US011834559B2

(12) United States Patent
Lundorf et al.

(10) Patent No.: US 11,834,559 B2
(45) Date of Patent: Dec. 5, 2023

(54) COMPOSITE MATERIALS WITH DESIRED CHARACTERISTICS

(71) Applicants: NANOCORE APS, Roskilde (DK); Mikkel Dybro Lundorf, Roskilde (DK); Henrik Pedersen, Bagsværd (DK)

(72) Inventors: Mikkel Dybro Lundorf, Roskilde (DK); Henrik Pedersen, Bagsværd (DK); Tore Dehli, Odense N (DK)

(73) Assignee: Nanocore APS, Bagsværd (DK)

(*) Notice: Subject to any disclaimer, the term of this patent is extended or adjusted under 35 U.S.C. 154(b) by 57 days.

(21) Appl. No.: 17/158,665

(22) Filed: Jan. 26, 2021

(65) Prior Publication Data

US 2021/0230381 A1 Jul. 29, 2021

Related U.S. Application Data

(63) Continuation of application No. 16/379,945, filed on Apr. 10, 2019, now Pat. No. 11,028,240, which is a (Continued)

(30) Foreign Application Priority Data

Nov. 11, 2014 (DK) .......................... PA 2014 00656

(51) Int. Cl.

| | |
|---|---|
| ***C08J 5/00*** | (2006.01) |
| ***B82Y 30/00*** | (2011.01) |
| ***B82Y 40/00*** | (2011.01) |
| ***C08K 9/04*** | (2006.01) |
| ***C08K 9/08*** | (2006.01) |
| ***C01B 32/05*** | (2017.01) |
| ***C01B 32/174*** | (2017.01) |
| ***C01B 32/194*** | (2017.01) |
| ***C04B 35/565*** | (2006.01) |
| ***C04B 35/58*** | (2006.01) |

(Continued)

(52) U.S. Cl.

CPC .............. *C08J 5/005* (2013.01); *B82Y 30/00* (2013.01); *B82Y 40/00* (2013.01); *C01B 32/05* (2017.08); *C01B 32/156* (2017.08); *C01B 32/168* (2017.08); *C01B 32/174* (2017.08); *C01B 32/194* (2017.08); *C04B 14/386* (2013.01); *C04B 16/0675* (2013.01); *C04B 28/02* (2013.01); *C04B 35/01* (2013.01); *C04B 35/10* (2013.01); *C04B 35/48* (2013.01); *C04B 35/50* (2013.01); *C04B 35/51* (2013.01); *C04B 35/56* (2013.01); *C04B 35/565* (2013.01); *C04B 35/58* (2013.01); *C04B 35/58085* (2013.01); *C04B 35/80* (2013.01); *C08F 292/00* (2013.01); *C08J 5/06* (2013.01); *C08K 9/04* (2013.01); *C08K 9/08* (2013.01); *C09D 5/24* (2013.01); *C09D 11/03* (2013.01); *C09D 11/04* (2013.01); *C09D 11/107* (2013.01); *C09D 11/52* (2013.01); *C09D 133/14* (2013.01); *C04B 2235/48* (2013.01); *C04B 2235/5252* (2013.01); *C04B 2235/5288* (2013.01); *C08F 2810/20* (2013.01); *C08J 2323/06* (2013.01); *C08J 2363/00* (2013.01); *C08J 2367/00* (2013.01); *C08J 2369/00* (2013.01); *C08J 2375/04* (2013.01); *C08J 2377/06* (2013.01); *C08K 3/041* (2017.05); *C08K 3/042* (2017.05); *C08K 2201/001* (2013.01); *C08K 2201/011* (2013.01); *C22C 26/00* (2013.01); *C22C 2026/001* (2013.01); *H01B 1/04* (2013.01)

(58) Field of Classification Search

CPC .. C08J 5/005; C08J 5/06; C08K 3/042; C08K 9/04; C08K 9/08; C08K 2201/001; C08K 2201/011; B82Y 40/00; B82Y 30/00; C01B 32/04; C01B 32/174; C01B 32/194; C01B 32/156; C01B 32/168; C04B 35/565; C04B 35/58085; C04B 35/50; C04B 35/10; C04B 35/58; C04B 35/56; C04B 35/48; C04B 28/02; C04B 14/386; C04B 16/0675; C04B 35/80; C08F 292/00; C09D 5/24; C09D 11/03; C09D 11/04; C09D 11/107; C09D 11/52; C09D 133/14

USPC ...................................................... 525/54.11

See application file for complete search history.

(56) References Cited

U.S. PATENT DOCUMENTS

2010/0038597 A1 2/2010 Reynolds et al.
2012/0202397 A1 8/2012 Wolf et al.

(Continued)

FOREIGN PATENT DOCUMENTS

CN 101721944 A 6/2010
WO WO 2011/056936 A2 5/2011
WO WO 2011/056936 A3 5/2011

OTHER PUBLICATIONS

Linke-Schaetzel et al., Chem. Eur. J., 12, 1931-1940, 2006. (Year: 2006).*

(Continued)

*Primary Examiner* — Hui H Chin

(74) *Attorney, Agent, or Firm* — Womble Bond Dickinson (US) LLP

(57) ABSTRACT

A type of composite material where the matrix material and additive are held together by covalently or non-covalently bound ligands is described. A particularly useful composite material covered by the present invention is a carbon nanotube-reinforced composite material where the matrix consists of a polymer, covalently attached to a linker, where said linker is non-covalently attached to the carbon nanotube. Methods for the preparation of such composite materials are provided.

29 Claims, 53 Drawing Sheets

Specification includes a Sequence Listing.

Related U.S. Application Data continuation of application No. 15/525,741, filed on May 10, 2017, now Pat. No. 10,301,433, which is a continuation of application No. PCT/DK2015/050345, filed on Nov. 11, 2015.

(60) Provisional application No. 62/202,309, filed on Aug. 7, 2015, provisional application No. 62/077,935, filed on Nov. 11, 2014.

(51) Int. Cl.

| | |
|---|---|
| ***C04B 35/50*** | (2006.01) |
| ***C04B 35/10*** | (2006.01) |
| ***C04B 35/56*** | (2006.01) |
| ***C04B 35/48*** | (2006.01) |
| ***C04B 28/02*** | (2006.01) |
| ***C04B 35/01*** | (2006.01) |
| ***C04B 35/51*** | (2006.01) |
| ***C01B 32/156*** | (2017.01) |
| ***C01B 32/168*** | (2017.01) |
| ***C04B 14/38*** | (2006.01) |
| ***C04B 16/06*** | (2006.01) |
| ***C04B 35/80*** | (2006.01) |
| ***C08F 292/00*** | (2006.01) |
| ***C08J 5/06*** | (2006.01) |
| ***C09D 5/24*** | (2006.01) |
| ***C09D 11/03*** | (2014.01) |
| ***C09D 11/04*** | (2006.01) |
| ***C09D 11/107*** | (2014.01) |
| ***C09D 11/52*** | (2014.01) |
| ***C09D 133/14*** | (2006.01) |
| *C08K 3/04* | (2006.01) |
| *C22C 26/00* | (2006.01) |
| *H01B 1/04* | (2006.01) |

(56) References Cited

U.S. PATENT DOCUMENTS

| | | | |
|---|---|---|---|
| 2012/0234204 | A1 | 9/2012 | Unai et al. |
| 2014/0083752 | A1 | 3/2014 | Walczak et al. |

OTHER PUBLICATIONS

Weissbuch et al., J. Phys., Chem. B, 102, 6313-6317, 1998. (Year: 1998).*

Bhattacharyya, S., et al., "Protein-functionalized carbon nanotube-polymer composites," *Appl. Phys. Lett.*, 2005, vol. 86, 113104.

Beyou, E., et al., "Polymer Nanocomposites Containing Functionalised Multiwalled Carbon NanoTubes: a Particular Attention to Polyolefin Based Materials," Chapter 5, *Synthesis and Applications of Carbon Nanotubes and Their Composites*, 2013, pp. 77-115.

Brown, S., et al."A Genetic Analysis of Carbon-Nanotube-Binding Proteins," *small*, 2008,vol. 4(4), pp. 416-420.

Gao, J., et al., "Chemical Engineering of the Single-Walled Carbon Nanotube—Nylon 6 Interface," *J. Am. Chem. Soc.*, 2006, vol. 128(23), pp. 7492-7496.

Li, S., et al., "Synthesis and Characterization of Polyethylene Chains Grafted onto the Sidewalls of Single-Walled Carbon Nanotubes via Copolymerization," *Journal of Polymer Scioence: Pat A: Polymer Chemistry*, 2007, vol. 45, pp. 5459-5469.

McIntosh, D., et al., "Benzoyl Peroxide Initiated In Situ Functionalization, Processing, and Mechanical Properties of Single-Walled Carbon Nanotube—Polypropylene Composite Fibers," *J. Phys. Chem. C*, 2007, vol. 2007(111), pp. 1592-1600.

Moniruzzaman, M., et al., "Tuning the Mechanical Properties of SWNT/Nylon 6,10 Composites with Flexible Spacers at the Interface," *Nano Letters*, 2007, vol. 7(5), pp. 1178-1185.

Petrov, P., et al., "Noncovalent functionalization of multi-walled carbon nanotubes by pyrene containing polymers," *Chemical Communications*, 2003, Issue 23, pp. 2904-2905.

Salzmann, C., et al., "Highly hydrophilic and stable polypeptide/single-wall carbon nanotube conjugates" *Journal of Materials Chemistry*, 2008, vol. 18(17), pp. 1977-1983.

Yang, Q., et al., "Functionalization of Multiwalled Carbon Nanotubes by Pyrene-Labeled Hydroxypropyl Cellulose," *J. Phys. Chem.*, 2008, vol. 112(41), pp. 12934-12939.

Yuan, W., et al., "Electronic Interactions and Polymer Effect in the Functionalization and Solvation of Carbon Nanotubes by Pyrene- and Ferrocene-Containing Poly(1-alkyne)s," *Macromolecules*, 2008, vol. 41(3), pp. 701-707.

Yang, Y., et al., "Synthesis of novel bispyrene diamines and their application as ratiometric fluorescent probes for detection of DNA," *Biosensors and Bioelectronics*, 2009, vol. 24, pp. 3442-3447.

* cited by examiner

FIG. 2
FIG. 2A Ligands linked in series
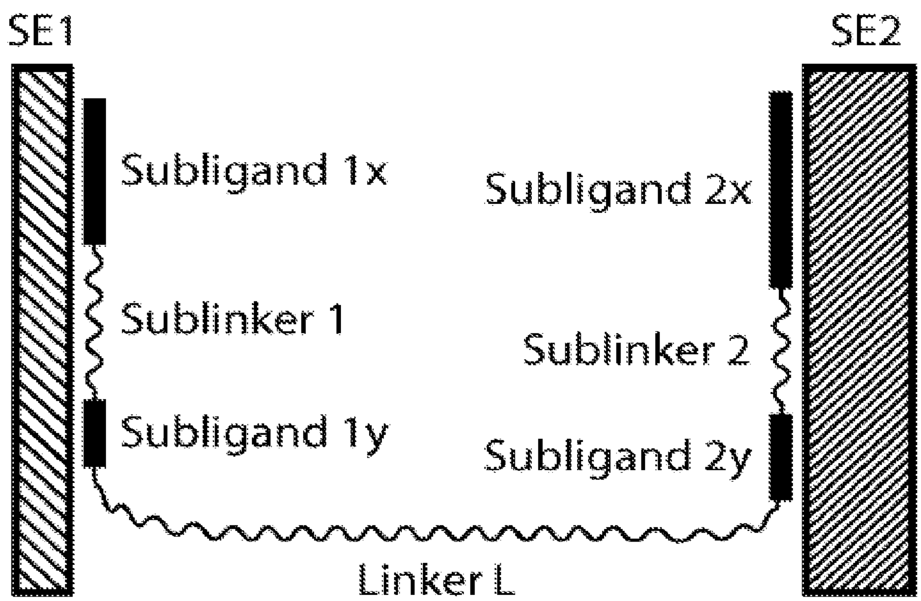
FIG. 2B Ligands linked in parallel
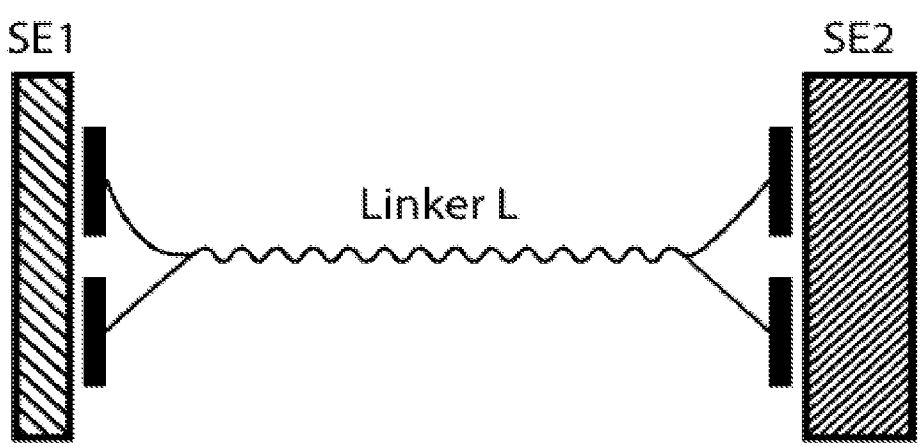

FIG. 3
FIG 3A In situ polymerisation
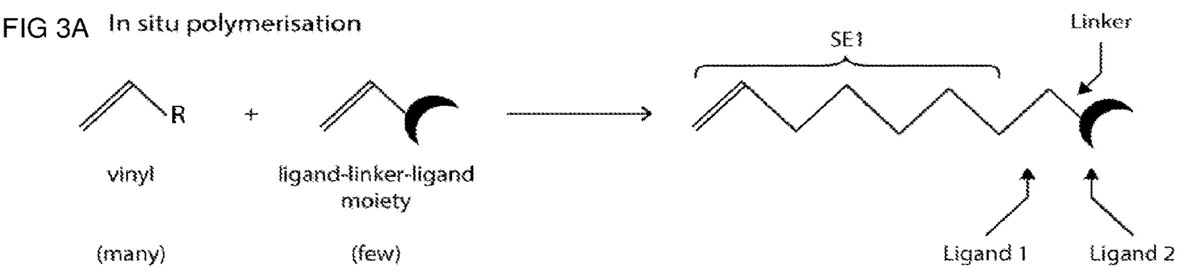
FIG 3B Solution mixing/Melt processing
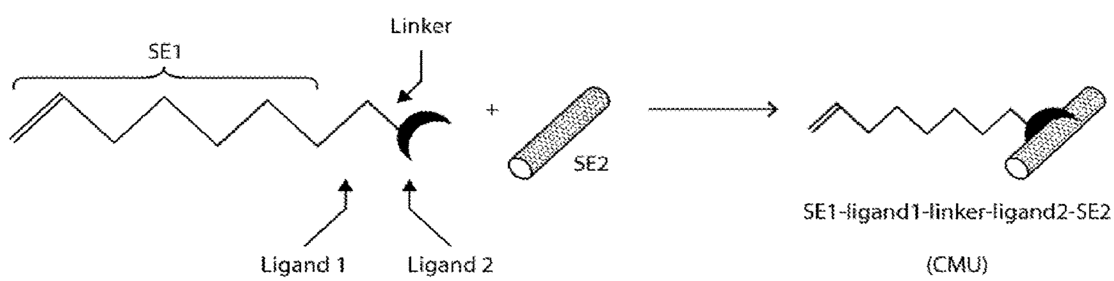

FIG. 7A

Linear Linker: Ligand1 - Linker - Ligand2

Branched Linker: Ligand1 - Linker - Ligand2

Ligand3

FIG. 7B-a
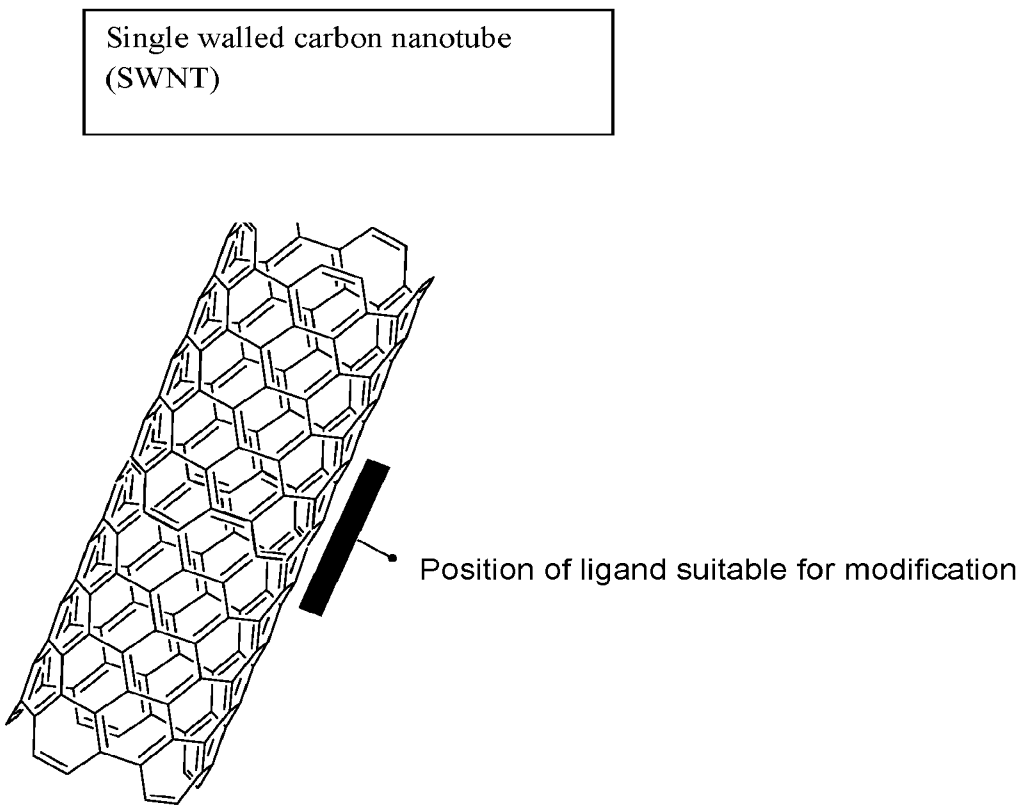

FIG. 7B-b
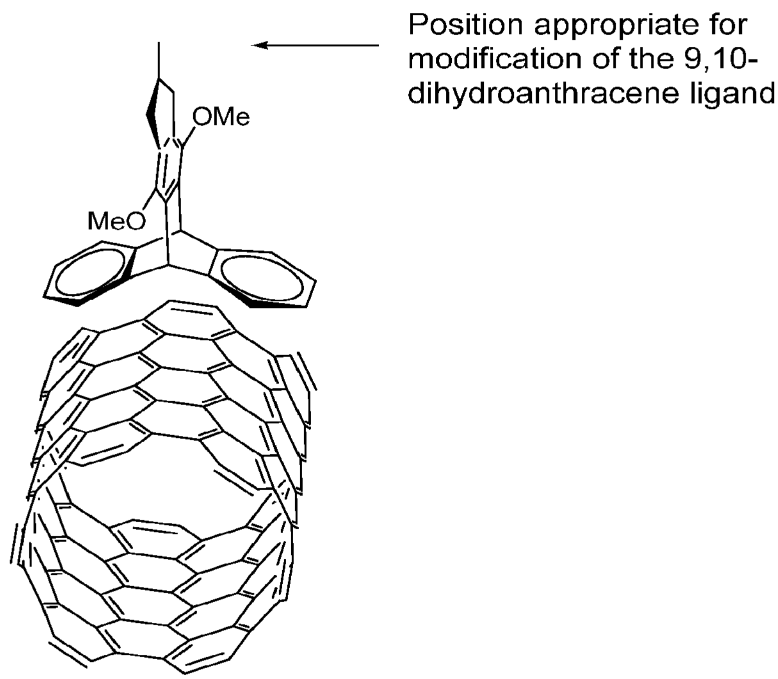

FIG. 7B-c
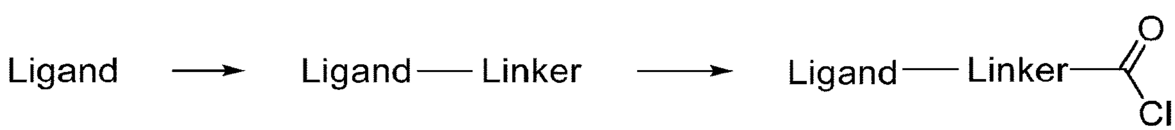

FIG. 7B-d
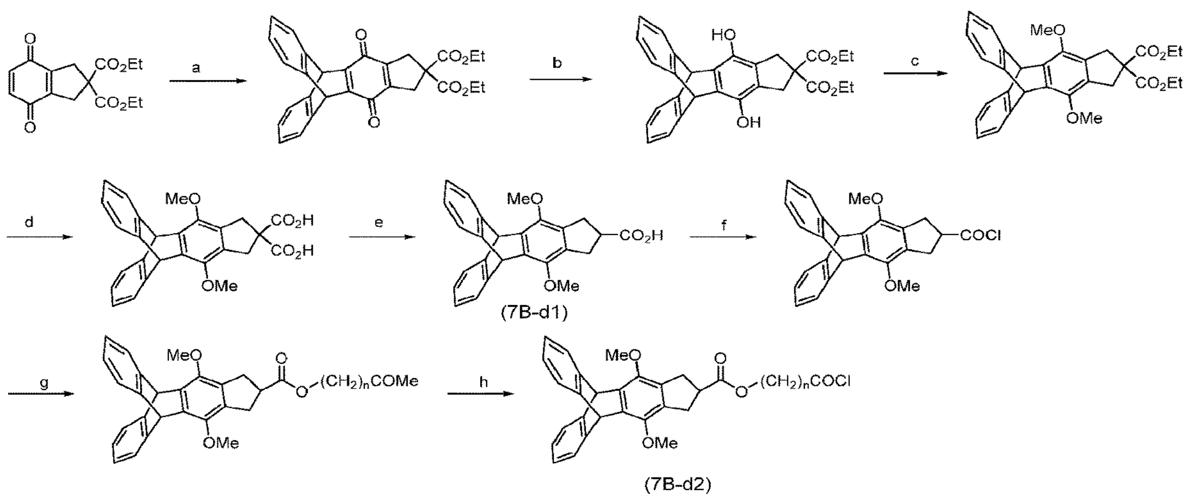

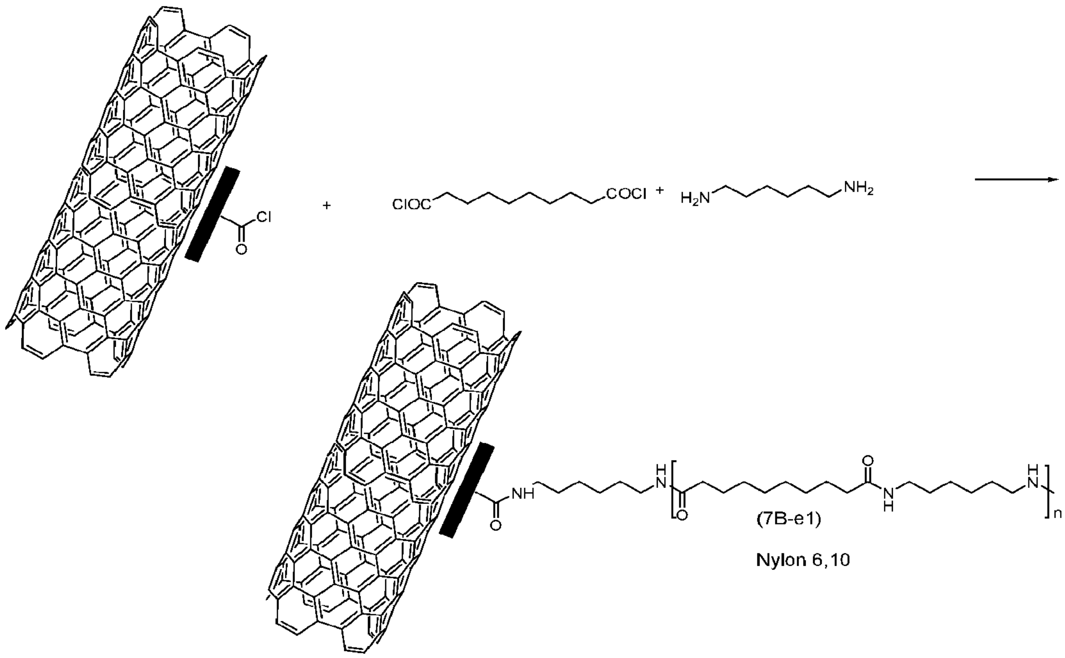
(7B-e1)
Nylon 6,10
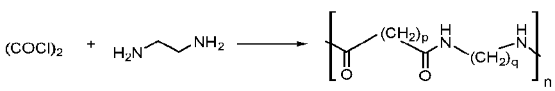
p=0, q=2
(7B-e2)
Nylon 2,2
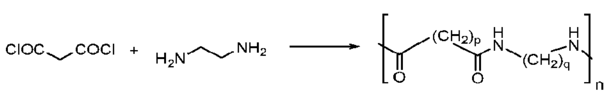
p=1, q=2
(7B-e3)
Nylon 2,3
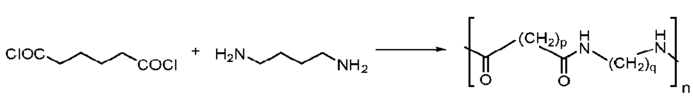
Nylon 4/6
p=4, q=4
(7B-e4)
Nylon 4,6
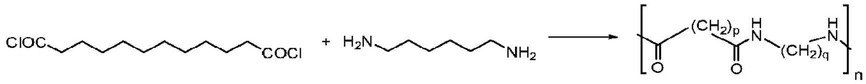
p=10, q=6
(7B-e5)
Nylon 6,12
FIG. 7B-e FIG. 7C-a
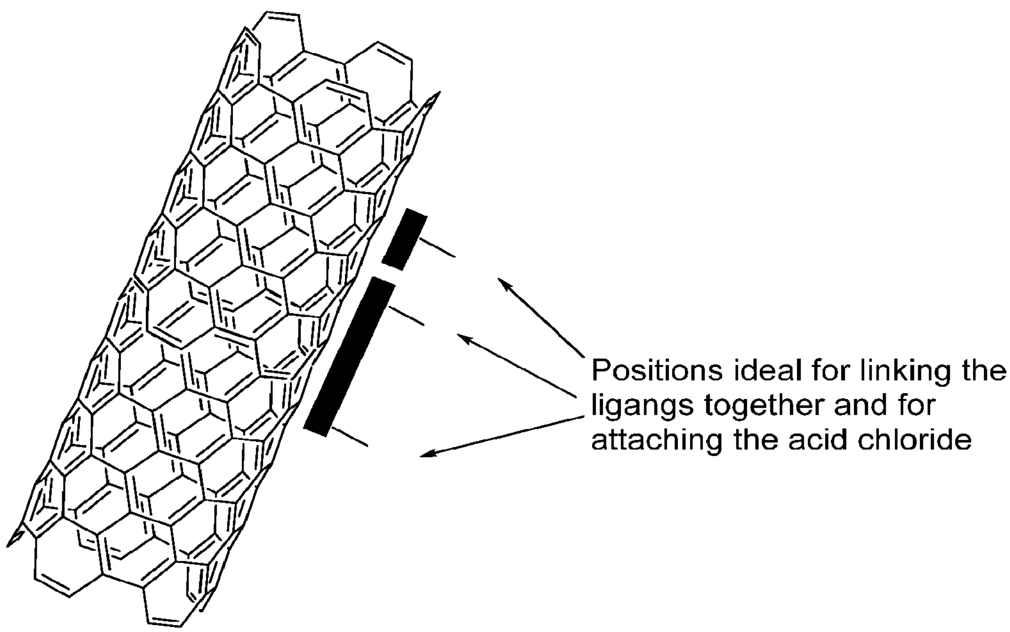

FIG. 7C-b
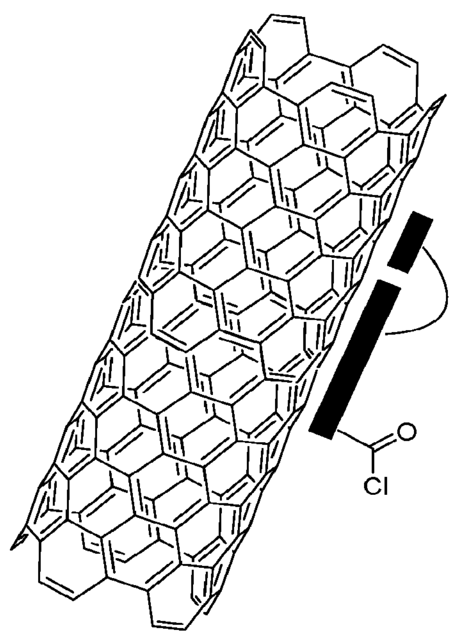

FIG. 7C-c
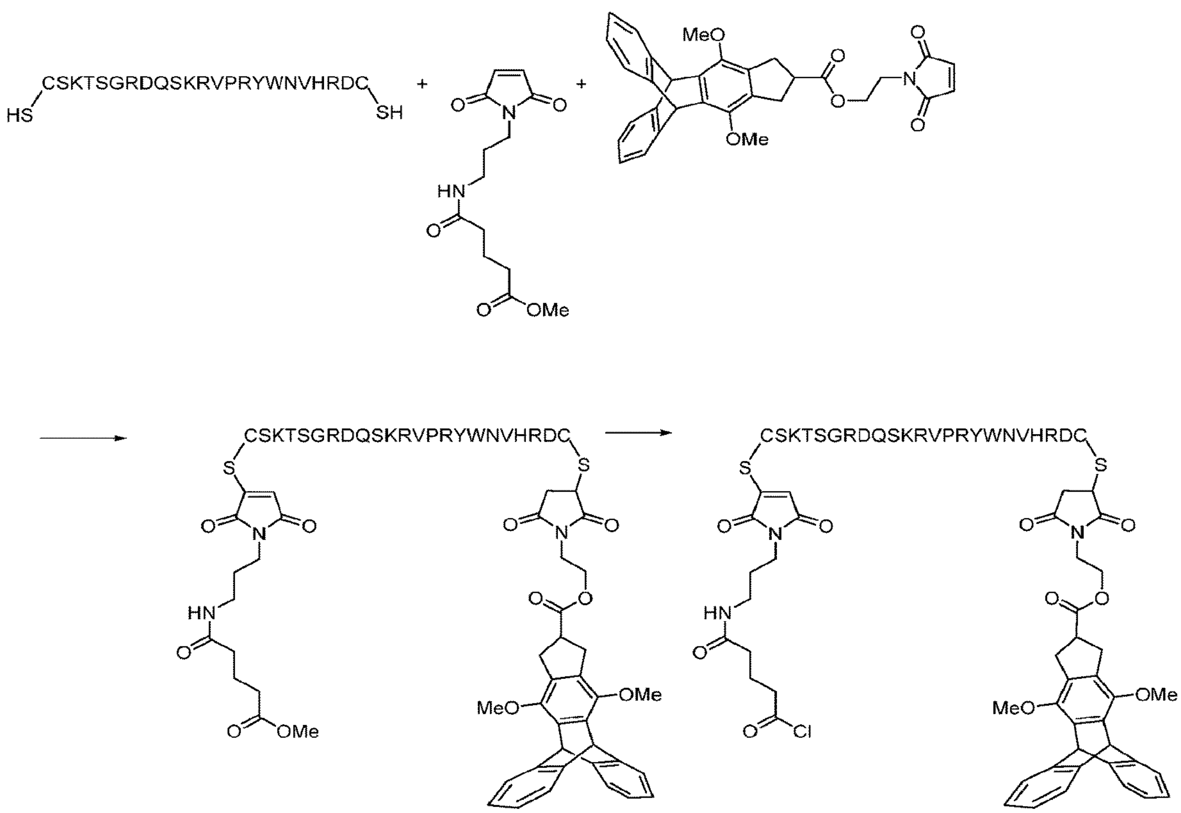
(7C-c)

FIG. 7D-a
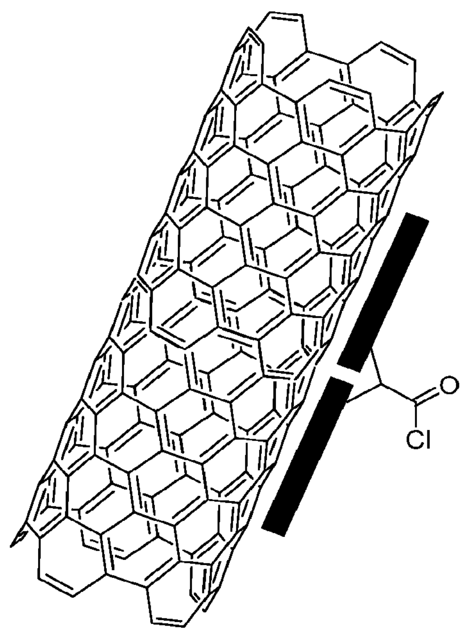

FIG. 7D-b
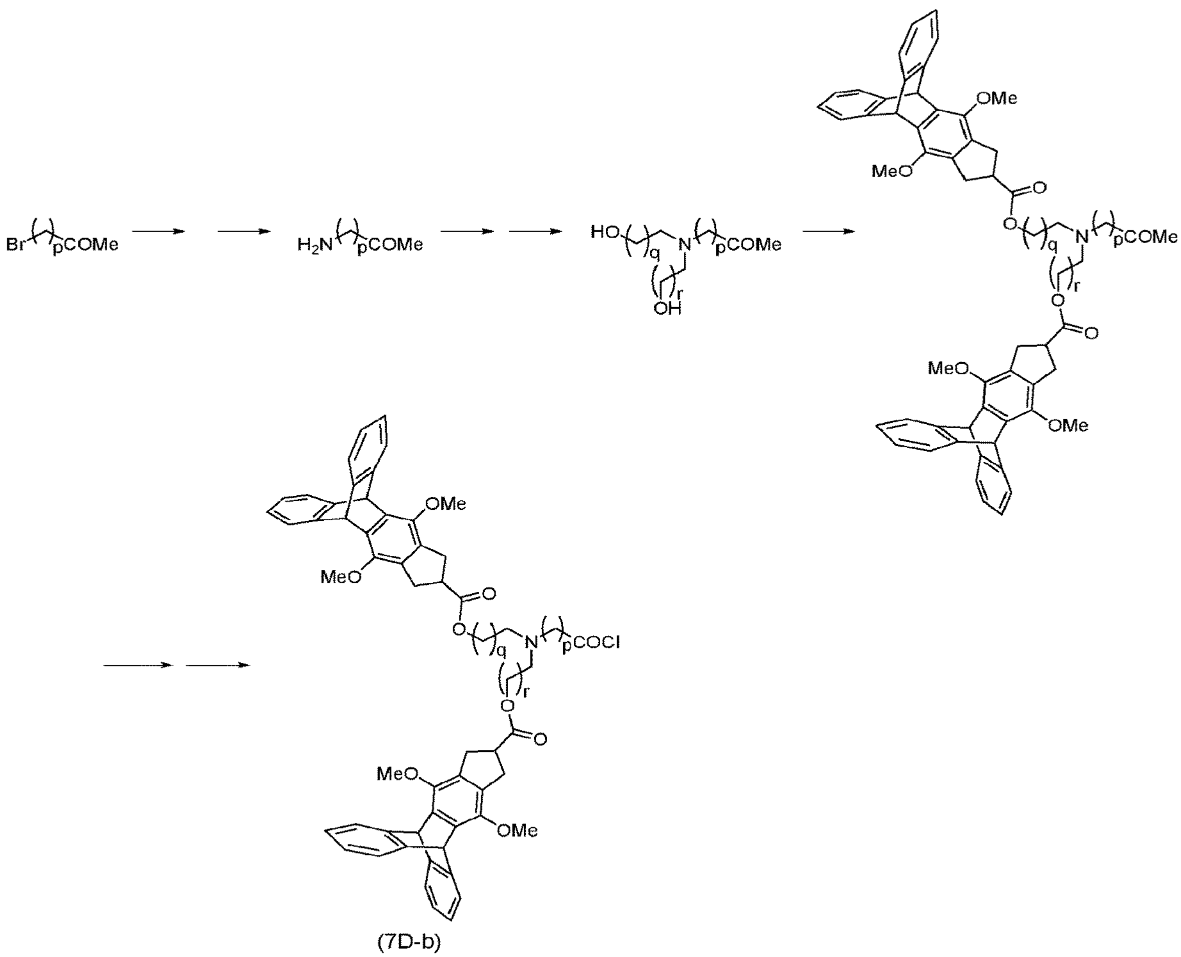
(7D-b)

FIG. 7E-a
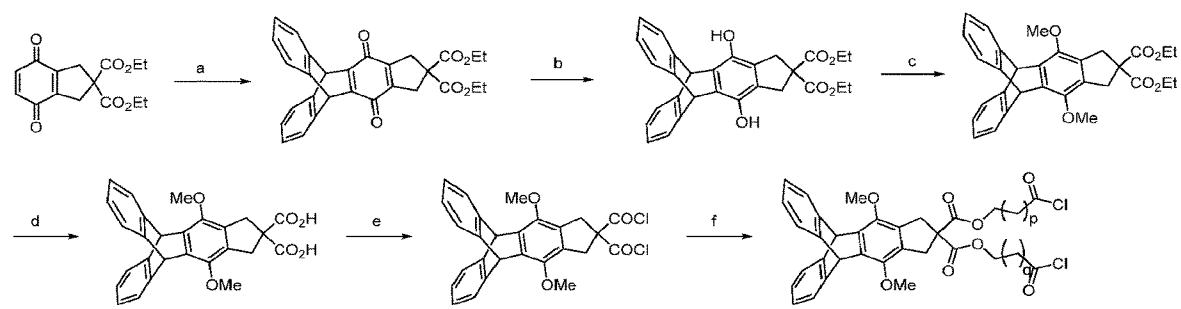
(7E-a)

FIG. 7E-b
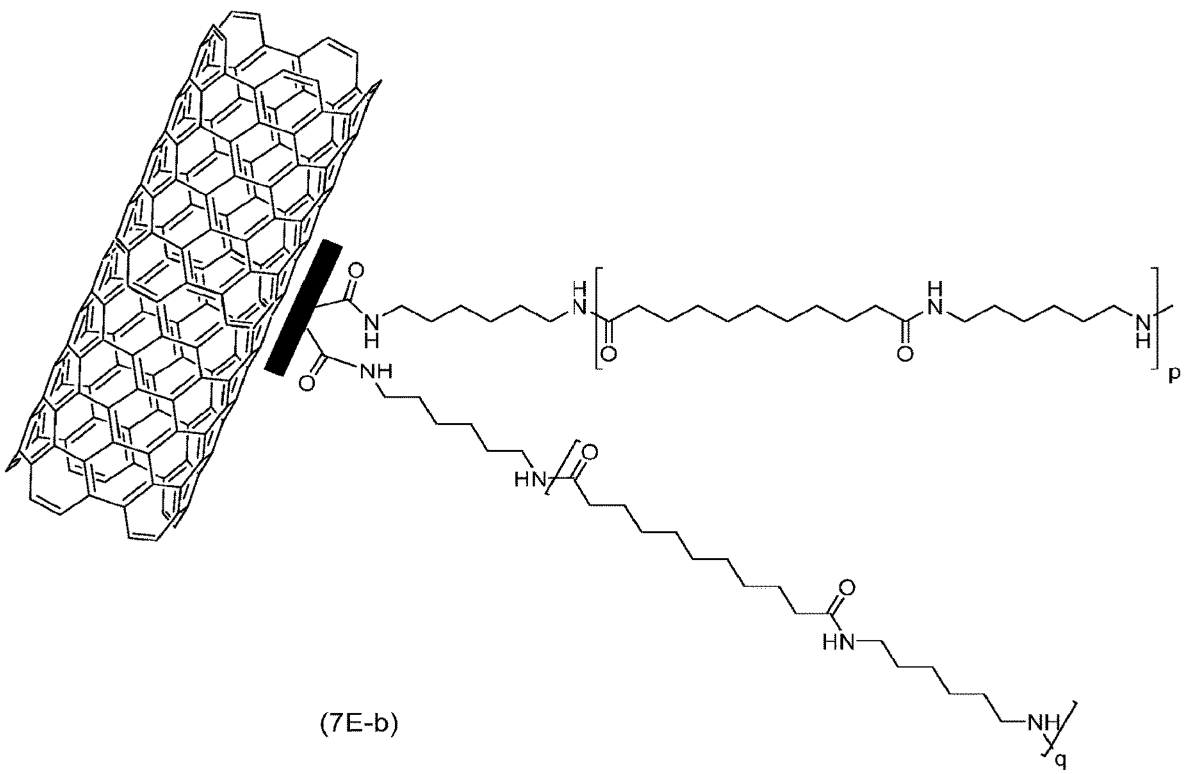
(7E-b)

FIG. 8 The ligand may be "built into" the matrix material
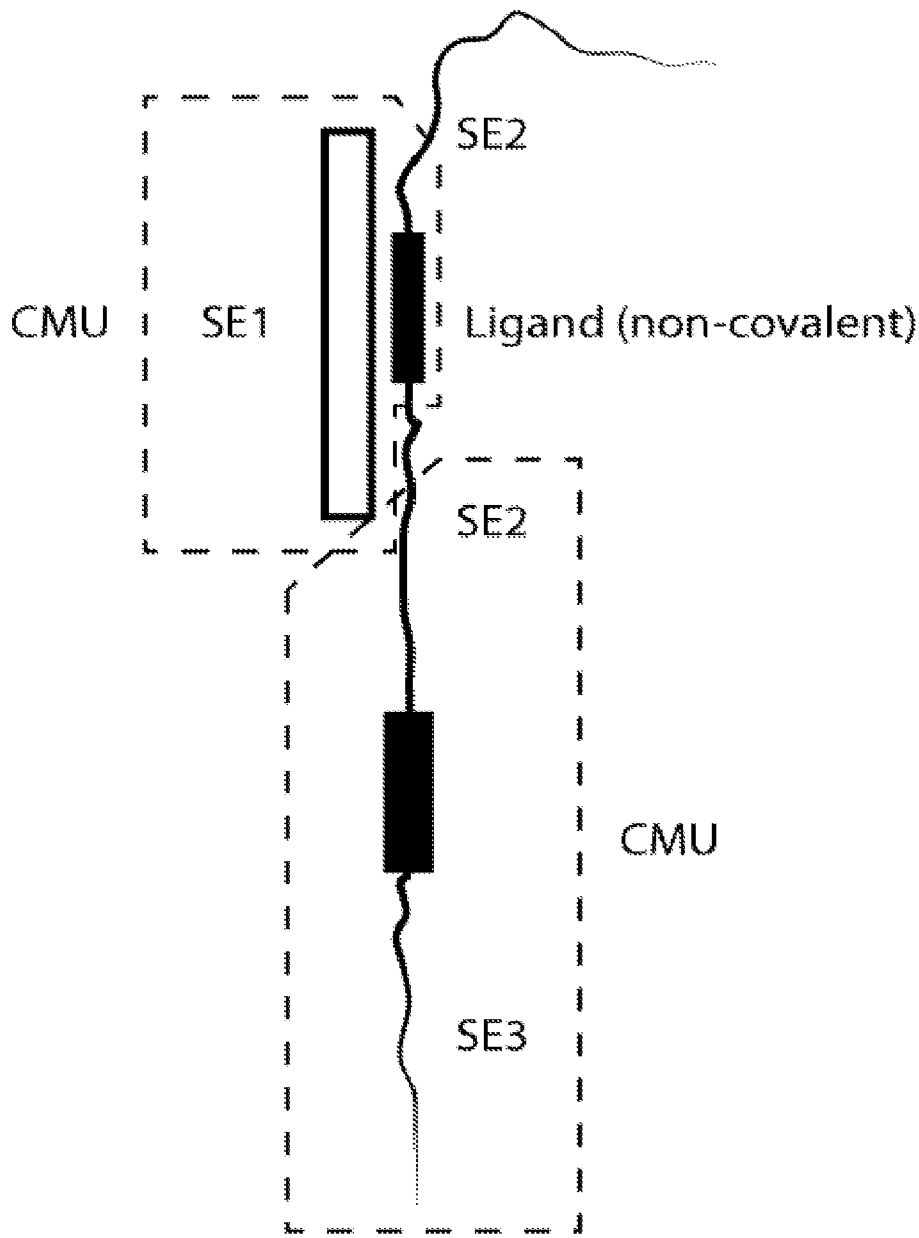

(9A-1)

FIG. 9A-2
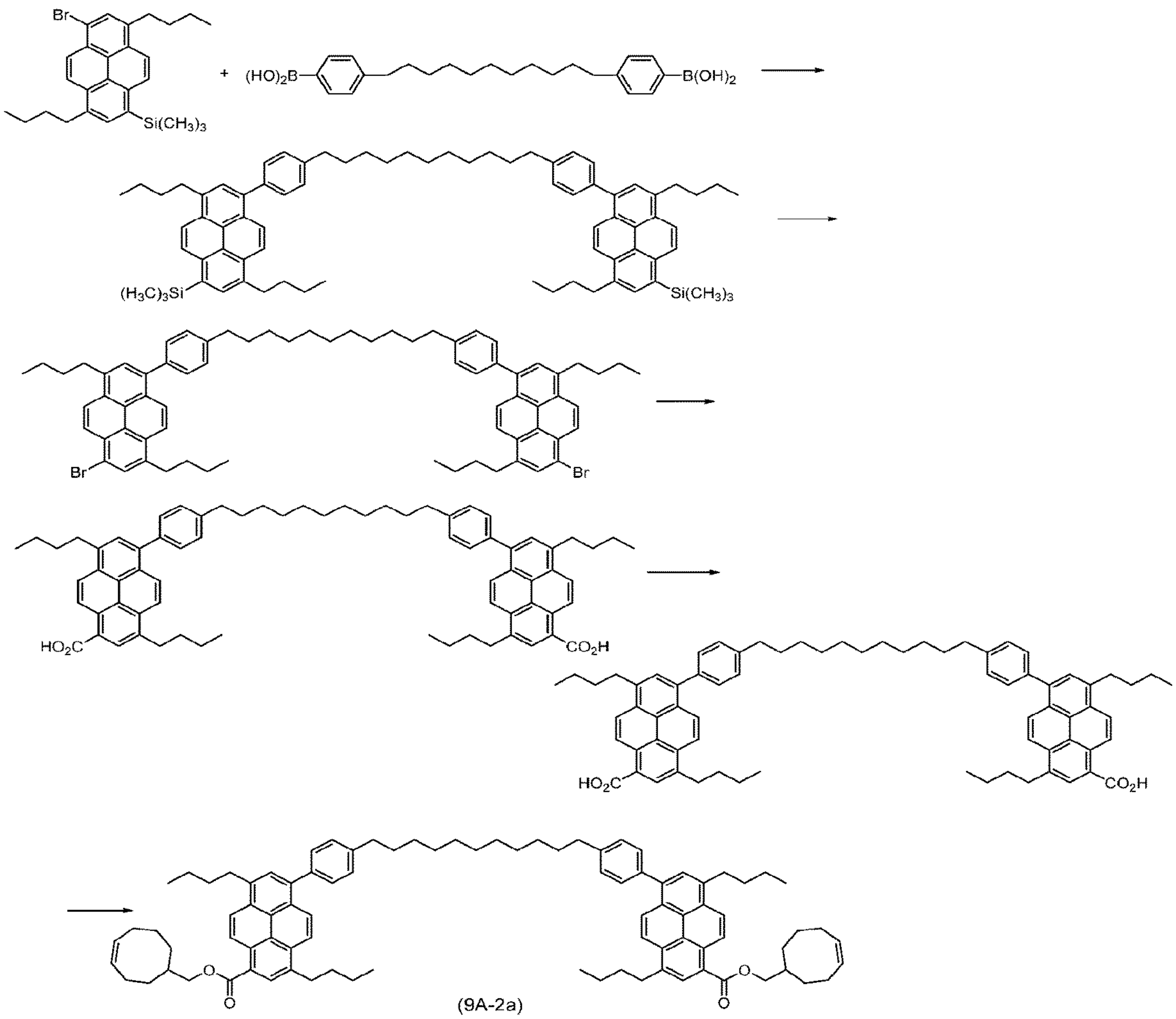
(9A-2a)
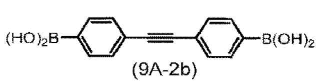
(9A-2b)
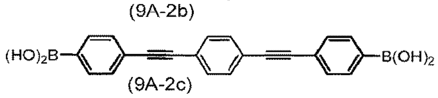
(9A-2c)
(9A-2d)

(9A-3)

(9A-4a)

(9A-4b)

(9A-5)

FIG. 10A
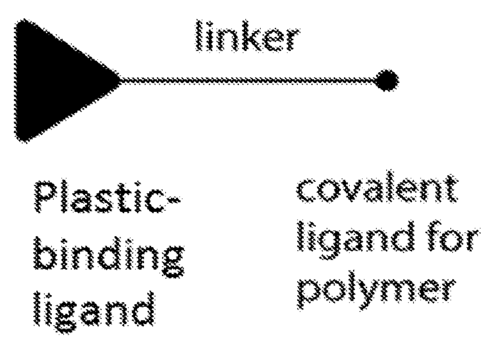
FIG. 10A-a
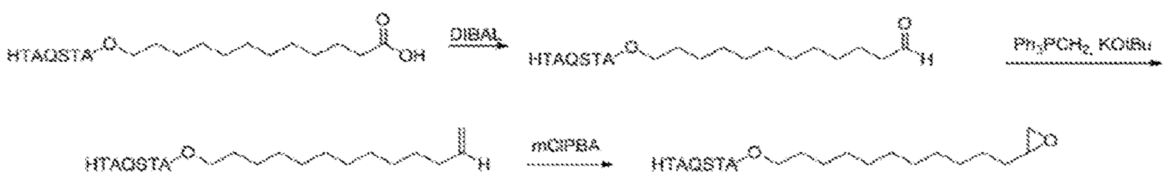
(10A-a)
FIG. 10A-b
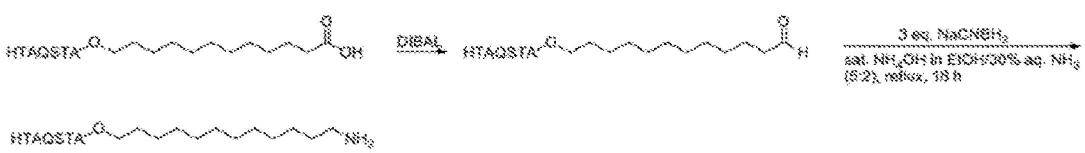
(10A-b)

FIG. 10B
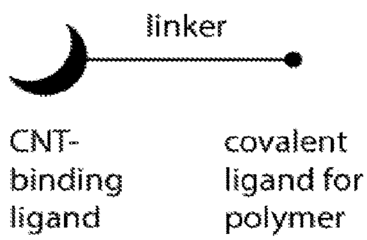
FIG. 10B-a
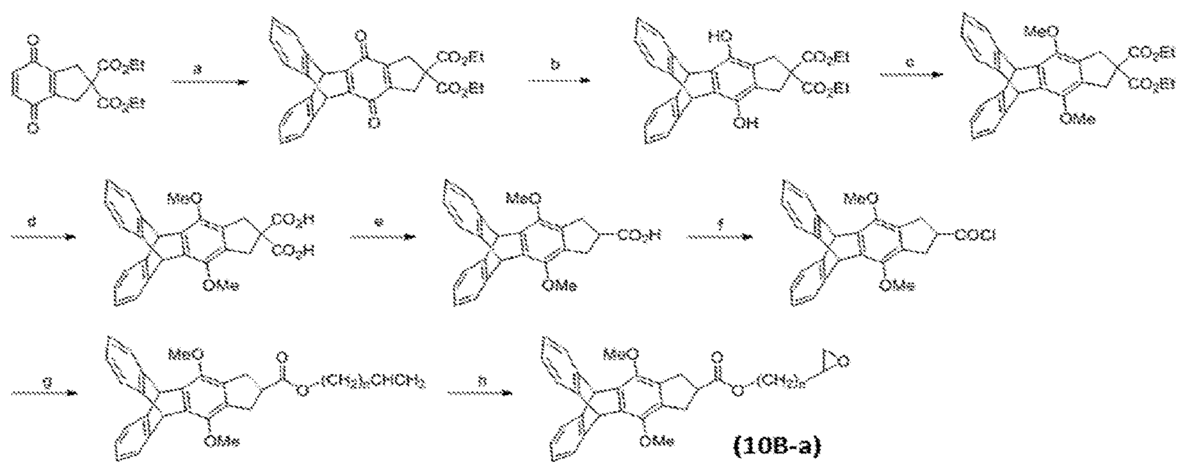
(10B-a)
FIG. 10B-b
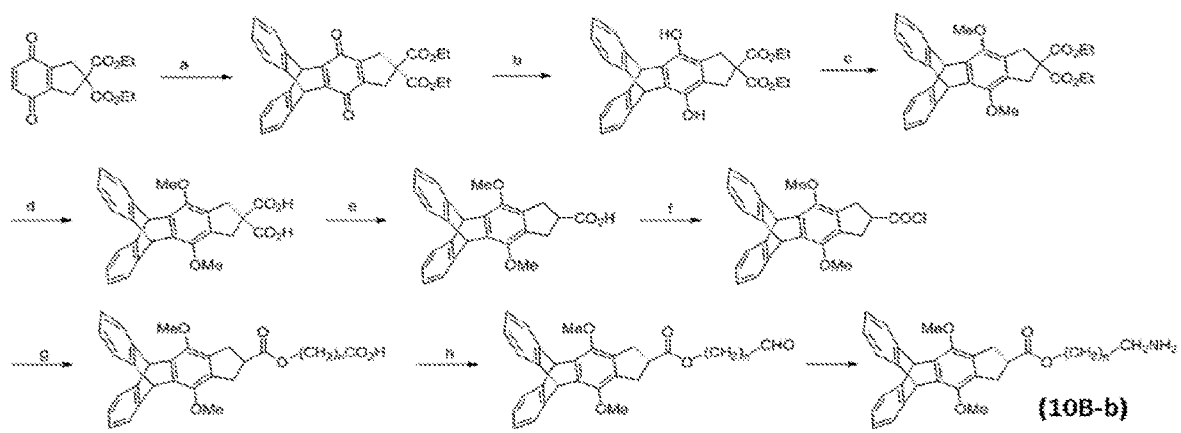
(10B-b)

FIG. 10C
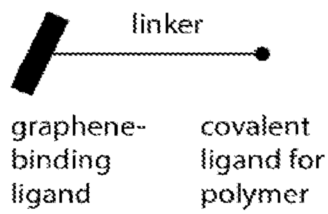
FIG. 10C-a
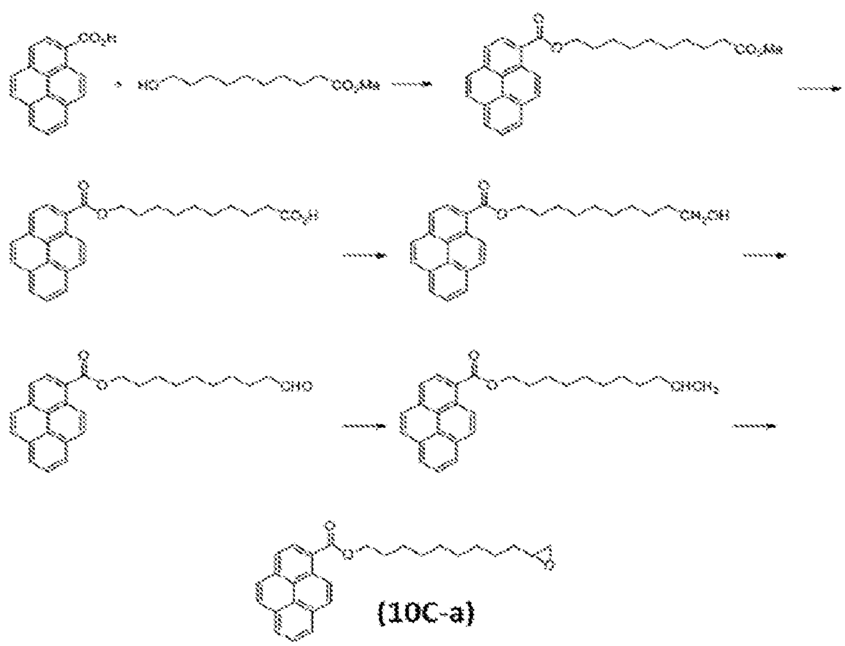
FIG. 10C-b
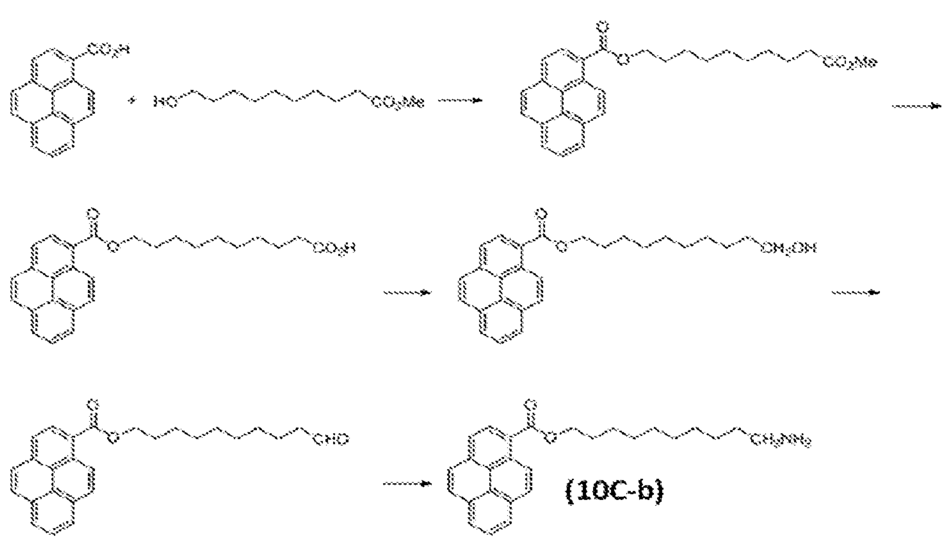

(10D)

FIG. 10F
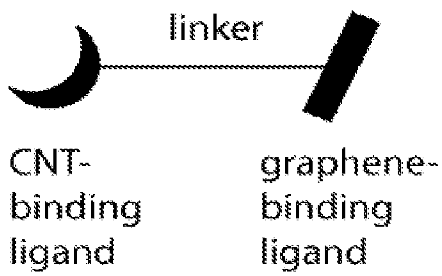
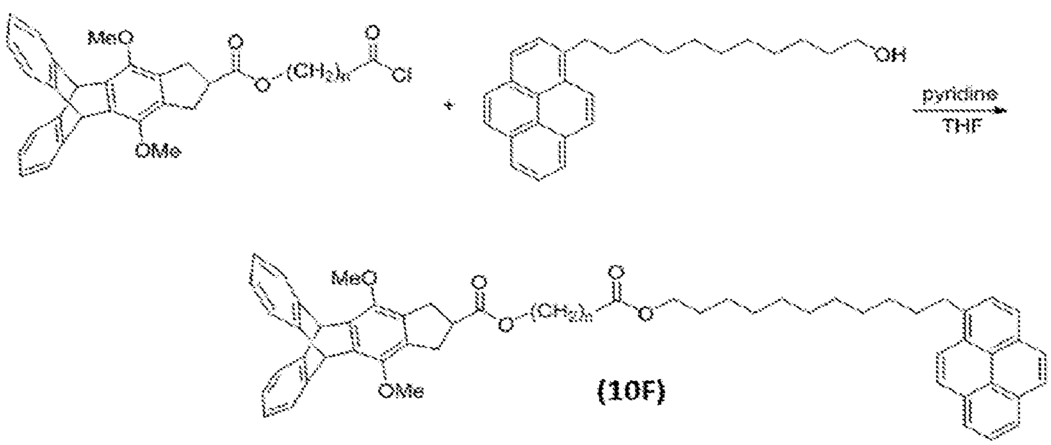
(10F)

FIG. 10J
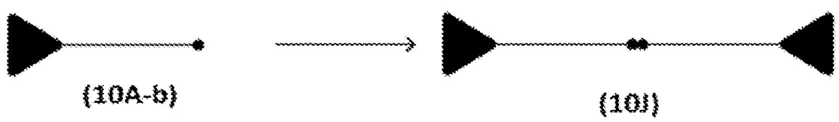
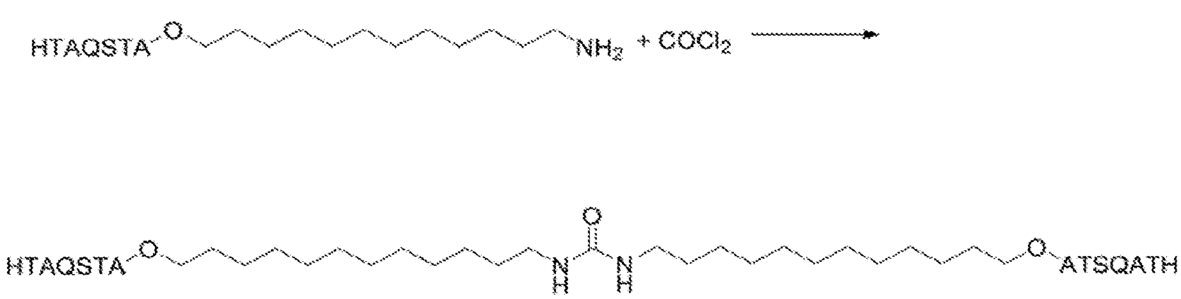
(10J)

FIG. 10K
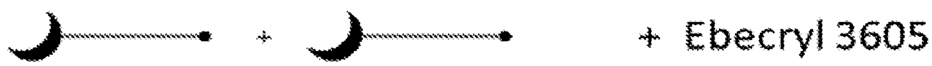
(10B-a) (10B-b)
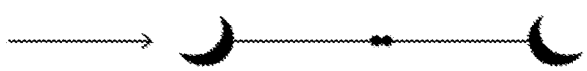
(10K)
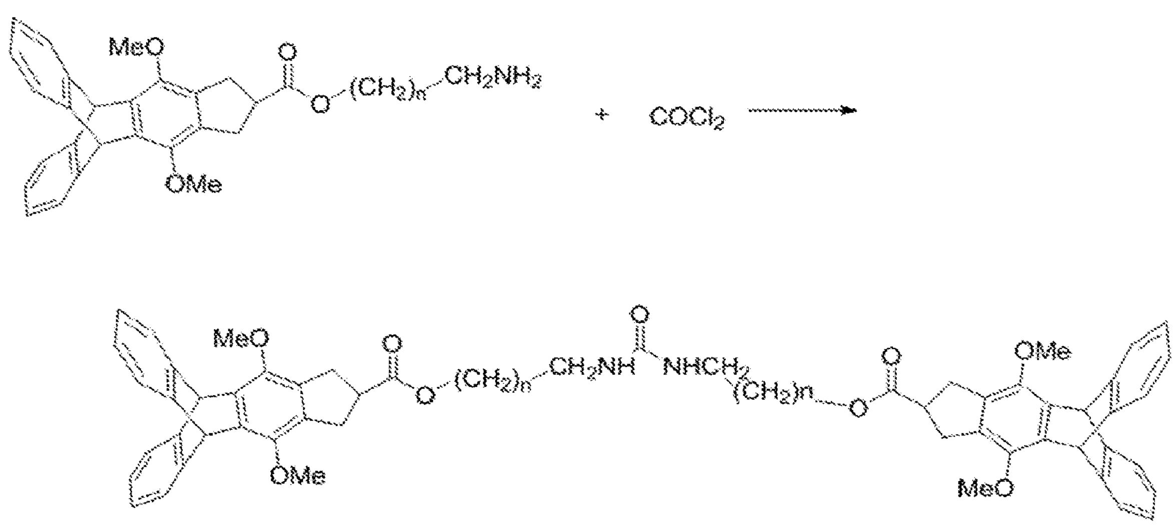
(10K)

(12B)

(12D)

(12E)

<u>QTWPPPLWFSTS</u>PGSSPGSS<u>QTWPPPLWFSTS</u>

The silica-binding peptide sequences are underlined

Graphene (left) and Carbon nanotube (right)

SEQUENCE LISTING

```
<160> NUMBER OF SEQ ID NOS: 62

<210> SEQ ID NO 1
<211> LENGTH: 16
<212> TYPE: PRT
<213> ORGANISM: Artificial Sequence
<220> FEATURE:
<223> OTHER INFORMATION: Synthetic sequence

<400> SEQUENCE: 1

Ser Val Ser Val Gly Met Lys Pro Ser Pro Arg Pro Gly Gly Gly Lys
1               5                   10                  15


<210> SEQ ID NO 2
<211> LENGTH: 12
<212> TYPE: PRT
<213> ORGANISM: Artificial Sequence
<220> FEATURE:
<223> OTHER INFORMATION: Synthetic sequence

<400> SEQUENCE: 2

Thr His Arg Thr Ser Thr Leu Asp Tyr Phe Val Ile
1               5                   10


<210> SEQ ID NO 3
<211> LENGTH: 9
<212> TYPE: PRT
<213> ORGANISM: Artificial Sequence
<220> FEATURE:
<223> OTHER INFORMATION: Synthetic sequence

<400> SEQUENCE: 3

Cys Pro Thr Ser Thr Gly Gln Ala Cys
1               5


<210> SEQ ID NO 4
<211> LENGTH: 9
<212> TYPE: PRT
<213> ORGANISM: Artificial Sequence
<220> FEATURE:
<223> OTHER INFORMATION: Synthetic sequence

<400> SEQUENCE: 4

Cys Thr Leu His Val Ser Ser Tyr Cys
1               5


<210> SEQ ID NO 5
<211> LENGTH: 4
<212> TYPE: PRT
<213> ORGANISM: Artificial Sequence
<220> FEATURE:
<223> OTHER INFORMATION: Synthetic sequence

<400> SEQUENCE: 5
```

Glu Leu Trp Arg
1

<210> SEQ ID NO 6
<211> LENGTH: 7
<212> TYPE: PRT
<213> ORGANISM: Artificial Sequence
<220> FEATURE:
<223> OTHER INFORMATION: Synthetic sequence

<400> SEQUENCE: 6

Glu Leu Trp Arg Pro Thr Arg
1 5

<210> SEQ ID NO 7
<211> LENGTH: 12
<212> TYPE: PRT
<213> ORGANISM: Artificial Sequence
<220> FEATURE:
<223> OTHER INFORMATION: Synthetic Sequence

<400> SEQUENCE: 7

Glu Leu Trp Ser Ile Asp Thr Ser Ala His Arg Lys
1 5 10

<210> SEQ ID NO 8
<211> LENGTH: 12
<212> TYPE: PRT
<213> ORGANISM: Artificial Sequence
<220> FEATURE:
<223> OTHER INFORMATION: Synthetic sequence

<400> SEQUENCE: 8

His Thr Asp Trp Arg Leu Gly Thr Trp His His Ser
1 5 10

<210> SEQ ID NO 9
<211> LENGTH: 7
<212> TYPE: PRT
<213> ORGANISM: Artificial Sequence
<220> FEATURE:
<223> OTHER INFORMATION: Synthetic sequence

<400> SEQUENCE: 9

Lys Pro Arg Ser Val Ser Gly
1 5

<210> SEQ ID NO 10
<211> LENGTH: 7
<212> TYPE: PRT
<213> ORGANISM: Artificial Sequence
<220> FEATURE:
<223> OTHER INFORMATION: Synthetic sequence

<400> SEQUENCE: 10

Gln Leu Met His Asp Tyr Arg
1 5

<210> SEQ ID NO 11
<211> LENGTH: 12
<212> TYPE: PRT
<213> ORGANISM: Artificial Sequence
<220> FEATURE:
<223> OTHER INFORMATION: Synthetic sequence

<400> SEQUENCE: 11

Gln Thr Trp Pro Pro Pro Leu Trp Phe Ser Thr Ser
1 5 10

<210> SEQ ID NO 12
<211> LENGTH: 12
<212> TYPE: PRT
<213> ORGANISM: Artificial Sequence
<220> FEATURE:
<223> OTHER INFORMATION: Synthetic sequence

<400> SEQUENCE: 12

Arg Leu Asn Pro Pro Ser Gln Met Asp Pro Pro Phe
1 5 10

<210> SEQ ID NO 13
<211> LENGTH: 11
<212> TYPE: PRT
<213> ORGANISM: Artificial Sequence
<220> FEATURE:
<223> OTHER INFORMATION: Synthetic sequence

<400> SEQUENCE: 13

Ile Phe Arg Leu Ser Trp Gly Thr Tyr Phe Ser
1 5 10

<210> SEQ ID NO 14
<211> LENGTH: 21
<212> TYPE: PRT
<213> ORGANISM: Artificial Sequence
<220> FEATURE:
<223> OTHER INFORMATION: Synthetic sequence

<400> SEQUENCE: 14

Lys Thr Gln Ala Thr Ser Glu Ser Gly Ser Ala Gly Arg Gln Met Phe
1 5 10 15

Val Ala Asp Met Gly
20

<210> SEQ ID NO 15
<211> LENGTH: 21
<212> TYPE: PRT
<213> ORGANISM: Artificial Sequence
<220> FEATURE:
<223> OTHER INFORMATION: Synthetic sequence

<400> SEQUENCE: 15

Lys Thr Gln Ala Thr Ser Arg Gly Thr Arg Gly Met Arg Thr Ser Gly
1 5 10 15

Gly Phe Pro Val Gly
20

<210> SEQ ID NO 16
<211> LENGTH: 21
<212> TYPE: PRT
<213> ORGANISM: Artificial Sequence
<220> FEATURE:
<223> OTHER INFORMATION: Synthetic sequence

<400> SEQUENCE: 16

Lys Thr Gln Ala Thr Ser Val Pro Arg Lys Ala Ala Arg Arg Trp Glu
1 5 10 15

Gln Val Asp Ser Val
20

<210> SEQ ID NO 17

<211> LENGTH: 14
<212> TYPE: PRT
<213> ORGANISM: Artificial Sequence
<220> FEATURE:
<223> OTHER INFORMATION: Synthetic sequence

<400> SEQUENCE: 17

```
Met His Gly Lys Thr Gln Ala Thr Ser Gly Thr Ile Gln Ser
1               5                   10
```

<210> SEQ ID NO 18
<211> LENGTH: 21
<212> TYPE: PRT
<213> ORGANISM: Artificial Sequence
<220> FEATURE:
<223> OTHER INFORMATION: Synthetic sequence

<400> SEQUENCE: 18

```
Pro Gln Ala Gln Asp Val Glu Leu Pro Gln Glu Leu Gln Asp Gln His
1               5                   10                  15

Arg Glu Val Glu Val
            20
```

<210> SEQ ID NO 19
<211> LENGTH: 21
<212> TYPE: PRT
<213> ORGANISM: Artificial Sequence
<220> FEATURE:
<223> OTHER INFORMATION: Synthetic sequence

<400> SEQUENCE: 19

```
Ser Lys Thr Ser Gly Arg Asp Gln Ser Lys Arg Val Pro Arg Tyr Trp
1               5                   10                  15

Asn Val His Arg Asp
            20
```

<210> SEQ ID NO 20
<211> LENGTH: 20
<212> TYPE: PRT
<213> ORGANISM: Artificial Sequence
<220> FEATURE:
<223> OTHER INFORMATION: Synthetic sequence

<400> SEQUENCE: 20

```
Ser Lys Thr Ser Arg Glu Ser Ser Ala Val Gln Met Gly Lys Ala Arg
1               5                   10                  15

Phe Leu Cys Thr
            20
```

<210> SEQ ID NO 21
<211> LENGTH: 40
<212> TYPE: PRT
<213> ORGANISM: Artificial Sequence
<220> FEATURE:
<223> OTHER INFORMATION: Synthetic sequence

<400> SEQUENCE: 21

```
Asp Ala Glu Phe Arg His Asp Ser Gly Tyr Glu Val His His Gln Lys
1               5                   10                  15

Leu Val Phe Phe Ala Glu Asp Val Gly Ser Asn Lys Gly Ala Ile Ile
            20                  25                  30

Gly Leu Met Val Gly Gly Val Val
        35                  40
```

<210> SEQ ID NO 22
<211> LENGTH: 42
<212> TYPE: PRT
<213> ORGANISM: Artificial Sequence
<220> FEATURE:
<223> OTHER INFORMATION: Synthetic sequence

<400> SEQUENCE: 22

Asp Ala Glu Phe Arg His Asp Ser Gly Tyr Glu Val His His Gln Lys
1               5                   10                  15

Leu Val Phe Phe Ala Glu Asp Val Gly Ser Asn Lys Gly Ala Ile Ile
            20                  25                  30

Gly Leu Met Val Gly Gly Val Val Ile Ala
        35                  40

<210> SEQ ID NO 23
<211> LENGTH: 12
<212> TYPE: PRT
<213> ORGANISM: Artificial Sequence
<220> FEATURE:
<223> OTHER INFORMATION: Synthetic sequence

<400> SEQUENCE: 23

His Trp Lys His Pro Trp Gly Ala Trp Asp Thr Leu
1               5                   10

<210> SEQ ID NO 24
<211> LENGTH: 9
<212> TYPE: PRT
<213> ORGANISM: Artificial Sequence
<220> FEATURE:
<223> OTHER INFORMATION: Synthetic sequence

<400> SEQUENCE: 24

Thr Gly Thr Gly Phe Gly Thr Cys Thr
1               5

<210> SEQ ID NO 25
<211> LENGTH: 9
<212> TYPE: PRT
<213> ORGANISM: Artificial Sequence
<220> FEATURE:
<223> OTHER INFORMATION: Synthetic sequence

<400> SEQUENCE: 25

Thr Gly Thr Gly Val Gly Thr Cys Thr
1               5

<210> SEQ ID NO 26
<211> LENGTH: 9
<212> TYPE: PRT
<213> ORGANISM: Artificial Sequence
<220> FEATURE:
<223> OTHER INFORMATION: Synthetic sequence

<400> SEQUENCE: 26

Thr Gly Thr Gly Trp Gly Thr Cys Thr
1               5

<210> SEQ ID NO 27
<211> LENGTH: 9
<212> TYPE: PRT
<213> ORGANISM: Artificial Sequence
<220> FEATURE:
<223> OTHER INFORMATION: Synthetic sequence

<400> SEQUENCE: 27

Thr Gly Thr Gly Thr Gly Thr Cys Thr
1 5

<210> SEQ ID NO 28
<211> LENGTH: 9
<212> TYPE: PRT
<213> ORGANISM: Artificial Sequence
<220> FEATURE:
<223> OTHER INFORMATION: Synthetic sequence

<400> SEQUENCE: 28

Thr Gly Thr Gly Gly Gly Thr Cys Thr
1 5

<210> SEQ ID NO 29
<211> LENGTH: 9
<212> TYPE: PRT
<213> ORGANISM: Artificial Sequence
<220> FEATURE:
<223> OTHER INFORMATION: Synthetic sequence

<400> SEQUENCE: 29

Thr Gly Thr Gly Asn Gly Thr Cys Thr
1 5

<210> SEQ ID NO 30
<211> LENGTH: 9
<212> TYPE: PRT
<213> ORGANISM: Artificial Sequence
<220> FEATURE:
<223> OTHER INFORMATION: Synthetic sequence

<400> SEQUENCE: 30

Thr Gly Thr Gly Lys Gly Thr Cys Thr
1 5

<210> SEQ ID NO 31
<211> LENGTH: 9
<212> TYPE: PRT
<213> ORGANISM: Artificial Sequence
<220> FEATURE:
<223> OTHER INFORMATION: Synthetic sequence

<400> SEQUENCE: 31

Thr Gly Thr Gly Asp Gly Thr Cys Thr
1 5

<210> SEQ ID NO 32
<211> LENGTH: 9
<212> TYPE: PRT
<213> ORGANISM: Artificial Sequence
<220> FEATURE:
<223> OTHER INFORMATION: Synthetic sequence

<400> SEQUENCE: 32

Cys His Lys Lys Pro Ser Lys Ser Cys
1 5

<210> SEQ ID NO 33
<211> LENGTH: 12
<212> TYPE: PRT
<213> ORGANISM: Artificial Sequence
<220> FEATURE:
<223> OTHER INFORMATION: Synthetic sequence

<400> SEQUENCE: 33

```
Arg Lys Leu Pro Asp Ala Pro Gly Met His Thr Trp
1               5                   10


<210> SEQ ID NO 34
<211> LENGTH: 19
<212> TYPE: PRT
<213> ORGANISM: Artificial Sequence
<220> FEATURE:
<223> OTHER INFORMATION: Synthetic sequence

<400> SEQUENCE: 34

Ser Cys Ser Asp Cys Leu Lys Ser Val Asp Phe Ile Pro Ser Ser Leu
1               5                   10                  15

Ala Ser Ser


<210> SEQ ID NO 35
<211> LENGTH: 7
<212> TYPE: PRT
<213> ORGANISM: Artificial Sequence
<220> FEATURE:
<223> OTHER INFORMATION: Synthetic sequence

<400> SEQUENCE: 35

Tyr Leu Thr Met Pro Thr Pro
1               5


<210> SEQ ID NO 36
<211> LENGTH: 7
<212> TYPE: PRT
<213> ORGANISM: Artificial Sequence
<220> FEATURE:
<223> OTHER INFORMATION: Synthetic sequence

<400> SEQUENCE: 36

Phe Ser Trp Glu Ala Phe Ala
1               5


<210> SEQ ID NO 37
<211> LENGTH: 7
<212> TYPE: PRT
<213> ORGANISM: Artificial Sequence
<220> FEATURE:
<223> OTHER INFORMATION: Synthetic sequence

<400> SEQUENCE: 37

His Leu Glu Ser Thr Pro Gly
1               5


<210> SEQ ID NO 38
<211> LENGTH: 7
<212> TYPE: PRT
<213> ORGANISM: Artificial Sequence
<220> FEATURE:
<223> OTHER INFORMATION: Synthetic sequence

<400> SEQUENCE: 38

Gly Glu Thr Arg Ala Pro Leu
1               5


<210> SEQ ID NO 39
<211> LENGTH: 7
<212> TYPE: PRT
<213> ORGANISM: Artificial Sequence
<220> FEATURE:
<223> OTHER INFORMATION: Synthetic sequence

<400> SEQUENCE: 39
```

Arg His Glu Pro Pro Leu Ala
1 5

<210> SEQ ID NO 40
<211> LENGTH: 7
<212> TYPE: PRT
<213> ORGANISM: Artificial Sequence
<220> FEATURE:
<223> OTHER INFORMATION: Synthetic sequence

<400> SEQUENCE: 40

Gly Glu Thr Gln Cys Ala Ala
1 5

<210> SEQ ID NO 41
<211> LENGTH: 7
<212> TYPE: PRT
<213> ORGANISM: Artificial Sequence
<220> FEATURE:
<223> OTHER INFORMATION: Synthetic sequence

<400> SEQUENCE: 41

Phe Pro Gly Arg Pro Ser Pro
1 5

<210> SEQ ID NO 42
<211> LENGTH: 7
<212> TYPE: PRT
<213> ORGANISM: Artificial Sequence
<220> FEATURE:
<223> OTHER INFORMATION: Synthetic sequence

<400> SEQUENCE: 42

His Thr Ala Gln Ser Thr Ala
1 5

<210> SEQ ID NO 43
<211> LENGTH: 7
<212> TYPE: PRT
<213> ORGANISM: Artificial Sequence
<220> FEATURE:
<223> OTHER INFORMATION: Synthetic sequence

<400> SEQUENCE: 43

His Lys Pro Asp Ala Asn Arg
1 5

<210> SEQ ID NO 44
<211> LENGTH: 7
<212> TYPE: PRT
<213> ORGANISM: Artificial Sequence
<220> FEATURE:
<223> OTHER INFORMATION: Synthetic sequence

<400> SEQUENCE: 44

Phe Pro Gly His Ser Gly Pro
1 5

<210> SEQ ID NO 45
<211> LENGTH: 7
<212> TYPE: PRT
<213> ORGANISM: Artificial Sequence
<220> FEATURE:
<223> OTHER INFORMATION: Synthetic sequence

<400> SEQUENCE: 45

Thr His Leu Pro Trp Gln Thr
1 5

<210> SEQ ID NO 46
<211> LENGTH: 21
<212> TYPE: PRT
<213> ORGANISM: Artificial Sequence
<220> FEATURE:
<223> OTHER INFORMATION: Synthetic sequence

<400> SEQUENCE: 46

Val Lys Thr Gln Ala Thr Ser Arg Glu Glu Pro Pro Arg Leu Pro Ser
1 5 10 15

Lys His Arg Pro Gly
20

<210> SEQ ID NO 47
<211> LENGTH: 24
<212> TYPE: PRT
<213> ORGANISM: Artificial Sequence
<220> FEATURE:
<223> OTHER INFORMATION: Synthetic sequence

<400> SEQUENCE: 47

Ser Lys Thr Ser Gly Arg Asp Gln Ser Lys Arg Val Pro Arg Tyr Trp
1 5 10 15

Asn Val His Arg Asp Ser Ser Cys
20

<210> SEQ ID NO 48
<211> LENGTH: 24
<212> TYPE: PRT
<213> ORGANISM: Artificial Sequence
<220> FEATURE:
<223> OTHER INFORMATION: Synthetic sequence

<400> SEQUENCE: 48

Ser Lys Thr Ser Arg Glu Ser Ser Ala Val Gln Met Gly Lys Ala Arg
1 5 10 15

Phe Leu Cys Thr His Ser Ser Cys
20

<210> SEQ ID NO 49
<211> LENGTH: 24
<212> TYPE: PRT
<213> ORGANISM: Artificial Sequence
<220> FEATURE:
<223> OTHER INFORMATION: Synthetic sequence

<400> SEQUENCE: 49

Lys Thr Gln Ala Thr Ser Arg Gly Thr Arg Gly Met Arg Thr Ser Gly
1 5 10 15

Gly Phe Pro Val Gly Ser Ser Cys
20

<210> SEQ ID NO 50
<211> LENGTH: 24
<212> TYPE: PRT
<213> ORGANISM: Artificial Sequence
<220> FEATURE:
<223> OTHER INFORMATION: Synthetic sequence

<400> SEQUENCE: 50

Lys Thr Gln Ala Thr Ser Val Pro Arg Lys Ala Ala Arg Arg Trp Glu
1 5 10 15

```
Gln Val Asp Ser Val Ser Ser Cys
            20


<210> SEQ ID NO 51
<211> LENGTH: 24
<212> TYPE: PRT
<213> ORGANISM: Artificial Sequence
<220> FEATURE:
<223> OTHER INFORMATION: Synthetic sequence

<400> SEQUENCE: 51

Lys Thr Gln Ala Thr Ser Glu Ser Gly Ser Ala Gly Arg Gln Met Phe
1               5                   10                  15

Val Ala Asp Met Gly Ser Ser Cys
            20


<210> SEQ ID NO 52
<211> LENGTH: 24
<212> TYPE: PRT
<213> ORGANISM: Artificial Sequence
<220> FEATURE:
<223> OTHER INFORMATION: Synthetic sequence

<400> SEQUENCE: 52

Pro Gln Ala Gln Asp Val Glu Leu Pro Gln Glu Leu Gln Asp Gln His
1               5                   10                  15

Arg Glu Val Glu Val Ser Ser Cys
            20


<210> SEQ ID NO 53
<211> LENGTH: 58
<212> TYPE: PRT
<213> ORGANISM: Artificial Sequence
<220> FEATURE:
<223> OTHER INFORMATION: Synthetic sequence

<400> SEQUENCE: 53

Ser Lys Thr Ser Gly Arg Asp Gln Ser Lys Arg Val Pro Arg Tyr Trp
1               5                   10                  15

Asn Val His Arg Asp Ser Ser Gly Ser Ser Gly Ser Ser Gly Pro Ser
            20                  25                  30

Ser Gly Ser Ser Gly Ser Lys Thr Ser Gly Arg Asp Gln Ser Lys Arg
        35                  40                  45

Val Pro Arg Tyr Trp Asn Val His Arg Asp
    50                  55


<210> SEQ ID NO 54
<211> LENGTH: 58
<212> TYPE: PRT
<213> ORGANISM: Artificial Sequence
<220> FEATURE:
<223> OTHER INFORMATION: Synthetic sequence

<400> SEQUENCE: 54

Ser Lys Thr Ser Arg Glu Ser Ser Ala Val Gln Met Gly Lys Ala Arg
1               5                   10                  15

Phe Leu Cys Thr His Ser Ser Gly Ser Ser Gly Ser Ser Gly Pro Ser
            20                  25                  30

Ser Gly Ser Ser Gly Ser Lys Thr Ser Arg Glu Ser Ser Ala Val Gln
        35                  40                  45

Met Gly Lys Ala Arg Phe Leu Cys Thr His
    50                  55
```

<210> SEQ ID NO 55
<211> LENGTH: 58
<212> TYPE: PRT
<213> ORGANISM: Artificial Sequence
<220> FEATURE:
<223> OTHER INFORMATION: Synthetic sequence

<400> SEQUENCE: 55

```
Lys Thr Gln Ala Thr Ser Arg Gly Thr Arg Gly Met Arg Thr Ser Gly
1               5                   10                  15

Gly Phe Pro Val Gly Ser Ser Gly Ser Ser Gly Ser Ser Gly Pro Ser
            20                  25                  30

Ser Gly Ser Ser Gly Lys Thr Gln Ala Thr Ser Arg Gly Thr Arg Gly
        35                  40                  45

Met Arg Thr Ser Gly Gly Phe Pro Val Gly
    50                  55
```

<210> SEQ ID NO 56
<211> LENGTH: 58
<212> TYPE: PRT
<213> ORGANISM: Artificial Sequence
<220> FEATURE:
<223> OTHER INFORMATION: Synthetic sequence

<400> SEQUENCE: 56

```
Lys Thr Gln Ala Thr Ser Val Pro Arg Lys Ala Ala Arg Arg Trp Glu
1               5                   10                  15

Gln Val Asp Ser Val Ser Ser Gly Ser Ser Gly Ser Ser Gly Pro Ser
            20                  25                  30

Ser Gly Ser Ser Gly Lys Thr Gln Ala Thr Ser Val Pro Arg Lys Ala
        35                  40                  45

Ala Arg Arg Trp Glu Gln Val Asp Ser Val
    50                  55
```

<210> SEQ ID NO 57
<211> LENGTH: 58
<212> TYPE: PRT
<213> ORGANISM: Artificial Sequence
<220> FEATURE:
<223> OTHER INFORMATION: Synthetic sequence

<400> SEQUENCE: 57

```
Lys Thr Gln Ala Thr Ser Glu Ser Gly Ser Ala Gly Arg Gln Met Phe
1               5                   10                  15

Val Ala Asp Met Gly Ser Ser Gly Ser Ser Gly Ser Ser Gly Pro Ser
            20                  25                  30

Ser Gly Ser Ser Gly Lys Thr Gln Ala Thr Ser Glu Ser Gly Ser Ala
        35                  40                  45

Gly Arg Gln Met Phe Val Ala Asp Met Gly
    50                  55
```

<210> SEQ ID NO 58
<211> LENGTH: 58
<212> TYPE: PRT
<213> ORGANISM: Artificial Sequence
<220> FEATURE:
<223> OTHER INFORMATION: Synthetic sequence

<400> SEQUENCE: 58

```
Pro Gln Ala Gln Asp Val Glu Leu Pro Gln Glu Leu Gln Asp Gln His
1               5                   10                  15
```

Arg Glu Val Glu Val Ser Ser Gly Ser Ser Gly Ser Ser Gly Pro Ser
20 25 30

Ser Gly Ser Ser Gly Pro Gln Ala Gln Asp Val Glu Leu Pro Gln Glu
35 40 45

Leu Gln Asp Gln His Arg Glu Val Glu Val
50 55

<210> SEQ ID NO 59
<211> LENGTH: 21
<212> TYPE: PRT
<213> ORGANISM: Artificial Sequence
<220> FEATURE:
<223> OTHER INFORMATION: Synthetic sequence

<400> SEQUENCE: 59

Ser Lys Thr Ser Arg Glu Ser Ser Ala Val Gln Met Gly Lys Ala Arg
1 5 10 15

Phe Leu Cys Thr His
20

<210> SEQ ID NO 60
<211> LENGTH: 33
<212> TYPE: PRT
<213> ORGANISM: Artificial Sequence
<220> FEATURE:
<223> OTHER INFORMATION: Synthetic sequence

<400> SEQUENCE: 60

Gly Ser Ser Gly Ser Ser Pro Gln Ala Gln Asp Val Glu Leu Pro Gln
1 5 10 15

Glu Leu Gln Asp Gln His Arg Glu Val Glu Val Gly Ser Ser Gly Ser
20 25 30

Ser

<210> SEQ ID NO 61
<211> LENGTH: 48
<212> TYPE: PRT
<213> ORGANISM: Artificial Sequence
<220> FEATURE:
<223> OTHER INFORMATION: Synthetic sequence

<400> SEQUENCE: 61

Pro Gln Ala Gln Asp Val Glu Leu Pro Gln Glu Leu Gln Asp Gln His
1 5 10 15

Arg Glu Val Glu Val Pro Gln Ala Gln Asp Val Glu Leu Pro Gln Glu
20 25 30

Leu Gln Asp Gln His Arg Glu Val Glu Val Gly Ser Ser Glu Glu Glu
35 40 45

<210> SEQ ID NO 62
<211> LENGTH: 32
<212> TYPE: PRT
<213> ORGANISM: Artificial Sequence
<220> FEATURE:
<223> OTHER INFORMATION: Synthetic sequence

<400> SEQUENCE: 62

Gln Thr Trp Pro Pro Pro Leu Trp Phe Ser Thr Ser Pro Gly Ser Ser
1 5 10 15

Pro Gly Ser Ser Gln Thr Trp Pro Pro Pro Leu Trp Phe Ser Thr Ser
20 25 30

COMPOSITE MATERIALS WITH DESIRED CHARACTERISTICS

CROSS-REFERENCE TO RELATED APPLICATIONS

This application is a continuation of U.S. application Ser. No. 16/379,945, filed Apr. 10, 2019, which is a continuation of U.S. application Ser. No. 15/525,741 filed May 10, 2017, which is a national stage filing under 35 U.S.C. 371 of PCT/DK2015/050345 filed Nov. 11, 2015, which International Application was published by the International Bureau in English on May 26, 2016, and application claims priority from Denmark Application No. PA 2014 00656, filed Nov. 11, 2014 and U.S. Provisional Application Nos. 62/077,935, filed Nov. 11, 2014 and 62/202,309, filed Aug. 7, 2015, which applications are hereby incorporated in their entirety by reference in this application.

INTRODUCTION

Technical Field

Composite materials, in particular materials where the strength of the material is of importance.

BACKGROUND

Composite materials typically consist of a polymer part and one or more kinds of additives. The polymers and additives have typically been mixed during preparation of the composite material. In the resulting composite material there are often only weak interactions between the polymer and additive components; however, the interaction can also be strong, sometimes the polymer and additive is even held together by a covalent bond. Characteristics of the composite material such as e.g. strength is often compromised as a result of this weak interaction between the different components of the composite material.

SUMMARY OF THE INVENTION

What is provided is a ligand capable of binding a structural entity. The ligand optionally changes the characteristics of the structural entity upon binding to it.

What is further provided is the preparation, structure and use of a complex between a structural entity (SE) and a ligand, where the characteristics of the structural entity when bound by the ligand is different from the characteristics of the structural entity when not bound by the ligand, or alternatively, the characteristics of said complex is different from the characteristics of the structural entity (SE) and the ligand.

The ligand-structural entity complex may comprise one or more ligands and one or more structural entities, and thus can be described by the formula $$SE_o\text{-Ligand}_p$$

where SE is a structural entity, and

Ligand is a chemical moiety capable of binding to the SE, and o and p are integers larger than zero.

What is further provided in this invention is a structure of, and a process for preparing, a Linker Unit (LU) of the following composition:

Ligand1-LinkerL-Ligand2 where

Ligand1 is a bond or chemical entity that is capable of binding covalently or non-covalently to a structural entity, LinkerL is a chemical bond or entity that links Ligand1 and Ligand2, Ligand 2 is a bond or chemical entity that is capable of binding covalently or non-covalently to a structural entity, and optionally, where a structural entity, SE1, is bound to Ligand1, and a structural entity, SE2, is bound to Ligand2, thereby forming a composite material unit (CMU) of the following composition:

SE1-Ligand1-LinkerL-Ligand2-SE2 where

SE1 is a Structural Entity,

Ligand1 is a bond or chemical entity that is covalently or non-covalently attached to SE1, LinkerL is a chemical bond or entity that links Ligand1 and Ligand2, Ligand 2 is a bond or chemical entity that is covalently or non-covalently attached to SE2, SE2 is a Structural Entity.

See FIG. 1 for the structure of a CMU.

The linker unit (LU) thus may be used to covalently or non-covalently link two structural entities. The LU as described in the present invention is capable of efficiently linking two or more structural entities. The link may either be covalent or non-covalent.

What is also provided is a LU comprising several Ligands and Linkers, of the following compositions:

((Ligand)m)-((Linker)n)

or (Ligand-Linker)n where m and n are any integers, and the Ligands and Linkers can be linked in any order and sequence.

What is also provided is a CMU comprising several SEs and LUs, of the following compositions:

((SE)l)-((Ligand)m)-((Linker)n)

or (SE-Ligand-Linker)n where l, m, and n are any integers, and where the SEs, Ligands and Linkers can be linked in any order and sequence.

The composite material unit (CMU) may be used in the preparation of composite materials with improved or novel characteristics. The CMU as described in the present invention in an appropriate manner links different parts of the composite material. Depending on the desired characteristics the link may be covalent or non-covalent; weak or strong; or may be e.g. temperature sensitive or conducting. See FIG. 1.

What is further provided is a composition, and the process of preparing a composition, comprising two or more CMUs. The two or more CMUs may be identical, essentially identical or different.

FIGURES

FIG. 1 shows schematically the structure of a CMU.

FIG. 2 shows a CMU with more than two ligands. FIG. 2A: shows a CMU with ligands linked in series. FIG. 2B: shows a CMU with ligands linked in parallel.

FIG. 7A, FIG. 7B-a, FIG. 7B-b, FIG. 7B-c, FIG. 7B-d, FIG. 7B-e, FIG. 7C-a, FIG. 7C-b, FIG. 7C-c, FIG. 7D-a, FIG. 7D-b, FIG. 7E-a, and FIG. 7E-b show how to prepare composite material units using noncovalent and covalent ligands, used in nylon composites.

FIG. 8 shows the preparation of carbon nanotube-reinforced polymers using melt processing and solution mixing.

FIG. 9A-1, FIG. 9A-2, FIG. 9A-3, FIG. 9A-4, FIG. 9A-5, FIG. 9B-1, FIG. 9B-2, FIG. 9B-3, FIG. 9B-4, and FIG. 9B-5, show synthesis and processing of fullerene/polyethylene (PE) composites.

FIG. 10A, FIG. 10A-a, FIG. 10A-b, FIG. 10B, FIG. 10B-a, FIG. 10B-b, FIG. 10C, FIG. 10C-a, FIG. 10C-b, FIG. 10D, FIG. 10E, FIG. 10F, FIG. 10G, FIG. 10H, FIG. 10I, FIG. 10J, FIG. 10K, FIG. 10L, and FIG. 10M show how to make ink based on composite materials comprising multiple CMUs.

Figure 11:
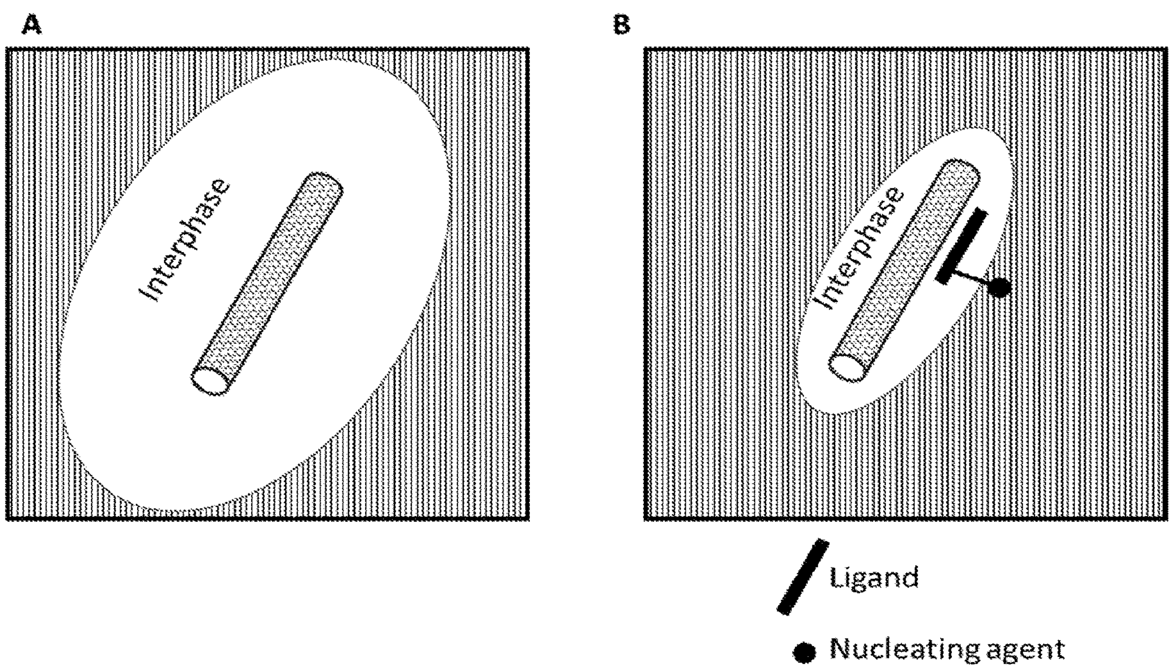
Figure 12A:
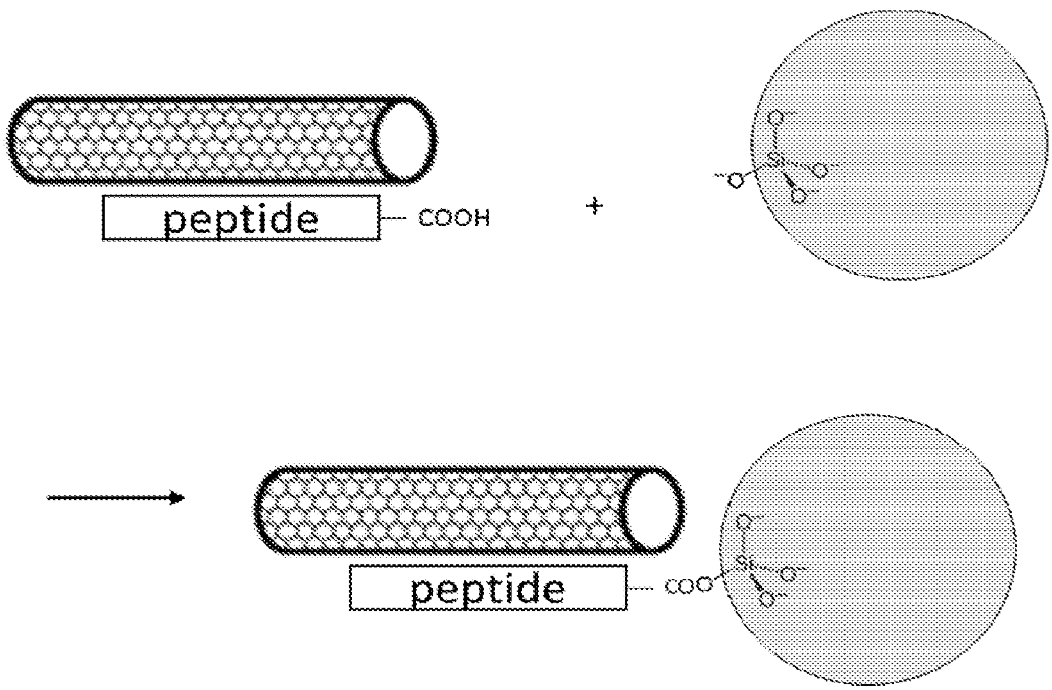
Figure 12B:
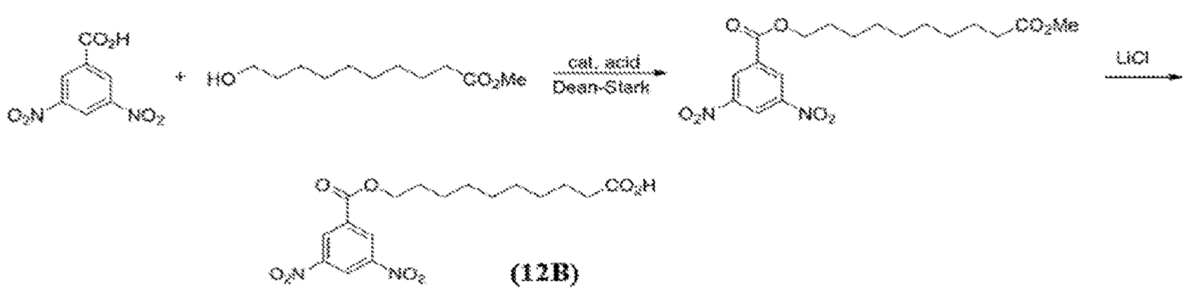
Figure 12C:
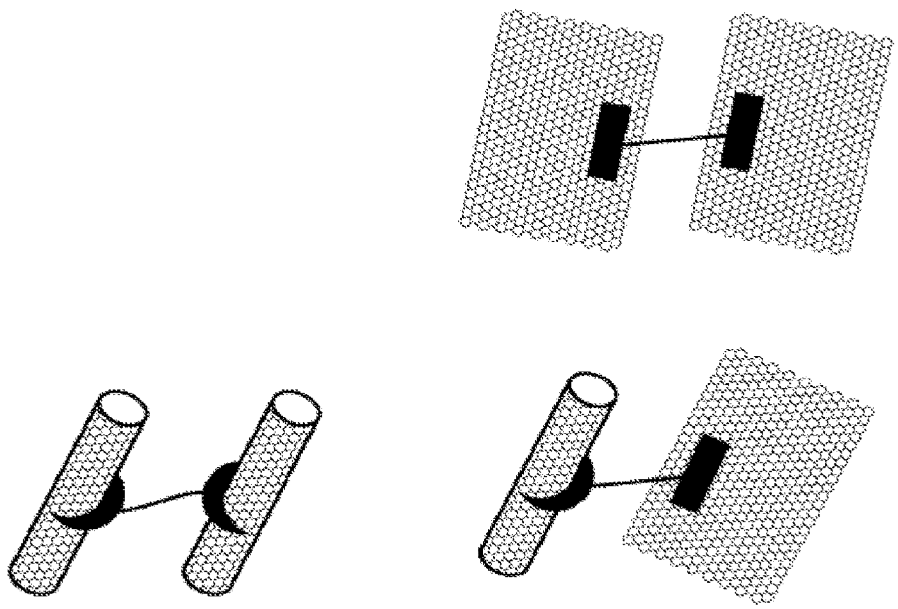
Figure 12D:
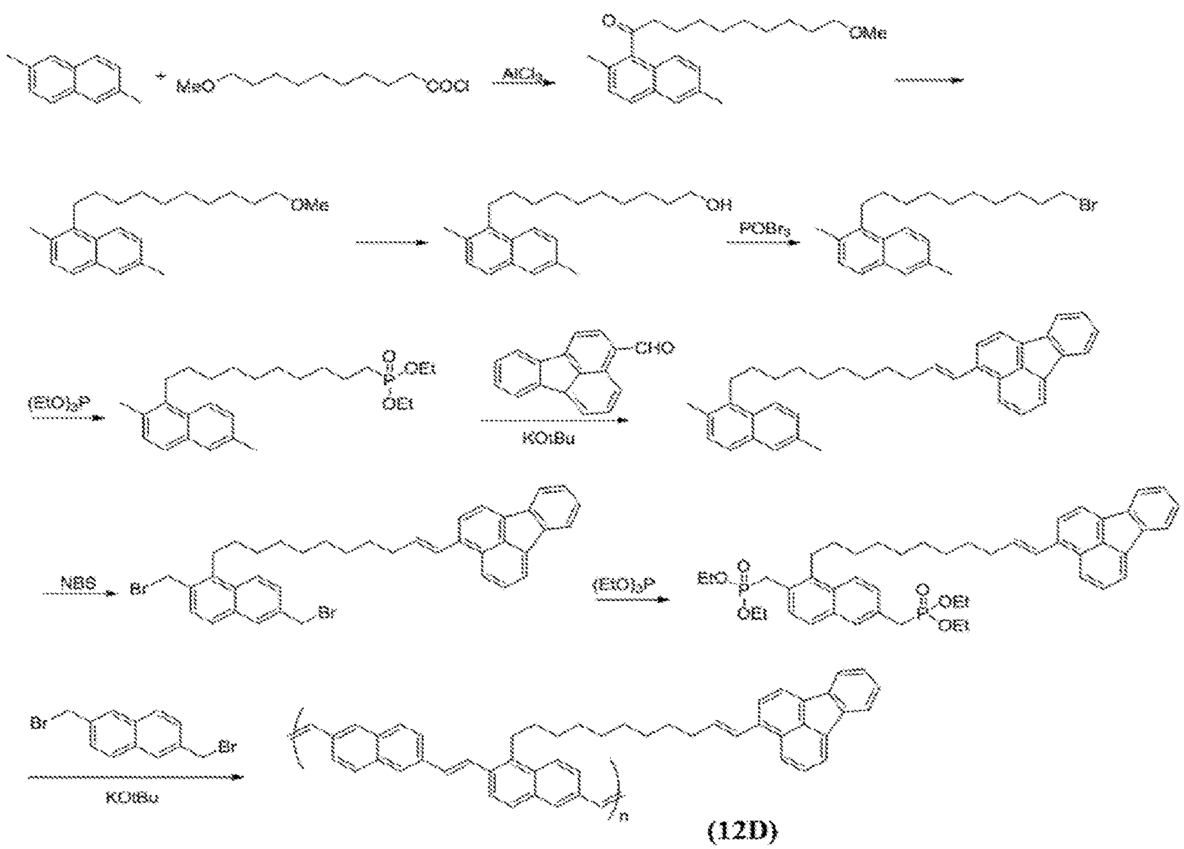
Figure 12E:
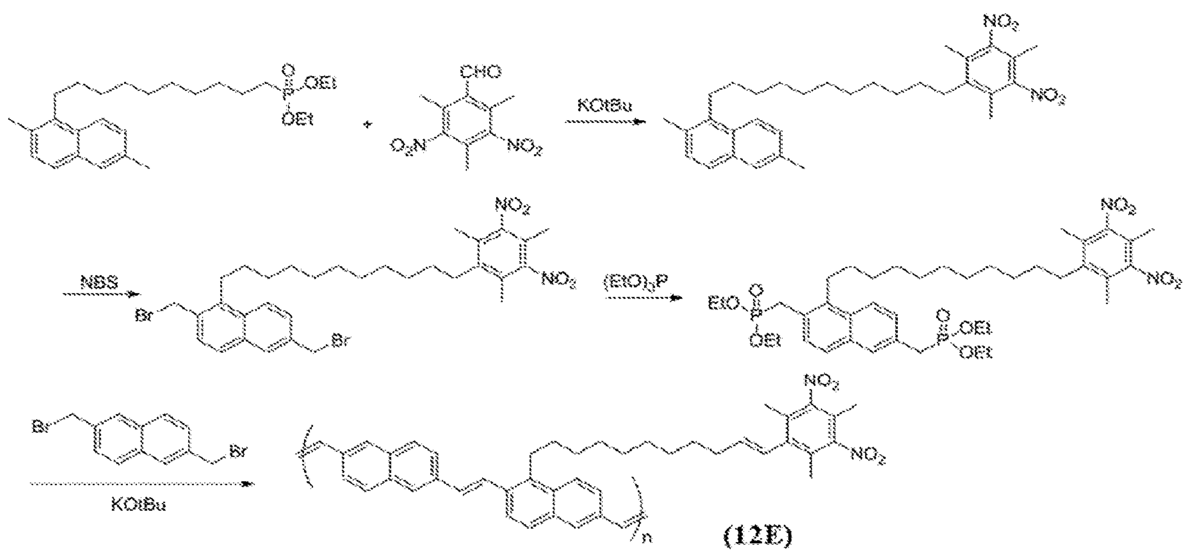
Figure 12F:
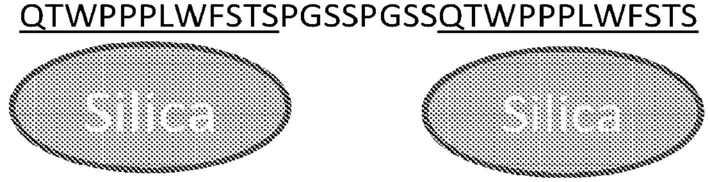

FIG. 11 shows how incorporation of nucleating agents in CMUs may help increase crystallinity of composite materials.

FIG. 12A, FIG. 12B, FIG. 12C, FIG. 12D, FIG. 12E, and FIG. 12F show different approaches for the making of reinforced concrete.

Figure 13:
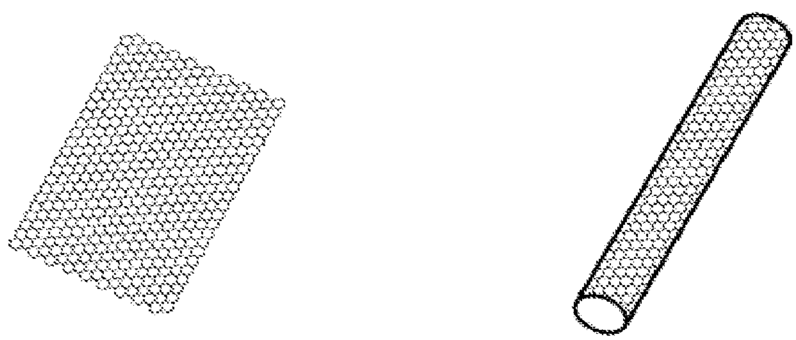

FIG. 13 shows how to make metal-, ceramics- and plastic composites.

Figure 14A:
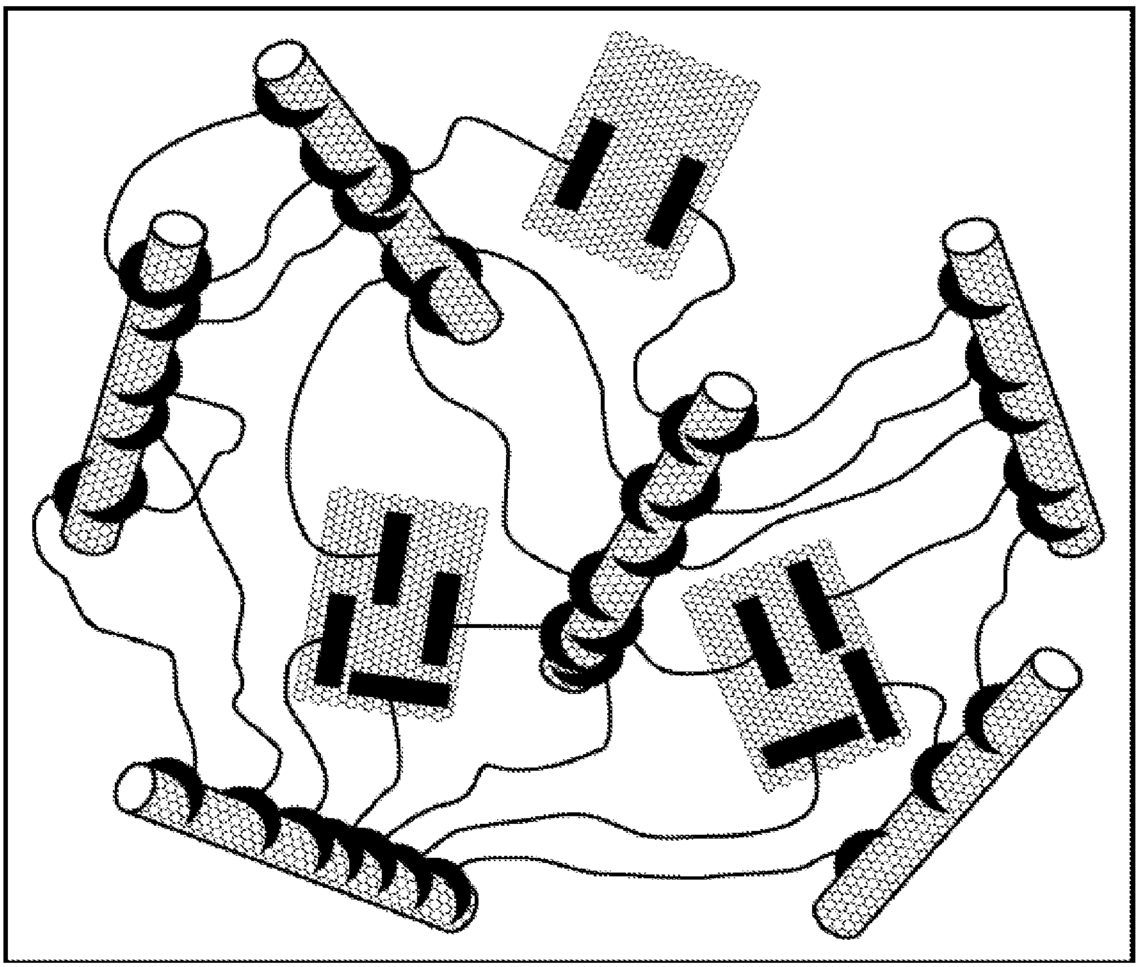
Figure 14B:
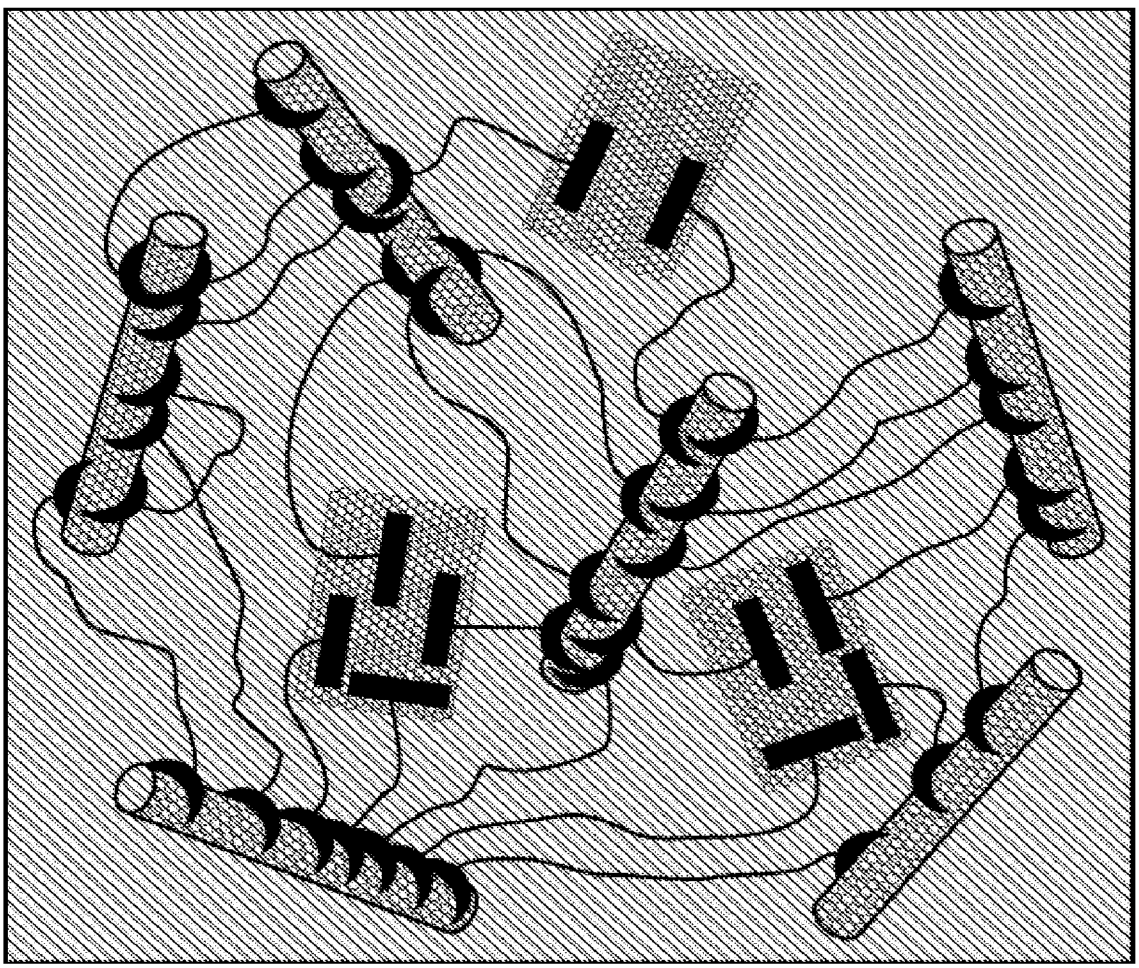

FIG. 14A and FIG. 14B describe the making of scaffolded networks in fullerene-reinforced metal-, ceramics- and plastic.

DETAILED DESCRIPTION OF THE INVENTION

General Components and Processes.

What is provided is a ligand capable of binding a structural entity. The ligand optionally changes the characteristics of the structural entity upon binding to it.

Ligands of the present invention may be used to increase the solubility or dispersion of structural entities, and is particularly useful when the structural entity has low solubility in a given solvent. Addition of the ligand, and binding of the ligand to the structural entity may then increase solubility, particularly if the face of the ligand that faces away from the structural entity to which it is bound, has chemical moieties that are soluble in the solvent used. For two ligands with similar solubility in a given solvent, it will typically be the ligand that binds the structural entity with the highest affinity that improves solubility of the structural entity the most.

Ligands of the present invention may also be used to preferentially disperse subgroups of structural entities. As an example, if a ligand with high affinity for a carbon nanotube (CNT) with a certain chirality, and low affinity for another CNT of a different chirality, is added, it will preferentially disperse the CNT that it has the highest affinity for, and thereby preferentially disperse this CNT.

Ligand-increased solubilization or dispersion thus provides a means to obtain a more even dispersion of e.g. additives in composite materials. Thus, by addition of a ligand that binds the structural entity, to the additive stock solution, to the polymerization reaction that generates the composite material, or at any other step of composite material production.

CNTs are particularly difficult to disperse in solvents typically used in the composite material production processes. Addition of CNT-binding ligands during production of e.g. CNT-reinforced polymers may often improve dispersion and/or solubilization, leading to a more even distribution of the CNT in the final composite.

What is further provided is the preparation, structure and use of a complex comprising a structural entity (SE) and a ligand, where the characteristics of the structural entity when bound by the ligand is different from the characteristics of the structural entity when not bound by the ligand, or alternatively, the characteristics of said complex is different from the characteristics of the structural entity (SE) and the ligand.

The ligand-structural entity complex may comprise one or more ligands and one or more structural entities, and thus can be described by the formula $$SE_o\text{-}Ligand_p$$

where SE is a structural entity, and

Ligand is a chemical moiety capable of binding to the SE, and o and p are integers larger than zero.

Characteristics of the structural entity that may be perturbed, modified, increased or decreased, include any one or more of the following characteristics: Size of SE, Conductivity of SE, Density of SE, Strength of SE (e.g. Young's Modulus, tensile strength, other types of strength), Melting point of SE, Elongation at break of SE. For any of these characteristics of an SE, and in each characteristic's entire range, further characteristics of the SE that may be modified upon binding of the ligand include any one or more of the following: stiffness, electrical conductivity, thermal conductivity, color, fluorescence, luminescence, UV protective capability, abrasion resistance, ductility, elasticity, flexibility, energy storage capability (energy storage as heat or kinetic energy), information storage capability, hydrophilicity, hydrophobicity, polarity, aproticity, and charge, as well as the following characteristics where the unit of measure is indicated after each characteristic: Arc Resistance, sec; Impact Strength, Charpy, J/cm; Impact Strength, Izod Notched, J/cm; Impact Strength, Izod Unnotched, J/cm; Impact Strength, Charpy Notched Low Temp, J/cm; Impact Strength, Izod Notched Low Temp, J/cm; Impact Strength, Charpy Unnotched Low Temp, J/cm; Impact Strength, Charpy Unnotched, J/cm; Linear Mold Shrinkage, cm/cm; Maximum Service Temperature, Air, Melt Flow, g/10 min; Melting Point, Modulus of Elasticity, GPa; Moisture Absorption at Equilibrium, %; Oxygen Transmission, cc-mm/m; Poisson's Ratio; Processing Temperature; Surface Resistance, ohm; Tensile Strength, Ultimate, MPa; Tensile Strength, Yield, MPa; Thermal Conductivity, W/m-K; UL RTI, Electrical; UL RTI, Mechanical with Impact; UL RTI, Mechanical without Impact; Vicat Softening Point; Water Absorption, %; Coefficient of Friction; Comparative Tracking Index, V; Compressive Yield Strength, MPa; CTE, linear 20; Deflection Temperature at 0.46 MPa; Deflection Temperature at 1.8 MPa; Density, g/cc; Dielectric Constant; Dielectric Constant, Low Frequency; Dielectric Strength, kV/mm; Dissipation Factor; Dissipation Factor, Low Frequency; Electrical Resistivity, ohm-cm; Elongation @ break, %; Flammability, UL94; Flexural Modulus, GPa; Flexural Yield Strength, MPa; Glass Temperature; Hardness, Barcol; Hardness, Rockwell E; Hardness, Rockwell M; Hardness, Rockwell R; Hardness, Shore A; Hardness, Shore D; Heat Capacity, J/g.

Depending on the application, an SE with a low, medium, or high degree of each of these characteristics is preferable in the present invention.

In a preferred embodiment, the characteristic of the SE that is modified by the binding of the ligand is the strength (e.g. tensile strength, Young's modulus, elongation at break). Particularly preferred embodiments involve SE-ligand complexes where the strength of the SE is increased upon binding of the ligand. The term "reinforced structural entity" will be used in the present invention to describe a complex of a structural entity and a ligand in which the strength of the SE is increased compared to the strength of the SE when not bound by the ligand.

In a preferred embodiment the reinforced structural entity is a component of a composite material unit (CMU; see below) which CMU may further be a component of a composite material. The reinforced structural entity, as well as the structural entity itself, in this case may be termed a filler or additive.

In another preferred embodiment the characteristic of the SE that is modified by the binding of the ligand is the conductivity. Particularly preferred embodiments involve SE-ligand complexes where the conductivity of the SE is increased upon binding of the ligand. Such ligand-structural entity complexes where the conductivity of the structural entity has been perturbed by the binding of a ligand may be useful as sensor molecules in various electronic circuits.

In a preferred embodiment, the ligand-SE complex consists of a structural entity (SE) to which is attached a number of non-covalently bound ligands. The characteristics of the SE-ligand complex changes as more ligands are bound. In some applications, a high number of ligands is desired. This may for example be the case where the SE-ligand complex is used in a nanosensor context, where the ligand is further attached to e.g. a receptor molecule that binds to the analyte in question, leading to a change in conductivity of the SE, which can be followed as a change in read-out of the sensor. The more ligands that are non-covalently bound to the SE, the more receptor molecules can be immobilized on the SE-ligand complex, and the higher the read-out will be as the analyte binds to the nanosensor.

Thus, depending on the context, the number of ligands bound per structural entity is preferably greater than 1, such as greater than 2, such as greater than 5, such as greater than 10, such as greater than 20, such as greater than 50, such as greater than 100, such as greater than 200, such as greater than 500, such as greater than 1000, such as greater than $10^4$, such as greater than $10^5$, such as greater than $10^6$, such as greater than 10', such as greater than $10^8$, such as greater than $10^9$.

In other cases, a smaller number of ligands bound to the SE is preferred. As an example, if the SE-ligand complex is part of a composition of CMUs, such as part of a composite material, the ligand may interfere with the polymerization- or processing process that generates the composite material, wherefore it may be preferable to use a smaller number of ligands bound to an SE. Thus, depending on the context, the number of non-covalently ligands bound to a structural entity is preferably less than $10^9$, such as less than $10^8$, such as less than $10^7$, such as less than $10^6$, such as less than $10^5$, such as less than $10^4$, such as less than $10^3$, such as less than $10^2$, such as less than 10, such as less than 2.

Thus, the preferred number of non-covalently bound ligands per structural entity is often a compromise and depends on the context, and may be in the range of 1 to 2, or 2 to 10, or 10 to 100, or 100 to 1000, or $10^3$ to $10^4$, or $10^4$ to $10^5$, or $10^5$ to $10^6$, or $10^6$ to $10^7$, or $10^7$ to $10^8$, or $10^8$ to $10^9$.

As described above and below, the optimal number of ligands bound to a structural entity varies depending on the context of its use and the process of its generation. Likewise, as described above and below, the optimal binding strength of the ligand for the structural entity varies depending on the context of its use and the process of its generation.

In a preferred embodiment of said preferred embodiment, the SE is a carbon nanotube or graphene molecule, bound by more than 1 ligand, more preferably by more than 10 ligands, more preferably by more than 100 ligands, more preferably by more than 1000 ligands, more preferably by more than 10 000 ligands, more preferably by more than 100 000 ligands, even more preferably by more than 1 000 000 ligands, where the individual ligands have a dissociation constant for the carbon nanotube or the graphene, respectively, of less than $10^{-2}$ M, more preferably less than $10^{-3}$M, more preferably less than $10^{-4}$ M, more preferably less than $10^{-5}$ M, more preferably less than $10^{-6}$ M, more preferably less than $10^{-7}$ M, more preferably less than $10^{-8}$ M, more preferably less than $10^{-9}$ M, more preferably less than $10^{-10}$ M, more preferably less than $10^{-12}$ M, more preferably less than $10^{-14}$ M, more preferably less than $10^{-16}$ M, more preferably less than $10^{-18}$ M, more preferably less than $10^{-20}$ M, more preferably less than $10^{-25}$ M, more preferably less than $10^{-30}$ M, more preferably less than $10^{-35}$ M, more preferably less than $10^{-40}$ M, more preferably less than $10^{-50}$ M. In a preferred embodiment of said preferred embodiment the ligand binds non-covalently to the carbon nanotube or graphene, respectively, thereby increasing the strength of the carbon nanotube or graphene, respectively. The reinforced structural entity comprising the large number of ligands attached to the SE will be significantly stronger than the SE without ligands attached, and/or the composite material of which the SE-ligand complex may be a part of, will be significantly stronger than the corresponding composite material comprising SEs without the ligands attached.

In a preferred embodiment of said preferred embodiment, the SE is a carbon nanotube or graphene molecule, bound by less than $10^9$ ligands, such as less than $10^8$ ligands, less than $10^7$ ligands, less than $10^6$ ligands, less than $10^5$ ligands, less than $10^4$ ligands, less than $10^3$ ligands, less than $10^2$ ligands, less than 10 ligands, less than 2 ligands, where the individual ligands have a dissociation constant for the carbon nanotube or the graphene, respectively, of less than $10^{-2}$ M, more preferably less than $10^{-3}$ M, more preferably less than $10^{-4}$ M, more preferably less than $10^{-5}$ M, more preferably less than $10^{-6}$ M, more preferably less than $10^{-7}$ M, more preferably less than $10^{-8}$M, more preferably less than $10^{-9}$M, more preferably less than $10^{-10}$ M, more preferably less than $10^{-12}$ M, more preferably less than $10^{-14}$ M, more preferably less than $10^{-16}$ M, more preferably less than $10^{-18}$ M, more preferably less than $10^{-20}$ M, more preferably less than $10^{-5}$ M, more preferably less than $10^{-30}$ M, more preferably less than $10^{-35}$ M, more preferably less than $10^{-40}$ M, more preferably less than $10^{-50}$ M. In a preferred embodiment of said preferred embodiment the ligand binds non-covalently to the carbon nanotube or graphene, thereby increasing the strength of the carbon nanotube or graphene, respectively. The reinforced structural entity comprising the large number of ligands attached to the SE will be significantly stronger than the SE without ligands attached, and/or the composite material of which the SE-ligand complex may be a part of, will be significantly stronger than the corresponding composite material comprising SEs without the ligands attached.

In a preferred embodiment of said preferred embodiment, the SE is a carbon nanotube or graphene molecule, bound by more than 1 ligand, more preferably by more than 10 ligands, more preferably by more than 100 ligands, more preferably by more than 1000 ligands, more preferably by more than 10 000 ligands, more preferably by more than 100 000 ligands, even more preferably by more than 1 000 000 ligands, where the individual ligands have a dissociation constant for the carbon nanotube or the graphene, respectively, of more than $10^{-}$M, more preferably more than $10^{-40}$ M, more preferably more than $10^{-35}$ M, more preferably more than $10^{-30}$ M, more preferably more than $10^{-5}$ M, more preferably more than $10^{-20}$ M, more preferably more than $10^{-18}$ M, more preferably more than $10^{-16}$ M, more preferably more than $10^{-14}$ M, more preferably more than $10^{-12}$ M, more preferably more than $10^{-10}$ M, more preferably more than $10^{-9}$ M, more preferably more than $10^{-8}$ M, more preferably more than $10^{-7}$ M, more preferably more than $10^{-6}$ M, more preferably more than $10^{-5}$ M, more preferably more than $10^{-2}$ M, more preferably more than $10^{-3}$ M, more preferably more than $10^{-2}$ M. In a preferred embodiment of said preferred embodiment the ligand binds non-covalently to the carbon nanotube or graphene, thereby increasing the strength of the carbon nanotube or graphene, respectively. The reinforced structural entity comprising the large number of ligands attached to the SE will be significantly stronger than the SE without ligands attached, and/or the composite material of which the SE-ligand complex may be a part of, will be significantly stronger than the corresponding composite material comprising SEs without the ligands attached.

In a preferred embodiment of said preferred embodiment, the SE is a carbon nanotube or graphene molecule, bound by less than $10^9$ ligands, such as less than $10^8$ ligands, less than $10^7$ ligands, less than $10^6$ ligands, less than $10^5$ ligands, less than $10^4$ ligands, less than $10^3$ ligands, less than $10^2$ ligands, less than 10 ligands, less than 2 ligands, where the individual ligands have a dissociation constant for the carbon nanotube or the graphene, respectively, of more than $10^{-50}$ M, more preferably more than $10^{-40}$ M, more preferably more than $10^{-35}$ M, more preferably more than $10^{-30}$ M, more preferably more than $10^{-5}$ M, more preferably more than $10^{-20}$ M, more preferably more than $10^{-18}$ M, more preferably more than $10^{-16}$ M, more preferably more than $10^{-14}$ M, more preferably more than $10^{-12}$ M, more preferably more than $10^{-10}$ M, more preferably more than $10^{-9}$ M, more preferably more than $10^{-8}$ M, more preferably more than $10^{-7}$ M, more preferably more than $10^{-6}$ M, more preferably more than $10^{-5}$ M, more preferably more than $10^{-4}$ M, more preferably more than $10^{-3}$ M, more preferably more than $10^{-2}$ M. In a preferred embodiment of said preferred embodiment the ligand binds non-covalently to the carbon nanotube or graphene, thereby increasing the strength of the carbon nanotube or graphene, respectively. The reinforced structural entity comprising the large number of ligands attached to the SE will be significantly stronger than the SE without ligands attached, and/or the composite material of which the SE-ligand complex may be a part of, will be significantly stronger than the corresponding composite material comprising SEs without the ligands attached.

In a preferred embodiment of said preferred embodiment, the SE is a carbon nanotube or graphene molecule, bound by 1 to 10, or 10 to $10^2$, or $10^2$ to $10^3$, or $10^3$ to $10^4$, or $10^4$ to $10^5$, or $10^5$ to $10^6$, or $10^6$ to $10^7$, or $10^7$ to $10^8$, or $10^8$ to $10^9$ ligands, where the individual ligands have a dissociation constant for the carbon nanotube or the graphene, respectively, of $10^{-50}$ to $10^{-30}$ M, or $10^{-30}$ to $10^{-20}$ M, or $10^{-20}$ to $10^{-10}$ M, or $10^{-10}$ to $10^{-9}$ M, or $10^{-9}$ to $10^{-8}$ M, or $10^{-8}$ to $10^{-7}$ M, or $10^{-7}$ to $10^{-6}$ M, or $10^{-6}$ to $10^{-5}$ M, or $10^{-5}$ to $10^{-4}$ M, or $10^{-4}$ to $10^{-3}$ M, or $10^{-3}$ to $10^{-2}$ M.

In a preferred embodiment, the reinforced SE consists of two carbon nanotubes linked through multiple disulfide bonds. The reinforced structural entity thus has the general structure CNT-$(S—S)_x$CNT, where $(S—S)_x$ represents multiple disulfide bonds, and where (S) represents a Ligand. The number of disulfide bonds is preferably greater than 2, such as greater than 10, such as greater than $10^2$, such as greater than $10^3$, such as greater than $10^4$, such as greater than $10^5$, such as greater than $10^6$, such as greater than $10^7$, such as greater than $10^8$, such as greater than $10^9$.

In another preferred embodiment, the reinforced SE consists of two graphene sheets linked through multiple disulfide bonds. The rSE thus has the general structure graphene-$(S—S)_x$-graphene, where $(S—S)_x$ represents multiple disulfide bonds, and where (S) represents a Ligand. The number of disulfide bonds is preferably greater than 2, such as greater than 10, such as greater than $10^2$, such as greater than $10^3$, such as greater than $10^4$, such as greater than $10^5$, such as greater than $10^6$, such as greater than $10^7$, such as greater than $10^8$, such as greater than $10^9$.

In another preferred embodiment, the reinforced SE consists of a carbon nanotube bound by a large number of one or more kinds of non-covalent carbon nanotube ligands, e.g. the carbon nanotube ligands listed below, or more preferably, ligands of higher affinity for the carbon nanotube.

Interactions between ligand and structural entity that may perturb the characteristics of the SE may be any kind of covalent and non-covalent interactions listed in the present invention. Particularly preferred interactions between carbon nanotube structural entities and non-covalent ligands include pi-stacking and T-stacking interactions, and cation/aromatic interactions. Any ligand-carbon nanotube interaction that stabilizes the sp2-hybridization of the carbon nanotube should increase the strength of the carbon nanotube, making it particularly useful as an additive in a composite material.

What is further provided in this invention is a structure of, and a process for preparing, a Linker Unit (LU) of the following composition:

Ligand1-LinkerL-Ligand2 where

Ligand1 is a bond or chemical entity that is capable of binding covalently or non-covalently to a structural entity, LinkerL is a chemical bond or entity that links Ligand1 and Ligand2, Ligand 2 is a bond or chemical entity that is capable of binding covalently or non-covalently to a structural entity, and optionally, where a structural entity, SE1, is bound to Ligand1, and a structural entity, SE2, is bound to Ligand2, thereby forming a composite material unit (CMU) of the following composition:

SE1-Ligand1-LinkerL-Ligand2-SE2 where

SE1 is a Structural Entity,

Ligand1 is a bond or chemical entity that is covalently or non-covalently attached to SE1, LinkerL is a chemical bond or entity that links Ligand1 and Ligand2, Ligand 2 is a bond or chemical entity that is covalently or non-covalently attached to SE2, SE2 is a Structural Entity, The LU thus may be used to covalently or non-covalently link two structural entities. The LU as described in the present invention is capable of efficiently linking two or more structural entities. The link may either be covalent or non-covalent.

A structural entity SE is a chemical or physical entity. A structural entity may be an atom (e.g. an ion), a molecule (e.g. a nylon polymer or a CNT), or part of a surface/material (e.g. metal). Furthermore, a molecular SE may either be small (largest dimension less than 10 nm), or large (largest dimension more than 10 nm). The two latter categories of SE shall be referred to as Small Molecular SE and Large Molecular SE.

The structural entity is typically used to anchor the CMU in place in the larger structure of the composite material, or alternatively, is used to modify the characteristics of the composite material, e.g. by modifying the strength or flexibility of the composite material.

The CMU may be used in the preparation of composite materials with improved or novel characteristics. The CMU as described in the present invention links different parts of the composite material in an efficient manner. The link may either be covalent or non-covalent.

What is further claimed is a composition, and the process of preparing a composition, comprising two or more CMUs. The two or more CMUs may be identical, essentially identical or different.

CMUs can be the sole constituents of composite materials, or further components may be added to form composite materials with unique characteristics.

Preferred embodiments include compositions comprising CMUs and a matrix such as a metal, a ceramic or a polymer.

The various components of the Composite Material Unit (CMU) are described below.

Guidelines for Using the Present Invention.

When using the present invention to make composite materials, the characteristics sought for the composite material must first be defined. Then an appropriate matrix material and additive can be chosen. As an example, if light-weight material with high strength is sought, one may choose a light-weight polymer material (e.g. polypropylene) as one of the structural entities (SE1), and an additive with high strength (e.g. a carbon nanotube) as the other structural entity (SE2).

Then it must be decided which ligands should be used. For good anchoring of the additive in the matrix one may choose to covalently link the polymer matrix to the ligand. Thus, reactive groups on the polymer units must be introduced, for reaction with the linker unit. Alternatively, some or all of the polymer units must be covalently linked to the linker prior to the polymerization of the polymer matrix. In the example in which a CNT is chosen as additive, in order to not interfere with the integrity of the carbon nanotube structure, and thereby drastically reduce the strength of the carbon nanotube, covalent reaction with the carbon nanotube should be avoided. Therefore, a non-covalent ligand may be chosen. The ligand should preferably bind with high affinity to the carbon nanotube in order to have an efficient load transfer from carbon nanotube to the matrix material. If a low degradability of the composite material is desired, a ligand should be chosen that carried no easily cleavable bonds such as amide bonds, and also, the ligand preferably should not comprise natural amino acids. The ligand should be attached to the linker, preferably through a covalent bond.

Once the principal components (structural entities, ligands, and linkers) of the composite material have been defined, the formation of the CMU and composite material in general can be performed, by adding the appropriate catalysts, reagents and components in appropriate amount and order.

In the above example a composite material consisting of polypropylene (matrix material) and carbon nanotube (additive, providing strength), held together by a linker comprising a covalent ligand (covalent bond between linker and polypropylene) and a non-covalent ligand (bound to carbon nanotube), will have been produced.

Further considerations may have to be taken into account when designing the process for producing the composite material:

One or both of the structural entities (SE1 and SE2) may be reactive or inert towards the polymerization reaction. An inert SE may be an advantage since it will not interfere with the polymerization reaction. In other embodiments a reactive SE may be an advantage as it may react with the reactive monomer/polymer species during polymerization, and hence, become covalently bound to the polymer matrix.

Solubility of the SEs is also an important parameter to consider. If the SE, that here functions as the additive, is soluble in both the solvent employed during the polymerization reaction and in the polymer itself, the SE will become evenly distributed in the composite material. However, sometimes a less soluble SE may be an advantage, as a decreased solubility might mediate interaction between SEs of the same kind, which may sometimes be an advantage, e.g. for efficient load transfer where efficient interaction is mediated by direct interactions between SEs of the same kind.

Structural Entity (SE).

A structural entity SE is a chemical or physical entity. A structural entity is typically used to anchor the CMU in place in the larger structure of the composite material, or alternatively, is used to modify the characteristics of the composite material, e.g. by modifying the strength or flexibility of the composite material. A structural entity may also provide alternative characteristics such as conductivity, heat absorption, energy storage, etc. Finally, an SE can be a CMU.

When an SE is added to a composite material, e.g. to increase the strength of the composite material, it is in most cases an additive that makes it more expensive to produce the composite material and therefore makes the final composite material more expensive. Thus, depending on the context, the amount of SE added is preferably less than $10^9$ kg, such as less than $10^8$ kg, such as less than $10^7$ kg, such as less than $10^6$ kg, such as less than $10^5$ kg, such as less than $10^4$ kg, such as less than $10^3$ kg, such as less than 100 kg, such as less than 10 kg, such as less than 1 kg, such as less than 0.1 kg, such as less than 0.01 kg, such as less than $10^{-3}$ kg, such as less than $10^{-4}$ kg, such as less than $10^{-5}$ kg, such as less than $10^{-6}$ kg, such as less than $10^{-7}$ kg, such as less than $10^{-8}$ kg, such as less than $10^{-9}$ kg, such as less than $10^{-10}$ kg, such as less than $10^{-11}$ kg, such as less than $10^{-12}$ kg.

In other cases, the SE added to the composite material is an additive that makes it cheaper to produce the composite material and therefore makes the final composite material less expensive. Thus, depending on the context, the amount of SE added is preferably greater than $10^{-12}$ kg, such as greater than $10^{-11}$ kg, such as greater than $10^{-10}$ kg, such as greater than $10^{-9}$ kg, such as greater than $10^{-8}$ kg, such as greater than $10^{-7}$ kg, such as greater than $10^{-6}$ kg, such as greater than $10^{-5}$ kg, such as greater than $10^{-4}$ kg, such as greater than $10^{-3}$ kg, such as greater than 0.01 kg, such as greater than 0.1 kg, such as greater than 1 kg, such as greater than 10 kg, such as greater than 100 kg, such as greater than $10^3$ kg, such as greater than $10^4$ kg, such as greater than $10^5$ kg, such as greater than $10^6$ kg, such as greater than $10^7$ kg, such as greater than $10^8$ kg, such as greater than $10^9$ kg.

Thus, the preferred compromise between addition of a large amount of SE and a low amount of SE depends on the context, and may be smaller than $10^{-12}$, but may also be in the range of $10^{-12}$-$10^{11}$ kg, $10^{11}$-$10^{10}$ kg, $10^{-10}$-$10^{-9}$ kg, $10^{-9}$-$10^{-8}$ kg, $10^{-8}$-$10^{-7}$ kg, $10^{-7}$-$10^{-6}$ kg, $10^{-6}$-$10^{-5}$ kg, $10^{-5}$-$10^{-4}$ kg, $10^{-4}$-$10^{-3}$ kg, 0.001-0.01 kg, 0.01-0.1 kg, 0.1-1 kg, 1-10 kg, 10-100 kg, 100-1,000 kg, $10^3$-$10^4$ kg, $10^4$-$10^5$ kg, $10^5$-$10^6$ kg, $10^6$-$10^7$ kg, $10^7$-$10^8$ kg, $10^8$-$10^9$ kg, or above $10^9$ kg.

When producing an SE, the MW of the SE is an important parameter. In many cases, a low MW is preferred as smaller molecule are often less expensive to produce compared to larger molecules. Thus, depending on the context, the SE MW is preferably less than $10^9$ Dal, such as less than $10^8$ Dal, such as less than $10^7$ Dal, such as less than $10^6$ Dal, such as less than $10^5$ Dal, such as less than $10^4$ Dal, such as less than $10^3$ Dal, such as less than $10^2$ Dal, such as less than 10 Dal, such as less than 3 Dal.

In other cases, a high MW is preferred as larger molecules are often less expensive to purify. Thus, depending on the context, the molecular weight is preferably greater than 3 Dal, such as greater than 10 Dal, such as greater than $10^2$ Dal, such as greater than $10^3$ Dal, such as greater than $10^4$ Dal, such as greater than $10^5$ Dal, such as greater than $10^6$ Dal, such as greater than $10^7$ Dal, such as greater than $10^8$ Dal, such as greater than $10^9$ Dal.

Therefore, depending on the context, preferred molecular weight of structural entities include molecular weights ranging from 3 Dalton to more than $10^9$ Dalton, such as from 3-10 Dal (e.g. Li+ or Na+), 10-100 Dal (e.g. benzene), 100-1000 Dal, 1000-10,000 Dal (e.g. a 20 amino acid natural polypeptide) 10,000-20,000 Dal (e.g. a polymer chain such as nylon), 20,000-30,000 Dal, 30,000-40,000 Dal, 40,000-50,000 Dal, 50,000-70,000 Dal, 70,000-100,000 Dal, 100,000-200,000 Dal, 200,000-500,000 Dal, 500,000-1,000,000 Dal (e.g. carbon nanotube), 1,000,000-2,000,000 Dal, 2,000,000-4,000,000 Dal, 4,000,000-10,000,000 Dal, 10,000,000-100,000,000 Dal, 100,000,000-1,000,000,000 Dal, or particles with molecular weight larger than $10^9$ Dal (e.g. gold particles).

Another important characteristic is the number of functional groups an SE comprises, as an SE with many functional groups will often be more expensive to synthesize. Thus, depending on the context, the number of functional groups on an SE is preferably less than $10^9$, such as less than $10^8$, such as less than $10^7$, such as less than $10^6$, such as less than $10^5$, such as less than $10^4$, such as less than $10^3$, such as less than 100, such as less than 90, such as less than 80, such as less than 70, such as less than 60, such as less than 50, such as less than 40, such as less than 30, such as less than 25, such as less than 20, such as less than 15, such as less than 10, such as less than 9, such as less than 8, such as less than 7, such as less than 6, such as less than 5, such as less than 4, such as less than 3, such as less than 2.

In other cases a high number of functional groups is desired, as the functional groups can be used to link an SE to a ligand or another SE either covalently or non-covalently, or to increase the dispersibility of the SE. Thus, depending on the context, the number of functional groups on an SE is preferably greater than 1, such as greater than 2, such as greater than 3, such as greater than 4, such as greater than 5, such as greater than 6, such as greater than 7, such as greater than 8, such as greater than 9, such as greater than 10, such as greater than 15, such as greater than 20, such as greater than 25, such as greater than 30, such as greater than 40, such as greater than 50, such as greater than 60, such as greater than 70, such as greater than 90, such as greater than 100, such as greater than $10^3$, such as greater than $10^4$, such as greater than $10^5$, such as greater than $10^6$, such as greater than $10^7$, such as greater than $10^8$, such as greater than $10^9$.

Thus, the preferred compromise between having an SE with many functional groups and an SE with few functional groups depends on the context, and may be in the range of 1-2, 2-3, 3-4, 4-5, 5-6, 6-7, 7-8, 8-9, 9-10, 10-15, 15-20, 20-25, 25-30, 30-40, 40-50, 50-60, 60-70, 70-80, 80-90, 90-100, 100-1,000, $10^3$-$10^4$, $10^4$-$10^5$, $10^5$-$10^6$, $10^6$-$10^7$, $10^7$-$10^8$, $10^8$-$10^9$, or above $10^9$.

Particularly preferred structural entities include carbon nanotubes, fullerenes, other carbon-based molecular structures, or any other kind of molecular-, supramolecular-, or macroscopic structures.

The SEs suitable for the present invention may have a number of characteristics.

SEs may be organic or inorganic.

For any characteristics of an SE mentioned above, and in each characteristic's entire range, a further characteristic of importance is the molecular weight of the SE.

Molecular weight of SEs. The molecular weight is an important determinant for the characteristics of SEs, and for the characteristics of the CMUs they are part of. For example, larger polymers typically form stronger, less flexible materials, whereas smaller polymers typically are more flexible, but have lesser strength. Therefore, depending on the context, preferred molecular weight of structural entities include molecular weights ranging from 3 Dalton to more than $10^9$ Dalton, such as from 3-10 Dal (e.g. Li+ or Na+), 10-100 Dal (e.g. benzene), 100-1000 Dal, 1000-10,000 Dal (e.g. a 20 amino acid natural polypeptide) 10,000-20,000 Dal (e.g. a polymer chain such as nylon), 20,000-30,000 Dal, 30,000-40,000 Dal, 40,000-50,000 Dal, 50,000-70,000 Dal, 70,000-100,000 Dal, 100,000-200,000 Dal, 200,000-500,000 Dal, 500,000-1,000,000 Dal (e.g. carbon nanotube), 1,000,000-2,000,000 Dal, 2,000,000-4,000,000 Dal, 4,000,000-10,000,000 Dal, 10,000,000-100,000,000 Dal, 100,000,000-1,000,000,000 Dal, or particles with molecular weight larger than $10^9$ Dal (e.g. gold particles).

In cases where the strength is of highest importance, typically a high molecular weight is preferred. Thus, depending on the context, the molecular weight is preferably greater than 3 Dal, such as greater than 10 Dal, such as greater than $10^2$ Dal, such as greater than $10^3$ Dal, such as greater than $10^4$ Dal, such as greater than $10^5$ Dal, such as greater than $10^6$ Dal, such as greater than $10^7$ Dal, such as greater than $10^8$ Dal, such as greater than $10^9$ Dal.

In cases where the flexibility is of highest importance, a low molecular weight is typically preferred. Thus, depending on the context, the molecular weight is preferably less than $10^9$ Dal, such as less than $10^8$ Dal, such as less than $10^7$ Dal, such as less than $10^6$ Dal, such as less than $10^5$ Dal, such as less than $10^4$ Dal, such as less than $10^3$ Dal, such as less than $10^2$ Dal, such as less than 10 Dal, such as less than 3 Dal.

For any characteristics of an SE mentioned above, and in each characteristic's entire range, a further characteristic of importance is the melting point of the SE.

Melting point of SE. The melting point of the SE is often an important parameter, since the melting point of the composite often is strongly dependent on the melting point of the SE. Some applications including CMUs of the present invention involve elevated temperatures, wherefore it is important that the CMU maintains its integrity and structure. This is for example the case when said CMU is part of a composite material, used in an application that involves high temperatures. In these cases a high melting point is preferred.

Thus, depending on the context, the melting point of the SE is preferably greater than −20° C., such as greater than 0° C., such as greater than 50° C., such as greater than 100° C., such as greater than 200° C., such as greater than 400° C., such as greater than 600° C., such as greater than 800° C., such as greater than 1000° C., such as greater than 1500° C., such as greater than 2000° C., such as greater than 3000° C., such as greater than 4000° C., such as greater than 6000° C., such as greater than 8000° C.

In other cases, a composite material's flexibility at low temperatures is important, wherefore a low melting point may be advantageous. Thus, depending on the context, the melting point of the SE is preferably less than 8000° C., such as less than 6000° C., such as less than 4000° C., such as less than 3000° C., such as less than 2000° C., such as less than 1500° C., such as less than 1000° C., such as less than 800° C., such as less than 600° C., such as less than 400° C., such as less than 200° C., such as less than 100° C., such as less than 50° C., such as less than 0° C., such as less than −20° C.

Depending on the context, preferred melting points of SEs thus are below 0° C., such as between −20° C. and 0° C.; or may be higher, such as between 0° C. and 50° C., or between 50° C. and 100° C., or between 100° C. and 200° C., or between 200° C. and 300° C., or between 300° C. and 400° C., or between 400° C. and 500° C., or between 500° C. and 600° C., or between 600° C. and 700° C., or between 700° C. and 800° C., or between 800° C. and 900° C., or between 900° C. and 1,000° C., or between 1,000° C. and 1,100° C., or between 1,000° C. and 1,200° C., or between 1,200° C. and 1,400° C., or between 1,400° C. and 1,600° C., or between 1,600° C. and 1,800° C., or between 1,800° C. and 2,000° C., or between 2,000° C. and 2,200° C., or between 2,200° C. and 2,400° C., or between 2,400° C. and 2,600° C., or between 2,600° C. and 2,800° C., or between 2,800° C. and 3,000° C., or between 3,000° C. and 3,200° C., or between 3,200° C. and 3,400° C., or between 3,400° C. and 3,600° C., or between 3,600° C. and 3,800° C., or between 3,800° C. and 4,000° C., or between 4,000° C. and 4,200° C., or between 4,200° C. and 4,400° C., or between 4,400° C. and 4,600° C., or between 4,600° C. and 4,800° C., or between 4,800° C. and 5,000° C., or between 5,000° C. and 5,200° C., or between 5,200° C. and 5,400° C., or between 5,400° C. and 5,600° C., or between 5,600° C. and 5,800° C., or between 5,800° C. and 6,000° C., or between 6,000° C. and 6,200° C., or between 6,200° C. and 6,400° C., or between 6,400° C. and 6,600° C., or between 6,600° C. and 6,800° C., or between 6,800° C. and 7,000° C., or between 7,000° C. and 7,200° C., or between 7,200° C. and 7,400° C., or between 7,400° C. and 7,600° C., or between 7,600° C. and 7,800° C., or between 7,800° C. and 8,000° C., or between 8,000° C. and 8,200° C., or between 8,400° C. and 8,600° C., or between 8,600° C. and 8,800° C., or between 8,800° C. and 9,000° C., or between 9,000° C. and 9,200° C., or between 9,200° C. and 9,400° C., or between 9,400° C. and 9,600° C., or between 9,600° C. and 9,800° C., or between 9,800° C. and 10,000° C., or between 10,000° C. and 11,000° C., or between 11,000° C. and 12,000° C., or between 12,000° C. and 13,000° C., or between 13,000° C. and 14,000° C., or between 14,000° C. and 15,000° C., or between 15,000° C. and 16,000° C., or between 16,000° C. and 17,000° C., or between 17,000° C. and 18,000° C., or between 18,000° C. and 19,000° C., or between 19,000° C. and 20,000° C., or above 20,000° C. The matrix of a composite to a high degree determines the melting point of the composite; in particular, ceramics and metals have high melting points.

For any characteristics of an SE mentioned above, and in each characteristic's entire range, a further characteristic of importance is the conductivity of the SE.

Conductivity of SE. In certain applications, e.g. use of a composite material in wind turbine blades, it may be important that the propellers are non-conductive, in order to not attract lightning. In other cases it may be desirable to prepare composite materials of modest or high conductivity, in order to be able to detect cracks in the material by analytical measurement of the conductance of the material. Likewise, for SEs used in e.g. nanosensor technology it may be important that the SE is conductive, in order to be able to detect changes in conductivity induced by the association of an analyte with the SE. In some sensor applications it may be desirable to have high conductivity (if the analyte has a strong reducing effect on the conductance of the SE), or it may be desirable to use an SE with an intermediate conductivity in order to detect small changes in conductivity. Thus, depending on the application it may be desirable that the SE has low, intermediate or high conductivity. Structural entities may have conductivities ranging from below $10^{-30}$ S/m to at least $10^{11}$ S/m and higher, such as from below $10^{-30}$ S/m to $10^{-25}$ S/m (e.g. Teflon), such as from $10^{-25}$ S/m to $10^{-20}$ S/m (e.g. PET), such as from $10^{-20}$ S/m to $10^{-15}$ S/m (e.g. Quarts (fused) and Paraffin), such as from $10^{-15}$ S/m to $10^{-10}$ S/m (e.g. Hard Rubber, Diamond, Glass), such as from $10^{-10}$ S/m to $10^{-5}$ S/m (e.g. GaAs, Silicon), such as from $10^{-5}$ S/m to 1 S/m, such as from 1 S/m to 10 S/m (e.g. Germanium), such as from 10 S/m to $10^{2}$ S/m, such as from $10^{2}$ S/m to $10^{4}$ S/m (e.g. graphite), such as from $10^{4}$ S/m to $10^{6}$ S/m (e.g. Nichrome, Mercury), such as from $10^{6}$ S/m to $10^{8}$ S/m (e.g. Stainless steel, Titanium, Platinum, Iron, Lithium, Aluminum, Gold, Coper, Silver), such as from $10^{8}$ S/m to $10^{9}$ S/m, such as from $10^{9}$ S/m to $10^{10}$ S/m, such as from $10^{10}$ S/m to $10^{11}$ S/m (e.g. Carbon nanotubes), such as from $10^{11}$ S/m to $10^{12}$ S/m (e.g. Carbon nanotubes), such as from $10^{12}$ S/m to $10^{14}$ S/m, and above $10^{14}$ S/m (e.g. superconducting material).

Thus, depending on the context, the conductivity of an SE is preferably greater than $10^{-30}$ S/m, such as greater than $10^{-25}$ S/m, such as greater than $10^{-20}$ S/m, such as greater than $10^{-15}$ S/m, such as greater than $10^{-10}$ S/m, such as greater than $10^{-5}$ S/m, such as greater than 1 S/m, such as greater than 10 S/m, such as greater than $10^{2}$ S/m, such as greater than $10^{4}$ S/m, such as greater than $10^{6}$ S/m, such as greater than $10^{8}$ S/m, such as greater than $10^{9}$ S/m, such as greater than $10^{10}$ S/m, such as greater than $10^{11}$ S/m, such as greater than $10^{12}$ S/m, such as greater than $10^{13}$ S/m, such as greater than $10^{14}$ S/m.

In other applications, and depending on the context, the conductivity is preferably less than $10^{14}$ S/m, such as less than $10^{13}$ S/m, such as less than $10^{12}$ S/m, such as less than $10^{11}$ S/m, such as less than $10^{10}$ S/m, such as less than $10^{9}$ S/m, such as less than $10^{8}$ S/m, such as less than $10^{6}$ S/m, such as less than $10^{4}$ S/m, such as less than $10^{2}$ S/m, such as less than 10 S/m, such as less than 1 S/m, such as less than $10^{-5}$ S/m, such as less than $10^{-10}$ S/m, such as less than $10^{-15}$ S/m, such as less than $10^{-20}$ S/m, such as less than $10^{-25}$ S/m, such as less than $10^{-30}$ S/m.

For any characteristics of an SE mentioned above, and in each characteristic's entire range, a further characteristic of importance is the density and strength of the SE, as well as the ratio between the density and the various types of strength.

Density and Strength of the SE. For certain applications, for example in the airplane or automotive industry, the strength and density of the composite material is of prime importance. Sometimes, one of the two features is by far the most important. For example, if a structure such as a bridge must be built and the structure must carry a lot of weight, where this weight is much larger than the weight of the structure itself, the weight of the composite material from which the structure is built, has little importance. Only strength is important. In cases where no significant force is applied to the material other than gravity, the weight of the structure becomes important, but the strength is not important. This is for example the case where the composite material is used to make a sculpture that rests on some other structure. Often, both low density and high strength is desired. However, as these two parameters often are opposing factors, a compromise will have to be made. Therefore, sometimes a high density is acceptable to gain strength, such as high tensile strength or large Young's Modulus. In other cases, low density is necessary, even if lower strength results. Thus, in preferred embodiments the SE may have relatively low Young's modulus or low tensile strength, and in other preferred embodiments the SE has large Young's modulus or large tensile strength; and likewise, in preferred embodiments the density can vary from very small to very large.

Preferred specific densities of SEs suitable for the present invention are lower than 0.01 kg/L, but may also include specific densities in the following ranges: 0.01-0.1 kg/L; 0.1-0.4 kg/L; 0.4-0.6 kg/L; 0.6-0.8 kg/L; 0.8-1 kg/L; 1-1.2 kg/L; 1.2-1.4 kg/L; 1.4-1.6 kg/L; 1.6-1.8 kg/L; 1.8-2 kg/L; 2-2.5 kg/L; 2.5-3 kg/L; 3-3.5 kg/L; 3.5-4 kg/L; 4-4.5 kg/L; 4.5-5 kg/L; 5-5.5 kg/L; 5.5-6 kg/L; 6-6.5 kg/L; 6.5-7 kg/L; 7-7.5 kg/L; 7.5-8 kg/L; 8-8.5 kg/L; 8.5-9 kg/L; 9-9.5 kg/L; 9.5-10 kg/L; 10-11 kg/L; 11-12 kg/L; 12-13 kg/L; 13-14 kg/L; 14-16 kg/L; 16-20 kg/L; 20-30 kg/L; or above 30 kg/L.

In some cases high specific densities are preferred. This may be the case when an anchor is made of a composite material comprising SEs, as the anchor should rest heavily on the bottom. Thus, depending on the context, the specific density is preferably greater than 0.01 kg/L, such as greater than 0.05 kg/L, such as greater than 0.2 kg/L, such as greater than 0.4 kg/L, such as greater than 0.6 kg/L, such as greater than 0.8 kg/L, such as greater than 1 kg/L, such as greater than 1.2 kg/L, such as greater than 1.5 kg/L, such as greater than 2 kg/L, such as greater than 4 kg/L, such as greater than 6 kg/L, such as greater than 8 kg/L, such as greater than 10 kg/L, such as greater than 12 kg/L, such as greater than 14 kg/L, such as greater than 16 kg/L, such as greater than 20 kg/L, such as greater than 30 kg/L.

In many cases low specific density is preferred. This is for example the case if the SE is part of a composite material, used to make ships that must float on the water, wherefore the weight must be minimized. Thus, depending on the context, the specific density is preferably less than 30 kg/L, such as less than 20 kg/L, such as less than 16 kg/L, such as less than 14 kg/L, such as less than 12 kg/L, such as less than 10 kg/L, such as less than 8 kg/L, such as less than 6 kg/L, such as less than 4 kg/L, such as less than 2 kg/L, such as less than 1.5 kg/L, such as less than 1.2 kg/L, such as less than 1 kg/L, such as less than 0.8 kg/L, such as less than 0.6 kg/L, such as less than 0.4 kg/L, such as less than 0.2 kg/L, such as less than 0.05 kg/L, such as less than 0.01 kg/L.

The Young's modulus of SEs. In the majority of applications of composite materials, a high Young's modulus is preferred, as this will allow the material to recover its original shape after force has been applied to the material. Thus, depending on the context, the Young's modulus is preferably greater than 0.001 TPa, such as greater than 0.01 TPa, such as greater than 0.1 TPa, such as greater than 0.15 TPa, such as greater than 0.2 TPa, such as greater than 0.5 TPa, such as greater than 1 TPa, such as greater than 2 TPa, such as greater than 4 TPa, such as greater than 6 TPa, such as greater than 8 TPa, such as greater than 10 TPa.

However, in a few applications, a low Young's modulus is desirable. This is for example the case when the degree of deformation of a composite material is being used as a measure of how much force was applied to the material. Thus, depending on the context, the Young's modulus is preferably less than 10 TPa, such as less than 8 TPa, such as less than 6 TPa, such as less than 4 TPa, such as less than 2 TPa, such as less than 1 TPa, such as less than 0.5 TPa, such as less than 0.2 TPa, such as less than 0.15 TPa, such as less than 0.1 TPa, such as less than 0.01 TPa, such as less than 0.01 TPa.

The Young's modulus of SEs suitable for the present invention can thus be lower than 0.001 TPa, but may also include SEs with Young's Modulus in the following ranges: 0.001-0 0.01 TPa; 0.01-0.03 TPa; 0.03-0.05 TPa; 0.05-0.07 TPa; 0.07-0.09 TPa; 0.09-0.1 TPa; 0.1-0.11 TPa; 0.11-0.12 TPa; 0.12-0.13 TPa; 0.13-0.14 TPa; 0.14-0.15 TPa; 0.15-0.16 TPa; 0.16-0.17 TPa; 0.17-0.18 TPa; 0.18-0.19 TPa; 0.19-0.20 TPa; 0.20-0.22 TPa (e.g. stainless steel); 0.22-0.25 TPa; 0.25-0.30 TPa; 0.30-0.35 TPa; 0.35-0.40 TPa; 0.40-0.45 TPa; 0.45-0.50 TPa; 0.50-0.60 TPa; 0.60-0.80 TPa; 0.80-1.0 TPa; 1-2 TPa (e.g. single-walled carbon nanotubes); 2-3 TPa; 3-4 TPa; 4-5 TPa; 5-7 TPa; 7-10 TPa; or above 10 TPA.

Preferred tensile strength of SEs is in most cases high, as this will enable the generation of composite materials of high tensile strength, suitable for a large number of applications, e.g. stronger fishing lines and stronger cables. Thus, depending on the context, the tensile strength of SEs is preferably greater than 0.01 GPa, such as greater than 0.05 GPa, such as greater than 0.1 GPa, such as greater than 0.5 GPa, such as greater than 1 GPa, such as greater than 2 GPa, such as greater than 3 GPa, such as greater than 5 GPa, such as greater than 10 GPa, such as greater than 20 GPa, such as greater than 30 GPa, such as greater than 40 GPa, such as greater than 60 GPa, such as greater than 80 GPa, such as greater than 100 GPa, such as greater than 200 GPa.

However, in some cases a low tensile strength is advantageous, for example in cables or lines that must break for safety reasons, in order to avoid damage to individuals. Thus, depending on the context, the tensile strength of SEs is preferably less than 200 GPa, such as less than 100 GPa, such as less than 80 GPa, such as less than 60 GPa, such as less than 40 GPa, such as less than 30 GPa, such as less than 20 GPa, such as less than 10 GPa, such as less than 5 GPa, such as less than 3 GPa, such as less than 2 GPa, such as less than 1 GPa, such as less than 0.5 GPa, such as less than 0.1 GPa, such as less than 0.05 GPa, such as less than 0.01 GPa.

The tensile strength for SEs suitable for the present invention can thus be lower than 0.01 GPa, but may also include SEs with tensile strengths in the following ranges: 0.01-0.03 GPa; 0.03-0.05 GPa; 0.05-0.07 GPa; 0.07-0.09

GPa; 0.09-0.1 GPa; 0.1-0.11 GPa; 0.11-0.12 GPa; 0.12-0.13 GPa; 0.13-0.14 GPa; 0.14-0.15 GPa; 0.15-0.16 GPa; 0.16-0.17 GPa; 0.17-0.18 GPa; 0.18-0.19 GPa; 0.19-0.20 GPa; 0.20-0.22 GPa; 0.22-0.25 GPa; 0.25-0.30 GPa; 0.30-0.35 GPa; 0.35-0.40 GPa; 0.40-0.45 GPa; 0.45-0.50 GPa; 0.50-0.60 GPa; 0.60-0.80 GPa; 0.80-1.0 GPa; 1-2 GPa (e.g. stainless steel); 2-3 GPa; 3-4 GPa; 4-5 GPa; 5-7 GPa; 7-10 GPa; 10-15 GPa; 15-20 GPa; 20-25 GPa; 25-30 GPa; 30-35 GPa; 35-40 GPa; 40-45 GPa; 45-50 GPa (e.g. single-walled carbon nanotubes); 50-55 GPa; 55-60 GPa; 60-65 GPa; 65-70 GPa; 70-75 GPa; 75-80 GPa; 80-85 GPa; 85-90 GPa; 90-100 GPa; 100-200 GPa, or above 200 GPa.

Ratio of strength to specific density is often important. The strength/specific density ratio for the structural entity that is preferred under the present invention is represented by all the ratios that can be obtained, by dividing the abovementioned strengths with the abovementioned specific densities. Thus, preferred embodiments have structural entities with strength/specific densities in the range 0.00003-1000 TPa L/Kg (where strength is represented by Young's modulus). More specifically, the strength/specific density (Young's Modulus) of the SE is preferably in the range 0.00003-1,000 TPa L/Kg, more preferably 0.001-1,000 TPA L/Kg, more preferably 0.01-1,000 TPA L/Kg, more preferably 0.1-1,000 TPA L/Kg, more preferably 1-1,000 TPA L/Kg, more preferably 10-1,000 TPA L/Kg, more preferably 100-1,000 TPA L/Kg, and more preferably 500-1,000 TPA L/Kg, or higher. In cases where e.g. the Young's modulus should be low (see above), the Young's modulus/specific density ratio is preferably less than 1,000 TPA L/kg, such as less than 500 TPA L/kg, such as less than 100 TPa L/kg, such as less than 10 TPa L/kg, such as less than 1 TPa L/kg, such as less than 0.1 TPa L/kg, such as less than 0.01 TPa L/kg, such as less than 0.001 TPa L/kg, such as less than 0.00003 TPa L/kg.

In cases where e.g. Young's modulus is preferably high, the Young's modulus/specific density ratio is preferably greater than 0.00003 TPa L/kg, such as greater than 0.001 TPa L/kg, such as greater than 0.01 TPa L/kg, such as greater than 0.1 TPa L/kg, such as greater than 1 TPa L/kg, such as greater than 10 TPa L/kg, such as greater than 100 TPa L/kg, such as greater than 500 TPa L/kg, such as greater than 1,000 TPA L/kg.

Where strength is measured as tensile strength, the preferred embodiments have structural entities with strength/specific density in the range 0.0003-20,000 GPa L/Kg. More specifically, the tensile strength/specific density of the SE is preferably in the range 0.0003-20,000 GPa L/Kg, more preferably 0.01-20,000 GPa L/Kg, more preferably 0.1-20,000 GPa L/Kg, more preferably 1-20,000 GPa L/Kg, more preferably 10-20,000 GPa L/Kg, more preferably 100-20,000 GPa L/Kg, more preferably 1,000-20,000 GPa L/Kg, more preferably 5,000-20,000 GPa L/Kg, and more preferably 10,000-20,000 GPa L/Kg, or higher.

In cases where e.g. the tensile strength is preferably low (see above), the tensile strength/specific density ratio is preferably less than 20,000 GPa L/kg, such as less than 10,000 GPa L/kg, such as less than 5,000 GPa L/kg, such as less than 1,000 GPa L/kg, such as less than 100 GPa L/kg, such as less than 10 GPa L/kg, such as less than 1 GPa L/kg, such as less than 0.1 GPa L/kg, such as less than 0.0003 GPa L/kg.

In cases where e.g. tensile strength is preferably high, the tensile strength/specific density ratio is preferably greater than 0.0003 GPa L/kg, such as greater than 0.1 GPa L/kg, such as greater than 1 GPa L/kg, such as greater than 10 GPa L/kg, such as greater than 100 GPa L/kg, such as greater than 1,000 GPa L/kg, such as greater than 5,000 GPa L/kg, such as greater than 10,000 GPa L/kg, such as greater than 20,000 GPA L/kg.

Preferred fracture toughness of SEs is in most cases high, as this will enable the generation of composite materials with a low risk of cracks propagating through the composite, ultimately leading to fracture. Examples of composite materials where a high fracture toughness is desirable includes, but are not limited to, wind turbine blades and airplane wings. Thus, depending on the context, the fracture toughness is preferably greater than 0.01 $MPa \cdot m^{1/2}$, such as greater than 0.1 $MPa \cdot m^{1/2}$, such as greater than 1 $MPa \cdot m^{1/2}$, such as greater than 2 $MPa \cdot m^{1/2}$, such as greater than 5 $MPa \cdot m^{1/2}$, such as greater than 10 $MPa \cdot m^{1/2}$, such as greater than 15 $MPa \cdot m^{1/2}$, such as greater than 20 $MPa \cdot m^{1/2}$, such as greater than 25 $MPa \cdot m^{1/2}$, such as greater than 30 $MPa \cdot m^{1/2}$, such as greater than 40 $MPa \cdot m^{1/2}$, such as greater than 50 $MPa \cdot m^{1/2}$, such as greater than 75 MPa such as greater than 100 $MPa \cdot m^{1/2}$, However, in some applications, a low fracture toughness is desirable. As an example, the fracture toughness of the windows in a train needs to be sufficiently low that a person can break the window using an appropriate tool in an emergency situation. Thus, depending on the context, the fracture toughness is preferably less than 100 $MPa \cdot m^{1/2}$, such as less than 75 $MPa \cdot m^{1/2}$, such as less than 50 $MPa \cdot m^{1/2}$, such as less than 40 $MPa \cdot m^{1/2}$, such as less than 30 $MPa \cdot m^{1/2}$, such as less than 25 $MPa \cdot m^{1/2}$, such as less than 20 $MPa \cdot m^{1/2}$, such as less than 15 $MPa \cdot m^{1/2}$, such as less than 10 $MPa \cdot m^{1/2}$, such as less than 5 $MPa \cdot m^{1/2}$, such as less than 2 $MPa \cdot m^{1/2}$, such as less than 1 $MPa \cdot m^{1/2}$, such as less than 0.1 $MPa \cdot m^{1/2}$, such as less than 0.01 $MPa \cdot m^{1/2}$.

The fracture toughness for SEs suitable for the present invention can thus be lower than 0.01 $MPa \cdot m^{1/2}$, but may also include SEs with fracture toughness in the following ranges: 0.01-0.1 $MPa \cdot m^{1/2}$, 0.1-1 $MPa \cdot m^{1/2}$, 1-2 $MPa \cdot m^{1/2}$, 5 $MPa \cdot m^{1/2}$, 5-10 $MPa \cdot m^{1/2}$, 10-15 $MPa \cdot m^{1/2}$, 15-20 $MPa \cdot m^{1/2}$, 20-25 $MPa \cdot m^{1/2}$, 25-30 $MPa \cdot m^{1/2}$, 30-40 $MPa \cdot m^{1/2}$, 40-50 $MPa \cdot m^{1/2}$, 50-75 $MPa \cdot m^{1/2}$, 75-100 $MPa \cdot m^{1/2}$, or above 100 $MPa \cdot m^{1/2}$.

Bulk modulus of SEs. In the majority of applications of composite materials, a high bulk modulus is preferred, as this will allow the composite material to withstand a high compression, which is important in structural elements of buildings, bridges, etc. Thus, depending on the context, the bulk modulus is preferably greater than 0.001 GPa, such as greater than 0.01 GPa, such as greater than 0.1 GPa, such as greater than 1 GPa, such as greater than 10 GPa, such as greater than 50 GPa, such as greater than 100 GPa, such as greater than 200 GPa, such as greater than 300 GPa, such as greater than 400 GPa, such as greater than 500 GPa, such as greater than 600 GPa, such as greater than 700 GPa, such as greater than 800 GPa, such as greater than 900 GPa, such as greater than 1,000 GPa. However, in a few applications, a low bulk modulus is desirable. This is for example the case in some foam products, where it should be easy to compress the foam, e.g. using a person's body weight. Thus, depending on the context, the bulk modulus is preferably less than 1,000 GPa, such as less than 900 GPa, such as less than 800 GPa, such as less than 700 GPa, such as less than 600 GPa, such as less than 500 GPa, such as less than 400 GPa, such as less than 300 GPa, such as less than 200 GPa, such as less than 100 GPa, such as less than 50 GPa, such as less than 10 GPa, such as less than 1 GPa, such as less than 0.1 GPa, such as less than 0.01 GPa, such as less than 0.001 GPa.

The bulk modulus for SEs suitable for the present invention can thus be lower than 0.001 GPa, but may also include SEs with bulk modules in the following ranges: 0.001-0.01 GPa, 0.01-0.1 GPa, 0.1-1 GPa, 1-10 GPa, 10-100 GPa, 100-200 GPa, 200-300 GPa, 300-400 GPa, 400-500 GPa, 500-600 GPa, 600-700 GPa, 700-800 GPa, 800-900 GPa, 900-1,000 GPa, or above 1,000 GPa.

Shear modulus of SEs. In the majority of applications of composite materials, a high shear modulus is preferred, as this will allow the composite material to withstand large forces imposed on the composite material in opposite directions, e.g. brakes on bicycles, cars, wind turbines, etc. Thus, depending on the context, the shear modulus is preferably greater than 0.001 GPa, such as greater than 0.01 GPa, such as greater than 0.1 GPa, such as greater than 1 GPa, such as greater than 10 GPa, such as greater than 50 GPa, such as greater than 100 GPa, such as greater than 200 GPa, such as greater than 300 GPa, such as greater than 400 GPa, such as greater than 500 GPa, such as greater than 600 GPa, such as greater than 700 GPa, such as greater than 800 GPa, such as greater than 900 GPa, such as greater than 1,000 GPa.

However, in some applications, a low shear modulus is desirable. This is for example the case in plastic composite materials used for buttons, e.g. to turn on or off electronic equipment. Such buttons must have a low shear modulus so pressing them is sufficiently easy. Thus, depending on the context, the shear modulus is preferably less than 1,000 GPa, such as less than 900 GPa, such as less than 800 GPa, such as less than 700 GPa, such as less than 600 GPa, such as less than 500 GPa, such as less than 400 GPa, such as less than 300 GPa, such as less than 200 GPa, such as less than 100 GPa, such as less than 50 GPa, such as less than 10 GPa, such as less than 1 GPa, such as less than 0.1 GPa, such as less than 0.01 GPa, such as less than 0.001 GPa.

The shear modulus for SEs suitable for the present invention can thus be lower than 0.001 GPa, but may also include SEs with shear modules in the following ranges: 0.001-0.01 GPa, 0.01-0.1 GPa, 0.1-1 GPa, 1-10 GPa, 10-100 GPa, 100-200 GPa, 200-300 GPa, 300-400 GPa, 400-500 GPa, 500-600 GPa, 600-700 GPa, 700-800 GPa, 800-900 GPa, 900-1,000 GPa, or above 1,000 GPa.

Other kinds of strength, such as torsional strength and impact strength, are also of importance. Thus, SEs with low, medium or high torsional strength, and SEs with low, medium or high impact strength are suitable for the present invention, and represent preferred embodiments.

For any characteristics of an SE mentioned above, and in each characteristic's entire range, a further characteristic of importance is the degree to which the SE can be elongated (stretched) without breaking.

Elongation at break. In many applications, a high elongation at break is preferred. This is for example important in components that absorb energy by deforming plastically such as crash barriers and car bumpers. Thus, depending on the context, the elongation at break is preferably greater than 0.1%, such as greater than 1%, such as greater than 5%, such as greater than 10%, such as greater than 20%, such as greater than 30%, such as greater than 40%, such as greater than 50%, such as greater than 60%, such as greater than 70%, such as greater than 80%, such as greater than 90%, such as greater than 100%, such as greater than 150%, such as greater than 200%, such as greater than 300%, such as greater than 400%, such as greater than 500%, such as greater than 800%, such as greater than 1,500%.

In other applications, a low elongation at break is preferred. This is important in composite materials that must not deform even under harsh conditions such as high pressure and elevated temperature; one such example is ceramic brakes on automobiles, aircrafts and trains. Thus, depending on the context, the elongation at break is preferably less than 1,500%, such as less than 800%, such as less than 500%, such as less than 400%, such as less than 300%, such as less than 200%, such as less than 150%, such as less than 100%, such as less than 90%, such as less than 80%, such as less than 70%, such as less than 60%, such as less than 50%, such as less than 40%, such as less than 30%, such as less than 20%, such as less than 10%, such as less than 5%, such as less than 1%, such as less than 0.1%.

SEs suitable for the present invention can thus have an elongation at break of less than 0.1%, or have elongation at break including the following ranges: 0.1-1%, 1-5%, 5-10%, 10-20%, 20-30%, 30-40%, 40-50%, 50-60%, 60-70%, 70-80%, 80-90%, 90-100%, 100-150%, 150-200%, 200-300%, 300-400%, 400-500%, 500-800%, 800-1,500%, or have elongation at break above 1,500%.

For any characteristics of an SE mentioned above, and in each characteristic's entire range, further characteristics of importance are size and shape of the SE.

Size of SE. The size and shape of the structural entity are important parameters. Thus, although depending on the characteristics of the structural entity, composite materials may benefit from SEs with extended shapes, preferably large in size, if the primary purpose is to increase the Young's modulus of the composite material, by including the SE. Thus, depending on the context, the size of the SE is preferably greater than 0.1 Å, such as greater than 2 Å, such as greater than 1 nm, such as greater than 10 nm, such as greater than 100 nm, such as greater than 1 μm, such as greater than 10 μm, such as greater than 100 μm, such as greater than 1 mm, such as greater than 10 mm.

For other applications, it may be an advantage to include SEs of smaller size, e.g. in order to increase molecular homogeneity of the composite material. In other cases, a primary characteristic of the composite material is even distribution of SEs and it may be generally desired that as little SE as possible should be used in the composite material, e.g. for economic reasons. In such cases, it may be desirable to include SEs of small size. Thus, depending on the context, the size of the SE is preferably less than 10 mm, such as less than 1 mm, such as less than 100 μm, such as less than 10 μm, such as less than 1 μm, such as less than 100 nm, such as less than 10 nm, such as less than 1 nm, such as less than 2 Å, such as less than 0.1 Å.

Often, the choice of size and shape will be a compromise between opposing interests. Thus, in preferred embodiments the SE may be very small to very large, depending on the application. For example, when making composite materials using thermoset polymers and glass fibers, typically long glass fibers in the size range 0.01-1 m are used, whereas when using thermoplastics shorter fibers of typically 1-10 mm are used.

Structural entities may vary in size from less than 1 Ångstrøm dimensions to the mm dimensions, such as from 0.1-2 Å (e.g. $K^+$), 2-10 Å (e.g. benzene), 1-10 nm (e.g. a short polypeptide), 10-100 nm (e.g. a carbon nanotube), 10-100 nm (e.g. a protein), 100-1,000 nm (e.g. a carbon fiber, PVC polymer molecule), 1-10 μm (e.g. a gold particle), 10-100 μm (e.g. a nylon fiber), 100-1,000 μm (e.g. an alumina fiber), 1-10 μm (e.g. a plant cell), 10-100 μm (e.g. a bamboo fiber), 100-1,000 μm (e.g. a silver particle), 1-10 mm (e.g. a carbon fiber), or particles larger than 10 mm in one dimension.

Further characteristics of SE. For any characteristics of an SE mentioned above, and in each characteristic's entire range, further characteristics of the SE that are of importance in the present invention are the stiffness, electrical conductivity, thermal conductivity, color, fluorescence, luminescence, UV protective capability, abrasion resistance, ductility, elasticity, flexibility, energy storage capability (energy storage as heat or kinetic energy), information storage capability, hydrophilicity, hydrophobicity, polarity, aproticity, and charge, as well as the following characteristics where the unit of measure is indicated after each characteristic: Arc Resistance, sec; Impact Strength, Charpy, J/cm; Impact Strength, Izod Notched, J/cm; Impact Strength, Izod Unnotched, J/cm; Impact Strength, Charpy Notched Low Temp, J/cm; Impact Strength, Izod Notched Low Temp, J/cm; Impact Strength, Charpy Unnotched Low Temp, J/cm; Impact Strength, Charpy Unnotched, J/cm; Linear Mold Shrinkage, cm/cm; Maximum Service Temperature, Air; Melt Flow, g/10 min; Melting Point; Modulus of Elasticity, GPa; Moisture Absorption at Equilibrium, %; Oxygen Transmission, cc-mm/m; Poisson's Ratio; Processing Temperature; Surface Resistance, ohm; Tensile Strength, Ultimate, MPa; Tensile Strength, Yield, MPa; Thermal Conductivity, W/m-K; UL RTI, Electrical; UL RTI, Mechanical with Impact; UL RTI, Mechanical without Impact; Vicat Softening Point; Water Absorption, %; Coefficient of Friction; Comparative Tracking Index, V; Compressive Yield Strength, MPa; CTE, linear 20; Deflection Temperature at 0.46 MPa; Deflection Temperature at 1.8 MPa; Density, g/cc; Dielectric Constant; Dielectric Constant, Low Frequency; Dielectric Strength, kV/mm; Dissipation Factor; Dissipation Factor, Low Frequency; Electrical Resistivity, ohm-cm; Elongation @ break, %; Flammability, UL94; Flexural Modulus, GPa; Flexural Yield Strength, MPa; Glass Temperature; Hardness, Barcol; Hardness, Rockwell E; Hardness, Rockwell M; Hardness, Rockwell R; Hardness, Shore A; Hardness, Shore D; Heat Capacity, J/g. Depending on the application, an SE with a low, medium, or high degree of each of these characteristics is preferable in the present invention.

Further, SEs, in particular SE2, may be polymers or may be non-polymeric in structure.

The polymers can be divided into biological polymers and non-biological polymers.

Non-biological polymers include polymers that are not RNA, DNA or natural polypeptides, yet include PVC, epoxy, unnatural polypeptides (i.e. not solely comprising alpha-amino acids) and unnatural nucleic acids (e.g. PNA, LNA and other unnatural nucleic acids).

The following polymers represent preferred structural entities, suitable for the present invention:

Polymers. The following is a non-comprehensive list of preferred structural entities, in the form of polymers often categorized as the matrix material of a composite:

1. Polymers of monoolefins and diolefins, for example polypropylene, polyisobutylene, polybut-1-ene, poly-4-methylpent-1-ene, polyvinylcyclohexane, polyisoprene or polybutadiene, as well as polymers of cycloolefins, for instance of cyclopentene or norbornene, polyethylene (which optionally can be crosslinked), for example high density polyethylene (HDPE), high density and high molecular weight polyethylene (HDPE-HMW), high density and ultrahigh molecular weight polyethylene (HDPE-UHMW), medium density polyethylene (MDPE), low density polyethylene (LDPE), linear low density polyethylene (LLDPE), (VLDPE) and (ULDPE).

Polyolefins, i.e. the polymers of monoolefins exemplified in the preceding paragraph, preferably polyethylene and polypropylene, can be prepared by different, and especially by the following, methods:

a) radical polymerisation (normally under high pressure and at elevated temperature).

b) catalytic polymerisation using a catalyst that normally contains one or more than one metal of groups IVb, Vb, VIb or VIII of the Periodic Table. These metals usually have one or more than one ligand, typically oxides, halides, alcoholates, esters, ethers, amines, alkyls, alkenyls and/or aryls that may be either π- or σ-coordinated. These metal complexes may be in the free form or fixed on substrates, typically on activated magnesium chloride, titanium(lll) chloride, alumina or silicon oxide. These catalysts may be soluble or insoluble in the polymerisation medium. The catalysts can be used by themselves in the polymerisation or further activators may be used, typically metal alkyls, metal hydrides, metal alkyl halides, metal alkyl oxides or metal alkyloxanes, said metals being elements of groups Ia, Na and/or Ilia of the Periodic Table. The activators may be modified conveniently with further ester, ether, amine or silyl ether groups. These catalyst systems are usually termed Phillips, Standard Oil Indiana, Ziegler (-Natta), TNZ (DuPont), metallocene or single site catalysts (SSC).

2. Mixtures of the polymers mentioned under 1), for example mixtures of polypropylene with polyisobutylene, polypropylene with polyethylene (for example PP/HDPE, PP/LDPE) and mixtures of different types of polyethylene (for example LDPE/HDPE).

3. Copolymers of monoolefins and diolefins with each other or with other vinyl monomers, for example ethylene/propylene copolymers, linear low density polyethylene (LLDPE) and mixtures thereof with low density polyethylene (LDPE), propylene/but-1-ene copolymers, propylene/isobutylene copolymers, ethylene/but-1-ene copolymers, ethylene/hexene copolymers, ethylene/methylpentene copolymers, ethylene/heptene copolymers, ethylene/octene copolymers, ethylene/vinylcyclohexane copolymers, ethylene/cycloolefin copolymers (e.g. ethylene/norbornene like COC), ethylene/1-olefins copolymers, where the 1-olefin is generated in-situ; propylene/butadiene copolymers, isobutylene/isoprene copolymers, ethylene/vinylcyclohexene copolymers, ethylene/alkyl acrylate copolymers, ethylene/alkyl methacrylate copolymers, ethylene/vinyl acetate copolymers or ethylene/acrylic acid copolymers and their salts (ionomers) as well as terpolymers of ethylene with propylene and a diene such as hexadiene, dicyclopentadiene or ethylidene-norbornene; and mixtures of such copolymers with one another and with polymers mentioned in 1) above, for example polypropylene/ethylene-propylene copolymers, LDPE/ethylene-vinyl acetate copolymers (EVA), LDPE/ethylene-acrylic acid copolymers (EAA), LLDPE/EVA, LLDPE/EAA and alternating or random polyalkylene/carbon monoxide copolymers and mixtures thereof with other polymers, for example polyamides.

4. Hydrocarbon resins (for example $C_5$-C8) including hydrogenated modifications thereof (e.g. tackifiers) and mixtures of polyalkylenes and starch.

Homopolymers and copolymers from 1.)-4.) may have any stereostructure including syndiotactic, isotactic, hemi-isotactic or atactic; where atactic polymers are preferred. Stereoblock polymers are also included.

5. Polystyrene, poly(p-methyl styrene), poly(α-methylstyrene).

6. Aromatic homopolymers and copolymers derived from vinyl aromatic monomers including styrene, α-methylstyrene, all isomers of vinyl toluene, especially p-vinyltoluene, all isomers of ethyl styrene, propyl styrene, vinyl biphenyl, vinyl naphthalene, and vinyl anthracene, and mixtures thereof. Homopolymers and copolymers may have any stereostructure including syndiotactic, isotactic, hemi-isotactic or atactic; where atactic polymers are preferred. Stereoblock polymers are also included.

6a. Copolymers including aforementioned vinyl aromatic monomers and comonomers selected from ethylene, propylene, dienes, nitriles, acids, maleic anhydrides, maleimides, vinyl acetate and vinyl chloride or acrylic derivatives and mixtures thereof, for example styrene/butadiene, styrene/acrylonitrile, styrene/ethylene (interpolymers), styrene/alkyl methacrylate, styrene/butadiene/alkyl acrylate, styrene/butadiene/alkyl methacrylate, styrene/maleic anhydride, styrene/acrylonitrile/methyl acrylate; mixtures of high impact strength of styrene copolymers and another polymer, for example a polyacrylate, a diene polymer or an ethylene/propylene/diene terpolymer; and block copolymers of styrene such as styrene/butadiene/styrene, styrene/isoprene/styrene, styrene/ethylene/butylene/styrene or styrene/ethylene/propylene/styrene.

6b. Hydrogenated aromatic polymers derived from hydrogenation of polymers mentioned under 6.), especially including polycyclohexylethylene (PCHE) prepared by hydrogenating atactic polystyrene, often referred to as polyvinylcyclohexane (PVCH).

6c. Hydrogenated aromatic polymers derived from hydrogenation of polymers mentioned under 6a.).

Homopolymers and copolymers may have any stereostructure including syndiotactic, isotactic, hemi-isotactic or atactic; where atactic polymers are preferred. Stereoblock polymers are also included.

7. Graft copolymers of vinyl aromatic monomers such as styrene or α-methylstyrene, for example styrene on polybutadiene, styrene on polybutadiene-styrene or polybutadiene-acrylonitrile copolymers; styrene and acrylonitrile (or methacrylonitrile) on polybutadiene; styrene, acrylonitrile and methyl methacrylate on polybutadiene; styrene and maleic anhydride on polybutadiene; styrene, acrylonitrile and maleic anhydride or maleimide on polybutadiene; styrene and maleimide on polybutadiene; styrene and alkyl acrylates or methacrylates on polybutadiene; styrene and acrylonitrile on ethylene/propylene/diene terpolymers; styrene and acrylonitrile on polyalkyl acrylates or polyalkyl methacrylates, styrene and acrylonitrile on acrylate/butadiene copolymers, as well as mixtures thereof with the copolymers listed under 6), for example the copolymer mixtures known as ABS, MBS, ASA or AES polymers.

8. Halogen-containing polymers such as polychloroprene, chlorinated rubbers, chlorinated and brominated copolymer of isobutylene-isoprene (halobutyl rubber), chlorinated or sulfo-chlorinated polyethylene, copolymers of ethylene and chlorinated ethylene, epichlorohydrin homo- and copolymers, especially polymers of halogen-containing vinyl compounds, for example polyvinyl chloride, polyvinylidene chloride, polyvinyl fluoride, polyvinylidene fluoride, as well as copolymers thereof such as vinyl chloride/vinylidene chloride, vinyl chloride/vinyl acetate or vinylidene chloride/vinyl acetate copolymers.

9. Polymers derived from α,β-unsaturated acids and derivatives thereof such as polyacrylates and polymethacrylates; polymethyl methacrylates, polyacrylamides and polyacrylonitriles, impact-modified with butyl acrylate.

10. Copolymers of the monomers mentioned under 9) with each other or with other unsaturated monomers, for example acrylonitrile/butadiene copolymers, acrylonitrile/alkyl acrylate copolymers, acrylonitrile/alkoxyalkyl acrylate or acrylonitrile/vinyl halide copolymers or acrylonitrile/alkyl methacrylate/butadiene terpolymers.

11. Polymers derived from unsaturated alcohols and amines or the acyl derivatives or acetals thereof, for example polyvinyl alcohol, polyvinyl acetate, polyvinyl stearate, polyvinyl benzoate, polyvinyl maleate, polyvinyl butyral, polyallyl phthalate or polyallyl melamine; as well as their copolymers with olefins mentioned in 1) above.

12. Homopolymers and copolymers of cyclic ethers such as polyalkylene glycols, polyethylene oxide, polypropylene oxide or copolymers thereof with bisglycidyl ethers.

13. Polyacetals such as polyoxymethylene and those polyoxymethylenes which contain ethylene oxide as a comonomer; polyacetals modified with thermoplastic polyurethanes, acrylates or MBS.

14. Polyphenylene oxides and sulfides, and mixtures of polyphenylene oxides with styrene polymers or polyamides.

15. Polyurethanes derived from hydroxyl-terminated polyethers, polyesters or polybutadienes on the one hand and aliphatic or aromatic polyisocyanates on the other, as well as precursors thereof.

16. Polyamides and copolyamides derived from diamines and dicarboxylic acids and/or from aminocarboxylic acids or the corresponding lactams, for example polyamide 4, polyamide 6, polyamide 6/6, 6/10, 6/9, 6/12, 4/6, 12/12, polyamide 1 1, polyamide 12, aromatic polyamides starting from m-xylene diamine and adipic acid; polyamides prepared from hexamethylenediamine and isophthalic or/and terephthalic acid and with or without an elastomer as modifier, for example poly-2,4,4-trimethylhexamethylene terephthalamide or poly-m-phenylene isophthalamide; and also block copolymers of the aforementioned polyamides with polyolefins, olefin copolymers, ionomers or chemically bonded or grafted elastomers; or with polyethers, e.g. with polyethylene glycol, polypropylene glycol or polytetra-methylene glycol; as well as polyamides or copolyamides modified with EPDM or ABS; and polyamides condensed during processing (RIM polyamide systems).

17. Polyureas, polyimides, polyamide-imides, polyetherimides, polyesterimides, polyhydantoins and polybenzimidazoles.

18. Polyesters derived from dicarboxylic acids and diols and/or from hydroxycarboxylic acids or the corresponding lactones or lactides, for example polyethylene terephthalate, polybutylene terephthalate, poly-1,4-dimethylolcyclohexane terephthalate, polyalkylene naphthalate and polyhydroxybenzoates as well as copolyether esters derived from hydroxyl-terminated polyethers, and also polyesters modified with polycarbonates or MBS. Copolyesters may comprise, for example—but are not limited to—polybutylenesuccinate/terephtalate, polybutyleneadipate/terephthalate, polytetramethyleneadipate/terephthalate, polybutylensuccinate/adipate, polybutylensuccinate/carbonate, poly-3-hydroxybutyrate/octanoate copolymer, poly-3-hydroxybutyrate/hexanoate/decanoate terpolymer. Furthermore, aliphatic polyesters may comprise, for example—but are not limited to—the class of poly(hydroxyalkanoates), in particular, poly(propiolactone), poly(butyrolactone), poly(pivalolactone), poly(valerolactone) and poly(caprolactone), polyethylenesuccinate, polypropylenesuccinate, polybutylenesuccinate, polyhexamethylenesuccinate, polyethyleneadipate, polypropyleneadipate, polybutyleneadi-pate, polyhexamethyleneadipate, polyethyleneoxalate, polypropyleneoxalate, polybutylene-oxalate, polyhexamethyleneoxalate, polyethylenesebacate, polypropylenesebacate and polybutylenesebacate, as well as corresponding polyesters modified with polycarbonates or MBS.

19. Polycarbonates and polyester carbonates.

20. Polyketones.

21. Polysulfones, polyether sulfones and polyether ketones.

22. Crosslinked polymers derived from aldehydes on the one hand and phenols, ureas and melamines on the other hand, such as phenol/formaldehyde resins, urea/formaldehyde resins and melamine/formaldehyde resins.

23. Drying and non-drying alkyd resins.

24. Unsaturated polyester resins derived from copolyesters of saturated and unsaturated dicarboxylic acids with polyhydric alcohols and vinyl compounds as crosslinking agents, and also halogen-containing modifications thereof of low flammability.

25. Crosslinkable acrylic resins derived from substituted acrylates, for example epoxy acrylates, urethane acrylates or polyester acrylates.

26. Alkyd resins, polyester resins and acrylate resins crosslinked with melamine resins, urea resins, isocyanates, isocyanurates, polyisocyanates or epoxy resins.

27. Crosslinked epoxy resins derived from aliphatic, cycloaliphatic, heterocyclic or aromatic glycidyl compounds, e.g. products of diglycidyl ethers of bisphenol A and bisphenol F, which are crosslinked with customary hardeners such as anhydrides or amines, with or without accelerators.

28. Natural polymers such as cellulose, rubber, gelatin and chemically modified homologous derivatives thereof, for example cellulose acetates, cellulose propionates and cellulose butyrates, or the cellulose ethers such as methyl cellulose; as well as rosins and their derivatives.

29. Blends of the aforementioned polymers (polyblends), for example PP/EPDM, Poly-amide/EPDM or ABS, PVC/EVA, PVC/ABS, PVC/MBS, PC/ABS, PBTP/ABS, PC/ASA, PC/PBT, PVC/CPE, PVC/acrylates, POM/thermoplastic PUR, PC/thermoplastic PUR, POM/acrylate, POM/MBS, PPO/HIPS, PPO/PA 6.6 and copolymers, PA/HDPE, PA/PP, PA/PPO, PBT/PC/ABS or PBT/PET/PC.

The polymers can be further divided into thermosets such as polyester resin, epoxy resin, and polyurethanes, and thermoplastics such as nylon, polycarbonate and polyethylene.

The polymers can be further divided into linear and branched polymers. The branched polymers may be further divided into short-chain branched polymers, long-chain branched polymers, star-branched polymers, ladder polymers and network polymers.

Polymers and plastics. In preferred embodiments, a suitable SE is chosen from the list comprising polymers & plastics:

- polyimide, PTFE, PMMA, Kapton, Vespel, Cirlex, ABS
- polyimides (kapton, upilex, etc)
- polyamides
- polycarbonates (PC/lexan)
- polyesters (PET/mylar, melinex, dacron, PEN/teonex)
- polyethylenes (LDPE, HDPE)
- polypropylenes (PP)
- styrenics (polystyrenes/PS, acrylonitriles/ABS)
- vinyls (PVC,nylon)
- acrylics (PMMA/perspex,plexiglas)
- fluoroplastics (PTFE/teflon, FEP, PFA, PVDF)
- polysulphones (PES)
- ketones (PEEK)
- polyurethanes
- barrier resins (PVA/polyvinyl alcohol)
- epoxy resins (FR4)
- silicone resins
- elastomes (PDMS)
- biopolymers (wood, cellulose, starch based)
- conductive polymers (Pedot:PSS/baytron,orgacon, TIPS pentacene)
- light emitting polymers (white LEP, etc)
- copolymers
- metalised polymers
- Co-polymers
- Block co-polymers
- Rubber
- Latex Polyacetylene, Polydiacetylenes, Polyethylene—very low density (VLDPE), Polyethylene—low density (LDPE), Polyethylene—linear low density (LLDPE), Polyethylene—medium density (MDPE), Polyethylene—high density (HDPE), Polyethylene—ultrahigh molecular weight (UHMWPE), Polyethylene—cross-linked polyethylene, Polyisoprene, Polybutadiene, Polypropylene, Polypropylene, Polypropylene, Poly-1-butene, Poly-1-hexene, Polymethylpentene, polyisobutylene, poly(ethylene propylene), Poly-1-octene, Ethylene-propylene-diene rubbers, Ethylene-propylene bases thermoplastic elastomers, Polyhexene, Polyheptene, Polyoctene, Polystyrene-butadiene, Parylene, Polystyrene, Polymers of styrene in primary forms, Expansible polystyrene in primary forms, Expanded polystyrene (EPS), Poly(p-phenylene), High-impact polystyrene (HIPS), Poly(p-phenylene-vinylene), Poly(2,5-dioctyl-1,4-phenylenevinylene), Poly(2,6-naphthalenevinylene), Polyanthracene, Poly(anthracene-vinylene), Polyvinylchloride, Polychloroprene, Non plasticised PVC mixed with any other substance in primary forms, Plasticised PVC mixed with any other substance in primary forms, Polyvinylidene chloride (PVDC), Polytetrafluorethylene (PTFE), Polyvinylidene fluoride (PVDF), ethylene tetrafluoro-ethylene copolymer (Tefzel), Polyvinylfluoride, Polyperfluoropropylene, Polyoxymethylene, Polyethyleneoxide, Polypropyleneoxide, Poly(ethylene-propylene oxide), polybutyleneoxide, Polyphenylene ether (PPE), polyacrylate, polyacrylic acid, Polymethylmethacrylate, Polymethylacrylate, Poly(ethyl acrylate), Polyhydroxyethylmethacrylate, Polybutylacrylate, Polybutylmethacrylate, Ethylene vinyl acetate (EVA) and ethylene vinyl alcohol (EVOH), Poly vinyl acetate in primary forms, Poly vinyl acetate in aqueous dispersion in primary forms, Polyvinylacetate, Polyvinylalcohol, Polycarbonate, Polyetherketon, Polyetheretherketon, Polyethyleneterephthalate, Polybutyleneterephthalate, polylactic acid, Polybutylene terephtalate (PBT), Other PET, Polycaprolactone (PCL), Polyglycolide (PG), Liqid crystalline polymers (aromatic) containing esters, Polyethylene adipate (PEA), Polytrimethylene terephthalate (PTT), Polyethylene naphthalate (PEN), Vectran, Alkyd resins, Polymers of vinyl esters or other vinyl polymers in primary forms, Polyacetals in primary forms, Bekalite, Phenol formaldehyde resins (PF), Diglycidyl Ether of Bisphenol-A (DGEBA), Phenolic (Novolac) Epoxy Resins, Poly-o-vinylbenzylalcohol, Poly-p-vinylbenzylalcohol, Polyvinyl formal, Polyvinyl acetal, Polyvinyl isobutyral, Polyvinyl butyral, Polyvinyl-n-butyl ether, Polytetramethylene sebacate, Polybutylene oxide, polypropylene oxide, Polyethylene adipate, Polyacrylonitrile (PAN) and copolymers, Acrylonitrile-butadiene-styrene (ABS) terpolymer, Styrene-acrylonitrile (SAN) copolymer, Polyaniline, Polypyrrole, Polymethacrylonitrile, Polysulphones, Polysulphides, ethylene chlorotrifluoro ethylene copolymer (ECTFE), fluorinated ethylene-propylene copolymer (Teflon FEP), polychlorotrifluoro-ethylene, Nylon PA1,1, Nylon PA1,2, Nylon PA1,3, Nylon PA1,4, Nylon PA1,5, Nylon PA1,6, Nylon PA2,1, Nylon PA6,6, Nylon PA6,10, Polyurethane based on, polyimide, polycaprolactam, aramid, Polyphenylene benzobisoxazole, Poly(m- phenyleneisophtalamide) (MPD-I) (Nomex®), Poly(p-phenyleneterephtalamide) (PPD-T) (Kevlar® and Twaron®), Polyisocyanurates, Polyimides, Bismaleimides (BMI), Polyacenaphthylene, Polyvinyl pyrrolidone, Vinyl chloride-vinyl acetate copolymers and other vinyl chloride copolymers in primary forms, perfluoroalkoxy Teflon PFA, Polydimethysiloxanes (PDMS), Organomodified siloxanes (OMS), Polymethylhydrosiloxane (PMHS), Silicones in primary forms, PolyAPTAC, (poly (acrylamido-N-propyltrimethylammonium chloride) and PolyMAPTAC (poly[(3-(methacryloylamino)-propyl] trimethylammonium chloride) are all suitable polymers for the structural entities SE.

Organic SEs include natural and unnatural polypeptides, lipids, polysaccharides, wood flour, etc.

The following additives represent preferred structural entities, suitable for the present invention: a carbon fibre, a carbon nanofibre, a carbon nanothread, a ceramic material, a composite material, a fullerene, a MWCNT, a SWCNT, graphane, graphene oxide, graphite, graphite, graphyne, a COOH-functionalized carbon nanotube, a OH-functionalized carbon nanotube, an NH2-functionalized carbon nanotube, an SH-functionalized CNT, COOH-functionalized graphene, multi-layer graphene, NH2-functionalized graphene, OH-functionalized graphene, reduced graphene oxide, thiol-functionalized graphene, a glass fibre, aramid, E-glass, iron, polyester, polyethylene, S-glass, steel, a battery, a borosilicate, a buckyball, a buckytube, a capacitator, a carbon dome, a carbon material, a carbon megatube, a carbon nanofoam, a carbon polymer, a catalyst, a cathode, a coated carbon nanotube, a conductor, a covalent crystal, a crystal, a crystalline material, a defect-free graphene sheet, a defect-free MWCNT, a defect-free SWCNT, a dielectric material, a diode, a dodecahedrane, a doped glass, a fibre, a fullerite, a fused silica, a glue, a green ceramic, a lanthanides, a machinable ceramic, a metal alloy, a metal-functionalized carbon nanotube, a metalised dielectric, a metallised ceramic, a metalloid, a mineral, a non-covalent crystal, a piezoelectric material, a platinum group metal, a post-transition metal, a rare earth element-a sapphire, a semiconductor, a sensor, a silicon nitride, a single crystal fiber, a sol-gel, a synthetic diamond, a transition metal, a triple-wall carbon nanotube, a tungsten carbide, alumina, alumina trihydrate, aluminium, aluminum boride, aluminum oxide, aluminum trihydroxide, amorphous carbon, an actinides, an amalgam, an anode, an elastomers, an electrode, an endohedral fullerene, an insulator, an intermetallic, an ionic crystal, an organic material, anode, anthracite, asbestos, barium, bone, boron, brass, buckypaper, calcium carbonite, calcium metasilicate, calcium sulfate, calcium sulphate, carbon black, carbon nanofoam, cathode, chromium, clay, coal, copper, diamond, diamond-like carbon, double-layer graphene, exfoliated graphite, exfoliated silicate, flourinated graphene, fused silica, gallium arsenide, gallium nitride, germanium, glass, glass microsphere, glass ribbons, glassy carbon, gold, hardened steel, hydrous magnesium silicate, hyperdiamond, iron oxides, lead zirconium titanate, lignite, lithium niobate, lonsdaleite, magnesium dihydroxide, magnesium oxide, manganese, metal, metal oxide, mica, molybdenum, nickel, nylon, palladium, pencil lead, platinum, prismane, pyrolytic graphite, rubber, silica, silica gel, silicon, silicon carbide, silicon dioxide, silicon nitride, silver, soot, stainless steel, tantalum, titanium, titanium oxide, tooth cementum, tooth dentine, tooth enamel, tungsten, tungsten carbide, wood, zinc oxide, zirconia.

The SEs can be further divided into SEs comprising solely aliphatic moieties, comprising solely aromatic moieties, or comprising both aliphatic and aromatic moieties.

The SEs can be further divided into SEs comprising solely single bonds, solely double bonds, solely triple bonds, or a combination of single-, double- and triple bonds.

Biological polymers are here defined as the polymers involved in the transcriptional and translational process, i.e. natural nucleic acids (RNA or DNA), and natural polypeptides. Natural polypeptides can be further divided into peptides, proteins and antibodies.

In preferred embodiments, a suitable organic SE is chosen from the list comprising biologicals, such as hair, nail, horn, ligaments, bone, cornea, teeth, fibrous cartilage, vitreous cells, intervertebral disc, womb, skin, intestines, heart membranes, membranes, stomach membrane, cartilage, chronodrocites, intervertebral cartilage, bone enamel, ligaments, tendons and tooth enamel, organs, lung, heart, brain, skin, kidney, tooth material, bone material, tendon material, skin, hair, nails, a biological surface, such as a vein, a biological macromolecule, such as a protein, such as a naturally occuring protein, such as a consensus sequence protein, a modified protein, such as a mutant protein where one or more amino acids have been changed relative to the consensus sequence.

Preferred embodiments of SEs include gold particles, carbon nanotubes, carbon fibers, aluminum fibers, nanotubes, graphene, metal ions, metal, ceramic, polyester, concrete, polystyrene, BN (boron nitride aka "white graphene"), BNNT (boron nitride nanotubes), nanotubes and nanowires and nanocrystals and nanospheres and nanochains e.g. comprising any one or more of the following elements: C, Si, Se, Cu, S, Co, Zn, Al, Au, Ag, N, B and Cd.

In preferred embodiments, a suitable SE is chosen from the list comprising

Concrete admixtures
Chemical admixtures
Mineral admixtures.
Air entrainers
Water reducers
Set retarders
Set accelerators
Superplasticizers
Corrosion inhibitors
Shrinkage control admixtures
Alkali-silica reactivity inhibitors
Coloring admixtures.
Plasticizers
Water reducers
Ssuperplasticizer
High range water reducers
Organic polymers
Ligning
Naphthalene
Melamine sulfonate superplasticisers
Pozzolans and other cementitious materials
Natural pozzolans (such as the volcanic ash used in Roman concrete)
Fly ash
Silica fume.
Dispersants.
Polycarboxylate ether superplasticizer (PCE)
Polycarboxylate (PC)
Coal
Soot
Carbon black
Anthracite
Lignite

- Kevlar
- Carbon fiber
- Carbon nanofiber
- Carbon allotropes
  - Activated carbon
    - Powdered activated carbon
    - Granular activated carbon
    - Extruded activated carbon
  - Fullerenes
    - ckyball
    - Buckypaper
    - Buckytube
    - Dodecahedrane
    - Endohedral fullerenes
    - Gedodesic carbon domes
    - Prismane
    - Carbon nanotube
      - Single-wall carbon nanotubes
      - Double-wall carbon nanotubes
      - Triple-wall carbon nanotube
      - Multi-wall carbon nanotubes
      - Pristine carbon nanotubes
      - Coated carbon nanotubes
      - Perfect carbon nanotubes
      - Imperfect carbon nanotubes
      - Functionalized carbon nanotubes
        - Thiol-functionalized
        - Hydroxyl-functionalized
        - Carboxylic acid-functionalized
        - Amine-functionalized
      - Carbon nanotubes that contain gadolinium
      - Buckypaper
    - Fullerite
      - Ultrahard fullerite
    - Buckminsterfullerene
    - Graphene
      - Single-layer graphene
      - Double-layer graphene
      - Triple-layer graphene
      - Multi-layer graphene
      - Pristine graphene
      - Coated graphene
      - Perfect graphene
      - Imperfect graphene
      - Functionalized graphene
        - Graphane
        - Flourinated graphene
        - Graphene oxide
        - Reduced graphene oxide
    - Buckyball clusters
    - Carbon megatubes
    - Carbon polymers
    - Carbon nano-onions
    - Carbon nanobuds
    - Fullerene rings
  - Glassy carbon
  - Diamond
    - Hyperdiamonds
    - Aggregated diamonds
  - Graphite
    - Pyrolytic graphite
  - Pencil lead
  - Lonsdaleite
  - Amorphous carbon
  - Carbon nanofoam
- Metals
  - Transition metal, Lanthanides, Actinides, Rare earth elements, Platinum group metals (PGMs), Post-transition metals
  - (Al) aluminium
  - (Fe) steel and stainless steel
  - (Mo) molybdenum
  - (Cu) copper
  - (Ti) titanium
  - (Pt) platinum
  - (Au) gold
  - (Ni) nickel
  - (Pa) palladium
  - (Mn) manganese
  - (Ta) tantalum
  - (Cr) chromium
  - (Ag) silver
  - (Wo) Tungsten
- Metalloids
- Alloys
  - Stainless steel
  - Steel fibers
  - Hardened steel
  - Brass
  - Brass fibers
- Amalgams
- Intermetallics
- Glasses
  - Glass fibre
  - Glass spheres
- Crystal
  - Ionic crystals, Covalent crystals, Non-covalent crystals
  - Non-covalent crystal
- Crystalline materials
  - BK7, sapphire, fused silica
- Glue
- Ceramic
  - alumina, zirconia, machinable ceramic, green ceramic, PZT, silicon nitride, tungsten carbide
  - alumina (Al2O3)
  - silicon nitrides (bulk and thin film)
  - silicon carbides
  - lithium niobates
  - zirconia
  - metallised ceramic
- Elastomers
- Fibres
- Composite materials
  - Wood
  - Cellulose fibers
  - lignin
  - Bone
  - Tooth enamel
  - Tooth cementum
  - Tooth dentine
- Sol-gel
- Mineral
- Montmorrilonite nanoclays
- Cellulose nanowhiskers
- Talc
- Cellulose nanofibers (e.g. Curran)
- Organic-Inorganic
- Organic-Inorganic hybrids
- Polymer hybrids of poly (vinyl alcohol) and silica gel
- Boron nitride nanotube
- Single-wall boron nitride nanotubes
- Double-wall boron nitride nanotubes
- Triple-wall boron nitride nanotube Multi-wall boron nitride nanotubes
Pristine boron nitride nanotubes
Coated boron nitride nanotubes
Perfect boron nitride nanotubes
Imperfect boron nitride nanotubes
Functionalized boron nitride nanotubes
  Thiol-functionalized
  Hydroxyl-functionalized
  Carboxylic acid-functionalized
  Amine-functionalized
Boron nitride nanotubes that contain gadolinium
Bucky paper
Boron nitride
Single-layer boron nitride
Double-layer boron nitride
Triple-layer boron nitride
Multi-layer boron nitride
Pristine boron nitride
Coated boron nitride
Perfect boron nitride
Imperfect boron nitride
Functionalized boron nitride
  Flourinated boron nitride
  Boron nitride oxide
  Reduced boron nitride oxide For any characteristics of an SE mentioned above or below, and in each characteristic's entire range, a further characteristic of importance is the content of elements in the SE. The kinds of elements in an SE will be reflected in the characteristics of the SE, but can in some cases also affect other parts of a CMU. As an example, the elements of SE1 may interfere with the integrity of SE2, or alternatively, if SE2 is made in situ, i.e. after the mixing of SE1 and the precursors from which SE2 will be made, SE1 may interfere with the formation of SE2 and or its final form, through interaction of its elements with the reactive monomers that react to form SE2.

Identities and number of elements of a structural entity. The structural entity may be composed of only one type of element, two types of elements, three types of elements, four types of elements, or more than four types of elements.

SEs consisting of one element or one type of element. Preferred embodiments of SEs comprising only one element are often ions, and often serve an essential structural role in the CMU. The following ions are particularly preferred structural entities: K+, Cl−, Ca++, Mg++, Gd+++, Cu+, Cu2+, Fe2+, Fe3+, Hg2+, Hg22+, Pb2+, Pb4+, Sn2+, Sn4+, Cr2+, Cr3+, Mn2+, Mn3+, Co2+, Co3+. If comprising only one element, the element may be any one of the following: Lithium (Li), Beryllium (Be), Boron (B), Carbon (C), Nitrogen (N), Oxygen (O), Fluorine (F), Sodium (Na), Magnesium (Mg), Aluminium (Al), Silicon (Si), Phosphorus (P), Sulfur (S), Chlorine (Cl), Potassium (K), Calcium (Ca), Scandium (Sc), Titanium (Ti), Vanadium (V), Chromium (Cr), Manganese (Mn), Iron (Fe), Cobalt (Co), Nickel (Ni), Copper (Cu), Zinc (Zn), Gallium (Ga), Germanium (Ge), Arsenic (As), Selenium (Se), Bromine (Br), Rubidium (Rb), Strontium (Sr), Yttrium (Y), Zirconium (Zr), Niobium (Nb), Molybdenum (Mo), Technetium (Tc), Ruthenium (Ru), Rhodium (Rh), Palladium (Pd), Silver (Ag), Cadmium (Cd), Indium (In), Tin (Sn), Antimony (Sb), Tellurium (Te), Iodine (I), Caesium (Cs), Barium (Ba), Platinum (Pt), Gold (Au), Mercury (Hg), Thallium (Tl), Lead (Pb), Bismuth (Bi).

SEs comprising only one type of element have no polarity, and are therefore attractive in cases where no polarity is desired. This may e.g. be the case where the polymer (e.g. SE1) of a composite has no polarity, and where it therefore may be beneficial to add an additive (SE2) with no polarity as well.

The following structural entities comprising only one element or one type of element, are particularly preferred structural entities:

Comprising carbon atoms only: Buckyball, Buckypaper, Buckytube, Dodecahedrane, Endohedral fullerenes, Geodesic carbon domes, Prismane, Pristine carbon nanotubes, Coated carbon nanotubes, Perfect carbon nanotubes, Imperfect carbon nanotubes, Fullerite, Ultrahard fullerite, Buckminsterfullerene, Graphene, Single-layer graphene, Double-layer graphene, Triple-layer graphene, Multi-layer graphene, Pristine graphene, Perfect graphene, Imperfect graphene, Buckyball clusters, Carbon megatubes, Carbon polymers, Carbon nano-onions, Carbon nanobuds, Fullerene rings, diamond, fullerenes in general, and specifically Carbon nanotubes, Single-wall carbon nanotubes, Double-wall carbon nanotubes, Triple-wall carbon nanotube, Multi-wall carbon nanotubes including single-walled carbon nanotubes and multiwalled nanotubes, and including Carbon nanotubes with the following chiral vectors (n, m); (0,0); (1,0); (2,0); (3,0); (4,0); (5,0); (6,0); (7,0); (8,0); (9,0); (10,0); (11,0); (12,0); (13,0); (14,0); (15,0); (16,0); (17,0); (18,0); (19,0); (20,0); (0,1); (1,1); (2,1); (3,1); (4,1); (5,1); (6,1); (7,1); (8,1); (9,1); (10,1); (11,1); (12,1); (13,1); (14,1); (15,1); (16,1); (17,1); (18,1); (19,1); (20,1); (0,2); (1,2); (2,2); (3,2); (4,2); (5,2); (6,2); (7,2); (8,2); (9,2); (10,2); (11,2); (12,2); (13,2); (14,2); (15,2); (16,2); (17,2); (18,2); (19,2); (20,2); (0,3); (1,3); (2,3); (3,3); (4,3); (5,3); (6,3); (7,3); (8,3); (9,3); (10,3); (11,3); (12,3); (13,3); (14,3); (15,3); (16,3); (17,3); (18,3); (19,3); (20,3); (0,4); (1,4); (2,4); (3,4); (4,4); (5,4); (6,4); (7,4); (8,4); (9,4); (10,4); (11,4); (12,4); (13,4); (14,4); (15,4); (16,4); (17,4); (18,4); (19,4); (20,4); (0,5); (1,5); (2,5); (3,5); (4,5); (5,5); (6,5); (7,5); (8,5); (9,5); (10,5); (11,5); (12,5); (13,5); (14,5); (15,5); (16,5); (17,5); (18,5); (19,5); (20,5); (0,6); (1,6); (2,6); (3,6); (4,6); (5,6); (6,6); (7,6); (8,6); (9,6); (10,6); (11,6); (12,6); (13,6); (14,6); (15,6); (16,6); (17,6); (18,6); (19,6); (20,6); (0,7); (1,7); (2,7); (3,7); (4,7); (5,7); (6,7); (7,7); (8,7); (9,7); (10,7); (11,7); (12,7); (13,7); (14,7); (15,7); (16,7); (17,7); (18,7); (19,7); (20,7); (0,8); (1,8); (2,8); (3,8); (4,8); (5,8); (6,8); (7,8); (8,8); (9,8); (10,8); (11,8); (12,8); (13,8); (14,8); (15,8); (16,8); (17,8); (18,8); (19,8); (20,8); (0,9); (1,9); (2,9); (3,9); (4,9); (5,9); (6,9); (7,9); (8,9); (9,9); (10,9); (11,9); (12,9); (13,9); (14,9); (15,9); (16,9); (17,9); (18,9); (19,9); (20,9); (0,10); (1,10); (2,10); (3,10); (4,10); (5,10); (6,10); (7,10); (8,10); (9,10); (10,10); (11,10); (12,10); (13, 10); (14,10); (15,10); (16,10); (17,10); (18,10); (19,10); (20,10); (0,11); (1,11); (2,11); (3,11); (4,11); (5,11); (6,11); (7,11); (8,11); (9,11); (10,11); (11,11); (12,11); (13,11); (14,11); (15,11); (16,11); (17,11); (18,11); (19,11); (20,11); (0,12); (1,12); (2,12); (3,12); (4,12); (5,12); (6,12); (7,12); (8,12); (9,12); (10,12); (11,12); (12,12); (13,12); (14,12); (15,12); (16,12); (17,12); (18,12); (19,12); (20,12); (0,13); (1,13); (2,13); (3,13); (4,13); (5,13); (6,13); (7,13); (8,13); (9,13); (10,13); (11,13); (12,13); (13,13); (14,13); (15,13); (16,13); (17,13); (18,13); (19,13); (20,13); (0,14); (1,14); (2,14); (3,14); (4,14); (5,14); (6,14); (7,14); (8,14); (9,14); (10,14); (11,14); (12,14); (13,14); (14,14); (15,14); (16,14); (17,14); (18,14); (19,14); (20,14); (0,15); (1,15); (2,15); (3,15); (4,15); (5,15); (6,15); (7,15); (8,15); (9,15); (10,15); (11,15); (12,15); (13,15); (14,15); (15,15); (16,15); (17,15); (18,15); (19,15); (20,15); (0,16); (1,16); (2,16); (3,16); (4,16); (5,16); (6,16); (7,16); (8,16); (9,16); (10,16); (11,16); (12,16); (13,16); (14,16); (15,16); (16,16); (17,16); (18,16); (19,16); (20,16); (0,17); (1,17); (2,17); (3,17); (4,17); (5,17);

(6,17); (7,17); (8,17); (9,17); (10,17); (11,17); (12,17); (13, 17); (14,17); (15,17); (16,17); (17,17); (18,17); (19,17); (20,17); (0,18); (1,18); (2,18); (3,18); (4,18); (5,18); (6,18); (7,18); (8,18); (9,18); (10,18); (11,18); (12,18); (13,18); (14,18); (15,18); (16,18); (17,18); (18,18); (19,18); (20,18); (0,19); (1,19); (2,19); (3,19); (4,19); (5,19); (6,19); (7,19); (8,19); (9,19); (10,19); (11,19); (12,19); (13,19); (14,19); (15,19); (16,19); (17,19); (18,19); (19,19); (20,19); (0,20); (1,20); (2,20); (3,20); (4,20); (5,20); (6,20); (7,20); (8,20); (9,20); (10,20); (11,20); (12,20); (13,20); (14,20); (15,20); (16,20); (17,20); (18,20); (19,20); (20,20)

In a preferred embodiment the structural entity is a CNT with the following chiral vectors (n, m):

n is between 0 and 20, such as between 0 and 10, such as between 0 and 5, such as between 0 and 2.

n is between 0 and 20, such as between 10 and 20, such as between 15 and 20, such as between 17 and 20.

p is between 0 and 20, such as between 0 and 10, such as between 0 and 5, such as between 0 and 2.

p is between 0 and 20, such as between 10 and 20, such as between 15 and 20, such as between 17 and 20.

Examples of structural entities consisting of only gold (Au) include gold nanotubes and gold nanowires.

Example of structural entities consisting of only titanium include titanium rods and titanium plates.

Example of structural entities consisting of only silver include silver fibres and silver cones.

Example of structural entities consisting of only zinc include zinc nanotubes and zinc particles.

Example of structural entities consisting of only copper include copper spheres and copper wires.

SEs consisting of two elements, or two types of elements. Examples of SEs comprising zinc and oxygen, or boron and nitride are ZnO nanorods, nanowires, nanotubes, Nanohelixes/nanosprings, seamless nanorings, nanopropellers, nanowires, such as single-crystal nanowires, ZnO nanobelts, polyhedral cages, single-wall boron nitride nanotubes, double-wall boron nitride nanotubes, triple-wall boron nitride nanotube, multi-wall boron nitride nanotubes, pristine boron nitride nanotubes, coated boron nitride nanotubes, perfect boron nitride nanotubes, imperfect boron nitride nanotubes, bucky paper, single-layer boron nitride, double-layer boron nitride, triple-layer boron nitride, multi-layer boron nitride, pristine boron nitride, coated boron nitride, perfect boron nitride and imperfect boron nitride.

If comprising only two elements, the elements may include any of the following: Hydrogen (H), Lithium (Li), Beryllium (Be), Boron (B), Carbon (C), Nitrogen (N), Oxygen (O), Fluorine (F), Sodium (Na), Magnesium (Mg), Aluminium (Al), Silicon (Si), Phosphorus (P), Sulfur (S), Chlorine (Cl), Potassium (K), Calcium (Ca), Scandium (Sc), Titanium (Ti), Vanadium (V), Chromium (Cr), Manganese (Mn), Iron (Fe), Cobalt (Co), Nickel (Ni), Copper (Cu), Zinc (Zn), Gallium (Ga), Germanium (Ge), Arsenic (As), Selenium (Se), Bromine (Br), Rubidium (Rb), Strontium (Sr), Yttrium (Y), Zirconium (Zr), Niobium (Nb), Molybdenum (Mo), Technetium (Tc), Ruthenium (Ru), Rhodium (Rh), Palladium (Pd), Silver (Ag), Cadmium (Cd), Indium (In), Tin (Sn), Antimony (Sb), Tellurium (Te), Iodine (I), Caesium (Cs), Barium (Ba), Platinum (Pt), Gold (Au), Mercury (Hg), Thallium (Tl), Lead (Pb), Bismuth (Bi).

Examples of structural entities consisting of only zinc (Zn) and oxygene (O) include ZnO nanotubes.

Examples of structural entities consisting of only carbon (C) and hydrogen (H) include polyethylene, polypropylene, polystyrene, graphane.

Examples of structural entities consisting of only boron (B) and nitrogen (N) include boron nitride and boron nitride nanotubes Examples of structural entities consisting of two elements include polytetrafluoroethylene (comprising C, F).

Comprising C and O: Graphene oxide

Comprising C and F: Fluorinated graphene

SEs consisting of three elements, or three types of elements. If comprising only three elements, the elements may include any of the following:

Hydrogen (H), Lithium (Li), Beryllium (Be), Boron (B), Carbon (C), Nitrogen (N), Oxygen (O), Fluorine (F), Sodium (Na), Magnesium (Mg), Aluminium (Al), Silicon (Si), Phosphorus (P), Sulfur (S), Chlorine (Cl), Potassium (K), Calcium (Ca), Scandium (Sc), Titanium (Ti), Vanadium (V), Chromium (Cr), Manganese (Mn), Iron (Fe), Cobalt (Co), Nickel (Ni), Copper (Cu), Zinc (Zn), Gallium (Ga), Germanium (Ge), Arsenic (As), Selenium (Se), Bromine (Br), Rubidium (Rb), Strontium (Sr), Yttrium (Y), Zirconium (Zr), Niobium (Nb), Molybdenum (Mo), Technetium (Tc), Ruthenium (Ru), Rhodium (Rh), Palladium (Pd), Silver (Ag), Cadmium (Cd), Indium (In), Tin (Sn), Antimony (Sb), Tellurium (Te), Iodine (I), Caesium (Cs), Barium (Ba), Platinum (Pt), Gold (Au), Mercury (Hg), Thallium (Tl), Lead (Pb), Bismuth (Bi).

Examples of structural entities consisting of three elements include the following:

Comprising C, H, Cl: polyvinylchloride

Comprising C, H, O: poly(vinylalcohol)

Comprising C, H, N: polyacrylonitrile

Comprising C, H, Si: Poly[(dimethylsilylene)methylene]

Comprising C, H, S: Poly(thiophene)

Comprising C, S, H: thiol-functionalized graphene

Comprising C, O, H: hydroxide-functionalized graphene

Comprising C, S, H: thiol-functionalized carbon nanotubes

Comprising C, O, H: hydroxide-functionalized carbon nanotubes

Comprising B, N, O: boron nitride oxide

Comprising B, N, F: fluorinated boron nitride

SEs consisting of four elements, or four kinds of elements. If comprising only four elements, the elements may include any of the following: Hydrogen (H), Lithium (Li), Beryllium (Be), Boron (B), Carbon (C), Nitrogen (N), Oxygen (O), Fluorine (F), Sodium (Na), Magnesium (Mg), Aluminium (Al), Silicon (Si), Phosphorus (P), Sulfur (S), Chlorine (Cl), Potassium (K), Calcium (Ca), Scandium (Sc), Titanium (Ti), Vanadium (V), Chromium (Cr), Manganese (Mn), Iron (Fe), Cobalt (Co), Nickel (Ni), Copper (Cu), Zinc (Zn), Gallium (Ga), Germanium (Ge), Arsenic (As), Selenium (Se), Bromine (Br), Rubidium (Rb), Strontium (Sr), Yttrium (Y), Zirconium (Zr), Niobium (Nb), Molybdenum (Mo), Technetium (Tc), Ruthenium (Ru), Rhodium (Rh), Palladium (Pd), Silver (Ag), Cadmium (Cd), Indium (In), Tin (Sn), Antimony (Sb), Tellurium (Te), Iodine (I), Caesium (Cs), Barium (Ba), Platinum (Pt), Gold (Au), Mercury (Hg), Thallium (Tl), Lead (Pb), Bismuth (Bi).

Examples of structural entities consisting of four elements include the following:

Comprising C, H, Cl, O: Poly(vinyl chloroacetate)

Comprising C, H, O, N: Proteins, peptides.

SEs consisting of more than four elements. If comprising more than four elements, the elements may include any of the following kinds: Hydrogen (H), Lithium (Li), Beryllium (Be), Boron (B), Carbon (C), Nitrogen (N), Oxygen (O), Fluorine (F), Sodium (Na), Magnesium (Mg), Aluminium (Al), Silicon (Si), Phosphorus (P), Sulfur (S), Chlorine (Cl), Potassium (K), Calcium (Ca), Scandium (Sc), Titanium (Ti), Vanadium (V), Chromium (Cr), Manganese (Mn), Iron (Fe), Cobalt (Co), Nickel (Ni), Copper (Cu), Zinc (Zn), Gallium (Ga), Germanium (Ge), Arsenic (As), Selenium (Se), Bromine (Br), Rubidium (Rb), Strontium (Sr), Yttrium (Y), Zirconium (Zr), Niobium (Nb), Molybdenum (Mo), Technetium (Tc), Ruthenium (Ru), Rhodium (Rh), Palladium (Pd), Silver (Ag), Cadmium (Cd), Indium (In), Tin (Sn), Antimony (Sb), Tellurium (Te), Iodine (I), Caesium (Cs), Barium (Ba), Platinum (Pt), Gold (Au), Mercury (Hg), Thallium (Tl), Lead (Pb), Bismuth (Bi).

Examples of structural entities consisting of more than four elements include the following:

Comprising C, H, N, O, P: Nucleic acids

A structural entity may consist of just one atom (in its non-charged form or as an ion, e.g. Gd or Gd+++), or may consist of several atoms, held together in an organized structure.

Comprising zinc only: Zinc nanotubes.

Example SEs. The following is a non-exhaustive list of structural entities: polymer, plastic, metal, additive, filler, inorganic polymer, organic polymer, supramolecular structure, fibers or filaments of human, animal or plant origin, macromolecular structure, polyethylene (PE), polypropylene (PP), polyvinylchloride (PVC), polystyrene (PS), poly (vinylalcohol) (PVAL), polyvinaylacetate (PVAC), poly(4-methyl-1-pentene), poly(1,4-butadiene), polyisoprene, polyacrylonitrile (PAN), polymethylmethacrylate (PMMA), poly(n-alkylmethacrylate), poly(n-alkylacrylate), poly(ethylene terephtalate) (PETP), poly(butylenes terephtalate) (PBTP), polytetrafluoroethylene (PTFE), polyamide 6 (PA 6), polyamide n (PAn), polyamide 6,10 (PA 6,10), polyoxymethylene (POM), polyethyleneoxide (PEO), poly(vinylidene dichloride) (PVDC), poly(vinylidine difluoride) (PVDF), epoxy, boron nitride, boron nitride nanotubes, carbon nanotube, zinc nanotube, graphene, myosin, actin, metal, steel, Kevlar filament, metal-oxide, alloy, silk, cotton, wool, latex, rubber, aluminum, copper, polymers, ceramic, metals, cement, and concrete.

Example SEs also include naturally occurring and synthetic organic materials which are pure monomeric compounds or mixtures of such compounds, for example mineral oils, animal and vegetable fats, oil and waxes, or oils, fats and waxes based on synthetic esters (e.g. phthalates, adipates, phosphates or trimellitates) and also mixtures of synthetic esters with mineral oils in any weight ratios, typically those used as spinning compositions, as well as aqueous emulsions of such materials.

Additives. The following is a non-comprehensive list of preferred structural entities, often categorized as the additives of a composite material:

Calcium carbonate, silicates, glass fibres, glass bulbs, asbestos, talc, kaolin, mica, barium sulfate, metal oxides and hydroxides, wood fiber, carbon fiber, bamboo fiber, UV absorbers, colourants, plasticisers, aluminum fiber, carbon black, graphite, wood flour and flours or fibers of other natural products, synthetic fibers; nano-materials, very finely dispersed or exfoliated layer structures are particularly useful, as for example montmorillonite, bentonite and the like, as well as natural or synthetic nano-tube fillers like halloysites, zeolites or carbon-based nano-tubes or layer materials of the graphene or boron nitride type.

In a preferred embodiment, the structural entity is a nucleating agent. Nucleating agents minimize the size of the interphase around fillers. By incorporating the nucleating agent into the CMU of the present invention, it is possible to control the crystalizing tendency of the interphase. See also Example 11.

Nucleating agents suitable for the present invention includes, but are not limited to: aromatic carboxylic acid salts; sodium benzoate; talc; pigment colorants; phosphate ester salts; calcium carbonate; glass; chalk; clay; kaolin; silicates; pigments; cadmium red; cobalt yellow; chromium oxide; titanium dioxide; magnesium oxide; carbonates; sulfates; carbon black; salts of carboxylic acids; benzophenone; polymers; organic liquids; polyamide-66; molybdenum disulfide; iron sulfide; titanium dioxide; sodium phenylphosphinate; potassium stearate; organic pigments; sodium benzoate; kaolin; triphenodithiazine; pimelic acid with calcium stearate; calcium stearate; pimelic acid; quinacridone permanent red dye; N,N-dicyclohexylnaphthalene-2, 6-dicarboxamide; 1,2,3,4-bis-dibenzylidene sorbitol (DBS); 1,2,3,4-bis-(p-methoxybenzylidene sorbitol) (DOS); 1,2,3,4-bis-(3,4-dimethylbenzylidene sorbitol) (MBDS); 1,3:2,4-di(3,4-dimethylbenzylidene) sorbitol (DMDBS); metal salts of substituted aromatic heterocyclic phosphate; sodium 2,2'-methylene-bis-(4,6-di-t-butylphenylene)phosphate (NA-11); salts of 2,2'-methylene-bis-(4,6-di-t-butylphenylene) phosphate; lithium 2,2'-methylene-bis-(4,6-di-t-butylphenylene)phosphate; potassium 2,2'-methylene-bis-(4,6-di-t-butylphenylene)phosphate; linear trans quinacridone (LTQ); γ-modification of LTO; calcium carboxylates, calcium salts of suberic acid (Ca-sub), calcium salts of pimelic acid (Ca-pim); N,N'-dicyclohexyl-2,6-naphtalene dicarboxamide (NJS); bicyclo[2.2.1]heptane dicarboxylate salt (HPN-68); Hyperform HPN-20E; ionomers; metal oxides; metal hybrids; organic compounds; residual catalysts; polymers; fibers; hydroxyl group-containing triglyceride oils; organic acid metal salts.

As can be seen, the structural entities SE1 and SE2 may e.g. both be a polymer, both may be an additive, both may be a filler, or one may be an additive and the other a polymer, or some other structural entity.

SE1 or SE2 may be the most abundant part of a matrix material. For example, in a composite material of PVC and carbon nanotubes, where a linker carrying two ligands, one of which is attached to a PVC polymer molecule and the other is attached to a carbon nanotube, and where the PVC polymers constitute ~99% of the composite material and the carbon nanotubes constitute ~1% of the composite material, the PVC is considered the matrix material of the composite.

SE1 and SE2 may be the same or different. Example pairs of SE1 and SE2 are shown below:

| SE1 | SE2 |
|---|---|
| Carbon nanotube | Epoxy |
| Carbon nanotube | Polyvinyl |
| Carbon nanotube | Polystyrene |
| Graphene | Epoxy |
| Kevlar | Polypropylene |
| Silk | Metal (e.g. iron, zinc, copper) |
| Metal alloy | Collagen |
| Collagen | Carbon nanotube |
| Myosin | Steel |
| Actin | Carbon nanotube |
| Cement (C—S—H) | Nanotube |
| Carbon nanotube | Carbon nanotube |
| Graphene | Graphene |
| Carbon nanotube | Carbon nanotube |
| Polyvinyl | Polyvinyl |
| BN | BNNT |

The abovementioned structural entities (SEs) may be modified. Thus, a structural entity may be modified by the addition of one or more functional groups. Examples of simple functional groups are OH, NH2, CO, COOH, SH. More complex functional groups are biotin, antibody, and metal chelate.

In a preferred embodiment this modification introduces a charged or polar group. The polar or charged group may be advantageous in order to make the SE soluble, or in order to allow strong ionic bond interactions with another SE or with a linker moiety. As an example, CNTs may be modified with charged or polar groups in order to make the CNTs soluble in polar solvents. In another preferred embodiment the modification of the SE introduces a reactive yet non-polar, non-charged group. Such groups may be preferable in cases where for example the polymerization reaction forming a composite material is inhibited by polar or charged groups. An example functionalisation is the introduction of a polyvinyl group on the surface of a CNT.

Ligand.

A ligand shall mean an entity capable of covalently or non-covalently associating with a structural entity. The ligands suitable for the present invention may have a number of characteristics. One important characteristic is the affinity (or dissociation constant) of the ligand-SE interaction.

For any characteristics of a ligand mentioned above, and in each characteristic's entire range, a further characteristic of importance is the molecular weight (MW) of the ligand.

MW of ligand. The molecular weight of the ligand may be of high economic importance (smaller compounds typically cost less to produce), and also, a smaller molecular weight is often indicative of a smaller surface of interaction with the SE, wherefore typically a higher number of ligands can bind simultaneously to the SE if their MWs are low. Thus, depending on the context, the MW is preferably less than 100,000,000 Dal, such as less than 10,000,000 Dal, such as less than 5,000,000 Dal, such as less than 2,000,000 Dal, such as less than 1,000,000 Dal, such as less than 500,000 Dal, such as less than 200,000 Dal, such as less than 100,000 Dal, such as less than 40,000 Dal, such as less than 20,000 Dal, such as less than 10,000 Dal, such as less than 7,000 Dal, such as less than 5,000 Dal, such as less than 3,000 Dal, such as less than 2,000 Dal, such as less than 1,700 Dal, such as less than 1,400 Dal, such as less than 1,200 Dal, such as less than 1,000 Dal, such as less than 900 Dal, such as less than 800 Dal, such as less than 700 Dal, such as less than 600 Dal, such as less than 500 Dal, such as less than 400 Dal, such as less than 300 Dal, such as less than 200 Dal, such as less than 100 Dal, such as less than 1 Dal.

However, it is typically easier to prepare a ligand of high affinity if its molecular weight is higher. Thus, depending on the context, the MW is preferably greater than 1 Dal, such as greater than 100 Dal, such as greater than 200 Dal, such as greater than 300 Dal, such as greater than 400 Dal, such as greater than 500 Dal, such as greater than 600 Dal, such as greater than 700 Dal, such as greater than 800 Dal, such as greater than 900 Dal, such as greater than 1,000 Dal, such as greater than 1,200 Dal, such as greater than 1,400 Dal, such as greater than 1,700 Dal, such as greater than 2,000 Dal, such as greater than 3,000 Dal, such as greater than 5,000 Dal, such as greater than 7,000 Dal, such as greater than 10,000 Dal, such as greater than 20,000 Dal, such as greater than 40,000 Dal, such as greater than 100,000 Dal, such as greater than 200,000 Dal, such as greater than 500,000 Dal, such as greater than 1,000,000 Dal, such as greater than 2,000,000 Dal, such as greater than 5,000,000 Dal, such as greater than 10,000,000 Dal, such as greater than 100,000,000 Dal.

Therefore, depending on the application and context, the molecular weight of a ligand may preferably be low, medium or high. Preferred embodiments of the present invention therefore include ligands with molecular weight of 1-100 Dal; 100-200 Dal, 200-300 Dal, 300-400 Dal, 400-500 Dal, 500-600 Dal, 600-700 Dal, 700-800 Dal, 800-900 Dal, 900-1000 Dal, 1,000-1200 Dal, 1,200-1,400 Dal, 1,400-1,700 Dal, 1,700-2,000 Dal, 2,000-3,000 Dal, 3,000-5,000 Dal, 5,000-7,000 Dal, 7,000-10,000 Dal, 10,000-20,000 Dal, 20,000-40,000 Dal, 40,000-100,000 Dal, 100,000-200,000 Dal, 200,000-500,000 Dal, 500,000-1,000,000 Dal, 1,000,000-2,000,000 Dal, 2,000,000-5,000,000 Dal, 5,000,000-10,000,000 Dal, 10,000,000-100,000,000 Dal, or larger than 100,000,000 Dal.

Chemical moieties. The ligand's content of chemical moieties is important, either because the chemical moiety is important for the interaction with the SE, because the chemical moiety is important for reactivity or non-reactivity of the ligand with e.g. the polymerization reaction. Generally preferred chemical moieties include —NH2, —COOH, —CONH2, —SH, phenyl, benzene, and pyrene. The following chemical motifs are preferred chemical motifs comprised within fullerene-binding ligands, and are particularly preferred chemical motifs of CNT- and graphene-binding ligands, suitable for use in the present invention:

- Aromatic systems, including benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants;
- Halogens, nitro group, amine, thiol, alcohol, ester, amide, carboxylic acid, phenol, indole, imidazole, sulfonate and phosphate;
- Alkane, including hexane and heptane;
- Soap-type molecules, including chemical motifs comprising a long alkane (including C4, C5, C6, C7, C8, C9, C10, C11, C12, C13, C14, C15, C16, C17, C18, C19, C20, C21, C22, C23, C24, C25) and a polar end group such as sulfonate, for example SDBS, Sodium dodecylbenzenesulfonate;
- Lactames, such as N-methyl-pyrrolidone and lactones;
- Peptides, in particular peptides with hydrophilic amino acids at the ends of the peptide and hydrophobic amino acids in the middle. Other peptides such as QLMHDYR, CPTSTGQAC, CTLHVSSYC, RLNPPSQMDPPF, QTWPPPLWFSTS, HTDWRLGTWHHS, ELWSIDTSAHRK, IFRLSWGTYFS, HWKHPWGAWDTL, ELWR, ELWRPTR, KPRSVSG-dansyl, TGTG-F-GTCT, TGTG-V-GTCT, TGTG-W-GTCT, TGTG-T-GTCT, TGTG-G-GTCT, TGTG-N-GTCT, TGTG-K-GTCT, TGTG-D-GTCT, MHGKTQATSGTIQS, DAEFRHD SGYEVHHQKLVFFAEDVGSNKGAIIGLMVGGVVIA, DAEFRHDSGYEVHHQKLVFFAEDVGSNKGAIIGLMVGGVV, CHKKPSKSC, RKLPDAPGMHTW, SCSDCLKSVDFIPSSLASS, YLTMPTP, FSWEAFA, HLESTPG, GETRAPL, RHEPPLA, GETQCAA, FPGRPSP, HTAQSTA, HKPDANR, FPGHSGP, THLPWQT, GETQCAA, FPGRPSP, HTAQSTA, VKTQATSREEPPRLPSKHRPG
- Amino acids such as phenylalanine, tyrosine, tryptophan, histidine;

- Heteroaromatic systems, including pyrrole, thiophene, furane, pyrazole, imidazole, isoxazole, oxazole, isothiazole, thiazole, pyridine and perylene bisimides
- Fused ring systems, composed of either aromatic, non-aromatic or anti-aromatic rings or combinations thereof.

Affinity of non-covalent ligand. For non-covalent interactions, a low affinity (i.e. a high dissociation constant) may sometimes be preferred. For example, if flexibility of a composite material is desired, it may be preferred that the ligand-SE interaction is weak, allowing easy dissociation. Thus, depending on the context, the dissociation constant is preferably greater than $10^{-30}$ M, such as greater than $10^{-25}$ M, such as greater than $10^{-20}$ M, such as greater than $10^{-18}$ M, such as greater than $10^{-16}$ M, such as greater than $10^{-15}$ M, such as greater than $10^{-14}$ M, such as greater than $10^{-13}$ M, such as greater than $10^{-12}$ M, such as greater than $10^{-11}$ M, such as greater than $10^{-10}$ M, such as greater than $10^{-9}$ M, such as greater than $10^{-8}$ M, such as greater than $10^{-7}$ M, such as greater than $10^{-6}$ M, such as greater than $10^{-5}$ M, such as greater than $10^{-4}$ M, such as greater than $10^{-3}$ M, such as greater than $10^{-2}$ M, such as greater than $10^{-1}$ M.

Alternatively, if high strength and low flexibility of a composite material is required, it may be desired to have a very tight binding of a non-covalent ligand to the SE. Thus, depending on the context, the dissociation constant is preferably less than $10^{-1}$ M, such as less than $10^{-2}$ M, such as less than $10^{-3}$ M, such as less than $10^{-4}$ M, such as less than $10^{-5}$ M, such as less than $10^{-6}$ M, such as less than $10^{-7}$ M, such as less than $10^{-8}$ M, such as less than $10^{-9}$ M, such as less than $10^{-10}$ M, such as less than $10^{-11}$ M, such as less than $10^{-12}$ M, such as less than $10^{-13}$ M, such as less than $10^{-14}$ M, such as less than $10^{-15}$ M, such as less than $10^{-16}$ M, such as less than $10^{-18}$ M, such as less than $10^{-20}$ M, such as less than $10^{-25}$ M, such as less than $10^{-30}$ M.

Also, if a ligand's binding strength is strongly dependent on temperature, systems can be designed that are flexible at high temperatures and rigid at lower temperatures, effectuated by the ligand's affinity for the SE. Thus, preferred embodiments of non-covalently interacting ligands of the present invention include ligands whose dissociation constant for the interaction with SE is smaller than $10^{-30}$ M, and include ligands whose dissociation constant is in one of the following ranges: $10^{-30}$-$10^{-25}$ M, $10^{-25}$-$10^{-20}$ M, $10^{-20}$-$10^{-18}$ M, $10^{-18}$-$10^{-16}$ M, $10^{-16}$-$10^{-15}$ M, $10^{-15}$-$10^{-14}$ M, $10^{-14}$-$10^{-13}$ M, $10^{-13}$-$10^{-12}$ M, $10^{-12}$-$10^{-11}$ M, $10^{-11}$-$10^{-10}$ M, $10^{-10}$-$10^{-9}$ M, $10^{-9}$-$10^{-8}$ M, $10^{-8}$-$10^{-7}$ M, $10^{-7}$-$10^{-6}$ M, $10^{-6}$-$10^{-5}$ M, $10^{-5}$-$10^{-4}$ M, $10^{-4}$-$10^{-3}$ M, $10^{-3}$-$10^{-2}$ M, $10^{-2}$-$10^{-1}$ M, or larger than $10^{-1}$ M.

Below a list of ligands and their binding strength for different targets (e.g. in the form of dissociation constant)

| Ligand[a] | MW [g/mol] | $K_d$[b] [M] | $K_d$/MW [M/Dal] | SE[c] | Affinity parameter value[d] | Ref.[e] |
|---|---|---|---|---|---|---|
| Nitrobenzene | 123.1 | | | MWNT | 1,380 L/kg | Kragulj et al. 2013 |
| Hexane | 86.2 | | | MWNT | 2,291 L/kg | Kragulj et al. 2013 |
| Benzene | 78.1 | | | MWNT | 126 L/kg | Kragulj et al. 2013 |
| Toluene | 92.1 | | | MWNT | 331 L/kg | Kragulj et al. 2013 |
| 1,2,3-Trichloro-benzene | 181.5 | | | MWNT | 12,882 L/kg | Kragulj et al. 2013 |
| 1,2,4-Trichloro-benzene | 181.5 | | | MWNT | 5,370 L/kg | Kragulj et al. 2013 |
| Naphtalene | 128.2 | | | MWNT | 2,951 L/kg | Kragulj et al. 2013 |
| Phenanthrene | 178.2 | | | MWNT | 87,096 L/kg | Kragulj et al. 2013 |
| Pyrene | 202.3 | | | MWNT | 229,087 L/kg | Kragulj et al. 2013 |
| Fluoranthene | 202.3 | | | MWNT | 204,174 L/kg | Kragulj et al. 2013 |
| Nitrobenzene | 123.1 | | | MWNT (acid treated, 3 hours) | 575 L/kg | Kragulj et al. 2013 |
| Hexane | 86.2 | | | MWNT (acid treated, 3 hours) | 813 L/kg | Kragulj et al. 2013 |
| Benzene | 78.1 | | | MWNT (acid treated, 3 hours) | 302 L/kg | Kragulj et al. 2013 |
| Toluene | 92.1 | | | MWNT (acid treated, 3 hours) | 269 L/kg | Kragulj et al. 2013 |
| 1,2,3-Trichloro-benzene | 181.5 | | | MWNT (acid treated, 3 hours) | 7,586 L/kg | Kragulj et al. 2013 |
| 1,2,4-Trichloro-benzene | 181.5 | | | MWNT (acid treated, 3 hours) | 2,754 L/kg | Kragulj et al. 2013 |
| Naphtalene | 128.2 | | | MWNT (acid treated, 3 hours) | 4,786 L/kg | Kragulj et al. 2013 |
| Phenanthrene | 178.2 | | | MWNT (acid treated, 3 hours) | 199,526 L/kg | Kragulj et al. 2013 |

-continued

| Ligand[a] | MW [g/mol] | $K_d$[b] [M] | $K_d$/MW [M/Dal] | SE[c] | Affinity parameter value[d] | Ref.[e] |
|---|---|---|---|---|---|---|
| Pyrene | 202.3 | | | MWNT (acid treated, 3 hours) | 457,088 L/kg | Kragulj et al. 2013 |
| Fluoranthene | 202.3 | | | MWNT (acid treated, 3 hours) | 371,535 L/kg | Kragulj et al. 2013 |
| Nitrobenzene | 123.1 | | | MWNT (acid treated, 6 hours) | 182 L/kg | Kragulj et al. 2013 |
| Hexane | 86.2 | | | MWNT (acid treated, 6 hours) | 562 L/kg | Kragulj et al. 2013 |
| Benzene | 78.1 | | | MWNT (acid treated, 6 hours) | 20 L/kg | Kragulj et al. 2013 |
| Toluene | 92.1 | | | MWNT (acid treated, 6 hours) | 32 L/kg | Kragulj et al. 2013 |
| 1,2,3-Trichloro-benzene | 181.5 | | | MWNT (acid treated, 6 hours) | 8,511 L/kg | Kragulj et al. 2013 |
| 1,2,4-Trichloro-benzene | 181.5 | | | MWNT (acid treated, 6 hours) | 9,772 L/kg | Kragulj et al. 2013 |
| Naphtalene | 128.2 | | | MWNT (acid treated, 6 hours) | 6,918 L/kg | Kragulj et al. 2013 |
| Phenanthrene | 178.2 | | | MWNT (acid treated, 6 hours) | 301,995 L/kg | Kragulj et al. 2013 |
| Pyrene | 202.3 | | | MWNT (acid treated, 6 hours) | 3,548,134 L/kg | Kragulj et al. 2013 |
| Fluoranthene | 202.3 | | | MWNT (acid treated, 6 hours) | 3,715,352 L/kg | Kragulj et al. 2013 |
| Naphtalene | 128.2 | | | SWNT | 10,000 L/kg | Ji et al. 2008 |
| Naphtalene | 128.2 | | | MWNT | 1,000 L/kg | Ji et al. 2008 |
| Naphtalene | 128.2 | | | Activated carbon | 1,000,000 L/kg | Ji et al. 2008 |
| Naphtalene | 128.2 | | | Graphite | 1,000 L/kg | Ji et al. 2008 |
| Tetracycline | 444.4 | | | SWNT | 100,000 L/kg | Ji et al. 2008 |
| Tetracycline | 444.4 | | | MWNT | 10,000 L/kg | Ji et al. 2008 |
| Tetracycline | 444.4 | | | Activated carbon | 10,000 L/kg | Ji et al. 2008 |
| Tetracycline | 444.4 | | | Graphite | 10,000 L/kg | Ji et al. 2008 |
| QLMHDYR | 962.1 | 1.6E−05 | 1.7E−08 | PLLA (melt crystallization) | 6.1E+04 $M^{-1}$ | Matsuno et al. 2008 |
| QLMHDYR | 962.1 | 1.8E−04 | 1.8E−07 | PMMA (atactic) | 5.7E+03 $M^{-1}$ | Matsuno et al. 2008 |
| QLMHDYR | 962.1 | 1.5E−04 | 1.5E−07 | PLLA (amorphous) | 6.8E+03 $M^{-1}$ | Matsuno et al. 2008 |
| QLMHDYR | 962.1 | 6.7E−05 | 6.9E−08 | PLLA (layer by layer) | 1.5E+04 $M^{-1}$ | Matsuno et al. 2008 |
| QLMHDYR | 962.1 | 2.1E−05 | 2.2E−08 | PDLA | 4.8E+04 $M^{-1}$ | Matsuno et al. 2008 |
| CPTSTGQAC | 867 | 2.8E−07 | 3.2E−10 | Platinum | 3.6E+06 $M^{-1}$ | Seker et al. 2011 |
| CTLHVSSYC | 1,012 | 1.1E−06 | 1.1E−09 | Platinum | 9.0E+05 $M^{-1}$ | Seker et al. 2011 |
| RLNPPSQMD-PPF | 1,399 | 8.3E−06 | 6.0E−09 | Silica | 1.2E+05 $M^{-1}$ | Seker et al. 2011 |
| QTWPPPLWF-STS | 1,447 | 8.1E−07 | 5.6E−10 | Silica | 1.2E+06 $M^{-1}$ | Seker et al. 2011 |
| HTDWRLGT-WHHS | 1,533 | 1.3E−06 | 8.5E−10 | PPV (hyperbranched) | 7.7E+05 $M^{-1}$ | Eijima et al. 2010 |

-continued

| Ligand[a] | MW [g/mol] | $K_d$[b] [M] | $K_d$/MW [M/Dal] | SE[c] | Affinity parameter value[d] | Ref.[e] |
|---|---|---|---|---|---|---|
| HTDWRLGT-WHHS | 1,533 | 1.9E−05 | 1.3E−08 | PPV (linear) | 5.2E+04 $M^{-1}$ | Eijima et al. 2010 |
| ELWSIDTSA-HRK | 1,443 | 2.7E−05 | 1.9E−08 | PPV (hyperbranched) | 3.7E+04 $M^{-1}$ | Eijima et al. 2010 |
| ELWSIDTSA-HRK | 1,443 | 1.3E−05 | 9.0E−09 | PPV (linear) | 7.7E+04 $M^{-1}$ | Eijima et al. 2010 |
| Sodium dodecyl-benzenesulfonate | 288.4 | 8.9E−04 | 3.1E−06 | SWNT (8, 6) | 1.1E+03 $M^{-1}$ | Sim et al. 2013 |
| Sodium dodecyl-benzenesulfonate | 288.4 | 7.1E−04 | 2.5E−06 | SWNT (6, 5) | 1.4E+03 $M^{-1}$ | Sim et al. 2013 |
| Sodium dodecyl-benzenesulfonate | 288.4 | 6.4E−04 | 2.2E−06 | SWNT (10, 2) | 1.6E+03 $M^{-1}$ | Sim et al. 2013 |
| IFRLSWGTYFS | 1,377 | 2.0E−05 | 1.5E−08 | SWNT (HiPco, raw) | 5.0E+04 $M^{-1}$ | Li et al. 2013 |
| HWKHPWGA-WDTL | 1,534 | 5.0E−05 | 3.3E−08 | MWNT (array) | 2.0E+04 $M^{-1}$ | Wang et al. 2003 |
| ELWR | 602.7 | 6.3E−04 | 1.0E−06 | PMMA (isotactic) | 1.6E+03 $M^{-1}$ | Serizawa et al. 2007 |
| ELWRPTR | 957.1 | 3.6E−06 | 3.7E−09 | PMMA (isotactic) | 2.8E+05 $M^{-1}$ | Serizawa et al. 2007 |
| ELWRPTR | 957.1 | 1.5E−04 | 1.5E−07 | PMMA (syndiotactic) | 6.8E+03 $M^{-1}$ | Serizawa et al. 2007 |
| KPRSVSG | 965 | 5.4E−06 | 5.6E−09 | Ceramic fluorapatite | 1.9E+05 $M^{-1}$ | Islam et al. 2012 |
| KPRSVSG | 965 | 7.2E−06 | 7.5E−09 | Ceramic hydroxylapatite | 1.4E+05 $M^{-1}$ | Islam et al. 2012 |
| Pyrene | 202.3 | 6.1E−02 | 3.0E−04 | SWNT (plasma purified) | 1.6E+01 $M^{-1}$ | Juan et al. 2015 |
| Pyrene | 202.3 | 4.2E−02 | 2.1E−04 | SWNT (plasma purified) | 2.4E+01 $M^{-1}$ | Juan et al. 2015 |
| Pyrene | 202.3 | 4.8E−02 | 2.4E−04 | SWNT (plasma purified) | 2.1E+01 $M^{-1}$ | Juan et al. 2015 |
| Pyrene | 202.3 | 1.1E−01 | 5.5E−04 | SWNT (plasma purified) | 9.0E+00 $M^{-1}$ | Juan et al. 2015 |
| Pyrene | 202.3 | 2.2E−01 | 1.1E−03 | SWNT (plasma purified) | 4.5E+00 $M^{-1}$ | Juan et al. 2015 |
| Pyrene | 202.3 | 3.8E−04 | 1.9E−06 | SWNT (plasma purified) | 2.6E+03 $M^{-1}$ | Juan et al. 2015 |
| Pyrene | 202.3 | 2.4E−02 | 1.2E−04 | SWNT (6, 5) | 4.1E+01 $M^{-1}$ | Juan et al. 2015 |
| Pyrene | 202.3 | 6.3E−01 | 3.1E−03 | SWNT (6, 5) | 1.6E+00 $M^{-1}$ | Juan et al. 2015 |
| Pyrene | 202.3 | 6.3E−01 | 3.1E−03 | SWNT (6, 5) | 1.6E+00 $M^{-1}$ | Juan et al. 2015 |
| Pyrene | 202.3 | 1.0E−03 | 4.9E−06 | SWNT (6, 5) | 1.0E+03 $M^{-1}$ | Juan et al. 2015 |
| Pyrene diamine | 230 | 4.5E−03 | 2.0E−05 | SWNT (plasma purified) | 2.2E+02 $M^{-1}$ | Juan et al. 2015 |
| Pyrene diamine | 230 | 3.4E−02 | 1.5E−04 | SWNT (6, 5) | 2.9E+01 $M^{-1}$ | Juan et al. 2015 |
| Pyrene phenyl ester | 240 | 1.1E−02 | 4.6E−05 | SWNT (plasma purified) | 9.0E+01 $M^{-1}$ | Juan et al. 2015 |
| Pyrene phenyl ester | 240 | 5.0E−02 | 2.1E−04 | SWNT (plasma purified) | 2.0E+01 $M^{-1}$ | Juan et al. 2015 |
| Dipyrene phenyl ester | 440 | 1.5E−04 | 3.5E−07 | SWNT (plasma purified) | 6.5E+03 $M^{-1}$ | Juan et al. 2015 |
| Dipyrene phenyl ester | 440 | 2.5E−04 | 5.7E−07 | SWNT (plasma purified) | 4.0E+03 $M^{-1}$ | Juan et al. 2015 |
| Bis-pyrene U-shape molecule | 640 | 1.4E−04 | 2.2E−07 | SWNT (plasma purified) | 7.0E+03 $M^{-1}$ | Juan et al. 2015 |
| TGTGFGTCT | 844 | | | Quartz | −0.8 kcal/mol | Aby et al. 2012 |

-continued

| Ligand[a] | MW [g/mol] | $K_d$[b] [M] | $K_d$/MW [M/Dal] | SE[c] | Affinity parameter value[d] | Ref.[e] |
|---|---|---|---|---|---|---|
| TGTGVGTCT | 796 | | | Quartz | 0.0 kcal/mol | Aby et al. 2012 |
| TGTGWGTCT | 883 | | | Quartz | 0.0 kcal/mol | Aby et al. 2012 |
| TGTGTGTCT | 798 | | | Quartz | 0.0 kcal/mol | Aby et al. 2012 |
| TGTGGGTCT | 754 | | | Quartz | −0.9 kcal/mol | Aby et al. 2012 |
| TGTGNGTCT | 811 | | | Quartz | −1.2 kcal/mol | Aby et al. 2012 |
| TGTGKGTCT | 825 | | | Quartz | −0.2 kcal/mol | Aby et al. 2012 |
| TGTGDGTCT | 812 | | | Quartz | −0.1 kcal/mol | Aby et al. 2012 |
| TGTGFGTCT | 844 | | | Glass | −2.2 kcal/mol | Aby et al. 2012 |
| TGTGVGTCT | 796 | | | Glass | −0.9 kcal/mol | Aby et al. 2012 |
| TGTGWGTCT | 883 | | | Glass | −0.3 kcal/mol | Aby et al. 2012 |
| TGTGTGTCT | 798 | | | Glass | −1.0 kcal/mol | Aby et al. 2012 |
| TGTGGGTCT | 754 | | | Glass | −1.9 kcal/mol | Aby et al. 2012 |
| TGTGNGTCT | 811 | | | Glass | −2.2 kcal/mol | Aby et al. 2012 |
| TGTGKGTCT | 825 | | | Glass | −0.9 kcal/mol | Aby et al. 2012 |
| TGTGDGTCT | 812 | | | Glass | −0.2 kcal/mol | Aby et al. 2012 |
| TGTGFGTCT | 844 | | | PMMA | −2.2 kcal/mol | Aby et al. 2012 |
| TGTGVGTCT | 796 | | | PMMA | −2.0 kcal/mol | Aby et al. 2012 |
| TGTGWGTCT | 883 | | | PMMA | −0.9 kcal/mol | Aby et al. 2012 |
| TGTGTGTCT | 798 | | | PMMA | −0.3 kcal/mol | Aby et al. 2012 |
| TGTGGGTCT | 754 | | | PMMA | −2.1 kcal/mol | Aby et al. 2012 |
| TGTGNGTCT | 811 | | | PMMA | −2.8 kcal/mol | Aby et al. 2012 |
| TGTGKGTCT | 825 | | | PMMA | −1.2 kcal/mol | Aby et al. 2012 |
| TGTGDGTCT | 812 | | | PMMA | −2.5 kcal/mol | Aby et al. 2012 |
| TGTGFGTCT | 844 | | | HDPE | −3.9 kcal/mol | Aby et al. 2012 |
| TGTGVGTCT | 796 | | | HDPE | −4.0 kcal/mol | Aby et al. 2012 |
| TGTGWGTCT | 883 | | | HDPE | −2.1 kcal/mol | Aby et al. 2012 |
| TGTGTGTCT | 798 | | | HDPE | −1.8 kcal/mol | Aby et al. 2012 |
| TGTGGGTCT | 754 | | | HDPE | −3.6 kcal/mol | Aby et al. 2012 |
| TGTGNGTCT | 811 | | | HDPE | −3.5 kcal/mol | Aby et al. 2012 |
| TGTGKGTCT | 825 | | | HDPE | −3.9 kcal/mol | Aby et al. 2012 |
| TGTGDGTCT | 812 | | | HDPE | −2.8 kcal/mol | Aby et al. 2012 |
| m-Dinitrobenzene | 168.11 | | | Graphene | 0.0569 L/mg | Chen et al. 2015 |
| m-Dinitrobenzene | 168.11 | | | Graphene oxide | 0.00299 L/mg | Chen et al. 2015 |
| m-Dinitrobenzene | 168.11 | | | Graphene oxide (reduced) | 0.162 L/mg | Chen et al. 2015 |
| Nitrobenzene | 123.06 | | | Graphene | 0.0118 L/mg | Chen et al. 2015 |
| Nitrobenzene | 123.06 | | | Graphene oxide | 0.00105 L/mg | Chen et al. 2015 |

-continued

| Ligand[a] | MW [g/mol] | $K_d$[b] [M] | $K_d$/MW [M/Dal] | SE[c] | Affinity parameter value[d] | Ref.[e] |
|---|---|---|---|---|---|---|
| Nitrobenzene | 123.06 | | | Graphene oxide (reduced) | 0.0330 L/mg | Chen et al. 2015 |
| p-Nitrotoluene | 137.14 | | | Graphene | 0.0939 L/mg | Chen et al. 2015 |
| p-Nitrotoluene | 137.14 | | | Graphene oxide | 0.00395 L/mg | Chen et al. 2015 |
| p-Nitrotoluene | 137.14 | | | Graphene oxide (reduced) | 0.121 L/mg | Chen et al. 2015 |
| MHGKTQATS-GTIQS$_7$ | 10,018 | 1.5E−10 | 1.5E−14 | Gold | 6.7E+09 $M^{-1}$ | Brown 1997 |
| DAEFRHDSGY-EVHHQKLVFF-AEDVGSNKGA-IIGLMVGGVVIA | 4,514 | 6.3E−18 | 1.4E−21 | Copper | 1.6E+17 $M^{-1}$ | Atwood et al. 2000 |
| DAEFRHDSGY-EVHHQKLVFF-AEDVGSNKGA-IIGLMVGGVV | 4,330 | 5.0E−11 | 1.2E−14 | Copper | 2.0E+10 $M^{-1}$ | Atwood et al. 2000 |
| CHKKPSKSC | 1,015 | 4.1E−09 | 4.0E−12 | Silica | 2.5E+08 $M^{-1}$ | Chen et al. 2006 |
| RKLPDAPGM-HTW | 1,408 | 1.3E−05 | 9.4E−09 | Titanium | 7.6E+04 $M^{-1}$ | Sano et al. 2005 |
| SCSDCLKSVD-FIPSSLASS | 1,946 | 2.5E−07 | 1.3E−10 | Titanium | 4.0E+06 $M^{-1}$ | Meyers et al. 2007 |
| YLTMPTP | 822 | 5.0E−12 | 6.1E−15 | Polystyrene (syndiotactic) | 2.0E+11 $M^{-1}$ | Serizawa et al. 2007 |
| FSWEAFA | 857 | 8.5E−11 | 9.9E−14 | Polystyrene (atactic) | 1.2E+10 $M^{-1}$ | Serizawa et al. 2007 |
| FSWEAFA | 857 | 3.4E−11 | 4.0E−14 | Polystyrene (isotactic) | 2.9E+10 $M^{-1}$ | Serizawa et al. 2007 |
| FSWEAFA | 857 | 6.1E−12 | 7.1E−15 | Polystyrene (syndiotactic) | 1.6E+11 $M^{-1}$ | Serizawa et al. 2007 |
| HLESTPG | 740 | 1.0E−10 | 1.4E−13 | Polystyrene (atactic) | 9.8E+09 $M^{-1}$ | Serizawa et al. 2007 |
| HLESTPG | 740 | 6.5E−11 | 8.8E−14 | Polystyrene (isotactic) | 1.5E+10 $M^{-1}$ | Serizawa et al. 2007 |
| HLESTPG | 740 | 7.9E−12 | 1.1E−14 | Polystyrene (syndiotactic) | 1.3E+11 $M^{-1}$ | Serizawa et al. 2007 |
| GETRAPL | 743 | 6.7E−11 | 9.0E−14 | Polystyrene (atactic) | 1.5E+10 $M^{-1}$ | Serizawa et al. 2007 |
| GETRAPL | 743 | 3.6E−11 | 4.9E−14 | Polystyrene (isotactic) | 2.8E+10 $M^{-1}$ | Serizawa et al. 2007 |
| GETRAPL | 743 | 6.7E−12 | 9.0E−15 | Polystyrene (syndiotactic) | 1.5E+11 $M^{-1}$ | Serizawa et al. 2007 |
| RHEPPLA | 819 | 5.6E−11 | 6.8E−14 | Polystyrene (atactic) | 1.8E+10 $M^{-1}$ | Serizawa et al. 2007 |
| RHEPPLA | 819 | 2.1E−11 | 2.6E−14 | Polystyrene (isotactic) | 4.7E+10 $M^{-1}$ | Serizawa et al. 2007 |
| RHEPPLA | 819 | 1.1E−11 | 1.3E−14 | Polystyrene (syndiotactic) | 9.4E+10 $M^{-1}$ | Serizawa et al. 2007 |
| GETQCAA | 679 | 3.4E−11 | 5.0E−14 | Polystyrene (atactic) | 3.0E+10 $M^{-1}$ | Serizawa et al. 2007 |
| YLTMPTP | 822 | 2.2E−11 | 2.6E−14 | Polystyrene (atactic) | 4.6E+10 $M^{-1}$ | Serizawa et al. 2007 |
| FPGRPSP | 757 | 3.1E−11 | 4.1E−14 | Polystyrene (atactic) | 3.2E+10 $M^{-1}$ | Serizawa et al. 2007 |
| HTAQSTA | 715 | 1.4E−11 | 2.0E−14 | Polystyrene (atactic) | 7.0E+10 $M^{-1}$ | Serizawa et al. 2007 |
| HKPDANR | 837 | 2.5E−11 | 3.0E−14 | PMMA (conditioned syndiotactic film) | 4.0E+10 $M^{-1}$ | Serizawa et al. 2007 |
| FPGHSGP | 698 | 1.0E−10 | 1.4E−13 | PMMA (non-conditioned syndiotactic film) | 1.0E+10 $M^{-1}$ | Serizawa et al. 2007 |
| THLPWQT | 882 | 6.7E−11 | 7.6E−14 | PMMA (non-conditioned syndiotactic film) | 1.5E+10 $M^{-1}$ | Serizawa et al. 2007 |

-continued

| Ligand[a] | MW [g/mol] | $K_d$[b] [M] | $K_d$/MW [M/Dal] | SE[c] | Affinity parameter value[d] | Ref.[e] |
|---|---|---|---|---|---|---|
| GETQCAA | 679 | 7.4E−12 | 1.1E−14 | Polystyrene (syndiotactic) | 1.4E+11 $M^{-1}$ | Serizawa et al. 2007 |
| FPGRPSP | 757 | 8.5E−12 | 1.1E−14 | Polystyrene (syndiotactic) | 1.2E+11 $M^{-1}$ | Serizawa et al. 2007 |
| HTAQSTA | 715 | 1.0E−11 | 1.4E−14 | Polystyrene (syndiotactic) | 9.7E+10 $M^{-1}$ | Serizawa et al. 2007 |
| VKTQATSREE-PPRLPSKHRPG$_4$ | 9,433 | 1.0E−10 | 1.1E−14 | Zeolite | 1.0E+10 $M^{-1}$ | Nygaard et al. 2002 |
| PQAQDVELPQ-ELQDQHREVEV$_5$ | 12,366 | 4.0E−11 | 3.2E−15 | SWNT (HiPco, purified) | 2.5E+10 $M^{-1}$ | Brown et al. 2008 |

[a]All ligands denoted by capital letters are peptide sequences; for polypeptides, the subscripts denote how many times the peptide sequence is repeated.
[b]$K_d$ is the dissociation constant.
[c]MWNT is multi walled carbon nanotube; SWNT is single walled carbon nanotube; PLLA is polylactic acid; PMMA is poly(methyl methacrylate); PDLA is poly-D-lactide; PPV is poly(p-phenylene vinylene); HDPE is high-density polyethylene; numbers in brackets after SWNTs denote chirality, e.g. (6, 5).
[d]Affinity parameter values with the unit L/kg are affinities expressed as the adsorption distribution coefficient; affinity parameter values with the unit $M^{-1}$ are affinities expressed as the affinity constant $K_a$, which is equal to $1/K_d$; affinity parameter values with the unit kcal/mol are affinities expressed as the standard-state adsorption free energy values ($\Delta G°_{ads}$); affinity parameter values with the unit L/mg are affinities expressed as Langmuir affinity constant ($K_L$).

For any characteristics of a ligand mentioned above, and in each characteristic's entire range, a further characteristic of importance is the Affinity-to-MW ratio of the ligand.

Binding constant-to-MW ratio of non-covalent ligand. In some cases, it is not the absolute affinity of a ligand for an SE that is important, but rather the affinity-to-MW ($K_B$/MW) ratio that is important. As an example, if the economical cost of preparing two small ligands with a combined binding constant for an SE of $K_B=10^{10}$ $M^{-1}$ is smaller than the cost of preparing one larger ligand with the same binding constant, it may be desirable to use the smaller ligands. Thus, depending on the context, the $K_B$/MW ratio is preferably greater than 1 $M^{-1}$/Dal, such as greater than $10^6$ $M^{-1}$/Dal, such as greater than $10^{10}$ $M^{-1}$/Dal, such as greater than $10^{13}$ $M^{-1}$/Dal, such as greater than $10^{16}$ $M^{-1}$/Dal, such as greater than $10^{18}$ $M^{-1}$/Dal, such as greater than $10^{20}$ $M^{-1}$/Dal.

However, if the processing of the composite material is performed more easily using fewer ligands, it may be desirable to use larger ligands. Thus, depending on the context, the $K_B$/MW ratio is preferably less than $10^{20}$ $M^{-1}$/Dal, such as less than $10^{18}$ $M^{-1}$/Dal, such as less than $10^{16}$ $M^{-1}$/Dal, such as less than $10^{13}$ $M^{-1}$/Dal, such as less than $10^{10}$ $M^{-1}$/Dal, such as less than $10^6$ $M^{-1}$/Dal, such as less than 1 $M^{-1}$/Dal.

Thus, the preferred compromise between many small ligands with relatively high $K_B$/MW ratios and fewer large ligands with relatively low $K_B$/MW ratios depends on the context. Preferred embodiments include ligands with $K_B$/MW ratios of from 1 $M^{-1}$/Dal to $10^{20}M^{-1}$/Dal, more preferably ligands with $K_B$/MW ratios of from $10^3$ $M^{-1}$/Dal to $10^{20}M^{-1}$/Dal, more preferably ligands with $K_B$/MW ratios of from $10^6$ $M^{-1}$/Dal to $10^{20}M^{-1}$/Dal, more preferably ligands with $K_B$/MW ratios of from $10^{10}$ $M^{-1}$/Dal to $10^{20}$ $M^{-1}$/Dal, more preferably ligands with $K_B$/MW ratios of from $10^{13}$ $M^{-1}$/Dal to $10^{20}M^{-1}$/Dal, more preferably ligands with $K_B$/MW ratios of from $10^{16}$ $M^{-1}$/Dal to $10^{20}M^{-1}$/Dal, more preferably ligands with $K_B$/MW ratios of from $10^{18}$ $M^{-1}$/Dal to $10^{20}M^{-1}$/Dal, and more preferably ligands with $K_B$/MW ratios larger than $10^{20}M^{-1}$/Dal.

For any characteristics of a ligand mentioned above, and in each characteristic's entire range, a further characteristic of importance is the half-life of the ligand-SE complex.

Half-life of ligand. In many cases, ligands with large half-lifes are preferred. This is for example the case in composite materials where the characteristics of the composite material should change as little over time as possible, e.g. in structural elements of buildings, bridges, etc. Thus, depending on the context, the half-life is preferably greater than 0.01 second, such as greater than 0.1 second, such as greater than 1 second, such as greater than 10 seconds, such as greater than 1 minute, such as greater than 10 minutes, such as greater than 1 hour, such as greater than 5 hours, such as greater than 10 hours, such as greater than 24 hours, such as greater than 2 days, such as greater than 10 days, such as greater than 50 days, such as greater than 100 days, such as greater than 1 year, such as greater than 10 years.

In other cases, ligands with short half-lifes are preferred. Thus, depending on the context, the half-life is preferably less than 10 years, such as less than 1 year, such as less than 100 days, such as less than 50 days, such as less than 10 days, such as less than 2 days, such as less than 24 hours, such as less than 10 hours, such as less than 5 hours, such as less than 1 hour, such as less than 10 minutes, such as less than 1 minute, such as less than 10 seconds, such as less than 1 second, such as less than 0.1 second, such as less than 0.01 second.

Thus, the preferred compromise between long half-lifes and short half-lifes depends on the context and half-lifes suitable for the present invention can be shorter than 0.01 second, but may also include half-lifes in the following ranges: 0.01-0.1 seconds, 0.1-1 seconds, 1-10 seconds, 10-60 seconds, 1-10 minutes, 10-60 minutes, 1-5 hours, 5-10 hours, 10-24 hours, 1-2 days, 2-10 days, 10-50 days, 50-100 days, 100-365 days, 1-10 years, or more than 10 years. When the ligand-SE interaction is characterized by an appropriately long half-life, the SE and Ligand will remain associated for a long time, and the composite material comprising such CMUs will retain its characteristics for a longer period of time.

Half-life-to-MW ratio of non-covalent ligand. In some cases, it is not the half-life (T½) of a ligand for an SE that is important, but rather the half-life-to-MW (T½/MW) ratio that is important. As an example, if the economical cost of preparing two small ligands with a combined half life for an SE of T½=5 days is smaller than the cost of preparing one larger ligand with the same binding constant, it may be desirable to use the smaller ligands. Thus, depending on the context, the T½/MW ratio is preferably greater than $10^{-8}$ days/Dal, such as greater than $10^{-6}$ days/Dal, such as greater than $10^{-4}$ days/Dal, such as greater than 0.01 days/Dal, such as greater than 1 days/Dal, such as greater than 100 days/Dal, such as greater than 10,000 days/Dal.

However, if the processing of the composite material is performed more easily using fewer ligands, it may be desirable to use larger ligands. Thus, depending on the context, the T½/MW ratio is preferably less than 10,000 days/Dal, such as less than 100 days/Dal, such as less than 1 days/Dal, such as less than 0.01 days/Dal, such as less than $10^{-4}$ days/Dal, such as less than $10^{-6}$ days/Dal, such as less than $10^{-8}$ days/Dal.

Thus, the preferred compromise between a high and low T½/MW ratio depends on the context, and may be lower than $10^{-8}$ days/Dal, but may also be in the range of $10^{-8}$-$10^{-6}$ days/Dal, $10^{-6}$-$10^{-4}$ days/Dal, $10^{-4}$-0.01 days/Dal, 0.01-1 days/Dal, 1-100 days/Dal, 100-10,000 days/Dal, or above 10,000 days/Dal.

For any characteristics of a ligand mentioned above, and in each characteristic's entire range, a further characteristic of importance is the charge of the ligand.

Charge of ligand. The charge of the ligand can be important. As an example, if the ligand is used as a means to prepare a nanosensor, where a conducting nanotube is used to sense the binding of certain analytes to another SE, linked to the nanotube by way of the ligand, then the charge of the ligand is likely to have an effect on the conductivity of the nanotube (and hence, an effect on the read-out), which may not always be desirable. A ligand carrying a charge may also be a disadvantage during the preparation of a composite material comprising CMUs, because the charge may interfere with e.g. polymerization of the matrix material. Alternatively, a ligand carrying a charge can help disperse an SE, in which case it will be an advantage to have a charged ligand. Thus, depending on the context, the net charge at pH 7 is preferably greater than −10, such as greater than −9, such as greater than −8, such as greater than −7, such as greater than −6, such as greater than −5, such as greater than −4, such as greater than −3, such as greater than −2, such as greater than −1, such as greater than 0, such as greater than 1, such as greater than 2, such as greater than 3, such as greater than 4, such as greater than 5, such as greater than 6, such as greater than 7, such as greater than 8, such as greater than 9, such as greater than 10, such as greater than 11, such as greater than 12, such as greater than 13. Preferred embodiments of the present invention include ligands with a net charge at pH 7 of less than −10, or a net charge of −10, or −9, −8, −7, −6, −5, −4, −3, −2, −1, 0 (e.g. the amino acid alanine), +1, +2, +3, +4, +5, +6, +7, +8, +9, +10, +11, +12, +13, or more than a net charge of +13.

Likewise, preferred embodiments of the present invention include ligands with a total number of charges (positive or negative charges) of 0, 1, 2 (e.g. the amino acid alanine at pH 7), 3, 4, 5, 6, 7, 8, 9, 10, 11, 12, 13-15, 15-20, 20-30, 30-50, 50-100, or more than 100.

For any characteristics of a ligand mentioned above, and in each characteristic's entire range, a further characteristic of importance is the surface area of interaction between the ligand and the SE.

Surface area of ligand-SE interaction. The surface area of interaction between ligand and SE determines how many ligands can bind to a given SE. Therefore, the surface area of interaction can be an important parameter and in some cases, a large surface area of interaction is desirable. Thus, depending on the context, the surface area of interaction is preferably greater than 20 Å$^2$, such as greater than 100 Å$^2$, such as greater than 200 Å$^2$, such as greater than 300 Å$^2$, such as greater than 500 Å$^2$, such as greater than 700 Å$^2$, such as greater than 1,000 Å$^2$, such as greater than 2,000 Å$^2$, such as greater than 4,000 Å$^2$, such as greater than 8,000 Å$^2$, such as greater than 15,000 Å$^2$, such as greater than 30,000 Å$^2$, such as greater than 100,000 Å$^2$.

In other cases, a small surface area of interaction is desirable and thus, depending on the context, the surface area of interaction is preferably less than 100,000 Å$^2$, such as less than 30,000 Å$^2$, such as less than 15,000 Å$^2$, such as less than 8,000 Å$^2$, such as less than 4,000 Å$^2$, such as less than 2,000 Å$^2$, such as less than 1,000 Å$^2$, such as less than 700 Å$^2$, such as less than 500 Å$^2$, such as less than 300 Å$^2$, such as less than 200 Å$^2$, such as less than 100 Å$^2$, such as less than 20 Å$^2$.

Preferred embodiments of the present invention include ligands that contact the SE over a surface area of less than 20 Å$^2$, or contact the SE over a surface area of 20-100 Å$^2$, 100-200 Å$^2$, 200-300 Å$^2$, 300-500 Å$^2$, 500-700 Å$^2$, 700-1,000 Å$^2$, 1,000-2,000 Å$^2$, 2,000-4,000 Å$^2$, 4,000-8,000 Å$^2$, 8,000-15,000 Å$^2$, 15,000-30,000 Å$^2$, 30,000-100,000 Å$^2$, or more than 100,000 Å$^2$.

For any characteristics of a ligand mentioned above, and in each characteristic's entire range, further characteristics of importance are the Affinity-to-charge ratio of the ligand, the Affinity to area-of-interaction ratio of the ligand, the degradability and biodegradability of the ligand, and the intrinsic stability of the ligand.

Particularly the biodegradability is of importance. Degradation by enzymes such as peptidases, nucleases and other enzymes commonly found in nature can decrease the lifetime of a composite material, wherefore it is often advantageous to avoid the use of natural and unnatural oligonucleotides, natural and unnatural polypeptides (comprising natural and unnatural amino acids), and in general avoid the use of polyamides or amide bonds in general, or any other kind of chemical entity or bond that is commonly found in nature.

In short, when trying to avoid biodegradation, it is often advantageous to use components for the making of composite materials that do not resemble too strongly the chemical entities found in nature. Thus, use of ligands (and structural entities and linkers) that do not contain peptides or nucleotides is often preferable.

Chemical stability is also of importance. It is generally advantageous to use ligands that are chemically stable (e.g. stable towards high temperature, low or high pH, high pressure, etc), in order to ensure that the ligand's characteristics, especially the affinity for the structural entity, remain relatively constant under varying conditions.

In another preferred embodiment it is advantageous to use biodegradable components, to avoid e.g. pollution of the environment.

Ligands may be organic or inorganic.

Further, ligands may be polymers or may be non-polymeric in structure. Preferred polymeric ligands include the polymers listed above.

The polymeric ligands can be divided into biological polymers and non-biological polymers. Biological polymers shall here be defined as the polymers involved in the transcriptional and translational process, i.e. natural nucleic acids (RNA or DNA), or natural polypeptides. Natural polypeptides can be further divided into peptides, proteins and antibodies.

Peptide ligands. The number of amino acids (AA) of the ligand may be of high economic importance (smaller peptides typically cost less to produce), and also, a smaller peptide is often indicative of a smaller surface of interaction with the SE, wherefore typically a higher number of ligands can bind simultaneously to the SE if each ligand comprise fewer amino acids. Thus, depending on the context, the peptide ligand is preferably comprised of fewer than 100 AA, such as fewer than 90 AA, such as fewer than 80 AA, such as fewer than 70 AA, such as fewer than 60 AA, such as fewer than 50 AA, such as fewer than 40 AA, such as fewer than 30 AA, such as fewer than 25 AA, such as fewer than 20 AA, such as fewer than 15 AA, such as fewer than 10 AA, such as fewer than 9 AA, such as fewer than 8 AA, such as fewer than 7 AA, such as fewer than 6 AA, such as fewer than 5 AA, such as fewer than 4 AA, such as fewer than 3 AA, such as fewer than 2 AA.

However, it is typically easier to prepare a peptide ligand of high affinity if it comprises more amino acids. Thus, depending on the context, the peptide ligand is preferably comprised of more than 1 AA, such as more than 2 AA, such as more than 3 AA, such as more than 4 AA, such as more than 5 AA, such as more than 6 AA, such as more than 7 AA, such as more than 8 AA, such as more than 9 AA, such as more than 10 AA, such as more than 15 AA, such as more than 20 AA, such as more than 25 AA, such as more than 30 AA, such as more than 40 AA, such as more than 50 AA, such as more than 60 AA, such as more than 70 AA, such as more than 80 AA, such as more than 90 AA, such as more than 100 AA.

Thus, the preferred compromise between peptide ligands comprising few or many amino acids depends on the context, and may be lower than 2 AA, but may also be in the range: 2-3 AA, 3-4 AA, 4-5 AA, 5-6 AA, 6-7 AA, 7-8 AA, 8-9 AA, 9-10 AA, 10-15 AA, 15-20 AA, 20-25 AA, 25-30 AA, 30-40 AA, 40-50 AA, 50-60 AA, 60-70 AA, 70-80 AA, 80-90 AA, 90-100 AA, or more than 100 AA.

Preferred peptide ligands include the following peptides, as well as all shorter peptide sequences that may be derived from these peptid sequences: PQAQDVELPQELQDQHREVEV$_5$=PQAQDVELPQELQDQHREVEVPQAQDVELPQELQDQHREVEVPQAQDVELPQELQD QHREVEVPQAQDVELPQELQDQHREVEVPQAQDVELPQELQDQHREVEV)

Non-biological polymers include polymers that are not RNA, DNA or natural polypeptides, e.g. including PVC, epoxy, unnatural polypeptides (i.e. not solely comprising alpha-amino acids) and unnatural nucleic acids (e.g. PNA, LNA and other unnatural nucleic acids).

The polymeric ligands can be further divided into linear and branched polymers. The branched polymers may be further divided into short-chain branched polymers, long-chain branched polymers, star-branched polymers, ladder polymers and network polymers.

The Ligands can be further divided into Ligands comprising solely aliphatic moieties, comprising solely aromatic moieties, or comprising both aliphatic and aromatic moieties.

The Ligands can be further divided into Ligands comprising solely single bonds, solely double bonds, solely triple bonds, solely aromatic bonds, or a combination of single-, double-, triple and aromatic bonds.

Organic Ligands include natural and unnatural polypeptides, lipids, polysaccharides, wood, flour, Inorganic Ligands include metal ions, Cu+, Cu2+, Fe2+, Fe3+, Hg2+, Hg22+, Pb2+, Pb4+, Sn2+, Sn4+, Cr2+, Cr3+, Mn2+, Mn3+, Co2+, Co3+.

Identities and number of different elements of a Ligand. The Ligand may be composed of only one element, two elements, three elements, four elements, or more than four elements.

Ligands consisting of one element. The ligand may consist of just one atom (in its non-charged form or as an ion, e.g. Gd or Gd+++), or may consist of several atoms, held together in an organized structure.

The following ions are particularly preferred Ligands: K+, Cl−, Ca++, Mg++, Gd+++, Cu+, Cu2+, Fe2+, Fe3+, Hg2+, Hg22+, Pb2+, Pb4+, Sn2+, Sn4+, Cr2+, Cr3+, Mn2+, Mn3+, Co2+, Co3+.

If comprising only one element, or one type of element, the element may be any one of the following elements: Lithium (Li), Beryllium (Be), Boron (B), Carbon (C), Nitrogen (N), Oxygen (O), Fluorine (F), Sodium (Na), Magnesium (Mg), Aluminium (Al), Silicon (Si), Phosphorus (P), Sulfur (S), Chlorine (Cl), Potassium (K), Calcium (Ca), Scandium (Sc), Titanium (Ti), Vanadium (V), Chromium (Cr), Manganese (Mn), Iron (Fe), Cobalt (Co), Nickel (Ni), Copper (Cu), Zinc (Zn), Gallium (Ga), Germanium (Ge), Arsenic (As), Selenium (Se), Bromine (Br), Rubidium (Rb), Strontium (Sr), Yttrium (Y), Zirconium (Zr), Niobium (Nb), Molybdenum (Mo), Technetium (Tc), Ruthenium (Ru), Rhodium (Rh), Palladium (Pd), Silver (Ag), Cadmium (Cd), Indium (In), Tin (Sn), Antimony (Sb), Tellurium (Te), Iodine (I), Caesium (Cs), Barium (Ba), Platinum (Pt), Gold (Au), Mercury (Hg), Thallium (Tl), Lead (Pb), Bismuth (Bi).

Examples of Ligands consisting of only carbon (C) include the following: Fullerenes including graphene and carbon nanotubes, carbon fiber, and pyrene.

Ligands consisting of two elements. If comprising only two elements, or two types of elements, the elements may include any of the following:

Hydrogen (H), Lithium (Li), Beryllium (Be), Boron (B), Carbon (C), Nitrogen (N), Oxygen (O), Fluorine (F), Sodium (Na), Magnesium (Mg), Aluminium (Al), Silicon (Si), Phosphorus (P), Sulfur (S), Chlorine (Cl), Potassium (K), Calcium (Ca), Scandium (Sc), Titanium (Ti), Vanadium (V), Chromium (Cr), Manganese (Mn), Iron (Fe), Cobalt (Co), Nickel (Ni), Copper (Cu), Zinc (Zn), Gallium (Ga), Germanium (Ge), Arsenic (As), Selenium (Se), Bromine (Br), Rubidium (Rb), Strontium (Sr), Yttrium (Y), Zirconium (Zr), Niobium (Nb), Molybdenum (Mo), Technetium (Tc), Ruthenium (Ru), Rhodium (Rh), Palladium (Pd), Silver (Ag), Cadmium (Cd), Indium (In), Tin (Sn), Antimony (Sb), Tellurium (Te), Iodine (I), Caesium (Cs), Barium (Ba), Platinum (Pt), Gold (Au), Mercury (Hg), Thallium (Tl), Lead (Pb), Bismuth (Bi).

Examples of Ligands consisting of only carbon (C) and hydrogen (H) include the following: polyethylene, polypropylene, polystyrene, phenylacetylene, naphthalene, ethylbenzene, phenanthrene, pyrene, decane, benzo(a)pyrene, trans-cyclooctene, anhydrous 1-octyne, meso-1,2-diphenylethylene, 1,2,3,4-tetrahydro-naphthalene, benzo[a]phenanthrene, 1,1-di(phenyl)ethylene, 1,2-benzacenaphthene, 1,2-dihydroacenaphthylene, 1,2-benzanthracene, perylene, 1-iso-propyl-4-methylbenzene, N-dodecane, tert-butyl benzene, 1-methyl-naphthalene, α-n-hexadecene, 1-n-decene, phenylenemethyl-ethylene, trans-2-methyl styrene, ethylmethylbenzene, 2-methyl-naphthalene, 4-methyl-styrene, triphenylemethane, 1-phenyl-1-propyne, 2,2,4-trimethylpentane, 4-methyl phenyl acetylene, hexamethyl-benzene, [3.3.1]nonane, p-mentha-1,8-diene, acetnaphthylene, 1,2,4,5-tetramethyl benzene, 2,6,6-trimethylbicyclo[3.1.1]hept-2-ene, 1,2,4-trimethyl benzene, tricyclo[3.3.1.1{3,7}]decane, butylbenzene, 2,3-benzanthracene, 4-methyl-biphenyl, β-carotene, and derivatives thereof.

Comprising Al and Cl: Aluminium trichloride

Comprising Al and O: Aluminum oxide

Comprising Nb and O: Niobium oxide

Comprising C and F: Polytetrafluoroethylene, pentafluoropropylene, 1,1,4,4,4-pentafluoro-2-butyne, pentafluoroethane.

Comprising C and Cl: 1,1,2,2-tetrachloroethylene, hexachloro-benzene.

Ligands consisting of three elements. If comprising only three elements, or three types of elements, the elements may include any of the following:

Hydrogen (H), Lithium (Li), Beryllium (Be), Boron (B), Carbon (C), Nitrogen (N), Oxygen (O), Fluorine (F), Sodium (Na), Magnesium (Mg), Aluminium (Al), Silicon (Si), Phosphorus (P), Sulfur (S), Chlorine (Cl), Potassium (K), Calcium (Ca), Scandium (Sc), Titanium (Ti), Vanadium (V), Chromium (Cr), Manganese (Mn), Iron (Fe), Cobalt (Co), Nickel (Ni), Copper (Cu), Zinc (Zn), Gallium (Ga), Germanium (Ge), Arsenic (As), Selenium (Se), Bromine (Br), Rubidium (Rb), Strontium (Sr), Yttrium (Y), Zirconium (Zr), Niobium (Nb), Molybdenum (Mo), Technetium (Tc), Ruthenium (Ru), Rhodium (Rh), Palladium (Pd), Silver (Ag), Cadmium (Cd), Indium (In), Tin (Sn), Antimony (Sb), Tellurium (Te), Iodine (I), Caesium (Cs), Barium (Ba), Platinum (Pt), Gold (Au), Mercury (Hg), Thallium (Tl), Lead (Pb), Bismuth (Bi).

Examples of Ligands consisting of three elements include:

Comprising C, H, Cl: Polyvinylchloride

Comprising C, H, O: Poly(vinylalcohol)

Comprising Ag, C, O: Silver carbonate, silver(I) oxalate

Comprising C, H, Cl: 3,3',4,4',5,5'-hexachlorobiphenyl; 1,2,4,5-TeCB; 2,4'-DDT; pentachloroethane; pentachlorobenzene Ligands consisting of four elements. If comprising only four elements, or three types of elements, the elements may include any of the following:

Hydrogen (H), Lithium (Li), Beryllium (Be), Boron (B), Carbon (C), Nitrogen (N), Oxygen (O), Fluorine (F), Sodium (Na), Magnesium (Mg), Aluminium (Al), Silicon (Si), Phosphorus (P), Sulfur (S), Chlorine (Cl), Potassium (K), Calcium (Ca), Scandium (Sc), Titanium (Ti), Vanadium (V), Chromium (Cr), Manganese (Mn), Iron (Fe), Cobalt (Co), Nickel (Ni), Copper (Cu), Zinc (Zn), Gallium (Ga), Germanium (Ge), Arsenic (As), Selenium (Se), Bromine (Br), Rubidium (Rb), Strontium (Sr), Yttrium (Y), Zirconium (Zr), Niobium (Nb), Molybdenum (Mo), Technetium (Tc), Ruthenium (Ru), Rhodium (Rh), Palladium (Pd), Silver (Ag), Cadmium (Cd), Indium (In), Tin (Sn), Antimony (Sb), Tellurium (Te), Iodine (I), Caesium (Cs), Barium (Ba), Platinum (Pt), Gold (Au), Mercury (Hg), Thallium (Tl), Lead (Pb), Bismuth (Bi).

Ligands consisting of four elements include:

Comprising C, H, Cl, O: 1,2,3,6,7,8-hexachlorooxanthrene; 4,4'-dichloro-benzophenone; Dieldrite; α,α-diphenylacetyl chloride; 1,2,3,4,6,7,8-H7CDF; 1,2,3,4,7,8-hexachlorooxanthrene; 2,3-dichloro-1,4-dihydro-1,4-dioxonaphthalene; 1,2,3,7,8,9-hexachlorooxanthrene.

Ligands consisting of more than four elements. If comprising more than four elements, the elements may include any of the following:

Hydrogen (H), Lithium (Li), Beryllium (Be), Boron (B), Carbon (C), Nitrogen (N), Oxygen (O), Fluorine (F), Sodium (Na), Magnesium (Mg), Aluminium (Al), Silicon (Si), Phosphorus (P), Sulfur (S), Chlorine (Cl), Potassium (K), Calcium (Ca), Scandium (Sc), Titanium (Ti), Vanadium (V), Chromium (Cr), Manganese (Mn), Iron (Fe), Cobalt (Co), Nickel (Ni), Copper (Cu), Zinc (Zn), Gallium (Ga), Germanium (Ge), Arsenic (As), Selenium (Se), Bromine (Br), Rubidium (Rb), Strontium (Sr), Yttrium (Y), Zirconium (Zr), Niobium (Nb), Molybdenum (Mo), Technetium (Tc), Ruthenium (Ru), Rhodium (Rh), Palladium (Pd), Silver (Ag), Cadmium (Cd), Indium (In), Tin (Sn), Antimony (Sb), Tellurium (Te), Iodine (I), Caesium (Cs), Barium (Ba), Platinum (Pt), Gold (Au), Mercury (Hg), Thallium (Tl), Lead (Pb), Bismuth (Bi).

Ligands consisting of more than four elements include:

Comprising N, H, Br, O, C: 1-amino-4-bromo-2-nitrobenzene, 5,7-dibromo-8-hydroxy quinolone; 4-Bromophenyl isothiocyanate; 2-(bromoacetyl)-thiophene The following is a non-comprehensive list of non-covalent ligands, where the SE that the ligand binds to, or may bind to, follows in parenthesis. Some of these ligands bind only weakly to the SEs.

Polystyrene (carbon nanotube)
Riboflavin (carbon nanotube)
DNA (carbon nanotube)
Porphyrine (carbon nanotube)
Pyrenyl (carbon nanotube)
SDBS (carbon nanotube)
Polypeptide with sequence SVSVGMKPSPRPGGGK (hydroxyapatite)
Polypeptide with sequence THRTSTLDYFVI (chlorine-doped polypyrrole)
Benzene (carbon nanotubes)
Naphthalene (carbon nanotubes)
Biphenyl (carbon nanotubes)
Fluorene (carbon nanotubes)
Phenanthrene (carbon nanotubes)
Anthracene (carbon nanotubes)
Pyrene (carbon nanotubes; graphene)
Triphenylene (carbon nanotubes)
P-terphenyl (carbon nanotubes)
Tetraphene (carbon nanotubes)
Pyrenecarboxylic acid (carbon nanotubes)
SDS (carbon nanotubes)
SDSA (carbon nanotubes)
DTAB (carbon nanotubes)
NaDDBS (carbon nanotubes)
Tween-60 (carbon nanotubes)
Tween-80 (carbon nanotubes)
Monostearate (carbon nanotubes)
Monooleate (carbon nanotubes)
PSPEO (carbon nanotubes)
PVP (carbon nanotubes)
Sulfonate (carbon nanotubes)

Combination of Covalent and Non-Covalent Ligands.

Both ligands bind covalently to the structural entities. In a preferred embodiment, both ligands (Ligand1 and Ligand2) bind, or are capable of binding, covalently to their respective structural entities. As an example, a sensor with the structure SE1-Ligand1-Linker-Ligand2-SE2, where SE1 forms the core of the sensor (e.g. is a conductive nanotube), Ligand1 is a covalent bond between SE1 and Ligand1 (e.g. an amide bond), the Linker is a polypeptide consisting of 5 amino acids, Ligand2 is a covalent bond between the Linker and SE2 (e.g. a disulfide bond), and SE2 is an analyte, the concentration of which will be determined through its effect on the conductivity of SE1 upon association of the analyte with Ligand2 and hence indirectly SE1. Preferably, both ligands are covalently bound to SE1 and SE2, respectively, in order to ensure that Ligand2 stays associated with SE1 for a very long time. In another example, the ligands are part of a CMU, which again is part of a composite material. In a preferred embodiment, the additive (SE1; e.g. a metal) and the matrix material (SE2, e.g. a polymer) are covalently linked through a LU comprising two covalent ligands. As a result, the composite material has increased strength because of the covalently linked polymer and metal.

Both ligands bind non-covalently to the structural entities. In a preferred embodiment, both ligands (Ligand1 and Ligand2) bind, or are capable of binding, non-covalently to their respective structural entities. In such cases, the CMU can be prepared in a step-wise modular process, without a need for covalent bond-formation (chemical reactions) to take place. As an example, a sensor comprising a CMU in which Ligand1 and Ligand2 can non-covalently bind SE1 and SE2, respectively, can be made and can be used to measure the concentration of the analyte (SE2), in a modular process where each of the components SE1, LU and SE2 are added at different time points in the process, and where the non-covalent complex SE1-LU-SE2 is spontaneously formed upon mixing of the three components. As an example, one may prepare a nanosensor and employ the nanosensor to measure the concentration of an analyte by going through the following steps: i) Attach a conducting nanotube (SE1) to electrodes; ii) add Ligand1-Linker-Ligand2 to the medium comprising the nanotube (medium can e.g. be a liquid or a gas), iii) add a medium comprising SE2. The conductivity of the nanotubes may change upon binding of the analyte (SE2) to Ligand2, whereby the concentration of the analyte can be deduced.

In another example, an ultra flexible polymer composite material is prepared, by using a LU comprising Ligand1, capable of interacting non-covalently with the repeating unit of the polymer part (SE1) (e.g. polyethylene, where the repeating unit is $C_2H_4$) of the composite material, and Ligand2, capable of interacting non-covalently with the additive (SE2) (e.g. a carbon nanotube).

In a preferred embodiment of the preferred embodiment described immediately above, the polymer part of the composite material makes up 80-99.9% of the weight of the composite material, and the additive makes up 0.001-10% of the weight of the composite material, and the affinity of Ligand1 for the polymer (SE1) is at least 100-fold lower than the affinity of Ligand2 for the additive (SE2), in the context of the composite material. As a result, when stress is applied to the composite material, for example by means of pulling at either end of the composite material, the complex between Ligand1 and the polymer repeat is likely to dissociate, whereas the complex between Ligand2 and additive is likely to withstand the external stress applied, and not dissociate. However, as the polymer makes up the majority of weight of the composite material, whenever Ligand1 dissociates from a polymer repeat it is likely to associate with a neighbouring polymer repeat soon thereafter. Thus, upon application of stress to this composite material, Ligand1-polymer complexes will associate/dissociate many times, while the Ligand2-additive interaction is likely to remain. This will result in a highly flexible material that is capable of significant extension and/or deformation without breaking. Moreover, the use of carbon nanotubes as additive will benefit from a non-covalent interaction between carbon nanotube and Ligand2, as covalent bonds to the carbon nanotube structure would decrease the intrinsic strength of the carbon nanotube.

One Ligand binds non-covalently to one structural entity, and one Ligand binds covalently to another structural entity. In a preferred embodiment, one of the ligands of the LU is capable of non-covalent binding, or is non-covalently bound, to SE1 or SE2, and the other ligand of the LU is capable of covalent binding, or is covalently bound, to the other structural entity. An example of CMUs where one ligand-SE interaction is preferably covalent and the other ligand-SE interaction is non-covalent, is a composite material where covalent modification of SE1 is not preferred because it modifies the characteristics of SE1 in a non-preferred way, but where covalent modification of SE2 is preferable. Such an example could involve cases where SE1 is a fullerene (e.g. CNT, graphene) or a nanotube, where covalent modification decreases the strength or conductivity of SE1, and where SE2 is a polymer (e.g. epoxy, polycarbonate), a ceramic or a metal. Another example of CMUs where one ligand-SE interaction is preferably covalent and the other ligand-SE interaction is non-covalent, is a composite material where the Ligand1-SE1 bond should have a long life-time, but where the Ligand2-SE2 interaction should be highly reversible and have fast kinetics, in order to achieve both high strength and high flexibility. For example, if the additive (SE1; representing about 1% of the total weight of the composite material) is covalently linked to the Ligand, and the matrix material (SE2, e.g. a polymer such as nylon; representing about 99% of the total weight of the composite material) is non-covalently linked to Ligand 2. Then, upon externally applied stress the covalent bond between SE1 and Ligand1 ensures that SE1 and Ligand1 stay associated, whereas the non-covalent (and therefore weaker) bond between SE2 and Ligand2 may break. However, as the SE2 make up about 99% of the composite material, a strong likelihood exists that Ligand2 will associate with another SE2 in the composite material following the deformation of the composite material, to lock the composite material in its new form (e.g. extended or bent). If a gas is introduced into the composite material, during or after polymerization of the matrix material, this gas may help to reform the composite material after deformation has occurred because of the external stress applied. Thus, the non-covalent interaction between SE2 and Ligand2, combined with the material's content of gas, will provide the material with both flexibility and elasticity.

It is clear from the above examples of covalently and non-covalently bound structural entities that the choice of covalent versus non-covalent binding of the ligand to the structural entity depends on the actual application, where often covalent binding of ligand to SE will favor one set of characteristics (e.g. life time of material) of the final CMU or composition of CMUs, whereas the non-covalent binding of ligand to SE will often favor another set of characteristics (e.g. flexibility).

Therefore, the choice between covalent and non-covalent interaction for each of the two ligand-SE interactions in a CMU will affect the resulting characteristics of the CMU.

Subligands.

Ligand1 and Ligand2 may each comprise one or more subligands held together by one or more sub-linkers. As an example, Ligand1 may comprise two subligands, each of which is capable of binding SE1, and which are linked by a sub-linker. The subligands of Ligand1 or Ligand2 may be linked in series or in parallel (see FIG. 2). In this case the CMU will have the following structure:

[SE1]-[(SubLigand1x)-(SubLinker1)-(SubLigand1y)]-[LinkerL]-[(SubLigand2x)-(SubLinker2)-(SubLigand2y)]-[SE2]

In the more general structures of the CMU (where the CMU comprises a number l of SEs, a number m of Ligands and a number n of Linkers, and where a Ligand comprises x Subligands, and where a Linker comprises y Sublinkers, the structures of the CMU may look as follows:

((SE)l)-((((Subligand)x)m)-(((Sublinker)y)n))

or (SE-((Subligand)x)-((Sublinker)y))n (in which x, y, n and m are integers of 1 or more)

Figure 6:
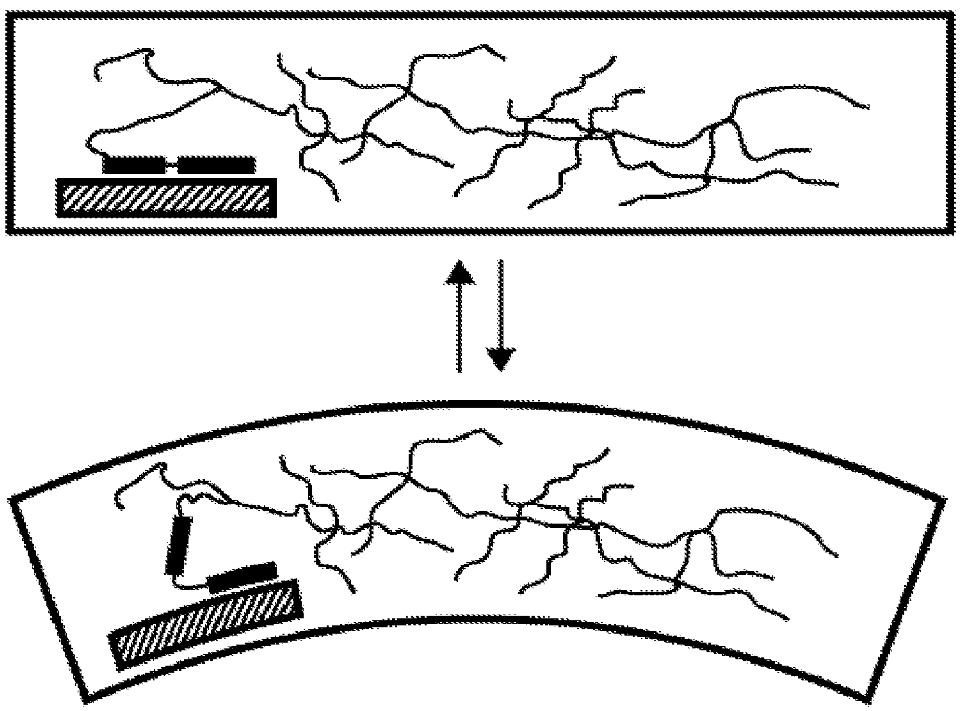
FIG. 6 shows a self-healing composite material.

The subligands may be of varying affinities. In a preferred embodiment, the subligands of Ligand1 are arranged in series (See FIG. 2, A), and the SubLigand closest to LinkerL (in the above CMU structure, SubLigand1y) is of weak affinity, and therefore easy to dissociate from SE1, and the SubLigand farthest away from LinkerL (in the above CMU structure, SubLigand1x) is of high affinity and therefore difficult to dissociate from SE1. Ligand2 is covalently attached to SE2. In composite materials where SE1 is a structural entity of high strength (e.g. a carbon nanotube) and SE2 is a polymer such as epoxy or poplypropylene, the composite material made up of CMUs as described immediately above will be very flexible (because the SubLigand1y will dissociate from SE1 upon applying relatively weak forces to the composite material), but will also be of high strength (because the Subligand1x will only dissociate from SE1 upon applying relatively strong forces to the composite material). By using SubLigands of varying affinities, as well as using linkers (Linker L and SubLinker1) of varying lengths, the flexibility and strength of the composite material can be varied. Moreover, CMUs comprising Ligands with more than one SubLigand will add self-healing properties to a composite material in which they are used. Thus, if during applied stress to the composite material one of the SubLigand-SE interactions is interrupted, the other SubLigand may stay associated with the SE, and upon removal of the applied stress, the interrupted SubLigand-SE interaction may re-form, thereby re-establishing the shape of the composite material. (See FIG. 6).

The subligands may also be arranged in parallel (See FIG. 2, B), in which case the corresponding composite material will be less flexible but often have higher strength.

Covalent Ligands, and Reactions that Form Covalent Bonds.

Ligands capable of covalently linking SEs with the linker may comprise functional groups such as OH, COOH, NH2, SH and CO, but can be any atom or molecule capable of forming a chemical bond with another atom or molecule. Below are shown example pairs of functional groups on the SE, functional groups on the linker, and the bond formed upon reaction of the functional group on the SE with the functional group of the linker:

| Functional group of SE | Functional group of Linker | Covalent bond formed |
|---|---|---|
| NH2 | COOH | CONH (amide bond) |
| SH | SH | SS (disulfide bond) |
| CO (aldehyde) | NH2 | CNH (secondary amine bond) |

Covalent bond-forming chemical reactions suitable for forming the covalent bond (the covalent ligand) that links the linker and SE, include any one or more of the following reactions:

Chemical reactions for synthesizing polymers, small molecules, or other chemical compounds such as those listed in March's Advanced Organic Chemistry, Organic Reactions, Organic Syntheses, organic text books, journals such as Journal of the American Chemical Society, Journal of Organic Chemistry, Tetrahedron, etc., and Carruther's Some Modern Methods of Organic Chemistry can be used. For example, substitution reactions, carbon-carbon bond forming reactions, elimination reactions, acylation reactions, and addition reactions. An illustrative but not exhaustive list of aliphatic nucleophilic substitution reactions useful in the present invention includes, for example, SN2 reactions, SNI reactions, SNi reactions, allylic rearrangements, nucleophilic substitution at an aliphatic trigonal carbon, and nucleophilic substitution at a vinylic carbon.

Specific aliphatic nucleophilic substitution reactions with oxygen nucleophiles include, for example, hydrolysis of alkyl halides, hydrolysis of gen-dihalides, hydrolysis of 1,1,1-trihalides, hydrolysis of alkyl esters or inorganic acids, hydrolysis of diazo ketones, hydrolysis of acetal and enol ethers, hydrolysis of epoxides, hydrolysis of acyl halides, hydrolysis of anhydrides, hydrolysis of carboxylic esters, hydrolysis of amides, alkylation with alkyl halides (Williamson Reaction), epoxide formation, alkylation with inorganic esters, alkylation with diazo compounds, dehydration of alcohols, transetherification, alcoholysis of epoxides, alkylation with onium salts, hydroxylation of silanes, alcoholysis of acyl halides, alcoholysis of anhydrides, esterfication of carboxylic acids, alcoholysis of carboxylic esters (transesterfication), alcoholysis of amides, alkylation of carboxylic acid salts, cleavage of ether with acetic anhydride, alkylation of carboxylic acids with diazo compounds, acylation of carboxylic acids with acyl halides; acylation of carlpoxylic acids with carboxylic acids, formation of oxonium salts, preparation of peroxides arid hydroperoxides, preparation of inorganic esters (e.g., nitrites, nitrates, sulfonates), preparation of alcohols from amines, arid preparation of mixed organic-inorganic anhydrides.

Specific aliphatic nucleophilic substitution reactions with sulfur nucleophiles, which tend to be better nucleophiles than their oxygen analogs, include, for example, attack by SH at an alkyl carbon to form thiols, attack by S at an alkyl carbon to form thioethers, attack by SH or SR at an acyl carbon, formation of disulfides, formation of Bunte salts, alkylation of sulfuric acid salts, and formation of alkyl thiocyanates.

Aliphatic nucleophilic substitution reactions with nitrogen nucleophiles include, for example, alkylation of amines, N-arylation of amines, replacement of a hydroxy by an amino group, transamination, transamidation, alkylation of amines with diazo compounds, animation of epoxides, amination of oxetanes, amination of aziridines, amination of alkanes, formation of isocyanides, acylation of amines by acyl halides, acylation of amines by anhydrides, acylation of amines by carboxylic acids, acylation of amines by carboxylic esters, acylation of amines by amides, acylation of amines by other acid derivatives, N-alkylation or N-arylation of amides and imides, N-acylation of amides and imides, formation of aziridines from epoxides, formation of nitro compounds, formation of azides, formation of isocyanates and isothiocyanates, and formation of azoxy compounds. Aliphatic nucleophilic substitution reactions with halogen nucleophiles include, for example, attack at an alkyl carbon, halide exchange, formation of alkyl halides from esters of sulfuric and sulfonic acids, formation of alkyl halides from alcohols, formation of alkyl halides from ethers, formation of halohydrins from epoxides, cleavage of carboxylic esters with lithium iodide, conversion of diazo ketones to alpha-halo ketones, conversion of amines to halides, conversion of tertiary amines to cyanamides (the von Braun reaction), formation of acyl halides from carboxylic acids, and formation of acyl halides from acid derivatives.

Aliphatic nucleophilic substitution reactions using hydrogen as a nucleophile include, for example, reduction of alkyl halides, reduction of tosylates, other sulfonates, and similar compounds, hydrogenolysis of alcohols, hydrogenolysis of esters (Barton-McCombie reaction), hydrogenolysis of nitriles, replacement of alkoxyl by hydrogen, reduction of epoxides, reductive cleavage of carboxylic esters, reduction of a CN bond, desulfurization, reduction of acyl halides, reduction of carboxylic acids, esters, and anhydrides to aldehydes, and reduction of amides to aldehydes.

Aliphatic nucleophilic substitution reactions using carbon nucleophiles include, for example, coupling with silanes, coupling of alkyl halides (the Wurtz reaction), the reaction of alkyl halides and sulfonate esters with Group I (I A), and II (II A) organometallic reagents, reaction of alkyl halides and sulfonate esters with organocuprates, reaction of alkyl halides and sulfonate esters with other organometallic reagents; allylic and propargylic coupling with a halide substrate, coupling of organometallic reagents with esters of sulfuric and sulfonic acids, sulfoxides, and sulfones, coupling involving alcohols, coupling of organometallic reagents with carboxylic esters, coupling of organometallic reagents with compounds containing an esther linkage, reaction of organometallic reagents with epoxides, reaction of organometallics with aziridine, alkylation at a carbon bearing an active hydrogen, alkylation of ketones, nitriles, and carboxylic esters, alkylation of carboxylic acid salts, alkylation at a position alpha to a heteroatom (alkylation of 1,3-dithianes), alkylation of dihydro-1,3-oxazine (the Meyers synthesis of aldehydes, ketones, and carboxylic acids), alkylation with trialkylboranes, alkylation at an alkynyl carbon, preparation of nitriles, direct conversion of alkyl halides to aldehydes and ketones, conversion of alkyl halides, alcohols, or alkanes to carboxylic acids and their derivatives, the conversion of acyl halides to ketones with organometallic compounds, the conversion of anhydrides, carboxylic esters, or amides to ketones with organometallic compounds, the coupling of acyl halides, acylation at a carbon bearing an active hydrogen, acylation of carboxylic esters by carboxylic esters (the Claisen and Dieckmann condensation), acylation of ketones and nitriles with carboxylic esters, acylation of carboxylic acid salts, preparation of acyl cyanides, and preparation of diazo ketones, ketonic decarboxylation.

Reactions which involve nucleophilic attack at a sulfonyl sulfur atom may also be used in the present invention and include, for example, hydrolysis of sulfonic acid derivatives (attack by OH), formation of sulfonic esters (attack by OR), formation of sulfonamides (attack by nitrogen), formation of sulfonyl halides (attack by halides), reduction of sulfonyl chlorides (attack by hydrogen), and preparation of sulfones (attack by carbon).

Aromatic electrophilic substitution reactions may also be used. Hydrogen exchange reactions are examples of aromatic electrophilic substitution reactions that use hydrogen as the electrophile. Aromatic electrophilic substitution, reactions which use nitrogen electrophiles include, for example, nitration and nitro-dehydrogenation, nitrosation of nitroso-de-hydrogenation, diazonium coupling, direct introduction of the diazonium group, and amination or amino-dehydrogenation. Reactions of this type with sulfur electrophiles include, for example, sulfonation, sulfo-dehydrogenation, halosulfonation, halosulfo-dehydrogenation, sulfurization, and sulfonylation. Reactions using halogen electrophiles include, for example, halogenation, and halo-dehydrogenation. Aromatic electrophilic substitution reactions with carbon electrophiles include, for example, Friedel-Crafts alkylation, alkylation, alkyl-dehydrogenation, Friedel-Crafts arylation (the Scholl reaction), Friedel-Crafts acylation, formylation with disubstituted formamides, formylation with zinc cyanide and HCl (the Gatterman reaction), formylation with chloroform (the Reimer-Tiemami reaction), other formylations, formyl-dehydrogenation, carboxylation with carbonyl halides, carboxylation with carbon dioxide (the Kolbe-Schmitt reaction), amidation with isocyanates, N-alkylcarbamoyl-dehydrogenation, hydroxyalkylation, hydroxyalkyl-dehydrogenation, cyclodehydration of aldehydes and ketones, haloalkylation, halo-dehydrogenation, aminoalkylation, amidoalkylation, dialkylaminoalkylation, dialkylamino-dehydrogenation, thioalkylation, acylation with nitriles (the Hoesch reaction), cyanation, and cyano-de hydrogenation. Reactions using oxygen electrophiles include, for example, hydroxylation and hydroxy-dehydrogenation.

Rearrangement reactions include, for example, the Fries rearrangement, migration of a nitro group, migration of a nitroso group (the Fischer-Hepp Rearrangement), migration of an arylazo group, migration of a halogen (the Orton rearrangement), migration of an alkyl group, etc. Other reaction on an aromatic ring include the reversal of a Friedel-Crafts alkylation, decarboxylation of aromatic aldehydes, decarboxylation of aromatic acids, the Jacobsen reaction, deoxygenation, desulfonation, hydro-desulfonation, dehalogenation, hydro-dehalogenation, and hydrolysis of organometallic compounds.

Aliphatic electrophilic substitution reactions are also useful. Reactions using the SEI, SE2 (front), SE2 (back), SEi, addition-elimination, and cyclic mechanisms can be used in the present invention. Reactions of this type with hydrogen as the leaving group include, for example, hydrogen exchange (deuterio-de-hydrogenation, deuteriation), migration of a double bond, and keto-enol tautomerization. Reactions with halogen electrophiles include, for example, halogenation of aldehydes and ketones, halogenation of carboxylic acids and acyl halides, and halogenation of sulfoxides and sulfones. Reactions with nitrogen electrophiles include, for example, aliphatic diazonium coupling, nitrosation at a carbon bearing an active hydrogen, direct formation of diazo compounds, conversion of amides to alpha-azido amides, direct amination at an activated position, and insertion by nitrenes. Reactions with sulfur or selenium electrophiles include, for example, sulfenylation, sulfonation, and selenylation of ketones and carboxylic esters. Reactions with carbon electrophiles include, for example, acylation at an aliphatic carbon, conversion of aldehydes to beta-keto esters or ketones, cyanation, cyano-de-hydrogenation, alkylation of alkanes, the Stork enamine reaction, and insertion by carbenes. Reactions with metal electrophiles include, for example, metalation with organometallic compounds, metalation with metals and strong bases, and conversion of enolates to silyl enol ethers. Aliphatic electrophilic substitution reactions with metals as leaving groups include, for example, replacement of metals by hydrogen, reactions between organometallic reagents and oxygen, reactions between organometallic reagents and peroxides, oxidation of trialkylboranes to borates, conversion of Grignard reagents to sulfur compounds, halo-demetalation, the conversion of organometallic compounds to amines, the conversion of organometallic compounds to ketones, aldehydes, carboxylic esters and amides, cyano-de-metalation, transmetalation with a metal, transmetalation with a metal halide, transmetalation with an organometallic compound, reduction of alkyl halides, metallo-de-halogenation, replacement of a halogen by a metal from an organometallic compound, decarboxylation of aliphatic acids, cleavage of alkoxides, replacement of a carboxyl group by an acyl group, basic cleavage of beta-keto esters and beta-diketones, haloform reaction, cleavage of non-enolizable ketones, the Haller-Bauer reaction, cleavage of alkanes, decyanation, and hydro-de-cyanation. Electrophilic substitution reactions at nitrogen include, for example, diazotization, conversion of hydrazines to azides, N-nitrosation, N-nitroso-de-hydrogenation, conversion of amines to azo compounds, N-halogenation, N-halo-de-hydrogenation, reactions of amines with carbon monoxide, and reactions of amines with carbon dioxide.

Aromatic nucleophilic substitution reactions may also be used in the present invention. Reactions proceeding via the SNAr mechanism, the SNI mechanism, the benzyne mechanism, the SRN1 mechanism, or other mechanism, for example, can be used. Aromatic nucleophilic substitution reactions with oxygen nucleophiles include, for example, hydroxy-de-halogenation, alkali fusion of sulfonate salts, and replacement of OR or OAr. Reactions with sulfur nucleophiles include, for example, replacement by SH or SR. Reactions using nitrogen nucleophiles include, for example, replacement by NH2, NHR, or NR2, and replacement of a hydroxy group by an amino group: Reactions with halogen nucleophiles include, for example, the introduction halogens. Aromatic nucleophilic substitution reactions with hydrogen as the nucleophile include, for example, reduction of phenols and phenolic esters and ethers, and reduction of halides and nitro compounds. Reactions with carbon nucleophiles include, for example, the Rosenmund-von Braun reaction, coupling of organometallic compounds with aryl halides, ethers, and carboxylic esters, arylation at a carbon containing an active hydrogen, conversions of aryl substrates to carboxylic acids, their derivatives, aldehydes, and ketones, and the Ullmann reaction. Reactions with hydrogen as the leaving group include, for example, alkylation, arylation, and amination of nitrogen heterocycles. Reactions with N2+ as the leaving group include, for example, hydroxy-de-diazoniation, replacement by sulfur-containing groups, iodo-de-diazoniation, and the Schiemann reaction. Rearrangement reactions include, for example, the von Richter rearrangement, the Sommelet-Hauser rearrangement, rearrangement of aryl hydroxylamines, and the Smiles rearrangement. Reactions involving free radicals can also be used, although the free radical reactions used in nucleotide-templated chemistry should be carefully chosen to avoid modification or cleavage of the nucleotide template. With that limitation, free radical substitution reactions can be used in the present invention. Particular free radical substitution reactions include, for example, substitution by halogen, halogenation at an alkyl carbon, allylic halogenation, benzylic halogenation, halogenation of aldehydes, hydroxylation at an aliphatic carbon, hydroxylation at an aromatic carbon, oxidation of aldehydes to carboxylic acids, formation of cyclic ethers, formation of hydroperoxides, formation of peroxides, acyloxylation, acyloxy-de-hydrogenation, chlorosulfonation, nitration of alkanes, direct conversion of aldehydes to amides, amidation and amination at an alkyl carbon, simple coupling at a susceptible position, coupling of alkynes, arylation of aromatic compounds by diazonium salts, arylation of activated alkenes by diazonium salts (the Meerwein arylation), arylation and alkylation of alkenes by organopalladium compounds (the Heck reaction), arylation and alkylation of alkenes by vinyltin compounds (the StHIe reaction), alkylation and arylation of aromatic compounds by peroxides, photochemical arylation of aromatic compounds, alkylation, acylation, and carbalkoxylation of nitrogen heterocydes. Particular reactions in which N2+ is the leaving group include, for example, replacement of the diazonium group by hydrogen, replacement of the diazonium group by chlorine or bromine, nitro-de-diazoniation, replacement of the diazonium group by sulfur-containing groups, aryl dimerization with diazonium salts, methylation of diazonium salts, vinylation of diazonium salts, arylation of diazonium salts, and conversion of diazonium salts to aldehydes, ketones, or carboxylic acids. Free radical substitution reactions with metals as leaving groups include, for example, coupling of Grignard reagents, coupling of boranes, and coupling of other organometallic reagents. Reaction with halogen as the leaving group are included. Other free radical substitution reactions with various leaving groups include, for example, desulfurization with Raney Nickel, conversion of sulfides to organolithium compounds, decarboxylase dimerization (the Kolbe reaction), the Hunsdiecker reaction, decarboxylative allylation, and decarbonylation of aldehydes and acyl halides.

Reactions involving additions to carbon-carbon multiple bonds are also used. Any mechanism may be used in the addition reaction including, for example, electrophilic addition, nucleophilic addition, free radical addition, and cyclic mechanisms. Reactions involving additions to conjugated systems can also be used. Addition to cyclopropane rings can also be utilized. Particular reactions include, for example, isomerization, addition of hydrogen halides, hydration of double bonds, hydration of triple bonds, addition of alcohols, addition of carboxylic acids, addition of H2S and thiols, addition of ammonia and amines, addition of amides, addition of hydrazoic acid, hydrogenation of double and triple bonds, other reduction of double and triple bonds, reduction of the double and triple bonds of conjugated systems, hydrogenation of aromatic rings, reductive cleavage of cyclopropanes, hydroboration, other hydrometalations, addition of alkanes, addition of alkenes and/or alkynes to alkenes and/or alkynes (e.g., pi-cation cyclization reactions, hydro-alkenyl-addition), ene reactions, the Michael reaction, addition of organometallics to double and triple bonds not conjugated to carbonyls, the addition of two alkyl groups to an alkyne, 1,4-addition of organometallic compounds to activated double bonds, addition of boranes to activated double bonds, addition of tin and mercury hydrides to activated double bonds, acylation of activated double bonds and of triple bonds, addition of alcohols, amines, carboxylic esters, aldehydes, etc., carbonylation of double and triple bonds, hydrocarboxylation, hydroformylation, addition of aldehydes, addition of HCN, addition of silanes, radical addition, radical cydization, halogenation of double and triple bonds (addition of halogen, halogen), halolactonization, halolactamization, addition of hypohalous acids and hypohalites (addition of halogen, oxygen), addition of sulfur compounds (addition of halogen, sulfur), addition of halogen and an amino group (addition of halogen, nitrogen), addition of NOX and NO2X (addition of halogen, nitrogen), addition of XN3 (addition of halogen, nitrogen), addition of alkyl halides (addition of halogen, carbon), addition of acyl halides (addition of halogen, carbon), hydroxylation (addition of oxygen, oxygen) (e.g., asymmetric dihydroxylation reaction with OSO4), dihydroxylation of aromatic rings, epoxidation (addition of oxygen, oxygen) (e.g., Sharpless asymmetric epoxidation), photooxidation of dienes (addition of oxygen, oxygen), hydroxysulfenylation (addition of oxygen, sulfur), oxyamination (addition of oxygen, nitrogen), diamination (addition of nitrogen, nitrogen), formation of aziridines (addition of nitrogen), aminosulferiylation (addition of nitrogen, sulfur), acylacyloxylation and acylamidation (addition of oxygen, carbon or nitrogen, carbon), 1,3-dipolar addition; (addition of oxygen, nitrogen, carbon), Diels-Alder reaction, heteroatom Diels-Alder reaction, all carbon 3+2 cycloadditions, dimerization of alkenes, the addition of carbenes and carbenoids to double and triple bonds, trimerization and tetramerization of alkynes, and other cycloaddition reactions.

In addition to reactions involving additions to carbon-carbon multiple bonds, addition reactions to carbon-hetero multiple bonds can be used in nucleotide-templated chemistry. Exemplary reactions include, for example, the addition of water to aldehydes and ketones (formation of hydrates), hydrolysis of carbon-nitrogen double bond, hydrolysis of aliphatic nitro compounds, hydrolysis of nitriles, addition of alcohols and thiols to aldehydes and ketones, reductive alkylation of alcohols, addition of alcohols to isocyanates, alcoholysis of nitriles, formation of xanthates, addition of H2S and thiols to carbonyl compounds, formation of bisulfite addition products, addition of amines to aldehydes and ketones, addition of amides to aldehydes, reductive alkylation of ammonia or amines, the Mannich reaction, the addition of amines to isocyanates, addition of ammonia or amines to nitriles, addition of amines to carbon disulfide and carbon dioxide, addition of hydrazine derivative to carbonyl compounds, formation of oximes, conversion of aldehydes to nitriles, formation of gem-dihalides from aldehydes and ketones, reduction of aldehydes and ketones to alcohols, reduction of the carbon-nitrogen double bond, reduction of nitriles to amines, reduction of nitriles to aldehydes, addition of Grignard reagents and organolithium reagents to aldehydes and ketones, addition of other organometallics to aldehydes and ketones, addition of trialkylallylsilanes to aldehydes and ketones, addition of conjugated alkenes to aldehydes (the Baylis-Billmah reaction), the Reformatsky reaction, the conversion of carboxylic acid salts to ketones with organometallic compounds, the addition of Grignard reagents to acid derivatives, the addition of Organometallic compounds to CO2 and CS2, addition of organometallic compounds to C=IM compounds, addition of carbenes and diazoalkanbs to C═N compounds, addition of Grignard reagents to nitriles and isocyanates, the Aldol reaction, Mukaiyama Aldol and related reactions, Aldol-type reactions between carboxylic esters or amides and aldehydes or ketones, the Knoevenagel reaction (e.g., the Nef reaction, the Favorskii reaction), the Peterson alkenylation reaction, the addition of active hydrogen compounds to CO2 and CS2, the Perkin reaction, Darzens glycidic ester condensation, the Tollens reaction, the Wittig reaction, the Tebbe alkenylation, the Petasis alkenylation, alternative alkenylations, the Thorpe reaction, the Thorpe-Ziegler reaction, addition of silanes, formation of cyanohydrins, addition of HCN to C═N and C—N bonds, the Prins reaction, the benzoin condensation, addition of radicals to C═O, C═S, C═N compounds, the Ritter reaction, acylation of aldehydes and ketones, addition of aldehydes to aldehydes, the addition of isocyanates to isocyanates (formation of carbodiimides), the conversion of carboxylic acid salts to nitriles, the formation of epoxides from aldehydes and ketones, the formation of episulfides and episulfones, the formation of beta-lactones and oxetanes (e.g., the Paterno-Buchi reaction), the formation of beta-lactams, etc. Reactions involving addition to isocyanides include the addition of water to isocyanides, the Passerini reaction, the Ug reaction, and the formation of metalated aldimines.

Elimination reactions, including alpha, beta, and gamma eliminations, as well as extrusion reactions, can be performed using nucleotide-templated chemistry, although the strength of the reagents and conditions employed should be considered. Preferred elimination reactions include reactions that go by E1, E2, EIcB, or E2C mechanisms. Exemplary reactions include, for example, reactions in which hydrogen is removed from one side (e.g., dehydration of alcohols, cleavage of ethers to alkenes, the Chugaev reaction, ester decomposition, cleavage of quarternary ammonium hydroxides, cleavage of quaternary ammonium salts with strong bases, cleavage of amine oxides, pyrolysis of keto-ylids, decomposition of toluene-p-sulfonylhydrazones, cleavage of sulfoxides, cleavage of selenoxides, cleavage of sulfornes, dehydrogalogenation of alkyl halides, dehydrohalogenation of acyl halides, dehydrohalogenation of sulfonyl halides, elimination of boranes, conversion of alkenes to alkynes, decarbonylation of acyl halides), reactions in which neither leaving atom is hydrogen (e.g., deoxygenation of vicinal diols, cleavage of cyclic thionocarbonates, conversion of epoxides to episulfides and alkenes, the Ramberg-Backlund reaction, conversion of aziridines to alkenes, dehalogenation of vicinal dihalides, dehalogenation of alpha-halo acyl halides, and elimination of a halogen and a hetero group), fragmentation reactions (i.e., reactions in which carbon is the positive leaving group or the electrofuge, such as, for example, fragmentation of gamma-amino and gamma-hydroxy halides, fragmentation of 1,3-diols, decarboxylation of beta-hydroxy carboxylic acids, decarboxylation of (3-lactones, fragmentation of alpha-beta-epoxy hydrazones, elimination of CO from bridged bicydic compounds, and elimination Of CO2 from bridged bicydic compounds), reactions in which C═N or C═N bonds are formed (e.g., dehydration of aldoximes or similar compounds, conversion of ketoximes to nitriles, dehydration of unsubstituted amides, and conversion of l\l-alkylformamides to isocyanides), reactions in which C═O bonds are formed (e.g., pyrolysis of beta-hydroxy alkenes), and reactions in which N═N bonds are formed (e.g., eliminations to give diazoalkenes). Extrusion reactions include, for example, extrusion of N2 from pyrazolines, extrusion of N2 from pyrazoles, extrusion of N2 from triazolines, extrusion of CO, extrusion Of CO2, extrusion Of SO2, the Story synthesis, and alkene synthesis by twofold extrusion.

Rearrangements, including, for example, nucleophilic rearrangements, electrophilic rearrangements, prototropic rearrangements, and free-radical rearrangements, can also be performed. Both 1,2 rearrangements and non-1,2 rearrangements can be performed. Exemplary reactions include, for example, carbon-to-carbon migrations of R, H, and Ar (e.g., Wagner-Meerwein and related reactions, the Pinacol rearrangement, ring expansion reactions, ring contraction reactions, acid-catalyzed rearrangements of aldehydes and ketones, the dienone-phenol rearrangement, the Favorskii rearrangement, the Arndt-Eistert synthesis, homologation of aldehydes, and homologation of ketones), carbon-to-carbon migrations of other groups (e.g., migrations of halogen, hydroxyl, amino, etc.; migration of boron; and the Neber rearrangement), carbon-to-nitrogen migrations of R and Ar (e.g., the Hofmann rearrangement, the Curtius rearrangement, the Lossen rearrangement, the Schmidt reaction, the Beckman rearrangement, the Stieglits rearrangement, and related rearrangements), carbon-to-oxygen migrations of R and Ar (e.g., the Baeyer-Villiger rearrangement and rearrangement of hydroperoxides), nitrogen-to-carbon, oxygen-to-carbon, and sulfur-to-carbon migration (e.g., the Stevens rearrangement, and the Wittig rearrangement), boron-to-carbon migrations (e.g., conversion of boranes to alcohols (primary or otherwise), conversion of boranes to aldehydes, conversion of boranes to carboxylic acids, conversion of vinylic boranes to alkenes, formation of alkynes from boranes and acetylides, formation of alkenes from boranes and acetylides, and formation of ketones from boranes and acetylides), electrocyclic rearrangements (e.g., of cydobutenes and 1,3-cyclohexadienes, or conversion of stilbenes to phenanthrenes), sigmatropic rearrangements (e.g., (1,j) sigmatropic migrations of hydrogen, (Ij) sigmatropic migrations of carbon, conversion of vinylcydopropanes to cyclopentenes, the Cope rearrangement, the Claisen rearrangement, the Fischer indole synthesis, (2,3) sigmatropic rearrangements, and the benzidine rearrangement), other cyclic rearrangements (e.g., metathesis of alkenes, the di-n-methane and related rearrangements, and the Hofmann-Loffler and related reactions), and non-cyclic rearrangements (e.g., hydride shifts, the Chapman rearrangement, the Wallach rearrangement, and dybtropic rearrangements).

Oxidative and reductive reactions may also be performed. Exemplary reactions may involve, for example, direct electron transfer, hydride transfer, hydrogen-atom transfer, formation of ester intermediates, displacement mechanisms, or addition-elimination mechanisms. Exemplary oxidations include, for example, eliminations of hydrogen (e.g., aromatization of six-membered rings, dehydrogenations yielding carbon-carbon double bonds, oxidation or dehydrogenation of alcohols to aldehydes and ketones, oxidation of phenols and aromatic amines to quinones, oxidative cleavage of ketones, oxidative cleavage of aldehydes, oxidative cleavage of alcohols, ozonolysis, oxidative cleavage of double bonds and aromatic rings, oxidation of aromatic side chains, oxidative decarboxylation, and bisdecarboxylation), reactions involving replacement of hydrogen by oxygen (e.g., oxidation of methylene to carbonyl, oxidation of methylene to OH, CO2R, or OR, oxidation of arylmethanes, oxidation of ethers to carboxylic esters and related reactions, oxidation of aromatic hydrocarbons to quinones, oxidation of amines or nitro compounds to aldehydes, ketones, or dihalides, oxidation of primary alcohols to carboxylic acids or carboxylic esters, oxidation of alkenes to aldehydes or ketones, oxidation of amines to nitroso compounds and hydroxylamines, oxidation of primary amines, oximes, azides, isocyanates, or nitroso compounds, to nitro compounds, oxidation of thiols and other sulfur compounds to sulfonic acids), reactions in which oxygen is added to the subtrate (e.g., oxidation of alkynes to alpha-diketones, oxidation of tertiary amines to amine oxides, oxidation of thioesters to sulfoxides and sulfones, and oxidation of carboxylic acids to peroxy acids, and oxidative coupling reactions (e.g., coupling involving carbanoins, dimerization of silyl enol ethers or of lithium enolates, and oxidation of thiols to disulfides). Exemplary reductive reactions include, for example, reactions involving replacement of oxygen by hydrogen {e.g., reduction of carbonyl to methylene in aldehydes and ketones, reduction of carboxylic acids to alcohols, reduction of amides to amines, reduction of carboxylic esters to ethers, reduction of cyclic anhydrides to lactones and acid derivatives to alcohols, reduction of carboxylic esters to alcohols, reduction of carboxylic acids and esters to alkanes, complete reduction of epoxides, reduction of nitro compounds to amines, reduction of nitro compounds to hydroxylamines, reduction of nitroso compounds and hydroxylamines to amines, reduction of oximes to primary amines or aziridines, reduction of azides to primary amines, reduction of nitrogen compounds, and reduction of sulfonyl halides and sulfonic acids to thiols), removal of oxygen from the substrate {e.g., reduction of amine oxides and azoxy compounds, reduction of sulfoxides and sulfones, reduction of hydroperoxides and peroxides, and reduction of aliphatic nitro compounds to oximes or nitrites), reductions that include cleavage {e.g., de-alkylation of amines and amides, reduction of azo, azoxy, and hydrazo compounds to amines, and reduction of disulfides to thiols), reductive coupling reactions {e.g., bimolecular reduction of aldehydes and ketones to 1,2-diols, bimolecular reduction of aldehydes or ketones to alkenes, acyloin ester condensation, reduction of nitro to azoxy compounds, and reduction of nitro to azo compounds), and. reductions in which an organic substrate is both oxidized and reduced {e.g., the Cannizzaro reaction, the Tishchenko reaction, the Pummerer rearrangement, and the Willgerodt reaction).

Such covalent bonds, linking two ligands, or linking SE with linker through a covalent ligand, may be chosen from the list comprising; a single bond, such as a single carbon-carbon bond, a carbon-heteroatom single bond, a heteroatom-heteroatom single bond, a double bond, such as a carbon-carbon double bond or a carbon-heteroatom double bond, a heteroatom-heteroatom double, bond, triple bond, such as a carbon-carbon triple bond or a carbon-heteroatom triple bond, a heteroatom-heteroatom triple bond, —CH2-, —C(O)—, —NH—, —O—, —S—, —SO2-, —CH2CH2-, —C(O)CH2-, —CH2C(O)—, —NHCH2-, —CH2NH—, —OCH2-, —CH2O-, —SCH2-, —CH2S—, —SO2CH2-, —CH2SO2-, —NHC(O)—, —C(O)NH—, —NHSO2-, —SO2NH—, —CH2CH2CH2-, —CH2CH2C(O)—, —CH2CH2NH—, —CH2CH2O—, —CH2CH$_2$S—, —CH2CH2SO2-, —CH2C(O)CH2-, —CH2NHCH2-, —CH2OCH2-, —CH2SCH2-, —CH2SO2CH2-, —C(O) CH2CH2-, —NHCH2CH2-, —OCH2CH2-, —SCH2CH2-, —SO2CH2CH2-, —CH2C(O)NH—, —CH2SO2NH—, —CH2NHC(O)—, —CH2NHSO2-, —C(O)NHCH2-, —SO2NHCH2-, —NHC(O)CH2-, —NHSO2CH2-, and —NHC(O)NH—

Linkers.

The linkers (LinkerL, Linker1, Linker2, etc.) may be any kind of chemical entity that links the Ligands and SEs. A linker may consist of just one bond, or a number of covalent and/or non-covalent bonds. A linker may have any length. A longer and more flexible linker will more easily allow the ligands and SEs to interact independently of the linker; however, a short linker connecting two ligands bound to the same SE may result in high synergy in the binding of the two ligands to the same SE—but may also interfere with efficient binding of the two ligands because of linker constraints and/or inaprropriate orientation of the interacting molecules. Thus, in some cases a short linker is preferable; in other cases a long linker is preferable. The linker may thus have a length of 0.1-100,000 nm, such as in the ranges of 0.1-0.4 nm, 0.4-1 nm, 1-2 nm, 2-4 nm, 4-8 nm, 8-15 nm, 15-25 nm, 25-40 nm, 40-100 nm, 100-200 nm, 200-500 nm, 500-1,000 nm, 1,000-10,000 nm, or 10,000-100,000 nm, or larger.

In a preferred embodiment the linker has a length of less than 1 µm, such as less than 100 nm, such as less than 50 nm, such as less than 40 nm, such as less than 30, such as less than 25 nm, such as less than 20 nm, such as less than 15 nm, such as less than 10 nm, such as less than 5 nm, such as less than 2 nm, such as less than 1 nm, such as less than 0.7 nm, such as less than 0.5 nm, such as less than 0.2 nm. Shorter linker lengths will often result in composite materials with higher tensile strength, wherefore it may be desirable to use shorter linkers to obtain higher strength of the composite material. In another preferred embodiment the linker has a length of more than 0.1 nm, such as more than 0.2 nm, such as more than 0.3 nm, such as more than 0.6 nm, such as more than 0.8 nm, such as more than 1 nm, such as more than 2 nm, such as more than 4 nm, such as more than 6 nm, such as more than 8 nm, such as more than 12 nm, such as more than 15 nm, such as more than 20 nm, such as more than 25 nm, such as more than 50 nm, such as more than 80 nm, such as more than 100 nm, such as more than 200 nm, such as more than 500 nm, such as more than 1 µm, such as more than 5 µm. Longer linkers will often lead to composite materials with higher flexibility, wherefore it may be desirable to increase the length of the linker if a higher flexibility is desired.

Shorter linker lengths may result in composite materials with higher tensile strength, and longer linkers may result in increased flexibility of the composite material. Therefore, the appropriate compromise between strength and flexibility of a composite material may be obtained by appropriate choice of linker length. In a preferred embodiment the linker length is between 1 and 10 nm, less preferably between 0.5 nm and 25 nm, as this linker length often is a good compromise between flexibility and strength of the composite material.

A linker may connect two, three, four or more Ligands. Thus, the linker may be linear (connecting two Ligands) or may be branched (connecting three or more Ligands) (see FIG. 7). A Linker Unit (LU) therefore has the general formula:

Linker-Ligand$_n$ where n can be any integer, and therefore, the LU can comprise any number (n) of Ligands.

Example linkers are organic molecules such as consisting of alkanes or alkenes, or polyvinyl, polypropylene, ethylene glycol, and the linkers may consist of just one element (e.g. carbon) or several elements (e.g. C, O, N).

A linker may comprise or consist of any polymer mentioned above or below, or may comprise or consist of any part of any polymer mentioned above or below, such as any number of repeating units of any polymer mentioned above or below, such as e.g. one, two, three, four or more repeating units of any polymer mentioned above or below.

The following is a non-comprehensive list of linkers: alkanes, alkenes, alkynes or combinations thereof (C1, C2, C3, C4, C5, C6, C7, C8, C9, C10, C12, C13, C14, C15, C16, C17, C18, C19, C20, and any other alkane, alkene, alkyne or combinations thereof comprising between 20 and 30 carbon atoms, or between 30 and 40 carbon atoms, or between 40 and 50 carbon atoms, or more than 50 carbon atoms; polyethylene glycol.

Any of the structural entities listed above or below may also be used as a linker.

The linkers may be modified. The modifications may be added to the linker before, after or during synthesis of the composite material unit or composite material. The modification may involve covalent attachment of aromatic or aliphatic rings, charged or polar groups such as NH2, CO, COOH, and COSH.

Ideally the chemical and physical characteristics of the linker should be similar to at least some of the characteristics of the structural entities of the CMU, in order to prepare composite materials where the characteristics of the matrix material and the additive are not significantly perturbed by the presence of the linker. However, under certain circumstances, such as for example when using carbon nanotubes as the additive, using processes and conditions under which e.g. solubility of the carbon nanotubes in the solution or matrix material is low, the linker may due to its solubility characteristics help make the carbon nanotube more soluble, because the linker becomes bound to the carbon nanotube by way of the ligand.

CMUs—Combination of SE1, Ligand1, Linker, Ligand2, and SE2.

A composite material unit (CMU) comprises a first structural entity (SE1), a first Ligand (Ligand1), a Linker, a second Ligand (Ligand2), and a second structural entity (SE2). Preferred CMUs of the present invention include anyone of the following CMUs, here identified as any specific combination of said first structural entity (SE1), first Ligand (Ligand1), Linker, second Ligand (Ligand2), and second structural entity (SE2):

SE1-Ligand1-Linker-Ligand2-SE2 (a CMU)

where SE1 is any specific Structural Entity, or any specific type of Structural Entity, listed above or below;

where Ligand1 is any specific Ligand, or any specific type of Ligand, listed above or below;

where Linker is any specific Linker, or any specific type of Linker, listed above or below;

where Ligand 2 is any specific Ligand, or any specific type of Ligand, listed above or below;

and where SE2 is any specific Structural Entity, or any specific type of Structural Entity, listed above or below.

Methods of Preparing Composite Material Units and Composite Materials.

The individual components of the composite material units (CMU), i.e. the structural entities (SEs), the ligands and the linker(s), may be synthesized before, during or after linking the SE, ligands and linker(s). As an example, the synthetic starting point for CMU synthesis can be the linker (e.g. a C10 alkane), on which is synthesized at both ends the ligand (e.g. at one end, an amine, and e.g. at the other end a vinyl group), whereafter SE1 (a polyamide) is synthesized by the iterated reaction with amino acids, and SE2 is synthesized by the polymerization of vinyl groups out from the initial vinyl group. At the other extreme, the SEs, linker(s) and ligands are first synthesized individually, and then attached to each other to form the CMU.

The following three processes for the synthesis of reinforced polymers (composite materials comprising a polymer component and an additive) are examples of processes where the individual components of the CMU are prepared before, during or after linking its SEs, linker(s) and ligands:

Solution mixing: The additive (e.g. a nanotube dispersion) is mixed with a solution of preformed polymer (e.g. polyvinyl alcohol, polystyrene, polycarbonate, or poly(methyl methacrylate)) and ligands and linker(s). CMUs will now form in the solution, whereafter the solvents are evaporated, leaving the reinforced polymer as a solid material. In this approach, the linker, ligand, polymer, and structural entities (polymer and additive) may associate during incubation in solvent, or may be partly associated prior to their mixing with the other components. As an example, the ligand-linker-ligand moiety may consist of a polymer unit (e.g. vinyl) to which a ligand for the additive has been covalently linked. If this ligand-polymer unit moiety is added to the polymerization mix, some of the resulting polymers will carry ligands for the additive. When the ligand-carrying polymer is mixed with the additive, the ligand will bind the additive, and thus form a CMU. See FIG. 3, B).

Melt processing: This process employs thermoplastic polymers (e.g. high-impact polystyrene, acrylonitrile-butadiene-styrene, polypropylene) that soften and melt when heated. The preformed, thermoplastic polymers are melted and then mixed with ligands, linkers and additive(s). Upon lowering of the temperature, and optionally fibre-spinning, melt-spinning, extrusion or other relevant process, reinforced polymers of desired characteristics are formed. As for solution mixing, the linker, ligand, polymer, and structural entities (polymer and additive) may associate during incubation, or may be partly associated prior to their mixing with the other components. (See FIG. 3, B).

In situ polymerization: In this process, the monomer(s) rather than the polymer(s) are used as starting material, whereafter the polymerization is carried out in situ. Thus, the additive is mixed with the monomer (e.g. epoxy resin), linkers and ligands. As for the two processes described immediately above, the linker and ligands may be preformed as one moiety which is then added to the polymerization mixture. In the example of a reinforced epoxy, one would therefore use an excess of the non-modified epoxy resin, plus a modified epoxy resin which had been coupled to a ligand capable of binding the additive in question. See (FIG. 3, A). Further details of polymer processing can be found in the Examples.

Ligands, linkers and SEs suitable for the present invention include small compact molecules, linear structures, polymers, polypeptides, poly-ureas, polycarbamates, scaffold structures, cyclic structures, natural compound derivatives, alpha-, beta-, gamma-, and omega-peptides, mono-, di- and tri-substituted peptides, L- and D-form peptides, cyclohexane- and cydopentane-backbone modified beta-peptides, vinylogous polypeptides, glycopolypeptides, polyamides, vinylogous sulfonamide peptide, Polysulfonamide conjugated peptide (i.e., having prosthetic groups), Polyesters, Polysaccharides, polycarbamates, polycarbonates, polyureas, poly-peptidylphosphonates, Azatïdes, peptoids (oligo N-substituted glycines), Polyethers, ethoxyformacetal oligomers, poly-thioethers, polyethylene, glycols (PEG), polyethylenes, polydisulfides, polyarylene sulfides, Polynucleotides, PNAs, LNAs, Morpholinos, oligo pyrrolinone, polyoximes, Polyimines, Polyethyleneimine, Polyacetates, Polystyrenes, Polyacetylene, Polyvinyl, Lipids, Phospholipids, Glycolipids, poiycycles, (aliphatic), polycycles (aromatic), polyheterocydes, Proteoglycan, Polysiloxanes, Polyisocyanides, Polyisocyanates, polymethacryiates, Monofunctional, Difunctional, Trifunctional and Oligofunctional open-chain hydrocarbons. Monofunctional, Difunctional, Trifunctional and Oligofunctional Nonaromatic Carbocycles, Monocyclic, Bicyclic, Tricyclic and Polycydic Hydrocarbons, Bridged Polycyclic Hydrocarbones, Monofunctional, Difunctional, Trifunctional and Oligofunctional Nonaromatic, Heterocycles, Monocyclic, Bicydic, Tricyclic and Polycyclic Heterocycles, bridged Polycyclic Heterocycles, Monofunctional, Difunctional, Trifunctional and Oligofunctional Aromatic Carbocycles.

Monocyclic, Bicydic, Tricyclic and Polycyclic Aromatic Carbocycles.

Monofunctional, Difunctional, Trifunctional and Oligofunctional Aromatic Hetero-cycles. Monocyclic, Bicydic, Tricyclic and Polycyclic Heterocycles. Chelates, fullerenes, and any combination of the above.

In preferred embodiments, the structural entity, the ligand, the linker or the composite material comprises one or more entities chosen from the list comprising:

Aluminium antimonide—AlSb, Aluminium arsenide—AlAs, Aluminium chloride—AlCl3, Aluminium fluoride—AlF3, Aluminium hydroxide—Al(OH)3, Aluminium nitrate—Al(NO3)3, Aluminium nitride—AlN, Aluminium oxide—Al2O3, Aluminium phosphide—A1P, Aluminium sulfate—Al2(SO4)3, Ammonia—NH3, Ammonium bicarbonate—NH4HCO3, Ammonium cerium(IV) nitrate—(NH4)2Ce(NO3)6, Ammonium chloride—NH4C1, Ammonium hydroxide—NH4OH, Ammonium nitrate—NH4NO3, Ammonium sulfate—(NH4)2SO4, Ammonium tetrathiocyanatodiamminechromate(III)—NH4[Cr(SCN)4(NH3)$_2$], Antimony hydride—SbH3, Antimony pentachloride—SbC15, Antimony pentafluoride—SbF5, Antimony trioxide—Sb2O3, Arsenic trioxide (Arsenic(III) oxide)—As2O3, Arsenous acid—As(OH)3, Arsine—AsH3, Baking soda—$NaHCO_3$, Barium chloride—BaCl2, Barium chromate—BaCrO4, Barium hydroxide—Ba(OH)2, Barium iodide—BaI2, Barium nitrate—Ba(NO3)2, Barium sulfate—BaSO4, Barium titanate—BaTiO3, Beryllium borohydride—Be(BH4)2, Beryllium bromide—BeBr2, Beryllium carbonate—BeCO3, Beryllium chloride—BeCl2, Beryllium fluoride—BeF2, Beryllium hydride—BeH2, Beryllium hydroxide—Be(OH)2, Beryllium iodide—BeI2, Beryllium nitrate—Be(NO3)2, Beryllium nitride—Be3N2, Beryllium oxide—BeO, Beryllium sulfate—BeSO4, Beryllium sulfite—BeSO3, Beryllium telluride—BeTe, Bismuth(III) oxide—Bi2O3, Bismuth(III) telluride—Bi2Te3, Borane—Diborane: B2H6, Pentaborane: B5H9 Decaborane: B10H14, Borax—Na2B4O7·10H2O, Boric acid—H3BO3, Boron carbide—B4C, Boron nitride—BN, Boron oxide—B2O3, Boron suboxide—B6O, Boron trichloride—BCl3, Boron trifluoride—BF3, Bromine pentafluoride—BrF5, Bromine trifluoride—BrF3, Cacodylic acid—(CH3)2AsO2H, Cadmium arsenide—Cd3As2, Cadmium bromide—CdBr2, Cadmium chloride—CdCl2, Cadmium fluoride—CdF2, Cadmium iodide—CdI2, Cadmium nitrate—Cd(NO3)2, Cadmium selenide—CdSe (of quantum dot fame), Cadmium sulfate—CdSO4, Cadmium telluride—CdTe, Caesium bicarbonate—CsHCO3, Caesium carbonate—Cs2CO3, Caesium chloride—CsCl, Caesium chromate—Cs2CrO4, Caesium fluoride—CsF, Caesium hydride—CsH, Calcium carbide—CaC2, Calcium chlorate—Ca(ClO3)2, Calcium chloride—CaCl2, Calcium chromate—CaCrO4, Calcium cyanamide—CaCN2, Calcium fluoride—CaF2, Calcium hydride—CaH2, Calcium hydroxide—Ca(OH)2, Calcium sulfate (Gypsum)—CaSO4, Carbon dioxide—CO2, Carbon disulfide—CS2, Carbon monoxide—CO, Carbon tetrabromide—CBr4, Carbon tetrachloride—CCl4, Carbon tetraiodide—CI4, Carbonic acid—H2CO3, Carbonyl fluoride—COF2, Carbonyl sulfide—COS, Carboplatin—C6H12N2O4Pt, carborundum SiC, Cerium aluminium—CeAl, Cerium cadmium—CeCd, Cerium magnesium—CeMg, Cerium mercury—CeHg, Cerium silver—CeAg, Cerium thallium—CeTl, Cerium zinc—CeZn, Cerium(III) bromide—CeBr3, Cerium(III) chloride—CeCl3, Cerium (IV) sulfate—Ce(SO4)2, Chrome-alum; K2SO4Cr2(SO4) 3·24H2O, Chromic acid—CrO3, Chromium trioxide (Chromic acid)—CrO3, Chromium(II) chloride—CrCl2 (also chromous chloride), Chromium(II) sulfate—CrSO4, Chromium(III) chloride—CrCl3, Chromium(III) oxide—Cr2O3, Chromium(IV) oxide—CrO2, Chromyl chloride—CrO2Cl2, Cisplatin (cis-platinum(II) chloride diammine)—PtCl2(NH3)2, Cobalt(II) bromide—CoBr2, Cobalt(II) carbonate—CoCO3, Cobalt(II) chloride—CoCl2, Cobalt(II) sulfate—CoSO4, Columbite—Fe2+Nb2O6, Copper(I) chloride—CuCl, Copper(I) oxide—Cu2O, Copper(I) sulfide—Cu2S, Copper(II) carbonate—CuCO3, Copper(II) chloride—CuCl2, Copper(II) hydroxide—Cu(OH)2, Copper(II) nitrate—Cu(NO3)2, Copper(II) oxide—CuO, Copper(II) sulfate—CuSO4, Copper(II) sulfide—CuS, Cyanogen—(CN)2, Cyanogen chloride—CNCl, Cyanuric chloride—C3Cl3N3, Decaborane (Diborane)—B10H14, Diammonium phosphate—(NH4)2HPO4, Diborane—B2H6, Dichlorosilane—SiH2Cl2, Digallane—Ga2H6, Dinitrogen pentoxide (nitronium nitrate)—N2O5, Disilane—Si2H6, Disulfur dichloride S2Cl2, Dysprosium(III) chloride—DyCl3, Erbium(III) chloride—ErCl3, Erbium-copper—ErCu, Erbium-gold—ErAu, Erbium-Iridium—ErIr, Erbium-silver—ErAg, Europium(III) chloride—EuCl3, Fluorosulfuric acid—FSO2(OH), Gadolinium(III) chloride—GdCl3, Gadolinium(III) oxide—Gd2O3, Gallium antimonide—GaSb, Gallium arsenide—GaAs, Gallium nitride—GaN, Gallium phosphide—GaP, Gallium trichloride—GaCl3, Germanium (IV) nitride—Ge3N4, Germanium telluride—GeTe, Germanium(II) bromide—GeBr2, Germanium(II) chloride—GeC12, Germanium(II) fluoride—GeF2, Germanium(II) iodide—GeI2, Germanium(II) oxide—GeO, Germanium(II) selenide—GeSe, Germanium (II) sulfide—GeS, Germanium(III) hydride—Ge2H6, Germanium(IV) bromide—GeBr4, Germanium(IV) chloride—GeCl4, Germanium(IV) fluoride—GeF4, Germanium(IV) hydride (Germane)—GeH4, Germanium(IV) iodide—GeI4, Germanium(IV) oxide—GeO2, Germanium(IV) selenide—GeSe2, Germanium(IV) sulfide—GeS2, Gold ditelluride—AuTe2, Gold(I) bromide—AuBr, Gold(I) chloride—AuCl, Gold(I) iodide—AuI, Gold(I) sulfide—Au2S, Gold(I,III) chloride—Au4Cl8, Gold(III) bromide—(AuBr3)2, Gold (III) chloride—(AuCl3)2, Gold(III) chloride—AuCl3, Gold (III) fluoride—AuF3, Gold(III) iodide—AuI3, Gold(III) oxide—Au2O3, Gold(III) selenide—Au2Se3, Gold(III) selenide—AuSe, Gold(III) sulfide—Au2S3, Gold(V) fluoride—AuF5, Hafnium fluoride, Hafnium tetrachloride—HfCl4, Hexadecacarbonylhexarhodium—Rh6CO16, Hydrazine—N2H4, Hydrazoic acid—HN3, Hydrobromic acid—HBr, Hydrochloric acid—HCl, Hydrogen bromide—HBr, Hydrogen chloride—HCl, Hydrogen fluoride—HF, Hydrogen peroxide—H2O2, Hydrogen selenide—H2Se, Hydrogen sulfide—H2S, Hydrogen telluride—H2Te, Hydroiodic acid—HI, Hydroxylamine—NH2OH, Hypochlorous acid—HClO, Hypophosphorous acid—H3PO2, Indium antimonide—InSb, Indium arsenide—InAs, Indium nitride—InN, Indium phosphide—InP, Indium(I) chloride, Iodic acid—HIO3, Iodine heptafluoride—IF7, Iodine monochloride—ICl, Iodine pentafluoride—IFS, Iridium(IV) chloride, Iron(II) chloride—FeCl2 including hydrate, Iron(II) oxide—FeO, Iron(II,III) oxide—Fe3O4, Iron(III) chloride—FeCl3, Iron(III) nitrate—Fe(NO3)3(H2O)9, Iron(III) oxide—Fe2O3, Iron(III) thiocyanate, Iron-sulfur cluster, Krypton difluoride—KrF2, Lanthanum aluminium—LaAl, Lanthanum cadmium—LaCd, Lanthanum carbonate—La2 (CO3)3, Lanthanum magnesium—LaMg, Lanthanum mercury—LaHg, Lanthanum silver—LaAg, Lanthanum tallium—LaTl, Lanthanum zinc—LaZn, Lead zirconate titanate—Pb[TixZr1-x]03 (e.g., x=0.52 is Lead zirconium titanate), Lead(II) carbonate—Pb(CO3), Lead(II) chloride—PbCl2, Lead(II) iodide—PbI2, Lead(II) nitrate—Pb (NO3)2, Lead(II) oxide—PbO, Lead(II) phosphate—Pb3 (PO4)2, Lead(II) selenide—PbSe, Lead(II) sulfate—Pb (SO4), Lead(II) sulfide—PbS, Lead(II) telluride—PbTe, Lead(IV) oxide—PbO2, Lithium aluminium hydride—LiAlH4, Lithium bromide—LiBr, Lithium carbonate (Lithium salt)—Li2CO3, Lithium chloride—LiCl, Lithium hydride—LiH, Lithium hydroxide—LiOH, Lithium iodide—LiI, Lithium nitrate—LiNO3, Lithium sulfate—Li2SO4, Magnesium antimonide—MgSb, Magnesium carbonate—MgCO3, Magnesium chloride—MgCl2, Magnesium oxide—MgO, Magnesium phosphate—Mg3(PO4)2, Magnesium sulfate—MgSO4, Manganese(II) chloride—MnCl2, Manganese(II) phosphate—Mn3(PO4)2, Manganese(II) sulfate monohydrate—MnSO4·H2O, Manganese(III) chloride—MnCl3, Manganese(IV) fluoride—MnF4, Manganese (IV) oxide (manganese dioxide)—MnO2, Mercury fulminate—Hg(ONC)2, Mercury(I) chloride—Hg2Cl2, Mercury (I) sulfate—Hg2SO4, Mercury(II) chloride—HgCl2, Mercury(II) selenide—HgSe, Mercury(II) sulfate—HgSO4, Mercury(II) sulfide—HgS, Mercury(II) telluride—HgTe, Metaphosphoric acid—HPO3, Molybdate orange, Molybdenum disulfide—MoS2, Molybdenum hexacarbonyl—C6O6Mo, Molybdenum trioxide—MoO3, Molybdic acid—H2MoO4, Neodymium(III) chloride—NdCl3, Nessler's reagent—K2[HgI4], Nickel(II) carbonate—NiCO3, Nickel (II) chloride—NiCl2 and hexahydrate, Nickel(II) hydroxide—Ni(OH)2, Nickel(II) nitrate—$Ni(NO_3)_2$, Nickel(II) oxide—NiO, Niobium oxychloride—NbOCl3, Niobium pentachloride—NbCl5, Nitric acid—HNO3, Nitrogen dioxide—NO2, Nitrogen monoxide—NO, Nitrosylsulfuric acid—NOHSO4, Osmium tetroxide (osmium(VIII) oxide)—OsO4, Osmium trioxide (osmium(VI) oxide)—

OsO3, Oxybis(tributyltin)—C24H54OSn2, Oxygen difluoride—OF2, Ozone—O3, Palladium(II) chloride—PdCl2, Palladium(II) nitrate—Pd(NO3)2, Pentaborane—B5H9, Pentasulfide antimony—Sb2S5, Perchloric acid—HClO4, Perchloryl fluoride—ClFO3, Persulfuric acid (Caro's acid)—H2SO5, Perxenic acid—H4XeO6, Phenylarsine oxide—(C6H5)AsO, Phenylphosphine—C6H7P, Phosgene—COCl2, Phosphine—PH3, Phosphite—HPO32-, Phosphomolybdic acid—HMoNiO6P-4, Phosphoric acid—H3PO4, Phosphorous acid (Phosphoric(III) acid)—H3PO3, Phosphorus pentabromide—PBr5, Phosphorus pentafluoride—PFS, Phosphorus pentasulfide—P4S10, Phosphorus pentoxide—P2O5, Phosphorus sesquisulfide—P4S3, Phosphorus tribromide—PBr3, Phosphorus trichloride—PCl3, Phosphorus trifluoride—PF3, Phosphorus triiodide—PI3, Phosphotungstic acid—H3PW12O40, Platinum(II) chloride—PtCl2, Platinum(IV) chloride—PtCl4, Plutonium dioxide (Plutonium(IV) oxide)—PuO2, Plutonium(III) chloride—PuCl3, Potash Alum-K2SO4·Al2(SO4)3·24H2O, Potassium aluminium fluoride—KAlF4, Potassium borate—K2B4O7·4H2O, Potassium bromide—KBr, Potassium calcium chloride—KCaCl3, Potassium carbonate—K2CO3, Potassium chlorate—KClO3, Potassium chloride—KCl, Potassium ferrioxalate—K3 [Fe(C2O4)3], Potassium hydrogen fluoride—HF2K, Potassium hydrogencarbonate—KHCO3, Potassium hydroxide—KOH, Potassium iodide—KI, Potassium monopersulfate—K2SO4·KHSO4·2KHSO5, Potassium nitrate—KNO3, Potassium perbromate—KBrO4, Potassium perchlorate—KClO4, Potassium permanganate—KMnO4, Potassium sulfate—K2SO4, Potassium sulfide—K2S, Potassium titanyl phosphate—KTiOPO4, Potassium vanadate—KVO3, Praseodymium (III) chloride—PrCl3, Protonated molecular hydrogen—H3+, Prussian blue (Iron(III) hexacyanoferrate(II))—Fe4[Fe (CN)6]3, Pyrosulfuric acid—H2S2O7, Radium chloride—RaCl2, Radon difluoride—RnF2, Rhodium(III) chloride—RhCl3, Rubidium bromide—RbBr, Rubidium chloride—RbCl, Rubidium fluoride—RbF, Rubidium hydroxide—RbOH, Rubidium iodide—RbI, Rubidium nitrate—RbNO3, Rubidium oxide—Rb2O, Rubidium telluride—Rb2Te, Ruthenium(VIII) oxide—RuO4, Samarium(II) iodide—SmI2, Samarium(III) chloride—SmCl3, Scandium(III) chloride—ScCl3 and hydrate, Scandium(III) fluoride—ScF3, Scandium(III) nitrate—Sc(NO3)3, Scandium(III) oxide—Sc2O3, Scandium(III) triflate—Sc(OSO2CF3)3, Selenic acid—H2SeO4, Selenious acid—H2SeO3, Selenium dioxide—SeO2, Selenium trioxide—SeO3, Silane—SiH4, Silica gel—$SiO_2$·nH2O, Silicic acid—[SiOx(OH)4-2x]n, Silicochloroform—Cl3HSi, Silicofluoric acid—H2SiF6, Silicon dioxide—SiO2, Silver chloride—AgCl, Silver iodide—AgI, Silver nitrate—AgNO3, Silver sulfide—Ag2S, Silver(I) fluoride—AgF, Silver(II) fluoride—AgF2, Soda lime —, Sodamide—NaNH2, Sodium borohydride—NaBH4, Sodium bromate—NaBrO3, Sodium bromide—NaBr, Sodium carbonate—Na2CO3, Sodium chlorate—NaClO3, Sodium chloride—NaCl, Sodium cyanide—NaCN, Sodium ferrocyanide—Na4Fe(CN)6, Sodium hydride—NaH, Sodium hydrogen carbonate (Sodium bicarbonate)—$NaHCO_3$, Sodium hydrosulfide—NaSH, Sodium hydroxide—NaOH, Sodium iodide—NaI, Sodium monofluorophosphate (MFP)—Na2PFO3, Sodium nitrate—NaNO3, Sodium nitrite—NaNO2, Sodium percarbonate—2Na2CO3·3H2O2, Sodium persulfate—Na2S2O8, Sodium phosphate; see Trisodium phosphate—Na3PO4, Sodium silicate—Na2SiO3, Sodium sulfate—Na2SO4, Sodium sulfide—Na2S, Sodium sulfite—Na2SO3, Sodium tellurite—Na2TeO3, Stannous chloride (tin(II) chloride)—SnCl2, Stibine—SbH3, Strontium chloride—SrCl2, Strontium nitrate—Sr(NO3)2, Strontium titanate—SrTiO3, Sulfamic acid—H3NO3S, Sulfane—H2S, Sulfur dioxide—SO2, Sulfuric acid—H2SO4, Sulfurous acid—H2SO3, Sulfuryl chloride—SO2Cl2, Tantalum carbide—TaC, Tantalum(V) oxide—Ta2O5, Telluric acid—H6TeO6, Tellurium dioxide—TeO2, Tellurium tetrachloride—TeCl4, Tellurous acid—H2TeO3, Terbium(III) chloride—TbCl3, Tetraborane (10)—B4H10, Tetrachloroauric acid—AuCl3, Tetrafluorohydrazine—N2F4, Tetramminecopper(II) sulfate—[Cu (NH3)4]SO4, Tetrasulfur tetranitride—S4N4, Thallium(I) carbonate—Tl2CO3, Thallium(I) fluoride—TlF, Thallium (III) oxide Tl2O3, Thallium(III) sulfate, Thionyl chloride—SOCl2, Thiophosgene—CSCl2, Thiophosphoryl chloride—Cl3PS, Thorium dioxide—ThO2, Thortveitite—(Sc,Y) 2Si2O7, Thulium(III) chloride—TmCl3, Tin(II) chloride—SnCl2, Tin(II) fluoride—SnF2, Tin(IV) chloride—SnCl4, Titanium boride—TiB2, Titanium carbide—TiC, Titanium dioxide (B) (titanium(IV) oxide)—TiO2, Titanium dioxide (titanium(IV) oxide)—TiO2, Titanium nitride—TiN, Titanium(II) chloride—TiCl2, Titanium(III) chloride—TiCl3, Titanium(IV) bromide (titanium tetrabromide)—TiBr4, Titanium(IV) chloride (titanium tetrachloride)—TiCl4, Titanium(IV) iodide (titanium tetraiodide)—TiI4, Trifluoromethanesulfonic acid—CF3SO3H, Trifluoromethylisocyanide—C2NF3, Trimethylphosphine—C3H9P, Trioxidane—H2O3, Tripotassium phosphate—K3PO4, Trisodium phosphate—Na3PO4, Triuranium octaoxide (pitchblende or yellowcake)—U3O8, Tungsten carbide—WC, Tungsten hexacarbonyl—W(CO)6, Tungsten(VI) chloride—WCl6, Tungsten(VI) Fluoride—WF6, Tungstic acid—H2WO4, Uranium hexafluoride—UF6, Uranium pentafluoride—UF5, Uranium tetrachloride—UCl4, Uranium tetrafluoride—UF4, Uranyl carbonate—UO2CO3, Uranyl chloride—UO2Cl2, Uranyl fluoride—UO2F2, Uranyl hydroxide—(UO2)2(OH)4, Uranyl hydroxide—UO2 (OH)2, Uranyl nitrate—UO2(NO3)2, Uranyl sulfate—UO2SO4, Vanadium carbide—VC, Vanadium oxytrichloride (Vanadium(V) oxide trichloride)—VOCl3, Vanadium(II) chloride—VCl2, Vanadium(II) oxide—VO, Vanadium(III) bromide—VBr3, Vanadium(III) chloride—VCl3, Vanadium(III) fluoride—VF3, Vanadium(III) nitride—VN, Vanadium(III) oxide—V2O3, Vanadium(IV) chloride—VCl4, Vanadium(IV) fluoride—VF4, Vanadium (IV) oxide—VO2, Vanadium(IV) sulfate—VOSO4, Vanadium(V) oxide—V2O5, Water—H2O, Xenic acid—H2XeO4, Xenon difluoride—XeF2, Xenon hexafluoroplatinate—Xe[PtF6], Xenon tetrafluoride—XeF4, Xenon tetroxide—XeO4, Ytterbium(III) chloride—YbCl3, Ytterbium(III) oxide—Yb2O3, Yttrium aluminium garnet—Y3Al5O12, Yttrium barium copper oxide—YBa2Cu3O7, Yttrium cadmium—YCd, Yttrium copper—YCu, Yttrium gold—YAu, Yttrium iridium—YIr, Yttrium iron garnet—Y3Fe5O12, Yttrium magnesium—YMg, Yttrium rhodium—YRh, Yttrium silver—YAg, Yttrium zinc—YZn, Yttrium(III) antimonide—YSb, Yttrium(III) arsenide—YAs, Yttrium(III) bromide—YBr3, Yttrium(III) fluoride—YF3, Yttrium(III) oxide—Y2O3, Yttrium(III) sulfide—Y2S3, Zinc bromide—ZnBr2, Zinc carbonate—ZnCO3, Zinc chloride—ZnCl2, Zinc cyanide—Zn(CN)2, Zinc fluoride—ZnF2, Zinc iodide—ZnI2, Zinc oxide—ZnO, Zinc selenide—ZnSe, Zinc sulfate—ZnSO4, Zinc sulfide—ZnS, Zinc telluride—ZnTe, Zirconia hydrate—ZrO2·nH2O, Zirconium carbide—ZrC, Zirconium hydroxide—Zr(OH)4, Zirconium nitride—ZrN, Zirconium orthosilicate—ZrSiO4, Zirconium tetrahydroxide—H4O4Zr, or Zirconium tungstate—$ZrW_2O_8$, Zirconium(IV) chloride—ZrC14, Zirconium(IV) oxide—$ZrO_2$.

Combinations of SEs, Ligands and Linkers, and Composite Materials.

Preferred embodiments include i) Embodiments in which Ligand1 and Ligand2 are both capable of covalently binding, or are both covalently bound, to SE1 and SE2, respectively, ii) Embodiments in which Ligand1 and Ligand2 are both capable of non-covalent binding, or are both non-covalently bound, to SE1 and SE2, respectively, iii) Embodiments in which one of the ligands of the LU is capable of non-covalent binding, or is non-covalently bound, to SE1 or SE2, and where the other ligand of the LU is capable of covalent binding, or is covalently bound, to the other structural entity, and where for each of i), ii) and iii), SE1 and SE2 are defined as follows:

- SE1 is a metal; more preferably SE1 is a metal and SE2 is a ceramic; more preferably SE1 is a metal and SE2 is a polymer; yet more preferably SE1 is metal and SE2 is a metal, or
- SE1 is a polymer; more preferably SE1 is a polymer and SE2 is a ceramic; more preferably SE1 is a polymer and SE2 is a polymer; yet more preferably SE1 is polymer and SE2 is a metal, or
- SE1 is a ceramic; more preferably SE1 is a ceramic and SE2 is a ceramic; more preferably SE1 is a ceramic and SE2 is a polymer; yet more preferably SE1 is ceramic and SE2 is a metal, or
- SE1 is a fullerene; more preferably SE1 is a fullerene and SE2 is a ceramic; more preferably SE1 is a fullerene and SE2 is a polymer; yet more preferably SE1 is fullerene and SE2 is a metal, or
- SE1 is a carbon nanotube; more preferably SE1 is a carbon nanotube and SE2 is a ceramic; more preferably SE1 is a carbon nanotube and SE2 is a polymer; yet more preferably SE1 is carbon nanotube and SE2 is a metal, or
- SE1 is a graphene; more preferably SE1 is a graphene and SE2 is a ceramic; more preferably SE1 is a graphene and SE2 is a polymer; yet more preferably SE1 is graphene and SE2 is a metal, or
- SE1 is a diamond or diamond film; more preferably SE1 is a diamond or diamond film and SE2 is a ceramic; more preferably SE1 is a diamond or diamond film and SE2 is a polymer; yet more preferably SE1 is diamond or diamond film and SE2 is a metal, or
- SE1 is a nanotube; more preferably SE1 is a nanotube and SE2 is a ceramic; more preferably SE1 is a nanotube and SE2 is a polymer; yet more preferably SE1 is nanotube and SE2 is a metal, or
- SE1 is an epoxy polymer; more preferably SE1 is an epoxy polymer and SE2 is a ceramic; more preferably SE1 is an epoxy polymer and SE2 is a polymer; yet more preferably SE1 is an epoxy polymer and SE2 is a metal, or
- SE1 is a quartz; more preferably SE1 is a quartz and SE2 is a ceramic; more preferably SE1 is a quartz and SE2 is a polymer; yet more preferably SE1 is quartz and SE2 is a metal, or
- SE1 is a carbon nanofiber; more preferably SE1 is a carbon nanofiber and SE2 is a ceramic; more preferably SE1 is a carbon nanofiber and SE2 is a polymer; yet more preferably SE1 is carbon nanofiber and SE2 is a metal, or
- SE1 is a linear polymer; more preferably SE1 is a linear polymer and SE2 is a ceramic; more preferably SE1 is a linear polymer and SE2 is a polymer; yet more preferably SE1 is linear polymer and SE2 is a metal, or
- SE1 is a short-chain branched polymer; more preferably SE1 is a short-chain branched polymer and SE2 is a ceramic; more preferably SE1 is a short-chain branched polymer and SE2 is a polymer; yet more preferably SE1 is short-chain branched polymer and SE2 is a metal, or
- SE1 is a long-chain branched polymer; more preferably SE1 is a long-chain branched polymer and SE2 is a ceramic; more preferably SE1 is a long-chain branched polymer and SE2 is a polymer; yet more preferably SE1 is long-chain branched polymer and SE2 is a metal, or
- SE1 is a ladder-type polymer; more preferably SE1 is a ladder-type polymer and SE2 is a ceramic; more preferably SE1 is a ladder-type polymer and SE2 is a polymer; yet more preferably SE1 is ladder-type polymer and SE2 is a metal, or
- SE1 is a star-branched polymer; more preferably SE1 is a star-branched polymer and SE2 is a ceramic; more preferably SE1 is a star-branched polymer and SE2 is a polymer; yet more preferably SE1 is star-branched polymer and SE2 is a metal, or
- SE1 is a network polymer; more preferably SE1 is a network polymer and SE2 is a ceramic; more preferably SE1 is a network polymer and SE2 is a polymer; yet more preferably SE1 is network polymer and SE2 is a metal.

In any of the above examples, SE1 and SE2 may be components of a CMU. Said CMU may be part of a composite material, or the CMU may be a sensor or some other partly isolated entity.

Particularly preferred LUs include LUs that comprise two noncovalent ligands that bind CNT Particularly preferred LUs include LUs that consist of two noncovalent ligands that bind CNT Particularly preferred LUs include LUs that comprise two noncovalent ligands that bind graphene Particularly preferred LUs include LUs that consist of two noncovalent ligands that bind graphene Particularly preferred LUs include LUs that comprise two noncovalent ligands that bind bornitride Particularly preferred LUs include LUs that consist of two noncovalent ligands that bind bornitride Particularly preferred LUs include LUs that comprise two noncovalent ligands that bind bornitride nanotube Particularly preferred LUs include LUs that consist of two noncovalent ligands that bind bornitride nanotube Particularly preferred LUs include LUs that comprise two noncovalent ligands where one binds CNT and the other binds graphene Particularly preferred LUs include LUs that consist of two noncovalent ligands where one binds CNT and the other binds bornitride Particularly preferred LUs include LUs that comprise two noncovalent ligands where one binds CNT and the other binds bornitride nanotube Particularly preferred LUs include LUs that consist of two noncovalent ligands where one binds graphene and the other binds bornitride nanotube Preferably, SE1 is a ceramic material, a COOH-functionalized CNT, a OH-functionalized carbon nanotube, an NH2-functionalized carbon nanotube, an SH-functionalized CNT, COOH-functionalized graphene, multi-layer graphene, NH2-functionalized graphene, OH-functionalized graphene, a glass fibre, aramid, E-glass, iron, polyester, polyethylene, S-glass, steel, a battery, a borosilicate, a buckyball, a buckytube, a capacitator, a carbon dome, a carbon material, a carbon megatube, a carbon nanofoam, a carbon polymer, a catalyst, a cathode, a coated carbon nanotube, a conductor, a covalent crystal, a crystal, a crystalline material, a defect-free graphene sheet, a defect-free MWCNT, a defect-free SWCNT, a dielectric material, a diode, a dodecahedrane, a doped glass, a fibre, a fullerite, a fused silica, a glue, a green ceramic, a lanthanides, a machinable ceramic, a metal alloy, a metal-functionalized carbon nanotube, a metalised dielectric, a metallised ceramic, a metalloid, a mineral, a non-covalent crystal, a piezoelectric material, a platinum group metal, a post-transition metal, a rare earth element-a sapphire, a semiconductor, a sensor, a silicon nitride, a single crystal fiber, a sol-gel, a synthetic diamond, a transition metal, a triple-wall carbon nanotube, a tungsten carbide, alumina, alumina trihydrate, aluminium, aluminum boride, aluminum oxide, aluminum trihydroxide, amorphous carbon, an actinides, an amalgam, an anode, an elastomers, an electrode, an endohedral fullerene, an insulator, an intermetallic, an ionic crystal, an organic material, anode, anthracite, asbestos, barium, bone, boron, brass, buckypaper, calcium carbonite, calcium metasilicate, calcium sulfate, calcium sulphate, carbon black, carbon nanofoam, cathode, chromium, clay, coal, copper, diamond, diamond-like carbon, double-layer graphene, exfoliated graphite, exfoliated silicate, flourinated graphene, fused silica, gallium arsenide, gallium nitride, germanium, glass, glass microsphere, glass ribbons, glassy carbon, gold, hardened steel, hydrous magnesium silicate, hyperdiamond, iron oxides, lead zirconium titanate, lignite, lithium niobate, lonsdaleite, magnesium dihydroxide, magnesium oxide, manganese, metal oxide, mica, molybdenum, nickel, nylon, palladium, pencil lead, platinum, prismane, pyrolytic graphite, rubber, silica, silica gel, silicon, silicon carbide, silicon dioxide, silicon nitride, silver, soot, stainless steel, tantalum, titanium, titanium oxide, tooth cementum, tooth dentine, tooth enamel, tungsten, tungsten carbide, wood, zinc oxide, zirconia, a nanofibre, a plastic, a fibre, a nanomaterial, graphite, a cellulose nanofibre, a ceramic, curran, a nanothread, a functionalized nanotube, a plastic material, a metal material, a polymer material, or a thio-functionalized graphene molecule More preferably, SE1 is a graphane molecule, a graphene oxide molecule, a graphyne molecule, a reduced graphene oxide molecule, or a metal Most preferably, SE1 is a carbon fibre, a carbon nanofibre, a carbon nanothread, a composite material, a fullerene, a MWCNT, a SWCNT, a graphene molecule, a nanotube, a boron nitride sheet, a one-layer molecule, a one-atom layer molecule, a boron nitride nanotube, a functionalized CNT, a functionalized graphene, a functionalized boron nitride nanotube or sheet, a multi-walled nanotube, or a single-walled nanotube Preferably, SE2 is a biopolymer, a block copolymer, a conductive polymer, a cross-linked polyethylene, a flouroplastic, a high density polypropylene, a low density polypropylene, a medium density polyethylene, a medium density polypropylene, a polyacrylonitrile, a polycaprolactone molecule, a polychloroprene, a polychlorotrifluoroethylene, a polyester molecule, a polyimide, a polylactic acid, a polyphenol, a polysulphone, a polytetrafluoroethylene, a polyurea, a polyurethane, a polyvinyl, a silicone, an elastomer, an inorganic polymer, an ultra-high-molecular-weight polyethylene, a melamin resin, a neoprene, a superlinear polyethylene, a poly(ethylene-vinyl acetate) (PEVA), a polyamide, a polyoxymethylene (POM), polyethylene, polyurethaner, epoxy-based polymer, poly ethylvinyl acetate, polystyrene, polypropylene, polyether, polyethylene oxide, polypropylene oxide, polyacrylates, a polymer, a non-biologic polymer, a biologic polymer, polyaromatic polymer, polyaliphatic polymer, a polymer consisting of C, a polymer consisting of C and H, a polymer consisting of C and H and O, a polymer comprising C, a polymer comprising C and H, a polymer comprising C and H and O, polytetrafluoroethylene (PTFE), a polymer comprising C, a polymer comprising O, a polymer comprising N, a polymer comprising Cl, a polymer comprising H, a polymer comprising a carbonyl, a polymer comprising an OH, a polymer comprising an amide bond, a polymer comprising F, a polymer comprising S, a polymer comprising Si, a polymer consisting of C and H and O and N, a polymer comprising C and H and O and N, a polymer consisting of C and H and Cl, a polymer comprising C and H and Cl, a polymer consisting of C and H and F, a polymer comprising C and H and F, a shape memory polymer, a polymer consisting of 4-(ethoxycarbonyl)benzoic ester, a polymer consisting of butyl, a polymer consisting of chloro-ethyl, a polymer consisting of ethyl, a polymer consisting of ethyl-acetate, a polymer consisting of ethyl-nitril, a polymer consisting of ethylbenzene, a polymer consisting of isobutyl, a polymer consisting of isopentyl, a polymer consisting of isopropyl, a polymer consisting of methyl, a polymer consisting of methyl 2-methyl-propionate, a polymer consisting of neopentyl, a polymer consisting of pentyl, a polymer consisting of phenyl-sulfide, a polymer consisting of propanoic acid, a polymer consisting of propanoic acid methyl ester, a polymer consisting of propyl, a polymer consisting of sec-butyl, a polymer consisting of sec-pentyl, a polymer consisting of tert-butyl, a polymer consisting of tert-pentyl, a polymer consisting of tetra-flouro-ethyl, a polymer comprising 2-methyl-propanoic acid methyl ester, a polymer comprising 4-(2-phenylpropan-2-yl)phenyl hydrogen carbonate, a polymer comprising 4-(4-phenoxybenzoyl)benzaketone, a polymer comprising 4-(ethoxycarbonyl)benzoic ester, a polymer comprising butyl, a polymer comprising chloro-ethyl, a polymer comprising ethyl, a polymer comprising ethyl-acetate, a polymer comprising ethyl-nitril, a polymer comprising ethylbenzene, a polymer comprising isobutyl, a polymer comprising isopentyl, a polymer comprising isopropyl, a polymer comprising methyl, a polymer comprising methyl 2-methyl-propionate, a polymer comprising neopentyl, a polymer comprising pentyl, a polymer comprising phenyl-sulfide, a polymer comprising propanoic acid, a polymer comprising propanoic acid methyl ester, a polymer comprising propyl, a polymer comprising sec-butyl, a polymer comprising sec-pentyl, a polymer comprising tert-butyl, a polymer comprising tert-pentyl, or a polymer comprising tetra-flour-ethyl More preferably, SE2 is a polyacrylate, a polyolefine, an acrylonitrile butadiene styrene polymer (ABS), an organic polymer, a styrene acrylonitrile copolymer, a styrene butadiene latex, an unsaturated polyester (UPR), a bis-maleimide (BMI), a polymeric cyanate ester, A6 nylon, a polyaryletheretherketone (PEEK), a polyethylenimine (PEI), a poly-ether-ketone-ketone (PEKK), a poly(methyl methacrylate) (PMMA), a polyphenylene sulfide (PPS), poly(ethylvinyl alcoho)l(EVA), a carbon fibre, a carbon nanofibre, a carbon nanothread, a composite material, a fullerene, a graphane molecule, a graphene oxide molecule, a graphyne molecule, a reduced graphene oxide molecule, a metal, a boron nitride sheet, a one-layer molecule, a one-atom layer molecule, a functionalized CNT, a functionalized graphene, a functionalized boron nitride, a multi-walled nanotube, or a single-walled nanotube.

Most preferably, SE2 is a copolymer, a high density polyethylene (HDPE), a linear low density polyethylene (LLDPE), a low density polyethylene (LDPE), a nylon, a polyamide (PA), a polycarbonate (PC), a polyethylene (PE), a polymer, a polypropylene (PP), a polystyrene (PS), an epoxy-based polymer, a polyethylene terephtalate (PET), a polyvinylchloride (PVC), a MWCNT, a SWCNT, a graphene molecule, a nanotube, or a boron nitride nanotube.

Preferably, Ligand1 is compound 1 from de Juan et al., 2015, doi: 10.1039/c5sc02916c, compound 2 from de Juan et al., 2015, doi: 10.1039/c5sc02916c, compound 3 from de Juan et al., 2015, doi: 10.1039/c5sc02916c, compound 4 from de Juan et al., 2015, doi: 10.1039/c5sc02916c, compound 5 from de Juan et al., 2015, doi: 10.1039/c5sc02916c, 1,2,3-Trichlorobenzene, 1,2,4-Trichlorobenzene, 9,10-dihydroanthracene, covalent bond, non-covalent bond, peptide composed of 5 amino acids, peptide composed of 6 amino acids, pyrene phenyl ester, small molecule with a molecular weight of 12 to 1200 dalton, benzene, biphenyl, peptide with the sequence CPTSTGQAC, peptide with the sequence CTLHVSSYC, dodecyl-trimethylammonium bromide (DTAB), peptide with the sequence ELWR, peptide with the sequence ELWRPTR, with the sequence ELWSIDTSAHRK, fluoranthene, hexane, peptide with the sequence HTDWRLGTWHHS, peptide with the sequence KPRSVSG-dansyl, m-dinitrobenzene, made up of two carbon nanotube-binding ligands arranged in parallel, made up of two carbon nanotube-binding ligands arranged in series, monooleate, monostearate, nitrobenzene, p-nitrotoluene, p-terphenyl, polycyclic carbonhydrides, polystyrene-polyethylene oxide copoymer, polyvinylpyrrolidone, porphyrine, pyrenecarboxylicacid, pyrenyl, peptide with the sequence QLMHDYR, peptide with the sequence QTWPPPLWFSTS, riboflavin, peptide with the sequence RLNPPSQMDPPF, sodium Dodecyl Benzene Sulphonate (SDBS), sodium dodecyl sulfate (SDS), tetraphene, peptide with the sequence IFRLSWGTYFS, peptide with the sequence KTQATSESGSAGRQMFVADMG, peptide with the sequence KTQATSRGTRGMRTSGGFPVG, peptide with the sequence KTQATSVPRKAARRWEQVDSV, peptide with the sequence MHGKTQATSGTIQS, peptide with the sequence PQAQDVELPQELQDQHREVEV, peptide with the sequence SKTSGRDQSKRVPRYWNVHRD, peptide with the sequence SKTSRESSAVQMGKARFLCT, toluene, trans-1,2-diaminocyclohexane-N,N,N9,N9-tetraacetic acid (CDTA), triphenylene, tween-60, tween-80, aromatic molecule, aromatic amino acid, aromatic ring, heteoaromatic ring, non-aromatic molecule, triple bond, Annulene, Aceanthrylene, Acenaphthylene, Acephenanthrylene, Anthracene, as-Indacene, Azulene, Benzene, Biphenylene, Chrysene, Coronene, Decacene, Decahelicene, Decaphene, Fluoranthene, Fluorene, Heptacene, Heptahelicene, Heptaphene, Heptaphenylene, Hexacene, Hexahelicene, Hexaphene, Hexaphenylene, Indene, Naphthalene, Nonacene, Nonahelicene, Nonaphene, Nonaphenylene, Octacene, Octahelicene, Octaphene, Octaphenylene, Ovalene, Pentacene, Pentalene, Pentaphene, Pentaphenylene, Perylene, Phenalene, Phenanthrene, Picene, Pleiadene, Polyacene, Polyalene, Polyaphene, Polyhelicene, Polynaphthylene, Polyphenylene, Pyranthrene, Rubicene, s-Indacene, Tetracene, Tetranaphthylene, Tetraphene, Tetraphenylene, Trinaphthylene, Triphenylene, 1,10-Phenanthroline, 1,5-Naphthyridine, 1,6-Naphthyridine, 1,7-Naphthyridine, 1,7-Phenanthroline, 1,8-Naphthyridine, 1,8-Phenanthroline, 1,9-Phenanthroline, 2,6-Naphthyridine, 2,7-Naphthyridine, 2,7-Phenanthroline, 2,8-Phenanthroline, 2,9-Phenanthroline, 3,7-Phenanthroline, 3,8-Phenanthroline, 4,7-Phenanthroline, Acridarsine, Acridine, Acridophosphine, Arsanthrene, Arsanthridine, Arsindole, Arsindolizine, Arsinoline, Arsinolizine, Boranthrene, Carbazole, Chromene, Cinnoline, Furan, Imidazole, Indazole, Indole, Indolizine, Isoarsindole, Isoarsinoline, Isochromene, Isoindole, Isophosphindole, Isophosphinoline, Isoquinoline, Isoselenochromene, Isotellurochromene, Isothiochromene, Mercuranthrene, Oxanthrene, Perimidine, Phenanthridine, Phenarsazinine, Phenazine, Phenomercurazine, Phenophosphazinine, Phenoselenazine, Phenotellurazine, Phenothiarsinine, Phenothiazine, Phenoxaphosphinine, Phenoxarsinine, Phenoxaselenine, Phenoxastibinine, Phenoxatellurine, Phenoxathiine, Phenoxazine, Phosphanthrene, Phosphanthridine, Phosphindole, Phosphindolizine, Phosphinoline, Phosphinolizine, Phthalazine, Pteridine, Purine, Pyran, Pyrazine, Pyrazole, Pyridazine, Pyridine, Pyrimidine, Pyrrole, Pyrrolizine, Quinazoline, Quinoline, Quinolizine, Quinoxaline, Selenanthrene, Selenochromene, Selenoxanthene, Silanthrene, Telluranthrene, Tellurochromene, Telluroxanthene, Thianthrene, Thiochromene, Thioxanthene, or Xanthene More preferably, Ligand1 is diamino pyrene, covalent ligand, anthracene, peptide with the sequence IFRLSWGTYFS, naphtalene, phenanthrene, aminogroup-containing carbonhydride, peptide with the sequence HWKHPWGAWDTL, bis-pyrene, dipyrene (phenyl ester), tetracycline, peptide with the sequence DAEFRHDSGYEVHHQKLVFFAEDVGSNKGAIIGLMVGGVV, or peptide with the sequence DAEFRHDSGYEVHHQKLVFFAEDVGSNKGAIIGLMVGGVVIA Most preferably, Ligand1 is a non-covalent ligand, pyrene, aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, a halogen, nitro group, amine, thiol, alcohol, ester, amide, carboxylic acid, phenol, indole, imidazole, sulfonate or phophate, C1-C10 alkane, such as hexane and heptane, detergent including chemical motifs comprising a C4-C25 alkane and a polar end group such as sulfonate, for example SDBS, Sodium dodecylbenzenesulfonate, lactam, such as N-methyl-pyrrolidone and lactone, amino acid residue such as phenylalanine, tyrosine, tryptophan, histidine, heteroaromatic system, including pyrole, thiophene, furane, pyrazole, imidazole, isoxazole, oxazole, isothiazole, thiazole, pyridine and perylene bisimides, fused ring system, composed of either aromatic, non-aromatic or anti-aromatic rings or combinations thereof Preferably, Ligand2 is a non-covalent bond, a single bond, a double bond, a triple bond, peptide with the sequence DAEFRHDSGYEVHHQKLVFFAEDVGSNKGAIIGLMVGGVV, peptide with the sequence DAEFRHDSGYEVHHQKLVFFAEDVGSNKGAIIGLMVGG0VVIA or covalent ligand More preferably, Ligand2 is an aminogroup-containing carbonhydride, peptide with the sequence HWKHPWGAWDTL, bis-pyrene, dipyrene (phenyl ester), or tetracycline.

Most preferably, Ligand2 is a non-covalent ligand, peptide, anthracene, peptide with the sequence IFRLSWGTYFS, pyrene, diamino pyrene, naphtalene, phenanthrene, aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, a halogen, nitro group, amine, thiol, alcohol, ester, amide, carboxylic acid, phenol, indole, imidazole, sulfonate or phophate, C1-C10 alkane, such as hexane and heptane, detergent including chemical motifs comprising a long alkane (including C4, C5, C6, C7, C8, C9, C10, C11, C12, C13, C14, C15, C16, C17, C18, C19, C20, C21, C22, C23, C24, C25) and a polar end group such as sulfonate, for example SDBS, Sodium dodecylbenzenesulfonate, lactam, such as N-methyl-pyrrolidone and lactone, amino acid residue such as phenylalanine, tyrosine, tryptophan, histidine, a heteroaromatic system, including pyrole, thiophene, furane, pyrazole, imidazole, isoxazole, oxazole, isothiazole, thiazole, pyridine and perylene bisimides, fused ring system, composed of either aromatic, non-aromatic or anti-aromatic rings or combinations thereof, or an amide bond, made up of two amide bonds arranged in parallel Preferably, the Linker is a covalent bond, a nylon polymer molecule, an alkyl chain, a branched alkyl, an aromatic molecule, a heteroaromatic molecule, a dendrimer, a polyeethylene glycol, or a C1-C50 hydrocarbon chain, with 0-20 double bonds and 0-20 triple bonds.

More preferably, the Linker is a polymer, a polyolefine, a polypropylene (PP), a polystyrene (PS), an acrylonitrile butadiene styrene polymer (ABS), an epoxy-based polymer, an organic polymer, a polyethylene terephtalate (PET), a polyvinylchloride (PVC), a styrene acrylonitrile copolymer, a styrene butadiene latex, an unsaturated polyester (UPR), a bis-maleimide (BMI), a polymeric cyanate ester, a polyarylether-etherketone (PEEK), a polyethylenimine (PEI), a poly-ether-ketone-ketone (PEKK), a poly(methyl methacrylate) (PMMA), a polyphenylene sulfide (PPS) or poly(ethylvinyl alcoho)l(EVA).

Most preferably, Linker is a linear molecule, a branched molecule, a rigid molecule, a flexible molecule, a polymer, a linear polymer, a branched polymer, a copolymer, a nylon, a polyacrylate, a polyamide (PA), a polycarbonate (PC), a polyethylene (PE), a high density polyethylene (HDPE), a linear low density polyethylene (LLDPE), or a low density polyethylene (LDPE)

Preferred matrices are inorganic matter, biologic matter, non-biologic matter, polymers.

Most preferred matrices are, a metal, a ceramic, organic matter, a plastic, a resin, a copolymer, a high density polyethylene (HDPE), a linear low density polyethylene (LLDPE), a low density polyethylene (LDPE), a nylon, a polyamide (PA), a polycarbonate (PC), a polyethylene (PE), a polymer, a polypropylene (PP), a polystyrene (PS), an epoxy-based polymer, a polyethylene terephtalate (PET), or a polyvinylchloride (PVC)

Preferred polymerisation methods are a polycondensation, a uv-induced polymerisation, a step-growth polymerisation, a chain-growth polymerisation, an emulsion polymerisation, a solution polymerisation, a suspension polymerisation, and a precipitation polymerization.

Preferred processing methods are injection molding, compression molding, transfer molding, blow molding, extrusion, injection molding, liquid casting, DMC, SMC, RIM, RRIM, GRP (hand-layup), GRP (spray and match die), filament winding, pultrusion, rotational molding, thermoforming, screw extrusion, calendering, powder injection molding, thixomolding, coating, cold pressure molding, encapsulation, filament winding, laminating, contact molding and slush molding, Preferred embodiments are a CMU; or a composite material comprising a CMU;

or a composite material comprising a CMU and a matrix chosen from; a metal, a ceramic, organic matter, a plastic, a resin, a copolymer, a high density polyethylene (HDPE), a linear low density polyethylene (LLDPE), a low density polyethylene (LDPE), a nylon, a polyamide (PA), a polycarbonate (PC), a polyethylene (PE), a polymer, a polypropylene (PP), a polystyrene (PS), an epoxy-based polymer, a polyethylene terephtalate (PET), a polyvinylchloride (PVC); wherein the CMU is chosen from the following;

C1.1.1: a CMU, where SE1 is a carbon fibre, and.

C1.1.2: a CMU, where SE1 is a carbon fibre, and SE2 is copolymer.

C1.1.3: a CMU, where SE1 is a carbon fibre, and SE2 is a high density polyethylene.

C1.1.4: a CMU, where SE1 is a carbon fibre, and SE2 is a linear low density polyethylene.

C1.1.5: a CMU, where SE1 is a carbon fibre, and SE2 is a low density polyethylene.

C1.1.6: a CMU, where SE1 is a carbon fibre, and SE2 is a nylon.

C1.1.7: a CMU, where SE1 is a carbon fibre, and SE2 is a polyamide.

C1.1.8: a CMU, where SE1 is a carbon fibre, and SE2 is a polycarbonate.

C1.1.9: a CMU, where SE1 is a carbon fibre, and SE2 is a polyethylene.

C1.1.10: a CMU, where SE1 is a carbon fibre, and SE2 is a polymer.

C1.1.11: a CMU, where SE1 is a carbon fibre, and SE2 is a polypropylene.

C1.1.12: a CMU, where SE1 is a carbon fibre, and SE2 is a polystyrene.

C1.1.13: a CMU, where SE1 is a carbon fibre, and SE2 is an epoxy-based polymer.

C1.1.14: a CMU, where SE1 is a carbon fibre, and SE2 is a polyethylene terephtalate.

C1.1.15: a CMU, where SE1 is a carbon fibre, and SE2 is a polyvinylchloride.

C1.1.16: a CMU, where SE1 is a carbon fibre, and SE2 is a MWCNT.

C1.1.17: a CMU, where SE1 is a carbon fibre, and SE2 is a SWCNT.

C1.1.18: a CMU, where SE1 is a carbon fibre, and SE2 is a GS.

C1.1.19: a CMU, where SE1 is a carbon fibre, and SE2 is a nanotube.

C1.1.20: a CMU, where SE1 is a carbon fibre, and SE2 is a BNNT.

C1.1.21: a CMU, where SE1 is a carbon fibre, and SE2 is a polyacrylate.

C1.1.22: a CMU, where SE1 is a carbon fibre, and SE2 is a polyolefine.

C1.2.1: a CMU, where SE1 is a carbon fibre, L1 and/or L2 comprises a non-covalent ligand, and.

C1.2.2: a CMU, where SE1 is a carbon fibre, L1 and/or L2 comprises a non-covalent ligand, and SE2 is copolymer.

C1.2.3: a CMU, where SE1 is a carbon fibre, L1 and/or L2 comprises a non-covalent ligand, and SE2 is a high density polyethylene.

C1.2.4: a CMU, where SE1 is a carbon fibre, L1 and/or L2 comprises a non-covalent ligand, and SE2 is a linear low density polyethylene.

C1.2.5: a CMU, where SE1 is a carbon fibre, L1 and/or L2 comprises a non-covalent ligand, and SE2 is a low density polyethylene.

C1.2.6: a CMU, where SE1 is a carbon fibre, L1 and/or L2 comprises a non-covalent ligand, and SE2 is a nylon.

C1.2.7: a CMU, where SE1 is a carbon fibre, L1 and/or L2 comprises a non-covalent ligand, and SE2 is a polyamide.

C1.2.8: a CMU, where SE1 is a carbon fibre, L1 and/or L2 comprises a non-covalent ligand, and SE2 is a polycarbonate.

C1.2.9: a CMU, where SE1 is a carbon fibre, L1 and/or L2 comprises a non-covalent ligand, and SE2 is a polyethylene.

C1.2.10: a CMU, where SE1 is a carbon fibre, L1 and/or L2 comprises a non-covalent ligand, and SE2 is a polymer.

C1.2.11: a CMU, where SE1 is a carbon fibre, L1 and/or L2 comprises a non-covalent ligand, and SE2 is a polypropylene.

C1.2.12: a CMU, where SE1 is a carbon fibre, L1 and/or L2 comprises a non-covalent ligand, and SE2 is a polystyrene.

C1.2.13: a CMU, where SE1 is a carbon fibre, L1 and/or L2 comprises a non-covalent ligand, and SE2 is an epoxy-based polymer.

C1.2.14: a CMU, where SE1 is a carbon fibre, L1 and/or L2 comprises a non-covalent ligand, and SE2 is a polyethylene terephtalate.

C1.2.15: a CMU, where SE1 is a carbon fibre, L1 and/or L2 comprises a non-covalent ligand, and SE2 is a polyvinylchloride.

C1.2.16: a CMU, where SE1 is a carbon fibre, L1 and/or L2 comprises a non-covalent ligand, and SE2 is a MWCNT.

C1.2.17: a CMU, where SE1 is a carbon fibre, L1 and/or L2 comprises a non-covalent ligand, and SE2 is a SWCNT.

C1.2.18: a CMU, where SE1 is a carbon fibre, L1 and/or L2 comprises a non-covalent ligand, and SE2 is a GS.

C1.2.19: a CMU, where SE1 is a carbon fibre, L1 and/or L2 comprises a non-covalent ligand, and SE2 is a nanotube.

C1.2.20: a CMU, where SE1 is a carbon fibre, L1 and/or L2 comprises a non-covalent ligand, and SE2 is a BNNT.

C1.2.21: a CMU, where SE1 is a carbon fibre, L1 and/or L2 comprises a non-covalent ligand, and SE2 is a polyacrylate.

C1.2.22: a CMU, where SE1 is a carbon fibre, L1 and/or L2 comprises a non-covalent ligand, and SE2 is a polyolefine.

C1.3.1: a CMU, where SE1 is a carbon fibre, L1 and/or L2 comprises a amino-substituted hydrocarbon, and.

C1.3.2: a CMU, where SE1 is a carbon fibre, L1 and/or L2 comprises a amino-substituted hydrocarbon, and SE2 is copolymer.

C1.3.3: a CMU, where SE1 is a carbon fibre, L1 and/or L2 comprises a amino-substituted hydrocarbon, and SE2 is a high density polyethylene.

C1.3.4: a CMU, where SE1 is a carbon fibre, L1 and/or L2 comprises a amino-substituted hydrocarbon, and SE2 is a linear low density polyethylene.

C1.3.5: a CMU, where SE1 is a carbon fibre, L1 and/or L2 comprises a amino-substituted hydrocarbon, and SE2 is a low density polyethylene.

C1.3.6: a CMU, where SE1 is a carbon fibre, L1 and/or L2 comprises a amino-substituted hydrocarbon, and SE2 is a nylon.

C1.3.7: a CMU, where SE1 is a carbon fibre, L1 and/or L2 comprises a amino-substituted hydrocarbon, and SE2 is a polyamide.

C1.3.8: a CMU, where SE1 is a carbon fibre, L1 and/or L2 comprises a amino-substituted hydrocarbon, and SE2 is a polycarbonate.

C1.3.9: a CMU, where SE1 is a carbon fibre, L1 and/or L2 comprises a amino-substituted hydrocarbon, and SE2 is a polyethylene.

C1.3.10: a CMU, where SE1 is a carbon fibre, L1 and/or L2 comprises a amino-substituted hydrocarbon, and SE2 is a polymer.

C1.3.11: a CMU, where SE1 is a carbon fibre, L1 and/or L2 comprises a amino-substituted hydrocarbon, and SE2 is a polypropylene.

C1.3.12: a CMU, where SE1 is a carbon fibre, L1 and/or L2 comprises a amino-substituted hydrocarbon, and SE2 is a polystyrene.

C1.3.13: a CMU, where SE1 is a carbon fibre, L1 and/or L2 comprises a amino-substituted hydrocarbon, and SE2 is an epoxy-based polymer.

C1.3.14: a CMU, where SE1 is a carbon fibre, L1 and/or L2 comprises a amino-substituted hydrocarbon, and SE2 is a polyethylene terephtalate.

C1.3.15: a CMU, where SE1 is a carbon fibre, L1 and/or L2 comprises a amino-substituted hydrocarbon, and SE2 is a polyvinylchloride.

C1.3.16: a CMU, where SE1 is a carbon fibre, L1 and/or L2 comprises a amino-substituted hydrocarbon, and SE2 is a MWCNT.

C1.3.17: a CMU, where SE1 is a carbon fibre, L1 and/or L2 comprises a amino-substituted hydrocarbon, and SE2 is a SWCNT.

C1.3.18: a CMU, where SE1 is a carbon fibre, L1 and/or L2 comprises a amino-substituted hydrocarbon, and SE2 is a GS.

C1.3.19: a CMU, where SE1 is a carbon fibre, L1 and/or L2 comprises a amino-substituted hydrocarbon, and SE2 is a nanotube.

C1.3.20: a CMU, where SE1 is a carbon fibre, L1 and/or L2 comprises a amino-substituted hydrocarbon, and SE2 is a BNNT.

C1.3.21: a CMU, where SE1 is a carbon fibre, L1 and/or L2 comprises a amino-substituted hydrocarbon, and SE2 is a polyacrylate.

C1.3.22: a CMU, where SE1 is a carbon fibre, L1 and/or L2 comprises a amino-substituted hydrocarbon, and SE2 is a polyolefine.

C1.4.1: a CMU, where SE1 is a carbon fibre, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and.

C1.4.2: a CMU, where SE1 is a carbon fibre, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and SE2 is copolymer.

C1.4.3: a CMU, where SE1 is a carbon fibre, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and SE2 is a high density polyethylene.

C1.4.4: a CMU, where SE1 is a carbon fibre, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and SE2 is a linear low density polyethylene.

C1.4.5: a CMU, where SE1 is a carbon fibre, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and SE2 is a low density polyethylene.

C1.4.6: a CMU, where SE1 is a carbon fibre, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and SE2 is a nylon.

C1.4.7: a CMU, where SE1 is a carbon fibre, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and SE2 is a polyamide.

C1.4.8: a CMU, where SE1 is a carbon fibre, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and SE2 is a polycarbonate.

C1.4.9: a CMU, where SE1 is a carbon fibre, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and SE2 is a polyethylene.

C1.4.10: a CMU, where SE1 is a carbon fibre, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and SE2 is a polymer.

C1.4.11: a CMU, where SE1 is a carbon fibre, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and SE2 is a polypropylene.

C1.4.12: a CMU, where SE1 is a carbon fibre, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and SE2 is a polystyrene.

C1.4.13: a CMU, where SE1 is a carbon fibre, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and SE2 is an epoxy-based polymer.

C1.4.14: a CMU, where SE1 is a carbon fibre, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and SE2 is a polyethylene terephtalate.

C1.4.15: a CMU, where SE1 is a carbon fibre, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and SE2 is a polyvinylchloride.

C1.4.16: a CMU, where SE1 is a carbon fibre, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and SE2 is a MWCNT.

C1.4.17: a CMU, where SE1 is a carbon fibre, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and SE2 is a SWCNT.

C1.4.18: a CMU, where SE1 is a carbon fibre, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and SE2 is a GS.

C1.4.19: a CMU, where SE1 is a carbon fibre, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and SE2 is a nanotube.

C1.4.20: a CMU, where SE1 is a carbon fibre, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and SE2 is a BNNT.

C1.4.21: a CMU, where SE1 is a carbon fibre, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and SE2 is a polyacrylate.

C1.4.22: a CMU, where SE1 is a carbon fibre, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and SE2 is a polyolefine.

C1.5.1: a CMU, where SE1 is a carbon fibre, L1 and/or L2 comprises a halogen, nitro group, amine, thiol, alcohol, ester, amide, carboxylic acid, phenol, indole, imidazole, sulfonate or phophate, and.

C1.5.2: a CMU, where SE1 is a carbon fibre, L1 and/or L2 comprises a halogen, nitro group, amine, thiol, alcohol, ester, amide, carboxylic acid, phenol, indole, imidazole, sulfonate or phophate, and SE2 is copolymer.

C1.5.3: a CMU, where SE1 is a carbon fibre, L1 and/or L2 comprises a halogen, nitro group, amine, thiol, alcohol, ester, amide, carboxylic acid, phenol, indole, imidazole, sulfonate or phophate, and SE2 is a high density polyethylene.

C1.5.4: a CMU, where SE1 is a carbon fibre, L1 and/or L2 comprises a halogen, nitro group, amine, thiol, alcohol, ester, amide, carboxylic acid, phenol, indole, imidazole, sulfonate or phophate, and SE2 is a linear low density polyethylene.

C1.5.5: a CMU, where SE1 is a carbon fibre, L1 and/or L2 comprises a halogen, nitro group, amine, thiol, alcohol, ester, amide, carboxylic acid, phenol, indole, imidazole, sulfonate or phophate, and SE2 is a low density polyethylene.

C1.5.6: a CMU, where SE1 is a carbon fibre, L1 and/or L2 comprises a halogen, nitro group, amine, thiol, alcohol, ester, amide, carboxylic acid, phenol, indole, imidazole, sulfonate or phophate, and SE2 is a nylon.

C1.5.7: a CMU, where SE1 is a carbon fibre, L1 and/or L2 comprises a halogen, nitro group, amine, thiol, alcohol, ester, amide, carboxylic acid, phenol, indole, imidazole, sulfonate or phophate, and SE2 is a polyamide.

C1.5.8: a CMU, where SE1 is a carbon fibre, L1 and/or L2 comprises a halogen, nitro group, amine, thiol, alcohol, ester, amide, carboxylic acid, phenol, indole, imidazole, sulfonate or phophate, and SE2 is a polycarbonate.

C1.5.9: a CMU, where SE1 is a carbon fibre, L1 and/or L2 comprises a halogen, nitro group, amine, thiol, alcohol, ester, amide, carboxylic acid, phenol, indole, imidazole, sulfonate or phophate, and SE2 is a polyethylene.

C1.5.10: a CMU, where SE1 is a carbon fibre, L1 and/or L2 comprises a halogen, nitro group, amine, thiol, alcohol, ester, amide, carboxylic acid, phenol, indole, imidazole, sulfonate or phophate, and SE2 is a polymer.

C1.5.11: a CMU, where SE1 is a carbon fibre, L1 and/or L2 comprises a halogen, nitro group, amine, thiol, alcohol, ester, amide, carboxylic acid, phenol, indole, imidazole, sulfonate or phophate, and SE2 is a polypropylene.

C1.5.12: a CMU, where SE1 is a carbon fibre, L1 and/or L2 comprises a halogen, nitro group, amine, thiol, alcohol, ester, amide, carboxylic acid, phenol, indole, imidazole, sulfonate or phophate, and SE2 is a polystyrene.

C1.5.13: a CMU, where SE1 is a carbon fibre, L1 and/or L2 comprises a halogen, nitro group, amine, thiol, alcohol, ester, amide, carboxylic acid, phenol, indole, imidazole, sulfonate or phophate, and SE2 is an epoxy-based polymer.

C1.5.14: a CMU, where SE1 is a carbon fibre, L1 and/or L2 comprises a halogen, nitro group, amine, thiol, alcohol, ester, amide, carboxylic acid, phenol, indole, imidazole, sulfonate or phophate, and SE2 is a polyethylene terephtalate.

C1.5.15: a CMU, where SE1 is a carbon fibre, L1 and/or L2 comprises a halogen, nitro group, amine, thiol, alcohol, ester, amide, carboxylic acid, phenol, indole, imidazole, sulfonate or phophate, and SE2 is a polyvinylchloride.

C1.5.16: a CMU, where SE1 is a carbon fibre, L1 and/or L2 comprises a halogen, nitro group, amine, thiol, alcohol, ester, amide, carboxylic acid, phenol, indole, imidazole, sulfonate or phophate, and SE2 is a MWCNT.

C1.5.17: a CMU, where SE1 is a carbon fibre, L1 and/or L2 comprises a halogen, nitro group, amine, thiol, alcohol, ester, amide, carboxylic acid, phenol, indole, imidazole, sulfonate or phophate, and SE2 is a SWCNT.

C1.5.18: a CMU, where SE1 is a carbon fibre, L1 and/or L2 comprises a halogen, nitro group, amine, thiol, alcohol, ester, amide, carboxylic acid, phenol, indole, imidazole, sulfonate or phophate, and SE2 is a GS.

C1.5.19: a CMU, where SE1 is a carbon fibre, L1 and/or L2 comprises a halogen, nitro group, amine, thiol, alcohol, ester, amide, carboxylic acid, phenol, indole, imidazole, sulfonate or phophate, and SE2 is a nanotube.

C1.5.20: a CMU, where SE1 is a carbon fibre, L1 and/or L2 comprises a halogen, nitro group, amine, thiol, alcohol, ester, amide, carboxylic acid, phenol, indole, imidazole, sulfonate or phophate, and SE2 is a BNNT.

C1.5.21: a CMU, where SE1 is a carbon fibre, L1 and/or L2 comprises a halogen, nitro group, amine, thiol, alcohol, ester, amide, carboxylic acid, phenol, indole, imidazole, sulfonate or phophate, and SE2 is a polyacrylate.

C1.5.22: a CMU, where SE1 is a carbon fibre, L1 and/or L2 comprises a halogen, nitro group, amine, thiol, alcohol, ester, amide, carboxylic acid, phenol, indole, imidazole, sulfonate or phophate, and SE2 is a polyolefin.

C1.6.1: a CMU, where SE1 is a carbon fibre, L1 and/or L2 comprises an C1-C10 alkane, and C1.6.2: a CMU, where SE1 is a carbon fibre, L1 and/or L2 comprises an C1-C10 alkane, and SE2 is copolymer.

C1.6.3: a CMU, where SE1 is a carbon fibre, L1 and/or L2 comprises an C1-C10 alkane, and SE2 is a high density polyethylene.

C1.6.4: a CMU, where SE1 is a carbon fibre, L1 and/or L2 comprises an C1-C10 alkane, and SE2 is a linear low density polyethylene.

C1.6.5: a CMU, where SE1 is a carbon fibre, L1 and/or L2 comprises an C1-C10 alkane, and SE2 is a low density polyethylene.

C1.6.6: a CMU, where SE1 is a carbon fibre, L1 and/or L2 comprises an C1-C10 alkane, and SE2 is a nylon.

C1.6.7: a CMU, where SE1 is a carbon fibre, L1 and/or L2 comprises an C1-C10 alkane, and SE2 is a polyamide.

C1.6.8: a CMU, where SE1 is a carbon fibre, L1 and/or L2 comprises an C1-C10 alkane, and SE2 is a polycarbonate.

C1.6.9: a CMU, where SE1 is a carbon fibre, L1 and/or L2 comprises an C1-C10 alkane, and SE2 is a polyethylene.

C1.6.10: a CMU, where SE1 is a carbon fibre, L1 and/or L2 comprises an C1-C10 alkane, and SE2 is a polymer.

C1.6.11: a CMU, where SE1 is a carbon fibre, L1 and/or L2 comprises an C1-C10 alkane, and SE2 is a polypropylene.

C1.6.12: a CMU, where SE1 is a carbon fibre, L1 and/or L2 comprises an C1-C10 alkane, and SE2 is a polystyrene.

C1.6.13: a CMU, where SE1 is a carbon fibre, L1 and/or L2 comprises an C1-C10 alkane, and SE2 is an epoxy-based polymer.

C1.6.14: a CMU, where SE1 is a carbon fibre, L1 and/or L2 comprises an C1-C10 alkane, and SE2 is a polyethylene terephtalate.

C1.6.15: a CMU, where SE1 is a carbon fibre, L1 and/or L2 comprises an C1-C10 alkane, and SE2 is a polyvinylchloride.

C1.6.16: a CMU, where SE1 is a carbon fibre, L1 and/or L2 comprises an C1-C10 alkane, and SE2 is a MWCNT.

C1.6.17: a CMU, where SE1 is a carbon fibre, L1 and/or L2 comprises an C1-C10 alkane, and SE2 is a SWCNT.

C1.6.18: a CMU, where SE1 is a carbon fibre, L1 and/or L2 comprises an C1-C10 alkane, and SE2 is a GS.

C1.6.19: a CMU, where SE1 is a carbon fibre, L1 and/or L2 comprises an C1-C10 alkane, and SE2 is a nanotube.

C1.6.20: a CMU, where SE1 is a carbon fibre, L1 and/or L2 comprises an C1-C10 alkane, and SE2 is a BNNT.

C1.6.21: a CMU, where SE1 is a carbon fibre, L1 and/or L2 comprises an C1-C10 alkane, and SE2 is a polyacrylate.

C1.6.22: a CMU, where SE1 is a carbon fibre, L1 and/or L2 comprises an C1-C10 alkane, and SE2 is a polyolefin.

C1.7.1: a CMU, where SE1 is a carbon fibre, L1 and/or L2 comprises a detergent comprising a C4-C25 alkane and a polar end group, and.

C1.7.2: a CMU, where SE1 is a carbon fibre, L1 and/or L2 comprises a detergent comprising a C4-C25 alkane and a polar end group, and SE2 is copolymer.

C1.7.3: a CMU, where SE1 is a carbon fibre, L1 and/or L2 comprises a detergent comprising a C4-C25 alkane and a polar end group, and SE2 is a high density polyethylene.

C1.7.4: a CMU, where SE1 is a carbon fibre, L1 and/or L2 comprises a detergent comprising a C4-C25 alkane and a polar end group, and SE2 is a linear low density polyethylene.

C1.7.5: a CMU, where SE1 is a carbon fibre, L1 and/or L2 comprises a detergent comprising a C4-C25 alkane and a polar end group, and SE2 is a low density polyethylene.

C1.7.6: a CMU, where SE1 is a carbon fibre, L1 and/or L2 comprises a detergent comprising a C4-C25 alkane and a polar end group, and SE2 is a nylon.

C1.7.7: a CMU, where SE1 is a carbon fibre, L1 and/or L2 comprises a detergent comprising a C4-C25 alkane and a polar end group, and SE2 is a polyamide.

C1.7.8: a CMU, where SE1 is a carbon fibre, L1 and/or L2 comprises a detergent comprising a C4-C25 alkane and a polar end group, and SE2 is a polycarbonate.

C1.7.9: a CMU, where SE1 is a carbon fibre, L1 and/or L2 comprises a detergent comprising a C4-C25 alkane and a polar end group, and SE2 is a polyethylene.

C1.7.10: a CMU, where SE1 is a carbon fibre, L1 and/or L2 comprises a detergent comprising a C4-C25 alkane and a polar end group, and SE2 is a polymer.

C1.7.11: a CMU, where SE1 is a carbon fibre, L1 and/or L2 comprises a detergent comprising a C4-C25 alkane and a polar end group, and SE2 is a polypropylene.

C1.7.12: a CMU, where SE1 is a carbon fibre, L1 and/or L2 comprises a detergent comprising a C4-C25 alkane and a polar end group, and SE2 is a polystyrene.

C1.7.13: a CMU, where SE1 is a carbon fibre, L1 and/or L2 comprises a detergent comprising a C4-C25 alkane and a polar end group, and SE2 is an epoxy-based polymer.

C1.7.14: a CMU, where SE1 is a carbon fibre, L1 and/or L2 comprises a detergent comprising a C4-C25 alkane and a polar end group, and SE2 is a polyethylene terephtalate.

C1.7.15: a CMU, where SE1 is a carbon fibre, L1 and/or L2 comprises a detergent comprising a C4-C25 alkane and a polar end group, and SE2 is a polyvinylchloride.

C1.7.16: a CMU, where SE1 is a carbon fibre, L1 and/or L2 comprises a detergent comprising a C4-C25 alkane and a polar end group, and SE2 is a MWCNT.

C1.7.17: a CMU, where SE1 is a carbon fibre, L1 and/or L2 comprises a detergent comprising a C4-C25 alkane and a polar end group, and SE2 is a SWCNT.

C1.7.18: a CMU, where SE1 is a carbon fibre, L1 and/or L2 comprises a detergent comprising a C4-C25 alkane and a polar end group, and SE2 is a GS.

C1.7.19: a CMU, where SE1 is a carbon fibre, L1 and/or L2 comprises a detergent comprising a C4-C25 alkane and a polar end group, and SE2 is a nanotube.

C1.7.20: a CMU, where SE1 is a carbon fibre, L1 and/or L2 comprises a detergent comprising a C4-C25 alkane and a polar end group, and SE2 is a BNNT.

C1.7.21: a CMU, where SE1 is a carbon fibre, L1 and/or L2 comprises a detergent comprising a C4-C25 alkane and a polar end group, and SE2 is a polyacrylate.

C1.7.22: a CMU, where SE1 is a carbon fibre, L1 and/or L2 comprises a detergent comprising a C4-C25 alkane and a polar end group, and SE2 is a polyolefine.

C1.8.1: a CMU, where SE1 is a carbon fibre, L1 and/or L2 comprises a lactam, such as N-methyl-pyrrolidone and lactone, and.

C1.8.2: a CMU, where SE1 is a carbon fibre, L1 and/or L2 comprises a lactam, such as N-methyl-pyrrolidone and lactone, and SE2 is copolymer.

C1.8.3: a CMU, where SE1 is a carbon fibre, L1 and/or L2 comprises a lactam, such as N-methyl-pyrrolidone and lactone, and SE2 is a high density polyethylene.

C1.8.4: a CMU, where SE1 is a carbon fibre, L1 and/or L2 comprises a lactam, such as N-methyl-pyrrolidone and lactone, and SE2 is a linear low density polyethylene.

C1.8.5: a CMU, where SE1 is a carbon fibre, L1 and/or L2 comprises a lactam, such as N-methyl-pyrrolidone and lactone, and SE2 is a low density polyethylene.

C1.8.6: a CMU, where SE1 is a carbon fibre, L1 and/or L2 comprises a lactam, such as N-methyl-pyrrolidone and lactone, and SE2 is a nylon.

C1.8.7: a CMU, where SE1 is a carbon fibre, L1 and/or L2 comprises a lactam, such as N-methyl-pyrrolidone and lactone, and SE2 is a polyamide.

C1.8.8: a CMU, where SE1 is a carbon fibre, L1 and/or L2 comprises a lactam, such as N-methyl-pyrrolidone and lactone, and SE2 is a polycarbonate.

C1.8.9: a CMU, where SE1 is a carbon fibre, L1 and/or L2 comprises a lactam, such as N-methyl-pyrrolidone and lactone, and SE2 is a polyethylene.

C1.8.10: a CMU, where SE1 is a carbon fibre, L1 and/or L2 comprises a lactam, such as N-methyl-pyrrolidone and lactone, and SE2 is a polymer.

C1.8.11: a CMU, where SE1 is a carbon fibre, L1 and/or L2 comprises a lactam, such as N-methyl-pyrrolidone and lactone, and SE2 is a polypropylene.

C1.8.12: a CMU, where SE1 is a carbon fibre, L1 and/or L2 comprises a lactam, such as N-methyl-pyrrolidone and lactone, and SE2 is a polystyrene.

C1.8.13: a CMU, where SE1 is a carbon fibre, L1 and/or L2 comprises a lactam, such as N-methyl-pyrrolidone and lactone, and SE2 is an epoxy-based polymer.

C1.8.14: a CMU, where SE1 is a carbon fibre, L1 and/or L2 comprises a lactam, such as N-methyl-pyrrolidone and lactone, and SE2 is a polyethylene terephtalate.

C1.8.15: a CMU, where SE1 is a carbon fibre, L1 and/or L2 comprises a lactam, such as N-methyl-pyrrolidone and lactone, and SE2 is a polyvinylchloride.

C1.8.16: a CMU, where SE1 is a carbon fibre, L1 and/or L2 comprises a lactam, such as N-methyl-pyrrolidone and lactone, and SE2 is a MWCNT.

C1.8.17: a CMU, where SE1 is a carbon fibre, L1 and/or L2 comprises a lactam, such as N-methyl-pyrrolidone and lactone, and SE2 is a SWCNT.

C1.8.18: a CMU, where SE1 is a carbon fibre, L1 and/or L2 comprises a lactam, such as N-methyl-pyrrolidone and lactone, and SE2 is a GS.

C1.8.19: a CMU, where SE1 is a carbon fibre, L1 and/or L2 comprises a lactam, such as N-methyl-pyrrolidone and lactone, and SE2 is a nanotube.

C1.8.20: a CMU, where SE1 is a carbon fibre, L1 and/or L2 comprises a lactam, such as N-methyl-pyrrolidone and lactone, and SE2 is a BNNT.

C1.8.21: a CMU, where SE1 is a carbon fibre, L1 and/or L2 comprises a lactam, such as N-methyl-pyrrolidone and lactone, and SE2 is a polyacrylate.

C1.8.22: a CMU, where SE1 is a carbon fibre, L1 and/or L2 comprises a lactam, such as N-methyl-pyrrolidone and lactone, and SE2 is a polyolefin.

C1.9.1: a CMU, where SE1 is a carbon fibre, L1 and/or L2 comprises a amino acid residue such as phenylalanine, tyrosine, tryptophan, or histidine, and.

C1.9.2: a CMU, where SE1 is a carbon fibre, L1 and/or L2 comprises a amino acid residue such as phenylalanine, tyrosine, tryptophan, or histidine, and SE2 is copolymer.

C1.9.3: a CMU, where SE1 is a carbon fibre, L1 and/or L2 comprises a amino acid residue such as phenylalanine, tyrosine, tryptophan, or histidine, and SE2 is a high density polyethylene.

C1.9.4: a CMU, where SE1 is a carbon fibre, L1 and/or L2 comprises a amino acid residue such as phenylalanine, tyrosine, tryptophan, or histidine, and SE2 is a linear low density polyethylene.

C1.9.5: a CMU, where SE1 is a carbon fibre, L1 and/or L2 comprises a amino acid residue such as phenylalanine, tyrosine, tryptophan, or histidine, and SE2 is a low density polyethylene.

C1.9.6: a CMU, where SE1 is a carbon fibre, L1 and/or L2 comprises a amino acid residue such as phenylalanine, tyrosine, tryptophan, or histidine, and SE2 is a nylon.

C1.9.7: a CMU, where SE1 is a carbon fibre, L1 and/or L2 comprises a amino acid residue such as phenylalanine, tyrosine, tryptophan, or histidine, and SE2 is a polyamide.

C1.9.8: a CMU, where SE1 is a carbon fibre, L1 and/or L2 comprises a amino acid residue such as phenylalanine, tyrosine, tryptophan, or histidine, and SE2 is a polycarbonate.

C1.9.9: a CMU, where SE1 is a carbon fibre, L1 and/or L2 comprises a amino acid residue such as phenylalanine, tyrosine, tryptophan, or histidine, and SE2 is a polyethylene.

C1.9.10: a CMU, where SE1 is a carbon fibre, L1 and/or L2 comprises a amino acid residue such as phenylalanine, tyrosine, tryptophan, or histidine, and SE2 is a polymer.

C1.9.11: a CMU, where SE1 is a carbon fibre, L1 and/or L2 comprises a amino acid residue such as phenylalanine, tyrosine, tryptophan, or histidine, and SE2 is a polypropylene.

C1.9.12: a CMU, where SE1 is a carbon fibre, L1 and/or L2 comprises a amino acid residue such as phenylalanine, tyrosine, tryptophan, or histidine, and SE2 is a polystyrene.

C1.9.13: a CMU, where SE1 is a carbon fibre, L1 and/or L2 comprises a amino acid residue such as phenylalanine, tyrosine, tryptophan, or histidine, and SE2 is an epoxy-based polymer.

C1.9.14: a CMU, where SE1 is a carbon fibre, L1 and/or L2 comprises a amino acid residue such as phenylalanine, tyrosine, tryptophan, or histidine, and SE2 is a polyethylene terephtalate.

C1.9.15: a CMU, where SE1 is a carbon fibre, L1 and/or L2 comprises a amino acid residue such as phenylalanine, tyrosine, tryptophan, or histidine, and SE2 is a polyvinylchloride.

C1.9.16: a CMU, where SE1 is a carbon fibre, L1 and/or L2 comprises a amino acid residue such as phenylalanine, tyrosine, tryptophan, or histidine, and SE2 is a MWCNT.

C1.9.17: a CMU, where SE1 is a carbon fibre, L1 and/or L2 comprises a amino acid residue such as phenylalanine, tyrosine, tryptophan, or histidine, and SE2 is a SWCNT.

C1.9.18: a CMU, where SE1 is a carbon fibre, L1 and/or L2 comprises a amino acid residue such as phenylalanine, tyrosine, tryptophan, or histidine, and SE2 is a GS.

C1.9.19: a CMU, where SE1 is a carbon fibre, L1 and/or L2 comprises a amino acid residue such as phenylalanine, tyrosine, tryptophan, or histidine, and SE2 is a nanotube.

C1.9.20: a CMU, where SE1 is a carbon fibre, L1 and/or L2 comprises a amino acid residue such as phenylalanine, tyrosine, tryptophan, or histidine, and SE2 is a BNNT.

C1.9.21: a CMU, where SE1 is a carbon fibre, L1 and/or L2 comprises a amino acid residue such as phenylalanine, tyrosine, tryptophan, or histidine, and SE2 is a polyacrylate.

C1.9.22: a CMU, where SE1 is a carbon fibre, L1 and/or L2 comprises a amino acid residue such as phenylalanine, tyrosine, tryptophan, or histidine, and SE2 is a polyolefine.

C1.10.1: a CMU, where SE1 is a carbon fibre, L1 and/or L2 comprises a heteroaromatic system, including pyrrole, thiophene, furane, pyrazole, imidazole, isoxazole, oxazole, isothiazole, thiazole, pyridine and perylene bisamides, and.

C1.10.2: a CMU, where SE1 is a carbon fibre, L1 and/or L2 comprises a heteroaromatic system, including pyrrole, thiophene, furane, pyrazole, imidazole, isoxazole, oxazole, isothiazole, thiazole, pyridine and perylene bisimides, and SE2 is copolymer.

C1.10.3: a CMU, where SE1 is a carbon fibre, L1 and/or L2 comprises a heteroaromatic system, including pyrole, thiophene, furane, pyrazole, imidazole, isoxazole, oxazole, isothiazole, thiazole, pyridine and perylene bisimides, and SE2 is a high density polyethylene.

C1.10.4: a CMU, where SE1 is a carbon fibre, L1 and/or L2 comprises a heteroaromatic system, including pyrole, thiophene, furane, pyrazole, imidazole, isoxazole, oxazole, isothiazole, thiazole, pyridine and perylene bisimides, and SE2 is a linear low density polyethylene.

C1.10.5: a CMU, where SE1 is a carbon fibre, L1 and/or L2 comprises a heteroaromatic system, including pyrole, thiophene, furane, pyrazole, imidazole, isoxazole, oxazole, isothiazole, thiazole, pyridine and perylene bisimides, and SE2 is a low density polyethylene.

C1.10.6: a CMU, where SE1 is a carbon fibre, L1 and/or L2 comprises a heteroaromatic system, including pyrole, thiophene, furane, pyrazole, imidazole, isoxazole, oxazole, isothiazole, thiazole, pyridine and perylene bisimides, and SE2 is a nylon.

C1.10.7: a CMU, where SE1 is a carbon fibre, L1 and/or L2 comprises a heteroaromatic system, including pyrole, thiophene, furane, pyrazole, imidazole, isoxazole, oxazole, isothiazole, thiazole, pyridine and perylene bisimides, and SE2 is a polyamide.

C1.10.8: a CMU, where SE1 is a carbon fibre, L1 and/or L2 comprises a heteroaromatic system, including pyrole, thiophene, furane, pyrazole, imidazole, isoxazole, oxazole, isothiazole, thiazole, pyridine and perylene bisimides, and SE2 is a polycarbonate.

C1.10.9: a CMU, where SE1 is a carbon fibre, L1 and/or L2 comprises a heteroaromatic system, including pyrole, thiophene, furane, pyrazole, imidazole, isoxazole, oxazole, isothiazole, thiazole, pyridine and perylene bisimides, and SE2 is a polyethylene.

C1.10.10: a CMU, where SE1 is a carbon fibre, L1 and/or L2 comprises a heteroaromatic system, including pyrole, thiophene, furane, pyrazole, imidazole, isoxazole, oxazole, isothiazole, thiazole, pyridine and perylene bisimides, and SE2 is a polymer.

C1.10.11: a CMU, where SE1 is a carbon fibre, L1 and/or L2 comprises a heteroaromatic system, including pyrole, thiophene, furane, pyrazole, imidazole, isoxazole, oxazole, isothiazole, thiazole, pyridine and perylene bisimides, and SE2 is a polypropylene.

C1.10.12: a CMU, where SE1 is a carbon fibre, L1 and/or L2 comprises a heteroaromatic system, including pyrole, thiophene, furane, pyrazole, imidazole, isoxazole, oxazole, isothiazole, thiazole, pyridine and perylene bisimides, and SE2 is a polystyrene.

C1.10.13: a CMU, where SE1 is a carbon fibre, L1 and/or L2 comprises a heteroaromatic system, including pyrole, thiophene, furane, pyrazole, imidazole, isoxazole, oxazole, isothiazole, thiazole, pyridine and perylene bisimides, and SE2 is an epoxy-based polymer.

C1.10.14: a CMU, where SE1 is a carbon fibre, L1 and/or L2 comprises a heteroaromatic system, including pyrole, thiophene, furane, pyrazole, imidazole, isoxazole, oxazole, isothiazole, thiazole, pyridine and perylene bisimides, and SE2 is a polyethylene terephtalate.

C1.10.15: a CMU, where SE1 is a carbon fibre, L1 and/or L2 comprises a heteroaromatic system, including pyrole, thiophene, furane, pyrazole, imidazole, isoxazole, oxazole, isothiazole, thiazole, pyridine and perylene bisimides, and SE2 is a polyvinylchloride.

C1.10.16: a CMU, where SE1 is a carbon fibre, L1 and/or L2 comprises a heteroaromatic system, including pyrole, thiophene, furane, pyrazole, imidazole, isoxazole, oxazole, isothiazole, thiazole, pyridine and perylene bisimides, and SE2 is a MWCNT.

C1.10.17: a CMU, where SE1 is a carbon fibre, L1 and/or L2 comprises a heteroaromatic system, including pyrole, thiophene, furane, pyrazole, imidazole, isoxazole, oxazole, isothiazole, thiazole, pyridine and perylene bisimides, and SE2 is a SWCNT.

C1.10.18: a CMU, where SE1 is a carbon fibre, L1 and/or L2 comprises a heteroaromatic system, including pyrole, thiophene, furane, pyrazole, imidazole, isoxazole, oxazole, isothiazole, thiazole, pyridine and perylene bisimides, and SE2 is a GS.

C1.10.19: a CMU, where SE1 is a carbon fibre, L1 and/or L2 comprises a heteroaromatic system, including pyrole, thiophene, furane, pyrazole, imidazole, isoxazole, oxazole, isothiazole, thiazole, pyridine and perylene bisimides, and SE2 is a nanotube.

C1.10.20: a CMU, where SE1 is a carbon fibre, L1 and/or L2 comprises a heteroaromatic system, including pyrole, thiophene, furane, pyrazole, imidazole, isoxazole, oxazole, isothiazole, thiazole, pyridine and perylene bisimides, and SE2 is a BNNT.

C1.10.21: a CMU, where SE1 is a carbon fibre, L1 and/or L2 comprises a heteroaromatic system, including pyrole, thiophene, furane, pyrazole, imidazole, isoxazole, oxazole, isothiazole, thiazole, pyridine and perylene bisimides, and SE2 is a polyacrylate.

C1.10.22: a CMU, where SE1 is a carbon fibre, L1 and/or L2 comprises a heteroaromatic system, including pyrole, thiophene, furane, pyrazole, imidazole, isoxazole, oxazole, isothiazole, thiazole, pyridine and perylene bisimides, and SE2 is a polyolefine.

C1.11.1: a CMU, where SE1 is a carbon fibre, L1 and/or L2 comprises a fused ring system, composed of either aromatic, non-aromatic or anti-aromatic rings or combinations thereof, and.

C1.11.2: a CMU, where SE1 is a carbon fibre, L1 and/or L2 comprises a fused ring system, composed of either aromatic, non-aromatic or anti-aromatic rings or combinations thereof, and SE2 is copolymer.

C1.11.3: a CMU, where SE1 is a carbon fibre, L1 and/or L2 comprises a fused ring system, composed of either aromatic, non-aromatic or anti-aromatic rings or combinations thereof, and SE2 is a high density polyethylene.

C1.11.4: a CMU, where SE1 is a carbon fibre, L1 and/or L2 comprises a fused ring system, composed of either aromatic, non-aromatic or anti-aromatic rings or combinations thereof, and SE2 is a linear low density polyethylene.

C1.11.5: a CMU, where SE1 is a carbon fibre, L1 and/or L2 comprises a fused ring system, composed of either aromatic, non-aromatic or anti-aromatic rings or combinations thereof, and SE2 is a low density polyethylene.

C1.11.6: a CMU, where SE1 is a carbon fibre, L1 and/or L2 comprises a fused ring system, composed of either aromatic, non-aromatic or anti-aromatic rings or combinations thereof, and SE2 is a nylon.

C1.11.7: a CMU, where SE1 is a carbon fibre, L1 and/or L2 comprises a fused ring system, composed of either aromatic, non-aromatic or anti-aromatic rings or combinations thereof, and SE2 is a polyamide.

C1.11.8: a CMU, where SE1 is a carbon fibre, L1 and/or L2 comprises a fused ring system, composed of either aromatic, non-aromatic or anti-aromatic rings or combinations thereof, and SE2 is a polycarbonate.

C1.11.9: a CMU, where SE1 is a carbon fibre, L1 and/or L2 comprises a fused ring system, composed of either aromatic, non-aromatic or anti-aromatic rings or combinations thereof, and SE2 is a polyethylene.

C1.11.10: a CMU, where SE1 is a carbon fibre, L1 and/or L2 comprises a fused ring system, composed of either aromatic, non-aromatic or anti-aromatic rings or combinations thereof, and SE2 is a polymer.

C1.11.11: a CMU, where SE1 is a carbon fibre, L1 and/or L2 comprises a fused ring system, composed of either aromatic, non-aromatic or anti-aromatic rings or combinations thereof, and SE2 is a polypropylene.

C1.11.12: a CMU, where SE1 is a carbon fibre, L1 and/or L2 comprises a fused ring system, composed of either aromatic, non-aromatic or anti-aromatic rings or combinations thereof, and SE2 is a polystyrene.

C1.11.13: a CMU, where SE1 is a carbon fibre, L1 and/or L2 comprises a fused ring system, composed of either aromatic, non-aromatic or anti-aromatic rings or combinations thereof, and SE2 is an epoxy-based polymer.

C1.11.14: a CMU, where SE1 is a carbon fibre, L1 and/or L2 comprises a fused ring system, composed of either aromatic, non-aromatic or anti-aromatic rings or combinations thereof, and SE2 is a polyethylene terephtalate.

C1.11.15: a CMU, where SE1 is a carbon fibre, L1 and/or L2 comprises a fused ring system, composed of either aromatic, non-aromatic or anti-aromatic rings or combinations thereof, and SE2 is a polyvinylchloride.

C1.11.16: a CMU, where SE1 is a carbon fibre, L1 and/or L2 comprises a fused ring system, composed of either aromatic, non-aromatic or anti-aromatic rings or combinations thereof, and SE2 is a MWCNT.

C1.11.17: a CMU, where SE1 is a carbon fibre, L1 and/or L2 comprises a fused ring system, composed of either aromatic, non-aromatic or anti-aromatic rings or combinations thereof, and SE2 is a SWCNT.

C1.11.18: a CMU, where SE1 is a carbon fibre, L1 and/or L2 comprises a fused ring system, composed of either aromatic, non-aromatic or anti-aromatic rings or combinations thereof, and SE2 is a GS.

C1.11.19: a CMU, where SE1 is a carbon fibre, L1 and/or L2 comprises a fused ring system, composed of either aromatic, non-aromatic or anti-aromatic rings or combinations thereof, and SE2 is a nanotube.

C1.11.20: a CMU, where SE1 is a carbon fibre, L1 and/or L2 comprises a fused ring system, composed of either aromatic, non-aromatic or anti-aromatic rings or combinations thereof, and SE2 is a BNNT.

C1.11.21: a CMU, where SE1 is a carbon fibre, L1 and/or L2 comprises a fused ring system, composed of either aromatic, non-aromatic or anti-aromatic rings or combinations thereof, and SE2 is a polyacrylate.

C1.11.22: a CMU, where SE1 is a carbon fibre, L1 and/or L2 comprises a fused ring system, composed of either aromatic, non-aromatic or anti-aromatic rings or combinations thereof, and SE2 is a polyolefine.

C2.1.1: a CMU, where SE1 is a carbon nanofibre.

C2.1.2: a CMU, where SE1 is a carbon nanofibre, and SE2 is copolymer.

C2.1.3: a CMU, where SE1 is a carbon nanofibre, and SE2 is a high density polyethylene.

C2.1.4: a CMU, where SE1 is a carbon nanofiber, and SE2 is a linear low density polyethylene.

C2.1.5: a CMU, where SE1 is a carbon nanofibre, and SE2 is a low density polyethylene.

C2.1.6: a CMU, where SE1 is a carbon nanofibre, and SE2 is a nylon.

C2.1.7: a CMU, where SE1 is a carbon nanofibre, and SE2 is a polyamide.

C2.1.8: a CMU, where SE1 is a carbon nanofibre, and SE2 is a polycarbonate.

C2.1.9: a CMU, where SE1 is a carbon nanofibre, and SE2 is a polyethylene.

C2.1.10: a CMU, where SE1 is a carbon nanofibre, and SE2 is a polymer.

C2.1.11: a CMU, where SE1 is a carbon nanofibre, and SE2 is a polypropylene.

C2.1.12: a CMU, where SE1 is a carbon nanofibre, and SE2 is a polystyrene.

C2.1.13: a CMU, where SE1 is a carbon nanofibre, and SE2 is an epoxy-based polymer.

C2.1.14: a CMU, where SE1 is a carbon nanofibre, and SE2 is a polyethylene terephtalate.

C2.1.15: a CMU, where SE1 is a carbon nanofibre, and SE2 is a polyvinylchloride.

C2.1.16: a CMU, where SE1 is a carbon nanofibre, and SE2 is a MWCNT.

C2.1.17: a CMU, where SE1 is a carbon nanofibre, and SE2 is a SWCNT.

C2.1.18: a CMU, where SE1 is a carbon nanofibre, and SE2 is a GS.

C2.1.19: a CMU, where SE1 is a carbon nanofibre, and SE2 is a nanotube.

C2.1.20: a CMU, where SE1 is a carbon nanofibre, and SE2 is a BNNT.

C2.1.21: a CMU, where SE1 is a carbon nanofibre, and SE2 is a polyacrylate.

C2.1.22: a CMU, where SE1 is a carbon nanofibre, and SE2 is a polyolefine.

C2.2.1: a CMU, where SE1 is a carbon nanofibre, L1 and/or L2 comprises a non-covalent ligand.

C2.2.2: a CMU, where SE1 is a carbon nanofibre, L1 and/or L2 comprises a non-covalent ligand, and SE2 is copolymer.

C2.2.3: a CMU, where SE1 is a carbon nanofibre, L1 and/or L2 comprises a non-covalent ligand, and SE2 is a high density polyethylene.

C2.2.4: a CMU, where SE1 is a carbon nanofibre, L1 and/or L2 comprises a non-covalent ligand, and SE2 is a linear low density polyethylene.

C2.2.5: a CMU, where SE1 is a carbon nanofibre, L1 and/or L2 comprises a non-covalent ligand, and SE2 is a low density polyethylene.

C2.2.6: a CMU, where SE1 is a carbon nanofibre, L1 and/or L2 comprises a non-covalent ligand, and SE2 is a nylon.

C2.2.7: a CMU, where SE1 is a carbon nanofibre, L1 and/or L2 comprises a non-covalent ligand, and SE2 is a polyamide.

C2.2.8: a CMU, where SE1 is a carbon nanofibre, L1 and/or L2 comprises a non-covalent ligand, and SE2 is a polycarbonate.

C2.2.9: a CMU, where SE1 is a carbon nanofibre, L1 and/or L2 comprises a non-covalent ligand, and SE2 is a polyethylene.

C2.2.10: a CMU, where SE1 is a carbon nanofibre, L1 and/or L2 comprises a non-covalent ligand, and SE2 is a polymer.

C2.2.11: a CMU, where SE1 is a carbon nanofibre, L1 and/or L2 comprises a non-covalent ligand, and SE2 is a polypropylene.

C2.2.12: a CMU, where SE1 is a carbon nanofibre, L1 and/or L2 comprises a non-covalent ligand, and SE2 is a polystyrene.

C2.2.13: a CMU, where SE1 is a carbon nanofibre, L1 and/or L2 comprises a non-covalent ligand, and SE2 is an epoxy-based polymer.

C2.2.14: a CMU, where SE1 is a carbon nanofibre, L1 and/or L2 comprises a non-covalent ligand, and SE2 is a polyethylene terephtalate.

C2.2.15: a CMU, where SE1 is a carbon nanofibre, L1 and/or L2 comprises a non-covalent ligand, and SE2 is a polyvinylchloride.

C2.2.16: a CMU, where SE1 is a carbon nanofibre, L1 and/or L2 comprises a non-covalent ligand, and SE2 is a MWCNT.

C2.2.17: a CMU, where SE1 is a carbon nanofibre, L1 and/or L2 comprises a non-covalent ligand, and SE2 is a SWCNT.

C2.2.18: a CMU, where SE1 is a carbon nanofibre, L1 and/or L2 comprises a non-covalent ligand, and SE2 is a GS.

C2.2.19: a CMU, where SE1 is a carbon nanofibre, L1 and/or L2 comprises a non-covalent ligand, and SE2 is a nanotube.

C2.2.20: a CMU, where SE1 is a carbon nanofibre, L1 and/or L2 comprises a non-covalent ligand, and SE2 is a BNNT.

C2.2.21: a CMU, where SE1 is a carbon nanofibre, L1 and/or L2 comprises a non-covalent ligand, and SE2 is a polyacrylate.

C2.2.22: a CMU, where SE1 is a carbon nanofibre, L1 and/or L2 comprises a non-covalent ligand, and SE2 is a polyolefine.

C2.3.1: a CMU, where SE1 is a carbon nanofibre, L1 and/or L2 comprises a amino-substituted hydrocarbon, and.

C2.3.2: a CMU, where SE1 is a carbon nanofibre, L1 and/or L2 comprises a amino-substituted hydrocarbon, and SE2 is copolymer.

C2.3.3: a CMU, where SE1 is a carbon nanofibre, L1 and/or L2 comprises a amino-substituted hydrocarbon, and SE2 is a high density polyethylene.

C2.3.4: a CMU, where SE1 is a carbon nanofibre, L1 and/or L2 comprises a amino-substituted hydrocarbon, and SE2 is a linear low density polyethylene.

C2.3.5: a CMU, where SE1 is a carbon nanofibre, L1 and/or L2 comprises a amino-substituted hydrocarbon, and SE2 is a low density polyethylene.

C2.3.6: a CMU, where SE1 is a carbon nanofibre, L1 and/or L2 comprises a amino-substituted hydrocarbon, and SE2 is a nylon.

C2.3.7: a CMU, where SE1 is a carbon nanofibre, L1 and/or L2 comprises a amino-substituted hydrocarbon, and SE2 is a polyamide.

C2.3.8: a CMU, where SE1 is a carbon nanofibre, L1 and/or L2 comprises a amino-substituted hydrocarbon, and SE2 is a polycarbonate.

C2.3.9: a CMU, where SE1 is a carbon nanofibre, L1 and/or L2 comprises a amino-substituted hydrocarbon, and SE2 is a polyethylene.

C2.3.10: a CMU, where SE1 is a carbon nanofibre, L1 and/or L2 comprises a amino-substituted hydrocarbon, and SE2 is a polymer.

C2.3.11: a CMU, where SE1 is a carbon nanofibre, L1 and/or L2 comprises a amino-substituted hydrocarbon, and SE2 is a polypropylene.

C2.3.12: a CMU, where SE1 is a carbon nanofibre, L1 and/or L2 comprises a amino-substituted hydrocarbon, and SE2 is a polystyrene.

C2.3.13: a CMU, where SE1 is a carbon nanofibre, L1 and/or L2 comprises a amino-substituted hydrocarbon, and SE2 is an epoxy-based polymer.

C2.3.14: a CMU, where SE1 is a carbon nanofibre, L1 and/or L2 comprises a amino-substituted hydrocarbon, and SE2 is a polyethylene terephtalate.

C2.3.15: a CMU, where SE1 is a carbon nanofibre, L1 and/or L2 comprises a amino-substituted hydrocarbon, and SE2 is a polyvinylchloride.

C2.3.16: a CMU, where SE1 is a carbon nanofibre, L1 and/or L2 comprises a amino-substituted hydrocarbon, and SE2 is a MWCNT.

C2.3.17: a CMU, where SE1 is a carbon nanofibre, L1 and/or L2 comprises a amino-substituted hydrocarbon, and SE2 is a SWCNT.

C2.3.18: a CMU, where SE1 is a carbon nanofibre, L1 and/or L2 comprises a amino-substituted hydrocarbon, and SE2 is a GS.

C2.3.19: a CMU, where SE1 is a carbon nanofibre, L1 and/or L2 comprises a amino-substituted hydrocarbon, and SE2 is a nanotube.

C2.3.20: a CMU, where SE1 is a carbon nanofibre, L1 and/or L2 comprises a amino-substituted hydrocarbon, and SE2 is a BNNT.

C2.3.21: a CMU, where SE1 is a carbon nanofibre, L1 and/or L2 comprises a amino-substituted hydrocarbon, and SE2 is a polyacrylate.

C2.3.22: a CMU, where SE1 is a carbon nanofibre, L1 and/or L2 comprises a amino-substituted hydrocarbon, and SE2 is a polyolefine.

C2.4.1: a CMU, where SE1 is a carbon nanofibre, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and.

C2.4.2: a CMU, where SE1 is a carbon nanofibre, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and SE2 is copolymer.

C2.4.3: a CMU, where SE1 is a carbon nanofibre, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and SE2 is a high density polyethylene.

C2.4.4: a CMU, where SE1 is a carbon nanofibre, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and SE2 is a linear low density polyethylene.

C2.4.5: a CMU, where SE1 is a carbon nanofibre, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and SE2 is a low density polyethylene.

C2.4.6: a CMU, where SE1 is a carbon nanofibre, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and SE2 is a nylon.

C2.4.7: a CMU, where SE1 is a carbon nanofibre, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and SE2 is a polyamide.

C2.4.8: a CMU, where SE1 is a carbon nanofibre, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and SE2 is a polycarbonate.

C2.4.9: a CMU, where SE1 is a carbon nanofibre, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and SE2 is a polyethylene.

C2.4.10: a CMU, where SE1 is a carbon nanofibre, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and SE2 is a polymer.

C2.4.11: a CMU, where SE1 is a carbon nanofibre, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and SE2 is a polypropylene.

C2.4.12: a CMU, where SE1 is a carbon nanofibre, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and SE2 is a polystyrene.

C2.4.13: a CMU, where SE1 is a carbon nanofibre, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and SE2 is an epoxy-based polymer.

C2.4.14: a CMU, where SE1 is a carbon nanofibre, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and SE2 is a polyethylene terephtalate.

C2.4.15: a CMU, where SE1 is a carbon nanofibre, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and SE2 is a polyvinylchloride.

C2.4.16: a CMU, where SE1 is a carbon nanofibre, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and SE2 is a MWCNT.

C2.4.17: a CMU, where SE1 is a carbon nanofibre, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and SE2 is a SWCNT.

C2.4.18: a CMU, where SE1 is a carbon nanofibre, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and SE2 is a GS.

C2.4.19: a CMU, where SE1 is a carbon nanofibre, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and SE2 is a nanotube.

C2.4.20: a CMU, where SE1 is a carbon nanofibre, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and SE2 is a BNNT.

C2.4.21: a CMU, where SE1 is a carbon nanofibre, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and SE2 is a polyacrylate.

C2.4.22: a CMU, where SE1 is a carbon nanofibre, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and SE2 is a polyolefine.

C2.5.1: a CMU, where SE1 is a carbon nanofibre, L1 and/or L2 comprises a halogen, nitro group, amine, thiol, alcohol, ester, amide, carboxylic acid, phenol, indole, imidazole, sulfonate or phophate, and.

C2.5.2: a CMU, where SE1 is a carbon nanofibre, L1 and/or L2 comprises a halogen, nitro group, amine, thiol, alcohol, ester, amide, carboxylic acid, phenol, indole, imidazole, sulfonate or phophate, and SE2 is copolymer.

C2.5.3: a CMU, where SE1 is a carbon nanofibre, L1 and/or L2 comprises a halogen, nitro group, amine, thiol, alcohol, ester, amide, carboxylic acid, phenol, indole, imidazole, sulfonate or phophate, and SE2 is a high density polyethylene.

C2.5.4: a CMU, where SE1 is a carbon nanofibre, L1 and/or L2 comprises a halogen, nitro group, amine, thiol, alcohol, ester, amide, carboxylic acid, phenol, indole, imidazole, sulfonate or phophate, and SE2 is a linear low density polyethylene.

C2.5.5: a CMU, where SE1 is a carbon nanofibre, L1 and/or L2 comprises a halogen, nitro group, amine, thiol, alcohol, ester, amide, carboxylic acid, phenol, indole, imidazole, sulfonate or phophate, and SE2 is a low density polyethylene.

C2.5.6: a CMU, where SE1 is a carbon nanofibre, L1 and/or L2 comprises a halogen, nitro group, amine, thiol, alcohol, ester, amide, carboxylic acid, phenol, indole, imidazole, sulfonate or phophate, and SE2 is a nylon.

C2.5.7: a CMU, where SE1 is a carbon nanofibre, L1 and/or L2 comprises a halogen, nitro group, amine, thiol, alcohol, ester, amide, carboxylic acid, phenol, indole, imidazole, sulfonate or phophate, and SE2 is a polyamide.

C2.5.8: a CMU, where SE1 is a carbon nanofibre, L1 and/or L2 comprises a halogen, nitro group, amine, thiol, alcohol, ester, amide, carboxylic acid, phenol, indole, imidazole, sulfonate or phophate, and SE2 is a polycarbonate.

C2.5.9: a CMU, where SE1 is a carbon nanofibre, L1 and/or L2 comprises a halogen, nitro group, amine, thiol, alcohol, ester, amide, carboxylic acid, phenol, indole, imidazole, sulfonate or phophate, and SE2 is a polyethylene.

C2.5.10: a CMU, where SE1 is a carbon nanofibre, L1 and/or L2 comprises a halogen, nitro group, amine, thiol, alcohol, ester, amide, carboxylic acid, phenol, indole, imidazole, sulfonate or phophate, and SE2 is a polymer.

C2.5.11: a CMU, where SE1 is a carbon nanofibre, L1 and/or L2 comprises a halogen, nitro group, amine, thiol, alcohol, ester, amide, carboxylic acid, phenol, indole, imidazole, sulfonate or phophate, and SE2 is a polypropylene.

C2.5.12: a CMU, where SE1 is a carbon nanofibre, L1 and/or L2 comprises a halogen, nitro group, amine, thiol, alcohol, ester, amide, carboxylic acid, phenol, indole, imidazole, sulfonate or phophate, and SE2 is a polystyrene.

C2.5.13: a CMU, where SE1 is a carbon nanofibre, L1 and/or L2 comprises a halogen, nitro group, amine, thiol, alcohol, ester, amide, carboxylic acid, phenol, indole, imidazole, sulfonate or phophate, and SE2 is an epoxy-based polymer.

C2.5.14: a CMU, where SE1 is a carbon nanofibre, L1 and/or L2 comprises a halogen, nitro group, amine, thiol, alcohol, ester, amide, carboxylic acid, phenol, indole, imidazole, sulfonate or phophate, and SE2 is a polyethylene terephtalate.

C2.5.15: a CMU, where SE1 is a carbon nanofibre, L1 and/or L2 comprises a halogen, nitro group, amine, thiol, alcohol, ester, amide, carboxylic acid, phenol, indole, imidazole, sulfonate or phophate, and SE2 is a polyvinylchloride.

C2.5.16: a CMU, where SE1 is a carbon nanofibre, L1 and/or L2 comprises a halogen, nitro group, amine, thiol, alcohol, ester, amide, carboxylic acid, phenol, indole, imidazole, sulfonate or phophate, and SE2 is a MWCNT.

C2.5.17: a CMU, where SE1 is a carbon nanofibre, L1 and/or L2 comprises a halogen, nitro group, amine, thiol, alcohol, ester, amide, carboxylic acid, phenol, indole, imidazole, sulfonate or phophate, and SE2 is a SWCNT.

C2.5.18: a CMU, where SE1 is a carbon nanofibre, L1 and/or L2 comprises a halogen, nitro group, amine, thiol, alcohol, ester, amide, carboxylic acid, phenol, indole, imidazole, sulfonate or phophate, and SE2 is a GS.

C2.5.19: a CMU, where SE1 is a carbon nanofibre, L1 and/or L2 comprises a halogen, nitro group, amine, thiol, alcohol, ester, amide, carboxylic acid, phenol, indole, imidazole, sulfonate or phophate, and SE2 is a nanotube.

C2.5.20: a CMU, where SE1 is a carbon nanofibre, L1 and/or L2 comprises a halogen, nitro group, amine, thiol, alcohol, ester, amide, carboxylic acid, phenol, indole, imidazole, sulfonate or phophate, and SE2 is a BNNT.

C2.5.21: a CMU, where SE1 is a carbon nanofibre, L1 and/or L2 comprises a halogen, nitro group, amine, thiol, alcohol, ester, amide, carboxylic acid, phenol, indole, imidazole, sulfonate or phophate, and SE2 is a polyacrylate.

C2.5.22: a CMU, where SE1 is a carbon nanofibre, L1 and/or L2 comprises a halogen, nitro group, amine, thiol, alcohol, ester, amide, carboxylic acid, phenol, indole, imidazole, sulfonate or phophate, and SE2 is a polyolefine.

C2.6.1: a CMU, where SE1 is a carbon nanofibre, L1 and/or L2 comprises an C1-C10 alkane, and.

C2.6.2: a CMU, where SE1 is a carbon nanofibre, L1 and/or L2 comprises an C1-C10 alkane, and SE2 is copolymer.

C2.6.3: a CMU, where SE1 is a carbon nanofibre, L1 and/or L2 comprises an C1-C10 alkane, and SE2 is a high density polyethylene.

C2.6.4: a CMU, where SE1 is a carbon nanofibre, L1 and/or L2 comprises an C1-C10 alkane, and SE2 is a linear low density polyethylene.

C2.6.5: a CMU, where SE1 is a carbon nanofibre, L1 and/or L2 comprises an C1-C10 alkane, and SE2 is a low density polyethylene.

C2.6.6: a CMU, where SE1 is a carbon nanofibre, L1 and/or L2 comprises an C1-C10 alkane, and SE2 is a nylon.

C2.6.7: a CMU, where SE1 is a carbon nanofibre, L1 and/or L2 comprises an C1-C10 alkane, and SE2 is a polyamide.

C2.6.8: a CMU, where SE1 is a carbon nanofibre, L1 and/or L2 comprises an C1-C10 alkane, and SE2 is a polycarbonate.

C2.6.9: a CMU, where SE1 is a carbon nanofibre, L1 and/or L2 comprises an C1-C10 alkane, and SE2 is a polyethylene.

C2.6.10: a CMU, where SE1 is a carbon nanofibre, L1 and/or L2 comprises an C1-C10 alkane, and SE2 is a polymer.

C2.6.11: a CMU, where SE1 is a carbon nanofibre, L1 and/or L2 comprises an C1-C10 alkane, and SE2 is a polypropylene.

C2.6.12: a CMU, where SE1 is a carbon nanofibre, L1 and/or L2 comprises an C1-C10 alkane, and SE2 is a polystyrene.

C2.6.13: a CMU, where SE1 is a carbon nanofibre, L1 and/or L2 comprises an C1-C10 alkane, and SE2 is an epoxy-based polymer.

C2.6.14: a CMU, where SE1 is a carbon nanofibre, L1 and/or L2 comprises an C1-C10 alkane, and SE2 is a polyethylene terephtalate.

C2.6.15: a CMU, where SE1 is a carbon nanofibre, L1 and/or L2 comprises an C1-C10 alkane, and SE2 is a polyvinylchloride.

C2.6.16: a CMU, where SE1 is a carbon nanofibre, L1 and/or L2 comprises an C1-C10 alkane, and SE2 is a MWCNT.

C2.6.17: a CMU, where SE1 is a carbon nanofibre, L1 and/or L2 comprises an C1-C10 alkane, and SE2 is a SWCNT.

C2.6.18: a CMU, where SE1 is a carbon nanofibre, L1 and/or L2 comprises an C1-C10 alkane, and SE2 is a GS.

C2.6.19: a CMU, where SE1 is a carbon nanofibre, L1 and/or L2 comprises an C1-C10 alkane, and SE2 is a nanotube.

C2.6.20: a CMU, where SE1 is a carbon nanofibre, L1 and/or L2 comprises an C1-C10 alkane, and SE2 is a BNNT.

C2.6.21: a CMU, where SE1 is a carbon nanofibre, L1 and/or L2 comprises an C1-C10 alkane, and SE2 is a polyacrylate.

C2.6.22: a CMU, where SE1 is a carbon nanofibre, L1 and/or L2 comprises an C1-C10 alkane, and SE2 is a polyolefine.

C2.7.1: a CMU, where SE1 is a carbon nanofibre, L1 and/or L2 comprises a detergent comprising a C4-C25 alkane and a polar end group, and.

C2.7.2: a CMU, where SE1 is a carbon nanofibre, L1 and/or L2 comprises a detergent comprising a C4-C25 alkane and a polar end group, and SE2 is copolymer.

C2.7.3: a CMU, where SE1 is a carbon nanofibre, L1 and/or L2 comprises a detergent comprising a C4-C25 alkane and a polar end group, and SE2 is a high density polyethylene.

C2.7.4: a CMU, where SE1 is a carbon nanofibre, L1 and/or L2 comprises a detergent comprising a C4-C25 alkane and a polar end group, and SE2 is a linear low density polyethylene.

C2.7.5: a CMU, where SE1 is a carbon nanofibre, L1 and/or L2 comprises a detergent comprising a C4-C25 alkane and a polar end group, and SE2 is a low density polyethylene.

C2.7.6: a CMU, where SE1 is a carbon nanofibre, L1 and/or L2 comprises a detergent comprising a C4-C25 alkane and a polar end group, and SE2 is a nylon.

C2.7.7: a CMU, where SE1 is a carbon nanofibre, L1 and/or L2 comprises a detergent comprising a C4-C25 alkane and a polar end group, and SE2 is a polyamide.

C2.7.8: a CMU, where SE1 is a carbon nanofibre, L1 and/or L2 comprises a detergent comprising a C4-C25 alkane and a polar end group, and SE2 is a polycarbonate.

C2.7.9: a CMU, where SE1 is a carbon nanofibre, L1 and/or L2 comprises a detergent comprising a C4-C25 alkane and a polar end group, and SE2 is a polyethylene.

C2.7.10: a CMU, where SE1 is a carbon nanofibre, L1 and/or L2 comprises a detergent comprising a C4-C25 alkane and a polar end group, and SE2 is a polymer.

C2.7.11: a CMU, where SE1 is a carbon nanofibre, L1 and/or L2 comprises a detergent comprising a C4-C25 alkane and a polar end group, and SE2 is a polypropylene.

C2.7.12: a CMU, where SE1 is a carbon nanofibre, L1 and/or L2 comprises a detergent comprising a C4-C25 alkane and a polar end group, and SE2 is a polystyrene.

C2.7.13: a CMU, where SE1 is a carbon nanofibre, L1 and/or L2 comprises a detergent comprising a C4-C25 alkane and a polar end group, and SE2 is an epoxy-based polymer.

C2.7.14: a CMU, where SE1 is a carbon nanofibre, L1 and/or L2 comprises a detergent comprising a C4-C25 alkane and a polar end group, and SE2 is a polyethylene terephtalate.

C2.7.15: a CMU, where SE1 is a carbon nanofibre, L1 and/or L2 comprises a detergent comprising a C4-C25 alkane and a polar end group, and SE2 is a polyvinylchloride.

C2.7.16: a CMU, where SE1 is a carbon nanofibre, L1 and/or L2 comprises a detergent comprising a C4-C25 alkane and a polar end group, and SE2 is a MWCNT.

C2.7.17: a CMU, where SE1 is a carbon nanofibre, L1 and/or L2 comprises a detergent comprising a C4-C25 alkane and a polar end group, and SE2 is a SWCNT.

C2.7.18: a CMU, where SE1 is a carbon nanofibre, L1 and/or L2 comprises a detergent comprising a C4-C25 alkane and a polar end group, and SE2 is a GS.

C2.7.19: a CMU, where SE1 is a carbon nanofibre, L1 and/or L2 comprises a detergent comprising a C4-C25 alkane and a polar end group, and SE2 is a nanotube.

C2.7.20: a CMU, where SE1 is a carbon nanofibre, L1 and/or L2 comprises a detergent comprising a C4-C25 alkane and a polar end group, and SE2 is a BNNT.

C2.7.21: a CMU, where SE1 is a carbon nanofibre, L1 and/or L2 comprises a detergent comprising a C4-C25 alkane and a polar end group, and SE2 is a polyacrylate.

C2.7.22: a CMU, where SE1 is a carbon nanofibre, L1 and/or L2 comprises a detergent comprising a C4-C25 alkane and a polar end group, and SE2 is a polyolefine.

C2.8.1: a CMU, where SE1 is a carbon nanofibre, L1 and/or L2 comprises a lactam, such as N-methyl-pyrrolidone and lactone, and.

C2.8.2: a CMU, where SE1 is a carbon nanofibre, L1 and/or L2 comprises a lactam, such as N-methyl-pyrrolidone and lactone, and SE2 is copolymer.

C2.8.3: a CMU, where SE1 is a carbon nanofibre, L1 and/or L2 comprises a lactam, such as N-methyl-pyrrolidone and lactone, and SE2 is a high density polyethylene.

C2.8.4: a CMU, where SE1 is a carbon nanofibre, L1 and/or L2 comprises a lactam, such as N-methyl-pyrrolidone and lactone, and SE2 is a linear low density polyethylene.

C2.8.5: a CMU, where SE1 is a carbon nanofibre, L1 and/or L2 comprises a lactam, such as N-methyl-pyrrolidone and lactone, and SE2 is a low density polyethylene.

C2.8.6: a CMU, where SE1 is a carbon nanofibre, L1 and/or L2 comprises a lactam, such as N-methyl-pyrrolidone and lactone, and SE2 is a nylon.

C2.8.7: a CMU, where SE1 is a carbon nanofibre, L1 and/or L2 comprises a lactam, such as N-methyl-pyrrolidone and lactone, and SE2 is a polyamide.

C2.8.8: a CMU, where SE1 is a carbon nanofibre, L1 and/or L2 comprises a lactam, such as N-methyl-pyrrolidone and lactone, and SE2 is a polycarbonate.

C2.8.9: a CMU, where SE1 is a carbon nanofibre, L1 and/or L2 comprises a lactam, such as N-methyl-pyrrolidone and lactone, and SE2 is a polyethylene.

C2.8.10: a CMU, where SE1 is a carbon nanofibre, L1 and/or L2 comprises a lactam, such as N-methyl-pyrrolidone and lactone, and SE2 is a polymer.

C2.8.11: a CMU, where SE1 is a carbon nanofibre, L1 and/or L2 comprises a lactam, such as N-methyl-pyrrolidone and lactone, and SE2 is a polypropylene.

C2.8.12: a CMU, where SE1 is a carbon nanofibre, L1 and/or L2 comprises a lactam, such as N-methyl-pyrrolidone and lactone, and SE2 is a polystyrene.

C2.8.13: a CMU, where SE1 is a carbon nanofibre, L1 and/or L2 comprises a lactam, such as N-methyl-pyrrolidone and lactone, and SE2 is an epoxy-based polymer.

C2.8.14: a CMU, where SE1 is a carbon nanofibre, L1 and/or L2 comprises a lactam, such as N-methyl-pyrrolidone and lactone, and SE2 is a polyethylene terephtalate.

C2.8.15: a CMU, where SE1 is a carbon nanofibre, L1 and/or L2 comprises a lactam, such as N-methyl-pyrrolidone and lactone, and SE2 is a polyvinylchloride.

C2.8.16: a CMU, where SE1 is a carbon nanofibre, L1 and/or L2 comprises a lactam, such as N-methyl-pyrrolidone and lactone, and SE2 is a MWCNT.

C2.8.17: a CMU, where SE1 is a carbon nanofibre, L1 and/or L2 comprises a lactam, such as N-methyl-pyrrolidone and lactone, and SE2 is a SWCNT.

C2.8.18: a CMU, where SE1 is a carbon nanofibre, L1 and/or L2 comprises a lactam, such as N-methyl-pyrrolidone and lactone, and SE2 is a GS.

C2.8.19: a CMU, where SE1 is a carbon nanofibre, L1 and/or L2 comprises a lactam, such as N-methyl-pyrrolidone and lactone, and SE2 is a nanotube.

C2.8.20: a CMU, where SE1 is a carbon nanofibre, L1 and/or L2 comprises a lactam, such as N-methyl-pyrrolidone and lactone, and SE2 is a BNNT.

C2.8.21: a CMU, where SE1 is a carbon nanofibre, L1 and/or L2 comprises a lactam, such as N-methyl-pyrrolidone and lactone, and SE2 is a polyacrylate.

C2.8.22: a CMU, where SE1 is a carbon nanofibre, L1 and/or L2 comprises a lactam, such as N-methyl-pyrrolidone and lactone, and SE2 is a polyolefine.

C2.9.1: a CMU, where SE1 is a carbon nanofibre, L1 and/or L2 comprises a amino acid residue such as phenylalanine, tyrosine, tryptophan, or histidine, and.

C2.9.2: a CMU, where SE1 is a carbon nanofibre, L1 and/or L2 comprises a amino acid residue such as phenylalanine, tyrosine, tryptophan, or histidine, and SE2 is copolymer.

C2.9.3: a CMU, where SE1 is a carbon nanofibre, L1 and/or L2 comprises a amino acid residue such as phenylalanine, tyrosine, tryptophan, or histidine, and SE2 is a high density polyethylene.

C2.9.4: a CMU, where SE1 is a carbon nanofibre, L1 and/or L2 comprises a amino acid residue such as phenylalanine, tyrosine, tryptophan, or histidine, and SE2 is a linear low density polyethylene.

C2.9.5: a CMU, where SE1 is a carbon nanofibre, L1 and/or L2 comprises a amino acid residue such as phenylalanine, tyrosine, tryptophan, or histidine, and SE2 is a low density polyethylene.

C2.9.6: a CMU, where SE1 is a carbon nanofibre, L1 and/or L2 comprises a amino acid residue such as phenylalanine, tyrosine, tryptophan, or histidine, and SE2 is a nylon.

C2.9.7: a CMU, where SE1 is a carbon nanofibre, L1 and/or L2 comprises a amino acid residue such as phenylalanine, tyrosine, tryptophan, or histidine, and SE2 is a polyamide.

C2.9.8: a CMU, where SE1 is a carbon nanofibre, L1 and/or L2 comprises a amino acid residue such as phenylalanine, tyrosine, tryptophan, or histidine, and SE2 is a polycarbonate.

C2.9.9: a CMU, where SE1 is a carbon nanofibre, L1 and/or L2 comprises a amino acid residue such as phenylalanine, tyrosine, tryptophan, or histidine, and SE2 is a polyethylene.

C2.9.10: a CMU, where SE1 is a carbon nanofibre, L1 and/or L2 comprises a amino acid residue such as phenylalanine, tyrosine, tryptophan, or histidine, and SE2 is a polymer.

C2.9.11: a CMU, where SE1 is a carbon nanofibre, L1 and/or L2 comprises a amino acid residue such as phenylalanine, tyrosine, tryptophan, or histidine, and SE2 is a polypropylene.

C2.9.12: a CMU, where SE1 is a carbon nanofibre, L1 and/or L2 comprises a amino acid residue such as phenylalanine, tyrosine, tryptophan, or histidine, and SE2 is a polystyrene.

C2.9.13: a CMU, where SE1 is a carbon nanofibre, L1 and/or L2 comprises a amino acid residue such as phenylalanine, tyrosine, tryptophan, or histidine, and SE2 is an epoxy-based polymer.

C2.9.14: a CMU, where SE1 is a carbon nanofibre, L1 and/or L2 comprises a amino acid residue such as phenylalanine, tyrosine, tryptophan, or histidine, and SE2 is a polyethylene terephtalate.

C2.9.15: a CMU, where SE1 is a carbon nanofibre, L1 and/or L2 comprises a amino acid residue such as phenylalanine, tyrosine, tryptophan, or histidine, and SE2 is a polyvinylchloride.

C2.9.16: a CMU, where SE1 is a carbon nanofibre, L1 and/or L2 comprises a amino acid residue such as phenylalanine, tyrosine, tryptophan, or histidine, and SE2 is a MWCNT.

C2.9.17: a CMU, where SE1 is a carbon nanofibre, L1 and/or L2 comprises a amino acid residue such as phenylalanine, tyrosine, tryptophan, or histidine, and SE2 is a SWCNT.

C2.9.18: a CMU, where SE1 is a carbon nanofibre, L1 and/or L2 comprises a amino acid residue such as phenylalanine, tyrosine, tryptophan, or histidine, and SE2 is a GS.

C2.9.19: a CMU, where SE1 is a carbon nanofibre, L1 and/or L2 comprises a amino acid residue such as phenylalanine, tyrosine, tryptophan, or histidine, and SE2 is a nanotube.

C2.9.20: a CMU, where SE1 is a carbon nanofibre, L1 and/or L2 comprises a amino acid residue such as phenylalanine, tyrosine, tryptophan, or histidine, and SE2 is a BNNT.

C2.9.21: a CMU, where SE1 is a carbon nanofibre, L1 and/or L2 comprises a amino acid residue such as phenylalanine, tyrosine, tryptophan, or histidine, and SE2 is a polyacrylate.

C2.9.22: a CMU, where SE1 is a carbon nanofibre, L1 and/or L2 comprises a amino acid residue such as phenylalanine, tyrosine, tryptophan, or histidine, and SE2 is a polyolefine.

C2.10.1: a CMU, where SE1 is a carbon nanofibre, L1 and/or L2 comprises a heteroaromatic system, including pyrole, thiophene, furane, pyrazole, imidazole, isoxazole, oxazole, isothiazole, thiazole, pyridine and perylene bisimides, and.

C2.10.2: a CMU, where SE1 is a carbon nanofibre, L1 and/or L2 comprises a heteroaromatic system, including pyrole, thiophene, furane, pyrazole, imidazole, isoxazole, oxazole, isothiazole, thiazole, pyridine and perylene bisimides, and SE2 is copolymer.

C2.10.3: a CMU, where SE1 is a carbon nanofibre, L1 and/or L2 comprises a heteroaromatic system, including pyrole, thiophene, furane, pyrazole, imidazole, isoxazole, oxazole, isothiazole, thiazole, pyridine and perylene bisimides, and SE2 is a high density polyethylene.

C2.10.4: a CMU, where SE1 is a carbon nanofibre, L1 and/or L2 comprises a heteroaromatic system, including pyrole, thiophene, furane, pyrazole, imidazole, isoxazole, oxazole, isothiazole, thiazole, pyridine and perylene bisimides, and SE2 is a linear low density polyethylene.

C2.10.5: a CMU, where SE1 is a carbon nanofibre, L1 and/or L2 comprises a heteroaromatic system, including pyrole, thiophene, furane, pyrazole, imidazole, isoxazole, oxazole, isothiazole, thiazole, pyridine and perylene bisimides, and SE2 is a low density polyethylene.

C2.10.6: a CMU, where SE1 is a carbon nanofibre, L1 and/or L2 comprises a heteroaromatic system, including pyrole, thiophene, furane, pyrazole, imidazole, isoxazole, oxazole, isothiazole, thiazole, pyridine and perylene bisimides, and SE2 is a nylon.

C2.10.7: a CMU, where SE1 is a carbon nanofibre, L1 and/or L2 comprises a heteroaromatic system, including pyrole, thiophene, furane, pyrazole, imidazole, isoxazole, oxazole, isothiazole, thiazole, pyridine and perylene bisimides, and SE2 is a polyamide.

C2.10.8: a CMU, where SE1 is a carbon nanofibre, L1 and/or L2 comprises a heteroaromatic system, including pyrole, thiophene, furane, pyrazole, imidazole, isoxazole, oxazole, isothiazole, thiazole, pyridine and perylene bisimides, and SE2 is a polycarbonate.

C2.10.9: a CMU, where SE1 is a carbon nanofibre, L1 and/or L2 comprises a heteroaromatic system, including pyrole, thiophene, furane, pyrazole, imidazole, isoxazole, oxazole, isothiazole, thiazole, pyridine and perylene bisimides, and SE2 is a polyethylene.

C2.10.10: a CMU, where SE1 is a carbon nanofibre, L1 and/or L2 comprises a heteroaromatic system, including pyrole, thiophene, furane, pyrazole, imidazole, isoxazole, oxazole, isothiazole, thiazole, pyridine and perylene bisimides, and SE2 is a polymer.

C2.10.11: a CMU, where SE1 is a carbon nanofibre, L1 and/or L2 comprises a heteroaromatic system, including pyrole, thiophene, furane, pyrazole, imidazole, isoxazole, oxazole, isothiazole, thiazole, pyridine and perylene bisimides, and SE2 is a polypropylene.

C2.10.12: a CMU, where SE1 is a carbon nanofibre, L1 and/or L2 comprises a heteroaromatic system, including pyrole, thiophene, furane, pyrazole, imidazole, isoxazole, oxazole, isothiazole, thiazole, pyridine and perylene bisimides, and SE2 is a polystyrene.

C2.10.13: a CMU, where SE1 is a carbon nanofibre, L1 and/or L2 comprises a heteroaromatic system, including pyrole, thiophene, furane, pyrazole, imidazole, isoxazole, oxazole, isothiazole, thiazole, pyridine and perylene bisimides, and SE2 is an epoxy-based polymer.

C2.10.14: a CMU, where SE1 is a carbon nanofibre, L1 and/or L2 comprises a heteroaromatic system, including pyrole, thiophene, furane, pyrazole, imidazole, isoxazole, oxazole, isothiazole, thiazole, pyridine and perylene bisimides, and SE2 is a polyethylene terephtalate.

C2.10.15: a CMU, where SE1 is a carbon nanofibre, L1 and/or L2 comprises a heteroaromatic system, including pyrole, thiophene, furane, pyrazole, imidazole, isoxazole, oxazole, isothiazole, thiazole, pyridine and perylene bisimides, and SE2 is a polyvinylchloride.

C2.10.16: a CMU, where SE1 is a carbon nanofibre, L1 and/or L2 comprises a heteroaromatic system, including pyrole, thiophene, furane, pyrazole, imidazole, isoxazole, oxazole, isothiazole, thiazole, pyridine and perylene bisimides, and SE2 is a MWCNT.

C2.10.17: a CMU, where SE1 is a carbon nanofibre, L1 and/or L2 comprises a heteroaromatic system, including pyrole, thiophene, furane, pyrazole, imidazole, isoxazole, oxazole, isothiazole, thiazole, pyridine and perylene bisimides, and SE2 is a SWCNT.

C2.10.18: a CMU, where SE1 is a carbon nanofibre, L1 and/or L2 comprises a heteroaromatic system, including pyrole, thiophene, furane, pyrazole, imidazole, isoxazole, oxazole, isothiazole, thiazole, pyridine and perylene bisimides, and SE2 is a GS.

C2.10.19: a CMU, where SE1 is a carbon nanofibre, L1 and/or L2 comprises a heteroaromatic system, including pyrole, thiophene, furane, pyrazole, imidazole, isoxazole, oxazole, isothiazole, thiazole, pyridine and perylene bisimides, and SE2 is a nanotube.

C2.10.20: a CMU, where SE1 is a carbon nanofibre, L1 and/or L2 comprises a heteroaromatic system, including pyrole, thiophene, furane, pyrazole, imidazole, isoxazole, oxazole, isothiazole, thiazole, pyridine and perylene bisimides, and SE2 is a BNNT.

C2.10.21: a CMU, where SE1 is a carbon nanofibre, L1 and/or L2 comprises a heteroaromatic system, including pyrole, thiophene, furane, pyrazole, imidazole, isoxazole, oxazole, isothiazole, thiazole, pyridine and perylene bisimides, and SE2 is a polyacrylate.

C2.10.22: a CMU, where SE1 is a carbon nanofibre, L1 and/or L2 comprises a heteroaromatic system, including pyrole, thiophene, furane, pyrazole, imidazole, isoxazole, oxazole, isothiazole, thiazole, pyridine and perylene bisimides, and SE2 is a polyolefine.

C2.11.1: a CMU, where SE1 is a carbon nanofibre, L1 and/or L2 comprises a fused ring system, composed of either aromatic, non-aromatic or anti-aromatic rings or combinations thereof, and.

C2.11.2: a CMU, where SE1 is a carbon nanofibre, L1 and/or L2 comprises a fused ring system, composed of either aromatic, non-aromatic or anti-aromatic rings or combinations thereof, and SE2 is copolymer.

C2.11.3: a CMU, where SE1 is a carbon nanofibre, L1 and/or L2 comprises a fused ring system, composed of either aromatic, non-aromatic or anti-aromatic rings or combinations thereof, and SE2 is a high density polyethylene.

C2.11.4: a CMU, where SE1 is a carbon nanofibre, L1 and/or L2 comprises a fused ring system, composed of either aromatic, non-aromatic or anti-aromatic rings or combinations thereof, and SE2 is a linear low density polyethylene.

C2.11.5: a CMU, where SE1 is a carbon nanofibre, L1 and/or L2 comprises a fused ring system, composed of either aromatic, non-aromatic or anti-aromatic rings or combinations thereof, and SE2 is a low density polyethylene.

C2.11.6: a CMU, where SE1 is a carbon nanofibre, L1 and/or L2 comprises a fused ring system, composed of either aromatic, non-aromatic or anti-aromatic rings or combinations thereof, and SE2 is a nylon.

C2.11.7: a CMU, where SE1 is a carbon nanofibre, L1 and/or L2 comprises a fused ring system, composed of either aromatic, non-aromatic or anti-aromatic rings or combinations thereof, and SE2 is a polyamide.

C2.11.8: a CMU, where SE1 is a carbon nanofibre, L1 and/or L2 comprises a fused ring system, composed of either aromatic, non-aromatic or anti-aromatic rings or combinations thereof, and SE2 is a polycarbonate.

C2.11.9: a CMU, where SE1 is a carbon nanofibre, L1 and/or L2 comprises a fused ring system, composed of either aromatic, non-aromatic or anti-aromatic rings or combinations thereof, and SE2 is a polyethylene.

C2.11.10: a CMU, where SE1 is a carbon nanofibre, L1 and/or L2 comprises a fused ring system, composed of either aromatic, non-aromatic or anti-aromatic rings or combinations thereof, and SE2 is a polymer.

C2.11.11: a CMU, where SE1 is a carbon nanofibre, L1 and/or L2 comprises a fused ring system, composed of either aromatic, non-aromatic or anti-aromatic rings or combinations thereof, and SE2 is a polypropylene.

C2.11.12: a CMU, where SE1 is a carbon nanofibre, L1 and/or L2 comprises a fused ring system, composed of either aromatic, non-aromatic or anti-aromatic rings or combinations thereof, and SE2 is a polystyrene.

C2.11.13: a CMU, where SE1 is a carbon nanofibre, L1 and/or L2 comprises a fused ring system, composed of either aromatic, non-aromatic or anti-aromatic rings or combinations thereof, and SE2 is an epoxy-based polymer.

C2.11.14: a CMU, where SE1 is a carbon nanofibre, L1 and/or L2 comprises a fused ring system, composed of either aromatic, non-aromatic or anti-aromatic rings or combinations thereof, and SE2 is a polyethylene terephtalate.

C2.11.15: a CMU, where SE1 is a carbon nanofibre, L1 and/or L2 comprises a fused ring system, composed of either aromatic, non-aromatic or anti-aromatic rings or combinations thereof, and SE2 is a polyvinylchloride.

C2.11.16: a CMU, where SE1 is a carbon nanofibre, L1 and/or L2 comprises a fused ring system, composed of either aromatic, non-aromatic or anti-aromatic rings or combinations thereof, and SE2 is a MWCNT.

C2.11.17: a CMU, where SE1 is a carbon nanofibre, L1 and/or L2 comprises a fused ring system, composed of either aromatic, non-aromatic or anti-aromatic rings or combinations thereof, and SE2 is a SWCNT.

C2.11.18: a CMU, where SE1 is a carbon nanofibre, L1 and/or L2 comprises a fused ring system, composed of either aromatic, non-aromatic or anti-aromatic rings or combinations thereof, and SE2 is a GS.

C2.11.19: a CMU, where SE1 is a carbon nanofibre, L1 and/or L2 comprises a fused ring system, composed of either aromatic, non-aromatic or anti-aromatic rings or combinations thereof, and SE2 is a nanotube.

C2.11.20: a CMU, where SE1 is a carbon nanofibre, L1 and/or L2 comprises a fused ring system, composed of either aromatic, non-aromatic or anti-aromatic rings or combinations thereof, and SE2 is a BNNT.

C2.11.21: a CMU, where SE1 is a carbon nanofibre, L1 and/or L2 comprises a fused ring system, composed of either aromatic, non-aromatic or anti-aromatic rings or combinations thereof, and SE2 is a polyacrylate.

C2.11.22: a CMU, where SE1 is a carbon nanofibre, L1 and/or L2 comprises a fused ring system, composed of either aromatic, non-aromatic or anti-aromatic rings or combinations thereof, and SE2 is a polyolefine.

C3.1.1: a CMU, where SE1 is a carbon nanothread, and.

C3.1.2: a CMU, where SE1 is a carbon nanothread, and SE2 is copolymer.

C3.1.3: a CMU, where SE1 is a carbon nanothread, and SE2 is a high density polyethylene.

C3.1.4: a CMU, where SE1 is a carbon nanothread, and SE2 is a linear low density polyethylene.

C3.1.5: a CMU, where SE1 is a carbon nanothread, and SE2 is a low density polyethylene.

C3.1.6: a CMU, where SE1 is a carbon nanothread, and SE2 is a nylon.

C3.1.7: a CMU, where SE1 is a carbon nanothread, and SE2 is a polyamide.

C3.1.8: a CMU, where SE1 is a carbon nanothread, and SE2 is a polycarbonate.

C3.1.9: a CMU, where SE1 is a carbon nanothread, and SE2 is a polyethylene.

C3.1.10: a CMU, where SE1 is a carbon nanothread, and SE2 is a polymer.

C3.1.11: a CMU, where SE1 is a carbon nanothread, and SE2 is a polypropylene.

C3.1.12: a CMU, where SE1 is a carbon nanothread, and SE2 is a polystyrene.

C3.1.13: a CMU, where SE1 is a carbon nanothread, and SE2 is an epoxy-based polymer.

C3.1.14: a CMU, where SE1 is a carbon nanothread, and SE2 is a polyethylene terephtalate.

C3.1.15: a CMU, where SE1 is a carbon nanothread, and SE2 is a polyvinylchloride.

C3.1.16: a CMU, where SE1 is a carbon nanothread, and SE2 is a MWCNT.

C3.1.17: a CMU, where SE1 is a carbon nanothread, and SE2 is a SWCNT.

C3.1.18: a CMU, where SE1 is a carbon nanothread, and SE2 is a GS.

C3.1.19: a CMU, where SE1 is a carbon nanothread, and SE2 is a nanotube.

C3.1.20: a CMU, where SE1 is a carbon nanothread, and SE2 is a BNNT.

C3.1.21: a CMU, where SE1 is a carbon nanothread, and SE2 is a polyacrylate.

C3.1.22: a CMU, where SE1 is a carbon nanothread, and SE2 is a polyolefine.

C3.2.1: a CMU, where SE1 is a carbon nanothread, L1 and/or L2 comprises a non-covalent ligand, and.

C3.2.2: a CMU, where SE1 is a carbon nanothread, L1 and/or L2 comprises a non-covalent ligand, and SE2 is copolymer.

C3.2.3: a CMU, where SE1 is a carbon nanothread, L1 and/or L2 comprises a non-covalent ligand, and SE2 is a high density polyethylene.

C3.2.4: a CMU, where SE1 is a carbon nanothread, L1 and/or L2 comprises a non-covalent ligand, and SE2 is a linear low density polyethylene.

C3.2.5: a CMU, where SE1 is a carbon nanothread, L1 and/or L2 comprises a non-covalent ligand, and SE2 is a low density polyethylene.

C3.2.6: a CMU, where SE1 is a carbon nanothread, L1 and/or L2 comprises a non-covalent ligand, and SE2 is a nylon.

C3.2.7: a CMU, where SE1 is a carbon nanothread, L1 and/or L2 comprises a non-covalent ligand, and SE2 is a polyamide.

C3.2.8: a CMU, where SE1 is a carbon nanothread, L1 and/or L2 comprises a non-covalent ligand, and SE2 is a polycarbonate.

C3.2.9: a CMU, where SE1 is a carbon nanothread, L1 and/or L2 comprises a non-covalent ligand, and SE2 is a polyethylene.

C3.2.10: a CMU, where SE1 is a carbon nanothread, L1 and/or L2 comprises a non-covalent ligand, and SE2 is a polymer.

C3.2.11: a CMU, where SE1 is a carbon nanothread, L1 and/or L2 comprises a non-covalent ligand, and SE2 is a polypropylene.

C3.2.12: a CMU, where SE1 is a carbon nanothread, L1 and/or L2 comprises a non-covalent ligand, and SE2 is a polystyrene.

C3.2.13: a CMU, where SE1 is a carbon nanothread, L1 and/or L2 comprises a non-covalent ligand, and SE2 is an epoxy-based polymer.

C3.2.14: a CMU, where SE1 is a carbon nanothread, L1 and/or L2 comprises a non-covalent ligand, and SE2 is a polyethylene terephtalate.

C3.2.15: a CMU, where SE1 is a carbon nanothread, L1 and/or L2 comprises a non-covalent ligand, and SE2 is a polyvinylchloride.

C3.2.16: a CMU, where SE1 is a carbon nanothread, L1 and/or L2 comprises a non-covalent ligand, and SE2 is a MWCNT.

C3.2.17: a CMU, where SE1 is a carbon nanothread, L1 and/or L2 comprises a non-covalent ligand, and SE2 is a SWCNT.

C3.2.18: a CMU, where SE1 is a carbon nanothread, L1 and/or L2 comprises a non-covalent ligand, and SE2 is a GS.

C3.2.19: a CMU, where SE1 is a carbon nanothread, L1 and/or L2 comprises a non-covalent ligand, and SE2 is a nanotube.

C3.2.20: a CMU, where SE1 is a carbon nanothread, L1 and/or L2 comprises a non-covalent ligand, and SE2 is a BNNT.

C3.2.21: a CMU, where SE1 is a carbon nanothread, L1 and/or L2 comprises a non-covalent ligand, and SE2 is a polyacrylate.

C3.2.22: a CMU, where SE1 is a carbon nanothread, L1 and/or L2 comprises a non-covalent ligand, and SE2 is a polyolefine.

C3.3.1: a CMU, where SE1 is a carbon nanothread, L1 and/or L2 comprises a amino-substituted hydrocarbon, and.

C3.3.2: a CMU, where SE1 is a carbon nanothread, L1 and/or L2 comprises a amino-substituted hydrocarbon, and SE2 is copolymer.

C3.3.3: a CMU, where SE1 is a carbon nanothread, L1 and/or L2 comprises a amino-substituted hydrocarbon, and SE2 is a high density polyethylene.

C3.3.4: a CMU, where SE1 is a carbon nanothread, L1 and/or L2 comprises a amino-substituted hydrocarbon, and SE2 is a linear low density polyethylene.

C3.3.5: a CMU, where SE1 is a carbon nanothread, L1 and/or L2 comprises a amino-substituted hydrocarbon, and SE2 is a low density polyethylene.

C3.3.6: a CMU, where SE1 is a carbon nanothread, L1 and/or L2 comprises a amino-substituted hydrocarbon, and SE2 is a nylon.

C3.3.7: a CMU, where SE1 is a carbon nanothread, L1 and/or L2 comprises a amino-substituted hydrocarbon, and SE2 is a polyamide.

C3.3.8: a CMU, where SE1 is a carbon nanothread, L1 and/or L2 comprises a amino-substituted hydrocarbon, and SE2 is a polycarbonate.

C3.3.9: a CMU, where SE1 is a carbon nanothread, L1 and/or L2 comprises a amino-substituted hydrocarbon, and SE2 is a polyethylene.

C3.3.10: a CMU, where SE1 is a carbon nanothread, L1 and/or L2 comprises a amino-substituted hydrocarbon, and SE2 is a polymer.

C3.3.11: a CMU, where SE1 is a carbon nanothread, L1 and/or L2 comprises a amino-substituted hydrocarbon, and SE2 is a polypropylene.

C3.3.12: a CMU, where SE1 is a carbon nanothread, L1 and/or L2 comprises a amino-substituted hydrocarbon, and SE2 is a polystyrene.

C3.3.13: a CMU, where SE1 is a carbon nanothread, L1 and/or L2 comprises a amino-substituted hydrocarbon, and SE2 is an epoxy-based polymer.

C3.3.14: a CMU, where SE1 is a carbon nanothread, L1 and/or L2 comprises a amino-substituted hydrocarbon, and SE2 is a polyethylene terephtalate.

C3.3.15: a CMU, where SE1 is a carbon nanothread, L1 and/or L2 comprises a amino-substituted hydrocarbon, and SE2 is a polyvinylchloride.

C3.3.16: a CMU, where SE1 is a carbon nanothread, L1 and/or L2 comprises a amino-substituted hydrocarbon, and SE2 is a MWCNT.

C3.3.17: a CMU, where SE1 is a carbon nanothread, L1 and/or L2 comprises a amino-substituted hydrocarbon, and SE2 is a SWCNT.

C3.3.18: a CMU, where SE1 is a carbon nanothread, L1 and/or L2 comprises a amino-substituted hydrocarbon, and SE2 is a GS.

C3.3.19: a CMU, where SE1 is a carbon nanothread, L1 and/or L2 comprises a amino-substituted hydrocarbon, and SE2 is a nanotube.

C3.3.20: a CMU, where SE1 is a carbon nanothread, L1 and/or L2 comprises a amino-substituted hydrocarbon, and SE2 is a BNNT.

C3.3.21: a CMU, where SE1 is a carbon nanothread, L1 and/or L2 comprises a amino-substituted hydrocarbon, and SE2 is a polyacrylate.

C3.3.22: a CMU, where SE1 is a carbon nanothread, L1 and/or L2 comprises a amino-substituted hydrocarbon, and SE2 is a polyolefine.

C3.4.1: a CMU, where SE1 is a carbon nanothread, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and.

C3.4.2: a CMU, where SE1 is a carbon nanothread, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and SE2 is copolymer.

C3.4.3: a CMU, where SE1 is a carbon nanothread, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and SE2 is a high density polyethylene.

C3.4.4: a CMU, where SE1 is a carbon nanothread, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and SE2 is a linear low density polyethylene.

C3.4.5: a CMU, where SE1 is a carbon nanothread, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and SE2 is a low density polyethylene.

C3.4.6: a CMU, where SE1 is a carbon nanothread, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and SE2 is a nylon.

C3.4.7: a CMU, where SE1 is a carbon nanothread, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and SE2 is a polyamide.

C3.4.8: a CMU, where SE1 is a carbon nanothread, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and SE2 is a polycarbonate.

C3.4.9: a CMU, where SE1 is a carbon nanothread, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and SE2 is a polyethylene.

C3.4.10: a CMU, where SE1 is a carbon nanothread, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and SE2 is a polymer.

C3.4.11: a CMU, where SE1 is a carbon nanothread, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and SE2 is a polypropylene.

C3.4.12: a CMU, where SE1 is a carbon nanothread, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and SE2 is a polystyrene.

C3.4.13: a CMU, where SE1 is a carbon nanothread, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and SE2 is an epoxy-based polymer.

C3.4.14: a CMU, where SE1 is a carbon nanothread, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and SE2 is a polyethylene terephtalate.

C3.4.15: a CMU, where SE1 is a carbon nanothread, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and SE2 is a polyvinylchloride.

C3.4.16: a CMU, where SE1 is a carbon nanothread, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and SE2 is a MWCNT.

C3.4.17: a CMU, where SE1 is a carbon nanothread, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and SE2 is a SWCNT.

C3.4.18: a CMU, where SE1 is a carbon nanothread, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and SE2 is a GS.

C3.4.19: a CMU, where SE1 is a carbon nanothread, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and SE2 is a nanotube.

C3.4.20: a CMU, where SE1 is a carbon nanothread, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and SE2 is a BNNT.

C3.4.21: a CMU, where SE1 is a carbon nanothread, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and SE2 is a polyacrylate.

C3.4.22: a CMU, where SE1 is a carbon nanothread, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and SE2 is a polyolefine.

C3.5.1: a CMU, where SE1 is a carbon nanothread, L1 and/or L2 comprises a halogen, nitro group, amine, thiol, alcohol, ester, amide, carboxylic acid, phenol, indole, imidazole, sulfonate or phophate, and.

C3.5.2: a CMU, where SE1 is a carbon nanothread, L1 and/or L2 comprises a halogen, nitro group, amine, thiol, alcohol, ester, amide, carboxylic acid, phenol, indole, imidazole, sulfonate or phophate, and SE2 is copolymer.

C3.5.3: a CMU, where SE1 is a carbon nanothread, L1 and/or L2 comprises a halogen, nitro group, amine, thiol, alcohol, ester, amide, carboxylic acid, phenol, indole, imidazole, sulfonate or phophate, and SE2 is a high density polyethylene.

C3.5.4: a CMU, where SE1 is a carbon nanothread, L1 and/or L2 comprises a halogen, nitro group, amine, thiol, alcohol, ester, amide, carboxylic acid, phenol, indole, imidazole, sulfonate or phophate, and SE2 is a linear low density polyethylene.

C3.5.5: a CMU, where SE1 is a carbon nanothread, L1 and/or L2 comprises a halogen, nitro group, amine, thiol, alcohol, ester, amide, carboxylic acid, phenol, indole, imidazole, sulfonate or phophate, and SE2 is a low density polyethylene.

C3.5.6: a CMU, where SE1 is a carbon nanothread, L1 and/or L2 comprises a halogen, nitro group, amine, thiol, alcohol, ester, amide, carboxylic acid, phenol, indole, imidazole, sulfonate or phophate, and SE2 is a nylon.

C3.5.7: a CMU, where SE1 is a carbon nanothread, L1 and/or L2 comprises a halogen, nitro group, amine, thiol, alcohol, ester, amide, carboxylic acid, phenol, indole, imidazole, sulfonate or phophate, and SE2 is a polyamide.

C3.5.8: a CMU, where SE1 is a carbon nanothread, L1 and/or L2 comprises a halogen, nitro group, amine, thiol, alcohol, ester, amide, carboxylic acid, phenol, indole, imidazole, sulfonate or phophate, and SE2 is a polycarbonate.

C3.5.9: a CMU, where SE1 is a carbon nanothread, L1 and/or L2 comprises a halogen, nitro group, amine, thiol, alcohol, ester, amide, carboxylic acid, phenol, indole, imidazole, sulfonate or phophate, and SE2 is a polyethylene.

C3.5.10: a CMU, where SE1 is a carbon nanothread, L1 and/or L2 comprises a halogen, nitro group, amine, thiol, alcohol, ester, amide, carboxylic acid, phenol, indole, imidazole, sulfonate or phophate, and SE2 is a polymer.

C3.5.11: a CMU, where SE1 is a carbon nanothread, L1 and/or L2 comprises a halogen, nitro group, amine, thiol, alcohol, ester, amide, carboxylic acid, phenol, indole, imidazole, sulfonate or phophate, and SE2 is a polypropylene.

C3.5.12: a CMU, where SE1 is a carbon nanothread, L1 and/or L2 comprises a halogen, nitro group, amine, thiol, alcohol, ester, amide, carboxylic acid, phenol, indole, imidazole, sulfonate or phophate, and SE2 is a polystyrene.

C3.5.13: a CMU, where SE1 is a carbon nanothread, L1 and/or L2 comprises a halogen, nitro group, amine, thiol, alcohol, ester, amide, carboxylic acid, phenol, indole, imidazole, sulfonate or phophate, and SE2 is an epoxy-based polymer.

C3.5.14: a CMU, where SE1 is a carbon nanothread, L1 and/or L2 comprises a halogen, nitro group, amine, thiol, alcohol, ester, amide, carboxylic acid, phenol, indole, imidazole, sulfonate or phophate, and SE2 is a polyethylene terephtalate.

C3.5.15: a CMU, where SE1 is a carbon nanothread, L1 and/or L2 comprises a halogen, nitro group, amine, thiol, alcohol, ester, amide, carboxylic acid, phenol, indole, imidazole, sulfonate or phophate, and SE2 is a polyvinylchloride.

C3.5.16: a CMU, where SE1 is a carbon nanothread, L1 and/or L2 comprises a halogen, nitro group, amine, thiol, alcohol, ester, amide, carboxylic acid, phenol, indole, imidazole, sulfonate or phophate, and SE2 is a MWCNT.

C3.5.17: a CMU, where SE1 is a carbon nanothread, L1 and/or L2 comprises a halogen, nitro group, amine, thiol, alcohol, ester, amide, carboxylic acid, phenol, indole, imidazole, sulfonate or phophate, and SE2 is a SWCNT.

C3.5.18: a CMU, where SE1 is a carbon nanothread, L1 and/or L2 comprises a halogen, nitro group, amine, thiol, alcohol, ester, amide, carboxylic acid, phenol, indole, imidazole, sulfonate or phophate, and SE2 is a GS.

C3.5.19: a CMU, where SE1 is a carbon nanothread, L1 and/or L2 comprises a halogen, nitro group, amine, thiol, alcohol, ester, amide, carboxylic acid, phenol, indole, imidazole, sulfonate or phophate, and SE2 is a nanotube.

C3.5.20: a CMU, where SE1 is a carbon nanothread, L1 and/or L2 comprises a halogen, nitro group, amine, thiol, alcohol, ester, amide, carboxylic acid, phenol, indole, imidazole, sulfonate or phophate, and SE2 is a BNNT.

C3.5.21: a CMU, where SE1 is a carbon nanothread, L1 and/or L2 comprises a halogen, nitro group, amine, thiol, alcohol, ester, amide, carboxylic acid, phenol, indole, imidazole, sulfonate or phophate, and SE2 is a polyacrylate.

C3.5.22: a CMU, where SE1 is a carbon nanothread, L1 and/or L2 comprises a halogen, nitro group, amine, thiol, alcohol, ester, amide, carboxylic acid, phenol, indole, imidazole, sulfonate or phophate, and SE2 is a polyolefine.

C3.6.1: a CMU, where SE1 is a carbon nanothread, L1 and/or L2 comprises an C1-C10 alkane, and.

C3.6.2: a CMU, where SE1 is a carbon nanothread, L1 and/or L2 comprises an C1-C10 alkane, and SE2 is copolymer.

C3.6.3: a CMU, where SE1 is a carbon nanothread, L1 and/or L2 comprises an C1-C10 alkane, and SE2 is a high density polyethylene.

C3.6.4: a CMU, where SE1 is a carbon nanothread, L1 and/or L2 comprises an C1-C10 alkane, and SE2 is a linear low density polyethylene.

C3.6.5: a CMU, where SE1 is a carbon nanothread, L1 and/or L2 comprises an C1-C10 alkane, and SE2 is a low density polyethylene.

C3.6.6: a CMU, where SE1 is a carbon nanothread, L1 and/or L2 comprises an C1-C10 alkane, and SE2 is a nylon.

C3.6.7: a CMU, where SE1 is a carbon nanothread, L1 and/or L2 comprises an C1-C10 alkane, and SE2 is a polyamide.

C3.6.8: a CMU, where SE1 is a carbon nanothread, L1 and/or L2 comprises an C1-C10 alkane, and SE2 is a polycarbonate.

C3.6.9: a CMU, where SE1 is a carbon nanothread, L1 and/or L2 comprises an C1-C10 alkane, and SE2 is a polyethylene.

C3.6.10: a CMU, where SE1 is a carbon nanothread, L1 and/or L2 comprises an C1-C10 alkane, and SE2 is a polymer.

C3.6.11: a CMU, where SE1 is a carbon nanothread, L1 and/or L2 comprises an C1-C10 alkane, and SE2 is a polypropylene.

C3.6.12: a CMU, where SE1 is a carbon nanothread, L1 and/or L2 comprises an C1-C10 alkane, and SE2 is a polystyrene.

C3.6.13: a CMU, where SE1 is a carbon nanothread, L1 and/or L2 comprises an C1-C10 alkane, and SE2 is an epoxy-based polymer.

C3.6.14: a CMU, where SE1 is a carbon nanothread, L1 and/or L2 comprises an C1-C10 alkane, and SE2 is a polyethylene terephtalate.

C3.6.15: a CMU, where SE1 is a carbon nanothread, L1 and/or L2 comprises an C1-C10 alkane, and SE2 is a polyvinylchloride.

C3.6.16: a CMU, where SE1 is a carbon nanothread, L1 and/or L2 comprises an C1-C10 alkane, and SE2 is a MWCNT.

C3.6.17: a CMU, where SE1 is a carbon nanothread, L1 and/or L2 comprises an C1-C10 alkane, and SE2 is a SWCNT.

C3.6.18: a CMU, where SE1 is a carbon nanothread, L1 and/or L2 comprises an C1-C10 alkane, and SE2 is a GS.

C3.6.19: a CMU, where SE1 is a carbon nanothread, L1 and/or L2 comprises an C1-C10 alkane, and SE2 is a nanotube.

C3.6.20: a CMU, where SE1 is a carbon nanothread, L1 and/or L2 comprises an C1-C10 alkane, and SE2 is a BNNT.

C3.6.21: a CMU, where SE1 is a carbon nanothread, L1 and/or L2 comprises an C1-C10 alkane, and SE2 is a polyacrylate.

C3.6.22: a CMU, where SE1 is a carbon nanothread, L1 and/or L2 comprises an C1-C10 alkane, and SE2 is a polyolefine.

C3.7.1: a CMU, where SE1 is a carbon nanothread, L1 and/or L2 comprises a detergent comprising a C4-C25 alkane and a polar end group, and.

C3.7.2: a CMU, where SE1 is a carbon nanothread, L1 and/or L2 comprises a detergent comprising a C4-C25 alkane and a polar end group, and SE2 is copolymer.

C3.7.3: a CMU, where SE1 is a carbon nanothread, L1 and/or L2 comprises a detergent comprising a C4-C25 alkane and a polar end group, and SE2 is a high density polyethylene.

C3.7.4: a CMU, where SE1 is a carbon nanothread, L1 and/or L2 comprises a detergent comprising a C4-C25 alkane and a polar end group, and SE2 is a linear low density polyethylene.

C3.7.5: a CMU, where SE1 is a carbon nanothread, L1 and/or L2 comprises a detergent comprising a C4-C25 alkane and a polar end group, and SE2 is a low density polyethylene.

C3.7.6: a CMU, where SE1 is a carbon nanothread, L1 and/or L2 comprises a detergent comprising a C4-C25 alkane and a polar end group, and SE2 is a nylon.

C3.7.7: a CMU, where SE1 is a carbon nanothread, L1 and/or L2 comprises a detergent comprising a C4-C25 alkane and a polar end group, and SE2 is a polyamide.

C3.7.8: a CMU, where SE1 is a carbon nanothread, L1 and/or L2 comprises a detergent comprising a C4-C25 alkane and a polar end group, and SE2 is a polycarbonate.

C3.7.9: a CMU, where SE1 is a carbon nanothread, L1 and/or L2 comprises a detergent comprising a C4-C25 alkane and a polar end group, and SE2 is a polyethylene.

C3.7.10: a CMU, where SE1 is a carbon nanothread, L1 and/or L2 comprises a detergent comprising a C4-C25 alkane and a polar end group, and SE2 is a polymer.

C3.7.11: a CMU, where SE1 is a carbon nanothread, L1 and/or L2 comprises a detergent comprising a C4-C25 alkane and a polar end group, and SE2 is a polypropylene.

C3.7.12: a CMU, where SE1 is a carbon nanothread, L1 and/or L2 comprises a detergent comprising a C4-C25 alkane and a polar end group, and SE2 is a polystyrene.

C3.7.13: a CMU, where SE1 is a carbon nanothread, L1 and/or L2 comprises a detergent comprising a C4-C25 alkane and a polar end group, and SE2 is an epoxy-based polymer.

C3.7.14: a CMU, where SE1 is a carbon nanothread, L1 and/or L2 comprises a detergent comprising a C4-C25 alkane and a polar end group, and SE2 is a polyethylene terephtalate.

C3.7.15: a CMU, where SE1 is a carbon nanothread, L1 and/or L2 comprises a detergent comprising a C4-C25 alkane and a polar end group, and SE2 is a polyvinylchloride.

C3.7.16: a CMU, where SE1 is a carbon nanothread, L1 and/or L2 comprises a detergent comprising a C4-C25 alkane and a polar end group, and SE2 is a MWCNT.

C3.7.17: a CMU, where SE1 is a carbon nanothread, L1 and/or L2 comprises a detergent comprising a C4-C25 alkane and a polar end group, and SE2 is a SWCNT.

C3.7.18: a CMU, where SE1 is a carbon nanothread, L1 and/or L2 comprises a detergent comprising a C4-C25 alkane and a polar end group, and SE2 is a GS.

C3.7.19: a CMU, where SE1 is a carbon nanothread, L1 and/or L2 comprises a detergent comprising a C4-C25 alkane and a polar end group, and SE2 is a nanotube.

C3.7.20: a CMU, where SE1 is a carbon nanothread, L1 and/or L2 comprises a detergent comprising a C4-C25 alkane and a polar end group, and SE2 is a BNNT.

C3.7.21: a CMU, where SE1 is a carbon nanothread, L1 and/or L2 comprises a detergent comprising a C4-C25 alkane and a polar end group, and SE2 is a polyacrylate.

C3.7.22: a CMU, where SE1 is a carbon nanothread, L1 and/or L2 comprises a detergent comprising a C4-C25 alkane and a polar end group, and SE2 is a polyolefine.

C3.8.1: a CMU, where SE1 is a carbon nanothread, L1 and/or L2 comprises a lactam, such as N-methyl-pyrrolidone and lactone, and.

C3.8.2: a CMU, where SE1 is a carbon nanothread, L1 and/or L2 comprises a lactam, such as N-methyl-pyrrolidone and lactone, and SE2 is copolymer.

C3.8.3: a CMU, where SE1 is a carbon nanothread, L1 and/or L2 comprises a lactam, such as N-methyl-pyrrolidone and lactone, and SE2 is a high density polyethylene.

C3.8.4: a CMU, where SE1 is a carbon nanothread, L1 and/or L2 comprises a lactam, such as N-methyl-pyrrolidone and lactone, and SE2 is a linear low density polyethylene.

C3.8.5: a CMU, where SE1 is a carbon nanothread, L1 and/or L2 comprises a lactam, such as N-methyl-pyrrolidone and lactone, and SE2 is a low density polyethylene.

C3.8.6: a CMU, where SE1 is a carbon nanothread, L1 and/or L2 comprises a lactam, such as N-methyl-pyrrolidone and lactone, and SE2 is a nylon.

C3.8.7: a CMU, where SE1 is a carbon nanothread, L1 and/or L2 comprises a lactam, such as N-methyl-pyrrolidone and lactone, and SE2 is a polyamide.

C3.8.8: a CMU, where SE1 is a carbon nanothread, L1 and/or L2 comprises a lactam, such as N-methyl-pyrrolidone and lactone, and SE2 is a polycarbonate.

C3.8.9: a CMU, where SE1 is a carbon nanothread, L1 and/or L2 comprises a lactam, such as N-methyl-pyrrolidone and lactone, and SE2 is a polyethylene.

C3.8.10: a CMU, where SE1 is a carbon nanothread, L1 and/or L2 comprises a lactam, such as N-methyl-pyrrolidone and lactone, and SE2 is a polymer.

C3.8.11: a CMU, where SE1 is a carbon nanothread, L1 and/or L2 comprises a lactam, such as N-methyl-pyrrolidone and lactone, and SE2 is a polypropylene.

C3.8.12: a CMU, where SE1 is a carbon nanothread, L1 and/or L2 comprises a lactam, such as N-methyl-pyrrolidone and lactone, and SE2 is a polystyrene.

C3.8.13: a CMU, where SE1 is a carbon nanothread, L1 and/or L2 comprises a lactam, such as N-methyl-pyrrolidone and lactone, and SE2 is an epoxy-based polymer.

C3.8.14: a CMU, where SE1 is a carbon nanothread, L1 and/or L2 comprises a lactam, such as N-methyl-pyrrolidone and lactone, and SE2 is a polyethylene terephtalate.

C3.8.15: a CMU, where SE1 is a carbon nanothread, L1 and/or L2 comprises a lactam, such as N-methyl-pyrrolidone and lactone, and SE2 is a polyvinylchloride.

C3.8.16: a CMU, where SE1 is a carbon nanothread, L1 and/or L2 comprises a lactam, such as N-methyl-pyrrolidone and lactone, and SE2 is a MWCNT.

C3.8.17: a CMU, where SE1 is a carbon nanothread, L1 and/or L2 comprises a lactam, such as N-methyl-pyrrolidone and lactone, and SE2 is a SWCNT.

C3.8.18: a CMU, where SE1 is a carbon nanothread, L1 and/or L2 comprises a lactam, such as N-methyl-pyrrolidone and lactone, and SE2 is a GS.

C3.8.19: a CMU, where SE1 is a carbon nanothread, L1 and/or L2 comprises a lactam, such as N-methyl-pyrrolidone and lactone, and SE2 is a nanotube.

C3.8.20: a CMU, where SE1 is a carbon nanothread, L1 and/or L2 comprises a lactam, such as N-methyl-pyrrolidone and lactone, and SE2 is a BNNT.

C3.8.21: a CMU, where SE1 is a carbon nanothread, L1 and/or L2 comprises a lactam, such as N-methyl-pyrrolidone and lactone, and SE2 is a polyacrylate.

C3.8.22: a CMU, where SE1 is a carbon nanothread, L1 and/or L2 comprises a lactam, such as N-methyl-pyrrolidone and lactone, and SE2 is a polyolefine.

C3.9.1: a CMU, where SE1 is a carbon nanothread, L1 and/or L2 comprises a amino acid residue such as phenylalanine, tyrosine, tryptophan, or histidine, and.

C3.9.2: a CMU, where SE1 is a carbon nanothread, L1 and/or L2 comprises a amino acid residue such as phenylalanine, tyrosine, tryptophan, or histidine, and SE2 is copolymer.

C3.9.3: a CMU, where SE1 is a carbon nanothread, L1 and/or L2 comprises a amino acid residue such as phenylalanine, tyrosine, tryptophan, or histidine, and SE2 is a high density polyethylene.

C3.9.4: a CMU, where SE1 is a carbon nanothread, L1 and/or L2 comprises a amino acid residue such as phenylalanine, tyrosine, tryptophan, or histidine, and SE2 is a linear low density polyethylene.

C3.9.5: a CMU, where SE1 is a carbon nanothread, L1 and/or L2 comprises a amino acid residue such as phenylalanine, tyrosine, tryptophan, or histidine, and SE2 is a low density polyethylene.

C3.9.6: a CMU, where SE1 is a carbon nanothread, L1 and/or L2 comprises a amino acid residue such as phenylalanine, tyrosine, tryptophan, or histidine, and SE2 is a nylon.

C3.9.7: a CMU, where SE1 is a carbon nanothread, L1 and/or L2 comprises a amino acid residue such as phenylalanine, tyrosine, tryptophan, or histidine, and SE2 is a polyamide.

C3.9.8: a CMU, where SE1 is a carbon nanothread, L1 and/or L2 comprises a amino acid residue such as phenylalanine, tyrosine, tryptophan, or histidine, and SE2 is a polycarbonate.

C3.9.9: a CMU, where SE1 is a carbon nanothread, L1 and/or L2 comprises a amino acid residue such as phenylalanine, tyrosine, tryptophan, or histidine, and SE2 is a polyethylene.

C3.9.10: a CMU, where SE1 is a carbon nanothread, L1 and/or L2 comprises a amino acid residue such as phenylalanine, tyrosine, tryptophan, or histidine, and SE2 is a polymer.

C3.9.11: a CMU, where SE1 is a carbon nanothread, L1 and/or L2 comprises a amino acid residue such as phenylalanine, tyrosine, tryptophan, or histidine, and SE2 is a polypropylene.

C3.9.12: a CMU, where SE1 is a carbon nanothread, L1 and/or L2 comprises a amino acid residue such as phenylalanine, tyrosine, tryptophan, or histidine, and SE2 is a polystyrene.

C3.9.13: a CMU, where SE1 is a carbon nanothread, L1 and/or L2 comprises a amino acid residue such as phenylalanine, tyrosine, tryptophan, or histidine, and SE2 is an epoxy-based polymer.

C3.9.14: a CMU, where SE1 is a carbon nanothread, L1 and/or L2 comprises a amino acid residue such as phenylalanine, tyrosine, tryptophan, or histidine, and SE2 is a polyethylene terephtalate.

C3.9.15: a CMU, where SE1 is a carbon nanothread, L1 and/or L2 comprises a amino acid residue such as phenylalanine, tyrosine, tryptophan, or histidine, and SE2 is a polyvinylchloride.

C3.9.16: a CMU, where SE1 is a carbon nanothread, L1 and/or L2 comprises a amino acid residue such as phenylalanine, tyrosine, tryptophan, or histidine, and SE2 is a MWCNT.

C3.9.17: a CMU, where SE1 is a carbon nanothread, L1 and/or L2 comprises a amino acid residue such as phenylalanine, tyrosine, tryptophan, or histidine, and SE2 is a SWCNT.

C3.9.18: a CMU, where SE1 is a carbon nanothread, L1 and/or L2 comprises a amino acid residue such as phenylalanine, tyrosine, tryptophan, or histidine, and SE2 is a GS.

C3.9.19: a CMU, where SE1 is a carbon nanothread, L1 and/or L2 comprises a amino acid residue such as phenylalanine, tyrosine, tryptophan, or histidine, and SE2 is a nanotube.

C3.9.20: a CMU, where SE1 is a carbon nanothread, L1 and/or L2 comprises a amino acid residue such as phenylalanine, tyrosine, tryptophan, or histidine, and SE2 is a BNNT.

C3.9.21: a CMU, where SE1 is a carbon nanothread, L1 and/or L2 comprises a amino acid residue such as phenylalanine, tyrosine, tryptophan, or histidine, and SE2 is a polyacrylate.

C3.9.22: a CMU, where SE1 is a carbon nanothread, L1 and/or L2 comprises a amino acid residue such as phenylalanine, tyrosine, tryptophan, or histidine, and SE2 is a polyolefine.

C3.10.1: a CMU, where SE1 is a carbon nanothread, L1 and/or L2 comprises a heteroaromatic system, including pyrole, thiophene, furane, pyrazole, imidazole, isoxazole, oxazole, isothiazole, thiazole, pyridine and perylene bisimides, and.

C3.10.2: a CMU, where SE1 is a carbon nanothread, L1 and/or L2 comprises a heteroaromatic system, including pyrole, thiophene, furane, pyrazole, imidazole, isoxazole, oxazole, isothiazole, thiazole, pyridine and perylene bisimides, and SE2 is copolymer.

C3.10.3: a CMU, where SE1 is a carbon nanothread, L1 and/or L2 comprises a heteroaromatic system, including pyrole, thiophene, furane, pyrazole, imidazole, isoxazole, oxazole, isothiazole, thiazole, pyridine and perylene bisimides, and SE2 is a high density polyethylene.

C3.10.4: a CMU, where SE1 is a carbon nanothread, L1 and/or L2 comprises a heteroaromatic system, including pyrole, thiophene, furane, pyrazole, imidazole, isoxazole, oxazole, isothiazole, thiazole, pyridine and perylene bisimides, and SE2 is a linear low density polyethylene.

C3.10.5: a CMU, where SE1 is a carbon nanothread, L1 and/or L2 comprises a heteroaromatic system, including pyrole, thiophene, furane, pyrazole, imidazole, isoxazole, oxazole, isothiazole, thiazole, pyridine and perylene bisimides, and SE2 is a low density polyethylene.

C3.10.6: a CMU, where SE1 is a carbon nanothread, L1 and/or L2 comprises a heteroaromatic system, including pyrole, thiophene, furane, pyrazole, imidazole, isoxazole, oxazole, isothiazole, thiazole, pyridine and perylene bisimides, and SE2 is a nylon.

C3.10.7: a CMU, where SE1 is a carbon nanothread, L1 and/or L2 comprises a heteroaromatic system, including pyrole, thiophene, furane, pyrazole, imidazole, isoxazole, oxazole, isothiazole, thiazole, pyridine and perylene bisimides, and SE2 is a polyamide.

C3.10.8: a CMU, where SE1 is a carbon nanothread, L1 and/or L2 comprises a heteroaromatic system, including pyrole, thiophene, furane, pyrazole, imidazole, isoxazole, oxazole, isothiazole, thiazole, pyridine and perylene bisimides, and SE2 is a polycarbonate.

C3.10.9: a CMU, where SE1 is a carbon nanothread, L1 and/or L2 comprises a heteroaromatic system, including pyrole, thiophene, furane, pyrazole, imidazole, isoxazole, oxazole, isothiazole, thiazole, pyridine and perylene bisimides, and SE2 is a polyethylene.

C3.10.10: a CMU, where SE1 is a carbon nanothread, L1 and/or L2 comprises a heteroaromatic system, including pyrole, thiophene, furane, pyrazole, imidazole, isoxazole, oxazole, isothiazole, thiazole, pyridine and perylene bisimides, and SE2 is a polymer.

C3.10.11: a CMU, where SE1 is a carbon nanothread, L1 and/or L2 comprises a heteroaromatic system, including pyrole, thiophene, furane, pyrazole, imidazole, isoxazole, oxazole, isothiazole, thiazole, pyridine and perylene bisimides, and SE2 is a polypropylene.

C3.10.12: a CMU, where SE1 is a carbon nanothread, L1 and/or L2 comprises a heteroaromatic system, including pyrole, thiophene, furane, pyrazole, imidazole, isoxazole, oxazole, isothiazole, thiazole, pyridine and perylene bisimides, and SE2 is a polystyrene.

C3.10.13: a CMU, where SE1 is a carbon nanothread, L1 and/or L2 comprises a heteroaromatic system, including pyrole, thiophene, furane, pyrazole, imidazole, isoxazole, oxazole, isothiazole, thiazole, pyridine and perylene bisimides, and SE2 is an epoxy-based polymer.

C3.10.14: a CMU, where SE1 is a carbon nanothread, L1 and/or L2 comprises a heteroaromatic system, including pyrole, thiophene, furane, pyrazole, imidazole, isoxazole, oxazole, isothiazole, thiazole, pyridine and perylene bisimides, and SE2 is a polyethylene terephtalate.

C3.10.15: a CMU, where SE1 is a carbon nanothread, L1 and/or L2 comprises a heteroaromatic system, including pyrole, thiophene, furane, pyrazole, imidazole, isoxazole, oxazole, isothiazole, thiazole, pyridine and perylene bisimides, and SE2 is a polyvinylchloride.

C3.10.16: a CMU, where SE1 is a carbon nanothread, L1 and/or L2 comprises a heteroaromatic system, including pyrole, thiophene, furane, pyrazole, imidazole, isoxazole, oxazole, isothiazole, thiazole, pyridine and perylene bisimides, and SE2 is a MWCNT.

C3.10.17: a CMU, where SE1 is a carbon nanothread, L1 and/or L2 comprises a heteroaromatic system, including pyrole, thiophene, furane, pyrazole, imidazole, isoxazole, oxazole, isothiazole, thiazole, pyridine and perylene bisimides, and SE2 is a SWCNT.

C3.10.18: a CMU, where SE1 is a carbon nanothread, L1 and/or L2 comprises a heteroaromatic system, including pyrole, thiophene, furane, pyrazole, imidazole, isoxazole, oxazole, isothiazole, thiazole, pyridine and perylene bisimides, and SE2 is a GS.

C3.10.19: a CMU, where SE1 is a carbon nanothread, L1 and/or L2 comprises a heteroaromatic system, including pyrole, thiophene, furane, pyrazole, imidazole, isoxazole, oxazole, isothiazole, thiazole, pyridine and perylene bisimides, and SE2 is a nanotube.

C3.10.20: a CMU, where SE1 is a carbon nanothread, L1 and/or L2 comprises a heteroaromatic system, including pyrole, thiophene, furane, pyrazole, imidazole, isoxazole, oxazole, isothiazole, thiazole, pyridine and perylene bisimides, and SE2 is a BNNT.

C3.10.21: a CMU, where SE1 is a carbon nanothread, L1 and/or L2 comprises a heteroaromatic system, including pyrole, thiophene, furane, pyrazole, imidazole, isoxazole, oxazole, isothiazole, thiazole, pyridine and perylene bisimides, and SE2 is a polyacrylate.

C3.10.22: a CMU, where SE1 is a carbon nanothread, L1 and/or L2 comprises a heteroaromatic system, including pyrole, thiophene, furane, pyrazole, imidazole, isoxazole, oxazole, isothiazole, thiazole, pyridine and perylene bisimides, and SE2 is a polyolefine.

C3.11.1: a CMU, where SE1 is a carbon nanothread, L1 and/or L2 comprises a fused ring system, composed of either aromatic, non-aromatic or anti-aromatic rings or combinations thereof, and.

C3.11.2: a CMU, where SE1 is a carbon nanothread, L1 and/or L2 comprises a fused ring system, composed of either aromatic, non-aromatic or anti-aromatic rings or combinations thereof, and SE2 is copolymer.

C3.11.3: a CMU, where SE1 is a carbon nanothread, L1 and/or L2 comprises a fused ring system, composed of either aromatic, non-aromatic or anti-aromatic rings or combinations thereof, and SE2 is a high density polyethylene.

C3.11.4: a CMU, where SE1 is a carbon nanothread, L1 and/or L2 comprises a fused ring system, composed of either aromatic, non-aromatic or anti-aromatic rings or combinations thereof, and SE2 is a linear low density polyethylene.

C3.11.5: a CMU, where SE1 is a carbon nanothread, L1 and/or L2 comprises a fused ring system, composed of either aromatic, non-aromatic or anti-aromatic rings or combinations thereof, and SE2 is a low density polyethylene.

C3.11.6: a CMU, where SE1 is a carbon nanothread, L1 and/or L2 comprises a fused ring system, composed of either aromatic, non-aromatic or anti-aromatic rings or combinations thereof, and SE2 is a nylon.

C3.11.7: a CMU, where SE1 is a carbon nanothread, L1 and/or L2 comprises a fused ring system, composed of either aromatic, non-aromatic or anti-aromatic rings or combinations thereof, and SE2 is a polyamide.

C3.11.8: a CMU, where SE1 is a carbon nanothread, L1 and/or L2 comprises a fused ring system, composed of either aromatic, non-aromatic or anti-aromatic rings or combinations thereof, and SE2 is a polycarbonate.

C3.11.9: a CMU, where SE1 is a carbon nanothread, L1 and/or L2 comprises a fused ring system, composed of either aromatic, non-aromatic or anti-aromatic rings or combinations thereof, and SE2 is a polyethylene.

C3.11.10: a CMU, where SE1 is a carbon nanothread, L1 and/or L2 comprises a fused ring system, composed of either aromatic, non-aromatic or anti-aromatic rings or combinations thereof, and SE2 is a polymer.

C3.11.11: a CMU, where SE1 is a carbon nanothread, L1 and/or L2 comprises a fused ring system, composed of either aromatic, non-aromatic or anti-aromatic rings or combinations thereof, and SE2 is a polypropylene.

C3.11.12: a CMU, where SE1 is a carbon nanothread, L1 and/or L2 comprises a fused ring system, composed of either aromatic, non-aromatic or anti-aromatic rings or combinations thereof, and SE2 is a polystyrene.

C3.11.13: a CMU, where SE1 is a carbon nanothread, L1 and/or L2 comprises a fused ring system, composed of either aromatic, non-aromatic or anti-aromatic rings or combinations thereof, and SE2 is an epoxy-based polymer.

C3.11.14: a CMU, where SE1 is a carbon nanothread, L1 and/or L2 comprises a fused ring system, composed of either aromatic, non-aromatic or anti-aromatic rings or combinations thereof, and SE2 is a polyethylene terephtalate.

C3.11.15: a CMU, where SE1 is a carbon nanothread, L1 and/or L2 comprises a fused ring system, composed of either aromatic, non-aromatic or anti-aromatic rings or combinations thereof, and SE2 is a polyvinylchloride.

C3.11.16: a CMU, where SE1 is a carbon nanothread, L1 and/or L2 comprises a fused ring system, composed of either aromatic, non-aromatic or anti-aromatic rings or combinations thereof, and SE2 is a MWCNT.

C3.11.17: a CMU, where SE1 is a carbon nanothread, L1 and/or L2 comprises a fused ring system, composed of either aromatic, non-aromatic or anti-aromatic rings or combinations thereof, and SE2 is a SWCNT.

C3.11.18: a CMU, where SE1 is a carbon nanothread, L1 and/or L2 comprises a fused ring system, composed of either aromatic, non-aromatic or anti-aromatic rings or combinations thereof, and SE2 is a GS.

C3.11.19: a CMU, where SE1 is a carbon nanothread, L1 and/or L2 comprises a fused ring system, composed of either aromatic, non-aromatic or anti-aromatic rings or combinations thereof, and SE2 is a nanotube.

C3.11.20: a CMU, where SE1 is a carbon nanothread, L1 and/or L2 comprises a fused ring system, composed of either aromatic, non-aromatic or anti-aromatic rings or combinations thereof, and SE2 is a BNNT.

C3.11.21: a CMU, where SE1 is a carbon nanothread, L1 and/or L2 comprises a fused ring system, composed of either aromatic, non-aromatic or anti-aromatic rings or combinations thereof, and SE2 is a polyacrylate.

C3.11.22: a CMU, where SE1 is a carbon nanothread, L1 and/or L2 comprises a fused ring system, composed of either aromatic, non-aromatic or anti-aromatic rings or combinations thereof, and SE2 is a polyolefine.

C4.1.1: a CMU, where SE1 is a composite material, and.

C4.1.2: a CMU, where SE1 is a composite material, and SE2 is copolymer.

C4.1.3: a CMU, where SE1 is a composite material, and SE2 is a high density polyethylene.

C4.1.4: a CMU, where SE1 is a composite material, and SE2 is a linear low density polyethylene.

C4.1.5: a CMU, where SE1 is a composite material, and SE2 is a low density polyethylene. C4.1.6: a CMU, where SE1 is a composite material, and SE2 is a nylon.

C4.1.7: a CMU, where SE1 is a composite material, and SE2 is a polyamide.

C4.1.8: a CMU, where SE1 is a composite material, and SE2 is a polycarbonate.

C4.1.9: a CMU, where SE1 is a composite material, and SE2 is a polyethylene.

C4.1.10: a CMU, where SE1 is a composite material, and SE2 is a polymer.

C4.1.11: a CMU, where SE1 is a composite material, and SE2 is a polypropylene.

C4.1.12: a CMU, where SE1 is a composite material, and SE2 is a polystyrene.

C4.1.13: a CMU, where SE1 is a composite material, and SE2 is an epoxy-based polymer.

C4.1.14: a CMU, where SE1 is a composite material, and SE2 is a polyethylene terephtalate.

C4.1.15: a CMU, where SE1 is a composite material, and SE2 is a polyvinylchloride.

C4.1.16: a CMU, where SE1 is a composite material, and SE2 is a MWCNT.

C4.1.17: a CMU, where SE1 is a composite material, and SE2 is a SWCNT.

C4.1.18: a CMU, where SE1 is a composite material, and SE2 is a GS.

C4.1.19: a CMU, where SE1 is a composite material, and SE2 is a nanotube.

C4.1.20: a CMU, where SE1 is a composite material, and SE2 is a BNNT.

C4.1.21: a CMU, where SE1 is a composite material, and SE2 is a polyacrylate.

C4.1.22: a CMU, where SE1 is a composite material, and SE2 is a polyolefine.

C4.2.1: a CMU, where SE1 is a composite material, L1 and/or L2 comprises a non-covalent ligand, and.

C4.2.2: a CMU, where SE1 is a composite material, L1 and/or L2 comprises a non-covalent ligand, and SE2 is copolymer.

C4.2.3: a CMU, where SE1 is a composite material, L1 and/or L2 comprises a non-covalent ligand, and SE2 is a high density polyethylene.

C4.2.4: a CMU, where SE1 is a composite material, L1 and/or L2 comprises a non-covalent ligand, and SE2 is a linear low density polyethylene.

C4.2.5: a CMU, where SE1 is a composite material, L1 and/or L2 comprises a non-covalent ligand, and SE2 is a low density polyethylene.

C4.2.6: a CMU, where SE1 is a composite material, L1 and/or L2 comprises a non-covalent ligand, and SE2 is a nylon.

C4.2.7: a CMU, where SE1 is a composite material, L1 and/or L2 comprises a non-covalent ligand, and SE2 is a polyamide.

C4.2.8: a CMU, where SE1 is a composite material, L1 and/or L2 comprises a non-covalent ligand, and SE2 is a polycarbonate.

C4.2.9: a CMU, where SE1 is a composite material, L1 and/or L2 comprises a non-covalent ligand, and SE2 is a polyethylene.

C4.2.10: a CMU, where SE1 is a composite material, L1 and/or L2 comprises a non-covalent ligand, and SE2 is a polymer.

C4.2.11: a CMU, where SE1 is a composite material, L1 and/or L2 comprises a non-covalent ligand, and SE2 is a polypropylene.

C4.2.12: a CMU, where SE1 is a composite material, L1 and/or L2 comprises a non-covalent ligand, and SE2 is a polystyrene.

C4.2.13: a CMU, where SE1 is a composite material, L1 and/or L2 comprises a non-covalent ligand, and SE2 is an epoxy-based polymer.

C4.2.14: a CMU, where SE1 is a composite material, L1 and/or L2 comprises a non-covalent ligand, and SE2 is a polyethylene terephtalate.

C4.2.15: a CMU, where SE1 is a composite material, L1 and/or L2 comprises a non-covalent ligand, and SE2 is a polyvinylchloride.

C4.2.16: a CMU, where SE1 is a composite material, L1 and/or L2 comprises a non-covalent ligand, and SE2 is a MWCNT.

C4.2.17: a CMU, where SE1 is a composite material, L1 and/or L2 comprises a non-covalent ligand, and SE2 is a SWCNT.

C4.2.18: a CMU, where SE1 is a composite material, L1 and/or L2 comprises a non-covalent ligand, and SE2 is a GS.

C4.2.19: a CMU, where SE1 is a composite material, L1 and/or L2 comprises a non-covalent ligand, and SE2 is a nanotube.

C4.2.20: a CMU, where SE1 is a composite material, L1 and/or L2 comprises a non-covalent ligand, and SE2 is a BNNT.

C4.2.21: a CMU, where SE1 is a composite material, L1 and/or L2 comprises a non-covalent ligand, and SE2 is a polyacrylate.

C4.2.22: a CMU, where SE1 is a composite material, L1 and/or L2 comprises a non-covalent ligand, and SE2 is a polyolefine.

C4.3.1: a CMU, where SE1 is a composite material, L1 and/or L2 comprises a amino-substituted hydrocarbon, and.

C4.3.2: a CMU, where SE1 is a composite material, L1 and/or L2 comprises a amino-substituted hydrocarbon, and SE2 is copolymer.

C4.3.3: a CMU, where SE1 is a composite material, L1 and/or L2 comprises a amino-substituted hydrocarbon, and SE2 is a high density polyethylene.

C4.3.4: a CMU, where SE1 is a composite material, L1 and/or L2 comprises a amino-substituted hydrocarbon, and SE2 is a linear low density polyethylene.

C4.3.5: a CMU, where SE1 is a composite material, L1 and/or L2 comprises a amino-substituted hydrocarbon, and SE2 is a low density polyethylene.

C4.3.6: a CMU, where SE1 is a composite material, L1 and/or L2 comprises a amino-substituted hydrocarbon, and SE2 is a nylon.

C4.3.7: a CMU, where SE1 is a composite material, L1 and/or L2 comprises a amino-substituted hydrocarbon, and SE2 is a polyamide.

C4.3.8: a CMU, where SE1 is a composite material, L1 and/or L2 comprises a amino-substituted hydrocarbon, and SE2 is a polycarbonate.

C4.3.9: a CMU, where SE1 is a composite material, L1 and/or L2 comprises a amino-substituted hydrocarbon, and SE2 is a polyethylene.

C4.3.10: a CMU, where SE1 is a composite material, L1 and/or L2 comprises a amino-substituted hydrocarbon, and SE2 is a polymer.

C4.3.11: a CMU, where SE1 is a composite material, L1 and/or L2 comprises a amino-substituted hydrocarbon, and SE2 is a polypropylene.

C4.3.12: a CMU, where SE1 is a composite material, L1 and/or L2 comprises a amino-substituted hydrocarbon, and SE2 is a polystyrene.

C4.3.13: a CMU, where SE1 is a composite material, L1 and/or L2 comprises a amino-substituted hydrocarbon, and SE2 is an epoxy-based polymer.

C4.3.14: a CMU, where SE1 is a composite material, L1 and/or L2 comprises a amino-substituted hydrocarbon, and SE2 is a polyethylene terephtalate.

C4.3.15: a CMU, where SE1 is a composite material, L1 and/or L2 comprises a amino-substituted hydrocarbon, and SE2 is a polyvinylchloride.

C4.3.16: a CMU, where SE1 is a composite material, L1 and/or L2 comprises a amino-substituted hydrocarbon, and SE2 is a MWCNT.

C4.3.17: a CMU, where SE1 is a composite material, L1 and/or L2 comprises a amino-substituted hydrocarbon, and SE2 is a SWCNT.

C4.3.18: a CMU, where SE1 is a composite material, L1 and/or L2 comprises a amino-substituted hydrocarbon, and SE2 is a GS.

C4.3.19: a CMU, where SE1 is a composite material, L1 and/or L2 comprises a amino-substituted hydrocarbon, and SE2 is a nanotube.

C4.3.20: a CMU, where SE1 is a composite material, L1 and/or L2 comprises a amino-substituted hydrocarbon, and SE2 is a BNNT.

C4.3.21: a CMU, where SE1 is a composite material, L1 and/or L2 comprises a amino-substituted hydrocarbon, and SE2 is a polyacrylate.

C4.3.22: a CMU, where SE1 is a composite material, L1 and/or L2 comprises a amino-substituted hydrocarbon, and SE2 is a polyolefine.

C4.4.1: a CMU, where SE1 is a composite material, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and.

C4.4.2: a CMU, where SE1 is a composite material, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and SE2 is copolymer.

C4.4.3: a CMU, where SE1 is a composite material, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and SE2 is a high density polyethylene.

C4.4.4: a CMU, where SE1 is a composite material, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and SE2 is a linear low density polyethylene.

C4.4.5: a CMU, where SE1 is a composite material, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and SE2 is a low density polyethylene.

C4.4.6: a CMU, where SE1 is a composite material, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and SE2 is a nylon.

C4.4.7: a CMU, where SE1 is a composite material, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and SE2 is a polyamide.

C4.4.8: a CMU, where SE1 is a composite material, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and SE2 is a polycarbonate.

C4.4.9: a CMU, where SE1 is a composite material, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and SE2 is a polyethylene.

C4.4.10: a CMU, where SE1 is a composite material, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and SE2 is a polymer.

C4.4.11: a CMU, where SE1 is a composite material, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and SE2 is a polypropylene.

C4.4.12: a CMU, where SE1 is a composite material, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and SE2 is a polystyrene.

C4.4.13: a CMU, where SE1 is a composite material, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and SE2 is an epoxy-based polymer.

C4.4.14: a CMU, where SE1 is a composite material, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and SE2 is a polyethylene terephtalate.

C4.4.15: a CMU, where SE1 is a composite material, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and SE2 is a polyvinylchloride.

C4.4.16: a CMU, where SE1 is a composite material, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and SE2 is a MWCNT.

C4.4.17: a CMU, where SE1 is a composite material, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and SE2 is a SWCNT.

C4.4.18: a CMU, where SE1 is a composite material, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and SE2 is a GS.

C4.4.19: a CMU, where SE1 is a composite material, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and SE2 is a nanotube.

C4.4.20: a CMU, where SE1 is a composite material, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and SE2 is a BNNT.

C4.4.21: a CMU, where SE1 is a composite material, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and SE2 is a polyacrylate.

C4.4.22: a CMU, where SE1 is a composite material, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and SE2 is a polyolefine.

C4.5.1: a CMU, where SE1 is a composite material, L1 and/or L2 comprises a halogen, nitro group, amine, thiol, alcohol, ester, amide, carboxylic acid, phenol, indole, imidazole, sulfonate or phophate, and.

C4.5.2: a CMU, where SE1 is a composite material, L1 and/or L2 comprises a halogen, nitro group, amine, thiol, alcohol, ester, amide, carboxylic acid, phenol, indole, imidazole, sulfonate or phophate, and SE2 is copolymer.

C4.5.3: a CMU, where SE1 is a composite material, L1 and/or L2 comprises a halogen, nitro group, amine, thiol, alcohol, ester, amide, carboxylic acid, phenol, indole, imidazole, sulfonate or phophate, and SE2 is a high density polyethylene.

C4.5.4: a CMU, where SE1 is a composite material, L1 and/or L2 comprises a halogen, nitro group, amine, thiol, alcohol, ester, amide, carboxylic acid, phenol, indole, imidazole, sulfonate or phophate, and SE2 is a linear low density polyethylene.

C4.5.5: a CMU, where SE1 is a composite material, L1 and/or L2 comprises a halogen, nitro group, amine, thiol, alcohol, ester, amide, carboxylic acid, phenol, indole, imidazole, sulfonate or phophate, and SE2 is a low density polyethylene.

C4.5.6: a CMU, where SE1 is a composite material, L1 and/or L2 comprises a halogen, nitro group, amine, thiol, alcohol, ester, amide, carboxylic acid, phenol, indole, imidazole, sulfonate or phophate, and SE2 is a nylon.

C4.5.7: a CMU, where SE1 is a composite material, L1 and/or L2 comprises a halogen, nitro group, amine, thiol, alcohol, ester, amide, carboxylic acid, phenol, indole, imidazole, sulfonate or phophate, and SE2 is a polyamide.

C4.5.8: a CMU, where SE1 is a composite material, L1 and/or L2 comprises a halogen, nitro group, amine, thiol, alcohol, ester, amide, carboxylic acid, phenol, indole, imidazole, sulfonate or phophate, and SE2 is a polycarbonate.

C4.5.9: a CMU, where SE1 is a composite material, L1 and/or L2 comprises a halogen, nitro group, amine, thiol, alcohol, ester, amide, carboxylic acid, phenol, indole, imidazole, sulfonate or phophate, and SE2 is a polyethylene.

C4.5.10: a CMU, where SE1 is a composite material, L1 and/or L2 comprises a halogen, nitro group, amine, thiol, alcohol, ester, amide, carboxylic acid, phenol, indole, imidazole, sulfonate or phophate, and SE2 is a polymer.

C4.5.11: a CMU, where SE1 is a composite material, L1 and/or L2 comprises a halogen, nitro group, amine, thiol, alcohol, ester, amide, carboxylic acid, phenol, indole, imidazole, sulfonate or phophate, and SE2 is a polypropylene.

C4.5.12: a CMU, where SE1 is a composite material, L1 and/or L2 comprises a halogen, nitro group, amine, thiol, alcohol, ester, amide, carboxylic acid, phenol, indole, imidazole, sulfonate or phophate, and SE2 is a polystyrene.

C4.5.13: a CMU, where SE1 is a composite material, L1 and/or L2 comprises a halogen, nitro group, amine, thiol, alcohol, ester, amide, carboxylic acid, phenol, indole, imidazole, sulfonate or phophate, and SE2 is an epoxy-based polymer.

C4.5.14: a CMU, where SE1 is a composite material, L1 and/or L2 comprises a halogen, nitro group, amine, thiol, alcohol, ester, amide, carboxylic acid, phenol, indole, imidazole, sulfonate or phophate, and SE2 is a polyethylene terephtalate.

C4.5.15: a CMU, where SE1 is a composite material, L1 and/or L2 comprises a halogen, nitro group, amine, thiol, alcohol, ester, amide, carboxylic acid, phenol, indole, imidazole, sulfonate or phophate, and SE2 is a polyvinylchloride.

C4.5.16: a CMU, where SE1 is a composite material, L1 and/or L2 comprises a halogen, nitro group, amine, thiol, alcohol, ester, amide, carboxylic acid, phenol, indole, imidazole, sulfonate or phophate, and SE2 is a MWCNT.

C4.5.17: a CMU, where SE1 is a composite material, L1 and/or L2 comprises a halogen, nitro group, amine, thiol, alcohol, ester, amide, carboxylic acid, phenol, indole, imidazole, sulfonate or phophate, and SE2 is a SWCNT.

C4.5.18: a CMU, where SE1 is a composite material, L1 and/or L2 comprises a halogen, nitro group, amine, thiol, alcohol, ester, amide, carboxylic acid, phenol, indole, imidazole, sulfonate or phophate, and SE2 is a GS.

C4.5.19: a CMU, where SE1 is a composite material, L1 and/or L2 comprises a halogen, nitro group, amine, thiol, alcohol, ester, amide, carboxylic acid, phenol, indole, imidazole, sulfonate or phophate, and SE2 is a nanotube.

C4.5.20: a CMU, where SE1 is a composite material, L1 and/or L2 comprises a halogen, nitro group, amine, thiol, alcohol, ester, amide, carboxylic acid, phenol, indole, imidazole, sulfonate or phophate, and SE2 is a BNNT.

C4.5.21: a CMU, where SE1 is a composite material, L1 and/or L2 comprises a halogen, nitro group, amine, thiol, alcohol, ester, amide, carboxylic acid, phenol, indole, imidazole, sulfonate or phophate, and SE2 is a polyacrylate.

C4.5.22: a CMU, where SE1 is a composite material, L1 and/or L2 comprises a halogen, nitro group, amine, thiol, alcohol, ester, amide, carboxylic acid, phenol, indole, imidazole, sulfonate or phophate, and SE2 is a polyolefine.

C4.6.1: a CMU, where SE1 is a composite material, L1 and/or L2 comprises an C1-C10 alkane, and.

C4.6.2: a CMU, where SE1 is a composite material, L1 and/or L2 comprises an C1-C10 alkane, and SE2 is copolymer.

C4.6.3: a CMU, where SE1 is a composite material, L1 and/or L2 comprises an C1-C10 alkane, and SE2 is a high density polyethylene.

C4.6.4: a CMU, where SE1 is a composite material, L1 and/or L2 comprises an C1-C10 alkane, and SE2 is a linear low density polyethylene.

C4.6.5: a CMU, where SE1 is a composite material, L1 and/or L2 comprises an C1-C10 alkane, and SE2 is a low density polyethylene.

C4.6.6: a CMU, where SE1 is a composite material, L1 and/or L2 comprises an C1-C10 alkane, and SE2 is a nylon.

C4.6.7: a CMU, where SE1 is a composite material, L1 and/or L2 comprises an C1-C10 alkane, and SE2 is a polyamide.

C4.6.8: a CMU, where SE1 is a composite material, L1 and/or L2 comprises an C1-C10 alkane, and SE2 is a polycarbonate.

C4.6.9: a CMU, where SE1 is a composite material, L1 and/or L2 comprises an C1-C10 alkane, and SE2 is a polyethylene.

C4.6.10: a CMU, where SE1 is a composite material, L1 and/or L2 comprises an C1-C10 alkane, and SE2 is a polymer.

C4.6.11: a CMU, where SE1 is a composite material, L1 and/or L2 comprises an C1-C10 alkane, and SE2 is a polypropylene.

C4.6.12: a CMU, where SE1 is a composite material, L1 and/or L2 comprises an C1-C10 alkane, and SE2 is a polystyrene.

C4.6.13: a CMU, where SE1 is a composite material, L1 and/or L2 comprises an C1-C10 alkane, and SE2 is an epoxy-based polymer.

C4.6.14: a CMU, where SE1 is a composite material, L1 and/or L2 comprises an C1-C10 alkane, and SE2 is a polyethylene terephtalate.

C4.6.15: a CMU, where SE1 is a composite material, L1 and/or L2 comprises an C1-C10 alkane, and SE2 is a polyvinylchloride.

C4.6.16: a CMU, where SE1 is a composite material, L1 and/or L2 comprises an C1-C10 alkane, and SE2 is a MWCNT.

C4.6.17: a CMU, where SE1 is a composite material, L1 and/or L2 comprises an C1-C10 alkane, and SE2 is a SWCNT.

C4.6.18: a CMU, where SE1 is a composite material, L1 and/or L2 comprises an C1-C10 alkane, and SE2 is a GS.

C4.6.19: a CMU, where SE1 is a composite material, L1 and/or L2 comprises an C1-C10 alkane, and SE2 is a nanotube.

C4.6.20: a CMU, where SE1 is a composite material, L1 and/or L2 comprises an C1-C10 alkane, and SE2 is a BNNT.

C4.6.21: a CMU, where SE1 is a composite material, L1 and/or L2 comprises an C1-C10 alkane, and SE2 is a polyacrylate.

C4.6.22: a CMU, where SE1 is a composite material, L1 and/or L2 comprises an C1-C10 alkane, and SE2 is a polyolefine.

C4.7.1: a CMU, where SE1 is a composite material, L1 and/or L2 comprises a detergent comprising a C4-C25 alkane and a polar end group, and.

C4.7.2: a CMU, where SE1 is a composite material, L1 and/or L2 comprises a detergent comprising a C4-C25 alkane and a polar end group, and SE2 is copolymer.

C4.7.3: a CMU, where SE1 is a composite material, L1 and/or L2 comprises a detergent comprising a C4-C25 alkane and a polar end group, and SE2 is a high density polyethylene.

C4.7.4: a CMU, where SE1 is a composite material, L1 and/or L2 comprises a detergent comprising a C4-C25 alkane and a polar end group, and SE2 is a linear low density polyethylene.

C4.7.5: a CMU, where SE1 is a composite material, L1 and/or L2 comprises a detergent comprising a C4-C25 alkane and a polar end group, and SE2 is a low density polyethylene.

C4.7.6: a CMU, where SE1 is a composite material, L1 and/or L2 comprises a detergent comprising a C4-C25 alkane and a polar end group, and SE2 is a nylon.

C4.7.7: a CMU, where SE1 is a composite material, L1 and/or L2 comprises a detergent comprising a C4-C25 alkane and a polar end group, and SE2 is a polyamide.

C4.7.8: a CMU, where SE1 is a composite material, L1 and/or L2 comprises a detergent comprising a C4-C25 alkane and a polar end group, and SE2 is a polycarbonate.

C4.7.9: a CMU, where SE1 is a composite material, L1 and/or L2 comprises a detergent comprising a C4-C25 alkane and a polar end group, and SE2 is a polyethylene.

C4.7.10: a CMU, where SE1 is a composite material, L1 and/or L2 comprises a detergent comprising a C4-C25 alkane and a polar end group, and SE2 is a polymer.

C4.7.11: a CMU, where SE1 is a composite material, L1 and/or L2 comprises a detergent comprising a C4-C25 alkane and a polar end group, and SE2 is a polypropylene.

C4.7.12: a CMU, where SE1 is a composite material, L1 and/or L2 comprises a detergent comprising a C4-C25 alkane and a polar end group, and SE2 is a polystyrene.

C4.7.13: a CMU, where SE1 is a composite material, L1 and/or L2 comprises a detergent comprising a C4-C25 alkane and a polar end group, and SE2 is an epoxy-based polymer.

C4.7.14: a CMU, where SE1 is a composite material, L1 and/or L2 comprises a detergent comprising a C4-C25 alkane and a polar end group, and SE2 is a polyethylene terephtalate.

C4.7.15: a CMU, where SE1 is a composite material, L1 and/or L2 comprises a detergent comprising a C4-C25 alkane and a polar end group, and SE2 is a polyvinylchloride.

C4.7.16: a CMU, where SE1 is a composite material, L1 and/or L2 comprises a detergent comprising a C4-C25 alkane and a polar end group, and SE2 is a MWCNT.

C4.7.17: a CMU, where SE1 is a composite material, L1 and/or L2 comprises a detergent comprising a C4-C25 alkane and a polar end group, and SE2 is a SWCNT.

C4.7.18: a CMU, where SE1 is a composite material, L1 and/or L2 comprises a detergent comprising a C4-C25 alkane and a polar end group, and SE2 is a GS.

C4.7.19: a CMU, where SE1 is a composite material, L1 and/or L2 comprises a detergent comprising a C4-C25 alkane and a polar end group, and SE2 is a nanotube.

C4.7.20: a CMU, where SE1 is a composite material, L1 and/or L2 comprises a detergent comprising a C4-C25 alkane and a polar end group, and SE2 is a BNNT.

C4.7.21: a CMU, where SE1 is a composite material, L1 and/or L2 comprises a detergent comprising a C4-C25 alkane and a polar end group, and SE2 is a polyacrylate.

C4.7.22: a CMU, where SE1 is a composite material, L1 and/or L2 comprises a detergent comprising a C4-C25 alkane and a polar end group, and SE2 is a polyolefine.

C4.8.1: a CMU, where SE1 is a composite material, L1 and/or L2 comprises a lactam, such as N-methyl-pyrrolidone and lactone, and.

C4.8.2: a CMU, where SE1 is a composite material, L1 and/or L2 comprises a lactam, such as N-methyl-pyrrolidone and lactone, and SE2 is copolymer.

C4.8.3: a CMU, where SE1 is a composite material, L1 and/or L2 comprises a lactam, such as N-methyl-pyrrolidone and lactone, and SE2 is a high density polyethylene.

C4.8.4: a CMU, where SE1 is a composite material, L1 and/or L2 comprises a lactam, such as N-methyl-pyrrolidone and lactone, and SE2 is a linear low density polyethylene.

C4.8.5: a CMU, where SE1 is a composite material, L1 and/or L2 comprises a lactam, such as N-methyl-pyrrolidone and lactone, and SE2 is a low density polyethylene.

C4.8.6: a CMU, where SE1 is a composite material, L1 and/or L2 comprises a lactam, such as N-methyl-pyrrolidone and lactone, and SE2 is a nylon.

C4.8.7: a CMU, where SE1 is a composite material, L1 and/or L2 comprises a lactam, such as N-methyl-pyrrolidone and lactone, and SE2 is a polyamide.

C4.8.8: a CMU, where SE1 is a composite material, L1 and/or L2 comprises a lactam, such as N-methyl-pyrrolidone and lactone, and SE2 is a polycarbonate.

C4.8.9: a CMU, where SE1 is a composite material, L1 and/or L2 comprises a lactam, such as N-methyl-pyrrolidone and lactone, and SE2 is a polyethylene.

C4.8.10: a CMU, where SE1 is a composite material, L1 and/or L2 comprises a lactam, such as N-methyl-pyrrolidone and lactone, and SE2 is a polymer.

C4.8.11: a CMU, where SE1 is a composite material, L1 and/or L2 comprises a lactam, such as N-methyl-pyrrolidone and lactone, and SE2 is a polypropylene.

C4.8.12: a CMU, where SE1 is a composite material, L1 and/or L2 comprises a lactam, such as N-methyl-pyrrolidone and lactone, and SE2 is a polystyrene.

C4.8.13: a CMU, where SE1 is a composite material, L1 and/or L2 comprises a lactam, such as N-methyl-pyrrolidone and lactone, and SE2 is an epoxy-based polymer.

C4.8.14: a CMU, where SE1 is a composite material, L1 and/or L2 comprises a lactam, such as N-methyl-pyrrolidone and lactone, and SE2 is a polyethylene terephtalate.

C4.8.15: a CMU, where SE1 is a composite material, L1 and/or L2 comprises a lactam, such as N-methyl-pyrrolidone and lactone, and SE2 is a polyvinylchloride.

C4.8.16: a CMU, where SE1 is a composite material, L1 and/or L2 comprises a lactam, such as N-methyl-pyrrolidone and lactone, and SE2 is a MWCNT.

C4.8.17: a CMU, where SE1 is a composite material, L1 and/or L2 comprises a lactam, such as N-methyl-pyrrolidone and lactone, and SE2 is a SWCNT.

C4.8.18: a CMU, where SE1 is a composite material, L1 and/or L2 comprises a lactam, such as N-methyl-pyrrolidone and lactone, and SE2 is a GS.

C4.8.19: a CMU, where SE1 is a composite material, L1 and/or L2 comprises a lactam, such as N-methyl-pyrrolidone and lactone, and SE2 is a nanotube.

C4.8.20: a CMU, where SE1 is a composite material, L1 and/or L2 comprises a lactam, such as N-methyl-pyrrolidone and lactone, and SE2 is a BNNT.

C4.8.21: a CMU, where SE1 is a composite material, L1 and/or L2 comprises a lactam, such as N-methyl-pyrrolidone and lactone, and SE2 is a polyacrylate.

C4.8.22: a CMU, where SE1 is a composite material, L1 and/or L2 comprises a lactam, such as N-methyl-pyrrolidone and lactone, and SE2 is a polyolefine.

C4.9.1: a CMU, where SE1 is a composite material, L1 and/or L2 comprises a amino acid residue such as phenylalanine, tyrosine, tryptophan, or histidine, and.

C4.9.2: a CMU, where SE1 is a composite material, L1 and/or L2 comprises a amino acid residue such as phenylalanine, tyrosine, tryptophan, or histidine, and SE2 is copolymer.

C4.9.3: a CMU, where SE1 is a composite material, L1 and/or L2 comprises a amino acid residue such as phenylalanine, tyrosine, tryptophan, or histidine, and SE2 is a high density polyethylene.

C4.9.4: a CMU, where SE1 is a composite material, L1 and/or L2 comprises a amino acid residue such as phenylalanine, tyrosine, tryptophan, or histidine, and SE2 is a linear low density polyethylene.

C4.9.5: a CMU, where SE1 is a composite material, L1 and/or L2 comprises a amino acid residue such as phenylalanine, tyrosine, tryptophan, or histidine, and SE2 is a low density polyethylene.

C4.9.6: a CMU, where SE1 is a composite material, L1 and/or L2 comprises a amino acid residue such as phenylalanine, tyrosine, tryptophan, or histidine, and SE2 is a nylon.

C4.9.7: a CMU, where SE1 is a composite material, L1 and/or L2 comprises a amino acid residue such as phenylalanine, tyrosine, tryptophan, or histidine, and SE2 is a polyamide.

C4.9.8: a CMU, where SE1 is a composite material, L1 and/or L2 comprises a amino acid residue such as phenylalanine, tyrosine, tryptophan, or histidine, and SE2 is a polycarbonate.

C4.9.9: a CMU, where SE1 is a composite material, L1 and/or L2 comprises a amino acid residue such as phenylalanine, tyrosine, tryptophan, or histidine, and SE2 is a polyethylene.

C4.9.10: a CMU, where SE1 is a composite material, L1 and/or L2 comprises a amino acid residue such as phenylalanine, tyrosine, tryptophan, or histidine, and SE2 is a polymer.

C4.9.11: a CMU, where SE1 is a composite material, L1 and/or L2 comprises a amino acid residue such as phenylalanine, tyrosine, tryptophan, or histidine, and SE2 is a polypropylene.

C4.9.12: a CMU, where SE1 is a composite material, L1 and/or L2 comprises a amino acid residue such as phenylalanine, tyrosine, tryptophan, or histidine, and SE2 is a polystyrene.

C4.9.13: a CMU, where SE1 is a composite material, L1 and/or L2 comprises a amino acid residue such as phenylalanine, tyrosine, tryptophan, or histidine, and SE2 is an epoxy-based polymer.

C4.9.14: a CMU, where SE1 is a composite material, L1 and/or L2 comprises a amino acid residue such as phenylalanine, tyrosine, tryptophan, or histidine, and SE2 is a polyethylene terephtalate.

C4.9.15: a CMU, where SE1 is a composite material, L1 and/or L2 comprises a amino acid residue such as phenylalanine, tyrosine, tryptophan, or histidine, and SE2 is a polyvinylchloride.

C4.9.16: a CMU, where SE1 is a composite material, L1 and/or L2 comprises a amino acid residue such as phenylalanine, tyrosine, tryptophan, or histidine, and SE2 is a MWCNT.

C4.9.17: a CMU, where SE1 is a composite material, L1 and/or L2 comprises a amino acid residue such as phenylalanine, tyrosine, tryptophan, or histidine, and SE2 is a SWCNT.

C4.9.18: a CMU, where SE1 is a composite material, L1 and/or L2 comprises a amino acid residue such as phenylalanine, tyrosine, tryptophan, or histidine, and SE2 is a GS.

C4.9.19: a CMU, where SE1 is a composite material, L1 and/or L2 comprises a amino acid residue such as phenylalanine, tyrosine, tryptophan, or histidine, and SE2 is a nanotube.

C4.9.20: a CMU, where SE1 is a composite material, L1 and/or L2 comprises a amino acid residue such as phenylalanine, tyrosine, tryptophan, or histidine, and SE2 is a BNNT.

C4.9.21: a CMU, where SE1 is a composite material, L1 and/or L2 comprises a amino acid residue such as phenylalanine, tyrosine, tryptophan, or histidine, and SE2 is a polyacrylate.

C4.9.22: a CMU, where SE1 is a composite material, L1 and/or L2 comprises a amino acid residue such as phenylalanine, tyrosine, tryptophan, or histidine, and SE2 is a polyolefine.

C4.10.1: a CMU, where SE1 is a composite material, L1 and/or L2 comprises a heteroaromatic system, including pyrole, thiophene, furane, pyrazole, imidazole, isoxazole, oxazole, isothiazole, thiazole, pyridine and perylene bisimides, and.

C4.10.2: a CMU, where SE1 is a composite material, L1 and/or L2 comprises a heteroaromatic system, including pyrole, thiophene, furane, pyrazole, imidazole, isoxazole, oxazole, isothiazole, thiazole, pyridine and perylene bisimides, and SE2 is copolymer.

C4.10.3: a CMU, where SE1 is a composite material, L1 and/or L2 comprises a heteroaromatic system, including pyrole, thiophene, furane, pyrazole, imidazole, isoxazole, oxazole, isothiazole, thiazole, pyridine and perylene bisimides, and SE2 is a high density polyethylene.

C4.10.4: a CMU, where SE1 is a composite material, L1 and/or L2 comprises a heteroaromatic system, including pyrole, thiophene, furane, pyrazole, imidazole, isoxazole, oxazole, isothiazole, thiazole, pyridine and perylene bisimides, and SE2 is a linear low density polyethylene.

C4.10.5: a CMU, where SE1 is a composite material, L1 and/or L2 comprises a heteroaromatic system, including pyrole, thiophene, furane, pyrazole, imidazole, isoxazole, oxazole, isothiazole, thiazole, pyridine and perylene bisimides, and SE2 is a low density polyethylene.

C4.10.6: a CMU, where SE1 is a composite material, L1 and/or L2 comprises a heteroaromatic system, including pyrole, thiophene, furane, pyrazole, imidazole, isoxazole, oxazole, isothiazole, thiazole, pyridine and perylene bisimides, and SE2 is a nylon.

C4.10.7: a CMU, where SE1 is a composite material, L1 and/or L2 comprises a heteroaromatic system, including pyrole, thiophene, furane, pyrazole, imidazole, isoxazole, oxazole, isothiazole, thiazole, pyridine and perylene bisimides, and SE2 is a polyamide.

C4.10.8: a CMU, where SE1 is a composite material, L1 and/or L2 comprises a heteroaromatic system, including pyrole, thiophene, furane, pyrazole, imidazole, isoxazole, oxazole, isothiazole, thiazole, pyridine and perylene bisimides, and SE2 is a polycarbonate.

C4.10.9: a CMU, where SE1 is a composite material, L1 and/or L2 comprises a heteroaromatic system, including pyrole, thiophene, furane, pyrazole, imidazole, isoxazole, oxazole, isothiazole, thiazole, pyridine and perylene bisimides, and SE2 is a polyethylene.

C4.10.10: a CMU, where SE1 is a composite material, L1 and/or L2 comprises a heteroaromatic system, including pyrole, thiophene, furane, pyrazole, imidazole, isoxazole, oxazole, isothiazole, thiazole, pyridine and perylene bisimides, and SE2 is a polymer.

C4.10.11: a CMU, where SE1 is a composite material, L1 and/or L2 comprises a heteroaromatic system, including pyrole, thiophene, furane, pyrazole, imidazole, isoxazole, oxazole, isothiazole, thiazole, pyridine and perylene bisimides, and SE2 is a polypropylene.

C4.10.12: a CMU, where SE1 is a composite material, L1 and/or L2 comprises a heteroaromatic system, including pyrole, thiophene, furane, pyrazole, imidazole, isoxazole, oxazole, isothiazole, thiazole, pyridine and perylene bisimides, and SE2 is a polystyrene.

C4.10.13: a CMU, where SE1 is a composite material, L1 and/or L2 comprises a heteroaromatic system, including pyrole, thiophene, furane, pyrazole, imidazole, isoxazole, oxazole, isothiazole, thiazole, pyridine and perylene bisimides, and SE2 is an epoxy-based polymer.

C4.10.14: a CMU, where SE1 is a composite material, L1 and/or L2 comprises a heteroaromatic system, including pyrole, thiophene, furane, pyrazole, imidazole, isoxazole, oxazole, isothiazole, thiazole, pyridine and perylene bisimides, and SE2 is a polyethylene terephtalate.

C4.10.15: a CMU, where SE1 is a composite material, L1 and/or L2 comprises a heteroaromatic system, including pyrole, thiophene, furane, pyrazole, imidazole, isoxazole, oxazole, isothiazole, thiazole, pyridine and perylene bisimides, and SE2 is a polyvinylchloride.

C4.10.16: a CMU, where SE1 is a composite material, L1 and/or L2 comprises a heteroaromatic system, including pyrole, thiophene, furane, pyrazole, imidazole, isoxazole, oxazole, isothiazole, thiazole, pyridine and perylene bisimides, and SE2 is a MWCNT.

C4.10.17: a CMU, where SE1 is a composite material, L1 and/or L2 comprises a heteroaromatic system, including pyrole, thiophene, furane, pyrazole, imidazole, isoxazole, oxazole, isothiazole, thiazole, pyridine and perylene bisimides, and SE2 is a SWCNT.

C4.10.18: a CMU, where SE1 is a composite material, L1 and/or L2 comprises a heteroaromatic system, including pyrole, thiophene, furane, pyrazole, imidazole, isoxazole, oxazole, isothiazole, thiazole, pyridine and perylene bisimides, and SE2 is a GS.

C4.10.19: a CMU, where SE1 is a composite material, L1 and/or L2 comprises a heteroaromatic system, including pyrole, thiophene, furane, pyrazole, imidazole, isoxazole, oxazole, isothiazole, thiazole, pyridine and perylene bisimides, and SE2 is a nanotube.

C4.10.20: a CMU, where SE1 is a composite material, L1 and/or L2 comprises a heteroaromatic system, including pyrole, thiophene, furane, pyrazole, imidazole, isoxazole, oxazole, isothiazole, thiazole, pyridine and perylene bisimides, and SE2 is a BNNT.

C4.10.21: a CMU, where SE1 is a composite material, L1 and/or L2 comprises a heteroaromatic system, including pyrole, thiophene, furane, pyrazole, imidazole, isoxazole, oxazole, isothiazole, thiazole, pyridine and perylene bisimides, and SE2 is a polyacrylate.

C4.10.22: a CMU, where SE1 is a composite material, L1 and/or L2 comprises a heteroaromatic system, including pyrole, thiophene, furane, pyrazole, imidazole, isoxazole, oxazole, isothiazole, thiazole, pyridine and perylene bisimides, and SE2 is a polyolefine.

C4.11.1: a CMU, where SE1 is a composite material, L1 and/or L2 comprises a fused ring system, composed of either aromatic, non-aromatic or anti-aromatic rings or combinations thereof, and.

C4.11.2: a CMU, where SE1 is a composite material, L1 and/or L2 comprises a fused ring system, composed of either aromatic, non-aromatic or anti-aromatic rings or combinations thereof, and SE2 is copolymer.

C4.11.3: a CMU, where SE1 is a composite material, L1 and/or L2 comprises a fused ring system, composed of either aromatic, non-aromatic or anti-aromatic rings or combinations thereof, and SE2 is a high density polyethylene.

C4.11.4: a CMU, where SE1 is a composite material, L1 and/or L2 comprises a fused ring system, composed of either aromatic, non-aromatic or anti-aromatic rings or combinations thereof, and SE2 is a linear low density polyethylene.

C4.11.5: a CMU, where SE1 is a composite material, L1 and/or L2 comprises a fused ring system, composed of either aromatic, non-aromatic or anti-aromatic rings or combinations thereof, and SE2 is a low density polyethylene.

C4.11.6: a CMU, where SE1 is a composite material, L1 and/or L2 comprises a fused ring system, composed of either aromatic, non-aromatic or anti-aromatic rings or combinations thereof, and SE2 is a nylon.

C4.11.7: a CMU, where SE1 is a composite material, L1 and/or L2 comprises a fused ring system, composed of either aromatic, non-aromatic or anti-aromatic rings or combinations thereof, and SE2 is a polyamide.

C4.11.8: a CMU, where SE1 is a composite material, L1 and/or L2 comprises a fused ring system, composed of either aromatic, non-aromatic or anti-aromatic rings or combinations thereof, and SE2 is a polycarbonate.

C4.11.9: a CMU, where SE1 is a composite material, L1 and/or L2 comprises a fused ring system, composed of either aromatic, non-aromatic or anti-aromatic rings or combinations thereof, and SE2 is a polyethylene.

C4.11.10: a CMU, where SE1 is a composite material, L1 and/or L2 comprises a fused ring system, composed of either aromatic, non-aromatic or anti-aromatic rings or combinations thereof, and SE2 is a polymer.

C4.11.11: a CMU, where SE1 is a composite material, L1 and/or L2 comprises a fused ring system, composed of either aromatic, non-aromatic or anti-aromatic rings or combinations thereof, and SE2 is a polypropylene.

C4.11.12: a CMU, where SE1 is a composite material, L1 and/or L2 comprises a fused ring system, composed of either aromatic, non-aromatic or anti-aromatic rings or combinations thereof, and SE2 is a polystyrene.

C4.11.13: a CMU, where SE1 is a composite material, L1 and/or L2 comprises a fused ring system, composed of either aromatic, non-aromatic or anti-aromatic rings or combinations thereof, and SE2 is an epoxy-based polymer.

C4.11.14: a CMU, where SE1 is a composite material, L1 and/or L2 comprises a fused ring system, composed of either aromatic, non-aromatic or anti-aromatic rings or combinations thereof, and SE2 is a polyethylene terephtalate.

C4.11.15: a CMU, where SE1 is a composite material, L1 and/or L2 comprises a fused ring system, composed of either aromatic, non-aromatic or anti-aromatic rings or combinations thereof, and SE2 is a polyvinylchloride.

C4.11.16: a CMU, where SE1 is a composite material, L1 and/or L2 comprises a fused ring system, composed of either aromatic, non-aromatic or anti-aromatic rings or combinations thereof, and SE2 is a MWCNT.

C4.11.17: a CMU, where SE1 is a composite material, L1 and/or L2 comprises a fused ring system, composed of either aromatic, non-aromatic or anti-aromatic rings or combinations thereof, and SE2 is a SWCNT.

C4.11.18: a CMU, where SE1 is a composite material, L1 and/or L2 comprises a fused ring system, composed of either aromatic, non-aromatic or anti-aromatic rings or combinations thereof, and SE2 is a GS.

C4.11.19: a CMU, where SE1 is a composite material, L1 and/or L2 comprises a fused ring system, composed of either aromatic, non-aromatic or anti-aromatic rings or combinations thereof, and SE2 is a nanotube.

C4.11.20: a CMU, where SE1 is a composite material, L1 and/or L2 comprises a fused ring system, composed of either aromatic, non-aromatic or anti-aromatic rings or combinations thereof, and SE2 is a BNNT.

C4.11.21: a CMU, where SE1 is a composite material, L1 and/or L2 comprises a fused ring system, composed of either aromatic, non-aromatic or anti-aromatic rings or combinations thereof, and SE2 is a polyacrylate.

C4.11.22: a CMU, where SE1 is a composite material, L1 and/or L2 comprises a fused ring system, composed of either aromatic, non-aromatic or anti-aromatic rings or combinations thereof, and SE2 is a polyolefine.

C5.1.1: a CMU, where SE1 is a fullerene, and.

C5.1.2: a CMU, where SE1 is a fullerene, and SE2 is copolymer.

C5.1.3: a CMU, where SE1 is a fullerene, and SE2 is a high density polyethylene.

C5.1.4: a CMU, where SE1 is a fullerene, and SE2 is a linear low density polyethylene.

C5.1.5: a CMU, where SE1 is a fullerene, and SE2 is a low density polyethylene.

C5.1.6: a CMU, where SE1 is a fullerene, and SE2 is a nylon.

C5.1.7: a CMU, where SE1 is a fullerene, and SE2 is a polyamide.

C5.1.8: a CMU, where SE1 is a fullerene, and SE2 is a polycarbonate.

C5.1.9: a CMU, where SE1 is a fullerene, and SE2 is a polyethylene.

C5.1.10: a CMU, where SE1 is a fullerene, and SE2 is a polymer.

C5.1.11: a CMU, where SE1 is a fullerene, and SE2 is a polypropylene.

C5.1.12: a CMU, where SE1 is a fullerene, and SE2 is a polystyrene.

C5.1.13: a CMU, where SE1 is a fullerene, and SE2 is an epoxy-based polymer.

C5.1.14: a CMU, where SE1 is a fullerene, and SE2 is a polyethylene terephtalate.

C5.1.15: a CMU, where SE1 is a fullerene, and SE2 is a polyvinylchloride.

C5.1.16: a CMU, where SE1 is a fullerene, and SE2 is a MWCNT.

C5.1.17: a CMU, where SE1 is a fullerene, and SE2 is a SWCNT.

C5.1.18: a CMU, where SE1 is a fullerene, and SE2 is a GS.

C5.1.19: a CMU, where SE1 is a fullerene, and SE2 is a nanotube.

C5.1.20: a CMU, where SE1 is a fullerene, and SE2 is a BNNT.

C5.1.21: a CMU, where SE1 is a fullerene, and SE2 is a polyacrylate.

C5.1.22: a CMU, where SE1 is a fullerene, and SE2 is a polyolefine.

C5.2.1: a CMU, where SE1 is a fullerene, L1 and/or L2 comprises a non-covalent ligand, and C5.2.2: a CMU, where SE1 is a fullerene, L1 and/or L2 comprises a non-covalent ligand, and SE2 is copolymer.

C5.2.3: a CMU, where SE1 is a fullerene, L1 and/or L2 comprises a non-covalent ligand, and SE2 is a high density polyethylene.

C5.2.4: a CMU, where SE1 is a fullerene, L1 and/or L2 comprises a non-covalent ligand, and SE2 is a linear low density polyethylene.

C5.2.5: a CMU, where SE1 is a fullerene, L1 and/or L2 comprises a non-covalent ligand, and SE2 is a low density polyethylene.

C5.2.6: a CMU, where SE1 is a fullerene, L1 and/or L2 comprises a non-covalent ligand, and SE2 is a nylon.

C5.2.7: a CMU, where SE1 is a fullerene, L1 and/or L2 comprises a non-covalent ligand, and SE2 is a polyamide.

C5.2.8: a CMU, where SE1 is a fullerene, L1 and/or L2 comprises a non-covalent ligand, and SE2 is a polycarbonate.

C5.2.9: a CMU, where SE1 is a fullerene, L1 and/or L2 comprises a non-covalent ligand, and SE2 is a polyethylene.

C5.2.10: a CMU, where SE1 is a fullerene, L1 and/or L2 comprises a non-covalent ligand, and SE2 is a polymer.

C5.2.11: a CMU, where SE1 is a fullerene, L1 and/or L2 comprises a non-covalent ligand, and SE2 is a polypropylene.

C5.2.12: a CMU, where SE1 is a fullerene, L1 and/or L2 comprises a non-covalent ligand, and SE2 is a polystyrene.

C5.2.13: a CMU, where SE1 is a fullerene, L1 and/or L2 comprises a non-covalent ligand, and SE2 is an epoxy-based polymer.

C5.2.14: a CMU, where SE1 is a fullerene, L1 and/or L2 comprises a non-covalent ligand, and SE2 is a polyethylene terephtalate.

C5.2.15: a CMU, where SE1 is a fullerene, L1 and/or L2 comprises a non-covalent ligand, and SE2 is a polyvinylchloride.

C5.2.16: a CMU, where SE1 is a fullerene, L1 and/or L2 comprises a non-covalent ligand, and SE2 is a MWCNT.

C5.2.17: a CMU, where SE1 is a fullerene, L1 and/or L2 comprises a non-covalent ligand, and SE2 is a SWCNT.

C5.2.18: a CMU, where SE1 is a fullerene, L1 and/or L2 comprises a non-covalent ligand, and SE2 is a GS.

C5.2.19: a CMU, where SE1 is a fullerene, L1 and/or L2 comprises a non-covalent ligand, and SE2 is a nanotube.

C5.2.20: a CMU, where SE1 is a fullerene, L1 and/or L2 comprises a non-covalent ligand, and SE2 is a BNNT.

C5.2.21: a CMU, where SE1 is a fullerene, L1 and/or L2 comprises a non-covalent ligand, and SE2 is a polyacrylate.

C5.2.22: a CMU, where SE1 is a fullerene, L1 and/or L2 comprises a non-covalent ligand, and SE2 is a polyolefine.

C5.3.1: a CMU, where SE1 is a fullerene, L1 and/or L2 comprises a amino-substituted hydrocarbon, and.

C5.3.2: a CMU, where SE1 is a fullerene, L1 and/or L2 comprises a amino-substituted hydrocarbon, and SE2 is copolymer.

C5.3.3: a CMU, where SE1 is a fullerene, L1 and/or L2 comprises a amino-substituted hydrocarbon, and SE2 is a high density polyethylene.

C5.3.4: a CMU, where SE1 is a fullerene, L1 and/or L2 comprises a amino-substituted hydrocarbon, and SE2 is a linear low density polyethylene.

C5.3.5: a CMU, where SE1 is a fullerene, L1 and/or L2 comprises a amino-substituted hydrocarbon, and SE2 is a low density polyethylene.

C5.3.6: a CMU, where SE1 is a fullerene, L1 and/or L2 comprises a amino-substituted hydrocarbon, and SE2 is a nylon.

C5.3.7: a CMU, where SE1 is a fullerene, L1 and/or L2 comprises a amino-substituted hydrocarbon, and SE2 is a polyamide.

C5.3.8: a CMU, where SE1 is a fullerene, L1 and/or L2 comprises a amino-substituted hydrocarbon, and SE2 is a polycarbonate.

C5.3.9: a CMU, where SE1 is a fullerene, L1 and/or L2 comprises a amino-substituted hydrocarbon, and SE2 is a polyethylene.

C5.3.10: a CMU, where SE1 is a fullerene, L1 and/or L2 comprises a amino-substituted hydrocarbon, and SE2 is a polymer.

C5.3.11: a CMU, where SE1 is a fullerene, L1 and/or L2 comprises a amino-substituted hydrocarbon, and SE2 is a polypropylene.

C5.3.12: a CMU, where SE1 is a fullerene, L1 and/or L2 comprises a amino-substituted hydrocarbon, and SE2 is a polystyrene.

C5.3.13: a CMU, where SE1 is a fullerene, L1 and/or L2 comprises a amino-substituted hydrocarbon, and SE2 is an epoxy-based polymer.

C5.3.14: a CMU, where SE1 is a fullerene, L1 and/or L2 comprises a amino-substituted hydrocarbon, and SE2 is a polyethylene terephtalate.

C5.3.15: a CMU, where SE1 is a fullerene, L1 and/or L2 comprises a amino-substituted hydrocarbon, and SE2 is a polyvinylchloride.

C5.3.16: a CMU, where SE1 is a fullerene, L1 and/or L2 comprises a amino-substituted hydrocarbon, and SE2 is a MWCNT.

C5.3.17: a CMU, where SE1 is a fullerene, L1 and/or L2 comprises a amino-substituted hydrocarbon, and SE2 is a SWCNT.

C5.3.18: a CMU, where SE1 is a fullerene, L1 and/or L2 comprises a amino-substituted hydrocarbon, and SE2 is a GS.

C5.3.19: a CMU, where SE1 is a fullerene, L1 and/or L2 comprises a amino-substituted hydrocarbon, and SE2 is a nanotube.

C5.3.20: a CMU, where SE1 is a fullerene, L1 and/or L2 comprises a amino-substituted hydrocarbon, and SE2 is a BNNT.

C5.3.21: a CMU, where SE1 is a fullerene, L1 and/or L2 comprises a amino-substituted hydrocarbon, and SE2 is a polyacrylate.

C5.3.22: a CMU, where SE1 is a fullerene, L1 and/or L2 comprises a amino-substituted hydrocarbon, and SE2 is a polyolefine.

C5.4.1: a CMU, where SE1 is a fullerene, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and.

C5.4.2: a CMU, where SE1 is a fullerene, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and SE2 is copolymer.

C5.4.3: a CMU, where SE1 is a fullerene, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and SE2 is a high density polyethylene.

C5.4.4: a CMU, where SE1 is a fullerene, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and SE2 is a linear low density polyethylene.

C5.4.5: a CMU, where SE1 is a fullerene, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and SE2 is a low density polyethylene.

C5.4.6: a CMU, where SE1 is a fullerene, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and SE2 is a nylon.

C5.4.7: a CMU, where SE1 is a fullerene, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and SE2 is a polyamide.

C5.4.8: a CMU, where SE1 is a fullerene, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and SE2 is a polycarbonate.

C5.4.9: a CMU, where SE1 is a fullerene, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and SE2 is a polyethylene.

C5.4.10: a CMU, where SE1 is a fullerene, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and SE2 is a polymer.

C5.4.11: a CMU, where SE1 is a fullerene, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and SE2 is a polypropylene.

C5.4.12: a CMU, where SE1 is a fullerene, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and SE2 is a polystyrene.

C5.4.13: a CMU, where SE1 is a fullerene, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and SE2 is an epoxy-based polymer.

C5.4.14: a CMU, where SE1 is a fullerene, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and SE2 is a polyethylene terephtalate.

C5.4.15: a CMU, where SE1 is a fullerene, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and SE2 is a polyvinylchloride.

C5.4.16: a CMU, where SE1 is a fullerene, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and SE2 is a MWCNT.

C5.4.17: a CMU, where SE1 is a fullerene, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and SE2 is a SWCNT.

C5.4.18: a CMU, where SE1 is a fullerene, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and SE2 is a GS.

C5.4.19: a CMU, where SE1 is a fullerene, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and SE2 is a nanotube.

C5.4.20: a CMU, where SE1 is a fullerene, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and SE2 is a BNNT.

C5.4.21: a CMU, where SE1 is a fullerene, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and SE2 is a polyacrylate.

C5.4.22: a CMU, where SE1 is a fullerene, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and SE2 is a polyolefine.

C5.5.1: a CMU, where SE1 is a fullerene, L1 and/or L2 comprises a halogen, nitro group, amine, thiol, alcohol, ester, amide, carboxylic acid, phenol, indole, imidazole, sulfonate or phophate, and.

C5.5.2: a CMU, where SE1 is a fullerene, L1 and/or L2 comprises a halogen, nitro group, amine, thiol, alcohol, ester, amide, carboxylic acid, phenol, indole, imidazole, sulfonate or phophate, and SE2 is copolymer.

C5.5.3: a CMU, where SE1 is a fullerene, L1 and/or L2 comprises a halogen, nitro group, amine, thiol, alcohol, ester, amide, carboxylic acid, phenol, indole, imidazole, sulfonate or phophate, and SE2 is a high density polyethylene.

C5.5.4: a CMU, where SE1 is a fullerene, L1 and/or L2 comprises a halogen, nitro group, amine, thiol, alcohol, ester, amide, carboxylic acid, phenol, indole, imidazole, sulfonate or phophate, and SE2 is a linear low density polyethylene.

C5.5.5: a CMU, where SE1 is a fullerene, L1 and/or L2 comprises a halogen, nitro group, amine, thiol, alcohol, ester, amide, carboxylic acid, phenol, indole, imidazole, sulfonate or phophate, and SE2 is a low density polyethylene.

C5.5.6: a CMU, where SE1 is a fullerene, L1 and/or L2 comprises a halogen, nitro group, amine, thiol, alcohol, ester, amide, carboxylic acid, phenol, indole, imidazole, sulfonate or phophate, and SE2 is a nylon.

C5.5.7: a CMU, where SE1 is a fullerene, L1 and/or L2 comprises a halogen, nitro group, amine, thiol, alcohol, ester, amide, carboxylic acid, phenol, indole, imidazole, sulfonate or phophate, and SE2 is a polyamide.

C5.5.8: a CMU, where SE1 is a fullerene, L1 and/or L2 comprises a halogen, nitro group, amine, thiol, alcohol, ester, amide, carboxylic acid, phenol, indole, imidazole, sulfonate or phophate, and SE2 is a polycarbonate.

C5.5.9: a CMU, where SE1 is a fullerene, L1 and/or L2 comprises a halogen, nitro group, amine, thiol, alcohol, ester, amide, carboxylic acid, phenol, indole, imidazole, sulfonate or phophate, and SE2 is a polyethylene.

C5.5.10: a CMU, where SE1 is a fullerene, L1 and/or L2 comprises a halogen, nitro group, amine, thiol, alcohol, ester, amide, carboxylic acid, phenol, indole, imidazole, sulfonate or phophate, and SE2 is a polymer.

C5.5.11: a CMU, where SE1 is a fullerene, L1 and/or L2 comprises a halogen, nitro group, amine, thiol, alcohol, ester, amide, carboxylic acid, phenol, indole, imidazole, sulfonate or phophate, and SE2 is a polypropylene.

C5.5.12: a CMU, where SE1 is a fullerene, L1 and/or L2 comprises a halogen, nitro group, amine, thiol, alcohol, ester, amide, carboxylic acid, phenol, indole, imidazole, sulfonate or phophate, and SE2 is a polystyrene.

C5.5.13: a CMU, where SE1 is a fullerene, L1 and/or L2 comprises a halogen, nitro group, amine, thiol, alcohol, ester, amide, carboxylic acid, phenol, indole, imidazole, sulfonate or phophate, and SE2 is an epoxy-based polymer.

C5.5.14: a CMU, where SE1 is a fullerene, L1 and/or L2 comprises a halogen, nitro group, amine, thiol, alcohol, ester, amide, carboxylic acid, phenol, indole, imidazole, sulfonate or phophate, and SE2 is a polyethylene terephtalate.

C5.5.15: a CMU, where SE1 is a fullerene, L1 and/or L2 comprises a halogen, nitro group, amine, thiol, alcohol, ester, amide, carboxylic acid, phenol, indole, imidazole, sulfonate or phophate, and SE2 is a polyvinylchloride.

C5.5.16: a CMU, where SE1 is a fullerene, L1 and/or L2 comprises a halogen, nitro group, amine, thiol, alcohol, ester, amide, carboxylic acid, phenol, indole, imidazole, sulfonate or phophate, and SE2 is a MWCNT.

C5.5.17: a CMU, where SE1 is a fullerene, L1 and/or L2 comprises a halogen, nitro group, amine, thiol, alcohol, ester, amide, carboxylic acid, phenol, indole, imidazole, sulfonate or phophate, and SE2 is a SWCNT.

C5.5.18: a CMU, where SE1 is a fullerene, L1 and/or L2 comprises a halogen, nitro group, amine, thiol, alcohol, ester, amide, carboxylic acid, phenol, indole, imidazole, sulfonate or phophate, and SE2 is a GS.

C5.5.19: a CMU, where SE1 is a fullerene, L1 and/or L2 comprises a halogen, nitro group, amine, thiol, alcohol, ester, amide, carboxylic acid, phenol, indole, imidazole, sulfonate or phophate, and SE2 is a nanotube.

C5.5.20: a CMU, where SE1 is a fullerene, L1 and/or L2 comprises a halogen, nitro group, amine, thiol, alcohol, ester, amide, carboxylic acid, phenol, indole, imidazole, sulfonate or phophate, and SE2 is a BNNT.

C5.5.21: a CMU, where SE1 is a fullerene, L1 and/or L2 comprises a halogen, nitro group, amine, thiol, alcohol, ester, amide, carboxylic acid, phenol, indole, imidazole, sulfonate or phophate, and SE2 is a polyacrylate.

C5.5.22: a CMU, where SE1 is a fullerene, L1 and/or L2 comprises a halogen, nitro group, amine, thiol, alcohol, ester, amide, carboxylic acid, phenol, indole, imidazole, sulfonate or phophate, and SE2 is a polyolefine.

C5.6.1: a CMU, where SE1 is a fullerene, L1 and/or L2 comprises an C1-C10 alkane, and.

C5.6.2: a CMU, where SE1 is a fullerene, L1 and/or L2 comprises an C1-C10 alkane, and SE2 is copolymer.

C5.6.3: a CMU, where SE1 is a fullerene, L1 and/or L2 comprises an C1-C10 alkane, and SE2 is a high density polyethylene.

C5.6.4: a CMU, where SE1 is a fullerene, L1 and/or L2 comprises an C1-C10 alkane, and SE2 is a linear low density polyethylene.

C5.6.5: a CMU, where SE1 is a fullerene, L1 and/or L2 comprises an C1-C10 alkane, and SE2 is a low density polyethylene.

C5.6.6: a CMU, where SE1 is a fullerene, L1 and/or L2 comprises an C1-C10 alkane, and SE2 is a nylon.

C5.6.7: a CMU, where SE1 is a fullerene, L1 and/or L2 comprises an C1-C10 alkane, and SE2 is a polyamide.

C5.6.8: a CMU, where SE1 is a fullerene, L1 and/or L2 comprises an C1-C10 alkane, and SE2 is a polycarbonate.

C5.6.9: a CMU, where SE1 is a fullerene, L1 and/or L2 comprises an C1-C10 alkane, and SE2 is a polyethylene.

C5.6.10: a CMU, where SE1 is a fullerene, L1 and/or L2 comprises an C1-C10 alkane, and SE2 is a polymer.

C5.6.11: a CMU, where SE1 is a fullerene, L1 and/or L2 comprises an C1-C10 alkane, and SE2 is a polypropylene.

C5.6.12: a CMU, where SE1 is a fullerene, L1 and/or L2 comprises an C1-C10 alkane, and SE2 is a polystyrene.

C5.6.13: a CMU, where SE1 is a fullerene, L1 and/or L2 comprises an C1-C10 alkane, and SE2 is an epoxy-based polymer.

C5.6.14: a CMU, where SE1 is a fullerene, L1 and/or L2 comprises an C1-C10 alkane, and SE2 is a polyethylene terephtalate.

C5.6.15: a CMU, where SE1 is a fullerene, L1 and/or L2 comprises an C1-C10 alkane, and SE2 is a polyvinylchloride.

C5.6.16: a CMU, where SE1 is a fullerene, L1 and/or L2 comprises an C1-C10 alkane, and SE2 is a MWCNT.

C5.6.17: a CMU, where SE1 is a fullerene, L1 and/or L2 comprises an C1-C10 alkane, and SE2 is a SWCNT.

C5.6.18: a CMU, where SE1 is a fullerene, L1 and/or L2 comprises an C1-C10 alkane, and SE2 is a GS.

C5.6.19: a CMU, where SE1 is a fullerene, L1 and/or L2 comprises an C1-C10 alkane, and SE2 is a nanotube.

C5.6.20: a CMU, where SE1 is a fullerene, L1 and/or L2 comprises an C1-C10 alkane, and SE2 is a BNNT.

C5.6.21: a CMU, where SE1 is a fullerene, L1 and/or L2 comprises an C1-C10 alkane, and SE2 is a polyacrylate.

C5.6.22: a CMU, where SE1 is a fullerene, L1 and/or L2 comprises an C1-C10 alkane, and SE2 is a polyolefine.

C5.7.1: a CMU, where SE1 is a fullerene, L1 and/or L2 comprises a detergent comprising a C4-C25 alkane and a polar end group, and.

C5.7.2: a CMU, where SE1 is a fullerene, L1 and/or L2 comprises a detergent comprising a C4-C25 alkane and a polar end group, and SE2 is copolymer.

C5.7.3: a CMU, where SE1 is a fullerene, L1 and/or L2 comprises a detergent comprising a C4-C25 alkane and a polar end group, and SE2 is a high density polyethylene.

C5.7.4: a CMU, where SE1 is a fullerene, L1 and/or L2 comprises a detergent comprising a C4-C25 alkane and a polar end group, and SE2 is a linear low density polyethylene.

C5.7.5: a CMU, where SE1 is a fullerene, L1 and/or L2 comprises a detergent comprising a C4-C25 alkane and a polar end group, and SE2 is a low density polyethylene.

C5.7.6: a CMU, where SE1 is a fullerene, L1 and/or L2 comprises a detergent comprising a C4-C25 alkane and a polar end group, and SE2 is a nylon.

C5.7.7: a CMU, where SE1 is a fullerene, L1 and/or L2 comprises a detergent comprising a C4-C25 alkane and a polar end group, and SE2 is a polyamide.

C5.7.8: a CMU, where SE1 is a fullerene, L1 and/or L2 comprises a detergent comprising a C4-C25 alkane and a polar end group, and SE2 is a polycarbonate.

C5.7.9: a CMU, where SE1 is a fullerene, L1 and/or L2 comprises a detergent comprising a C4-C25 alkane and a polar end group, and SE2 is a polyethylene.

C5.7.10: a CMU, where SE1 is a fullerene, L1 and/or L2 comprises a detergent comprising a C4-C25 alkane and a polar end group, and SE2 is a polymer.

C5.7.11: a CMU, where SE1 is a fullerene, L1 and/or L2 comprises a detergent comprising a C4-C25 alkane and a polar end group, and SE2 is a polypropylene.

C5.7.12: a CMU, where SE1 is a fullerene, L1 and/or L2 comprises a detergent comprising a C4-C25 alkane and a polar end group, and SE2 is a polystyrene.

C5.7.13: a CMU, where SE1 is a fullerene, L1 and/or L2 comprises a detergent comprising a C4-C25 alkane and a polar end group, and SE2 is an epoxy-based polymer.

C5.7.14: a CMU, where SE1 is a fullerene, L1 and/or L2 comprises a detergent comprising a C4-C25 alkane and a polar end group, and SE2 is a polyethylene terephtalate.

C5.7.15: a CMU, where SE1 is a fullerene, L1 and/or L2 comprises a detergent comprising a C4-C25 alkane and a polar end group, and SE2 is a polyvinylchloride.

C5.7.16: a CMU, where SE1 is a fullerene, L1 and/or L2 comprises a detergent comprising a C4-C25 alkane and a polar end group, and SE2 is a MWCNT.

C5.7.17: a CMU, where SE1 is a fullerene, L1 and/or L2 comprises a detergent comprising a C4-C25 alkane and a polar end group, and SE2 is a SWCNT.

C5.7.18: a CMU, where SE1 is a fullerene, L1 and/or L2 comprises a detergent comprising a C4-C25 alkane and a polar end group, and SE2 is a GS.

C5.7.19: a CMU, where SE1 is a fullerene, L1 and/or L2 comprises a detergent comprising a C4-C25 alkane and a polar end group, and SE2 is a nanotube.

C5.7.20: a CMU, where SE1 is a fullerene, L1 and/or L2 comprises a detergent comprising a C4-C25 alkane and a polar end group, and SE2 is a BNNT.

C5.7.21: a CMU, where SE1 is a fullerene, L1 and/or L2 comprises a detergent comprising a C4-C25 alkane and a polar end group, and SE2 is a polyacrylate.

C5.7.22: a CMU, where SE1 is a fullerene, L1 and/or L2 comprises a detergent comprising a C4-C25 alkane and a polar end group, and SE2 is a polyolefine.

C5.8.1: a CMU, where SE1 is a fullerene, L1 and/or L2 comprises a lactam, such as N-methyl-pyrrolidone and lactone, and.

C5.8.2: a CMU, where SE1 is a fullerene, L1 and/or L2 comprises a lactam, such as N-methyl-pyrrolidone and lactone, and SE2 is copolymer.

C5.8.3: a CMU, where SE1 is a fullerene, L1 and/or L2 comprises a lactam, such as N-methyl-pyrrolidone and lactone, and SE2 is a high density polyethylene.

C5.8.4: a CMU, where SE1 is a fullerene, L1 and/or L2 comprises a lactam, such as N-methyl-pyrrolidone and lactone, and SE2 is a linear low density polyethylene.

C5.8.5: a CMU, where SE1 is a fullerene, L1 and/or L2 comprises a lactam, such as N-methyl-pyrrolidone and lactone, and SE2 is a low density polyethylene.

C5.8.6: a CMU, where SE1 is a fullerene, L1 and/or L2 comprises a lactam, such as N-methyl-pyrrolidone and lactone, and SE2 is a nylon.

C5.8.7: a CMU, where SE1 is a fullerene, L1 and/or L2 comprises a lactam, such as N-methyl-pyrrolidone and lactone, and SE2 is a polyamide.

C5.8.8: a CMU, where SE1 is a fullerene, L1 and/or L2 comprises a lactam, such as N-methyl-pyrrolidone and lactone, and SE2 is a polycarbonate.

C5.8.9: a CMU, where SE1 is a fullerene, L1 and/or L2 comprises a lactam, such as N-methyl-pyrrolidone and lactone, and SE2 is a polyethylene.

C5.8.10: a CMU, where SE1 is a fullerene, L1 and/or L2 comprises a lactam, such as N-methyl-pyrrolidone and lactone, and SE2 is a polymer.

C5.8.11: a CMU, where SE1 is a fullerene, L1 and/or L2 comprises a lactam, such as N-methyl-pyrrolidone and lactone, and SE2 is a polypropylene.

C5.8.12: a CMU, where SE1 is a fullerene, L1 and/or L2 comprises a lactam, such as N-methyl-pyrrolidone and lactone, and SE2 is a polystyrene.

C5.8.13: a CMU, where SE1 is a fullerene, L1 and/or L2 comprises a lactam, such as N-methyl-pyrrolidone and lactone, and SE2 is an epoxy-based polymer.

C5.8.14: a CMU, where SE1 is a fullerene, L1 and/or L2 comprises a lactam, such as N-methyl-pyrrolidone and lactone, and SE2 is a polyethylene terephtalate.

C5.8.15: a CMU, where SE1 is a fullerene, L1 and/or L2 comprises a lactam, such as N-methyl-pyrrolidone and lactone, and SE2 is a polyvinylchloride.

C5.8.16: a CMU, where SE1 is a fullerene, L1 and/or L2 comprises a lactam, such as N-methyl-pyrrolidone and lactone, and SE2 is a MWCNT.

C5.8.17: a CMU, where SE1 is a fullerene, L1 and/or L2 comprises a lactam, such as N-methyl-pyrrolidone and lactone, and SE2 is a SWCNT.

C5.8.18: a CMU, where SE1 is a fullerene, L1 and/or L2 comprises a lactam, such as N-methyl-pyrrolidone and lactone, and SE2 is a GS.

C5.8.19: a CMU, where SE1 is a fullerene, L1 and/or L2 comprises a lactam, such as N-methyl-pyrrolidone and lactone, and SE2 is a nanotube.

C5.8.20: a CMU, where SE1 is a fullerene, L1 and/or L2 comprises a lactam, such as N-methyl-pyrrolidone and lactone, and SE2 is a BNNT.

C5.8.21: a CMU, where SE1 is a fullerene, L1 and/or L2 comprises a lactam, such as N-methyl-pyrrolidone and lactone, and SE2 is a polyacrylate.

C5.8.22: a CMU, where SE1 is a fullerene, L1 and/or L2 comprises a lactam, such as N-methyl-pyrrolidone and lactone, and SE2 is a polyolefine.

C5.9.1: a CMU, where SE1 is a fullerene, L1 and/or L2 comprises a amino acid residue such as phenylalanine, tyrosine, tryptophan, or histidine, and.

C5.9.2: a CMU, where SE1 is a fullerene, L1 and/or L2 comprises a amino acid residue such as phenylalanine, tyrosine, tryptophan, or histidine, and SE2 is copolymer.

C5.9.3: a CMU, where SE1 is a fullerene, L1 and/or L2 comprises a amino acid residue such as phenylalanine, tyrosine, tryptophan, or histidine, and SE2 is a high density polyethylene.

C5.9.4: a CMU, where SE1 is a fullerene, L1 and/or L2 comprises a amino acid residue such as phenylalanine, tyrosine, tryptophan, or histidine, and SE2 is a linear low density polyethylene.

C5.9.5: a CMU, where SE1 is a fullerene, L1 and/or L2 comprises a amino acid residue such as phenylalanine, tyrosine, tryptophan, or histidine, and SE2 is a low density polyethylene.

C5.9.6: a CMU, where SE1 is a fullerene, L1 and/or L2 comprises a amino acid residue such as phenylalanine, tyrosine, tryptophan, or histidine, and SE2 is a nylon.

C5.9.7: a CMU, where SE1 is a fullerene, L1 and/or L2 comprises a amino acid residue such as phenylalanine, tyrosine, tryptophan, or histidine, and SE2 is a polyamide.

C5.9.8: a CMU, where SE1 is a fullerene, L1 and/or L2 comprises a amino acid residue such as phenylalanine, tyrosine, tryptophan, or histidine, and SE2 is a polycarbonate.

C5.9.9: a CMU, where SE1 is a fullerene, L1 and/or L2 comprises a amino acid residue such as phenylalanine, tyrosine, tryptophan, or histidine, and SE2 is a polyethylene.

C5.9.10: a CMU, where SE1 is a fullerene, L1 and/or L2 comprises a amino acid residue such as phenylalanine, tyrosine, tryptophan, or histidine, and SE2 is a polymer.

C5.9.11: a CMU, where SE1 is a fullerene, L1 and/or L2 comprises a amino acid residue such as phenylalanine, tyrosine, tryptophan, or histidine, and SE2 is a polypropylene.

C5.9.12: a CMU, where SE1 is a fullerene, L1 and/or L2 comprises a amino acid residue such as phenylalanine, tyrosine, tryptophan, or histidine, and SE2 is a polystyrene.

C5.9.13: a CMU, where SE1 is a fullerene, L1 and/or L2 comprises a amino acid residue such as phenylalanine, tyrosine, tryptophan, or histidine, and SE2 is an epoxy-based polymer.

C5.9.14: a CMU, where SE1 is a fullerene, L1 and/or L2 comprises a amino acid residue such as phenylalanine, tyrosine, tryptophan, or histidine, and SE2 is a polyethylene terephtalate.

C5.9.15: a CMU, where SE1 is a fullerene, L1 and/or L2 comprises a amino acid residue such as phenylalanine, tyrosine, tryptophan, or histidine, and SE2 is a polyvinylchloride.

C5.9.16: a CMU, where SE1 is a fullerene, L1 and/or L2 comprises a amino acid residue such as phenylalanine, tyrosine, tryptophan, or histidine, and SE2 is a MWCNT.

C5.9.17: a CMU, where SE1 is a fullerene, L1 and/or L2 comprises a amino acid residue such as phenylalanine, tyrosine, tryptophan, or histidine, and SE2 is a SWCNT.

C5.9.18: a CMU, where SE1 is a fullerene, L1 and/or L2 comprises a amino acid residue such as phenylalanine, tyrosine, tryptophan, or histidine, and SE2 is a GS.

C5.9.19: a CMU, where SE1 is a fullerene, L1 and/or L2 comprises a amino acid residue such as phenylalanine, tyrosine, tryptophan, or histidine, and SE2 is a nanotube.

C5.9.20: a CMU, where SE1 is a fullerene, L1 and/or L2 comprises a amino acid residue such as phenylalanine, tyrosine, tryptophan, or histidine, and SE2 is a BNNT.

C5.9.21: a CMU, where SE1 is a fullerene, L1 and/or L2 comprises a amino acid residue such as phenylalanine, tyrosine, tryptophan, or histidine, and SE2 is a polyacrylate.

C5.9.22: a CMU, where SE1 is a fullerene, L1 and/or L2 comprises a amino acid residue such as phenylalanine, tyrosine, tryptophan, or histidine, and SE2 is a polyolefine.

C5.10.1: a CMU, where SE1 is a fullerene, L1 and/or L2 comprises a heteroaromatic system, including pyrole, thiophene, furane, pyrazole, imidazole, isoxazole, oxazole, isothiazole, thiazole, pyridine and perylene bisimides, and.

C5.10.2: a CMU, where SE1 is a fullerene, L1 and/or L2 comprises a heteroaromatic system, including pyrole, thiophene, furane, pyrazole, imidazole, isoxazole, oxazole, isothiazole, thiazole, pyridine and perylene bisimides, and SE2 is copolymer.

C5.10.3: a CMU, where SE1 is a fullerene, L1 and/or L2 comprises a heteroaromatic system, including pyrole, thiophene, furane, pyrazole, imidazole, isoxazole, oxazole, isothiazole, thiazole, pyridine and perylene bisimides, and SE2 is a high density polyethylene.

C5.10.4: a CMU, where SE1 is a fullerene, L1 and/or L2 comprises a heteroaromatic system, including pyrole, thiophene, furane, pyrazole, imidazole, isoxazole, oxazole, isothiazole, thiazole, pyridine and perylene bisimides, and SE2 is a linear low density polyethylene.

C5.10.5: a CMU, where SE1 is a fullerene, L1 and/or L2 comprises a heteroaromatic system, including pyrole, thiophene, furane, pyrazole, imidazole, isoxazole, oxazole, isothiazole, thiazole, pyridine and perylene bisimides, and SE2 is a low density polyethylene.

C5.10.6: a CMU, where SE1 is a fullerene, L1 and/or L2 comprises a heteroaromatic system, including pyrole, thiophene, furane, pyrazole, imidazole, isoxazole, oxazole, isothiazole, thiazole, pyridine and perylene bisimides, and SE2 is a nylon.

C5.10.7: a CMU, where SE1 is a fullerene, L1 and/or L2 comprises a heteroaromatic system, including pyrole, thiophene, furane, pyrazole, imidazole, isoxazole, oxazole, isothiazole, thiazole, pyridine and perylene bisimides, and SE2 is a polyamide.

C5.10.8: a CMU, where SE1 is a fullerene, L1 and/or L2 comprises a heteroaromatic system, including pyrole, thiophene, furane, pyrazole, imidazole, isoxazole, oxazole, isothiazole, thiazole, pyridine and perylene bisimides, and SE2 is a polycarbonate.

C5.10.9: a CMU, where SE1 is a fullerene, L1 and/or L2 comprises a heteroaromatic system, including pyrole, thiophene, furane, pyrazole, imidazole, isoxazole, oxazole, isothiazole, thiazole, pyridine and perylene bisimides, and SE2 is a polyethylene.

C5.10.10: a CMU, where SE1 is a fullerene, L1 and/or L2 comprises a heteroaromatic system, including pyrole, thiophene, furane, pyrazole, imidazole, isoxazole, oxazole, isothiazole, thiazole, pyridine and perylene bisimides, and SE2 is a polymer.

C5.10.11: a CMU, where SE1 is a fullerene, L1 and/or L2 comprises a heteroaromatic system, including pyrole, thiophene, furane, pyrazole, imidazole, isoxazole, oxazole, isothiazole, thiazole, pyridine and perylene bisimides, and SE2 is a polypropylene.

C5.10.12: a CMU, where SE1 is a fullerene, L1 and/or L2 comprises a heteroaromatic system, including pyrole, thiophene, furane, pyrazole, imidazole, isoxazole, oxazole, isothiazole, thiazole, pyridine and perylene bisimides, and SE2 is a polystyrene.

C5.10.13: a CMU, where SE1 is a fullerene, L1 and/or L2 comprises a heteroaromatic system, including pyrole, thiophene, furane, pyrazole, imidazole, isoxazole, oxazole, isothiazole, thiazole, pyridine and perylene bisimides, and SE2 is an epoxy-based polymer.

C5.10.14: a CMU, where SE1 is a fullerene, L1 and/or L2 comprises a heteroaromatic system, including pyrole, thiophene, furane, pyrazole, imidazole, isoxazole, oxazole, isothiazole, thiazole, pyridine and perylene bisimides, and SE2 is a polyethylene terephtalate.

C5.10.15: a CMU, where SE1 is a fullerene, L1 and/or L2 comprises a heteroaromatic system, including pyrole, thiophene, furane, pyrazole, imidazole, isoxazole, oxazole, isothiazole, thiazole, pyridine and perylene bisimides, and SE2 is a polyvinylchloride.

C5.10.16: a CMU, where SE1 is a fullerene, L1 and/or L2 comprises a heteroaromatic system, including pyrole, thiophene, furane, pyrazole, imidazole, isoxazole, oxazole, isothiazole, thiazole, pyridine and perylene bisimides, and SE2 is a MWCNT.

C5.10.17: a CMU, where SE1 is a fullerene, L1 and/or L2 comprises a heteroaromatic system, including pyrole, thiophene, furane, pyrazole, imidazole, isoxazole, oxazole, isothiazole, thiazole, pyridine and perylene bisimides, and SE2 is a SWCNT.

C5.10.18: a CMU, where SE1 is a fullerene, L1 and/or L2 comprises a heteroaromatic system, including pyrole, thiophene, furane, pyrazole, imidazole, isoxazole, oxazole, isothiazole, thiazole, pyridine and perylene bisimides, and SE2 is a GS.

C5.10.19: a CMU, where SE1 is a fullerene, L1 and/or L2 comprises a heteroaromatic system, including pyrole, thiophene, furane, pyrazole, imidazole, isoxazole, oxazole, isothiazole, thiazole, pyridine and perylene bisimides, and SE2 is a nanotube.

C5.10.20: a CMU, where SE1 is a fullerene, L1 and/or L2 comprises a heteroaromatic system, including pyrole, thiophene, furane, pyrazole, imidazole, isoxazole, oxazole, isothiazole, thiazole, pyridine and perylene bisimides, and SE2 is a BNNT.

C5.10.21: a CMU, where SE1 is a fullerene, L1 and/or L2 comprises a heteroaromatic system, including pyrole, thiophene, furane, pyrazole, imidazole, isoxazole, oxazole, isothiazole, thiazole, pyridine and perylene bisimides, and SE2 is a polyacrylate.

C5.10.22: a CMU, where SE1 is a fullerene, L1 and/or L2 comprises a heteroaromatic system, including pyrole, thiophene, furane, pyrazole, imidazole, isoxazole, oxazole, isothiazole, thiazole, pyridine and perylene bisimides, and SE2 is a polyolefine.

C5.11.1: a CMU, where SE1 is a fullerene, L1 and/or L2 comprises a fused ring system, composed of either aromatic, non-aromatic or anti-aromatic rings or combinations thereof, and.

C5.11.2: a CMU, where SE1 is a fullerene, L1 and/or L2 comprises a fused ring system, composed of either aromatic, non-aromatic or anti-aromatic rings or combinations thereof, and SE2 is copolymer.

C5.11.3: a CMU, where SE1 is a fullerene, L1 and/or L2 comprises a fused ring system, composed of either aromatic, non-aromatic or anti-aromatic rings or combinations thereof, and SE2 is a high density polyethylene.

C5.11.4: a CMU, where SE1 is a fullerene, L1 and/or L2 comprises a fused ring system, composed of either aromatic, non-aromatic or anti-aromatic rings or combinations thereof, and SE2 is a linear low density polyethylene.

C5.11.5: a CMU, where SE1 is a fullerene, L1 and/or L2 comprises a fused ring system, composed of either aromatic, non-aromatic or anti-aromatic rings or combinations thereof, and SE2 is a low density polyethylene.

C5.11.6: a CMU, where SE1 is a fullerene, L1 and/or L2 comprises a fused ring system, composed of either aromatic, non-aromatic or anti-aromatic rings or combinations thereof, and SE2 is a nylon.

C5.11.7: a CMU, where SE1 is a fullerene, L1 and/or L2 comprises a fused ring system, composed of either aromatic, non-aromatic or anti-aromatic rings or combinations thereof, and SE2 is a polyamide.

C5.11.8: a CMU, where SE1 is a fullerene, L1 and/or L2 comprises a fused ring system, composed of either aromatic, non-aromatic or anti-aromatic rings or combinations thereof, and SE2 is a polycarbonate.

C5.11.9: a CMU, where SE1 is a fullerene, L1 and/or L2 comprises a fused ring system, composed of either aromatic, non-aromatic or anti-aromatic rings or combinations thereof, and SE2 is a polyethylene.

C5.11.10: a CMU, where SE1 is a fullerene, L1 and/or L2 comprises a fused ring system, composed of either aromatic, non-aromatic or anti-aromatic rings or combinations thereof, and SE2 is a polymer.

C5.11.11: a CMU, where SE1 is a fullerene, L1 and/or L2 comprises a fused ring system, composed of either aromatic, non-aromatic or anti-aromatic rings or combinations thereof, and SE2 is a polypropylene.

C5.11.12: a CMU, where SE1 is a fullerene, L1 and/or L2 comprises a fused ring system, composed of either aromatic, non-aromatic or anti-aromatic rings or combinations thereof, and SE2 is a polystyrene.

C5.11.13: a CMU, where SE1 is a fullerene, L1 and/or L2 comprises a fused ring system, composed of either aromatic, non-aromatic or anti-aromatic rings or combinations thereof, and SE2 is an epoxy-based polymer.

C5.11.14: a CMU, where SE1 is a fullerene, L1 and/or L2 comprises a fused ring system, composed of either aromatic, non-aromatic or anti-aromatic rings or combinations thereof, and SE2 is a polyethylene terephtalate.

C5.11.15: a CMU, where SE1 is a fullerene, L1 and/or L2 comprises a fused ring system, composed of either aromatic, non-aromatic or anti-aromatic rings or combinations thereof, and SE2 is a polyvinylchloride.

C5.11.16: a CMU, where SE1 is a fullerene, L1 and/or L2 comprises a fused ring system, composed of either aromatic, non-aromatic or anti-aromatic rings or combinations thereof, and SE2 is a MWCNT.

C5.11.17: a CMU, where SE1 is a fullerene, L1 and/or L2 comprises a fused ring system, composed of either aromatic, non-aromatic or anti-aromatic rings or combinations thereof, and SE2 is a SWCNT.

C5.11.18: a CMU, where SE1 is a fullerene, L1 and/or L2 comprises a fused ring system, composed of either aromatic, non-aromatic or anti-aromatic rings or combinations thereof, and SE2 is a GS.

C5.11.19: a CMU, where SE1 is a fullerene, L1 and/or L2 comprises a fused ring system, composed of either aromatic, non-aromatic or anti-aromatic rings or combinations thereof, and SE2 is a nanotube.

C5.11.20: a CMU, where SE1 is a fullerene, L1 and/or L2 comprises a fused ring system, composed of either aromatic, non-aromatic or anti-aromatic rings or combinations thereof, and SE2 is a BNNT.

C5.11.21: a CMU, where SE1 is a fullerene, L1 and/or L2 comprises a fused ring system, composed of either aromatic, non-aromatic or anti-aromatic rings or combinations thereof, and SE2 is a polyacrylate.

C5.11.22: a CMU, where SE1 is a fullerene, L1 and/or L2 comprises a fused ring system, composed of either aromatic, non-aromatic or anti-aromatic rings or combinations thereof, and SE2 is a polyolefine.

C6.1.1: a CMU, where SE1 is a MWCNT, and.

C6.1.2: a CMU, where SE1 is a MWCNT, and SE2 is copolymer.

C6.1.3: a CMU, where SE1 is a MWCNT, and SE2 is a high density polyethylene.

C6.1.4: a CMU, where SE1 is a MWCNT, and SE2 is a linear low density polyethylene.

C6.1.5: a CMU, where SE1 is a MWCNT, and SE2 is a low density polyethylene.

C6.1.6: a CMU, where SE1 is a MWCNT, and SE2 is a nylon.

C6.1.7: a CMU, where SE1 is a MWCNT, and SE2 is a polyamide.

C6.1.8: a CMU, where SE1 is a MWCNT, and SE2 is a polycarbonate.

C6.1.9: a CMU, where SE1 is a MWCNT, and SE2 is a polyethylene.

C6.1.10: a CMU, where SE1 is a MWCNT, and SE2 is a polymer.

C6.1.11: a CMU, where SE1 is a MWCNT, and SE2 is a polypropylene.

C6.1.12: a CMU, where SE1 is a MWCNT, and SE2 is a polystyrene.

C6.1.13: a CMU, where SE1 is a MWCNT, and SE2 is an epoxy-based polymer.

C6.1.14: a CMU, where SE1 is a MWCNT, and SE2 is a polyethylene terephtalate.

C6.1.15: a CMU, where SE1 is a MWCNT, and SE2 is a polyvinylchloride.

C6.1.16: a CMU, where SE1 is a MWCNT, and SE2 is a MWCNT.

C6.1.17: a CMU, where SE1 is a MWCNT, and SE2 is a SWCNT.

C6.1.18: a CMU, where SE1 is a MWCNT, and SE2 is a GS.

C6.1.19: a CMU, where SE1 is a MWCNT, and SE2 is a nanotube.

C6.1.20: a CMU, where SE1 is a MWCNT, and SE2 is a BNNT.

C6.1.21: a CMU, where SE1 is a MWCNT, and SE2 is a polyacrylate.

C6.1.22: a CMU, where SE1 is a MWCNT, and SE2 is a polyolefine.

C6.2.1: a CMU, where SE1 is a MWCNT, L1 and/or L2 comprises a non-covalent ligand, and.

C6.2.2: a CMU, where SE1 is a MWCNT, L1 and/or L2 comprises a non-covalent ligand, and SE2 is copolymer.

C6.2.3: a CMU, where SE1 is a MWCNT, L1 and/or L2 comprises a non-covalent ligand, and SE2 is a high density polyethylene.

C6.2.4: a CMU, where SE1 is a MWCNT, L1 and/or L2 comprises a non-covalent ligand, and SE2 is a linear low density polyethylene.

C6.2.5: a CMU, where SE1 is a MWCNT, L1 and/or L2 comprises a non-covalent ligand, and SE2 is a low density polyethylene.

C6.2.6: a CMU, where SE1 is a MWCNT, L1 and/or L2 comprises a non-covalent ligand, and SE2 is a nylon.

C6.2.7: a CMU, where SE1 is a MWCNT, L1 and/or L2 comprises a non-covalent ligand, and SE2 is a polyamide.

C6.2.8: a CMU, where SE1 is a MWCNT, L1 and/or L2 comprises a non-covalent ligand, and SE2 is a polycarbonate.

C6.2.9: a CMU, where SE1 is a MWCNT, L1 and/or L2 comprises a non-covalent ligand, and SE2 is a polyethylene.

C6.2.10: a CMU, where SE1 is a MWCNT, L1 and/or L2 comprises a non-covalent ligand, and SE2 is a polymer.

C6.2.11: a CMU, where SE1 is a MWCNT, L1 and/or L2 comprises a non-covalent ligand, and SE2 is a polypropylene.

C6.2.12: a CMU, where SE1 is a MWCNT, L1 and/or L2 comprises a non-covalent ligand, and SE2 is a polystyrene.

C6.2.13: a CMU, where SE1 is a MWCNT, L1 and/or L2 comprises a non-covalent ligand, and SE2 is an epoxy-based polymer.

C6.2.14: a CMU, where SE1 is a MWCNT, L1 and/or L2 comprises a non-covalent ligand, and SE2 is a polyethylene terephtalate.

C6.2.15: a CMU, where SE1 is a MWCNT, L1 and/or L2 comprises a non-covalent ligand, and SE2 is a polyvinylchloride.

C6.2.16: a CMU, where SE1 is a MWCNT, L1 and/or L2 comprises a non-covalent ligand, and SE2 is a MWCNT.

C6.2.17: a CMU, where SE1 is a MWCNT, L1 and/or L2 comprises a non-covalent ligand, and SE2 is a SWCNT.

C6.2.18: a CMU, where SE1 is a MWCNT, L1 and/or L2 comprises a non-covalent ligand, and SE2 is a GS.

C6.2.19: a CMU, where SE1 is a MWCNT, L1 and/or L2 comprises a non-covalent ligand, and SE2 is a nanotube.

C6.2.20: a CMU, where SE1 is a MWCNT, L1 and/or L2 comprises a non-covalent ligand, and SE2 is a BNNT.

C6.2.21: a CMU, where SE1 is a MWCNT, L1 and/or L2 comprises a non-covalent ligand, and SE2 is a polyacrylate.

C6.2.22: a CMU, where SE1 is a MWCNT, L1 and/or L2 comprises a non-covalent ligand, and SE2 is a polyolefine.

C6.3.1: a CMU, where SE1 is a MWCNT, L1 and/or L2 comprises a amino-substituted hydrocarbon, and.

C6.3.2: a CMU, where SE1 is a MWCNT, L1 and/or L2 comprises a amino-substituted hydrocarbon, and SE2 is copolymer.

C6.3.3: a CMU, where SE1 is a MWCNT, L1 and/or L2 comprises a amino-substituted hydrocarbon, and SE2 is a high density polyethylene.

C6.3.4: a CMU, where SE1 is a MWCNT, L1 and/or L2 comprises a amino-substituted hydrocarbon, and SE2 is a linear low density polyethylene.

C6.3.5: a CMU, where SE1 is a MWCNT, L1 and/or L2 comprises a amino-substituted hydrocarbon, and SE2 is a low density polyethylene.

C6.3.6: a CMU, where SE1 is a MWCNT, L1 and/or L2 comprises a amino-substituted hydrocarbon, and SE2 is a nylon.

C6.3.7: a CMU, where SE1 is a MWCNT, L1 and/or L2 comprises a amino-substituted hydrocarbon, and SE2 is a polyamide.

C6.3.8: a CMU, where SE1 is a MWCNT, L1 and/or L2 comprises a amino-substituted hydrocarbon, and SE2 is a polycarbonate.

C6.3.9: a CMU, where SE1 is a MWCNT, L1 and/or L2 comprises a amino-substituted hydrocarbon, and SE2 is a polyethylene.

C6.3.10: a CMU, where SE1 is a MWCNT, L1 and/or L2 comprises a amino-substituted hydrocarbon, and SE2 is a polymer.

C6.3.11: a CMU, where SE1 is a MWCNT, L1 and/or L2 comprises a amino-substituted hydrocarbon, and SE2 is a polypropylene.

C6.3.12: a CMU, where SE1 is a MWCNT, L1 and/or L2 comprises a amino-substituted hydrocarbon, and SE2 is a polystyrene.

C6.3.13: a CMU, where SE1 is a MWCNT, L1 and/or L2 comprises a amino-substituted hydrocarbon, and SE2 is an epoxy-based polymer.

C6.3.14: a CMU, where SE1 is a MWCNT, L1 and/or L2 comprises a amino-substituted hydrocarbon, and SE2 is a polyethylene terephtalate.

C6.3.15: a CMU, where SE1 is a MWCNT, L1 and/or L2 comprises a amino-substituted hydrocarbon, and SE2 is a polyvinylchloride.

C6.3.16: a CMU, where SE1 is a MWCNT, L1 and/or L2 comprises a amino-substituted hydrocarbon, and SE2 is a MWCNT.

C6.3.17: a CMU, where SE1 is a MWCNT, L1 and/or L2 comprises a amino-substituted hydrocarbon, and SE2 is a SWCNT.

C6.3.18: a CMU, where SE1 is a MWCNT, L1 and/or L2 comprises a amino-substituted hydrocarbon, and SE2 is a GS.

C6.3.19: a CMU, where SE1 is a MWCNT, L1 and/or L2 comprises a amino-substituted hydrocarbon, and SE2 is a nanotube.

C6.3.20: a CMU, where SE1 is a MWCNT, L1 and/or L2 comprises a amino-substituted hydrocarbon, and SE2 is a BNNT.

C6.3.21: a CMU, where SE1 is a MWCNT, L1 and/or L2 comprises a amino-substituted hydrocarbon, and SE2 is a polyacrylate.

C6.3.22: a CMU, where SE1 is a MWCNT, L1 and/or L2 comprises a amino-substituted hydrocarbon, and SE2 is a polyolefine.

C6.4.1: a CMU, where SE1 is a MWCNT, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and.

C6.4.2: a CMU, where SE1 is a MWCNT, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and SE2 is copolymer.

C6.4.3: a CMU, where SE1 is a MWCNT, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and SE2 is a high density polyethylene.

C6.4.4: a CMU, where SE1 is a MWCNT, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and SE2 is a linear low density polyethylene.

C6.4.5: a CMU, where SE1 is a MWCNT, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and SE2 is a low density polyethylene.

C6.4.6: a CMU, where SE1 is a MWCNT, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and SE2 is a nylon.

C6.4.7: a CMU, where SE1 is a MWCNT, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and SE2 is a polyamide.

C6.4.8: a CMU, where SE1 is a MWCNT, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and SE2 is a polycarbonate.

C6.4.9: a CMU, where SE1 is a MWCNT, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and SE2 is a polyethylene.

C6.4.10: a CMU, where SE1 is a MWCNT, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and SE2 is a polymer.

C6.4.11: a CMU, where SE1 is a MWCNT, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and SE2 is a polypropylene.

C6.4.12: a CMU, where SE1 is a MWCNT, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and SE2 is a polystyrene.

C6.4.13: a CMU, where SE1 is a MWCNT, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and SE2 is an epoxy-based polymer.

C6.4.14: a CMU, where SE1 is a MWCNT, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and SE2 is a polyethylene terephtalate.

C6.4.15: a CMU, where SE1 is a MWCNT, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and SE2 is a polyvinylchloride.

C6.4.16: a CMU, where SE1 is a MWCNT, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and SE2 is a MWCNT.

C6.4.17: a CMU, where SE1 is a MWCNT, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and SE2 is a SWCNT.

C6.4.18: a CMU, where SE1 is a MWCNT, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and SE2 is a GS.

C6.4.19: a CMU, where SE1 is a MWCNT, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and SE2 is a nanotube.

C6.4.20: a CMU, where SE1 is a MWCNT, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and SE2 is a BNNT.

C6.4.21: a CMU, where SE1 is a MWCNT, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and SE2 is a polyacrylate.

C6.4.22: a CMU, where SE1 is a MWCNT, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and SE2 is a polyolefine.

C6.5.1: a CMU, where SE1 is a MWCNT, L1 and/or L2 comprises a halogen, nitro group, amine, thiol, alcohol, ester, amide, carboxylic acid, phenol, indole, imidazole, sulfonate or phophate, and.

C6.5.2: a CMU, where SE1 is a MWCNT, L1 and/or L2 comprises a halogen, nitro group, amine, thiol, alcohol, ester, amide, carboxylic acid, phenol, indole, imidazole, sulfonate or phophate, and SE2 is copolymer.

C6.5.3: a CMU, where SE1 is a MWCNT, L1 and/or L2 comprises a halogen, nitro group, amine, thiol, alcohol, ester, amide, carboxylic acid, phenol, indole, imidazole, sulfonate or phophate, and SE2 is a high density polyethylene.

C6.5.4: a CMU, where SE1 is a MWCNT, L1 and/or L2 comprises a halogen, nitro group, amine, thiol, alcohol, ester, amide, carboxylic acid, phenol, indole, imidazole, sulfonate or phophate, and SE2 is a linear low density polyethylene.

C6.5.5: a CMU, where SE1 is a MWCNT, L1 and/or L2 comprises a halogen, nitro group, amine, thiol, alcohol, ester, amide, carboxylic acid, phenol, indole, imidazole, sulfonate or phophate, and SE2 is a low density polyethylene.

C6.5.6: a CMU, where SE1 is a MWCNT, L1 and/or L2 comprises a halogen, nitro group, amine, thiol, alcohol, ester, amide, carboxylic acid, phenol, indole, imidazole, sulfonate or phophate, and SE2 is a nylon.

C6.5.7: a CMU, where SE1 is a MWCNT, L1 and/or L2 comprises a halogen, nitro group, amine, thiol, alcohol, ester, amide, carboxylic acid, phenol, indole, imidazole, sulfonate or phophate, and SE2 is a polyamide.

C6.5.8: a CMU, where SE1 is a MWCNT, L1 and/or L2 comprises a halogen, nitro group, amine, thiol, alcohol, ester, amide, carboxylic acid, phenol, indole, imidazole, sulfonate or phophate, and SE2 is a polycarbonate.

C6.5.9: a CMU, where SE1 is a MWCNT, L1 and/or L2 comprises a halogen, nitro group, amine, thiol, alcohol, ester, amide, carboxylic acid, phenol, indole, imidazole, sulfonate or phophate, and SE2 is a polyethylene.

C6.5.10: a CMU, where SE1 is a MWCNT, L1 and/or L2 comprises a halogen, nitro group, amine, thiol, alcohol, ester, amide, carboxylic acid, phenol, indole, imidazole, sulfonate or phophate, and SE2 is a polymer.

C6.5.11: a CMU, where SE1 is a MWCNT, L1 and/or L2 comprises a halogen, nitro group, amine, thiol, alcohol, ester, amide, carboxylic acid, phenol, indole, imidazole, sulfonate or phophate, and SE2 is a polypropylene.

C6.5.12: a CMU, where SE1 is a MWCNT, L1 and/or L2 comprises a halogen, nitro group, amine, thiol, alcohol, ester, amide, carboxylic acid, phenol, indole, imidazole, sulfonate or phophate, and SE2 is a polystyrene.

C6.5.13: a CMU, where SE1 is a MWCNT, L1 and/or L2 comprises a halogen, nitro group, amine, thiol, alcohol, ester, amide, carboxylic acid, phenol, indole, imidazole, sulfonate or phophate, and SE2 is an epoxy-based polymer.

C6.5.14: a CMU, where SE1 is a MWCNT, L1 and/or L2 comprises a halogen, nitro group, amine, thiol, alcohol, ester, amide, carboxylic acid, phenol, indole, imidazole, sulfonate or phophate, and SE2 is a polyethylene terephtalate.

C6.5.15: a CMU, where SE1 is a MWCNT, L1 and/or L2 comprises a halogen, nitro group, amine, thiol, alcohol, ester, amide, carboxylic acid, phenol, indole, imidazole, sulfonate or phophate, and SE2 is a polyvinylchloride.

C6.5.16: a CMU, where SE1 is a MWCNT, L1 and/or L2 comprises a halogen, nitro group, amine, thiol, alcohol, ester, amide, carboxylic acid, phenol, indole, imidazole, sulfonate or phophate, and SE2 is a MWCNT.

C6.5.17: a CMU, where SE1 is a MWCNT, L1 and/or L2 comprises a halogen, nitro group, amine, thiol, alcohol, ester, amide, carboxylic acid, phenol, indole, imidazole, sulfonate or phophate, and SE2 is a SWCNT.

C6.5.18: a CMU, where SE1 is a MWCNT, L1 and/or L2 comprises a halogen, nitro group, amine, thiol, alcohol, ester, amide, carboxylic acid, phenol, indole, imidazole, sulfonate or phophate, and SE2 is a GS.

C6.5.19: a CMU, where SE1 is a MWCNT, L1 and/or L2 comprises a halogen, nitro group, amine, thiol, alcohol, ester, amide, carboxylic acid, phenol, indole, imidazole, sulfonate or phophate, and SE2 is a nanotube.

C6.5.20: a CMU, where SE1 is a MWCNT, L1 and/or L2 comprises a halogen, nitro group, amine, thiol, alcohol, ester, amide, carboxylic acid, phenol, indole, imidazole, sulfonate or phophate, and SE2 is a BNNT.

C6.5.21: a CMU, where SE1 is a MWCNT, L1 and/or L2 comprises a halogen, nitro group, amine, thiol, alcohol, ester, amide, carboxylic acid, phenol, indole, imidazole, sulfonate or phophate, and SE2 is a polyacrylate.

C6.5.22: a CMU, where SE1 is a MWCNT, L1 and/or L2 comprises a halogen, nitro group, amine, thiol, alcohol, ester, amide, carboxylic acid, phenol, indole, imidazole, sulfonate or phophate, and SE2 is a polyolefine.

C6.6.1: a CMU, where SE1 is a MWCNT, L1 and/or L2 comprises an C1-C10 alkane, and.

C6.6.2: a CMU, where SE1 is a MWCNT, L1 and/or L2 comprises an C1-C10 alkane, and SE2 is copolymer.

C6.6.3: a CMU, where SE1 is a MWCNT, L1 and/or L2 comprises an C1-C10 alkane, and SE2 is a high density polyethylene.

C6.6.4: a CMU, where SE1 is a MWCNT, L1 and/or L2 comprises an C1-C10 alkane, and SE2 is a linear low density polyethylene.

C6.6.5: a CMU, where SE1 is a MWCNT, L1 and/or L2 comprises an C1-C10 alkane, and SE2 is a low density polyethylene.

C6.6.6: a CMU, where SE1 is a MWCNT, L1 and/or L2 comprises an C1-C10 alkane, and SE2 is a nylon.

C6.6.7: a CMU, where SE1 is a MWCNT, L1 and/or L2 comprises an C1-C10 alkane, and SE2 is a polyamide.

C6.6.8: a CMU, where SE1 is a MWCNT, L1 and/or L2 comprises an C1-C10 alkane, and SE2 is a polycarbonate.

C6.6.9: a CMU, where SE1 is a MWCNT, L1 and/or L2 comprises an C1-C10 alkane, and SE2 is a polyethylene.

C6.6.10: a CMU, where SE1 is a MWCNT, L1 and/or L2 comprises an C1-C10 alkane, and SE2 is a polymer.

C6.6.11: a CMU, where SE1 is a MWCNT, L1 and/or L2 comprises an C1-C10 alkane, and SE2 is a polypropylene.

C6.6.12: a CMU, where SE1 is a MWCNT, L1 and/or L2 comprises an C1-C10 alkane, and SE2 is a polystyrene.

C6.6.13: a CMU, where SE1 is a MWCNT, L1 and/or L2 comprises an C1-C10 alkane, and SE2 is an epoxy-based polymer.

C6.6.14: a CMU, where SE1 is a MWCNT, L1 and/or L2 comprises an C1-C10 alkane, and SE2 is a polyethylene terephtalate.

C6.6.15: a CMU, where SE1 is a MWCNT, L1 and/or L2 comprises an C1-C10 alkane, and SE2 is a polyvinylchloride.

C6.6.16: a CMU, where SE1 is a MWCNT, L1 and/or L2 comprises an C1-C10 alkane, and SE2 is a MWCNT.

C6.6.17: a CMU, where SE1 is a MWCNT, L1 and/or L2 comprises an C1-C10 alkane, and SE2 is a SWCNT.

C6.6.18: a CMU, where SE1 is a MWCNT, L1 and/or L2 comprises an C1-C10 alkane, and SE2 is a GS.

C6.6.19: a CMU, where SE1 is a MWCNT, L1 and/or L2 comprises an C1-C10 alkane, and SE2 is a nanotube.

C6.6.20: a CMU, where SE1 is a MWCNT, L1 and/or L2 comprises an C1-C10 alkane, and SE2 is a BNNT.

C6.6.21: a CMU, where SE1 is a MWCNT, L1 and/or L2 comprises an C1-C10 alkane, and SE2 is a polyacrylate.

C6.6.22: a CMU, where SE1 is a MWCNT, L1 and/or L2 comprises an C1-C10 alkane, and SE2 is a polyolefine.

C6.7.1: a CMU, where SE1 is a MWCNT, L1 and/or L2 comprises a detergent comprising a C4-C25 alkane and a polar end group, and.

C6.7.2: a CMU, where SE1 is a MWCNT, L1 and/or L2 comprises a detergent comprising a C4-C25 alkane and a polar end group, and SE2 is copolymer.

C6.7.3: a CMU, where SE1 is a MWCNT, L1 and/or L2 comprises a detergent comprising a C4-C25 alkane and a polar end group, and SE2 is a high density polyethylene.

C6.7.4: a CMU, where SE1 is a MWCNT, L1 and/or L2 comprises a detergent comprising a C4-C25 alkane and a polar end group, and SE2 is a linear low density polyethylene.

C6.7.5: a CMU, where SE1 is a MWCNT, L1 and/or L2 comprises a detergent comprising a C4-C25 alkane and a polar end group, and SE2 is a low density polyethylene.

C6.7.6: a CMU, where SE1 is a MWCNT, L1 and/or L2 comprises a detergent comprising a C4-C25 alkane and a polar end group, and SE2 is a nylon.

C6.7.7: a CMU, where SE1 is a MWCNT, L1 and/or L2 comprises a detergent comprising a C4-C25 alkane and a polar end group, and SE2 is a polyamide.

C6.7.8: a CMU, where SE1 is a MWCNT, L1 and/or L2 comprises a detergent comprising a C4-C25 alkane and a polar end group, and SE2 is a polycarbonate.

C6.7.9: a CMU, where SE1 is a MWCNT, L1 and/or L2 comprises a detergent comprising a C4-C25 alkane and a polar end group, and SE2 is a polyethylene.

C6.7.10: a CMU, where SE1 is a MWCNT, L1 and/or L2 comprises a detergent comprising a C4-C25 alkane and a polar end group, and SE2 is a polymer.

C6.7.11: a CMU, where SE1 is a MWCNT, L1 and/or L2 comprises a detergent comprising a C4-C25 alkane and a polar end group, and SE2 is a polypropylene.

C6.7.12: a CMU, where SE1 is a MWCNT, L1 and/or L2 comprises a detergent comprising a C4-C25 alkane and a polar end group, and SE2 is a polystyrene.

C6.7.13: a CMU, where SE1 is a MWCNT, L1 and/or L2 comprises a detergent comprising a C4-C25 alkane and a polar end group, and SE2 is an epoxy-based polymer.

C6.7.14: a CMU, where SE1 is a MWCNT, L1 and/or L2 comprises a detergent comprising a C4-C25 alkane and a polar end group, and SE2 is a polyethylene terephtalate.

C6.7.15: a CMU, where SE1 is a MWCNT, L1 and/or L2 comprises a detergent comprising a C4-C25 alkane and a polar end group, and SE2 is a polyvinylchloride.

C6.7.16: a CMU, where SE1 is a MWCNT, L1 and/or L2 comprises a detergent comprising a C4-C25 alkane and a polar end group, and SE2 is a MWCNT.

C6.7.17: a CMU, where SE1 is a MWCNT, L1 and/or L2 comprises a detergent comprising a C4-C25 alkane and a polar end group, and SE2 is a SWCNT.

C6.7.18: a CMU, where SE1 is a MWCNT, L1 and/or L2 comprises a detergent comprising a C4-C25 alkane and a polar end group, and SE2 is a GS.

C6.7.19: a CMU, where SE1 is a MWCNT, L1 and/or L2 comprises a detergent comprising a C4-C25 alkane and a polar end group, and SE2 is a nanotube.

C6.7.20: a CMU, where SE1 is a MWCNT, L1 and/or L2 comprises a detergent comprising a C4-C25 alkane and a polar end group, and SE2 is a BNNT.

C6.7.21: a CMU, where SE1 is a MWCNT, L1 and/or L2 comprises a detergent comprising a C4-C25 alkane and a polar end group, and SE2 is a polyacrylate.

C6.7.22: a CMU, where SE1 is a MWCNT, L1 and/or L2 comprises a detergent comprising a C4-C25 alkane and a polar end group, and SE2 is a polyolefine.

C6.8.1: a CMU, where SE1 is a MWCNT, L1 and/or L2 comprises a lactam, such as N-methyl-pyrrolidone and lactone, and.

C6.8.2: a CMU, where SE1 is a MWCNT, L1 and/or L2 comprises a lactam, such as N-methyl-pyrrolidone and lactone, and SE2 is copolymer.

C6.8.3: a CMU, where SE1 is a MWCNT, L1 and/or L2 comprises a lactam, such as N-methyl-pyrrolidone and lactone, and SE2 is a high density polyethylene.

C6.8.4: a CMU, where SE1 is a MWCNT, L1 and/or L2 comprises a lactam, such as N-methyl-pyrrolidone and lactone, and SE2 is a linear low density polyethylene.

C6.8.5: a CMU, where SE1 is a MWCNT, L1 and/or L2 comprises a lactam, such as N-methyl-pyrrolidone and lactone, and SE2 is a low density polyethylene.

C6.8.6: a CMU, where SE1 is a MWCNT, L1 and/or L2 comprises a lactam, such as N-methyl-pyrrolidone and lactone, and SE2 is a nylon.

C6.8.7: a CMU, where SE1 is a MWCNT, L1 and/or L2 comprises a lactam, such as N-methyl-pyrrolidone and lactone, and SE2 is a polyamide.

C6.8.8: a CMU, where SE1 is a MWCNT, L1 and/or L2 comprises a lactam, such as N-methyl-pyrrolidone and lactone, and SE2 is a polycarbonate.

C6.8.9: a CMU, where SE1 is a MWCNT, L1 and/or L2 comprises a lactam, such as N-methyl-pyrrolidone and lactone, and SE2 is a polyethylene.

C6.8.10: a CMU, where SE1 is a MWCNT, L1 and/or L2 comprises a lactam, such as N-methyl-pyrrolidone and lactone, and SE2 is a polymer.

C6.8.11: a CMU, where SE1 is a MWCNT, L1 and/or L2 comprises a lactam, such as N-methyl-pyrrolidone and lactone, and SE2 is a polypropylene.

C6.8.12: a CMU, where SE1 is a MWCNT, L1 and/or L2 comprises a lactam, such as N-methyl-pyrrolidone and lactone, and SE2 is a polystyrene.

C6.8.13: a CMU, where SE1 is a MWCNT, L1 and/or L2 comprises a lactam, such as N-methyl-pyrrolidone and lactone, and SE2 is an epoxy-based polymer.

C6.8.14: a CMU, where SE1 is a MWCNT, L1 and/or L2 comprises a lactam, such as N-methyl-pyrrolidone and lactone, and SE2 is a polyethylene terephtalate.

C6.8.15: a CMU, where SE1 is a MWCNT, L1 and/or L2 comprises a lactam, such as N-methyl-pyrrolidone and lactone, and SE2 is a polyvinylchloride.

C6.8.16: a CMU, where SE1 is a MWCNT, L1 and/or L2 comprises a lactam, such as N-methyl-pyrrolidone and lactone, and SE2 is a MWCNT.

C6.8.17: a CMU, where SE1 is a MWCNT, L1 and/or L2 comprises a lactam, such as N-methyl-pyrrolidone and lactone, and SE2 is a SWCNT.

C6.8.18: a CMU, where SE1 is a MWCNT, L1 and/or L2 comprises a lactam, such as N-methyl-pyrrolidone and lactone, and SE2 is a GS.

C6.8.19: a CMU, where SE1 is a MWCNT, L1 and/or L2 comprises a lactam, such as N-methyl-pyrrolidone and lactone, and SE2 is a nanotube.

C6.8.20: a CMU, where SE1 is a MWCNT, L1 and/or L2 comprises a lactam, such as N-methyl-pyrrolidone and lactone, and SE2 is a BNNT.

C6.8.21: a CMU, where SE1 is a MWCNT, L1 and/or L2 comprises a lactam, such as N-methyl-pyrrolidone and lactone, and SE2 is a polyacrylate.

C6.8.22: a CMU, where SE1 is a MWCNT, L1 and/or L2 comprises a lactam, such as N-methyl-pyrrolidone and lactone, and SE2 is a polyolefine.

C6.9.1: a CMU, where SE1 is a MWCNT, L1 and/or L2 comprises a amino acid residue such as phenylalanine, tyrosine, tryptophan, or histidine, and.

C6.9.2: a CMU, where SE1 is a MWCNT, L1 and/or L2 comprises a amino acid residue such as phenylalanine, tyrosine, tryptophan, or histidine, and SE2 is copolymer.

C6.9.3: a CMU, where SE1 is a MWCNT, L1 and/or L2 comprises a amino acid residue such as phenylalanine, tyrosine, tryptophan, or histidine, and SE2 is a high density polyethylene.

C6.9.4: a CMU, where SE1 is a MWCNT, L1 and/or L2 comprises a amino acid residue such as phenylalanine, tyrosine, tryptophan, or histidine, and SE2 is a linear low density polyethylene.

C6.9.5: a CMU, where SE1 is a MWCNT, L1 and/or L2 comprises a amino acid residue such as phenylalanine, tyrosine, tryptophan, or histidine, and SE2 is a low density polyethylene.

C6.9.6: a CMU, where SE1 is a MWCNT, L1 and/or L2 comprises a amino acid residue such as phenylalanine, tyrosine, tryptophan, or histidine, and SE2 is a nylon.

C6.9.7: a CMU, where SE1 is a MWCNT, L1 and/or L2 comprises a amino acid residue such as phenylalanine, tyrosine, tryptophan, or histidine, and SE2 is a polyamide.

C6.9.8: a CMU, where SE1 is a MWCNT, L1 and/or L2 comprises a amino acid residue such as phenylalanine, tyrosine, tryptophan, or histidine, and SE2 is a polycarbonate.

C6.9.9: a CMU, where SE1 is a MWCNT, L1 and/or L2 comprises a amino acid residue such as phenylalanine, tyrosine, tryptophan, or histidine, and SE2 is a polyethylene.

C6.9.10: a CMU, where SE1 is a MWCNT, L1 and/or L2 comprises a amino acid residue such as phenylalanine, tyrosine, tryptophan, or histidine, and SE2 is a polymer.

C6.9.11: a CMU, where SE1 is a MWCNT, L1 and/or L2 comprises a amino acid residue such as phenylalanine, tyrosine, tryptophan, or histidine, and SE2 is a polypropylene.

C6.9.12: a CMU, where SE1 is a MWCNT, L1 and/or L2 comprises a amino acid residue such as phenylalanine, tyrosine, tryptophan, or histidine, and SE2 is a polystyrene.

C6.9.13: a CMU, where SE1 is a MWCNT, L1 and/or L2 comprises a amino acid residue such as phenylalanine, tyrosine, tryptophan, or histidine, and SE2 is an epoxy-based polymer.

C6.9.14: a CMU, where SE1 is a MWCNT, L1 and/or L2 comprises a amino acid residue such as phenylalanine, tyrosine, tryptophan, or histidine, and SE2 is a polyethylene terephtalate.

C6.9.15: a CMU, where SE1 is a MWCNT, L1 and/or L2 comprises a amino acid residue such as phenylalanine, tyrosine, tryptophan, or histidine, and SE2 is a polyvinylchloride.

C6.9.16: a CMU, where SE1 is a MWCNT, L1 and/or L2 comprises a amino acid residue such as phenylalanine, tyrosine, tryptophan, or histidine, and SE2 is a MWCNT.

C6.9.17: a CMU, where SE1 is a MWCNT, L1 and/or L2 comprises a amino acid residue such as phenylalanine, tyrosine, tryptophan, or histidine, and SE2 is a SWCNT.

C6.9.18: a CMU, where SE1 is a MWCNT, L1 and/or L2 comprises a amino acid residue such as phenylalanine, tyrosine, tryptophan, or histidine, and SE2 is a GS.

C6.9.19: a CMU, where SE1 is a MWCNT, L1 and/or L2 comprises a amino acid residue such as phenylalanine, tyrosine, tryptophan, or histidine, and SE2 is a nanotube.

C6.9.20: a CMU, where SE1 is a MWCNT, L1 and/or L2 comprises a amino acid residue such as phenylalanine, tyrosine, tryptophan, or histidine, and SE2 is a BNNT.

C6.9.21: a CMU, where SE1 is a MWCNT, L1 and/or L2 comprises a amino acid residue such as phenylalanine, tyrosine, tryptophan, or histidine, and SE2 is a polyacrylate.

C6.9.22: a CMU, where SE1 is a MWCNT, L1 and/or L2 comprises a amino acid residue such as phenylalanine, tyrosine, tryptophan, or histidine, and SE2 is a polyolefine.

C6.10.1: a CMU, where SE1 is a MWCNT, L1 and/or L2 comprises a heteroaromatic system, including pyrole, thiophene, furane, pyrazole, imidazole, isoxazole, oxazole, isothiazole, thiazole, pyridine and perylene bisimides, and.

C6.10.2: a CMU, where SE1 is a MWCNT, L1 and/or L2 comprises a heteroaromatic system, including pyrole, thiophene, furane, pyrazole, imidazole, isoxazole, oxazole, isothiazole, thiazole, pyridine and perylene bisimides, and SE2 is copolymer.

C6.10.3: a CMU, where SE1 is a MWCNT, L1 and/or L2 comprises a heteroaromatic system, including pyrole, thiophene, furane, pyrazole, imidazole, isoxazole, oxazole, isothiazole, thiazole, pyridine and perylene bisimides, and SE2 is a high density polyethylene.

C6.10.4: a CMU, where SE1 is a MWCNT, L1 and/or L2 comprises a heteroaromatic system, including pyrole, thiophene, furane, pyrazole, imidazole, isoxazole, oxazole, isothiazole, thiazole, pyridine and perylene bisimides, and SE2 is a linear low density polyethylene.

C6.10.5: a CMU, where SE1 is a MWCNT, L1 and/or L2 comprises a heteroaromatic system, including pyrole, thiophene, furane, pyrazole, imidazole, isoxazole, oxazole, isothiazole, thiazole, pyridine and perylene bisimides, and SE2 is a low density polyethylene.

C6.10.6: a CMU, where SE1 is a MWCNT, L1 and/or L2 comprises a heteroaromatic system, including pyrole, thiophene, furane, pyrazole, imidazole, isoxazole, oxazole, isothiazole, thiazole, pyridine and perylene bisimides, and SE2 is a nylon.

C6.10.7: a CMU, where SE1 is a MWCNT, L1 and/or L2 comprises a heteroaromatic system, including pyrole, thiophene, furane, pyrazole, imidazole, isoxazole, oxazole, isothiazole, thiazole, pyridine and perylene bisimides, and SE2 is a polyamide.

C6.10.8: a CMU, where SE1 is a MWCNT, L1 and/or L2 comprises a heteroaromatic system, including pyrole, thiophene, furane, pyrazole, imidazole, isoxazole, oxazole, isothiazole, thiazole, pyridine and perylene bisimides, and SE2 is a polycarbonate.

C6.10.9: a CMU, where SE1 is a MWCNT, L1 and/or L2 comprises a heteroaromatic system, including pyrole, thiophene, furane, pyrazole, imidazole, isoxazole, oxazole, isothiazole, thiazole, pyridine and perylene bisimides, and SE2 is a polyethylene.

C6.10.10: a CMU, where SE1 is a MWCNT, L1 and/or L2 comprises a heteroaromatic system, including pyrole, thiophene, furane, pyrazole, imidazole, isoxazole, oxazole, isothiazole, thiazole, pyridine and perylene bisimides, and SE2 is a polymer.

C6.10.11: a CMU, where SE1 is a MWCNT, L1 and/or L2 comprises a heteroaromatic system, including pyrole, thiophene, furane, pyrazole, imidazole, isoxazole, oxazole, isothiazole, thiazole, pyridine and perylene bisimides, and SE2 is a polypropylene.

C6.10.12: a CMU, where SE1 is a MWCNT, L1 and/or L2 comprises a heteroaromatic system, including pyrole, thiophene, furane, pyrazole, imidazole, isoxazole, oxazole, isothiazole, thiazole, pyridine and perylene bisimides, and SE2 is a polystyrene.

C6.10.13: a CMU, where SE1 is a MWCNT, L1 and/or L2 comprises a heteroaromatic system, including pyrole, thiophene, furane, pyrazole, imidazole, isoxazole, oxazole, isothiazole, thiazole, pyridine and perylene bisimides, and SE2 is an epoxy-based polymer.

C6.10.14: a CMU, where SE1 is a MWCNT, L1 and/or L2 comprises a heteroaromatic system, including pyrole, thiophene, furane, pyrazole, imidazole, isoxazole, oxazole, isothiazole, thiazole, pyridine and perylene bisimides, and SE2 is a polyethylene terephtalate.

C6.10.15: a CMU, where SE1 is a MWCNT, L1 and/or L2 comprises a heteroaromatic system, including pyrole, thiophene, furane, pyrazole, imidazole, isoxazole, oxazole, isothiazole, thiazole, pyridine and perylene bisimides, and SE2 is a polyvinylchloride.

C6.10.16: a CMU, where SE1 is a MWCNT, L1 and/or L2 comprises a heteroaromatic system, including pyrole, thiophene, furane, pyrazole, imidazole, isoxazole, oxazole, isothiazole, thiazole, pyridine and perylene bisimides, and SE2 is a MWCNT.

C6.10.17: a CMU, where SE1 is a MWCNT, L1 and/or L2 comprises a heteroaromatic system, including pyrole, thiophene, furane, pyrazole, imidazole, isoxazole, oxazole, isothiazole, thiazole, pyridine and perylene bisimides, and SE2 is a SWCNT.

C6.10.18: a CMU, where SE1 is a MWCNT, L1 and/or L2 comprises a heteroaromatic system, including pyrole, thiophene, furane, pyrazole, imidazole, isoxazole, oxazole, isothiazole, thiazole, pyridine and perylene bisimides, and SE2 is a GS.

C6.10.19: a CMU, where SE1 is a MWCNT, L1 and/or L2 comprises a heteroaromatic system, including pyrole, thiophene, furane, pyrazole, imidazole, isoxazole, oxazole, isothiazole, thiazole, pyridine and perylene bisimides, and SE2 is a nanotube.

C6.10.20: a CMU, where SE1 is a MWCNT, L1 and/or L2 comprises a heteroaromatic system, including pyrole, thiophene, furane, pyrazole, imidazole, isoxazole, oxazole, isothiazole, thiazole, pyridine and perylene bisimides, and SE2 is a BNNT.

C6.10.21: a CMU, where SE1 is a MWCNT, L1 and/or L2 comprises a heteroaromatic system, including pyrole, thiophene, furane, pyrazole, imidazole, isoxazole, oxazole, isothiazole, thiazole, pyridine and perylene bisimides, and SE2 is a polyacrylate.

C6.10.22: a CMU, where SE1 is a MWCNT, L1 and/or L2 comprises a heteroaromatic system, including pyrole, thiophene, furane, pyrazole, imidazole, isoxazole, oxazole, isothiazole, thiazole, pyridine and perylene bisimides, and SE2 is a polyolefine.

C6.11.1: a CMU, where SE1 is a MWCNT, L1 and/or L2 comprises a fused ring system, composed of either aromatic, non-aromatic or anti-aromatic rings or combinations thereof, and.

C6.11.2: a CMU, where SE1 is a MWCNT, L1 and/or L2 comprises a fused ring system, composed of either aromatic, non-aromatic or anti-aromatic rings or combinations thereof, and SE2 is copolymer.

C6.11.3: a CMU, where SE1 is a MWCNT, L1 and/or L2 comprises a fused ring system, composed of either aromatic, non-aromatic or anti-aromatic rings or combinations thereof, and SE2 is a high density polyethylene.

C6.11.4: a CMU, where SE1 is a MWCNT, L1 and/or L2 comprises a fused ring system, composed of either aromatic, non-aromatic or anti-aromatic rings or combinations thereof, and SE2 is a linear low density polyethylene.

C6.11.5: a CMU, where SE1 is a MWCNT, L1 and/or L2 comprises a fused ring system, composed of either aromatic, non-aromatic or anti-aromatic rings or combinations thereof, and SE2 is a low density polyethylene.

C6.11.6: a CMU, where SE1 is a MWCNT, L1 and/or L2 comprises a fused ring system, composed of either aromatic, non-aromatic or anti-aromatic rings or combinations thereof, and SE2 is a nylon.

C6.11.7: a CMU, where SE1 is a MWCNT, L1 and/or L2 comprises a fused ring system, composed of either aromatic, non-aromatic or anti-aromatic rings or combinations thereof, and SE2 is a polyamide.

C6.11.8: a CMU, where SE1 is a MWCNT, L1 and/or L2 comprises a fused ring system, composed of either aromatic, non-aromatic or anti-aromatic rings or combinations thereof, and SE2 is a polycarbonate.

C6.11.9: a CMU, where SE1 is a MWCNT, L1 and/or L2 comprises a fused ring system, composed of either aromatic, non-aromatic or anti-aromatic rings or combinations thereof, and SE2 is a polyethylene.

C6.11.10: a CMU, where SE1 is a MWCNT, L1 and/or L2 comprises a fused ring system, composed of either aromatic, non-aromatic or anti-aromatic rings or combinations thereof, and SE2 is a polymer.

C6.11.11: a CMU, where SE1 is a MWCNT, L1 and/or L2 comprises a fused ring system, composed of either aromatic, non-aromatic or anti-aromatic rings or combinations thereof, and SE2 is a polypropylene.

C6.11.12: a CMU, where SE1 is a MWCNT, L1 and/or L2 comprises a fused ring system, composed of either aromatic, non-aromatic or anti-aromatic rings or combinations thereof, and SE2 is a polystyrene.

C6.11.13: a CMU, where SE1 is a MWCNT, L1 and/or L2 comprises a fused ring system, composed of either aromatic, non-aromatic or anti-aromatic rings or combinations thereof, and SE2 is an epoxy-based polymer.

C6.11.14: a CMU, where SE1 is a MWCNT, L1 and/or L2 comprises a fused ring system, composed of either aromatic, non-aromatic or anti-aromatic rings or combinations thereof, and SE2 is a polyethylene terephtalate.

C6.11.15: a CMU, where SE1 is a MWCNT, L1 and/or L2 comprises a fused ring system, composed of either aromatic, non-aromatic or anti-aromatic rings or combinations thereof, and SE2 is a polyvinylchloride.

C6.11.16: a CMU, where SE1 is a MWCNT, L1 and/or L2 comprises a fused ring system, composed of either aromatic, non-aromatic or anti-aromatic rings or combinations thereof, and SE2 is a MWCNT.

C6.11.17: a CMU, where SE1 is a MWCNT, L1 and/or L2 comprises a fused ring system, composed of either aromatic, non-aromatic or anti-aromatic rings or combinations thereof, and SE2 is a SWCNT.

C6.11.18: a CMU, where SE1 is a MWCNT, L1 and/or L2 comprises a fused ring system, composed of either aromatic, non-aromatic or anti-aromatic rings or combinations thereof, and SE2 is a GS.

C6.11.19: a CMU, where SE1 is a MWCNT, L1 and/or L2 comprises a fused ring system, composed of either aromatic, non-aromatic or anti-aromatic rings or combinations thereof, and SE2 is a nanotube.

C6.11.20: a CMU, where SE1 is a MWCNT, L1 and/or L2 comprises a fused ring system, composed of either aromatic, non-aromatic or anti-aromatic rings or combinations thereof, and SE2 is a BNNT.

C6.11.21: a CMU, where SE1 is a MWCNT, L1 and/or L2 comprises a fused ring system, composed of either aromatic, non-aromatic or anti-aromatic rings or combinations thereof, and SE2 is a polyacrylate.

C6.11.22: a CMU, where SE1 is a MWCNT, L1 and/or L2 comprises a fused ring system, composed of either aromatic, non-aromatic or anti-aromatic rings or combinations thereof, and SE2 is a polyolefine.

C7.1.1: a CMU, where SE1 is a SWCNT, and.

C7.1.2: a CMU, where SE1 is a SWCNT, and SE2 is copolymer.

C7.1.3: a CMU, where SE1 is a SWCNT, and SE2 is a high density polyethylene.

C7.1.4: a CMU, where SE1 is a SWCNT, and SE2 is a linear low density polyethylene.

C7.1.5: a CMU, where SE1 is a SWCNT, and SE2 is a low density polyethylene.

C7.1.6: a CMU, where SE1 is a SWCNT, and SE2 is a nylon.

C7.1.7: a CMU, where SE1 is a SWCNT, and SE2 is a polyamide.

C7.1.8: a CMU, where SE1 is a SWCNT, and SE2 is a polycarbonate.

C7.1.9: a CMU, where SE1 is a SWCNT, and SE2 is a polyethylene.

C7.1.10: a CMU, where SE1 is a SWCNT, and SE2 is a polymer.

C7.1.11: a CMU, where SE1 is a SWCNT, and SE2 is a polypropylene.

C7.1.12: a CMU, where SE1 is a SWCNT, and SE2 is a polystyrene.

C7.1.13: a CMU, where SE1 is a SWCNT, and SE2 is an epoxy-based polymer.

C7.1.14: a CMU, where SE1 is a SWCNT, and SE2 is a polyethylene terephtalate.

C7.1.15: a CMU, where SE1 is a SWCNT, and SE2 is a polyvinylchloride.

C7.1.16: a CMU, where SE1 is a SWCNT, and SE2 is a MWCNT.

C7.1.17: a CMU, where SE1 is a SWCNT, and SE2 is a SWCNT.

C7.1.18: a CMU, where SE1 is a SWCNT, and SE2 is a GS.

C7.1.19: a CMU, where SE1 is a SWCNT, and SE2 is a nanotube.

C7.1.20: a CMU, where SE1 is a SWCNT, and SE2 is a BNNT.

C7.1.21: a CMU, where SE1 is a SWCNT, and SE2 is a polyacrylate.

C7.1.22: a CMU, where SE1 is a SWCNT, and SE2 is a polyolefine.

C7.2.1: a CMU, where SE1 is a SWCNT, L1 and/or L2 comprises a non-covalent ligand, and C7.2.2: a CMU, where SE1 is a SWCNT, L1 and/or L2 comprises a non-covalent ligand, and SE2 is copolymer.

C7.2.3: a CMU, where SE1 is a SWCNT, L1 and/or L2 comprises a non-covalent ligand, and SE2 is a high density polyethylene.

C7.2.4: a CMU, where SE1 is a SWCNT, L1 and/or L2 comprises a non-covalent ligand, and SE2 is a linear low density polyethylene.

C7.2.5: a CMU, where SE1 is a SWCNT, L1 and/or L2 comprises a non-covalent ligand, and SE2 is a low density polyethylene.

C7.2.6: a CMU, where SE1 is a SWCNT, L1 and/or L2 comprises a non-covalent ligand, and SE2 is a nylon.

C7.2.7: a CMU, where SE1 is a SWCNT, L1 and/or L2 comprises a non-covalent ligand, and SE2 is a polyamide.

C7.2.8: a CMU, where SE1 is a SWCNT, L1 and/or L2 comprises a non-covalent ligand, and SE2 is a polycarbonate.

C7.2.9: a CMU, where SE1 is a SWCNT, L1 and/or L2 comprises a non-covalent ligand, and SE2 is a polyethylene.

C7.2.10: a CMU, where SE1 is a SWCNT, L1 and/or L2 comprises a non-covalent ligand, and SE2 is a polymer.

C7.2.11: a CMU, where SE1 is a SWCNT, L1 and/or L2 comprises a non-covalent ligand, and SE2 is a polypropylene.

C7.2.12: a CMU, where SE1 is a SWCNT, L1 and/or L2 comprises a non-covalent ligand, and SE2 is a polystyrene.

C7.2.13: a CMU, where SE1 is a SWCNT, L1 and/or L2 comprises a non-covalent ligand, and SE2 is an epoxy-based polymer.

C7.2.14: a CMU, where SE1 is a SWCNT, L1 and/or L2 comprises a non-covalent ligand, and SE2 is a polyethylene terephtalate.

C7.2.15: a CMU, where SE1 is a SWCNT, L1 and/or L2 comprises a non-covalent ligand, and SE2 is a polyvinylchloride.

C7.2.16: a CMU, where SE1 is a SWCNT, L1 and/or L2 comprises a non-covalent ligand, and SE2 is a MWCNT.

C7.2.17: a CMU, where SE1 is a SWCNT, L1 and/or L2 comprises a non-covalent ligand, and SE2 is a SWCNT.

C7.2.18: a CMU, where SE1 is a SWCNT, L1 and/or L2 comprises a non-covalent ligand, and SE2 is a GS.

C7.2.19: a CMU, where SE1 is a SWCNT, L1 and/or L2 comprises a non-covalent ligand, and SE2 is a nanotube.

C7.2.20: a CMU, where SE1 is a SWCNT, L1 and/or L2 comprises a non-covalent ligand, and SE2 is a BNNT.

C7.2.21: a CMU, where SE1 is a SWCNT, L1 and/or L2 comprises a non-covalent ligand, and SE2 is a polyacrylate.

C7.2.22: a CMU, where SE1 is a SWCNT, L1 and/or L2 comprises a non-covalent ligand, and SE2 is a polyolefine.

C7.3.1: a CMU, where SE1 is a SWCNT, L1 and/or L2 comprises a amino-substituted hydrocarbon, and.

C7.3.2: a CMU, where SE1 is a SWCNT, L1 and/or L2 comprises a amino-substituted hydrocarbon, and SE2 is copolymer.

C7.3.3: a CMU, where SE1 is a SWCNT, L1 and/or L2 comprises a amino-substituted hydrocarbon, and SE2 is a high density polyethylene.

C7.3.4: a CMU, where SE1 is a SWCNT, L1 and/or L2 comprises a amino-substituted hydrocarbon, and SE2 is a linear low density polyethylene.

C7.3.5: a CMU, where SE1 is a SWCNT, L1 and/or L2 comprises a amino-substituted hydrocarbon, and SE2 is a low density polyethylene.

C7.3.6: a CMU, where SE1 is a SWCNT, L1 and/or L2 comprises a amino-substituted hydrocarbon, and SE2 is a nylon.

C7.3.7: a CMU, where SE1 is a SWCNT, L1 and/or L2 comprises a amino-substituted hydrocarbon, and SE2 is a polyamide.

C7.3.8: a CMU, where SE1 is a SWCNT, L1 and/or L2 comprises a amino-substituted hydrocarbon, and SE2 is a polycarbonate.

C7.3.9: a CMU, where SE1 is a SWCNT, L1 and/or L2 comprises a amino-substituted hydrocarbon, and SE2 is a polyethylene.

C7.3.10: a CMU, where SE1 is a SWCNT, L1 and/or L2 comprises a amino-substituted hydrocarbon, and SE2 is a polymer.

C7.3.11: a CMU, where SE1 is a SWCNT, L1 and/or L2 comprises a amino-substituted hydrocarbon, and SE2 is a polypropylene.

C7.3.12: a CMU, where SE1 is a SWCNT, L1 and/or L2 comprises a amino-substituted hydrocarbon, and SE2 is a polystyrene.

C7.3.13: a CMU, where SE1 is a SWCNT, L1 and/or L2 comprises a amino-substituted hydrocarbon, and SE2 is an epoxy-based polymer.

C7.3.14: a CMU, where SE1 is a SWCNT, L1 and/or L2 comprises a amino-substituted hydrocarbon, and SE2 is a polyethylene terephtalate.

C7.3.15: a CMU, where SE1 is a SWCNT, L1 and/or L2 comprises a amino-substituted hydrocarbon, and SE2 is a polyvinylchloride.

C7.3.16: a CMU, where SE1 is a SWCNT, L1 and/or L2 comprises a amino-substituted hydrocarbon, and SE2 is a MWCNT.

C7.3.17: a CMU, where SE1 is a SWCNT, L1 and/or L2 comprises a amino-substituted hydrocarbon, and SE2 is a SWCNT.

C7.3.18: a CMU, where SE1 is a SWCNT, L1 and/or L2 comprises a amino-substituted hydrocarbon, and SE2 is a GS.

C7.3.19: a CMU, where SE1 is a SWCNT, L1 and/or L2 comprises a amino-substituted hydrocarbon, and SE2 is a nanotube.

C7.3.20: a CMU, where SE1 is a SWCNT, L1 and/or L2 comprises a amino-substituted hydrocarbon, and SE2 is a BNNT.

C7.3.21: a CMU, where SE1 is a SWCNT, L1 and/or L2 comprises a amino-substituted hydrocarbon, and SE2 is a polyacrylate.

C7.3.22: a CMU, where SE1 is a SWCNT, L1 and/or L2 comprises a amino-substituted hydrocarbon, and SE2 is a polyolefine.

C7.4.1: a CMU, where SE1 is a SWCNT, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and.

C7.4.2: a CMU, where SE1 is a SWCNT, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and SE2 is copolymer.

C7.4.3: a CMU, where SE1 is a SWCNT, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and SE2 is a high density polyethylene.

C7.4.4: a CMU, where SE1 is a SWCNT, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and SE2 is a linear low density polyethylene.

C7.4.5: a CMU, where SE1 is a SWCNT, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and SE2 is a low density polyethylene.

C7.4.6: a CMU, where SE1 is a SWCNT, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and SE2 is a nylon.

C7.4.7: a CMU, where SE1 is a SWCNT, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and SE2 is a polyamide.

C7.4.8: a CMU, where SE1 is a SWCNT, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and SE2 is a polycarbonate.

C7.4.9: a CMU, where SE1 is a SWCNT, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and SE2 is a polyethylene.

C7.4.10: a CMU, where SE1 is a SWCNT, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and SE2 is a polymer.

C7.4.11: a CMU, where SE1 is a SWCNT, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and SE2 is a polypropylene.

C7.4.12: a CMU, where SE1 is a SWCNT, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and SE2 is a polystyrene.

C7.4.13: a CMU, where SE1 is a SWCNT, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and SE2 is an epoxy-based polymer.

C7.4.14: a CMU, where SE1 is a SWCNT, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and SE2 is a polyethylene terephtalate.

C7.4.15: a CMU, where SE1 is a SWCNT, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and SE2 is a polyvinylchloride.

C7.4.16: a CMU, where SE1 is a SWCNT, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and SE2 is a MWCNT.

C7.4.17: a CMU, where SE1 is a SWCNT, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and SE2 is a SWCNT.

C7.4.18: a CMU, where SE1 is a SWCNT, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and SE2 is a GS.

C7.4.19: a CMU, where SE1 is a SWCNT, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and SE2 is a nanotube.

C7.4.20: a CMU, where SE1 is a SWCNT, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and SE2 is a BNNT.

C7.4.21: a CMU, where SE1 is a SWCNT, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and SE2 is a polyacrylate.

C7.4.22: a CMU, where SE1 is a SWCNT, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and SE2 is a polyolefine.

C7.5.1: a CMU, where SE1 is a SWCNT, L1 and/or L2 comprises a halogen, nitro group, amine, thiol, alcohol, ester, amide, carboxylic acid, phenol, indole, imidazole, sulfonate or phophate, and.

C7.5.2: a CMU, where SE1 is a SWCNT, L1 and/or L2 comprises a halogen, nitro group, amine, thiol, alcohol, ester, amide, carboxylic acid, phenol, indole, imidazole, sulfonate or phophate, and SE2 is copolymer.

C7.5.3: a CMU, where SE1 is a SWCNT, L1 and/or L2 comprises a halogen, nitro group, amine, thiol, alcohol, ester, amide, carboxylic acid, phenol, indole, imidazole, sulfonate or phophate, and SE2 is a high density polyethylene.

C7.5.4: a CMU, where SE1 is a SWCNT, L1 and/or L2 comprises a halogen, nitro group, amine, thiol, alcohol, ester, amide, carboxylic acid, phenol, indole, imidazole, sulfonate or phophate, and SE2 is a linear low density polyethylene.

C7.5.5: a CMU, where SE1 is a SWCNT, L1 and/or L2 comprises a halogen, nitro group, amine, thiol, alcohol, ester, amide, carboxylic acid, phenol, indole, imidazole, sulfonate or phophate, and SE2 is a low density polyethylene.

C7.5.6: a CMU, where SE1 is a SWCNT, L1 and/or L2 comprises a halogen, nitro group, amine, thiol, alcohol, ester, amide, carboxylic acid, phenol, indole, imidazole, sulfonate or phophate, and SE2 is a nylon.

C7.5.7: a CMU, where SE1 is a SWCNT, L1 and/or L2 comprises a halogen, nitro group, amine, thiol, alcohol, ester, amide, carboxylic acid, phenol, indole, imidazole, sulfonate or phophate, and SE2 is a polyamide.

C7.5.8: a CMU, where SE1 is a SWCNT, L1 and/or L2 comprises a halogen, nitro group, amine, thiol, alcohol, ester, amide, carboxylic acid, phenol, indole, imidazole, sulfonate or phophate, and SE2 is a polycarbonate.

C7.5.9: a CMU, where SE1 is a SWCNT, L1 and/or L2 comprises a halogen, nitro group, amine, thiol, alcohol, ester, amide, carboxylic acid, phenol, indole, imidazole, sulfonate or phophate, and SE2 is a polyethylene.

C7.5.10: a CMU, where SE1 is a SWCNT, L1 and/or L2 comprises a halogen, nitro group, amine, thiol, alcohol, ester, amide, carboxylic acid, phenol, indole, imidazole, sulfonate or phophate, and SE2 is a polymer.

C7.5.11: a CMU, where SE1 is a SWCNT, L1 and/or L2 comprises a halogen, nitro group, amine, thiol, alcohol, ester, amide, carboxylic acid, phenol, indole, imidazole, sulfonate or phophate, and SE2 is a polypropylene.

C7.5.12: a CMU, where SE1 is a SWCNT, L1 and/or L2 comprises a halogen, nitro group, amine, thiol, alcohol, ester, amide, carboxylic acid, phenol, indole, imidazole, sulfonate or phophate, and SE2 is a polystyrene.

C7.5.13: a CMU, where SE1 is a SWCNT, L1 and/or L2 comprises a halogen, nitro group, amine, thiol, alcohol, ester, amide, carboxylic acid, phenol, indole, imidazole, sulfonate or phophate, and SE2 is an epoxy-based polymer.

C7.5.14: a CMU, where SE1 is a SWCNT, L1 and/or L2 comprises a halogen, nitro group, amine, thiol, alcohol, ester, amide, carboxylic acid, phenol, indole, imidazole, sulfonate or phophate, and SE2 is a polyethylene terephtalate.

C7.5.15: a CMU, where SE1 is a SWCNT, L1 and/or L2 comprises a halogen, nitro group, amine, thiol, alcohol, ester, amide, carboxylic acid, phenol, indole, imidazole, sulfonate or phophate, and SE2 is a polyvinylchloride.

C7.5.16: a CMU, where SE1 is a SWCNT, L1 and/or L2 comprises a halogen, nitro group, amine, thiol, alcohol, ester, amide, carboxylic acid, phenol, indole, imidazole, sulfonate or phophate, and SE2 is a MWCNT.

C7.5.17: a CMU, where SE1 is a SWCNT, L1 and/or L2 comprises a halogen, nitro group, amine, thiol, alcohol, ester, amide, carboxylic acid, phenol, indole, imidazole, sulfonate or phophate, and SE2 is a SWCNT.

C7.5.18: a CMU, where SE1 is a SWCNT, L1 and/or L2 comprises a halogen, nitro group, amine, thiol, alcohol, ester, amide, carboxylic acid, phenol, indole, imidazole, sulfonate or phophate, and SE2 is a GS.

C7.5.19: a CMU, where SE1 is a SWCNT, L1 and/or L2 comprises a halogen, nitro group, amine, thiol, alcohol, ester, amide, carboxylic acid, phenol, indole, imidazole, sulfonate or phophate, and SE2 is a nanotube.

C7.5.20: a CMU, where SE1 is a SWCNT, L1 and/or L2 comprises a halogen, nitro group, amine, thiol, alcohol, ester, amide, carboxylic acid, phenol, indole, imidazole, sulfonate or phophate, and SE2 is a BNNT.

C7.5.21: a CMU, where SE1 is a SWCNT, L1 and/or L2 comprises a halogen, nitro group, amine, thiol, alcohol, ester, amide, carboxylic acid, phenol, indole, imidazole, sulfonate or phophate, and SE2 is a polyacrylate.

C7.5.22: a CMU, where SE1 is a SWCNT, L1 and/or L2 comprises a halogen, nitro group, amine, thiol, alcohol, ester, amide, carboxylic acid, phenol, indole, imidazole, sulfonate or phophate, and SE2 is a polyolefine.

C7.6.1: a CMU, where SE1 is a SWCNT, L1 and/or L2 comprises an C1-C10 alkane, and.

C7.6.2: a CMU, where SE1 is a SWCNT, L1 and/or L2 comprises an C1-C10 alkane, and SE2 is copolymer.

C7.6.3: a CMU, where SE1 is a SWCNT, L1 and/or L2 comprises an C1-C10 alkane, and SE2 is a high density polyethylene.

C7.6.4: a CMU, where SE1 is a SWCNT, L1 and/or L2 comprises an C1-C10 alkane, and SE2 is a linear low density polyethylene.

C7.6.5: a CMU, where SE1 is a SWCNT, L1 and/or L2 comprises an C1-C10 alkane, and SE2 is a low density polyethylene.

C7.6.6: a CMU, where SE1 is a SWCNT, L1 and/or L2 comprises an C1-C10 alkane, and SE2 is a nylon.

C7.6.7: a CMU, where SE1 is a SWCNT, L1 and/or L2 comprises an C1-C10 alkane, and SE2 is a polyamide.

C7.6.8: a CMU, where SE1 is a SWCNT, L1 and/or L2 comprises an C1-C10 alkane, and SE2 is a polycarbonate.

C7.6.9: a CMU, where SE1 is a SWCNT, L1 and/or L2 comprises an C1-C10 alkane, and SE2 is a polyethylene.

C7.6.10: a CMU, where SE1 is a SWCNT, L1 and/or L2 comprises an C1-C10 alkane, and SE2 is a polymer.

C7.6.11: a CMU, where SE1 is a SWCNT, L1 and/or L2 comprises an C1-C10 alkane, and SE2 is a polypropylene.

C7.6.12: a CMU, where SE1 is a SWCNT, L1 and/or L2 comprises an C1-C10 alkane, and SE2 is a polystyrene.

C7.6.13: a CMU, where SE1 is a SWCNT, L1 and/or L2 comprises an C1-C10 alkane, and SE2 is an epoxy-based polymer.

C7.6.14: a CMU, where SE1 is a SWCNT, L1 and/or L2 comprises an C1-C10 alkane, and SE2 is a polyethylene terephtalate.

C7.6.15: a CMU, where SE1 is a SWCNT, L1 and/or L2 comprises an C1-C10 alkane, and SE2 is a polyvinylchloride.

C7.6.16: a CMU, where SE1 is a SWCNT, L1 and/or L2 comprises an C1-C10 alkane, and SE2 is a MWCNT.

C7.6.17: a CMU, where SE1 is a SWCNT, L1 and/or L2 comprises an C1-C10 alkane, and SE2 is a SWCNT.

C7.6.18: a CMU, where SE1 is a SWCNT, L1 and/or L2 comprises an C1-C10 alkane, and SE2 is a GS.

C7.6.19: a CMU, where SE1 is a SWCNT, L1 and/or L2 comprises an C1-C10 alkane, and SE2 is a nanotube.

C7.6.20: a CMU, where SE1 is a SWCNT, L1 and/or L2 comprises an C1-C10 alkane, and SE2 is a BNNT.

C7.6.21: a CMU, where SE1 is a SWCNT, L1 and/or L2 comprises an C1-C10 alkane, and SE2 is a polyacrylate.

C7.6.22: a CMU, where SE1 is a SWCNT, L1 and/or L2 comprises an C1-C10 alkane, and SE2 is a polyolefine.

C7.7.1: a CMU, where SE1 is a SWCNT, L1 and/or L2 comprises a detergent comprising a C4-C25 alkane and a polar end group, and.

C7.7.2: a CMU, where SE1 is a SWCNT, L1 and/or L2 comprises a detergent comprising a C4-C25 alkane and a polar end group, and SE2 is copolymer.

C7.7.3: a CMU, where SE1 is a SWCNT, L1 and/or L2 comprises a detergent comprising a C4-C25 alkane and a polar end group, and SE2 is a high density polyethylene.

C7.7.4: a CMU, where SE1 is a SWCNT, L1 and/or L2 comprises a detergent comprising a C4-C25 alkane and a polar end group, and SE2 is a linear low density polyethylene.

C7.7.5: a CMU, where SE1 is a SWCNT, L1 and/or L2 comprises a detergent comprising a C4-C25 alkane and a polar end group, and SE2 is a low density polyethylene.

C7.7.6: a CMU, where SE1 is a SWCNT, L1 and/or L2 comprises a detergent comprising a C4-C25 alkane and a polar end group, and SE2 is a nylon.

C7.7.7: a CMU, where SE1 is a SWCNT, L1 and/or L2 comprises a detergent comprising a C4-C25 alkane and a polar end group, and SE2 is a polyamide.

C7.7.8: a CMU, where SE1 is a SWCNT, L1 and/or L2 comprises a detergent comprising a C4-C25 alkane and a polar end group, and SE2 is a polycarbonate.

C7.7.9: a CMU, where SE1 is a SWCNT, L1 and/or L2 comprises a detergent comprising a C4-C25 alkane and a polar end group, and SE2 is a polyethylene.

C7.7.10: a CMU, where SE1 is a SWCNT, L1 and/or L2 comprises a detergent comprising a C4-C25 alkane and a polar end group, and SE2 is a polymer.

C7.7.11: a CMU, where SE1 is a SWCNT, L1 and/or L2 comprises a detergent comprising a C4-C25 alkane and a polar end group, and SE2 is a polypropylene.

C7.7.12: a CMU, where SE1 is a SWCNT, L1 and/or L2 comprises a detergent comprising a C4-C25 alkane and a polar end group, and SE2 is a polystyrene.

C7.7.13: a CMU, where SE1 is a SWCNT, L1 and/or L2 comprises a detergent comprising a C4-C25 alkane and a polar end group, and SE2 is an epoxy-based polymer.

C7.7.14: a CMU, where SE1 is a SWCNT, L1 and/or L2 comprises a detergent comprising a C4-C25 alkane and a polar end group, and SE2 is a polyethylene terephtalate.

C7.7.15: a CMU, where SE1 is a SWCNT, L1 and/or L2 comprises a detergent comprising a C4-C25 alkane and a polar end group, and SE2 is a polyvinylchloride.

C7.7.16: a CMU, where SE1 is a SWCNT, L1 and/or L2 comprises a detergent comprising a C4-C25 alkane and a polar end group, and SE2 is a MWCNT.

C7.7.17: a CMU, where SE1 is a SWCNT, L1 and/or L2 comprises a detergent comprising a C4-C25 alkane and a polar end group, and SE2 is a SWCNT.

C7.7.18: a CMU, where SE1 is a SWCNT, L1 and/or L2 comprises a detergent comprising a C4-C25 alkane and a polar end group, and SE2 is a GS.

C7.7.19: a CMU, where SE1 is a SWCNT, L1 and/or L2 comprises a detergent comprising a C4-C25 alkane and a polar end group, and SE2 is a nanotube.

C7.7.20: a CMU, where SE1 is a SWCNT, L1 and/or L2 comprises a detergent comprising a C4-C25 alkane and a polar end group, and SE2 is a BNNT.

C7.7.21: a CMU, where SE1 is a SWCNT, L1 and/or L2 comprises a detergent comprising a C4-C25 alkane and a polar end group, and SE2 is a polyacrylate.

C7.7.22: a CMU, where SE1 is a SWCNT, L1 and/or L2 comprises a detergent comprising a C4-C25 alkane and a polar end group, and SE2 is a polyolefine.

C7.8.1: a CMU, where SE1 is a SWCNT, L1 and/or L2 comprises a lactam, such as N-methyl-pyrrolidone and lactone, and.

C7.8.2: a CMU, where SE1 is a SWCNT, L1 and/or L2 comprises a lactam, such as N-methyl-pyrrolidone and lactone, and SE2 is copolymer.

C7.8.3: a CMU, where SE1 is a SWCNT, L1 and/or L2 comprises a lactam, such as N-methyl-pyrrolidone and lactone, and SE2 is a high density polyethylene.

C7.8.4: a CMU, where SE1 is a SWCNT, L1 and/or L2 comprises a lactam, such as N-methyl-pyrrolidone and lactone, and SE2 is a linear low density polyethylene.

C7.8.5: a CMU, where SE1 is a SWCNT, L1 and/or L2 comprises a lactam, such as N-methyl-pyrrolidone and lactone, and SE2 is a low density polyethylene.

C7.8.6: a CMU, where SE1 is a SWCNT, L1 and/or L2 comprises a lactam, such as N-methyl-pyrrolidone and lactone, and SE2 is a nylon.

C7.8.7: a CMU, where SE1 is a SWCNT, L1 and/or L2 comprises a lactam, such as N-methyl-pyrrolidone and lactone, and SE2 is a polyamide.

C7.8.8: a CMU, where SE1 is a SWCNT, L1 and/or L2 comprises a lactam, such as N-methyl-pyrrolidone and lactone, and SE2 is a polycarbonate.

C7.8.9: a CMU, where SE1 is a SWCNT, L1 and/or L2 comprises a lactam, such as N-methyl-pyrrolidone and lactone, and SE2 is a polyethylene.

C7.8.10: a CMU, where SE1 is a SWCNT, L1 and/or L2 comprises a lactam, such as N-methyl-pyrrolidone and lactone, and SE2 is a polymer.

C7.8.11: a CMU, where SE1 is a SWCNT, L1 and/or L2 comprises a lactam, such as N-methyl-pyrrolidone and lactone, and SE2 is a polypropylene.

C7.8.12: a CMU, where SE1 is a SWCNT, L1 and/or L2 comprises a lactam, such as N-methyl-pyrrolidone and lactone, and SE2 is a polystyrene.

C7.8.13: a CMU, where SE1 is a SWCNT, L1 and/or L2 comprises a lactam, such as N-methyl-pyrrolidone and lactone, and SE2 is an epoxy-based polymer.

C7.8.14: a CMU, where SE1 is a SWCNT, L1 and/or L2 comprises a lactam, such as N-methyl-pyrrolidone and lactone, and SE2 is a polyethylene terephtalate.

C7.8.15: a CMU, where SE1 is a SWCNT, L1 and/or L2 comprises a lactam, such as N-methyl-pyrrolidone and lactone, and SE2 is a polyvinylchloride.

C7.8.16: a CMU, where SE1 is a SWCNT, L1 and/or L2 comprises a lactam, such as N-methyl-pyrrolidone and lactone, and SE2 is a MWCNT.

C7.8.17: a CMU, where SE1 is a SWCNT, L1 and/or L2 comprises a lactam, such as N-methyl-pyrrolidone and lactone, and SE2 is a SWCNT.

C7.8.18: a CMU, where SE1 is a SWCNT, L1 and/or L2 comprises a lactam, such as N-methyl-pyrrolidone and lactone, and SE2 is a GS.

C7.8.19: a CMU, where SE1 is a SWCNT, L1 and/or L2 comprises a lactam, such as N-methyl-pyrrolidone and lactone, and SE2 is a nanotube.

C7.8.20: a CMU, where SE1 is a SWCNT, L1 and/or L2 comprises a lactam, such as N-methyl-pyrrolidone and lactone, and SE2 is a BNNT.

C7.8.21: a CMU, where SE1 is a SWCNT, L1 and/or L2 comprises a lactam, such as N-methyl-pyrrolidone and lactone, and SE2 is a polyacrylate.

C7.8.22: a CMU, where SE1 is a SWCNT, L1 and/or L2 comprises a lactam, such as N-methyl-pyrrolidone and lactone, and SE2 is a polyolefine.

C7.9.1: a CMU, where SE1 is a SWCNT, L1 and/or L2 comprises a amino acid residue such as phenylalanine, tyrosine, tryptophan, or histidine, and.

C7.9.2: a CMU, where SE1 is a SWCNT, L1 and/or L2 comprises a amino acid residue such as phenylalanine, tyrosine, tryptophan, or histidine, and SE2 is copolymer.

C7.9.3: a CMU, where SE1 is a SWCNT, L1 and/or L2 comprises a amino acid residue such as phenylalanine, tyrosine, tryptophan, or histidine, and SE2 is a high density polyethylene.

C7.9.4: a CMU, where SE1 is a SWCNT, L1 and/or L2 comprises a amino acid residue such as phenylalanine, tyrosine, tryptophan, or histidine, and SE2 is a linear low density polyethylene.

C7.9.5: a CMU, where SE1 is a SWCNT, L1 and/or L2 comprises a amino acid residue such as phenylalanine, tyrosine, tryptophan, or histidine, and SE2 is a low density polyethylene.

C7.9.6: a CMU, where SE1 is a SWCNT, L1 and/or L2 comprises a amino acid residue such as phenylalanine, tyrosine, tryptophan, or histidine, and SE2 is a nylon.

C7.9.7: a CMU, where SE1 is a SWCNT, L1 and/or L2 comprises a amino acid residue such as phenylalanine, tyrosine, tryptophan, or histidine, and SE2 is a polyamide.

C7.9.8: a CMU, where SE1 is a SWCNT, L1 and/or L2 comprises a amino acid residue such as phenylalanine, tyrosine, tryptophan, or histidine, and SE2 is a polycarbonate.

C7.9.9: a CMU, where SE1 is a SWCNT, L1 and/or L2 comprises a amino acid residue such as phenylalanine, tyrosine, tryptophan, or histidine, and SE2 is a polyethylene.

C7.9.10: a CMU, where SE1 is a SWCNT, L1 and/or L2 comprises a amino acid residue such as phenylalanine, tyrosine, tryptophan, or histidine, and SE2 is a polymer.

C7.9.11: a CMU, where SE1 is a SWCNT, L1 and/or L2 comprises a amino acid residue such as phenylalanine, tyrosine, tryptophan, or histidine, and SE2 is a polypropylene.

C7.9.12: a CMU, where SE1 is a SWCNT, L1 and/or L2 comprises a amino acid residue such as phenylalanine, tyrosine, tryptophan, or histidine, and SE2 is a polystyrene.

C7.9.13: a CMU, where SE1 is a SWCNT, L1 and/or L2 comprises a amino acid residue such as phenylalanine, tyrosine, tryptophan, or histidine, and SE2 is an epoxy-based polymer.

C7.9.14: a CMU, where SE1 is a SWCNT, L1 and/or L2 comprises a amino acid residue such as phenylalanine, tyrosine, tryptophan, or histidine, and SE2 is a polyethylene terephtalate.

C7.9.15: a CMU, where SE1 is a SWCNT, L1 and/or L2 comprises a amino acid residue such as phenylalanine, tyrosine, tryptophan, or histidine, and SE2 is a polyvinylchloride.

C7.9.16: a CMU, where SE1 is a SWCNT, L1 and/or L2 comprises a amino acid residue such as phenylalanine, tyrosine, tryptophan, or histidine, and SE2 is a MWCNT.

C7.9.17: a CMU, where SE1 is a SWCNT, L1 and/or L2 comprises a amino acid residue such as phenylalanine, tyrosine, tryptophan, or histidine, and SE2 is a SWCNT.

C7.9.18: a CMU, where SE1 is a SWCNT, L1 and/or L2 comprises a amino acid residue such as phenylalanine, tyrosine, tryptophan, or histidine, and SE2 is a GS.

C7.9.19: a CMU, where SE1 is a SWCNT, L1 and/or L2 comprises a amino acid residue such as phenylalanine, tyrosine, tryptophan, or histidine, and SE2 is a nanotube.

C7.9.20: a CMU, where SE1 is a SWCNT, L1 and/or L2 comprises a amino acid residue such as phenylalanine, tyrosine, tryptophan, or histidine, and SE2 is a BNNT.

C7.9.21: a CMU, where SE1 is a SWCNT, L1 and/or L2 comprises a amino acid residue such as phenylalanine, tyrosine, tryptophan, or histidine, and SE2 is a polyacrylate.

C7.9.22: a CMU, where SE1 is a SWCNT, L1 and/or L2 comprises a amino acid residue such as phenylalanine, tyrosine, tryptophan, or histidine, and SE2 is a polyolefine.

C7.10.1: a CMU, where SE1 is a SWCNT, L1 and/or L2 comprises a heteroaromatic system, including pyrole, thiophene, furane, pyrazole, imidazole, isoxazole, oxazole, isothiazole, thiazole, pyridine and perylene bisimides, and.

C7.10.2: a CMU, where SE1 is a SWCNT, L1 and/or L2 comprises a heteroaromatic system, including pyrole, thiophene, furane, pyrazole, imidazole, isoxazole, oxazole, isothiazole, thiazole, pyridine and perylene bisimides, and SE2 is copolymer.

C7.10.3: a CMU, where SE1 is a SWCNT, L1 and/or L2 comprises a heteroaromatic system, including pyrole, thiophene, furane, pyrazole, imidazole, isoxazole, oxazole, isothiazole, thiazole, pyridine and perylene bisimides, and SE2 is a high density polyethylene.

C7.10.4: a CMU, where SE1 is a SWCNT, L1 and/or L2 comprises a heteroaromatic system, including pyrole, thiophene, furane, pyrazole, imidazole, isoxazole, oxazole, isothiazole, thiazole, pyridine and perylene bisimides, and SE2 is a linear low density polyethylene.

C7.10.5: a CMU, where SE1 is a SWCNT, L1 and/or L2 comprises a heteroaromatic system, including pyrole, thiophene, furane, pyrazole, imidazole, isoxazole, oxazole, isothiazole, thiazole, pyridine and perylene bisimides, and SE2 is a low density polyethylene.

C7.10.6: a CMU, where SE1 is a SWCNT, L1 and/or L2 comprises a heteroaromatic system, including pyrole, thiophene, furane, pyrazole, imidazole, isoxazole, oxazole, isothiazole, thiazole, pyridine and perylene bisimides, and SE2 is a nylon.

C7.10.7: a CMU, where SE1 is a SWCNT, L1 and/or L2 comprises a heteroaromatic system, including pyrole, thiophene, furane, pyrazole, imidazole, isoxazole, oxazole, isothiazole, thiazole, pyridine and perylene bisimides, and SE2 is a polyamide.

C7.10.8: a CMU, where SE1 is a SWCNT, L1 and/or L2 comprises a heteroaromatic system, including pyrole, thiophene, furane, pyrazole, imidazole, isoxazole, oxazole, isothiazole, thiazole, pyridine and perylene bisimides, and SE2 is a polycarbonate.

C7.10.9: a CMU, where SE1 is a SWCNT, L1 and/or L2 comprises a heteroaromatic system, including pyrole, thiophene, furane, pyrazole, imidazole, isoxazole, oxazole, isothiazole, thiazole, pyridine and perylene bisimides, and SE2 is a polyethylene.

C7.10.10: a CMU, where SE1 is a SWCNT, L1 and/or L2 comprises a heteroaromatic system, including pyrole, thiophene, furane, pyrazole, imidazole, isoxazole, oxazole, isothiazole, thiazole, pyridine and perylene bisimides, and SE2 is a polymer.

C7.10.11: a CMU, where SE1 is a SWCNT, L1 and/or L2 comprises a heteroaromatic system, including pyrole, thiophene, furane, pyrazole, imidazole, isoxazole, oxazole, isothiazole, thiazole, pyridine and perylene bisimides, and SE2 is a polypropylene.

C7.10.12: a CMU, where SE1 is a SWCNT, L1 and/or L2 comprises a heteroaromatic system, including pyrole, thiophene, furane, pyrazole, imidazole, isoxazole, oxazole, isothiazole, thiazole, pyridine and perylene bisimides, and SE2 is a polystyrene.

C7.10.13: a CMU, where SE1 is a SWCNT, L1 and/or L2 comprises a heteroaromatic system, including pyrole, thiophene, furane, pyrazole, imidazole, isoxazole, oxazole, isothiazole, thiazole, pyridine and perylene bisimides, and SE2 is an epoxy-based polymer.

C7.10.14: a CMU, where SE1 is a SWCNT, L1 and/or L2 comprises a heteroaromatic system, including pyrole, thiophene, furane, pyrazole, imidazole, isoxazole, oxazole, isothiazole, thiazole, pyridine and perylene bisimides, and SE2 is a polyethylene terephtalate.

C7.10.15: a CMU, where SE1 is a SWCNT, L1 and/or L2 comprises a heteroaromatic system, including pyrole, thiophene, furane, pyrazole, imidazole, isoxazole, oxazole, isothiazole, thiazole, pyridine and perylene bisimides, and SE2 is a polyvinylchloride.

C7.10.16: a CMU, where SE1 is a SWCNT, L1 and/or L2 comprises a heteroaromatic system, including pyrole, thiophene, furane, pyrazole, imidazole, isoxazole, oxazole, isothiazole, thiazole, pyridine and perylene bisimides, and SE2 is a MWCNT.

C7.10.17: a CMU, where SE1 is a SWCNT, L1 and/or L2 comprises a heteroaromatic system, including pyrole, thiophene, furane, pyrazole, imidazole, isoxazole, oxazole, isothiazole, thiazole, pyridine and perylene bisimides, and SE2 is a SWCNT.

C7.10.18: a CMU, where SE1 is a SWCNT, L1 and/or L2 comprises a heteroaromatic system, including pyrole, thiophene, furane, pyrazole, imidazole, isoxazole, oxazole, isothiazole, thiazole, pyridine and perylene bisimides, and SE2 is a GS.

C7.10.19: a CMU, where SE1 is a SWCNT, L1 and/or L2 comprises a heteroaromatic system, including pyrole, thiophene, furane, pyrazole, imidazole, isoxazole, oxazole, isothiazole, thiazole, pyridine and perylene bisimides, and SE2 is a nanotube.

C7.10.20: a CMU, where SE1 is a SWCNT, L1 and/or L2 comprises a heteroaromatic system, including pyrole, thiophene, furane, pyrazole, imidazole, isoxazole, oxazole, isothiazole, thiazole, pyridine and perylene bisimides, and SE2 is a BNNT.

C7.10.21: a CMU, where SE1 is a SWCNT, L1 and/or L2 comprises a heteroaromatic system, including pyrole, thiophene, furane, pyrazole, imidazole, isoxazole, oxazole, isothiazole, thiazole, pyridine and perylene bisimides, and SE2 is a polyacrylate.

C7.10.22: a CMU, where SE1 is a SWCNT, L1 and/or L2 comprises a heteroaromatic system, including pyrole, thiophene, furane, pyrazole, imidazole, isoxazole, oxazole, isothiazole, thiazole, pyridine and perylene bisimides, and SE2 is a polyolefine.

C7.11.1: a CMU, where SE1 is a SWCNT, L1 and/or L2 comprises a fused ring system, composed of either aromatic, non-aromatic or anti-aromatic rings or combinations thereof, and.

C7.11.2: a CMU, where SE1 is a SWCNT, L1 and/or L2 comprises a fused ring system, composed of either aromatic, non-aromatic or anti-aromatic rings or combinations thereof, and SE2 is copolymer.

C7.11.3: a CMU, where SE1 is a SWCNT, L1 and/or L2 comprises a fused ring system, composed of either aromatic, non-aromatic or anti-aromatic rings or combinations thereof, and SE2 is a high density polyethylene.

C7.11.4: a CMU, where SE1 is a SWCNT, L1 and/or L2 comprises a fused ring system, composed of either aromatic, non-aromatic or anti-aromatic rings or combinations thereof, and SE2 is a linear low density polyethylene.

C7.11.5: a CMU, where SE1 is a SWCNT, L1 and/or L2 comprises a fused ring system, composed of either aromatic, non-aromatic or anti-aromatic rings or combinations thereof, and SE2 is a low density polyethylene.

C7.11.6: a CMU, where SE1 is a SWCNT, L1 and/or L2 comprises a fused ring system, composed of either aromatic, non-aromatic or anti-aromatic rings or combinations thereof, and SE2 is a nylon.

C7.11.7: a CMU, where SE1 is a SWCNT, L1 and/or L2 comprises a fused ring system, composed of either aromatic, non-aromatic or anti-aromatic rings or combinations thereof, and SE2 is a polyamide.

C7.11.8: a CMU, where SE1 is a SWCNT, L1 and/or L2 comprises a fused ring system, composed of either aromatic, non-aromatic or anti-aromatic rings or combinations thereof, and SE2 is a polycarbonate.

C7.11.9: a CMU, where SE1 is a SWCNT, L1 and/or L2 comprises a fused ring system, composed of either aromatic, non-aromatic or anti-aromatic rings or combinations thereof, and SE2 is a polyethylene.

C7.11.10: a CMU, where SE1 is a SWCNT, L1 and/or L2 comprises a fused ring system, composed of either aromatic, non-aromatic or anti-aromatic rings or combinations thereof, and SE2 is a polymer.

C7.11.11: a CMU, where SE1 is a SWCNT, L1 and/or L2 comprises a fused ring system, composed of either aromatic, non-aromatic or anti-aromatic rings or combinations thereof, and SE2 is a polypropylene.

C7.11.12: a CMU, where SE1 is a SWCNT, L1 and/or L2 comprises a fused ring system, composed of either aromatic, non-aromatic or anti-aromatic rings or combinations thereof, and SE2 is a polystyrene.

C7.11.13: a CMU, where SE1 is a SWCNT, L1 and/or L2 comprises a fused ring system, composed of either aromatic, non-aromatic or anti-aromatic rings or combinations thereof, and SE2 is an epoxy-based polymer.

C7.11.14: a CMU, where SE1 is a SWCNT, L1 and/or L2 comprises a fused ring system, composed of either aromatic, non-aromatic or anti-aromatic rings or combinations thereof, and SE2 is a polyethylene terephtalate.

C7.11.15: a CMU, where SE1 is a SWCNT, L1 and/or L2 comprises a fused ring system, composed of either aromatic, non-aromatic or anti-aromatic rings or combinations thereof, and SE2 is a polyvinylchloride.

C7.11.16: a CMU, where SE1 is a SWCNT, L1 and/or L2 comprises a fused ring system, composed of either aromatic, non-aromatic or anti-aromatic rings or combinations thereof, and SE2 is a MWCNT.

C7.11.17: a CMU, where SE1 is a SWCNT, L1 and/or L2 comprises a fused ring system, composed of either aromatic, non-aromatic or anti-aromatic rings or combinations thereof, and SE2 is a SWCNT.

C7.11.18: a CMU, where SE1 is a SWCNT, L1 and/or L2 comprises a fused ring system, composed of either aromatic, non-aromatic or anti-aromatic rings or combinations thereof, and SE2 is a GS.

C7.11.19: a CMU, where SE1 is a SWCNT, L1 and/or L2 comprises a fused ring system, composed of either aromatic, non-aromatic or anti-aromatic rings or combinations thereof, and SE2 is a nanotube.

C7.11.20: a CMU, where SE1 is a SWCNT, L1 and/or L2 comprises a fused ring system, composed of either aromatic, non-aromatic or anti-aromatic rings or combinations thereof, and SE2 is a BNNT.

C7.11.21: a CMU, where SE1 is a SWCNT, L1 and/or L2 comprises a fused ring system, composed of either aromatic, non-aromatic or anti-aromatic rings or combinations thereof, and SE2 is a polyacrylate.

C7.11.22: a CMU, where SE1 is a SWCNT, L1 and/or L2 comprises a fused ring system, composed of either aromatic, non-aromatic or anti-aromatic rings or combinations thereof, and SE2 is a polyolefine.

C8.1.1: a CMU, where SE1 is a GS, and.

C8.1.2: a CMU, where SE1 is a GS, and SE2 is copolymer.

C8.1.3: a CMU, where SE1 is a GS, and SE2 is a high density polyethylene.

C8.1.4: a CMU, where SE1 is a GS, and SE2 is a linear low density polyethylene.

C8.1.5: a CMU, where SE1 is a GS, and SE2 is a low density polyethylene.

C8.1.6: a CMU, where SE1 is a GS, and SE2 is a nylon.

C8.1.7: a CMU, where SE1 is a GS, and SE2 is a polyamide.

C8.1.8: a CMU, where SE1 is a GS, and SE2 is a polycarbonate.

C8.1.9: a CMU, where SE1 is a GS, and SE2 is a polyethylene.

C8.1.10: a CMU, where SE1 is a GS, and SE2 is a polymer.

C8.1.11: a CMU, where SE1 is a GS, and SE2 is a polypropylene.

C8.1.12: a CMU, where SE1 is a GS, and SE2 is a polystyrene.

C8.1.13: a CMU, where SE1 is a GS, and SE2 is an epoxy-based polymer.

C8.1.14: a CMU, where SE1 is a GS, and SE2 is a polyethylene terephtalate.

C8.1.15: a CMU, where SE1 is a GS, and SE2 is a polyvinylchloride.

C8.1.16: a CMU, where SE1 is a GS, and SE2 is a MWCNT.

C8.1.17: a CMU, where SE1 is a GS, and SE2 is a SWCNT.

C8.1.18: a CMU, where SE1 is a GS, and SE2 is a GS.

C8.1.19: a CMU, where SE1 is a GS, and SE2 is a nanotube.

C8.1.20: a CMU, where SE1 is a GS, and SE2 is a BNNT.

C8.1.21: a CMU, where SE1 is a GS, and SE2 is a polyacrylate.

C8.1.22: a CMU, where SE1 is a GS, and SE2 is a polyolefine.

C8.2.1: a CMU, where SE1 is a GS, L1 and/or L2 comprises a non-covalent ligand, and.

C8.2.2: a CMU, where SE1 is a GS, L1 and/or L2 comprises a non-covalent ligand, and SE2 is copolymer.

C8.2.3: a CMU, where SE1 is a GS, L1 and/or L2 comprises a non-covalent ligand, and SE2 is a high density polyethylene.

C8.2.4: a CMU, where SE1 is a GS, L1 and/or L2 comprises a non-covalent ligand, and SE2 is a linear low density polyethylene.

C8.2.5: a CMU, where SE1 is a GS, L1 and/or L2 comprises a non-covalent ligand, and SE2 is a low density polyethylene.

C8.2.6: a CMU, where SE1 is a GS, L1 and/or L2 comprises a non-covalent ligand, and SE2 is a nylon.

C8.2.7: a CMU, where SE1 is a GS, L1 and/or L2 comprises a non-covalent ligand, and SE2 is a polyamide.

C8.2.8: a CMU, where SE1 is a GS, L1 and/or L2 comprises a non-covalent ligand, and SE2 is a polycarbonate.

C8.2.9: a CMU, where SE1 is a GS, L1 and/or L2 comprises a non-covalent ligand, and SE2 is a polyethylene.

C8.2.10: a CMU, where SE1 is a GS, L1 and/or L2 comprises a non-covalent ligand, and SE2 is a polymer.

C8.2.11: a CMU, where SE1 is a GS, L1 and/or L2 comprises a non-covalent ligand, and SE2 is a polypropylene.

C8.2.12: a CMU, where SE1 is a GS, L1 and/or L2 comprises a non-covalent ligand, and SE2 is a polystyrene.

C8.2.13: a CMU, where SE1 is a GS, L1 and/or L2 comprises a non-covalent ligand, and SE2 is an epoxy-based polymer.

C8.2.14: a CMU, where SE1 is a GS, L1 and/or L2 comprises a non-covalent ligand, and SE2 is a polyethylene terephtalate.

C8.2.15: a CMU, where SE1 is a GS, L1 and/or L2 comprises a non-covalent ligand, and SE2 is a polyvinylchloride.

C8.2.16: a CMU, where SE1 is a GS, L1 and/or L2 comprises a non-covalent ligand, and SE2 is a MWCNT.

C8.2.17: a CMU, where SE1 is a GS, L1 and/or L2 comprises a non-covalent ligand, and SE2 is a SWCNT.

C8.2.18: a CMU, where SE1 is a GS, L1 and/or L2 comprises a non-covalent ligand, and SE2 is a GS.

C8.2.19: a CMU, where SE1 is a GS, L1 and/or L2 comprises a non-covalent ligand, and SE2 is a nanotube.

C8.2.20: a CMU, where SE1 is a GS, L1 and/or L2 comprises a non-covalent ligand, and SE2 is a BNNT.

C8.2.21: a CMU, where SE1 is a GS, L1 and/or L2 comprises a non-covalent ligand, and SE2 is a polyacrylate.

C8.2.22: a CMU, where SE1 is a GS, L1 and/or L2 comprises a non-covalent ligand, and SE2 is a polyolefine.

C8.3.1: a CMU, where SE1 is a GS, L1 and/or L2 comprises a amino-substituted hydrocarbon, and.

C8.3.2: a CMU, where SE1 is a GS, L1 and/or L2 comprises a amino-substituted hydrocarbon, and SE2 is copolymer.

C8.3.3: a CMU, where SE1 is a GS, L1 and/or L2 comprises a amino-substituted hydrocarbon, and SE2 is a high density polyethylene.

C8.3.4: a CMU, where SE1 is a GS, L1 and/or L2 comprises a amino-substituted hydrocarbon, and SE2 is a linear low density polyethylene.

C8.3.5: a CMU, where SE1 is a GS, L1 and/or L2 comprises a amino-substituted hydrocarbon, and SE2 is a low density polyethylene.

C8.3.6: a CMU, where SE1 is a GS, L1 and/or L2 comprises a amino-substituted hydrocarbon, and SE2 is a nylon.

C8.3.7: a CMU, where SE1 is a GS, L1 and/or L2 comprises a amino-substituted hydrocarbon, and SE2 is a polyamide.

C8.3.8: a CMU, where SE1 is a GS, L1 and/or L2 comprises a amino-substituted hydrocarbon, and SE2 is a polycarbonate.

C8.3.9: a CMU, where SE1 is a GS, L1 and/or L2 comprises a amino-substituted hydrocarbon, and SE2 is a polyethylene.

C8.3.10: a CMU, where SE1 is a GS, L1 and/or L2 comprises a amino-substituted hydrocarbon, and SE2 is a polymer.

C8.3.11: a CMU, where SE1 is a GS, L1 and/or L2 comprises a amino-substituted hydrocarbon, and SE2 is a polypropylene.

C8.3.12: a CMU, where SE1 is a GS, L1 and/or L2 comprises a amino-substituted hydrocarbon, and SE2 is a polystyrene.

C8.3.13: a CMU, where SE1 is a GS, L1 and/or L2 comprises a amino-substituted hydrocarbon, and SE2 is an epoxy-based polymer.

C8.3.14: a CMU, where SE1 is a GS, L1 and/or L2 comprises a amino-substituted hydrocarbon, and SE2 is a polyethylene terephtalate.

C8.3.15: a CMU, where SE1 is a GS, L1 and/or L2 comprises a amino-substituted hydrocarbon, and SE2 is a polyvinylchloride.

C8.3.16: a CMU, where SE1 is a GS, L1 and/or L2 comprises a amino-substituted hydrocarbon, and SE2 is a MWCNT.

C8.3.17: a CMU, where SE1 is a GS, L1 and/or L2 comprises a amino-substituted hydrocarbon, and SE2 is a SWCNT.

C8.3.18: a CMU, where SE1 is a GS, L1 and/or L2 comprises a amino-substituted hydrocarbon, and SE2 is a GS.

C8.3.19: a CMU, where SE1 is a GS, L1 and/or L2 comprises a amino-substituted hydrocarbon, and SE2 is a nanotube.

C8.3.20: a CMU, where SE1 is a GS, L1 and/or L2 comprises a amino-substituted hydrocarbon, and SE2 is a BNNT.

C8.3.21: a CMU, where SE1 is a GS, L1 and/or L2 comprises a amino-substituted hydrocarbon, and SE2 is a polyacrylate.

C8.3.22: a CMU, where SE1 is a GS, L1 and/or L2 comprises a amino-substituted hydrocarbon, and SE2 is a polyolefine.

C8.4.1: a CMU, where SE1 is a GS, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and.

C8.4.2: a CMU, where SE1 is a GS, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and SE2 is copolymer.

C8.4.3: a CMU, where SE1 is a GS, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and SE2 is a high density polyethylene.

C8.4.4: a CMU, where SE1 is a GS, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and SE2 is a linear low density polyethylene.

C8.4.5: a CMU, where SE1 is a GS, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and SE2 is a low density polyethylene.

C8.4.6: a CMU, where SE1 is a GS, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and SE2 is a nylon.

C8.4.7: a CMU, where SE1 is a GS, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and SE2 is a polyamide.

C8.4.8: a CMU, where SE1 is a GS, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and SE2 is a polycarbonate.

C8.4.9: a CMU, where SE1 is a GS, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and SE2 is a polyethylene.

C8.4.10: a CMU, where SE1 is a GS, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and SE2 is a polymer.

C8.4.11: a CMU, where SE1 is a GS, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and SE2 is a polypropylene.

C8.4.12: a CMU, where SE1 is a GS, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and SE2 is a polystyrene.

C8.4.13: a CMU, where SE1 is a GS, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and SE2 is an epoxy-based polymer.

C8.4.14: a CMU, where SE1 is a GS, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and SE2 is a polyethylene terephtalate.

C8.4.15: a CMU, where SE1 is a GS, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and SE2 is a polyvinylchloride.

C8.4.16: a CMU, where SE1 is a GS, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and SE2 is a MWCNT.

C8.4.17: a CMU, where SE1 is a GS, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and SE2 is a SWCNT.

C8.4.18: a CMU, where SE1 is a GS, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and SE2 is a GS.

C8.4.19: a CMU, where SE1 is a GS, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and SE2 is a nanotube.

C8.4.20: a CMU, where SE1 is a GS, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and SE2 is a BNNT.

C8.4.21: a CMU, where SE1 is a GS, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and SE2 is a polyacrylate.

C8.4.22: a CMU, where SE1 is a GS, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and SE2 is a polyolefine.

C8.5.1: a CMU, where SE1 is a GS, L1 and/or L2 comprises a halogen, nitro group, amine, thiol, alcohol, ester, amide, carboxylic acid, phenol, indole, imidazole, sulfonate or phophate, and.

C8.5.2: a CMU, where SE1 is a GS, L1 and/or L2 comprises a halogen, nitro group, amine, thiol, alcohol, ester, amide, carboxylic acid, phenol, indole, imidazole, sulfonate or phophate, and SE2 is copolymer.

C8.5.3: a CMU, where SE1 is a GS, L1 and/or L2 comprises a halogen, nitro group, amine, thiol, alcohol, ester, amide, carboxylic acid, phenol, indole, imidazole, sulfonate or phophate, and SE2 is a high density polyethylene.

C8.5.4: a CMU, where SE1 is a GS, L1 and/or L2 comprises a halogen, nitro group, amine, thiol, alcohol, ester, amide, carboxylic acid, phenol, indole, imidazole, sulfonate or phophate, and SE2 is a linear low density polyethylene.

C8.5.5: a CMU, where SE1 is a GS, L1 and/or L2 comprises a halogen, nitro group, amine, thiol, alcohol, ester, amide, carboxylic acid, phenol, indole, imidazole, sulfonate or phophate, and SE2 is a low density polyethylene.

C8.5.6: a CMU, where SE1 is a GS, L1 and/or L2 comprises a halogen, nitro group, amine, thiol, alcohol, ester, amide, carboxylic acid, phenol, indole, imidazole, sulfonate or phophate, and SE2 is a nylon.

C8.5.7: a CMU, where SE1 is a GS, L1 and/or L2 comprises a halogen, nitro group, amine, thiol, alcohol, ester, amide, carboxylic acid, phenol, indole, imidazole, sulfonate or phophate, and SE2 is a polyamide.

C8.5.8: a CMU, where SE1 is a GS, L1 and/or L2 comprises a halogen, nitro group, amine, thiol, alcohol, ester, amide, carboxylic acid, phenol, indole, imidazole, sulfonate or phophate, and SE2 is a polycarbonate.

C8.5.9: a CMU, where SE1 is a GS, L1 and/or L2 comprises a halogen, nitro group, amine, thiol, alcohol, ester, amide, carboxylic acid, phenol, indole, imidazole, sulfonate or phophate, and SE2 is a polyethylene.

C8.5.10: a CMU, where SE1 is a GS, L1 and/or L2 comprises a halogen, nitro group, amine, thiol, alcohol, ester, amide, carboxylic acid, phenol, indole, imidazole, sulfonate or phophate, and SE2 is a polymer.

C8.5.11: a CMU, where SE1 is a GS, L1 and/or L2 comprises a halogen, nitro group, amine, thiol, alcohol, ester, amide, carboxylic acid, phenol, indole, imidazole, sulfonate or phophate, and SE2 is a polypropylene.

C8.5.12: a CMU, where SE1 is a GS, L1 and/or L2 comprises a halogen, nitro group, amine, thiol, alcohol, ester, amide, carboxylic acid, phenol, indole, imidazole, sulfonate or phophate, and SE2 is a polystyrene.

C8.5.13: a CMU, where SE1 is a GS, L1 and/or L2 comprises a halogen, nitro group, amine, thiol, alcohol, ester, amide, carboxylic acid, phenol, indole, imidazole, sulfonate or phophate, and SE2 is an epoxy-based polymer.

C8.5.14: a CMU, where SE1 is a GS, L1 and/or L2 comprises a halogen, nitro group, amine, thiol, alcohol, ester, amide, carboxylic acid, phenol, indole, imidazole, sulfonate or phophate, and SE2 is a polyethylene terephtalate.

C8.5.15: a CMU, where SE1 is a GS, L1 and/or L2 comprises a halogen, nitro group, amine, thiol, alcohol, ester, amide, carboxylic acid, phenol, indole, imidazole, sulfonate or phophate, and SE2 is a polyvinylchloride.

C8.5.16: a CMU, where SE1 is a GS, L1 and/or L2 comprises a halogen, nitro group, amine, thiol, alcohol, ester, amide, carboxylic acid, phenol, indole, imidazole, sulfonate or phophate, and SE2 is a MWCNT.

C8.5.17: a CMU, where SE1 is a GS, L1 and/or L2 comprises a halogen, nitro group, amine, thiol, alcohol, ester, amide, carboxylic acid, phenol, indole, imidazole, sulfonate or phophate, and SE2 is a SWCNT.

C8.5.18: a CMU, where SE1 is a GS, L1 and/or L2 comprises a halogen, nitro group, amine, thiol, alcohol, ester, amide, carboxylic acid, phenol, indole, imidazole, sulfonate or phophate, and SE2 is a GS.

C8.5.19: a CMU, where SE1 is a GS, L1 and/or L2 comprises a halogen, nitro group, amine, thiol, alcohol, ester, amide, carboxylic acid, phenol, indole, imidazole, sulfonate or phophate, and SE2 is a nanotube.

C8.5.20: a CMU, where SE1 is a GS, L1 and/or L2 comprises a halogen, nitro group, amine, thiol, alcohol, ester, amide, carboxylic acid, phenol, indole, imidazole, sulfonate or phophate, and SE2 is a BNNT.

C8.5.21: a CMU, where SE1 is a GS, L1 and/or L2 comprises a halogen, nitro group, amine, thiol, alcohol, ester, amide, carboxylic acid, phenol, indole, imidazole, sulfonate or phophate, and SE2 is a polyacrylate.

C8.5.22: a CMU, where SE1 is a GS, L1 and/or L2 comprises a halogen, nitro group, amine, thiol, alcohol, ester, amide, carboxylic acid, phenol, indole, imidazole, sulfonate or phophate, and SE2 is a polyolefine.

C8.6.1: a CMU, where SE1 is a GS, L1 and/or L2 comprises an C1-C10 alkane, and.

C8.6.2: a CMU, where SE1 is a GS, L1 and/or L2 comprises an C1-C10 alkane, and SE2 is copolymer.

C8.6.3: a CMU, where SE1 is a GS, L1 and/or L2 comprises an C1-C10 alkane, and SE2 is a high density polyethylene.

C8.6.4: a CMU, where SE1 is a GS, L1 and/or L2 comprises an C1-C10 alkane, and SE2 is a linear low density polyethylene.

C8.6.5: a CMU, where SE1 is a GS, L1 and/or L2 comprises an C1-C10 alkane, and SE2 is a low density polyethylene.

C8.6.6: a CMU, where SE1 is a GS, L1 and/or L2 comprises an C1-C10 alkane, and SE2 is a nylon.

C8.6.7: a CMU, where SE1 is a GS, L1 and/or L2 comprises an C1-C10 alkane, and SE2 is a polyamide.

C8.6.8: a CMU, where SE1 is a GS, L1 and/or L2 comprises an C1-C10 alkane, and SE2 is a polycarbonate.

C8.6.9: a CMU, where SE1 is a GS, L1 and/or L2 comprises an C1-C10 alkane, and SE2 is a polyethylene.

C8.6.10: a CMU, where SE1 is a GS, L1 and/or L2 comprises an C1-C10 alkane, and SE2 is a polymer.

C8.6.11: a CMU, where SE1 is a GS, L1 and/or L2 comprises an C1-C10 alkane, and SE2 is a polypropylene.

C8.6.12: a CMU, where SE1 is a GS, L1 and/or L2 comprises an C1-C10 alkane, and SE2 is a polystyrene.

C8.6.13: a CMU, where SE1 is a GS, L1 and/or L2 comprises an C1-C10 alkane, and SE2 is an epoxy-based polymer.

C8.6.14: a CMU, where SE1 is a GS, L1 and/or L2 comprises an C1-C10 alkane, and SE2 is a polyethylene terephtalate.

C8.6.15: a CMU, where SE1 is a GS, L1 and/or L2 comprises an C1-C10 alkane, and SE2 is a polyvinylchloride.

C8.6.16: a CMU, where SE1 is a GS, L1 and/or L2 comprises an C1-C10 alkane, and SE2 is a MWCNT.

C8.6.17: a CMU, where SE1 is a GS, L1 and/or L2 comprises an C1-C10 alkane, and SE2 is a SWCNT.

C8.6.18: a CMU, where SE1 is a GS, L1 and/or L2 comprises an C1-C10 alkane, and SE2 is a GS.

C8.6.19: a CMU, where SE1 is a GS, L1 and/or L2 comprises an C1-C10 alkane, and SE2 is a nanotube.

C8.6.20: a CMU, where SE1 is a GS, L1 and/or L2 comprises an C1-C10 alkane, and SE2 is a BNNT.

C8.6.21: a CMU, where SE1 is a GS, L1 and/or L2 comprises an C1-C10 alkane, and SE2 is a polyacrylate.

C8.6.22: a CMU, where SE1 is a GS, L1 and/or L2 comprises an C1-C10 alkane, and SE2 is a polyolefine.

C8.7.1: a CMU, where SE1 is a GS, L1 and/or L2 comprises a detergent comprising a C4-C25 alkane and a polar end group, and.

C8.7.2: a CMU, where SE1 is a GS, L1 and/or L2 comprises a detergent comprising a C4-C25 alkane and a polar end group, and SE2 is copolymer.

C8.7.3: a CMU, where SE1 is a GS, L1 and/or L2 comprises a detergent comprising a C4-C25 alkane and a polar end group, and SE2 is a high density polyethylene.

C8.7.4: a CMU, where SE1 is a GS, L1 and/or L2 comprises a detergent comprising a C4-C25 alkane and a polar end group, and SE2 is a linear low density polyethylene.

C8.7.5: a CMU, where SE1 is a GS, L1 and/or L2 comprises a detergent comprising a C4-C25 alkane and a polar end group, and SE2 is a low density polyethylene.

C8.7.6: a CMU, where SE1 is a GS, L1 and/or L2 comprises a detergent comprising a C4-C25 alkane and a polar end group, and SE2 is a nylon.

C8.7.7: a CMU, where SE1 is a GS, L1 and/or L2 comprises a detergent comprising a C4-C25 alkane and a polar end group, and SE2 is a polyamide.

C8.7.8: a CMU, where SE1 is a GS, L1 and/or L2 comprises a detergent comprising a C4-C25 alkane and a polar end group, and SE2 is a polycarbonate.

C8.7.9: a CMU, where SE1 is a GS, L1 and/or L2 comprises a detergent comprising a C4-C25 alkane and a polar end group, and SE2 is a polyethylene.

C8.7.10: a CMU, where SE1 is a GS, L1 and/or L2 comprises a detergent comprising a C4-C25 alkane and a polar end group, and SE2 is a polymer.

C8.7.11: a CMU, where SE1 is a GS, L1 and/or L2 comprises a detergent comprising a C4-C25 alkane and a polar end group, and SE2 is a polypropylene.

C8.7.12: a CMU, where SE1 is a GS, L1 and/or L2 comprises a detergent comprising a C4-C25 alkane and a polar end group, and SE2 is a polystyrene.

C8.7.13: a CMU, where SE1 is a GS, L1 and/or L2 comprises a detergent comprising a C4-C25 alkane and a polar end group, and SE2 is an epoxy-based polymer.

C8.7.14: a CMU, where SE1 is a GS, L1 and/or L2 comprises a detergent comprising a C4-C25 alkane and a polar end group, and SE2 is a polyethylene terephtalate.

C8.7.15: a CMU, where SE1 is a GS, L1 and/or L2 comprises a detergent comprising a C4-C25 alkane and a polar end group, and SE2 is a polyvinylchloride.

C8.7.16: a CMU, where SE1 is a GS, L1 and/or L2 comprises a detergent comprising a C4-C25 alkane and a polar end group, and SE2 is a MWCNT.

C8.7.17: a CMU, where SE1 is a GS, L1 and/or L2 comprises a detergent comprising a C4-C25 alkane and a polar end group, and SE2 is a SWCNT.

C8.7.18: a CMU, where SE1 is a GS, L1 and/or L2 comprises a detergent comprising a C4-C25 alkane and a polar end group, and SE2 is a GS.

C8.7.19: a CMU, where SE1 is a GS, L1 and/or L2 comprises a detergent comprising a C4-C25 alkane and a polar end group, and SE2 is a nanotube.

C8.7.20: a CMU, where SE1 is a GS, L1 and/or L2 comprises a detergent comprising a C4-C25 alkane and a polar end group, and SE2 is a BNNT.

C8.7.21: a CMU, where SE1 is a GS, L1 and/or L2 comprises a detergent comprising a C4-C25 alkane and a polar end group, and SE2 is a polyacrylate.

C8.7.22: a CMU, where SE1 is a GS, L1 and/or L2 comprises a detergent comprising a C4-C25 alkane and a polar end group, and SE2 is a polyolefine.

C8.8.1: a CMU, where SE1 is a GS, L1 and/or L2 comprises a lactam, such as N-methyl-pyrrolidone and lactone, and.

C8.8.2: a CMU, where SE1 is a GS, L1 and/or L2 comprises a lactam, such as N-methyl-pyrrolidone and lactone, and SE2 is copolymer.

C8.8.3: a CMU, where SE1 is a GS, L1 and/or L2 comprises a lactam, such as N-methyl-pyrrolidone and lactone, and SE2 is a high density polyethylene.

C8.8.4: a CMU, where SE1 is a GS, L1 and/or L2 comprises a lactam, such as N-methyl-pyrrolidone and lactone, and SE2 is a linear low density polyethylene.

C8.8.5: a CMU, where SE1 is a GS, L1 and/or L2 comprises a lactam, such as N-methyl-pyrrolidone and lactone, and SE2 is a low density polyethylene.

C8.8.6: a CMU, where SE1 is a GS, L1 and/or L2 comprises a lactam, such as N-methyl-pyrrolidone and lactone, and SE2 is a nylon.

C8.8.7: a CMU, where SE1 is a GS, L1 and/or L2 comprises a lactam, such as N-methyl-pyrrolidone and lactone, and SE2 is a polyamide.

C8.8.8: a CMU, where SE1 is a GS, L1 and/or L2 comprises a lactam, such as N-methyl-pyrrolidone and lactone, and SE2 is a polycarbonate.

C8.8.9: a CMU, where SE1 is a GS, L1 and/or L2 comprises a lactam, such as N-methyl-pyrrolidone and lactone, and SE2 is a polyethylene.

C8.8.10: a CMU, where SE1 is a GS, L1 and/or L2 comprises a lactam, such as N-methyl-pyrrolidone and lactone, and SE2 is a polymer.

C8.8.11: a CMU, where SE1 is a GS, L1 and/or L2 comprises a lactam, such as N-methyl-pyrrolidone and lactone, and SE2 is a polypropylene.

C8.8.12: a CMU, where SE1 is a GS, L1 and/or L2 comprises a lactam, such as N-methyl-pyrrolidone and lactone, and SE2 is a polystyrene.

C8.8.13: a CMU, where SE1 is a GS, L1 and/or L2 comprises a lactam, such as N-methyl-pyrrolidone and lactone, and SE2 is an epoxy-based polymer.

C8.8.14: a CMU, where SE1 is a GS, L1 and/or L2 comprises a lactam, such as N-methyl-pyrrolidone and lactone, and SE2 is a polyethylene terephtalate.

C8.8.15: a CMU, where SE1 is a GS, L1 and/or L2 comprises a lactam, such as N-methyl-pyrrolidone and lactone, and SE2 is a polyvinylchloride.

C8.8.16: a CMU, where SE1 is a GS, L1 and/or L2 comprises a lactam, such as N-methyl-pyrrolidone and lactone, and SE2 is a MWCNT.

C8.8.17: a CMU, where SE1 is a GS, L1 and/or L2 comprises a lactam, such as N-methyl-pyrrolidone and lactone, and SE2 is a SWCNT.

C8.8.18: a CMU, where SE1 is a GS, L1 and/or L2 comprises a lactam, such as N-methyl-pyrrolidone and lactone, and SE2 is a GS.

C8.8.19: a CMU, where SE1 is a GS, L1 and/or L2 comprises a lactam, such as N-methyl-pyrrolidone and lactone, and SE2 is a nanotube.

C8.8.20: a CMU, where SE1 is a GS, L1 and/or L2 comprises a lactam, such as N-methyl-pyrrolidone and lactone, and SE2 is a BNNT.

C8.8.21: a CMU, where SE1 is a GS, L1 and/or L2 comprises a lactam, such as N-methyl-pyrrolidone and lactone, and SE2 is a polyacrylate.

C8.8.22: a CMU, where SE1 is a GS, L1 and/or L2 comprises a lactam, such as N-methyl-pyrrolidone and lactone, and SE2 is a polyolefine.

C8.9.1: a CMU, where SE1 is a GS, L1 and/or L2 comprises a amino acid residue such as phenylalanine, tyrosine, tryptophan, or histidine, and.

C8.9.2: a CMU, where SE1 is a GS, L1 and/or L2 comprises a amino acid residue such as phenylalanine, tyrosine, tryptophan, or histidine, and SE2 is copolymer.

C8.9.3: a CMU, where SE1 is a GS, L1 and/or L2 comprises a amino acid residue such as phenylalanine, tyrosine, tryptophan, or histidine, and SE2 is a high density polyethylene.

C8.9.4: a CMU, where SE1 is a GS, L1 and/or L2 comprises a amino acid residue such as phenylalanine, tyrosine, tryptophan, or histidine, and SE2 is a linear low density polyethylene.

C8.9.5: a CMU, where SE1 is a GS, L1 and/or L2 comprises a amino acid residue such as phenylalanine, tyrosine, tryptophan, or histidine, and SE2 is a low density polyethylene.

C8.9.6: a CMU, where SE1 is a GS, L1 and/or L2 comprises a amino acid residue such as phenylalanine, tyrosine, tryptophan, or histidine, and SE2 is a nylon.

C8.9.7: a CMU, where SE1 is a GS, L1 and/or L2 comprises a amino acid residue such as phenylalanine, tyrosine, tryptophan, or histidine, and SE2 is a polyamide.

C8.9.8: a CMU, where SE1 is a GS, L1 and/or L2 comprises a amino acid residue such as phenylalanine, tyrosine, tryptophan, or histidine, and SE2 is a polycarbonate.

C8.9.9: a CMU, where SE1 is a GS, L1 and/or L2 comprises a amino acid residue such as phenylalanine, tyrosine, tryptophan, or histidine, and SE2 is a polyethylene.

C8.9.10: a CMU, where SE1 is a GS, L1 and/or L2 comprises a amino acid residue such as phenylalanine, tyrosine, tryptophan, or histidine, and SE2 is a polymer.

C8.9.11: a CMU, where SE1 is a GS, L1 and/or L2 comprises a amino acid residue such as phenylalanine, tyrosine, tryptophan, or histidine, and SE2 is a polypropylene.

C8.9.12: a CMU, where SE1 is a GS, L1 and/or L2 comprises a amino acid residue such as phenylalanine, tyrosine, tryptophan, or histidine, and SE2 is a polystyrene.

C8.9.13: a CMU, where SE1 is a GS, L1 and/or L2 comprises a amino acid residue such as phenylalanine, tyrosine, tryptophan, or histidine, and SE2 is an epoxy-based polymer.

C8.9.14: a CMU, where SE1 is a GS, L1 and/or L2 comprises a amino acid residue such as phenylalanine, tyrosine, tryptophan, or histidine, and SE2 is a polyethylene terephtalate.

C8.9.15: a CMU, where SE1 is a GS, L1 and/or L2 comprises a amino acid residue such as phenylalanine, tyrosine, tryptophan, or histidine, and SE2 is a polyvinylchloride.

C8.9.16: a CMU, where SE1 is a GS, L1 and/or L2 comprises a amino acid residue such as phenylalanine, tyrosine, tryptophan, or histidine, and SE2 is a MWCNT.

C8.9.17: a CMU, where SE1 is a GS, L1 and/or L2 comprises a amino acid residue such as phenylalanine, tyrosine, tryptophan, or histidine, and SE2 is a SWCNT.

C8.9.18: a CMU, where SE1 is a GS, L1 and/or L2 comprises a amino acid residue such as phenylalanine, tyrosine, tryptophan, or histidine, and SE2 is a GS.

C8.9.19: a CMU, where SE1 is a GS, L1 and/or L2 comprises a amino acid residue such as phenylalanine, tyrosine, tryptophan, or histidine, and SE2 is a nanotube.

C8.9.20: a CMU, where SE1 is a GS, L1 and/or L2 comprises a amino acid residue such as phenylalanine, tyrosine, tryptophan, or histidine, and SE2 is a BNNT.

C8.9.21: a CMU, where SE1 is a GS, L1 and/or L2 comprises a amino acid residue such as phenylalanine, tyrosine, tryptophan, or histidine, and SE2 is a polyacrylate.

C8.9.22: a CMU, where SE1 is a GS, L1 and/or L2 comprises a amino acid residue such as phenylalanine, tyrosine, tryptophan, or histidine, and SE2 is a polyolefine.

C8.10.1: a CMU, where SE1 is a GS, L1 and/or L2 comprises a heteroaromatic system, including pyrole, thiophene, furane, pyrazole, imidazole, isoxazole, oxazole, isothiazole, thiazole, pyridine and perylene bisimides, and.

C8.10.2: a CMU, where SE1 is a GS, L1 and/or L2 comprises a heteroaromatic system, including pyrole, thiophene, furane, pyrazole, imidazole, isoxazole, oxazole, isothiazole, thiazole, pyridine and perylene bisimides, and SE2 is copolymer.

C8.10.3: a CMU, where SE1 is a GS, L1 and/or L2 comprises a heteroaromatic system, including pyrole, thiophene, furane, pyrazole, imidazole, isoxazole, oxazole, isothiazole, thiazole, pyridine and perylene bisimides, and SE2 is a high density polyethylene.

C8.10.4: a CMU, where SE1 is a GS, L1 and/or L2 comprises a heteroaromatic system, including pyrole, thiophene, furane, pyrazole, imidazole, isoxazole, oxazole, isothiazole, thiazole, pyridine and perylene bisimides, and SE2 is a linear low density polyethylene.

C8.10.5: a CMU, where SE1 is a GS, L1 and/or L2 comprises a heteroaromatic system, including pyrole, thiophene, furane, pyrazole, imidazole, isoxazole, oxazole, isothiazole, thiazole, pyridine and perylene bisimides, and SE2 is a low density polyethylene.

C8.10.6: a CMU, where SE1 is a GS, L1 and/or L2 comprises a heteroaromatic system, including pyrole, thiophene, furane, pyrazole, imidazole, isoxazole, oxazole, isothiazole, thiazole, pyridine and perylene bisimides, and SE2 is a nylon.

C8.10.7: a CMU, where SE1 is a GS, L1 and/or L2 comprises a heteroaromatic system, including pyrole, thiophene, furane, pyrazole, imidazole, isoxazole, oxazole, isothiazole, thiazole, pyridine and perylene bisimides, and SE2 is a polyamide.

C8.10.8: a CMU, where SE1 is a GS, L1 and/or L2 comprises a heteroaromatic system, including pyrole, thiophene, furane, pyrazole, imidazole, isoxazole, oxazole, isothiazole, thiazole, pyridine and perylene bisimides, and SE2 is a polycarbonate.

C8.10.9: a CMU, where SE1 is a GS, L1 and/or L2 comprises a heteroaromatic system, including pyrole, thiophene, furane, pyrazole, imidazole, isoxazole, oxazole, isothiazole, thiazole, pyridine and perylene bisimides, and SE2 is a polyethylene.

C8.10.10: a CMU, where SE1 is a GS, L1 and/or L2 comprises a heteroaromatic system, including pyrole, thiophene, furane, pyrazole, imidazole, isoxazole, oxazole, isothiazole, thiazole, pyridine and perylene bisimides, and SE2 is a polymer.

C8.10.11: a CMU, where SE1 is a GS, L1 and/or L2 comprises a heteroaromatic system, including pyrole, thiophene, furane, pyrazole, imidazole, isoxazole, oxazole, isothiazole, thiazole, pyridine and perylene bisimides, and SE2 is a polypropylene.

C8.10.12: a CMU, where SE1 is a GS, L1 and/or L2 comprises a heteroaromatic system, including pyrole, thiophene, furane, pyrazole, imidazole, isoxazole, oxazole, isothiazole, thiazole, pyridine and perylene bisimides, and SE2 is a polystyrene.

C8.10.13: a CMU, where SE1 is a GS, L1 and/or L2 comprises a heteroaromatic system, including pyrole, thiophene, furane, pyrazole, imidazole, isoxazole, oxazole, isothiazole, thiazole, pyridine and perylene bisimides, and SE2 is an epoxy-based polymer.

C8.10.14: a CMU, where SE1 is a GS, L1 and/or L2 comprises a heteroaromatic system, including pyrole, thiophene, furane, pyrazole, imidazole, isoxazole, oxazole, isothiazole, thiazole, pyridine and perylene bisimides, and SE2 is a polyethylene terephtalate.

C8.10.15: a CMU, where SE1 is a GS, L1 and/or L2 comprises a heteroaromatic system, including pyrole, thiophene, furane, pyrazole, imidazole, isoxazole, oxazole, isothiazole, thiazole, pyridine and perylene bisimides, and SE2 is a polyvinylchloride.

C8.10.16: a CMU, where SE1 is a GS, L1 and/or L2 comprises a heteroaromatic system, including pyrole, thiophene, furane, pyrazole, imidazole, isoxazole, oxazole, isothiazole, thiazole, pyridine and perylene bisimides, and SE2 is a MWCNT.

C8.10.17: a CMU, where SE1 is a GS, L1 and/or L2 comprises a heteroaromatic system, including pyrole, thiophene, furane, pyrazole, imidazole, isoxazole, oxazole, isothiazole, thiazole, pyridine and perylene bisimides, and SE2 is a SWCNT.

C8.10.18: a CMU, where SE1 is a GS, L1 and/or L2 comprises a heteroaromatic system, including pyrole, thiophene, furane, pyrazole, imidazole, isoxazole, oxazole, isothiazole, thiazole, pyridine and perylene bisimides, and SE2 is a GS.

C8.10.19: a CMU, where SE1 is a GS, L1 and/or L2 comprises a heteroaromatic system, including pyrole, thiophene, furane, pyrazole, imidazole, isoxazole, oxazole, isothiazole, thiazole, pyridine and perylene bisimides, and SE2 is a nanotube.

C8.10.20: a CMU, where SE1 is a GS, L1 and/or L2 comprises a heteroaromatic system, including pyrole, thiophene, furane, pyrazole, imidazole, isoxazole, oxazole, isothiazole, thiazole, pyridine and perylene bisimides, and SE2 is a BNNT.

C8.10.21: a CMU, where SE1 is a GS, L1 and/or L2 comprises a heteroaromatic system, including pyrole, thiophene, furane, pyrazole, imidazole, isoxazole, oxazole, isothiazole, thiazole, pyridine and perylene bisimides, and SE2 is a polyacrylate.

C8.10.22: a CMU, where SE1 is a GS, L1 and/or L2 comprises a heteroaromatic system, including pyrole, thiophene, furane, pyrazole, imidazole, isoxazole, oxazole, isothiazole, thiazole, pyridine and perylene bisimides, and SE2 is a polyolefine.

C8.11.1: a CMU, where SE1 is a GS, L1 and/or L2 comprises a fused ring system, composed of either aromatic, non-aromatic or anti-aromatic rings or combinations thereof, and.

C8.11.2: a CMU, where SE1 is a GS, L1 and/or L2 comprises a fused ring system, composed of either aromatic, non-aromatic or anti-aromatic rings or combinations thereof, and SE2 is copolymer.

C8.11.3: a CMU, where SE1 is a GS, L1 and/or L2 comprises a fused ring system, composed of either aromatic, non-aromatic or anti-aromatic rings or combinations thereof, and SE2 is a high density polyethylene.

C8.11.4: a CMU, where SE1 is a GS, L1 and/or L2 comprises a fused ring system, composed of either aromatic, non-aromatic or anti-aromatic rings or combinations thereof, and SE2 is a linear low density polyethylene.

C8.11.5: a CMU, where SE1 is a GS, L1 and/or L2 comprises a fused ring system, composed of either aromatic, non-aromatic or anti-aromatic rings or combinations thereof, and SE2 is a low density polyethylene.

C8.11.6: a CMU, where SE1 is a GS, L1 and/or L2 comprises a fused ring system, composed of either aromatic, non-aromatic or anti-aromatic rings or combinations thereof, and SE2 is a nylon.

C8.11.7: a CMU, where SE1 is a GS, L1 and/or L2 comprises a fused ring system, composed of either aromatic, non-aromatic or anti-aromatic rings or combinations thereof, and SE2 is a polyamide.

C8.11.8: a CMU, where SE1 is a GS, L1 and/or L2 comprises a fused ring system, composed of either aromatic, non-aromatic or anti-aromatic rings or combinations thereof, and SE2 is a polycarbonate.

C8.11.9: a CMU, where SE1 is a GS, L1 and/or L2 comprises a fused ring system, composed of either aromatic, non-aromatic or anti-aromatic rings or combinations thereof, and SE2 is a polyethylene.

C8.11.10: a CMU, where SE1 is a GS, L1 and/or L2 comprises a fused ring system, composed of either aromatic, non-aromatic or anti-aromatic rings or combinations thereof, and SE2 is a polymer.

C8.11.11: a CMU, where SE1 is a GS, L1 and/or L2 comprises a fused ring system, composed of either aromatic, non-aromatic or anti-aromatic rings or combinations thereof, and SE2 is a polypropylene.

C8.11.12: a CMU, where SE1 is a GS, L1 and/or L2 comprises a fused ring system, composed of either aromatic, non-aromatic or anti-aromatic rings or combinations thereof, and SE2 is a polystyrene.

C8.11.13: a CMU, where SE1 is a GS, L1 and/or L2 comprises a fused ring system, composed of either aromatic, non-aromatic or anti-aromatic rings or combinations thereof, and SE2 is an epoxy-based polymer.

C8.11.14: a CMU, where SE1 is a GS, L1 and/or L2 comprises a fused ring system, composed of either aromatic, non-aromatic or anti-aromatic rings or combinations thereof, and SE2 is a polyethylene terephtalate.

C8.11.15: a CMU, where SE1 is a GS, L1 and/or L2 comprises a fused ring system, composed of either aromatic, non-aromatic or anti-aromatic rings or combinations thereof, and SE2 is a polyvinylchloride.

C8.11.16: a CMU, where SE1 is a GS, L1 and/or L2 comprises a fused ring system, composed of either aromatic, non-aromatic or anti-aromatic rings or combinations thereof, and SE2 is a MWCNT.

C8.11.17: a CMU, where SE1 is a GS, L1 and/or L2 comprises a fused ring system, composed of either aromatic, non-aromatic or anti-aromatic rings or combinations thereof, and SE2 is a SWCNT.

C8.11.18: a CMU, where SE1 is a GS, L1 and/or L2 comprises a fused ring system, composed of either aromatic, non-aromatic or anti-aromatic rings or combinations thereof, and SE2 is a GS.

C8.11.19: a CMU, where SE1 is a GS, L1 and/or L2 comprises a fused ring system, composed of either aromatic, non-aromatic or anti-aromatic rings or combinations thereof, and SE2 is a nanotube.

C8.11.20: a CMU, where SE1 is a GS, L1 and/or L2 comprises a fused ring system, composed of either aromatic, non-aromatic or anti-aromatic rings or combinations thereof, and SE2 is a BNNT.

C8.11.21: a CMU, where SE1 is a GS, L1 and/or L2 comprises a fused ring system, composed of either aromatic, non-aromatic or anti-aromatic rings or combinations thereof, and SE2 is a polyacrylate.

C8.11.22: a CMU, where SE1 is a GS, L1 and/or L2 comprises a fused ring system, composed of either aromatic, non-aromatic or anti-aromatic rings or combinations thereof, and SE2 is a polyolefine.

C9.1.1: a CMU, where SE1 is a nanotube, and.

C9.1.2: a CMU, where SE1 is a nanotube, and SE2 is copolymer.

C9.1.3: a CMU, where SE1 is a nanotube, and SE2 is a high density polyethylene.

C9.1.4: a CMU, where SE1 is a nanotube, and SE2 is a linear low density polyethylene.

C9.1.5: a CMU, where SE1 is a nanotube, and SE2 is a low density polyethylene.

C9.1.6: a CMU, where SE1 is a nanotube, and SE2 is a nylon.

C9.1.7: a CMU, where SE1 is a nanotube, and SE2 is a polyamide.

C9.1.8: a CMU, where SE1 is a nanotube, and SE2 is a polycarbonate.

C9.1.9: a CMU, where SE1 is a nanotube, and SE2 is a polyethylene.

C9.1.10: a CMU, where SE1 is a nanotube, and SE2 is a polymer.

C9.1.11: a CMU, where SE1 is a nanotube, and SE2 is a polypropylene.

C9.1.12: a CMU, where SE1 is a nanotube, and SE2 is a polystyrene.

C9.1.13: a CMU, where SE1 is a nanotube, and SE2 is an epoxy-based polymer.

C9.1.14: a CMU, where SE1 is a nanotube, and SE2 is a polyethylene terephtalate.

C9.1.15: a CMU, where SE1 is a nanotube, and SE2 is a polyvinylchloride.

C9.1.16: a CMU, where SE1 is a nanotube, and SE2 is a MWCNT.

C9.1.17: a CMU, where SE1 is a nanotube, and SE2 is a SWCNT.

C9.1.18: a CMU, where SE1 is a nanotube, and SE2 is a GS.

C9.1.19: a CMU, where SE1 is a nanotube, and SE2 is a nanotube.

C9.1.20: a CMU, where SE1 is a nanotube, and SE2 is a BNNT.

C9.1.21: a CMU, where SE1 is a nanotube, and SE2 is a polyacrylate.

C9.1.22: a CMU, where SE1 is a nanotube, and SE2 is a polyolefine.

C9.2.1: a CMU, where SE1 is a nanotube, L1 and/or L2 comprises a non-covalent ligand, and C9.2.2: a CMU, where SE1 is a nanotube, L1 and/or L2 comprises a non-covalent ligand, and SE2 is copolymer.

C9.2.3: a CMU, where SE1 is a nanotube, L1 and/or L2 comprises a non-covalent ligand, and SE2 is a high density polyethylene.

C9.2.4: a CMU, where SE1 is a nanotube, L1 and/or L2 comprises a non-covalent ligand, and SE2 is a linear low density polyethylene.

C9.2.5: a CMU, where SE1 is a nanotube, L1 and/or L2 comprises a non-covalent ligand, and SE2 is a low density polyethylene.

C9.2.6: a CMU, where SE1 is a nanotube, L1 and/or L2 comprises a non-covalent ligand, and SE2 is a nylon.

C9.2.7: a CMU, where SE1 is a nanotube, L1 and/or L2 comprises a non-covalent ligand, and SE2 is a polyamide.

C9.2.8: a CMU, where SE1 is a nanotube, L1 and/or L2 comprises a non-covalent ligand, and SE2 is a polycarbonate.

C9.2.9: a CMU, where SE1 is a nanotube, L1 and/or L2 comprises a non-covalent ligand, and SE2 is a polyethylene.

C9.2.10: a CMU, where SE1 is a nanotube, L1 and/or L2 comprises a non-covalent ligand, and SE2 is a polymer.

C9.2.11: a CMU, where SE1 is a nanotube, L1 and/or L2 comprises a non-covalent ligand, and SE2 is a polypropylene.

C9.2.12: a CMU, where SE1 is a nanotube, L1 and/or L2 comprises a non-covalent ligand, and SE2 is a polystyrene.

C9.2.13: a CMU, where SE1 is a nanotube, L1 and/or L2 comprises a non-covalent ligand, and SE2 is an epoxy-based polymer.

C9.2.14: a CMU, where SE1 is a nanotube, L1 and/or L2 comprises a non-covalent ligand, and SE2 is a polyethylene terephtalate.

C9.2.15: a CMU, where SE1 is a nanotube, L1 and/or L2 comprises a non-covalent ligand, and SE2 is a polyvinylchloride.

C9.2.16: a CMU, where SE1 is a nanotube, L1 and/or L2 comprises a non-covalent ligand, and SE2 is a MWCNT.

C9.2.17: a CMU, where SE1 is a nanotube, L1 and/or L2 comprises a non-covalent ligand, and SE2 is a SWCNT.

C9.2.18: a CMU, where SE1 is a nanotube, L1 and/or L2 comprises a non-covalent ligand, and SE2 is a GS.

C9.2.19: a CMU, where SE1 is a nanotube, L1 and/or L2 comprises a non-covalent ligand, and SE2 is a nanotube.

C9.2.20: a CMU, where SE1 is a nanotube, L1 and/or L2 comprises a non-covalent ligand, and SE2 is a BNNT.

C9.2.21: a CMU, where SE1 is a nanotube, L1 and/or L2 comprises a non-covalent ligand, and SE2 is a polyacrylate.

C9.2.22: a CMU, where SE1 is a nanotube, L1 and/or L2 comprises a non-covalent ligand, and SE2 is a polyolefine.

C9.3.1: a CMU, where SE1 is a nanotube, L1 and/or L2 comprises a amino-substituted hydrocarbon, and.

C9.3.2: a CMU, where SE1 is a nanotube, L1 and/or L2 comprises a amino-substituted hydrocarbon, and SE2 is copolymer.

C9.3.3: a CMU, where SE1 is a nanotube, L1 and/or L2 comprises a amino-substituted hydrocarbon, and SE2 is a high density polyethylene.

C9.3.4: a CMU, where SE1 is a nanotube, L1 and/or L2 comprises a amino-substituted hydrocarbon, and SE2 is a linear low density polyethylene.

C9.3.5: a CMU, where SE1 is a nanotube, L1 and/or L2 comprises a amino-substituted hydrocarbon, and SE2 is a low density polyethylene.

C9.3.6: a CMU, where SE1 is a nanotube, L1 and/or L2 comprises a amino-substituted hydrocarbon, and SE2 is a nylon.

C9.3.7: a CMU, where SE1 is a nanotube, L1 and/or L2 comprises a amino-substituted hydrocarbon, and SE2 is a polyamide.

C9.3.8: a CMU, where SE1 is a nanotube, L1 and/or L2 comprises a amino-substituted hydrocarbon, and SE2 is a polycarbonate.

C9.3.9: a CMU, where SE1 is a nanotube, L1 and/or L2 comprises a amino-substituted hydrocarbon, and SE2 is a polyethylene.

C9.3.10: a CMU, where SE1 is a nanotube, L1 and/or L2 comprises a amino-substituted hydrocarbon, and SE2 is a polymer.

C9.3.11: a CMU, where SE1 is a nanotube, L1 and/or L2 comprises a amino-substituted hydrocarbon, and SE2 is a polypropylene.

C9.3.12: a CMU, where SE1 is a nanotube, L1 and/or L2 comprises a amino-substituted hydrocarbon, and SE2 is a polystyrene.

C9.3.13: a CMU, where SE1 is a nanotube, L1 and/or L2 comprises a amino-substituted hydrocarbon, and SE2 is an epoxy-based polymer.

C9.3.14: a CMU, where SE1 is a nanotube, L1 and/or L2 comprises a amino-substituted hydrocarbon, and SE2 is a polyethylene terephtalate.

C9.3.15: a CMU, where SE1 is a nanotube, L1 and/or L2 comprises a amino-substituted hydrocarbon, and SE2 is a polyvinylchloride.

C9.3.16: a CMU, where SE1 is a nanotube, L1 and/or L2 comprises a amino-substituted hydrocarbon, and SE2 is a MWCNT.

C9.3.17: a CMU, where SE1 is a nanotube, L1 and/or L2 comprises a amino-substituted hydrocarbon, and SE2 is a SWCNT.

C9.3.18: a CMU, where SE1 is a nanotube, L1 and/or L2 comprises a amino-substituted hydrocarbon, and SE2 is a GS.

C9.3.19: a CMU, where SE1 is a nanotube, L1 and/or L2 comprises a amino-substituted hydrocarbon, and SE2 is a nanotube.

C9.3.20: a CMU, where SE1 is a nanotube, L1 and/or L2 comprises a amino-substituted hydrocarbon, and SE2 is a BNNT.

C9.3.21: a CMU, where SE1 is a nanotube, L1 and/or L2 comprises a amino-substituted hydrocarbon, and SE2 is a polyacrylate.

C9.3.22: a CMU, where SE1 is a nanotube, L1 and/or L2 comprises a amino-substituted hydrocarbon, and SE2 is a polyolefine.

C9.4.1: a CMU, where SE1 is a nanotube, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and.

C9.4.2: a CMU, where SE1 is a nanotube, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and SE2 is copolymer.

C9.4.3: a CMU, where SE1 is a nanotube, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and SE2 is a high density polyethylene.

C9.4.4: a CMU, where SE1 is a nanotube, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and SE2 is a linear low density polyethylene.

C9.4.5: a CMU, where SE1 is a nanotube, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and SE2 is a low density polyethylene.

C9.4.6: a CMU, where SE1 is a nanotube, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and SE2 is a nylon.

C9.4.7: a CMU, where SE1 is a nanotube, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and SE2 is a polyamide.

C9.4.8: a CMU, where SE1 is a nanotube, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and SE2 is a polycarbonate.

C9.4.9: a CMU, where SE1 is a nanotube, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and SE2 is a polyethylene.

C9.4.10: a CMU, where SE1 is a nanotube, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and SE2 is a polymer.

C9.4.11: a CMU, where SE1 is a nanotube, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and SE2 is a polypropylene.

C9.4.12: a CMU, where SE1 is a nanotube, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and SE2 is a polystyrene.

C9.4.13: a CMU, where SE1 is a nanotube, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and SE2 is an epoxy-based polymer.

C9.4.14: a CMU, where SE1 is a nanotube, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and SE2 is a polyethylene terephtalate.

C9.4.15: a CMU, where SE1 is a nanotube, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and SE2 is a polyvinylchloride.

C9.4.16: a CMU, where SE1 is a nanotube, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and SE2 is a MWCNT.

C9.4.17: a CMU, where SE1 is a nanotube, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and SE2 is a SWCNT.

C9.4.18: a CMU, where SE1 is a nanotube, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and SE2 is a GS.

C9.4.19: a CMU, where SE1 is a nanotube, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and SE2 is a nanotube.

C9.4.20: a CMU, where SE1 is a nanotube, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and SE2 is a BNNT.

C9.4.21: a CMU, where SE1 is a nanotube, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and SE2 is a polyacrylate.

C9.4.22: a CMU, where SE1 is a nanotube, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and SE2 is a polyolefine.

C9.5.1: a CMU, where SE1 is a nanotube, L1 and/or L2 comprises a halogen, nitro group, amine, thiol, alcohol, ester, amide, carboxylic acid, phenol, indole, imidazole, sulfonate or phophate, and.

C9.5.2: a CMU, where SE1 is a nanotube, L1 and/or L2 comprises a halogen, nitro group, amine, thiol, alcohol, ester, amide, carboxylic acid, phenol, indole, imidazole, sulfonate or phophate, and SE2 is copolymer.

C9.5.3: a CMU, where SE1 is a nanotube, L1 and/or L2 comprises a halogen, nitro group, amine, thiol, alcohol, ester, amide, carboxylic acid, phenol, indole, imidazole, sulfonate or phophate, and SE2 is a high density polyethylene.

C9.5.4: a CMU, where SE1 is a nanotube, L1 and/or L2 comprises a halogen, nitro group, amine, thiol, alcohol, ester, amide, carboxylic acid, phenol, indole, imidazole, sulfonate or phophate, and SE2 is a linear low density polyethylene.

C9.5.5: a CMU, where SE1 is a nanotube, L1 and/or L2 comprises a halogen, nitro group, amine, thiol, alcohol, ester, amide, carboxylic acid, phenol, indole, imidazole, sulfonate or phophate, and SE2 is a low density polyethylene.

C9.5.6: a CMU, where SE1 is a nanotube, L1 and/or L2 comprises a halogen, nitro group, amine, thiol, alcohol, ester, amide, carboxylic acid, phenol, indole, imidazole, sulfonate or phophate, and SE2 is a nylon.

C9.5.7: a CMU, where SE1 is a nanotube, L1 and/or L2 comprises a halogen, nitro group, amine, thiol, alcohol, ester, amide, carboxylic acid, phenol, indole, imidazole, sulfonate or phophate, and SE2 is a polyamide.

C9.5.8: a CMU, where SE1 is a nanotube, L1 and/or L2 comprises a halogen, nitro group, amine, thiol, alcohol, ester, amide, carboxylic acid, phenol, indole, imidazole, sulfonate or phophate, and SE2 is a polycarbonate.

C9.5.9: a CMU, where SE1 is a nanotube, L1 and/or L2 comprises a halogen, nitro group, amine, thiol, alcohol, ester, amide, carboxylic acid, phenol, indole, imidazole, sulfonate or phophate, and SE2 is a polyethylene.

C9.5.10: a CMU, where SE1 is a nanotube, L1 and/or L2 comprises a halogen, nitro group, amine, thiol, alcohol, ester, amide, carboxylic acid, phenol, indole, imidazole, sulfonate or phophate, and SE2 is a polymer.

C9.5.11: a CMU, where SE1 is a nanotube, L1 and/or L2 comprises a halogen, nitro group, amine, thiol, alcohol, ester, amide, carboxylic acid, phenol, indole, imidazole, sulfonate or phophate, and SE2 is a polypropylene.

C9.5.12: a CMU, where SE1 is a nanotube, L1 and/or L2 comprises a halogen, nitro group, amine, thiol, alcohol, ester, amide, carboxylic acid, phenol, indole, imidazole, sulfonate or phophate, and SE2 is a polystyrene.

C9.5.13: a CMU, where SE1 is a nanotube, L1 and/or L2 comprises a halogen, nitro group, amine, thiol, alcohol, ester, amide, carboxylic acid, phenol, indole, imidazole, sulfonate or phophate, and SE2 is an epoxy-based polymer.

C9.5.14: a CMU, where SE1 is a nanotube, L1 and/or L2 comprises a halogen, nitro group, amine, thiol, alcohol, ester, amide, carboxylic acid, phenol, indole, imidazole, sulfonate or phophate, and SE2 is a polyethylene terephtalate.

C9.5.15: a CMU, where SE1 is a nanotube, L1 and/or L2 comprises a halogen, nitro group, amine, thiol, alcohol, ester, amide, carboxylic acid, phenol, indole, imidazole, sulfonate or phophate, and SE2 is a polyvinylchloride.

C9.5.16: a CMU, where SE1 is a nanotube, L1 and/or L2 comprises a halogen, nitro group, amine, thiol, alcohol, ester, amide, carboxylic acid, phenol, indole, imidazole, sulfonate or phophate, and SE2 is a MWCNT.

C9.5.17: a CMU, where SE1 is a nanotube, L1 and/or L2 comprises a halogen, nitro group, amine, thiol, alcohol, ester, amide, carboxylic acid, phenol, indole, imidazole, sulfonate or phophate, and SE2 is a SWCNT.

C9.5.18: a CMU, where SE1 is a nanotube, L1 and/or L2 comprises a halogen, nitro group, amine, thiol, alcohol, ester, amide, carboxylic acid, phenol, indole, imidazole, sulfonate or phophate, and SE2 is a GS.

C9.5.19: a CMU, where SE1 is a nanotube, L1 and/or L2 comprises a halogen, nitro group, amine, thiol, alcohol, ester, amide, carboxylic acid, phenol, indole, imidazole, sulfonate or phophate, and SE2 is a nanotube.

C9.5.20: a CMU, where SE1 is a nanotube, L1 and/or L2 comprises a halogen, nitro group, amine, thiol, alcohol, ester, amide, carboxylic acid, phenol, indole, imidazole, sulfonate or phophate, and SE2 is a BNNT.

C9.5.21: a CMU, where SE1 is a nanotube, L1 and/or L2 comprises a halogen, nitro group, amine, thiol, alcohol, ester, amide, carboxylic acid, phenol, indole, imidazole, sulfonate or phophate, and SE2 is a polyacrylate.

C9.5.22: a CMU, where SE1 is a nanotube, L1 and/or L2 comprises a halogen, nitro group, amine, thiol, alcohol, ester, amide, carboxylic acid, phenol, indole, imidazole, sulfonate or phophate, and SE2 is a polyolefine.

C9.6.1: a CMU, where SE1 is a nanotube, L1 and/or L2 comprises an C1-C10 alkane, and.

C9.6.2: a CMU, where SE1 is a nanotube, L1 and/or L2 comprises an C1-C10 alkane, and SE2 is copolymer.

C9.6.3: a CMU, where SE1 is a nanotube, L1 and/or L2 comprises an C1-C10 alkane, and SE2 is a high density polyethylene.

C9.6.4: a CMU, where SE1 is a nanotube, L1 and/or L2 comprises an C1-C10 alkane, and SE2 is a linear low density polyethylene.

C9.6.5: a CMU, where SE1 is a nanotube, L1 and/or L2 comprises an C1-C10 alkane, and SE2 is a low density polyethylene.

C9.6.6: a CMU, where SE1 is a nanotube, L1 and/or L2 comprises an C1-C10 alkane, and SE2 is a nylon.

C9.6.7: a CMU, where SE1 is a nanotube, L1 and/or L2 comprises an C1-C10 alkane, and SE2 is a polyamide.

C9.6.8: a CMU, where SE1 is a nanotube, L1 and/or L2 comprises an C1-C10 alkane, and SE2 is a polycarbonate.

C9.6.9: a CMU, where SE1 is a nanotube, L1 and/or L2 comprises an C1-C10 alkane, and SE2 is a polyethylene.

C9.6.10: a CMU, where SE1 is a nanotube, L1 and/or L2 comprises an C1-C10 alkane, and SE2 is a polymer.

C9.6.11: a CMU, where SE1 is a nanotube, L1 and/or L2 comprises an C1-C10 alkane, and SE2 is a polypropylene.

C9.6.12: a CMU, where SE1 is a nanotube, L1 and/or L2 comprises an C1-C10 alkane, and SE2 is a polystyrene.

C9.6.13: a CMU, where SE1 is a nanotube, L1 and/or L2 comprises an C1-C10 alkane, and SE2 is an epoxy-based polymer.

C9.6.14: a CMU, where SE1 is a nanotube, L1 and/or L2 comprises an C1-C10 alkane, and SE2 is a polyethylene terephtalate.

C9.6.15: a CMU, where SE1 is a nanotube, L1 and/or L2 comprises an C1-C10 alkane, and SE2 is a polyvinylchloride.

C9.6.16: a CMU, where SE1 is a nanotube, L1 and/or L2 comprises an C1-C10 alkane, and SE2 is a MWCNT.

C9.6.17: a CMU, where SE1 is a nanotube, L1 and/or L2 comprises an C1-C10 alkane, and SE2 is a SWCNT.

C9.6.18: a CMU, where SE1 is a nanotube, L1 and/or L2 comprises an C1-C10 alkane, and SE2 is a GS.

C9.6.19: a CMU, where SE1 is a nanotube, L1 and/or L2 comprises an C1-C10 alkane, and SE2 is a nanotube.

C9.6.20: a CMU, where SE1 is a nanotube, L1 and/or L2 comprises an C1-C10 alkane, and SE2 is a BNNT.

C9.6.21: a CMU, where SE1 is a nanotube, L1 and/or L2 comprises an C1-C10 alkane, and SE2 is a polyacrylate.

C9.6.22: a CMU, where SE1 is a nanotube, L1 and/or L2 comprises an C1-C10 alkane, and SE2 is a polyolefine.

C9.7.1: a CMU, where SE1 is a nanotube, L1 and/or L2 comprises a detergent comprising a C4-C25 alkane and a polar end group, and.

C9.7.2: a CMU, where SE1 is a nanotube, L1 and/or L2 comprises a detergent comprising a C4-C25 alkane and a polar end group, and SE2 is copolymer.

C9.7.3: a CMU, where SE1 is a nanotube, L1 and/or L2 comprises a detergent comprising a C4-C25 alkane and a polar end group, and SE2 is a high density polyethylene.

C9.7.4: a CMU, where SE1 is a nanotube, L1 and/or L2 comprises a detergent comprising a C4-C25 alkane and a polar end group, and SE2 is a linear low density polyethylene.

C9.7.5: a CMU, where SE1 is a nanotube, L1 and/or L2 comprises a detergent comprising a C4-C25 alkane and a polar end group, and SE2 is a low density polyethylene.

C9.7.6: a CMU, where SE1 is a nanotube, L1 and/or L2 comprises a detergent comprising a C4-C25 alkane and a polar end group, and SE2 is a nylon.

C9.7.7: a CMU, where SE1 is a nanotube, L1 and/or L2 comprises a detergent comprising a C4-C25 alkane and a polar end group, and SE2 is a polyamide.

C9.7.8: a CMU, where SE1 is a nanotube, L1 and/or L2 comprises a detergent comprising a C4-C25 alkane and a polar end group, and SE2 is a polycarbonate.

C9.7.9: a CMU, where SE1 is a nanotube, L1 and/or L2 comprises a detergent comprising a C4-C25 alkane and a polar end group, and SE2 is a polyethylene.

C9.7.10: a CMU, where SE1 is a nanotube, L1 and/or L2 comprises a detergent comprising a C4-C25 alkane and a polar end group, and SE2 is a polymer.

C9.7.11: a CMU, where SE1 is a nanotube, L1 and/or L2 comprises a detergent comprising a C4-C25 alkane and a polar end group, and SE2 is a polypropylene.

C9.7.12: a CMU, where SE1 is a nanotube, L1 and/or L2 comprises a detergent comprising a C4-C25 alkane and a polar end group, and SE2 is a polystyrene.

C9.7.13: a CMU, where SE1 is a nanotube, L1 and/or L2 comprises a detergent comprising a C4-C25 alkane and a polar end group, and SE2 is an epoxy-based polymer.

C9.7.14: a CMU, where SE1 is a nanotube, L1 and/or L2 comprises a detergent comprising a C4-C25 alkane and a polar end group, and SE2 is a polyethylene terephtalate.

C9.7.15: a CMU, where SE1 is a nanotube, L1 and/or L2 comprises a detergent comprising a C4-C25 alkane and a polar end group, and SE2 is a polyvinylchloride.

C9.7.16: a CMU, where SE1 is a nanotube, L1 and/or L2 comprises a detergent comprising a C4-C25 alkane and a polar end group, and SE2 is a MWCNT.

C9.7.17: a CMU, where SE1 is a nanotube, L1 and/or L2 comprises a detergent comprising a C4-C25 alkane and a polar end group, and SE2 is a SWCNT.

C9.7.18: a CMU, where SE1 is a nanotube, L1 and/or L2 comprises a detergent comprising a C4-C25 alkane and a polar end group, and SE2 is a GS.

C9.7.19: a CMU, where SE1 is a nanotube, L1 and/or L2 comprises a detergent comprising a C4-C25 alkane and a polar end group, and SE2 is a nanotube.

C9.7.20: a CMU, where SE1 is a nanotube, L1 and/or L2 comprises a detergent comprising a C4-C25 alkane and a polar end group, and SE2 is a BNNT.

C9.7.21: a CMU, where SE1 is a nanotube, L1 and/or L2 comprises a detergent comprising a C4-C25 alkane and a polar end group, and SE2 is a polyacrylate.

C9.7.22: a CMU, where SE1 is a nanotube, L1 and/or L2 comprises a detergent comprising a C4-C25 alkane and a polar end group, and SE2 is a polyolefine.

C9.8.1: a CMU, where SE1 is a nanotube, L1 and/or L2 comprises a lactam, such as N-methyl-pyrrolidone and lactone, and.

C9.8.2: a CMU, where SE1 is a nanotube, L1 and/or L2 comprises a lactam, such as N-methyl-pyrrolidone and lactone, and SE2 is copolymer.

C9.8.3: a CMU, where SE1 is a nanotube, L1 and/or L2 comprises a lactam, such as N-methyl-pyrrolidone and lactone, and SE2 is a high density polyethylene.

C9.8.4: a CMU, where SE1 is a nanotube, L1 and/or L2 comprises a lactam, such as N-methyl-pyrrolidone and lactone, and SE2 is a linear low density polyethylene.

C9.8.5: a CMU, where SE1 is a nanotube, L1 and/or L2 comprises a lactam, such as N-methyl-pyrrolidone and lactone, and SE2 is a low density polyethylene.

C9.8.6: a CMU, where SE1 is a nanotube, L1 and/or L2 comprises a lactam, such as N-methyl-pyrrolidone and lactone, and SE2 is a nylon.

C9.8.7: a CMU, where SE1 is a nanotube, L1 and/or L2 comprises a lactam, such as N-methyl-pyrrolidone and lactone, and SE2 is a polyamide.

C9.8.8: a CMU, where SE1 is a nanotube, L1 and/or L2 comprises a lactam, such as N-methyl-pyrrolidone and lactone, and SE2 is a polycarbonate.

C9.8.9: a CMU, where SE1 is a nanotube, L1 and/or L2 comprises a lactam, such as N-methyl-pyrrolidone and lactone, and SE2 is a polyethylene.

C9.8.10: a CMU, where SE1 is a nanotube, L1 and/or L2 comprises a lactam, such as N-methyl-pyrrolidone and lactone, and SE2 is a polymer.

C9.8.11: a CMU, where SE1 is a nanotube, L1 and/or L2 comprises a lactam, such as N-methyl-pyrrolidone and lactone, and SE2 is a polypropylene.

C9.8.12: a CMU, where SE1 is a nanotube, L1 and/or L2 comprises a lactam, such as N-methyl-pyrrolidone and lactone, and SE2 is a polystyrene.

C9.8.13: a CMU, where SE1 is a nanotube, L1 and/or L2 comprises a lactam, such as N-methyl-pyrrolidone and lactone, and SE2 is an epoxy-based polymer.

C9.8.14: a CMU, where SE1 is a nanotube, L1 and/or L2 comprises a lactam, such as N-methyl-pyrrolidone and lactone, and SE2 is a polyethylene terephtalate.

C9.8.15: a CMU, where SE1 is a nanotube, L1 and/or L2 comprises a lactam, such as N-methyl-pyrrolidone and lactone, and SE2 is a polyvinylchloride.

C9.8.16: a CMU, where SE1 is a nanotube, L1 and/or L2 comprises a lactam, such as N-methyl-pyrrolidone and lactone, and SE2 is a MWCNT.

C9.8.17: a CMU, where SE1 is a nanotube, L1 and/or L2 comprises a lactam, such as N-methyl-pyrrolidone and lactone, and SE2 is a SWCNT.

C9.8.18: a CMU, where SE1 is a nanotube, L1 and/or L2 comprises a lactam, such as N-methyl-pyrrolidone and lactone, and SE2 is a GS.

C9.8.19: a CMU, where SE1 is a nanotube, L1 and/or L2 comprises a lactam, such as N-methyl-pyrrolidone and lactone, and SE2 is a nanotube.

C9.8.20: a CMU, where SE1 is a nanotube, L1 and/or L2 comprises a lactam, such as N-methyl-pyrrolidone and lactone, and SE2 is a BNNT.

C9.8.21: a CMU, where SE1 is a nanotube, L1 and/or L2 comprises a lactam, such as N-methyl-pyrrolidone and lactone, and SE2 is a polyacrylate.

C9.8.22: a CMU, where SE1 is a nanotube, L1 and/or L2 comprises a lactam, such as N-methyl-pyrrolidone and lactone, and SE2 is a polyolefine.

C9.9.1: a CMU, where SE1 is a nanotube, L1 and/or L2 comprises a amino acid residue such as phenylalanine, tyrosine, tryptophan, or histidine, and.

C9.9.2: a CMU, where SE1 is a nanotube, L1 and/or L2 comprises a amino acid residue such as phenylalanine, tyrosine, tryptophan, or histidine, and SE2 is copolymer.

C9.9.3: a CMU, where SE1 is a nanotube, L1 and/or L2 comprises a amino acid residue such as phenylalanine, tyrosine, tryptophan, or histidine, and SE2 is a high density polyethylene.

C9.9.4: a CMU, where SE1 is a nanotube, L1 and/or L2 comprises a amino acid residue such as phenylalanine, tyrosine, tryptophan, or histidine, and SE2 is a linear low density polyethylene.

C9.9.5: a CMU, where SE1 is a nanotube, L1 and/or L2 comprises a amino acid residue such as phenylalanine, tyrosine, tryptophan, or histidine, and SE2 is a low density polyethylene.

C9.9.6: a CMU, where SE1 is a nanotube, L1 and/or L2 comprises a amino acid residue such as phenylalanine, tyrosine, tryptophan, or histidine, and SE2 is a nylon.

C9.9.7: a CMU, where SE1 is a nanotube, L1 and/or L2 comprises a amino acid residue such as phenylalanine, tyrosine, tryptophan, or histidine, and SE2 is a polyamide.

C9.9.8: a CMU, where SE1 is a nanotube, L1 and/or L2 comprises a amino acid residue such as phenylalanine, tyrosine, tryptophan, or histidine, and SE2 is a polycarbonate.

C9.9.9: a CMU, where SE1 is a nanotube, L1 and/or L2 comprises a amino acid residue such as phenylalanine, tyrosine, tryptophan, or histidine, and SE2 is a polyethylene.

C9.9.10: a CMU, where SE1 is a nanotube, L1 and/or L2 comprises a amino acid residue such as phenylalanine, tyrosine, tryptophan, or histidine, and SE2 is a polymer.

C9.9.11: a CMU, where SE1 is a nanotube, L1 and/or L2 comprises a amino acid residue such as phenylalanine, tyrosine, tryptophan, or histidine, and SE2 is a polypropylene.

C9.9.12: a CMU, where SE1 is a nanotube, L1 and/or L2 comprises a amino acid residue such as phenylalanine, tyrosine, tryptophan, or histidine, and SE2 is a polystyrene.

C9.9.13: a CMU, where SE1 is a nanotube, L1 and/or L2 comprises a amino acid residue such as phenylalanine, tyrosine, tryptophan, or histidine, and SE2 is an epoxy-based polymer.

C9.9.14: a CMU, where SE1 is a nanotube, L1 and/or L2 comprises a amino acid residue such as phenylalanine, tyrosine, tryptophan, or histidine, and SE2 is a polyethylene terephtalate.

C9.9.15: a CMU, where SE1 is a nanotube, L1 and/or L2 comprises a amino acid residue such as phenylalanine, tyrosine, tryptophan, or histidine, and SE2 is a polyvinylchloride.

C9.9.16: a CMU, where SE1 is a nanotube, L1 and/or L2 comprises a amino acid residue such as phenylalanine, tyrosine, tryptophan, or histidine, and SE2 is a MWCNT.

C9.9.17: a CMU, where SE1 is a nanotube, L1 and/or L2 comprises a amino acid residue such as phenylalanine, tyrosine, tryptophan, or histidine, and SE2 is a SWCNT.

C9.9.18: a CMU, where SE1 is a nanotube, L1 and/or L2 comprises a amino acid residue such as phenylalanine, tyrosine, tryptophan, or histidine, and SE2 is a GS.

C9.9.19: a CMU, where SE1 is a nanotube, L1 and/or L2 comprises a amino acid residue such as phenylalanine, tyrosine, tryptophan, or histidine, and SE2 is a nanotube.

C9.9.20: a CMU, where SE1 is a nanotube, L1 and/or L2 comprises a amino acid residue such as phenylalanine, tyrosine, tryptophan, or histidine, and SE2 is a BNNT.

C9.9.21: a CMU, where SE1 is a nanotube, L1 and/or L2 comprises a amino acid residue such as phenylalanine, tyrosine, tryptophan, or histidine, and SE2 is a polyacrylate.

C9.9.22: a CMU, where SE1 is a nanotube, L1 and/or L2 comprises a amino acid residue such as phenylalanine, tyrosine, tryptophan, or histidine, and SE2 is a polyolefine.

C9.10.1: a CMU, where SE1 is a nanotube, L1 and/or L2 comprises a heteroaromatic system, including pyrole, thiophene, furane, pyrazole, imidazole, isoxazole, oxazole, isothiazole, thiazole, pyridine and perylene bisimides, and.

C9.10.2: a CMU, where SE1 is a nanotube, L1 and/or L2 comprises a heteroaromatic system, including pyrole, thiophene, furane, pyrazole, imidazole, isoxazole, oxazole, isothiazole, thiazole, pyridine and perylene bisimides, and SE2 is copolymer.

C9.10.3: a CMU, where SE1 is a nanotube, L1 and/or L2 comprises a heteroaromatic system, including pyrole, thiophene, furane, pyrazole, imidazole, isoxazole, oxazole, isothiazole, thiazole, pyridine and perylene bisimides, and SE2 is a high density polyethylene.

C9.10.4: a CMU, where SE1 is a nanotube, L1 and/or L2 comprises a heteroaromatic system, including pyrole, thiophene, furane, pyrazole, imidazole, isoxazole, oxazole, isothiazole, thiazole, pyridine and perylene bisimides, and SE2 is a linear low density polyethylene.

C9.10.5: a CMU, where SE1 is a nanotube, L1 and/or L2 comprises a heteroaromatic system, including pyrole, thiophene, furane, pyrazole, imidazole, isoxazole, oxazole, isothiazole, thiazole, pyridine and perylene bisimides, and SE2 is a low density polyethylene.

C9.10.6: a CMU, where SE1 is a nanotube, L1 and/or L2 comprises a heteroaromatic system, including pyrole, thiophene, furane, pyrazole, imidazole, isoxazole, oxazole, isothiazole, thiazole, pyridine and perylene bisimides, and SE2 is a nylon.

C9.10.7: a CMU, where SE1 is a nanotube, L1 and/or L2 comprises a heteroaromatic system, including pyrole, thiophene, furane, pyrazole, imidazole, isoxazole, oxazole, isothiazole, thiazole, pyridine and perylene bisimides, and SE2 is a polyamide.

C9.10.8: a CMU, where SE1 is a nanotube, L1 and/or L2 comprises a heteroaromatic system, including pyrole, thiophene, furane, pyrazole, imidazole, isoxazole, oxazole, isothiazole, thiazole, pyridine and perylene bisimides, and SE2 is a polycarbonate.

C9.10.9: a CMU, where SE1 is a nanotube, L1 and/or L2 comprises a heteroaromatic system, including pyrole, thiophene, furane, pyrazole, imidazole, isoxazole, oxazole, isothiazole, thiazole, pyridine and perylene bisimides, and SE2 is a polyethylene.

C9.10.10: a CMU, where SE1 is a nanotube, L1 and/or L2 comprises a heteroaromatic system, including pyrole, thiophene, furane, pyrazole, imidazole, isoxazole, oxazole, isothiazole, thiazole, pyridine and perylene bisimides, and SE2 is a polymer.

C9.10.11: a CMU, where SE1 is a nanotube, L1 and/or L2 comprises a heteroaromatic system, including pyrole, thiophene, furane, pyrazole, imidazole, isoxazole, oxazole, isothiazole, thiazole, pyridine and perylene bisimides, and SE2 is a polypropylene.

C9.10.12: a CMU, where SE1 is a nanotube, L1 and/or L2 comprises a heteroaromatic system, including pyrole, thiophene, furane, pyrazole, imidazole, isoxazole, oxazole, isothiazole, thiazole, pyridine and perylene bisimides, and SE2 is a polystyrene.

C9.10.13: a CMU, where SE1 is a nanotube, L1 and/or L2 comprises a heteroaromatic system, including pyrole, thiophene, furane, pyrazole, imidazole, isoxazole, oxazole, isothiazole, thiazole, pyridine and perylene bisimides, and SE2 is an epoxy-based polymer.

C9.10.14: a CMU, where SE1 is a nanotube, L1 and/or L2 comprises a heteroaromatic system, including pyrole, thiophene, furane, pyrazole, imidazole, isoxazole, oxazole, isothiazole, thiazole, pyridine and perylene bisimides, and SE2 is a polyethylene terephtalate.

C9.10.15: a CMU, where SE1 is a nanotube, L1 and/or L2 comprises a heteroaromatic system, including pyrole, thiophene, furane, pyrazole, imidazole, isoxazole, oxazole, isothiazole, thiazole, pyridine and perylene bisimides, and SE2 is a polyvinylchloride.

C9.10.16: a CMU, where SE1 is a nanotube, L1 and/or L2 comprises a heteroaromatic system, including pyrole, thiophene, furane, pyrazole, imidazole, isoxazole, oxazole, isothiazole, thiazole, pyridine and perylene bisimides, and SE2 is a MWCNT.

C9.10.17: a CMU, where SE1 is a nanotube, L1 and/or L2 comprises a heteroaromatic system, including pyrole, thiophene, furane, pyrazole, imidazole, isoxazole, oxazole, isothiazole, thiazole, pyridine and perylene bisimides, and SE2 is a SWCNT.

C9.10.18: a CMU, where SE1 is a nanotube, L1 and/or L2 comprises a heteroaromatic system, including pyrole, thiophene, furane, pyrazole, imidazole, isoxazole, oxazole, isothiazole, thiazole, pyridine and perylene bisimides, and SE2 is a GS.

C9.10.19: a CMU, where SE1 is a nanotube, L1 and/or L2 comprises a heteroaromatic system, including pyrole, thiophene, furane, pyrazole, imidazole, isoxazole, oxazole, isothiazole, thiazole, pyridine and perylene bisimides, and SE2 is a nanotube.

C9.10.20: a CMU, where SE1 is a nanotube, L1 and/or L2 comprises a heteroaromatic system, including pyrole, thiophene, furane, pyrazole, imidazole, isoxazole, oxazole, isothiazole, thiazole, pyridine and perylene bisimides, and SE2 is a BNNT.

C9.10.21: a CMU, where SE1 is a nanotube, L1 and/or L2 comprises a heteroaromatic system, including pyrole, thiophene, furane, pyrazole, imidazole, isoxazole, oxazole, isothiazole, thiazole, pyridine and perylene bisimides, and SE2 is a polyacrylate.

C9.10.22: a CMU, where SE1 is a nanotube, L1 and/or L2 comprises a heteroaromatic system, including pyrole, thiophene, furane, pyrazole, imidazole, isoxazole, oxazole, isothiazole, thiazole, pyridine and perylene bisimides, and SE2 is a polyolefine.

C9.11.1: a CMU, where SE1 is a nanotube, L1 and/or L2 comprises a fused ring system, composed of either aromatic, non-aromatic or anti-aromatic rings or combinations thereof, and.

C9.11.2: a CMU, where SE1 is a nanotube, L1 and/or L2 comprises a fused ring system, composed of either aromatic, non-aromatic or anti-aromatic rings or combinations thereof, and SE2 is copolymer.

C9.11.3: a CMU, where SE1 is a nanotube, L1 and/or L2 comprises a fused ring system, composed of either aromatic, non-aromatic or anti-aromatic rings or combinations thereof, and SE2 is a high density polyethylene.

C9.11.4: a CMU, where SE1 is a nanotube, L1 and/or L2 comprises a fused ring system, composed of either aromatic, non-aromatic or anti-aromatic rings or combinations thereof, and SE2 is a linear low density polyethylene.

C9.11.5: a CMU, where SE1 is a nanotube, L1 and/or L2 comprises a fused ring system, composed of either aromatic, non-aromatic or anti-aromatic rings or combinations thereof, and SE2 is a low density polyethylene.

C9.11.6: a CMU, where SE1 is a nanotube, L1 and/or L2 comprises a fused ring system, composed of either aromatic, non-aromatic or anti-aromatic rings or combinations thereof, and SE2 is a nylon.

C9.11.7: a CMU, where SE1 is a nanotube, L1 and/or L2 comprises a fused ring system, composed of either aromatic, non-aromatic or anti-aromatic rings or combinations thereof, and SE2 is a polyamide.

C9.11.8: a CMU, where SE1 is a nanotube, L1 and/or L2 comprises a fused ring system, composed of either aromatic, non-aromatic or anti-aromatic rings or combinations thereof, and SE2 is a polycarbonate.

C9.11.9: a CMU, where SE1 is a nanotube, L1 and/or L2 comprises a fused ring system, composed of either aromatic, non-aromatic or anti-aromatic rings or combinations thereof, and SE2 is a polyethylene.

C9.11.10: a CMU, where SE1 is a nanotube, L1 and/or L2 comprises a fused ring system, composed of either aromatic, non-aromatic or anti-aromatic rings or combinations thereof, and SE2 is a polymer.

C9.11.11: a CMU, where SE1 is a nanotube, L1 and/or L2 comprises a fused ring system, composed of either aromatic, non-aromatic or anti-aromatic rings or combinations thereof, and SE2 is a polypropylene.

C9.11.12: a CMU, where SE1 is a nanotube, L1 and/or L2 comprises a fused ring system, composed of either aromatic, non-aromatic or anti-aromatic rings or combinations thereof, and SE2 is a polystyrene.

C9.11.13: a CMU, where SE1 is a nanotube, L1 and/or L2 comprises a fused ring system, composed of either aromatic, non-aromatic or anti-aromatic rings or combinations thereof, and SE2 is an epoxy-based polymer.

C9.11.14: a CMU, where SE1 is a nanotube, L1 and/or L2 comprises a fused ring system, composed of either aromatic, non-aromatic or anti-aromatic rings or combinations thereof, and SE2 is a polyethylene terephtalate.

C9.11.15: a CMU, where SE1 is a nanotube, L1 and/or L2 comprises a fused ring system, composed of either aromatic, non-aromatic or anti-aromatic rings or combinations thereof, and SE2 is a polyvinylchloride.

C9.11.16: a CMU, where SE1 is a nanotube, L1 and/or L2 comprises a fused ring system, composed of either aromatic, non-aromatic or anti-aromatic rings or combinations thereof, and SE2 is a MWCNT.

C9.11.17: a CMU, where SE1 is a nanotube, L1 and/or L2 comprises a fused ring system, composed of either aromatic, non-aromatic or anti-aromatic rings or combinations thereof, and SE2 is a SWCNT.

C9.11.18: a CMU, where SE1 is a nanotube, L1 and/or L2 comprises a fused ring system, composed of either aromatic, non-aromatic or anti-aromatic rings or combinations thereof, and SE2 is a GS.

C9.11.19: a CMU, where SE1 is a nanotube, L1 and/or L2 comprises a fused ring system, composed of either aromatic, non-aromatic or anti-aromatic rings or combinations thereof, and SE2 is a nanotube.

C9.11.20: a CMU, where SE1 is a nanotube, L1 and/or L2 comprises a fused ring system, composed of either aromatic, non-aromatic or anti-aromatic rings or combinations thereof, and SE2 is a BNNT.

C9.11.21: a CMU, where SE1 is a nanotube, L1 and/or L2 comprises a fused ring system, composed of either aromatic, non-aromatic or anti-aromatic rings or combinations thereof, and SE2 is a polyacrylate.

C9.11.22: a CMU, where SE1 is a nanotube, L1 and/or L2 comprises a fused ring system, composed of either aromatic, non-aromatic or anti-aromatic rings or combinations thereof, and SE2 is a polyolefine.

C10.1.1: a CMU, where SE1 is a one-atom layer molecule, and.

C10.1.2: a CMU, where SE1 is a one-atom layer molecule, and SE2 is copolymer.

C10.1.3: a CMU, where SE1 is a one-atom layer molecule, and SE2 is a high density polyethylene.

C10.1.4: a CMU, where SE1 is a one-atom layer molecule, and SE2 is a linear low density polyethylene.

C10.1.5: a CMU, where SE1 is a one-atom layer molecule, and SE2 is a low density polyethylene.

C10.1.6: a CMU, where SE1 is a one-atom layer molecule, and SE2 is a nylon.

C10.1.7: a CMU, where SE1 is a one-atom layer molecule, and SE2 is a polyamide.

C10.1.8: a CMU, where SE1 is a one-atom layer molecule, and SE2 is a polycarbonate.

C10.1.9: a CMU, where SE1 is a one-atom layer molecule, and SE2 is a polyethylene.

C10.1.10: a CMU, where SE1 is a one-atom layer molecule, and SE2 is a polymer.

C10.1.11: a CMU, where SE1 is a one-atom layer molecule, and SE2 is a polypropylene.

C10.1.12: a CMU, where SE1 is a one-atom layer molecule, and SE2 is a polystyrene.

C10.1.13: a CMU, where SE1 is a one-atom layer molecule, and SE2 is an epoxy-based polymer.

C10.1.14: a CMU, where SE1 is a one-atom layer molecule, and SE2 is a polyethylene terephtalate.

C10.1.15: a CMU, where SE1 is a one-atom layer molecule, and SE2 is a polyvinylchloride.

C10.1.16: a CMU, where SE1 is a one-atom layer molecule, and SE2 is a MWCNT.

C10.1.17: a CMU, where SE1 is a one-atom layer molecule, and SE2 is a SWCNT.

C10.1.18: a CMU, where SE1 is a one-atom layer molecule, and SE2 is a GS.

C10.1.19: a CMU, where SE1 is a one-atom layer molecule, and SE2 is a nanotube.

C10.1.20: a CMU, where SE1 is a one-atom layer molecule, and SE2 is a BNNT.

C10.1.21: a CMU, where SE1 is a one-atom layer molecule, and SE2 is a polyacrylate.

C10.1.22: a CMU, where SE1 is a one-atom layer molecule, and SE2 is a polyolefine.

C10.2.1: a CMU, where SE1 is a one-atom layer molecule, L1 and/or L2 comprises a non-covalent ligand, and.

C10.2.2: a CMU, where SE1 is a one-atom layer molecule, L1 and/or L2 comprises a non-covalent ligand, and SE2 is copolymer.

C10.2.3: a CMU, where SE1 is a one-atom layer molecule, L1 and/or L2 comprises a non-covalent ligand, and SE2 is a high density polyethylene.

C10.2.4: a CMU, where SE1 is a one-atom layer molecule, L1 and/or L2 comprises a non-covalent ligand, and SE2 is a linear low density polyethylene.

C10.2.5: a CMU, where SE1 is a one-atom layer molecule, L1 and/or L2 comprises a non-covalent ligand, and SE2 is a low density polyethylene.

C10.2.6: a CMU, where SE1 is a one-atom layer molecule, L1 and/or L2 comprises a non-covalent ligand, and SE2 is a nylon.

C10.2.7: a CMU, where SE1 is a one-atom layer molecule, L1 and/or L2 comprises a non-covalent ligand, and SE2 is a polyamide.

C10.2.8: a CMU, where SE1 is a one-atom layer molecule, L1 and/or L2 comprises a non-covalent ligand, and SE2 is a polycarbonate.

C10.2.9: a CMU, where SE1 is a one-atom layer molecule, L1 and/or L2 comprises a non-covalent ligand, and SE2 is a polyethylene.

C10.2.10: a CMU, where SE1 is a one-atom layer molecule, L1 and/or L2 comprises a non-covalent ligand, and SE2 is a polymer.

C10.2.11: a CMU, where SE1 is a one-atom layer molecule, L1 and/or L2 comprises a non-covalent ligand, and SE2 is a polypropylene.

C10.2.12: a CMU, where SE1 is a one-atom layer molecule, L1 and/or L2 comprises a non-covalent ligand, and SE2 is a polystyrene.

C10.2.13: a CMU, where SE1 is a one-atom layer molecule, L1 and/or L2 comprises a non-covalent ligand, and SE2 is an epoxy-based polymer.

C10.2.14: a CMU, where SE1 is a one-atom layer molecule, L1 and/or L2 comprises a non-covalent ligand, and SE2 is a polyethylene terephtalate.

C10.2.15: a CMU, where SE1 is a one-atom layer molecule, L1 and/or L2 comprises a non-covalent ligand, and SE2 is a polyvinylchloride.

C10.2.16: a CMU, where SE1 is a one-atom layer molecule, L1 and/or L2 comprises a non-covalent ligand, and SE2 is a MWCNT.

C10.2.17: a CMU, where SE1 is a one-atom layer molecule, L1 and/or L2 comprises a non-covalent ligand, and SE2 is a SWCNT.

C10.2.18: a CMU, where SE1 is a one-atom layer molecule, L1 and/or L2 comprises a non-covalent ligand, and SE2 is a GS.

C10.2.19: a CMU, where SE1 is a one-atom layer molecule, L1 and/or L2 comprises a non-covalent ligand, and SE2 is a nanotube.

C10.2.20: a CMU, where SE1 is a one-atom layer molecule, L1 and/or L2 comprises a non-covalent ligand, and SE2 is a BNNT.

C10.2.21: a CMU, where SE1 is a one-atom layer molecule, L1 and/or L2 comprises a non-covalent ligand, and SE2 is a polyacrylate.

C10.2.22: a CMU, where SE1 is a one-atom layer molecule, L1 and/or L2 comprises a non-covalent ligand, and SE2 is a polyolefine.

C10.3.1: a CMU, where SE1 is a one-atom layer molecule, L1 and/or L2 comprises a amino-substituted hydrocarbon, and.

C10.3.2: a CMU, where SE1 is a one-atom layer molecule, L1 and/or L2 comprises a amino-substituted hydrocarbon, and SE2 is copolymer.

C10.3.3: a CMU, where SE1 is a one-atom layer molecule, L1 and/or L2 comprises a amino-substituted hydrocarbon, and SE2 is a high density polyethylene.

C10.3.4: a CMU, where SE1 is a one-atom layer molecule, L1 and/or L2 comprises a amino-substituted hydrocarbon, and SE2 is a linear low density polyethylene.

C10.3.5: a CMU, where SE1 is a one-atom layer molecule, L1 and/or L2 comprises a amino-substituted hydrocarbon, and SE2 is a low density polyethylene.

C10.3.6: a CMU, where SE1 is a one-atom layer molecule, L1 and/or L2 comprises a amino-substituted hydrocarbon, and SE2 is a nylon.

C10.3.7: a CMU, where SE1 is a one-atom layer molecule, L1 and/or L2 comprises a amino-substituted hydrocarbon, and SE2 is a polyamide.

C10.3.8: a CMU, where SE1 is a one-atom layer molecule, L1 and/or L2 comprises a amino-substituted hydrocarbon, and SE2 is a polycarbonate.

C10.3.9: a CMU, where SE1 is a one-atom layer molecule, L1 and/or L2 comprises a amino-substituted hydrocarbon, and SE2 is a polyethylene.

C10.3.10: a CMU, where SE1 is a one-atom layer molecule, L1 and/or L2 comprises a amino-substituted hydrocarbon, and SE2 is a polymer.

C10.3.11: a CMU, where SE1 is a one-atom layer molecule, L1 and/or L2 comprises a amino-substituted hydrocarbon, and SE2 is a polypropylene.

C10.3.12: a CMU, where SE1 is a one-atom layer molecule, L1 and/or L2 comprises a amino-substituted hydrocarbon, and SE2 is a polystyrene.

C10.3.13: a CMU, where SE1 is a one-atom layer molecule, L1 and/or L2 comprises a amino-substituted hydrocarbon, and SE2 is an epoxy-based polymer.

C10.3.14: a CMU, where SE1 is a one-atom layer molecule, L1 and/or L2 comprises a amino-substituted hydrocarbon, and SE2 is a polyethylene terephtalate.

C10.3.15: a CMU, where SE1 is a one-atom layer molecule, L1 and/or L2 comprises a amino-substituted hydrocarbon, and SE2 is a polyvinylchloride.

C10.3.16: a CMU, where SE1 is a one-atom layer molecule, L1 and/or L2 comprises a amino-substituted hydrocarbon, and SE2 is a MWCNT.

C10.3.17: a CMU, where SE1 is a one-atom layer molecule, L1 and/or L2 comprises a amino-substituted hydrocarbon, and SE2 is a SWCNT.

C10.3.18: a CMU, where SE1 is a one-atom layer molecule, L1 and/or L2 comprises a amino-substituted hydrocarbon, and SE2 is a GS.

C10.3.19: a CMU, where SE1 is a one-atom layer molecule, L1 and/or L2 comprises a amino-substituted hydrocarbon, and SE2 is a nanotube.

C10.3.20: a CMU, where SE1 is a one-atom layer molecule, L1 and/or L2 comprises a amino-substituted hydrocarbon, and SE2 is a BNNT.

C10.3.21: a CMU, where SE1 is a one-atom layer molecule, L1 and/or L2 comprises a amino-substituted hydrocarbon, and SE2 is a polyacrylate.

C10.3.22: a CMU, where SE1 is a one-atom layer molecule, L1 and/or L2 comprises a amino-substituted hydrocarbon, and SE2 is a polyolefine.

C10.4.1: a CMU, where SE1 is a one-atom layer molecule, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and.

C10.4.2: a CMU, where SE1 is a one-atom layer molecule, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and SE2 is copolymer.

C10.4.3: a CMU, where SE1 is a one-atom layer molecule, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and SE2 is a high density polyethylene.

C10.4.4: a CMU, where SE1 is a one-atom layer molecule, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and SE2 is a linear low density polyethylene.

C10.4.5: a CMU, where SE1 is a one-atom layer molecule, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and SE2 is a low density polyethylene.

C10.4.6: a CMU, where SE1 is a one-atom layer molecule, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and SE2 is a nylon.

C10.4.7: a CMU, where SE1 is a one-atom layer molecule, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and SE2 is a polyamide.

C10.4.8: a CMU, where SE1 is a one-atom layer molecule, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and SE2 is a polycarbonate.

C10.4.9: a CMU, where SE1 is a one-atom layer molecule, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and SE2 is a polyethylene.

C10.4.10: a CMU, where SE1 is a one-atom layer molecule, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and SE2 is a polymer.

C10.4.11: a CMU, where SE1 is a one-atom layer molecule, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and SE2 is a polypropylene.

C10.4.12: a CMU, where SE1 is a one-atom layer molecule, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and SE2 is a polystyrene.

C10.4.13: a CMU, where SE1 is a one-atom layer molecule, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and SE2 is an epoxy-based polymer.

C10.4.14: a CMU, where SE1 is a one-atom layer molecule, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and SE2 is a polyethylene terephtalate.

C10.4.15: a CMU, where SE1 is a one-atom layer molecule, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and SE2 is a polyvinylchloride.

C10.4.16: a CMU, where SE1 is a one-atom layer molecule, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and SE2 is a MWCNT.

C10.4.17: a CMU, where SE1 is a one-atom layer molecule, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and SE2 is a SWCNT.

C10.4.18: a CMU, where SE1 is a one-atom layer molecule, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and SE2 is a GS.

C10.4.19: a CMU, where SE1 is a one-atom layer molecule, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and SE2 is a nanotube.

C10.4.20: a CMU, where SE1 is a one-atom layer molecule, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and SE2 is a BNNT.

C10.4.21: a CMU, where SE1 is a one-atom layer molecule, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and SE2 is a polyacrylate.

C10.4.22: a CMU, where SE1 is a one-atom layer molecule, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and SE2 is a polyolefine.

C10.5.1: a CMU, where SE1 is a one-atom layer molecule, L1 and/or L2 comprises a halogen, nitro group, amine, thiol, alcohol, ester, amide, carboxylic acid, phenol, indole, imidazole, sulfonate or phophate, and.

C10.5.2: a CMU, where SE1 is a one-atom layer molecule, L1 and/or L2 comprises a halogen, nitro group, amine, thiol, alcohol, ester, amide, carboxylic acid, phenol, indole, imidazole, sulfonate or phophate, and SE2 is copolymer.

C10.5.3: a CMU, where SE1 is a one-atom layer molecule, L1 and/or L2 comprises a halogen, nitro group, amine, thiol, alcohol, ester, amide, carboxylic acid, phenol, indole, imidazole, sulfonate or phophate, and SE2 is a high density polyethylene.

C10.5.4: a CMU, where SE1 is a one-atom layer molecule, L1 and/or L2 comprises a halogen, nitro group, amine, thiol, alcohol, ester, amide, carboxylic acid, phenol, indole, imidazole, sulfonate or phophate, and SE2 is a linear low density polyethylene.

C10.5.5: a CMU, where SE1 is a one-atom layer molecule, L1 and/or L2 comprises a halogen, nitro group, amine, thiol, alcohol, ester, amide, carboxylic acid, phenol, indole, imidazole, sulfonate or phophate, and SE2 is a low density polyethylene.

C10.5.6: a CMU, where SE1 is a one-atom layer molecule, L1 and/or L2 comprises a halogen, nitro group, amine, thiol, alcohol, ester, amide, carboxylic acid, phenol, indole, imidazole, sulfonate or phophate, and SE2 is a nylon.

C10.5.7: a CMU, where SE1 is a one-atom layer molecule, L1 and/or L2 comprises a halogen, nitro group, amine, thiol, alcohol, ester, amide, carboxylic acid, phenol, indole, imidazole, sulfonate or phophate, and SE2 is a polyamide.

C10.5.8: a CMU, where SE1 is a one-atom layer molecule, L1 and/or L2 comprises a halogen, nitro group, amine, thiol, alcohol, ester, amide, carboxylic acid, phenol, indole, imidazole, sulfonate or phophate, and SE2 is a polycarbonate.

C10.5.9: a CMU, where SE1 is a one-atom layer molecule, L1 and/or L2 comprises a halogen, nitro group, amine, thiol, alcohol, ester, amide, carboxylic acid, phenol, indole, imidazole, sulfonate or phophate, and SE2 is a polyethylene.

C10.5.10: a CMU, where SE1 is a one-atom layer molecule, L1 and/or L2 comprises a halogen, nitro group, amine, thiol, alcohol, ester, amide, carboxylic acid, phenol, indole, imidazole, sulfonate or phophate, and SE2 is a polymer.

C10.5.11: a CMU, where SE1 is a one-atom layer molecule, L1 and/or L2 comprises a halogen, nitro group, amine, thiol, alcohol, ester, amide, carboxylic acid, phenol, indole, imidazole, sulfonate or phophate, and SE2 is a polypropylene.

C10.5.12: a CMU, where SE1 is a one-atom layer molecule, L1 and/or L2 comprises a halogen, nitro group, amine, thiol, alcohol, ester, amide, carboxylic acid, phenol, indole, imidazole, sulfonate or phophate, and SE2 is a polystyrene.

C10.5.13: a CMU, where SE1 is a one-atom layer molecule, L1 and/or L2 comprises a halogen, nitro group, amine, thiol, alcohol, ester, amide, carboxylic acid, phenol, indole, imidazole, sulfonate or phophate, and SE2 is an epoxy-based polymer.

C10.5.14: a CMU, where SE1 is a one-atom layer molecule, L1 and/or L2 comprises a halogen, nitro group, amine, thiol, alcohol, ester, amide, carboxylic acid, phenol, indole, imidazole, sulfonate or phophate, and SE2 is a polyethylene terephtalate.

C10.5.15: a CMU, where SE1 is a one-atom layer molecule, L1 and/or L2 comprises a halogen, nitro group, amine, thiol, alcohol, ester, amide, carboxylic acid, phenol, indole, imidazole, sulfonate or phophate, and SE2 is a polyvinylchloride.

C10.5.16: a CMU, where SE1 is a one-atom layer molecule, L1 and/or L2 comprises a halogen, nitro group, amine, thiol, alcohol, ester, amide, carboxylic acid, phenol, indole, imidazole, sulfonate or phophate, and SE2 is a MWCNT.

C10.5.17: a CMU, where SE1 is a one-atom layer molecule, L1 and/or L2 comprises a halogen, nitro group, amine, thiol, alcohol, ester, amide, carboxylic acid, phenol, indole, imidazole, sulfonate or phophate, and SE2 is a SWCNT.

C10.5.18: a CMU, where SE1 is a one-atom layer molecule, L1 and/or L2 comprises a halogen, nitro group, amine, thiol, alcohol, ester, amide, carboxylic acid, phenol, indole, imidazole, sulfonate or phophate, and SE2 is a GS.

C10.5.19: a CMU, where SE1 is a one-atom layer molecule, L1 and/or L2 comprises a halogen, nitro group, amine, thiol, alcohol, ester, amide, carboxylic acid, phenol, indole, imidazole, sulfonate or phophate, and SE2 is a nanotube.

C10.5.20: a CMU, where SE1 is a one-atom layer molecule, L1 and/or L2 comprises a halogen, nitro group, amine, thiol, alcohol, ester, amide, carboxylic acid, phenol, indole, imidazole, sulfonate or phophate, and SE2 is a BNNT.

C10.5.21: a CMU, where SE1 is a one-atom layer molecule, L1 and/or L2 comprises a halogen, nitro group, amine, thiol, alcohol, ester, amide, carboxylic acid, phenol, indole, imidazole, sulfonate or phophate, and SE2 is a polyacrylate.

C10.5.22: a CMU, where SE1 is a one-atom layer molecule, L1 and/or L2 comprises a halogen, nitro group, amine, thiol, alcohol, ester, amide, carboxylic acid, phenol, indole, imidazole, sulfonate or phophate, and SE2 is a polyolefine.

C10.6.1: a CMU, where SE1 is a one-atom layer molecule, L1 and/or L2 comprises an C1-C10 alkane, and.

C10.6.2: a CMU, where SE1 is a one-atom layer molecule, L1 and/or L2 comprises an C1-C10 alkane, and SE2 is copolymer.

C10.6.3: a CMU, where SE1 is a one-atom layer molecule, L1 and/or L2 comprises an C1-C10 alkane, and SE2 is a high density polyethylene.

C10.6.4: a CMU, where SE1 is a one-atom layer molecule, L1 and/or L2 comprises an C1-C10 alkane, and SE2 is a linear low density polyethylene.

C10.6.5: a CMU, where SE1 is a one-atom layer molecule, L1 and/or L2 comprises an C1-C10 alkane, and SE2 is a low density polyethylene.

C10.6.6: a CMU, where SE1 is a one-atom layer molecule, L1 and/or L2 comprises an C1-C10 alkane, and SE2 is a nylon.

C10.6.7: a CMU, where SE1 is a one-atom layer molecule, L1 and/or L2 comprises an C1-C10 alkane, and SE2 is a polyamide.

C10.6.8: a CMU, where SE1 is a one-atom layer molecule, L1 and/or L2 comprises an C1-C10 alkane, and SE2 is a polycarbonate.

C10.6.9: a CMU, where SE1 is a one-atom layer molecule, L1 and/or L2 comprises an C1-C10 alkane, and SE2 is a polyethylene.

C10.6.10: a CMU, where SE1 is a one-atom layer molecule, L1 and/or L2 comprises an C1-C10 alkane, and SE2 is a polymer.

C10.6.11: a CMU, where SE1 is a one-atom layer molecule, L1 and/or L2 comprises an C1-C10 alkane, and SE2 is a polypropylene.

C10.6.12: a CMU, where SE1 is a one-atom layer molecule, L1 and/or L2 comprises an C1-C10 alkane, and SE2 is a polystyrene.

C10.6.13: a CMU, where SE1 is a one-atom layer molecule, L1 and/or L2 comprises an C1-C10 alkane, and SE2 is an epoxy-based polymer.

C10.6.14: a CMU, where SE1 is a one-atom layer molecule, L1 and/or L2 comprises an C1-C10 alkane, and SE2 is a polyethylene terephtalate.

C10.6.15: a CMU, where SE1 is a one-atom layer molecule, L1 and/or L2 comprises an C1-C10 alkane, and SE2 is a polyvinylchloride.

C10.6.16: a CMU, where SE1 is a one-atom layer molecule, L1 and/or L2 comprises an C1-C10 alkane, and SE2 is a MWCNT.

C10.6.17: a CMU, where SE1 is a one-atom layer molecule, L1 and/or L2 comprises an C1-C10 alkane, and SE2 is a SWCNT.

C10.6.18: a CMU, where SE1 is a one-atom layer molecule, L1 and/or L2 comprises an C1-C10 alkane, and SE2 is a GS.

C10.6.19: a CMU, where SE1 is a one-atom layer molecule, L1 and/or L2 comprises an C1-C10 alkane, and SE2 is a nanotube.

C10.6.20: a CMU, where SE1 is a one-atom layer molecule, L1 and/or L2 comprises an C1-C10 alkane, and SE2 is a BNNT.

C10.6.21: a CMU, where SE1 is a one-atom layer molecule, L1 and/or L2 comprises an C1-C10 alkane, and SE2 is a polyacrylate.

C10.6.22: a CMU, where SE1 is a one-atom layer molecule, L1 and/or L2 comprises an C1-C10 alkane, and SE2 is a polyolefine.

C10.7.1: a CMU, where SE1 is a one-atom layer molecule, L1 and/or L2 comprises a detergent comprising a C4-C25 alkane and a polar end group, and.

C10.7.2: a CMU, where SE1 is a one-atom layer molecule, L1 and/or L2 comprises a detergent comprising a C4-C25 alkane and a polar end group, and SE2 is copolymer.

C10.7.3: a CMU, where SE1 is a one-atom layer molecule, L1 and/or L2 comprises a detergent comprising a C4-C25 alkane and a polar end group, and SE2 is a high density polyethylene.

C10.7.4: a CMU, where SE1 is a one-atom layer molecule, L1 and/or L2 comprises a detergent comprising a C4-C25 alkane and a polar end group, and SE2 is a linear low density polyethylene.

C10.7.5: a CMU, where SE1 is a one-atom layer molecule, L1 and/or L2 comprises a detergent comprising a C4-C25 alkane and a polar end group, and SE2 is a low density polyethylene.

C10.7.6: a CMU, where SE1 is a one-atom layer molecule, L1 and/or L2 comprises a detergent comprising a C4-C25 alkane and a polar end group, and SE2 is a nylon.

C10.7.7: a CMU, where SE1 is a one-atom layer molecule, L1 and/or L2 comprises a detergent comprising a C4-C25 alkane and a polar end group, and SE2 is a polyamide.

C10.7.8: a CMU, where SE1 is a one-atom layer molecule, L1 and/or L2 comprises a detergent comprising a C4-C25 alkane and a polar end group, and SE2 is a polycarbonate.

C10.7.9: a CMU, where SE1 is a one-atom layer molecule, L1 and/or L2 comprises a detergent comprising a C4-C25 alkane and a polar end group, and SE2 is a polyethylene.

C10.7.10: a CMU, where SE1 is a one-atom layer molecule, L1 and/or L2 comprises a detergent comprising a C4-C25 alkane and a polar end group, and SE2 is a polymer.

C10.7.11: a CMU, where SE1 is a one-atom layer molecule, L1 and/or L2 comprises a detergent comprising a C4-C25 alkane and a polar end group, and SE2 is a polypropylene.

C10.7.12: a CMU, where SE1 is a one-atom layer molecule, L1 and/or L2 comprises a detergent comprising a C4-C25 alkane and a polar end group, and SE2 is a polystyrene.

C10.7.13: a CMU, where SE1 is a one-atom layer molecule, L1 and/or L2 comprises a detergent comprising a C4-C25 alkane and a polar end group, and SE2 is an epoxy-based polymer.

C10.7.14: a CMU, where SE1 is a one-atom layer molecule, L1 and/or L2 comprises a detergent comprising a C4-C25 alkane and a polar end group, and SE2 is a polyethylene terephtalate.

C10.7.15: a CMU, where SE1 is a one-atom layer molecule, L1 and/or L2 comprises a detergent comprising a C4-C25 alkane and a polar end group, and SE2 is a polyvinylchloride.

C10.7.16: a CMU, where SE1 is a one-atom layer molecule, L1 and/or L2 comprises a detergent comprising a C4-C25 alkane and a polar end group, and SE2 is a MWCNT.

C10.7.17: a CMU, where SE1 is a one-atom layer molecule, L1 and/or L2 comprises a detergent comprising a C4-C25 alkane and a polar end group, and SE2 is a SWCNT.

C10.7.18: a CMU, where SE1 is a one-atom layer molecule, L1 and/or L2 comprises a detergent comprising a C4-C25 alkane and a polar end group, and SE2 is a GS.

C10.7.19: a CMU, where SE1 is a one-atom layer molecule, L1 and/or L2 comprises a detergent comprising a C4-C25 alkane and a polar end group, and SE2 is a nanotube.

C10.7.20: a CMU, where SE1 is a one-atom layer molecule, L1 and/or L2 comprises a detergent comprising a C4-C25 alkane and a polar end group, and SE2 is a BNNT.

C10.7.21: a CMU, where SE1 is a one-atom layer molecule, L1 and/or L2 comprises a detergent comprising a C4-C25 alkane and a polar end group, and SE2 is a polyacrylate.

C10.7.22: a CMU, where SE1 is a one-atom layer molecule, L1 and/or L2 comprises a detergent comprising a C4-C25 alkane and a polar end group, and SE2 is a polyolefine.

C10.8.1: a CMU, where SE1 is a one-atom layer molecule, L1 and/or L2 comprises a lactam, such as N-methylpyrrolidone and lactone, and.

C10.8.2: a CMU, where SE1 is a one-atom layer molecule, L1 and/or L2 comprises a lactam, such as N-methylpyrrolidone and lactone, and SE2 is copolymer.

C10.8.3: a CMU, where SE1 is a one-atom layer molecule, L1 and/or L2 comprises a lactam, such as N-methylpyrrolidone and lactone, and SE2 is a high density polyethylene.

C10.8.4: a CMU, where SE1 is a one-atom layer molecule, L1 and/or L2 comprises a lactam, such as N-methylpyrrolidone and lactone, and SE2 is a linear low density polyethylene.

C10.8.5: a CMU, where SE1 is a one-atom layer molecule, L1 and/or L2 comprises a lactam, such as N-methylpyrrolidone and lactone, and SE2 is a low density polyethylene.

C10.8.6: a CMU, where SE1 is a one-atom layer molecule, L1 and/or L2 comprises a lactam, such as N-methylpyrrolidone and lactone, and SE2 is a nylon.

C10.8.7: a CMU, where SE1 is a one-atom layer molecule, L1 and/or L2 comprises a lactam, such as N-methylpyrrolidone and lactone, and SE2 is a polyamide.

C10.8.8: a CMU, where SE1 is a one-atom layer molecule, L1 and/or L2 comprises a lactam, such as N-methylpyrrolidone and lactone, and SE2 is a polycarbonate.

C10.8.9: a CMU, where SE1 is a one-atom layer molecule, L1 and/or L2 comprises a lactam, such as N-methylpyrrolidone and lactone, and SE2 is a polyethylene.

C10.8.10: a CMU, where SE1 is a one-atom layer molecule, L1 and/or L2 comprises a lactam, such as N-methylpyrrolidone and lactone, and SE2 is a polymer.

C10.8.11: a CMU, where SE1 is a one-atom layer molecule, L1 and/or L2 comprises a lactam, such as N-methylpyrrolidone and lactone, and SE2 is a polypropylene.

C10.8.12: a CMU, where SE1 is a one-atom layer molecule, L1 and/or L2 comprises a lactam, such as N-methylpyrrolidone and lactone, and SE2 is a polystyrene.

C10.8.13: a CMU, where SE1 is a one-atom layer molecule, L1 and/or L2 comprises a lactam, such as N-methylpyrrolidone and lactone, and SE2 is an epoxy-based polymer.

C10.8.14: a CMU, where SE1 is a one-atom layer molecule, L1 and/or L2 comprises a lactam, such as N-methylpyrrolidone and lactone, and SE2 is a polyethylene terephtalate.

C10.8.15: a CMU, where SE1 is a one-atom layer molecule, L1 and/or L2 comprises a lactam, such as N-methylpyrrolidone and lactone, and SE2 is a polyvinylchloride.

C10.8.16: a CMU, where SE1 is a one-atom layer molecule, L1 and/or L2 comprises a lactam, such as N-methylpyrrolidone and lactone, and SE2 is a MWCNT.

C10.8.17: a CMU, where SE1 is a one-atom layer molecule, L1 and/or L2 comprises a lactam, such as N-methylpyrrolidone and lactone, and SE2 is a SWCNT.

C10.8.18: a CMU, where SE1 is a one-atom layer molecule, L1 and/or L2 comprises a lactam, such as N-methylpyrrolidone and lactone, and SE2 is a GS.

C10.8.19: a CMU, where SE1 is a one-atom layer molecule, L1 and/or L2 comprises a lactam, such as N-methylpyrrolidone and lactone, and SE2 is a nanotube.

C10.8.20: a CMU, where SE1 is a one-atom layer molecule, L1 and/or L2 comprises a lactam, such as N-methylpyrrolidone and lactone, and SE2 is a BNNT.

C10.8.21: a CMU, where SE1 is a one-atom layer molecule, L1 and/or L2 comprises a lactam, such as N-methylpyrrolidone and lactone, and SE2 is a polyacrylate.

C10.8.22: a CMU, where SE1 is a one-atom layer molecule, L1 and/or L2 comprises a lactam, such as N-methylpyrrolidone and lactone, and SE2 is a polyolefine.

C10.9.1: a CMU, where SE1 is a one-atom layer molecule, L1 and/or L2 comprises a amino acid residue such as phenylalanine, tyrosine, tryptophan, or histidine, and.

C10.9.2: a CMU, where SE1 is a one-atom layer molecule, L1 and/or L2 comprises a amino acid residue such as phenylalanine, tyrosine, tryptophan, or histidine, and SE2 is copolymer.

C10.9.3: a CMU, where SE1 is a one-atom layer molecule, L1 and/or L2 comprises a amino acid residue such as phenylalanine, tyrosine, tryptophan, or histidine, and SE2 is a high density polyethylene.

C10.9.4: a CMU, where SE1 is a one-atom layer molecule, L1 and/or L2 comprises a amino acid residue such as phenylalanine, tyrosine, tryptophan, or histidine, and SE2 is a linear low density polyethylene.

C10.9.5: a CMU, where SE1 is a one-atom layer molecule, L1 and/or L2 comprises a amino acid residue such as phenylalanine, tyrosine, tryptophan, or histidine, and SE2 is a low density polyethylene.

C10.9.6: a CMU, where SE1 is a one-atom layer molecule, L1 and/or L2 comprises a amino acid residue such as phenylalanine, tyrosine, tryptophan, or histidine, and SE2 is a nylon.

C10.9.7: a CMU, where SE1 is a one-atom layer molecule, L1 and/or L2 comprises a amino acid residue such as phenylalanine, tyrosine, tryptophan, or histidine, and SE2 is a polyamide.

C10.9.8: a CMU, where SE1 is a one-atom layer molecule, L1 and/or L2 comprises a amino acid residue such as phenylalanine, tyrosine, tryptophan, or histidine, and SE2 is a polycarbonate.

C10.9.9: a CMU, where SE1 is a one-atom layer molecule, L1 and/or L2 comprises a amino acid residue such as phenylalanine, tyrosine, tryptophan, or histidine, and SE2 is a polyethylene.

C10.9.10: a CMU, where SE1 is a one-atom layer molecule, L1 and/or L2 comprises a amino acid residue such as phenylalanine, tyrosine, tryptophan, or histidine, and SE2 is a polymer.

C10.9.11: a CMU, where SE1 is a one-atom layer molecule, L1 and/or L2 comprises a amino acid residue such as phenylalanine, tyrosine, tryptophan, or histidine, and SE2 is a polypropylene.

C10.9.12: a CMU, where SE1 is a one-atom layer molecule, L1 and/or L2 comprises a amino acid residue such as phenylalanine, tyrosine, tryptophan, or histidine, and SE2 is a polystyrene.

C10.9.13: a CMU, where SE1 is a one-atom layer molecule, L1 and/or L2 comprises a amino acid residue such as phenylalanine, tyrosine, tryptophan, or histidine, and SE2 is an epoxy-based polymer.

C10.9.14: a CMU, where SE1 is a one-atom layer molecule, L1 and/or L2 comprises a amino acid residue such as phenylalanine, tyrosine, tryptophan, or histidine, and SE2 is a polyethylene terephtalate.

C10.9.15: a CMU, where SE1 is a one-atom layer molecule, L1 and/or L2 comprises a amino acid residue such as phenylalanine, tyrosine, tryptophan, or histidine, and SE2 is a polyvinylchloride.

C10.9.16: a CMU, where SE1 is a one-atom layer molecule, L1 and/or L2 comprises a amino acid residue such as phenylalanine, tyrosine, tryptophan, or histidine, and SE2 is a MWCNT.

C10.9.17: a CMU, where SE1 is a one-atom layer molecule, L1 and/or L2 comprises a amino acid residue such as phenylalanine, tyrosine, tryptophan, or histidine, and SE2 is a SWCNT.

C10.9.18: a CMU, where SE1 is a one-atom layer molecule, L1 and/or L2 comprises a amino acid residue such as phenylalanine, tyrosine, tryptophan, or histidine, and SE2 is a GS.

C10.9.19: a CMU, where SE1 is a one-atom layer molecule, L1 and/or L2 comprises a amino acid residue such as phenylalanine, tyrosine, tryptophan, or histidine, and SE2 is a nanotube.

C10.9.20: a CMU, where SE1 is a one-atom layer molecule, L1 and/or L2 comprises a amino acid residue such as phenylalanine, tyrosine, tryptophan, or histidine, and SE2 is a BNNT.

C10.9.21: a CMU, where SE1 is a one-atom layer molecule, L1 and/or L2 comprises a amino acid residue such as phenylalanine, tyrosine, tryptophan, or histidine, and SE2 is a polyacrylate.

C10.9.22: a CMU, where SE1 is a one-atom layer molecule, L1 and/or L2 comprises a amino acid residue such as phenylalanine, tyrosine, tryptophan, or histidine, and SE2 is a polyolefine.

C10.10.1: a CMU, where SE1 is a one-atom layer molecule, L1 and/or L2 comprises a heteroaromatic system, including pyrole, thiophene, furane, pyrazole, imidazole, isoxazole, oxazole, isothiazole, thiazole, pyridine and perylene bisimides, and.

C10.10.2: a CMU, where SE1 is a one-atom layer molecule, L1 and/or L2 comprises a heteroaromatic system, including pyrole, thiophene, furane, pyrazole, imidazole, isoxazole, oxazole, isothiazole, thiazole, pyridine and perylene bisimides, and SE2 is copolymer.

C10.10.3: a CMU, where SE1 is a one-atom layer molecule, L1 and/or L2 comprises a heteroaromatic system, including pyrole, thiophene, furane, pyrazole, imidazole, isoxazole, oxazole, isothiazole, thiazole, pyridine and perylene bisimides, and SE2 is a high density polyethylene.

C10.10.4: a CMU, where SE1 is a one-atom layer molecule, L1 and/or L2 comprises a heteroaromatic system, including pyrole, thiophene, furane, pyrazole, imidazole, isoxazole, oxazole, isothiazole, thiazole, pyridine and perylene bisimides, and SE2 is a linear low density polyethylene.

C10.10.5: a CMU, where SE1 is a one-atom layer molecule, L1 and/or L2 comprises a heteroaromatic system, including pyrole, thiophene, furane, pyrazole, imidazole, isoxazole, oxazole, isothiazole, thiazole, pyridine and perylene bisimides, and SE2 is a low density polyethylene.

C10.10.6: a CMU, where SE1 is a one-atom layer molecule, L1 and/or L2 comprises a heteroaromatic system, including pyrole, thiophene, furane, pyrazole, imidazole, isoxazole, oxazole, isothiazole, thiazole, pyridine and perylene bisimides, and SE2 is a nylon.

C10.10.7: a CMU, where SE1 is a one-atom layer molecule, L1 and/or L2 comprises a heteroaromatic system, including pyrole, thiophene, furane, pyrazole, imidazole, isoxazole, oxazole, isothiazole, thiazole, pyridine and perylene bisimides, and SE2 is a polyamide.

C10.10.8: a CMU, where SE1 is a one-atom layer molecule, L1 and/or L2 comprises a heteroaromatic system, including pyrole, thiophene, furane, pyrazole, imidazole, isoxazole, oxazole, isothiazole, thiazole, pyridine and perylene bisimides, and SE2 is a polycarbonate.

C10.10.9: a CMU, where SE1 is a one-atom layer molecule, L1 and/or L2 comprises a heteroaromatic system, including pyrole, thiophene, furane, pyrazole, imidazole, isoxazole, oxazole, isothiazole, thiazole, pyridine and perylene bisimides, and SE2 is a polyethylene.

C10.10.10: a CMU, where SE1 is a one-atom layer molecule, L1 and/or L2 comprises a heteroaromatic system, including pyrole, thiophene, furane, pyrazole, imidazole, isoxazole, oxazole, isothiazole, thiazole, pyridine and perylene bisimides, and SE2 is a polymer.

C10.10.11: a CMU, where SE1 is a one-atom layer molecule, L1 and/or L2 comprises a heteroaromatic system, including pyrole, thiophene, furane, pyrazole, imidazole, isoxazole, oxazole, isothiazole, thiazole, pyridine and perylene bisimides, and SE2 is a polypropylene.

C10.10.12: a CMU, where SE1 is a one-atom layer molecule, L1 and/or L2 comprises a heteroaromatic system, including pyrole, thiophene, furane, pyrazole, imidazole, isoxazole, oxazole, isothiazole, thiazole, pyridine and perylene bisimides, and SE2 is a polystyrene.

C10.10.13: a CMU, where SE1 is a one-atom layer molecule, L1 and/or L2 comprises a heteroaromatic system, including pyrole, thiophene, furane, pyrazole, imidazole, isoxazole, oxazole, isothiazole, thiazole, pyridine and perylene bisimides, and SE2 is an epoxy-based polymer.

C10.10.14: a CMU, where SE1 is a one-atom layer molecule, L1 and/or L2 comprises a heteroaromatic system, including pyrole, thiophene, furane, pyrazole, imidazole, isoxazole, oxazole, isothiazole, thiazole, pyridine and perylene bisimides, and SE2 is a polyethylene terephtalate.

C10.10.15: a CMU, where SE1 is a one-atom layer molecule, L1 and/or L2 comprises a heteroaromatic system, including pyrole, thiophene, furane, pyrazole, imidazole, isoxazole, oxazole, isothiazole, thiazole, pyridine and perylene bisimides, and SE2 is a polyvinylchloride.

C10.10.16: a CMU, where SE1 is a one-atom layer molecule, L1 and/or L2 comprises a heteroaromatic system, including pyrole, thiophene, furane, pyrazole, imidazole, isoxazole, oxazole, isothiazole, thiazole, pyridine and perylene bisimides, and SE2 is a MWCNT.

C10.10.17: a CMU, where SE1 is a one-atom layer molecule, L1 and/or L2 comprises a heteroaromatic system, including pyrole, thiophene, furane, pyrazole, imidazole, isoxazole, oxazole, isothiazole, thiazole, pyridine and perylene bisimides, and SE2 is a SWCNT.

C10.10.18: a CMU, where SE1 is a one-atom layer molecule, L1 and/or L2 comprises a heteroaromatic system, including pyrole, thiophene, furane, pyrazole, imidazole, isoxazole, oxazole, isothiazole, thiazole, pyridine and perylene bisimides, and SE2 is a GS.

C10.10.19: a CMU, where SE1 is a one-atom layer molecule, L1 and/or L2 comprises a heteroaromatic system, including pyrole, thiophene, furane, pyrazole, imidazole, isoxazole, oxazole, isothiazole, thiazole, pyridine and perylene bisimides, and SE2 is a nanotube.

C10.10.20: a CMU, where SE1 is a one-atom layer molecule, L1 and/or L2 comprises a heteroaromatic system, including pyrole, thiophene, furane, pyrazole, imidazole, isoxazole, oxazole, isothiazole, thiazole, pyridine and perylene bisimides, and SE2 is a BNNT.

C10.10.21: a CMU, where SE1 is a one-atom layer molecule, L1 and/or L2 comprises a heteroaromatic system, including pyrole, thiophene, furane, pyrazole, imidazole, isoxazole, oxazole, isothiazole, thiazole, pyridine and perylene bisimides, and SE2 is a polyacrylate.

C10.10.22: a CMU, where SE1 is a one-atom layer molecule, L1 and/or L2 comprises a heteroaromatic system, including pyrole, thiophene, furane, pyrazole, imidazole, isoxazole, oxazole, isothiazole, thiazole, pyridine and perylene bisimides, and SE2 is a polyolefine.

C10.11.1: a CMU, where SE1 is a one-atom layer molecule, L1 and/or L2 comprises a fused ring system, composed of either aromatic, non-aromatic or anti-aromatic rings or combinations thereof, and.

C10.11.2: a CMU, where SE1 is a one-atom layer molecule, L1 and/or L2 comprises a fused ring system, composed of either aromatic, non-aromatic or anti-aromatic rings or combinations thereof, and SE2 is copolymer.

C10.11.3: a CMU, where SE1 is a one-atom layer molecule, L1 and/or L2 comprises a fused ring system, composed of either aromatic, non-aromatic or anti-aromatic rings or combinations thereof, and SE2 is a high density polyethylene.

C10.11.4: a CMU, where SE1 is a one-atom layer molecule, L1 and/or L2 comprises a fused ring system, composed of either aromatic, non-aromatic or anti-aromatic rings or combinations thereof, and SE2 is a linear low density polyethylene.

C10.11.5: a CMU, where SE1 is a one-atom layer molecule, L1 and/or L2 comprises a fused ring system, composed of either aromatic, non-aromatic or anti-aromatic rings or combinations thereof, and SE2 is a low density polyethylene.

C10.11.6: a CMU, where SE1 is a one-atom layer molecule, L1 and/or L2 comprises a fused ring system, composed of either aromatic, non-aromatic or anti-aromatic rings or combinations thereof, and SE2 is a nylon.

C10.11.7: a CMU, where SE1 is a one-atom layer molecule, L1 and/or L2 comprises a fused ring system, composed of either aromatic, non-aromatic or anti-aromatic rings or combinations thereof, and SE2 is a polyamide.

C10.11.8: a CMU, where SE1 is a one-atom layer molecule, L1 and/or L2 comprises a fused ring system, composed of either aromatic, non-aromatic or anti-aromatic rings or combinations thereof, and SE2 is a polycarbonate.

C10.11.9: a CMU, where SE1 is a one-atom layer molecule, L1 and/or L2 comprises a fused ring system, composed of either aromatic, non-aromatic or anti-aromatic rings or combinations thereof, and SE2 is a polyethylene.

C10.11.10: a CMU, where SE1 is a one-atom layer molecule, L1 and/or L2 comprises a fused ring system, composed of either aromatic, non-aromatic or anti-aromatic rings or combinations thereof, and SE2 is a polymer.

C10.11.11: a CMU, where SE1 is a one-atom layer molecule, L1 and/or L2 comprises a fused ring system, composed of either aromatic, non-aromatic or anti-aromatic rings or combinations thereof, and SE2 is a polypropylene.

C10.11.12: a CMU, where SE1 is a one-atom layer molecule, L1 and/or L2 comprises a fused ring system, composed of either aromatic, non-aromatic or anti-aromatic rings or combinations thereof, and SE2 is a polystyrene.

C10.11.13: a CMU, where SE1 is a one-atom layer molecule, L1 and/or L2 comprises a fused ring system, composed of either aromatic, non-aromatic or anti-aromatic rings or combinations thereof, and SE2 is an epoxy-based polymer.

C10.11.14: a CMU, where SE1 is a one-atom layer molecule, L1 and/or L2 comprises a fused ring system, composed of either aromatic, non-aromatic or anti-aromatic rings or combinations thereof, and SE2 is a polyethylene terephtalate.

C10.11.15: a CMU, where SE1 is a one-atom layer molecule, L1 and/or L2 comprises a fused ring system, composed of either aromatic, non-aromatic or anti-aromatic rings or combinations thereof, and SE2 is a polyvinylchloride.

C10.11.16: a CMU, where SE1 is a one-atom layer molecule, L1 and/or L2 comprises a fused ring system, composed of either aromatic, non-aromatic or anti-aromatic rings or combinations thereof, and SE2 is a MWCNT.

C10.11.17: a CMU, where SE1 is a one-atom layer molecule, L1 and/or L2 comprises a fused ring system, composed of either aromatic, non-aromatic or anti-aromatic rings or combinations thereof, and SE2 is a SWCNT.

C10.11.18: a CMU, where SE1 is a one-atom layer molecule, L1 and/or L2 comprises a fused ring system, composed of either aromatic, non-aromatic or anti-aromatic rings or combinations thereof, and SE2 is a GS.

C10.11.19: a CMU, where SE1 is a one-atom layer molecule, L1 and/or L2 comprises a fused ring system, composed of either aromatic, non-aromatic or anti-aromatic rings or combinations thereof, and SE2 is a nanotube.

C10.11.20: a CMU, where SE1 is a one-atom layer molecule, L1 and/or L2 comprises a fused ring system, composed of either aromatic, non-aromatic or anti-aromatic rings or combinations thereof, and SE2 is a BNNT.

C10.11.21: a CMU, where SE1 is a one-atom layer molecule, L1 and/or L2 comprises a fused ring system, composed of either aromatic, non-aromatic or anti-aromatic rings or combinations thereof, and SE2 is a polyacrylate.

C10.11.22: a CMU, where SE1 is a one-atom layer molecule, L1 and/or L2 comprises a fused ring system, composed of either aromatic, non-aromatic or anti-aromatic rings or combinations thereof, and SE2 is a polyolefine.

C11.1.1: a CMU, where SE1 is a BNS, and.

C11.1.2: a CMU, where SE1 is a BNS, and SE2 is copolymer.

C11.1.3: a CMU, where SE1 is a BNS, and SE2 is a high density polyethylene.

C11.1.4: a CMU, where SE1 is a BNS, and SE2 is a linear low density polyethylene.

C11.1.5: a CMU, where SE1 is a BNS, and SE2 is a low density polyethylene.

C11.1.6: a CMU, where SE1 is a BNS, and SE2 is a nylon.

C11.1.7: a CMU, where SE1 is a BNS, and SE2 is a polyamide.

C11.1.8: a CMU, where SE1 is a BNS, and SE2 is a polycarbonate.

C11.1.9: a CMU, where SE1 is a BNS, and SE2 is a polyethylene.

C11.1.10: a CMU, where SE1 is a BNS, and SE2 is a polymer.

C11.1.11: a CMU, where SE1 is a BNS, and SE2 is a polypropylene.

C11.1.12: a CMU, where SE1 is a BNS, and SE2 is a polystyrene.

C11.1.13: a CMU, where SE1 is a BNS, and SE2 is an epoxy-based polymer.

C11.1.14: a CMU, where SE1 is a BNS, and SE2 is a polyethylene terephtalate.

C11.1.15: a CMU, where SE1 is a BNS, and SE2 is a polyvinylchloride.

C11.1.16: a CMU, where SE1 is a BNS, and SE2 is a MWCNT.

C11.1.17: a CMU, where SE1 is a BNS, and SE2 is a SWCNT.

C11.1.18: a CMU, where SE1 is a BNS, and SE2 is a GS.

C11.1.19: a CMU, where SE1 is a BNS, and SE2 is a nanotube.

C11.1.20: a CMU, where SE1 is a BNS, and SE2 is a BNNT.

C11.1.21: a CMU, where SE1 is a BNS, and SE2 is a polyacrylate.

C11.1.22: a CMU, where SE1 is a BNS, and SE2 is a polyolefine.

C11.2.1: a CMU, where SE1 is a BNS, L1 and/or L2 comprises a non-covalent ligand, and.

C11.2.2: a CMU, where SE1 is a BNS, L1 and/or L2 comprises a non-covalent ligand, and SE2 is copolymer.

C11.2.3: a CMU, where SE1 is a BNS, L1 and/or L2 comprises a non-covalent ligand, and SE2 is a high density polyethylene.

C11.2.4: a CMU, where SE1 is a BNS, L1 and/or L2 comprises a non-covalent ligand, and SE2 is a linear low density polyethylene.

C11.2.5: a CMU, where SE1 is a BNS, L1 and/or L2 comprises a non-covalent ligand, and SE2 is a low density polyethylene.

C11.2.6: a CMU, where SE1 is a BNS, L1 and/or L2 comprises a non-covalent ligand, and SE2 is a nylon.

C11.2.7: a CMU, where SE1 is a BNS, L1 and/or L2 comprises a non-covalent ligand, and SE2 is a polyamide.

C11.2.8: a CMU, where SE1 is a BNS, L1 and/or L2 comprises a non-covalent ligand, and SE2 is a polycarbonate.

C11.2.9: a CMU, where SE1 is a BNS, L1 and/or L2 comprises a non-covalent ligand, and SE2 is a polyethylene.

C11.2.10: a CMU, where SE1 is a BNS, L1 and/or L2 comprises a non-covalent ligand, and SE2 is a polymer.

C11.2.11: a CMU, where SE1 is a BNS, L1 and/or L2 comprises a non-covalent ligand, and SE2 is a polypropylene.

C11.2.12: a CMU, where SE1 is a BNS, L1 and/or L2 comprises a non-covalent ligand, and SE2 is a polystyrene.

C11.2.13: a CMU, where SE1 is a BNS, L1 and/or L2 comprises a non-covalent ligand, and SE2 is an epoxy-based polymer.

C11.2.14: a CMU, where SE1 is a BNS, L1 and/or L2 comprises a non-covalent ligand, and SE2 is a polyethylene terephtalate.

C11.2.15: a CMU, where SE1 is a BNS, L1 and/or L2 comprises a non-covalent ligand, and SE2 is a polyvinylchloride.

C11.2.16: a CMU, where SE1 is a BNS, L1 and/or L2 comprises a non-covalent ligand, and SE2 is a MWCNT.

C11.2.17: a CMU, where SE1 is a BNS, L1 and/or L2 comprises a non-covalent ligand, and SE2 is a SWCNT.

C11.2.18: a CMU, where SE1 is a BNS, L1 and/or L2 comprises a non-covalent ligand, and SE2 is a GS.

C11.2.19: a CMU, where SE1 is a BNS, L1 and/or L2 comprises a non-covalent ligand, and SE2 is a nanotube.

C11.2.20: a CMU, where SE1 is a BNS, L1 and/or L2 comprises a non-covalent ligand, and SE2 is a BNNT.

C11.2.21: a CMU, where SE1 is a BNS, L1 and/or L2 comprises a non-covalent ligand, and SE2 is a polyacrylate.

C11.2.22: a CMU, where SE1 is a BNS, L1 and/or L2 comprises a non-covalent ligand, and SE2 is a polyolefine.

C11.3.1: a CMU, where SE1 is a BNS, L1 and/or L2 comprises a amino-substituted hydrocarbon, and.

C11.3.2: a CMU, where SE1 is a BNS, L1 and/or L2 comprises a amino-substituted hydrocarbon, and SE2 is copolymer.

C11.3.3: a CMU, where SE1 is a BNS, L1 and/or L2 comprises a amino-substituted hydrocarbon, and SE2 is a high density polyethylene.

C11.3.4: a CMU, where SE1 is a BNS, L1 and/or L2 comprises a amino-substituted hydrocarbon, and SE2 is a linear low density polyethylene.

C11.3.5: a CMU, where SE1 is a BNS, L1 and/or L2 comprises a amino-substituted hydrocarbon, and SE2 is a low density polyethylene.

C11.3.6: a CMU, where SE1 is a BNS, L1 and/or L2 comprises a amino-substituted hydrocarbon, and SE2 is a nylon.

C11.3.7: a CMU, where SE1 is a BNS, L1 and/or L2 comprises a amino-substituted hydrocarbon, and SE2 is a polyamide.

C11.3.8: a CMU, where SE1 is a BNS, L1 and/or L2 comprises a amino-substituted hydrocarbon, and SE2 is a polycarbonate.

C11.3.9: a CMU, where SE1 is a BNS, L1 and/or L2 comprises a amino-substituted hydrocarbon, and SE2 is a polyethylene.

C11.3.10: a CMU, where SE1 is a BNS, L1 and/or L2 comprises a amino-substituted hydrocarbon, and SE2 is a polymer.

C11.3.11: a CMU, where SE1 is a BNS, L1 and/or L2 comprises a amino-substituted hydrocarbon, and SE2 is a polypropylene.

C11.3.12: a CMU, where SE1 is a BNS, L1 and/or L2 comprises a amino-substituted hydrocarbon, and SE2 is a polystyrene.

C11.3.13: a CMU, where SE1 is a BNS, L1 and/or L2 comprises a amino-substituted hydrocarbon, and SE2 is an epoxy-based polymer.

C11.3.14: a CMU, where SE1 is a BNS, L1 and/or L2 comprises a amino-substituted hydrocarbon, and SE2 is a polyethylene terephtalate.

C11.3.15: a CMU, where SE1 is a BNS, L1 and/or L2 comprises a amino-substituted hydrocarbon, and SE2 is a polyvinylchloride.

C11.3.16: a CMU, where SE1 is a BNS, L1 and/or L2 comprises a amino-substituted hydrocarbon, and SE2 is a MWCNT.

C11.3.17: a CMU, where SE1 is a BNS, L1 and/or L2 comprises a amino-substituted hydrocarbon, and SE2 is a SWCNT.

C11.3.18: a CMU, where SE1 is a BNS, L1 and/or L2 comprises a amino-substituted hydrocarbon, and SE2 is a GS.

C11.3.19: a CMU, where SE1 is a BNS, L1 and/or L2 comprises a amino-substituted hydrocarbon, and SE2 is a nanotube.

C11.3.20: a CMU, where SE1 is a BNS, L1 and/or L2 comprises a amino-substituted hydrocarbon, and SE2 is a BNNT.

C11.3.21: a CMU, where SE1 is a BNS, L1 and/or L2 comprises a amino-substituted hydrocarbon, and SE2 is a polyacrylate.

C11.3.22: a CMU, where SE1 is a BNS, L1 and/or L2 comprises a amino-substituted hydrocarbon, and SE2 is a polyolefine.

C11.4.1: a CMU, where SE1 is a BNS, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and.

C11.4.2: a CMU, where SE1 is a BNS, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and SE2 is copolymer.

C11.4.3: a CMU, where SE1 is a BNS, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and SE2 is a high density polyethylene.

C11.4.4: a CMU, where SE1 is a BNS, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and SE2 is a linear low density polyethylene.

C11.4.5: a CMU, where SE1 is a BNS, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and SE2 is a low density polyethylene.

C11.4.6: a CMU, where SE1 is a BNS, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and SE2 is a nylon.

C11.4.7: a CMU, where SE1 is a BNS, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and SE2 is a polyamide.

C11.4.8: a CMU, where SE1 is a BNS, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and SE2 is a polycarbonate.

C11.4.9: a CMU, where SE1 is a BNS, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and SE2 is a polyethylene.

C11.4.10: a CMU, where SE1 is a BNS, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and SE2 is a polymer.

C11.4.11: a CMU, where SE1 is a BNS, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and SE2 is a polypropylene.

C11.4.12: a CMU, where SE1 is a BNS, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and SE2 is a polystyrene.

C11.4.13: a CMU, where SE1 is a BNS, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and SE2 is an epoxy-based polymer.

C11.4.14: a CMU, where SE1 is a BNS, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and SE2 is a polyethylene terephtalate.

C11.4.15: a CMU, where SE1 is a BNS, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and SE2 is a polyvinylchloride.

C11.4.16: a CMU, where SE1 is a BNS, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and SE2 is a MWCNT.

C11.4.17: a CMU, where SE1 is a BNS, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and SE2 is a SWCNT.

C11.4.18: a CMU, where SE1 is a BNS, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and SE2 is a GS.

C11.4.19: a CMU, where SE1 is a BNS, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and SE2 is a nanotube.

C11.4.20: a CMU, where SE1 is a BNS, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and SE2 is a BNNT.

C11.4.21: a CMU, where SE1 is a BNS, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and SE2 is a polyacrylate.

C11.4.22: a CMU, where SE1 is a BNS, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and SE2 is a polyolefine.

C11.5.1: a CMU, where SE1 is a BNS, L1 and/or L2 comprises a halogen, nitro group, amine, thiol, alcohol, ester, amide, carboxylic acid, phenol, indole, imidazole, sulfonate or phophate, and.

C11.5.2: a CMU, where SE1 is a BNS, L1 and/or L2 comprises a halogen, nitro group, amine, thiol, alcohol, ester, amide, carboxylic acid, phenol, indole, imidazole, sulfonate or phophate, and SE2 is copolymer.

C11.5.3: a CMU, where SE1 is a BNS, L1 and/or L2 comprises a halogen, nitro group, amine, thiol, alcohol, ester, amide, carboxylic acid, phenol, indole, imidazole, sulfonate or phophate, and SE2 is a high density polyethylene.

C11.5.4: a CMU, where SE1 is a BNS, L1 and/or L2 comprises a halogen, nitro group, amine, thiol, alcohol, ester, amide, carboxylic acid, phenol, indole, imidazole, sulfonate or phophate, and SE2 is a linear low density polyethylene.

C11.5.5: a CMU, where SE1 is a BNS, L1 and/or L2 comprises a halogen, nitro group, amine, thiol, alcohol, ester, amide, carboxylic acid, phenol, indole, imidazole, sulfonate or phophate, and SE2 is a low density polyethylene.

C11.5.6: a CMU, where SE1 is a BNS, L1 and/or L2 comprises a halogen, nitro group, amine, thiol, alcohol, ester, amide, carboxylic acid, phenol, indole, imidazole, sulfonate or phophate, and SE2 is a nylon.

C11.5.7: a CMU, where SE1 is a BNS, L1 and/or L2 comprises a halogen, nitro group, amine, thiol, alcohol, ester, amide, carboxylic acid, phenol, indole, imidazole, sulfonate or phophate, and SE2 is a polyamide.

C11.5.8: a CMU, where SE1 is a BNS, L1 and/or L2 comprises a halogen, nitro group, amine, thiol, alcohol, ester, amide, carboxylic acid, phenol, indole, imidazole, sulfonate or phophate, and SE2 is a polycarbonate.

C11.5.9: a CMU, where SE1 is a BNS, L1 and/or L2 comprises a halogen, nitro group, amine, thiol, alcohol, ester, amide, carboxylic acid, phenol, indole, imidazole, sulfonate or phophate, and SE2 is a polyethylene.

C11.5.10: a CMU, where SE1 is a BNS, L1 and/or L2 comprises a halogen, nitro group, amine, thiol, alcohol, ester, amide, carboxylic acid, phenol, indole, imidazole, sulfonate or phophate, and SE2 is a polymer.

C11.5.11: a CMU, where SE1 is a BNS, L1 and/or L2 comprises a halogen, nitro group, amine, thiol, alcohol, ester, amide, carboxylic acid, phenol, indole, imidazole, sulfonate or phophate, and SE2 is a polypropylene.

C11.5.12: a CMU, where SE1 is a BNS, L1 and/or L2 comprises a halogen, nitro group, amine, thiol, alcohol, ester, amide, carboxylic acid, phenol, indole, imidazole, sulfonate or phophate, and SE2 is a polystyrene.

C11.5.13: a CMU, where SE1 is a BNS, L1 and/or L2 comprises a halogen, nitro group, amine, thiol, alcohol, ester, amide, carboxylic acid, phenol, indole, imidazole, sulfonate or phophate, and SE2 is an epoxy-based polymer.

C11.5.14: a CMU, where SE1 is a BNS, L1 and/or L2 comprises a halogen, nitro group, amine, thiol, alcohol, ester, amide, carboxylic acid, phenol, indole, imidazole, sulfonate or phophate, and SE2 is a polyethylene terephtalate.

C11.5.15: a CMU, where SE1 is a BNS, L1 and/or L2 comprises a halogen, nitro group, amine, thiol, alcohol, ester, amide, carboxylic acid, phenol, indole, imidazole, sulfonate or phophate, and SE2 is a polyvinylchloride.

C11.5.16: a CMU, where SE1 is a BNS, L1 and/or L2 comprises a halogen, nitro group, amine, thiol, alcohol, ester, amide, carboxylic acid, phenol, indole, imidazole, sulfonate or phophate, and SE2 is a MWCNT.

C11.5.17: a CMU, where SE1 is a BNS, L1 and/or L2 comprises a halogen, nitro group, amine, thiol, alcohol, ester, amide, carboxylic acid, phenol, indole, imidazole, sulfonate or phophate, and SE2 is a SWCNT.

C11.5.18: a CMU, where SE1 is a BNS, L1 and/or L2 comprises a halogen, nitro group, amine, thiol, alcohol, ester, amide, carboxylic acid, phenol, indole, imidazole, sulfonate or phophate, and SE2 is a GS.

C11.5.19: a CMU, where SE1 is a BNS, L1 and/or L2 comprises a halogen, nitro group, amine, thiol, alcohol, ester, amide, carboxylic acid, phenol, indole, imidazole, sulfonate or phophate, and SE2 is a nanotube.

C11.5.20: a CMU, where SE1 is a BNS, L1 and/or L2 comprises a halogen, nitro group, amine, thiol, alcohol, ester, amide, carboxylic acid, phenol, indole, imidazole, sulfonate or phophate, and SE2 is a BNNT.

C11.5.21: a CMU, where SE1 is a BNS, L1 and/or L2 comprises a halogen, nitro group, amine, thiol, alcohol, ester, amide, carboxylic acid, phenol, indole, imidazole, sulfonate or phophate, and SE2 is a polyacrylate.

C11.5.22: a CMU, where SE1 is a BNS, L1 and/or L2 comprises a halogen, nitro group, amine, thiol, alcohol, ester, amide, carboxylic acid, phenol, indole, imidazole, sulfonate or phophate, and SE2 is a polyolefine.

C11.6.1: a CMU, where SE1 is a BNS, L1 and/or L2 comprises an C1-C10 alkane, and.

C11.6.2: a CMU, where SE1 is a BNS, L1 and/or L2 comprises an C1-C10 alkane, and SE2 is copolymer.

C11.6.3: a CMU, where SE1 is a BNS, L1 and/or L2 comprises an C1-C10 alkane, and SE2 is a high density polyethylene.

C11.6.4: a CMU, where SE1 is a BNS, L1 and/or L2 comprises an C1-C10 alkane, and SE2 is a linear low density polyethylene.

C11.6.5: a CMU, where SE1 is a BNS, L1 and/or L2 comprises an C1-C10 alkane, and SE2 is a low density polyethylene.

C11.6.6: a CMU, where SE1 is a BNS, L1 and/or L2 comprises an C1-C10 alkane, and SE2 is a nylon.

C11.6.7: a CMU, where SE1 is a BNS, L1 and/or L2 comprises an C1-C10 alkane, and SE2 is a polyamide.

C11.6.8: a CMU, where SE1 is a BNS, L1 and/or L2 comprises an C1-C10 alkane, and SE2 is a polycarbonate.

C11.6.9: a CMU, where SE1 is a BNS, L1 and/or L2 comprises an C1-C10 alkane, and SE2 is a polyethylene.

C11.6.10: a CMU, where SE1 is a BNS, L1 and/or L2 comprises an C1-C10 alkane, and SE2 is a polymer.

C11.6.11: a CMU, where SE1 is a BNS, L1 and/or L2 comprises an C1-C10 alkane, and SE2 is a polypropylene.

C11.6.12: a CMU, where SE1 is a BNS, L1 and/or L2 comprises an C1-C10 alkane, and SE2 is a polystyrene.

C11.6.13: a CMU, where SE1 is a BNS, L1 and/or L2 comprises an C1-C10 alkane, and SE2 is an epoxy-based polymer.

C11.6.14: a CMU, where SE1 is a BNS, L1 and/or L2 comprises an C1-C10 alkane, and SE2 is a polyethylene terephtalate.

C11.6.15: a CMU, where SE1 is a BNS, L1 and/or L2 comprises an C1-C10 alkane, and SE2 is a polyvinylchloride.

C11.6.16: a CMU, where SE1 is a BNS, L1 and/or L2 comprises an C1-C10 alkane, and SE2 is a MWCNT.

C11.6.17: a CMU, where SE1 is a BNS, L1 and/or L2 comprises an C1-C10 alkane, and SE2 is a SWCNT.

C11.6.18: a CMU, where SE1 is a BNS, L1 and/or L2 comprises an C1-C10 alkane, and SE2 is a GS.

C11.6.19: a CMU, where SE1 is a BNS, L1 and/or L2 comprises an C1-C10 alkane, and SE2 is a nanotube.

C11.6.20: a CMU, where SE1 is a BNS, L1 and/or L2 comprises an C1-C10 alkane, and SE2 is a BNNT.

C11.6.21: a CMU, where SE1 is a BNS, L1 and/or L2 comprises an C1-C10 alkane, and SE2 is a polyacrylate.

C11.6.22: a CMU, where SE1 is a BNS, L1 and/or L2 comprises an C1-C10 alkane, and SE2 is a polyolefine.

C11.7.1: a CMU, where SE1 is a BNS, L1 and/or L2 comprises a detergent comprising a C4-C25 alkane and a polar end group, and.

C11.7.2: a CMU, where SE1 is a BNS, L1 and/or L2 comprises a detergent comprising a C4-C25 alkane and a polar end group, and SE2 is copolymer.

C11.7.3: a CMU, where SE1 is a BNS, L1 and/or L2 comprises a detergent comprising a C4-C25 alkane and a polar end group, and SE2 is a high density polyethylene.

C11.7.4: a CMU, where SE1 is a BNS, L1 and/or L2 comprises a detergent comprising a C4-C25 alkane and a polar end group, and SE2 is a linear low density polyethylene.

C11.7.5: a CMU, where SE1 is a BNS, L1 and/or L2 comprises a detergent comprising a C4-C25 alkane and a polar end group, and SE2 is a low density polyethylene.

C11.7.6: a CMU, where SE1 is a BNS, L1 and/or L2 comprises a detergent comprising a C4-C25 alkane and a polar end group, and SE2 is a nylon.

C11.7.7: a CMU, where SE1 is a BNS, L1 and/or L2 comprises a detergent comprising a C4-C25 alkane and a polar end group, and SE2 is a polyamide.

C11.7.8: a CMU, where SE1 is a BNS, L1 and/or L2 comprises a detergent comprising a C4-C25 alkane and a polar end group, and SE2 is a polycarbonate.

C11.7.9: a CMU, where SE1 is a BNS, L1 and/or L2 comprises a detergent comprising a C4-C25 alkane and a polar end group, and SE2 is a polyethylene.

C11.7.10: a CMU, where SE1 is a BNS, L1 and/or L2 comprises a detergent comprising a C4-C25 alkane and a polar end group, and SE2 is a polymer.

C11.7.11: a CMU, where SE1 is a BNS, L1 and/or L2 comprises a detergent comprising a C4-C25 alkane and a polar end group, and SE2 is a polypropylene.

C11.7.12: a CMU, where SE1 is a BNS, L1 and/or L2 comprises a detergent comprising a C4-C25 alkane and a polar end group, and SE2 is a polystyrene.

C11.7.13: a CMU, where SE1 is a BNS, L1 and/or L2 comprises a detergent comprising a C4-C25 alkane and a polar end group, and SE2 is an epoxy-based polymer.

C11.7.14: a CMU, where SE1 is a BNS, L1 and/or L2 comprises a detergent comprising a C4-C25 alkane and a polar end group, and SE2 is a polyethylene terephtalate.

C11.7.15: a CMU, where SE1 is a BNS, L1 and/or L2 comprises a detergent comprising a C4-C25 alkane and a polar end group, and SE2 is a polyvinylchloride.

C11.7.16: a CMU, where SE1 is a BNS, L1 and/or L2 comprises a detergent comprising a C4-C25 alkane and a polar end group, and SE2 is a MWCNT.

C11.7.17: a CMU, where SE1 is a BNS, L1 and/or L2 comprises a detergent comprising a C4-C25 alkane and a polar end group, and SE2 is a SWCNT.

C11.7.18: a CMU, where SE1 is a BNS, L1 and/or L2 comprises a detergent comprising a C4-C25 alkane and a polar end group, and SE2 is a GS.

C11.7.19: a CMU, where SE1 is a BNS, L1 and/or L2 comprises a detergent comprising a C4-C25 alkane and a polar end group, and SE2 is a nanotube.

C11.7.20: a CMU, where SE1 is a BNS, L1 and/or L2 comprises a detergent comprising a C4-C25 alkane and a polar end group, and SE2 is a BNNT.

C11.7.21: a CMU, where SE1 is a BNS, L1 and/or L2 comprises a detergent comprising a C4-C25 alkane and a polar end group, and SE2 is a polyacrylate.

C11.7.22: a CMU, where SE1 is a BNS, L1 and/or L2 comprises a detergent comprising a C4-C25 alkane and a polar end group, and SE2 is a polyolefine.

C11.8.1: a CMU, where SE1 is a BNS, L1 and/or L2 comprises a lactam, such as N-methyl-pyrrolidone and lactone, and.

C11.8.2: a CMU, where SE1 is a BNS, L1 and/or L2 comprises a lactam, such as N-methyl-pyrrolidone and lactone, and SE2 is copolymer.

C11.8.3: a CMU, where SE1 is a BNS, L1 and/or L2 comprises a lactam, such as N-methyl-pyrrolidone and lactone, and SE2 is a high density polyethylene.

C11.8.4: a CMU, where SE1 is a BNS, L1 and/or L2 comprises a lactam, such as N-methyl-pyrrolidone and lactone, and SE2 is a linear low density polyethylene.

C11.8.5: a CMU, where SE1 is a BNS, L1 and/or L2 comprises a lactam, such as N-methyl-pyrrolidone and lactone, and SE2 is a low density polyethylene.

C11.8.6: a CMU, where SE1 is a BNS, L1 and/or L2 comprises a lactam, such as N-methyl-pyrrolidone and lactone, and SE2 is a nylon.

C11.8.7: a CMU, where SE1 is a BNS, L1 and/or L2 comprises a lactam, such as N-methyl-pyrrolidone and lactone, and SE2 is a polyamide.

C11.8.8: a CMU, where SE1 is a BNS, L1 and/or L2 comprises a lactam, such as N-methyl-pyrrolidone and lactone, and SE2 is a polycarbonate.

C11.8.9: a CMU, where SE1 is a BNS, L1 and/or L2 comprises a lactam, such as N-methyl-pyrrolidone and lactone, and SE2 is a polyethylene.

C11.8.10: a CMU, where SE1 is a BNS, L1 and/or L2 comprises a lactam, such as N-methyl-pyrrolidone and lactone, and SE2 is a polymer.

C11.8.11: a CMU, where SE1 is a BNS, L1 and/or L2 comprises a lactam, such as N-methyl-pyrrolidone and lactone, and SE2 is a polypropylene.

C11.8.12: a CMU, where SE1 is a BNS, L1 and/or L2 comprises a lactam, such as N-methyl-pyrrolidone and lactone, and SE2 is a polystyrene.

C11.8.13: a CMU, where SE1 is a BNS, L1 and/or L2 comprises a lactam, such as N-methyl-pyrrolidone and lactone, and SE2 is an epoxy-based polymer.

C11.8.14: a CMU, where SE1 is a BNS, L1 and/or L2 comprises a lactam, such as N-methyl-pyrrolidone and lactone, and SE2 is a polyethylene terephtalate.

C11.8.15: a CMU, where SE1 is a BNS, L1 and/or L2 comprises a lactam, such as N-methyl-pyrrolidone and lactone, and SE2 is a polyvinylchloride.

C11.8.16: a CMU, where SE1 is a BNS, L1 and/or L2 comprises a lactam, such as N-methyl-pyrrolidone and lactone, and SE2 is a MWCNT.

C11.8.17: a CMU, where SE1 is a BNS, L1 and/or L2 comprises a lactam, such as N-methyl-pyrrolidone and lactone, and SE2 is a SWCNT.

C11.8.18: a CMU, where SE1 is a BNS, L1 and/or L2 comprises a lactam, such as N-methyl-pyrrolidone and lactone, and SE2 is a GS.

C11.8.19: a CMU, where SE1 is a BNS, L1 and/or L2 comprises a lactam, such as N-methyl-pyrrolidone and lactone, and SE2 is a nanotube.

C11.8.20: a CMU, where SE1 is a BNS, L1 and/or L2 comprises a lactam, such as N-methyl-pyrrolidone and lactone, and SE2 is a BNNT.

C11.8.21: a CMU, where SE1 is a BNS, L1 and/or L2 comprises a lactam, such as N-methyl-pyrrolidone and lactone, and SE2 is a polyacrylate.

C11.8.22: a CMU, where SE1 is a BNS, L1 and/or L2 comprises a lactam, such as N-methyl-pyrrolidone and lactone, and SE2 is a polyolefine.

C11.9.1: a CMU, where SE1 is a BNS, L1 and/or L2 comprises a amino acid residue such as phenylalanine, tyrosine, tryptophan, or histidine, and.

C11.9.2: a CMU, where SE1 is a BNS, L1 and/or L2 comprises a amino acid residue such as phenylalanine, tyrosine, tryptophan, or histidine, and SE2 is copolymer.

C11.9.3: a CMU, where SE1 is a BNS, L1 and/or L2 comprises a amino acid residue such as phenylalanine, tyrosine, tryptophan, or histidine, and SE2 is a high density polyethylene.

C11.9.4: a CMU, where SE1 is a BNS, L1 and/or L2 comprises a amino acid residue such as phenylalanine, tyrosine, tryptophan, or histidine, and SE2 is a linear low density polyethylene.

C11.9.5: a CMU, where SE1 is a BNS, L1 and/or L2 comprises a amino acid residue such as phenylalanine, tyrosine, tryptophan, or histidine, and SE2 is a low density polyethylene.

C11.9.6: a CMU, where SE1 is a BNS, L1 and/or L2 comprises a amino acid residue such as phenylalanine, tyrosine, tryptophan, or histidine, and SE2 is a nylon.

C11.9.7: a CMU, where SE1 is a BNS, L1 and/or L2 comprises a amino acid residue such as phenylalanine, tyrosine, tryptophan, or histidine, and SE2 is a polyamide.

C11.9.8: a CMU, where SE1 is a BNS, L1 and/or L2 comprises a amino acid residue such as phenylalanine, tyrosine, tryptophan, or histidine, and SE2 is a polycarbonate.

C11.9.9: a CMU, where SE1 is a BNS, L1 and/or L2 comprises a amino acid residue such as phenylalanine, tyrosine, tryptophan, or histidine, and SE2 is a polyethylene.

C11.9.10: a CMU, where SE1 is a BNS, L1 and/or L2 comprises a amino acid residue such as phenylalanine, tyrosine, tryptophan, or histidine, and SE2 is a polymer.

C11.9.11: a CMU, where SE1 is a BNS, L1 and/or L2 comprises a amino acid residue such as phenylalanine, tyrosine, tryptophan, or histidine, and SE2 is a polypropylene.

C11.9.12: a CMU, where SE1 is a BNS, L1 and/or L2 comprises a amino acid residue such as phenylalanine, tyrosine, tryptophan, or histidine, and SE2 is a polystyrene.

C11.9.13: a CMU, where SE1 is a BNS, L1 and/or L2 comprises a amino acid residue such as phenylalanine, tyrosine, tryptophan, or histidine, and SE2 is an epoxy-based polymer.

C11.9.14: a CMU, where SE1 is a BNS, L1 and/or L2 comprises a amino acid residue such as phenylalanine, tyrosine, tryptophan, or histidine, and SE2 is a polyethylene terephtalate.

C11.9.15: a CMU, where SE1 is a BNS, L1 and/or L2 comprises a amino acid residue such as phenylalanine, tyrosine, tryptophan, or histidine, and SE2 is a polyvinylchloride.

C11.9.16: a CMU, where SE1 is a BNS, L1 and/or L2 comprises a amino acid residue such as phenylalanine, tyrosine, tryptophan, or histidine, and SE2 is a MWCNT.

C11.9.17: a CMU, where SE1 is a BNS, L1 and/or L2 comprises a amino acid residue such as phenylalanine, tyrosine, tryptophan, or histidine, and SE2 is a SWCNT.

C11.9.18: a CMU, where SE1 is a BNS, L1 and/or L2 comprises a amino acid residue such as phenylalanine, tyrosine, tryptophan, or histidine, and SE2 is a GS.

C11.9.19: a CMU, where SE1 is a BNS, L1 and/or L2 comprises a amino acid residue such as phenylalanine, tyrosine, tryptophan, or histidine, and SE2 is a nanotube.

C11.9.20: a CMU, where SE1 is a BNS, L1 and/or L2 comprises a amino acid residue such as phenylalanine, tyrosine, tryptophan, or histidine, and SE2 is a BNNT.

C11.9.21: a CMU, where SE1 is a BNS, L1 and/or L2 comprises a amino acid residue such as phenylalanine, tyrosine, tryptophan, or histidine, and SE2 is a polyacrylate.

C11.9.22: a CMU, where SE1 is a BNS, L1 and/or L2 comprises a amino acid residue such as phenylalanine, tyrosine, tryptophan, or histidine, and SE2 is a polyolefine.

C11.10.1: a CMU, where SE1 is a BNS, L1 and/or L2 comprises a heteroaromatic system, including pyrole, thiophene, furane, pyrazole, imidazole, isoxazole, oxazole, isothiazole, thiazole, pyridine and perylene bisimides, and.

C11.10.2: a CMU, where SE1 is a BNS, L1 and/or L2 comprises a heteroaromatic system, including pyrole, thiophene, furane, pyrazole, imidazole, isoxazole, oxazole, isothiazole, thiazole, pyridine and perylene bisimides, and SE2 is copolymer.

C11.10.3: a CMU, where SE1 is a BNS, L1 and/or L2 comprises a heteroaromatic system, including pyrole, thiophene, furane, pyrazole, imidazole, isoxazole, oxazole, isothiazole, thiazole, pyridine and perylene bisimides, and SE2 is a high density polyethylene.

C11.10.4: a CMU, where SE1 is a BNS, L1 and/or L2 comprises a heteroaromatic system, including pyrole, thiophene, furane, pyrazole, imidazole, isoxazole, oxazole, isothiazole, thiazole, pyridine and perylene bisimides, and SE2 is a linear low density polyethylene.

C11.10.5: a CMU, where SE1 is a BNS, L1 and/or L2 comprises a heteroaromatic system, including pyrole, thiophene, furane, pyrazole, imidazole, isoxazole, oxazole, isothiazole, thiazole, pyridine and perylene bisimides, and SE2 is a low density polyethylene.

C11.10.6: a CMU, where SE1 is a BNS, L1 and/or L2 comprises a heteroaromatic system, including pyrole, thiophene, furane, pyrazole, imidazole, isoxazole, oxazole, isothiazole, thiazole, pyridine and perylene bisimides, and SE2 is a nylon.

C11.10.7: a CMU, where SE1 is a BNS, L1 and/or L2 comprises a heteroaromatic system, including pyrole, thiophene, furane, pyrazole, imidazole, isoxazole, oxazole, isothiazole, thiazole, pyridine and perylene bisimides, and SE2 is a polyamide.

C11.10.8: a CMU, where SE1 is a BNS, L1 and/or L2 comprises a heteroaromatic system, including pyrole, thiophene, furane, pyrazole, imidazole, isoxazole, oxazole, isothiazole, thiazole, pyridine and perylene bisimides, and SE2 is a polycarbonate.

C11.10.9: a CMU, where SE1 is a BNS, L1 and/or L2 comprises a heteroaromatic system, including pyrole, thiophene, furane, pyrazole, imidazole, isoxazole, oxazole, isothiazole, thiazole, pyridine and perylene bisimides, and SE2 is a polyethylene.

C11.10.10: a CMU, where SE1 is a BNS, L1 and/or L2 comprises a heteroaromatic system, including pyrole, thiophene, furane, pyrazole, imidazole, isoxazole, oxazole, isothiazole, thiazole, pyridine and perylene bisimides, and SE2 is a polymer.

C11.10.11: a CMU, where SE1 is a BNS, L1 and/or L2 comprises a heteroaromatic system, including pyrole, thiophene, furane, pyrazole, imidazole, isoxazole, oxazole, isothiazole, thiazole, pyridine and perylene bisimides, and SE2 is a polypropylene.

C11.10.12: a CMU, where SE1 is a BNS, L1 and/or L2 comprises a heteroaromatic system, including pyrole, thiophene, furane, pyrazole, imidazole, isoxazole, oxazole, isothiazole, thiazole, pyridine and perylene bisimides, and SE2 is a polystyrene.

C11.10.13: a CMU, where SE1 is a BNS, L1 and/or L2 comprises a heteroaromatic system, including pyrole, thiophene, furane, pyrazole, imidazole, isoxazole, oxazole, isothiazole, thiazole, pyridine and perylene bisimides, and SE2 is an epoxy-based polymer.

C11.10.14: a CMU, where SE1 is a BNS, L1 and/or L2 comprises a heteroaromatic system, including pyrole, thiophene, furane, pyrazole, imidazole, isoxazole, oxazole, isothiazole, thiazole, pyridine and perylene bisimides, and SE2 is a polyethylene terephtalate.

C11.10.15: a CMU, where SE1 is a BNS, L1 and/or L2 comprises a heteroaromatic system, including pyrole, thiophene, furane, pyrazole, imidazole, isoxazole, oxazole, isothiazole, thiazole, pyridine and perylene bisimides, and SE2 is a polyvinylchloride.

C11.10.16: a CMU, where SE1 is a BNS, L1 and/or L2 comprises a heteroaromatic system, including pyrole, thiophene, furane, pyrazole, imidazole, isoxazole, oxazole, isothiazole, thiazole, pyridine and perylene bisimides, and SE2 is a MWCNT.

C11.10.17: a CMU, where SE1 is a BNS, L1 and/or L2 comprises a heteroaromatic system, including pyrole, thiophene, furane, pyrazole, imidazole, isoxazole, oxazole, isothiazole, thiazole, pyridine and perylene bisimides, and SE2 is a SWCNT.

C11.10.18: a CMU, where SE1 is a BNS, L1 and/or L2 comprises a heteroaromatic system, including pyrole, thiophene, furane, pyrazole, imidazole, isoxazole, oxazole, isothiazole, thiazole, pyridine and perylene bisimides, and SE2 is a GS.

C11.10.19: a CMU, where SE1 is a BNS, L1 and/or L2 comprises a heteroaromatic system, including pyrole, thiophene, furane, pyrazole, imidazole, isoxazole, oxazole, isothiazole, thiazole, pyridine and perylene bisimides, and SE2 is a nanotube.

C11.10.20: a CMU, where SE1 is a BNS, L1 and/or L2 comprises a heteroaromatic system, including pyrole, thiophene, furane, pyrazole, imidazole, isoxazole, oxazole, isothiazole, thiazole, pyridine and perylene bisimides, and SE2 is a BNNT.

C11.10.21: a CMU, where SE1 is a BNS, L1 and/or L2 comprises a heteroaromatic system, including pyrole, thiophene, furane, pyrazole, imidazole, isoxazole, oxazole, isothiazole, thiazole, pyridine and perylene bisimides, and SE2 is a polyacrylate.

C11.10.22: a CMU, where SE1 is a BNS, L1 and/or L2 comprises a heteroaromatic system, including pyrole, thiophene, furane, pyrazole, imidazole, isoxazole, oxazole, isothiazole, thiazole, pyridine and perylene bisimides, and SE2 is a polyolefine.

C11.11.1: a CMU, where SE1 is a BNS, L1 and/or L2 comprises a fused ring system, composed of either aromatic, non-aromatic or anti-aromatic rings or combinations thereof, and.

C11.11.2: a CMU, where SE1 is a BNS, L1 and/or L2 comprises a fused ring system, composed of either aromatic, non-aromatic or anti-aromatic rings or combinations thereof, and SE2 is copolymer.

C11.11.3: a CMU, where SE1 is a BNS, L1 and/or L2 comprises a fused ring system, composed of either aromatic, non-aromatic or anti-aromatic rings or combinations thereof, and SE2 is a high density polyethylene.

C11.11.4: a CMU, where SE1 is a BNS, L1 and/or L2 comprises a fused ring system, composed of either aromatic, non-aromatic or anti-aromatic rings or combinations thereof, and SE2 is a linear low density polyethylene.

C11.11.5: a CMU, where SE1 is a BNS, L1 and/or L2 comprises a fused ring system, composed of either aromatic, non-aromatic or anti-aromatic rings or combinations thereof, and SE2 is a low density polyethylene.

C11.11.6: a CMU, where SE1 is a BNS, L1 and/or L2 comprises a fused ring system, composed of either aromatic, non-aromatic or anti-aromatic rings or combinations thereof, and SE2 is a nylon.

C11.11.7: a CMU, where SE1 is a BNS, L1 and/or L2 comprises a fused ring system, composed of either aromatic, non-aromatic or anti-aromatic rings or combinations thereof, and SE2 is a polyamide.

C11.11.8: a CMU, where SE1 is a BNS, L1 and/or L2 comprises a fused ring system, composed of either aromatic, non-aromatic or anti-aromatic rings or combinations thereof, and SE2 is a polycarbonate.

C11.11.9: a CMU, where SE1 is a BNS, L1 and/or L2 comprises a fused ring system, composed of either aromatic, non-aromatic or anti-aromatic rings or combinations thereof, and SE2 is a polyethylene.

C11.11.10: a CMU, where SE1 is a BNS, L1 and/or L2 comprises a fused ring system, composed of either aromatic, non-aromatic or anti-aromatic rings or combinations thereof, and SE2 is a polymer.

C11.11.11: a CMU, where SE1 is a BNS, L1 and/or L2 comprises a fused ring system, composed of either aromatic, non-aromatic or anti-aromatic rings or combinations thereof, and SE2 is a polypropylene.

C11.11.12: a CMU, where SE1 is a BNS, L1 and/or L2 comprises a fused ring system, composed of either aromatic, non-aromatic or anti-aromatic rings or combinations thereof, and SE2 is a polystyrene.

C11.11.13: a CMU, where SE1 is a BNS, L1 and/or L2 comprises a fused ring system, composed of either aromatic, non-aromatic or anti-aromatic rings or combinations thereof, and SE2 is an epoxy-based polymer.

C11.11.14: a CMU, where SE1 is a BNS, L1 and/or L2 comprises a fused ring system, composed of either aromatic, non-aromatic or anti-aromatic rings or combinations thereof, and SE2 is a polyethylene terephtalate.

C11.11.15: a CMU, where SE1 is a BNS, L1 and/or L2 comprises a fused ring system, composed of either aromatic, non-aromatic or anti-aromatic rings or combinations thereof, and SE2 is a polyvinylchloride.

C11.11.16: a CMU, where SE1 is a BNS, L1 and/or L2 comprises a fused ring system, composed of either aromatic, non-aromatic or anti-aromatic rings or combinations thereof, and SE2 is a MWCNT.

C11.11.17: a CMU, where SE1 is a BNS, L1 and/or L2 comprises a fused ring system, composed of either aromatic, non-aromatic or anti-aromatic rings or combinations thereof, and SE2 is a SWCNT.

C11.11.18: a CMU, where SE1 is a BNS, L1 and/or L2 comprises a fused ring system, composed of either aromatic, non-aromatic or anti-aromatic rings or combinations thereof, and SE2 is a GS.

C11.11.19: a CMU, where SE1 is a BNS, L1 and/or L2 comprises a fused ring system, composed of either aromatic, non-aromatic or anti-aromatic rings or combinations thereof, and SE2 is a nanotube.

C11.11.20: a CMU, where SE1 is a BNS, L1 and/or L2 comprises a fused ring system, composed of either aromatic, non-aromatic or anti-aromatic rings or combinations thereof, and SE2 is a BNNT.

C11.11.21: a CMU, where SE1 is a BNS, L1 and/or L2 comprises a fused ring system, composed of either aromatic, non-aromatic or anti-aromatic rings or combinations thereof, and SE2 is a polyacrylate.

C11.11.22: a CMU, where SE1 is a BNS, L1 and/or L2 comprises a fused ring system, composed of either aromatic, non-aromatic or anti-aromatic rings or combinations thereof, and SE2 is a polyolefine.

C12.1.1: a CMU, where SE1 is a BNNT, and.

C12.1.2: a CMU, where SE1 is a BNNT, and SE2 is copolymer.

C12.1.3: a CMU, where SE1 is a BNNT, and SE2 is a high density polyethylene.

C12.1.4: a CMU, where SE1 is a BNNT, and SE2 is a linear low density polyethylene.

C12.1.5: a CMU, where SE1 is a BNNT, and SE2 is a low density polyethylene.

C12.1.6: a CMU, where SE1 is a BNNT, and SE2 is a nylon.

C12.1.7: a CMU, where SE1 is a BNNT, and SE2 is a polyamide.

C12.1.8: a CMU, where SE1 is a BNNT, and SE2 is a polycarbonate.

C12.1.9: a CMU, where SE1 is a BNNT, and SE2 is a polyethylene.

C12.1.10: a CMU, where SE1 is a BNNT, and SE2 is a polymer.

C12.1.11: a CMU, where SE1 is a BNNT, and SE2 is a polypropylene.

C12.1.12: a CMU, where SE1 is a BNNT, and SE2 is a polystyrene.

C12.1.13: a CMU, where SE1 is a BNNT, and SE2 is an epoxy-based polymer.

C12.1.14: a CMU, where SE1 is a BNNT, and SE2 is a polyethylene terephtalate.

C12.1.15: a CMU, where SE1 is a BNNT, and SE2 is a polyvinylchloride.

C12.1.16: a CMU, where SE1 is a BNNT, and SE2 is a MWCNT.

C12.1.17: a CMU, where SE1 is a BNNT, and SE2 is a SWCNT.

C12.1.18: a CMU, where SE1 is a BNNT, and SE2 is a GS.

C12.1.19: a CMU, where SE1 is a BNNT, and SE2 is a nanotube.

C12.1.20: a CMU, where SE1 is a BNNT, and SE2 is a BNNT.

C12.1.21: a CMU, where SE1 is a BNNT, and SE2 is a polyacrylate.

C12.1.22: a CMU, where SE1 is a BNNT, and SE2 is a polyolefine.

C12.2.1: a CMU, where SE1 is a BNNT, L1 and/or L2 comprises a non-covalent ligand, and.

C12.2.2: a CMU, where SE1 is a BNNT, L1 and/or L2 comprises a non-covalent ligand, and SE2 is copolymer.

C12.2.3: a CMU, where SE1 is a BNNT, L1 and/or L2 comprises a non-covalent ligand, and SE2 is a high density polyethylene.

C12.2.4: a CMU, where SE1 is a BNNT, L1 and/or L2 comprises a non-covalent ligand, and SE2 is a linear low density polyethylene.

C12.2.5: a CMU, where SE1 is a BNNT, L1 and/or L2 comprises a non-covalent ligand, and SE2 is a low density polyethylene.

C12.2.6: a CMU, where SE1 is a BNNT, L1 and/or L2 comprises a non-covalent ligand, and SE2 is a nylon.

C12.2.7: a CMU, where SE1 is a BNNT, L1 and/or L2 comprises a non-covalent ligand, and SE2 is a polyamide.

C12.2.8: a CMU, where SE1 is a BNNT, L1 and/or L2 comprises a non-covalent ligand, and SE2 is a polycarbonate.

C12.2.9: a CMU, where SE1 is a BNNT, L1 and/or L2 comprises a non-covalent ligand, and SE2 is a polyethylene.

C12.2.10: a CMU, where SE1 is a BNNT, L1 and/or L2 comprises a non-covalent ligand, and SE2 is a polymer.

C12.2.11: a CMU, where SE1 is a BNNT, L1 and/or L2 comprises a non-covalent ligand, and SE2 is a polypropylene.

C12.2.12: a CMU, where SE1 is a BNNT, L1 and/or L2 comprises a non-covalent ligand, and SE2 is a polystyrene.

C12.2.13: a CMU, where SE1 is a BNNT, L1 and/or L2 comprises a non-covalent ligand, and SE2 is an epoxy-based polymer.

C12.2.14: a CMU, where SE1 is a BNNT, L1 and/or L2 comprises a non-covalent ligand, and SE2 is a polyethylene terephtalate.

C12.2.15: a CMU, where SE1 is a BNNT, L1 and/or L2 comprises a non-covalent ligand, and SE2 is a polyvinylchloride.

C12.2.16: a CMU, where SE1 is a BNNT, L1 and/or L2 comprises a non-covalent ligand, and SE2 is a MWCNT.

C12.2.17: a CMU, where SE1 is a BNNT, L1 and/or L2 comprises a non-covalent ligand, and SE2 is a SWCNT.

C12.2.18: a CMU, where SE1 is a BNNT, L1 and/or L2 comprises a non-covalent ligand, and SE2 is a GS.

C12.2.19: a CMU, where SE1 is a BNNT, L1 and/or L2 comprises a non-covalent ligand, and SE2 is a nanotube.

C12.2.20: a CMU, where SE1 is a BNNT, L1 and/or L2 comprises a non-covalent ligand, and SE2 is a BNNT.

C12.2.21: a CMU, where SE1 is a BNNT, L1 and/or L2 comprises a non-covalent ligand, and SE2 is a polyacrylate.

C12.2.22: a CMU, where SE1 is a BNNT, L1 and/or L2 comprises a non-covalent ligand, and SE2 is a polyolefine.

C12.3.1: a CMU, where SE1 is a BNNT, L1 and/or L2 comprises a amino-substituted hydrocarbon, and.

C12.3.2: a CMU, where SE1 is a BNNT, L1 and/or L2 comprises a amino-substituted hydrocarbon, and SE2 is copolymer.

C12.3.3: a CMU, where SE1 is a BNNT, L1 and/or L2 comprises a amino-substituted hydrocarbon, and SE2 is a high density polyethylene.

C12.3.4: a CMU, where SE1 is a BNNT, L1 and/or L2 comprises a amino-substituted hydrocarbon, and SE2 is a linear low density polyethylene.

C12.3.5: a CMU, where SE1 is a BNNT, L1 and/or L2 comprises a amino-substituted hydrocarbon, and SE2 is a low density polyethylene.

C12.3.6: a CMU, where SE1 is a BNNT, L1 and/or L2 comprises a amino-substituted hydrocarbon, and SE2 is a nylon.

C12.3.7: a CMU, where SE1 is a BNNT, L1 and/or L2 comprises a amino-substituted hydrocarbon, and SE2 is a polyamide.

C12.3.8: a CMU, where SE1 is a BNNT, L1 and/or L2 comprises a amino-substituted hydrocarbon, and SE2 is a polycarbonate.

C12.3.9: a CMU, where SE1 is a BNNT, L1 and/or L2 comprises a amino-substituted hydrocarbon, and SE2 is a polyethylene.

C12.3.10: a CMU, where SE1 is a BNNT, L1 and/or L2 comprises a amino-substituted hydrocarbon, and SE2 is a polymer.

C12.3.11: a CMU, where SE1 is a BNNT, L1 and/or L2 comprises a amino-substituted hydrocarbon, and SE2 is a polypropylene.

C12.3.12: a CMU, where SE1 is a BNNT, L1 and/or L2 comprises a amino-substituted hydrocarbon, and SE2 is a polystyrene.

C12.3.13: a CMU, where SE1 is a BNNT, L1 and/or L2 comprises a amino-substituted hydrocarbon, and SE2 is an epoxy-based polymer.

C12.3.14: a CMU, where SE1 is a BNNT, L1 and/or L2 comprises a amino-substituted hydrocarbon, and SE2 is a polyethylene terephtalate.

C12.3.15: a CMU, where SE1 is a BNNT, L1 and/or L2 comprises a amino-substituted hydrocarbon, and SE2 is a polyvinylchloride.

C12.3.16: a CMU, where SE1 is a BNNT, L1 and/or L2 comprises a amino-substituted hydrocarbon, and SE2 is a MWCNT.

C12.3.17: a CMU, where SE1 is a BNNT, L1 and/or L2 comprises a amino-substituted hydrocarbon, and SE2 is a SWCNT.

C12.3.18: a CMU, where SE1 is a BNNT, L1 and/or L2 comprises a amino-substituted hydrocarbon, and SE2 is a GS.

C12.3.19: a CMU, where SE1 is a BNNT, L1 and/or L2 comprises a amino-substituted hydrocarbon, and SE2 is a nanotube.

C12.3.20: a CMU, where SE1 is a BNNT, L1 and/or L2 comprises a amino-substituted hydrocarbon, and SE2 is a BNNT.

C12.3.21: a CMU, where SE1 is a BNNT, L1 and/or L2 comprises a amino-substituted hydrocarbon, and SE2 is a polyacrylate.

C12.3.22: a CMU, where SE1 is a BNNT, L1 and/or L2 comprises a amino-substituted hydrocarbon, and SE2 is a polyolefine.

C12.4.1: a CMU, where SE1 is a BNNT, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and.

C12.4.2: a CMU, where SE1 is a BNNT, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and SE2 is copolymer.

C12.4.3: a CMU, where SE1 is a BNNT, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and SE2 is a high density polyethylene.

C12.4.4: a CMU, where SE1 is a BNNT, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and SE2 is a linear low density polyethylene.

C12.4.5: a CMU, where SE1 is a BNNT, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and SE2 is a low density polyethylene.

C12.4.6: a CMU, where SE1 is a BNNT, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and SE2 is a nylon.

C12.4.7: a CMU, where SE1 is a BNNT, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and SE2 is a polyamide.

C12.4.8: a CMU, where SE1 is a BNNT, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and SE2 is a polycarbonate.

C12.4.9: a CMU, where SE1 is a BNNT, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and SE2 is a polyethylene.

C12.4.10: a CMU, where SE1 is a BNNT, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and SE2 is a polymer.

C12.4.11: a CMU, where SE1 is a BNNT, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and SE2 is a polypropylene.

C12.4.12: a CMU, where SE1 is a BNNT, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and SE2 is a polystyrene.

C12.4.13: a CMU, where SE1 is a BNNT, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and SE2 is an epoxy-based polymer.

C12.4.14: a CMU, where SE1 is a BNNT, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and SE2 is a polyethylene terephtalate.

C12.4.15: a CMU, where SE1 is a BNNT, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and SE2 is a polyvinylchloride.

C12.4.16: a CMU, where SE1 is a BNNT, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and SE2 is a MWCNT.

C12.4.17: a CMU, where SE1 is a BNNT, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and SE2 is a SWCNT.

C12.4.18: a CMU, where SE1 is a BNNT, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and SE2 is a GS.

C12.4.19: a CMU, where SE1 is a BNNT, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and SE2 is a nanotube.

C12.4.20: a CMU, where SE1 is a BNNT, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and SE2 is a BNNT.

C12.4.21: a CMU, where SE1 is a BNNT, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and SE2 is a polyacrylate.

C12.4.22: a CMU, where SE1 is a BNNT, L1 and/or L2 comprises a aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, and SE2 is a polyolefine.

C12.5.1: a CMU, where SE1 is a BNNT, L1 and/or L2 comprises a halogen, nitro group, amine, thiol, alcohol, ester, amide, carboxylic acid, phenol, indole, imidazole, sulfonate or phophate, and.

C12.5.2: a CMU, where SE1 is a BNNT, L1 and/or L2 comprises a halogen, nitro group, amine, thiol, alcohol, ester, amide, carboxylic acid, phenol, indole, imidazole, sulfonate or phophate, and SE2 is copolymer.

C12.5.3: a CMU, where SE1 is a BNNT, L1 and/or L2 comprises a halogen, nitro group, amine, thiol, alcohol, ester, amide, carboxylic acid, phenol, indole, imidazole, sulfonate or phophate, and SE2 is a high density polyethylene.

C12.5.4: a CMU, where SE1 is a BNNT, L1 and/or L2 comprises a halogen, nitro group, amine, thiol, alcohol, ester, amide, carboxylic acid, phenol, indole, imidazole, sulfonate or phophate, and SE2 is a linear low density polyethylene.

C12.5.5: a CMU, where SE1 is a BNNT, L1 and/or L2 comprises a halogen, nitro group, amine, thiol, alcohol, ester, amide, carboxylic acid, phenol, indole, imidazole, sulfonate or phophate, and SE2 is a low density polyethylene.

C12.5.6: a CMU, where SE1 is a BNNT, L1 and/or L2 comprises a halogen, nitro group, amine, thiol, alcohol, ester, amide, carboxylic acid, phenol, indole, imidazole, sulfonate or phophate, and SE2 is a nylon.

C12.5.7: a CMU, where SE1 is a BNNT, L1 and/or L2 comprises a halogen, nitro group, amine, thiol, alcohol, ester, amide, carboxylic acid, phenol, indole, imidazole, sulfonate or phophate, and SE2 is a polyamide.

C12.5.8: a CMU, where SE1 is a BNNT, L1 and/or L2 comprises a halogen, nitro group, amine, thiol, alcohol, ester, amide, carboxylic acid, phenol, indole, imidazole, sulfonate or phophate, and SE2 is a polycarbonate.

C12.5.9: a CMU, where SE1 is a BNNT, L1 and/or L2 comprises a halogen, nitro group, amine, thiol, alcohol, ester, amide, carboxylic acid, phenol, indole, imidazole, sulfonate or phophate, and SE2 is a polyethylene.

C12.5.10: a CMU, where SE1 is a BNNT, L1 and/or L2 comprises a halogen, nitro group, amine, thiol, alcohol, ester, amide, carboxylic acid, phenol, indole, imidazole, sulfonate or phophate, and SE2 is a polymer.

C12.5.11: a CMU, where SE1 is a BNNT, L1 and/or L2 comprises a halogen, nitro group, amine, thiol, alcohol, ester, amide, carboxylic acid, phenol, indole, imidazole, sulfonate or phophate, and SE2 is a polypropylene.

C12.5.12: a CMU, where SE1 is a BNNT, L1 and/or L2 comprises a halogen, nitro group, amine, thiol, alcohol, ester, amide, carboxylic acid, phenol, indole, imidazole, sulfonate or phophate, and SE2 is a polystyrene.

C12.5.13: a CMU, where SE1 is a BNNT, L1 and/or L2 comprises a halogen, nitro group, amine, thiol, alcohol, ester, amide, carboxylic acid, phenol, indole, imidazole, sulfonate or phophate, and SE2 is an epoxy-based polymer.

C12.5.14: a CMU, where SE1 is a BNNT, L1 and/or L2 comprises a halogen, nitro group, amine, thiol, alcohol, ester, amide, carboxylic acid, phenol, indole, imidazole, sulfonate or phophate, and SE2 is a polyethylene terephtalate.

C12.5.15: a CMU, where SE1 is a BNNT, L1 and/or L2 comprises a halogen, nitro group, amine, thiol, alcohol, ester, amide, carboxylic acid, phenol, indole, imidazole, sulfonate or phophate, and SE2 is a polyvinylchloride.

C12.5.16: a CMU, where SE1 is a BNNT, L1 and/or L2 comprises a halogen, nitro group, amine, thiol, alcohol, ester, amide, carboxylic acid, phenol, indole, imidazole, sulfonate or phophate, and SE2 is a MWCNT.

C12.5.17: a CMU, where SE1 is a BNNT, L1 and/or L2 comprises a halogen, nitro group, amine, thiol, alcohol, ester, amide, carboxylic acid, phenol, indole, imidazole, sulfonate or phophate, and SE2 is a SWCNT.

C12.5.18: a CMU, where SE1 is a BNNT, L1 and/or L2 comprises a halogen, nitro group, amine, thiol, alcohol, ester, amide, carboxylic acid, phenol, indole, imidazole, sulfonate or phophate, and SE2 is a GS.

C12.5.19: a CMU, where SE1 is a BNNT, L1 and/or L2 comprises a halogen, nitro group, amine, thiol, alcohol, ester, amide, carboxylic acid, phenol, indole, imidazole, sulfonate or phophate, and SE2 is a nanotube.

C12.5.20: a CMU, where SE1 is a BNNT, L1 and/or L2 comprises a halogen, nitro group, amine, thiol, alcohol, ester, amide, carboxylic acid, phenol, indole, imidazole, sulfonate or phophate, and SE2 is a BNNT.

C12.5.21: a CMU, where SE1 is a BNNT, L1 and/or L2 comprises a halogen, nitro group, amine, thiol, alcohol, ester, amide, carboxylic acid, phenol, indole, imidazole, sulfonate or phophate, and SE2 is a polyacrylate.

C12.5.22: a CMU, where SE1 is a BNNT, L1 and/or L2 comprises a halogen, nitro group, amine, thiol, alcohol, ester, amide, carboxylic acid, phenol, indole, imidazole, sulfonate or phophate, and SE2 is a polyolefine.

C12.6.1: a CMU, where SE1 is a BNNT, L1 and/or L2 comprises an C1-C10 alkane, and.

C12.6.2: a CMU, where SE1 is a BNNT, L1 and/or L2 comprises an C1-C10 alkane, and SE2 is copolymer.

C12.6.3: a CMU, where SE1 is a BNNT, L1 and/or L2 comprises an C1-C10 alkane, and SE2 is a high density polyethylene.

C12.6.4: a CMU, where SE1 is a BNNT, L1 and/or L2 comprises an C1-C10 alkane, and SE2 is a linear low density polyethylene.

C12.6.5: a CMU, where SE1 is a BNNT, L1 and/or L2 comprises an C1-C10 alkane, and SE2 is a low density polyethylene.

C12.6.6: a CMU, where SE1 is a BNNT, L1 and/or L2 comprises an C1-C10 alkane, and SE2 is a nylon.

C12.6.7: a CMU, where SE1 is a BNNT, L1 and/or L2 comprises an C1-C10 alkane, and SE2 is a polyamide.

C12.6.8: a CMU, where SE1 is a BNNT, L1 and/or L2 comprises an C1-C10 alkane, and SE2 is a polycarbonate.

C12.6.9: a CMU, where SE1 is a BNNT, L1 and/or L2 comprises an C1-C10 alkane, and SE2 is a polyethylene.

C12.6.10: a CMU, where SE1 is a BNNT, L1 and/or L2 comprises an C1-C10 alkane, and SE2 is a polymer.

C12.6.11: a CMU, where SE1 is a BNNT, L1 and/or L2 comprises an C1-C10 alkane, and SE2 is a polypropylene.

C12.6.12: a CMU, where SE1 is a BNNT, L1 and/or L2 comprises an C1-C10 alkane, and SE2 is a polystyrene.

C12.6.13: a CMU, where SE1 is a BNNT, L1 and/or L2 comprises an C1-C10 alkane, and SE2 is an epoxy-based polymer.

C12.6.14: a CMU, where SE1 is a BNNT, L1 and/or L2 comprises an C1-C10 alkane, and SE2 is a polyethylene terephtalate.

C12.6.15: a CMU, where SE1 is a BNNT, L1 and/or L2 comprises an C1-C10 alkane, and SE2 is a polyvinylchloride.

C12.6.16: a CMU, where SE1 is a BNNT, L1 and/or L2 comprises an C1-C10 alkane, and SE2 is a MWCNT.

C12.6.17: a CMU, where SE1 is a BNNT, L1 and/or L2 comprises an C1-C10 alkane, and SE2 is a SWCNT.

C12.6.18: a CMU, where SE1 is a BNNT, L1 and/or L2 comprises an C1-C10 alkane, and SE2 is a GS.

C12.6.19: a CMU, where SE1 is a BNNT, L1 and/or L2 comprises an C1-C10 alkane, and SE2 is a nanotube.

C12.6.20: a CMU, where SE1 is a BNNT, L1 and/or L2 comprises an C1-C10 alkane, and SE2 is a BNNT.

C12.6.21: a CMU, where SE1 is a BNNT, L1 and/or L2 comprises an C1-C10 alkane, and SE2 is a polyacrylate.

C12.6.22: a CMU, where SE1 is a BNNT, L1 and/or L2 comprises an C1-C10 alkane, and SE2 is a polyolefine.

C12.7.1: a CMU, where SE1 is a BNNT, L1 and/or L2 comprises a detergent comprising a C4-C25 alkane and a polar end group, and.

C12.7.2: a CMU, where SE1 is a BNNT, L1 and/or L2 comprises a detergent comprising a C4-C25 alkane and a polar end group, and SE2 is copolymer.

C12.7.3: a CMU, where SE1 is a BNNT, L1 and/or L2 comprises a detergent comprising a C4-C25 alkane and a polar end group, and SE2 is a high density polyethylene.

C12.7.4: a CMU, where SE1 is a BNNT, L1 and/or L2 comprises a detergent comprising a C4-C25 alkane and a polar end group, and SE2 is a linear low density polyethylene.

C12.7.5: a CMU, where SE1 is a BNNT, L1 and/or L2 comprises a detergent comprising a C4-C25 alkane and a polar end group, and SE2 is a low density polyethylene.

C12.7.6: a CMU, where SE1 is a BNNT, L1 and/or L2 comprises a detergent comprising a C4-C25 alkane and a polar end group, and SE2 is a nylon.

C12.7.7: a CMU, where SE1 is a BNNT, L1 and/or L2 comprises a detergent comprising a C4-C25 alkane and a polar end group, and SE2 is a polyamide.

C12.7.8: a CMU, where SE1 is a BNNT, L1 and/or L2 comprises a detergent comprising a C4-C25 alkane and a polar end group, and SE2 is a polycarbonate.

C12.7.9: a CMU, where SE1 is a BNNT, L1 and/or L2 comprises a detergent comprising a C4-C25 alkane and a polar end group, and SE2 is a polyethylene.

C12.7.10: a CMU, where SE1 is a BNNT, L1 and/or L2 comprises a detergent comprising a C4-C25 alkane and a polar end group, and SE2 is a polymer.

C12.7.11: a CMU, where SE1 is a BNNT, L1 and/or L2 comprises a detergent comprising a C4-C25 alkane and a polar end group, and SE2 is a polypropylene.

C12.7.12: a CMU, where SE1 is a BNNT, L1 and/or L2 comprises a detergent comprising a C4-C25 alkane and a polar end group, and SE2 is a polystyrene.

C12.7.13: a CMU, where SE1 is a BNNT, L1 and/or L2 comprises a detergent comprising a C4-C25 alkane and a polar end group, and SE2 is an epoxy-based polymer.

C12.7.14: a CMU, where SE1 is a BNNT, L1 and/or L2 comprises a detergent comprising a C4-C25 alkane and a polar end group, and SE2 is a polyethylene terephtalate.

C12.7.15: a CMU, where SE1 is a BNNT, L1 and/or L2 comprises a detergent comprising a C4-C25 alkane and a polar end group, and SE2 is a polyvinylchloride.

C12.7.16: a CMU, where SE1 is a BNNT, L1 and/or L2 comprises a detergent comprising a C4-C25 alkane and a polar end group, and SE2 is a MWCNT.

C12.7.17: a CMU, where SE1 is a BNNT, L1 and/or L2 comprises a detergent comprising a C4-C25 alkane and a polar end group, and SE2 is a SWCNT.

C12.7.18: a CMU, where SE1 is a BNNT, L1 and/or L2 comprises a detergent comprising a C4-C25 alkane and a polar end group, and SE2 is a GS.

C12.7.19: a CMU, where SE1 is a BNNT, L1 and/or L2 comprises a detergent comprising a C4-C25 alkane and a polar end group, and SE2 is a nanotube.

C12.7.20: a CMU, where SE1 is a BNNT, L1 and/or L2 comprises a detergent comprising a C4-C25 alkane and a polar end group, and SE2 is a BNNT.

C12.7.21: a CMU, where SE1 is a BNNT, L1 and/or L2 comprises a detergent comprising a C4-C25 alkane and a polar end group, and SE2 is a polyacrylate.

C12.7.22: a CMU, where SE1 is a BNNT, L1 and/or L2 comprises a detergent comprising a C4-C25 alkane and a polar end group, and SE2 is a polyolefine.

C12.8.1: a CMU, where SE1 is a BNNT, L1 and/or L2 comprises a lactam, such as N-methyl-pyrrolidone and lactone, and.

C12.8.2: a CMU, where SE1 is a BNNT, L1 and/or L2 comprises a lactam, such as N-methyl-pyrrolidone and lactone, and SE2 is copolymer.

C12.8.3: a CMU, where SE1 is a BNNT, L1 and/or L2 comprises a lactam, such as N-methyl-pyrrolidone and lactone, and SE2 is a high density polyethylene.

C12.8.4: a CMU, where SE1 is a BNNT, L1 and/or L2 comprises a lactam, such as N-methyl-pyrrolidone and lactone, and SE2 is a linear low density polyethylene.

C12.8.5: a CMU, where SE1 is a BNNT, L1 and/or L2 comprises a lactam, such as N-methyl-pyrrolidone and lactone, and SE2 is a low density polyethylene.

C12.8.6: a CMU, where SE1 is a BNNT, L1 and/or L2 comprises a lactam, such as N-methyl-pyrrolidone and lactone, and SE2 is a nylon.

C12.8.7: a CMU, where SE1 is a BNNT, L1 and/or L2 comprises a lactam, such as N-methyl-pyrrolidone and lactone, and SE2 is a polyamide.

C12.8.8: a CMU, where SE1 is a BNNT, L1 and/or L2 comprises a lactam, such as N-methyl-pyrrolidone and lactone, and SE2 is a polycarbonate.

C12.8.9: a CMU, where SE1 is a BNNT, L1 and/or L2 comprises a lactam, such as N-methyl-pyrrolidone and lactone, and SE2 is a polyethylene.

C12.8.10: a CMU, where SE1 is a BNNT, L1 and/or L2 comprises a lactam, such as N-methyl-pyrrolidone and lactone, and SE2 is a polymer.

C12.8.11: a CMU, where SE1 is a BNNT, L1 and/or L2 comprises a lactam, such as N-methyl-pyrrolidone and lactone, and SE2 is a polypropylene.

C12.8.12: a CMU, where SE1 is a BNNT, L1 and/or L2 comprises a lactam, such as N-methyl-pyrrolidone and lactone, and SE2 is a polystyrene.

C12.8.13: a CMU, where SE1 is a BNNT, L1 and/or L2 comprises a lactam, such as N-methyl-pyrrolidone and lactone, and SE2 is an epoxy-based polymer.

C12.8.14: a CMU, where SE1 is a BNNT, L1 and/or L2 comprises a lactam, such as N-methyl-pyrrolidone and lactone, and SE2 is a polyethylene terephtalate.

C12.8.15: a CMU, where SE1 is a BNNT, L1 and/or L2 comprises a lactam, such as N-methyl-pyrrolidone and lactone, and SE2 is a polyvinylchloride.

C12.8.16: a CMU, where SE1 is a BNNT, L1 and/or L2 comprises a lactam, such as N-methyl-pyrrolidone and lactone, and SE2 is a MWCNT.

C12.8.17: a CMU, where SE1 is a BNNT, L1 and/or L2 comprises a lactam, such as N-methyl-pyrrolidone and lactone, and SE2 is a SWCNT.

C12.8.18: a CMU, where SE1 is a BNNT, L1 and/or L2 comprises a lactam, such as N-methyl-pyrrolidone and lactone, and SE2 is a GS.

C12.8.19: a CMU, where SE1 is a BNNT, L1 and/or L2 comprises a lactam, such as N-methyl-pyrrolidone and lactone, and SE2 is a nanotube.

C12.8.20: a CMU, where SE1 is a BNNT, L1 and/or L2 comprises a lactam, such as N-methyl-pyrrolidone and lactone, and SE2 is a BNNT.

C12.8.21: a CMU, where SE1 is a BNNT, L1 and/or L2 comprises a lactam, such as N-methyl-pyrrolidone and lactone, and SE2 is a polyacrylate.

C12.8.22: a CMU, where SE1 is a BNNT, L1 and/or L2 comprises a lactam, such as N-methyl-pyrrolidone and lactone, and SE2 is a polyolefine.

C12.9.1: a CMU, where SE1 is a BNNT, L1 and/or L2 comprises a amino acid residue such as phenylalanine, tyrosine, tryptophan, or histidine, and.

C12.9.2: a CMU, where SE1 is a BNNT, L1 and/or L2 comprises a amino acid residue such as phenylalanine, tyrosine, tryptophan, or histidine, and SE2 is copolymer.

C12.9.3: a CMU, where SE1 is a BNNT, L1 and/or L2 comprises a amino acid residue such as phenylalanine, tyrosine, tryptophan, or histidine, and SE2 is a high density polyethylene.

C12.9.4: a CMU, where SE1 is a BNNT, L1 and/or L2 comprises a amino acid residue such as phenylalanine, tyrosine, tryptophan, or histidine, and SE2 is a linear low density polyethylene.

C12.9.5: a CMU, where SE1 is a BNNT, L1 and/or L2 comprises a amino acid residue such as phenylalanine, tyrosine, tryptophan, or histidine, and SE2 is a low density polyethylene.

C12.9.6: a CMU, where SE1 is a BNNT, L1 and/or L2 comprises a amino acid residue such as phenylalanine, tyrosine, tryptophan, or histidine, and SE2 is a nylon.

C12.9.7: a CMU, where SE1 is a BNNT, L1 and/or L2 comprises a amino acid residue such as phenylalanine, tyrosine, tryptophan, or histidine, and SE2 is a polyamide.

C12.9.8: a CMU, where SE1 is a BNNT, L1 and/or L2 comprises a amino acid residue such as phenylalanine, tyrosine, tryptophan, or histidine, and SE2 is a polycarbonate.

C12.9.9: a CMU, where SE1 is a BNNT, L1 and/or L2 comprises a amino acid residue such as phenylalanine, tyrosine, tryptophan, or histidine, and SE2 is a polyethylene.

C12.9.10: a CMU, where SE1 is a BNNT, L1 and/or L2 comprises a amino acid residue such as phenylalanine, tyrosine, tryptophan, or histidine, and SE2 is a polymer.

C12.9.11: a CMU, where SE1 is a BNNT, L1 and/or L2 comprises a amino acid residue such as phenylalanine, tyrosine, tryptophan, or histidine, and SE2 is a polypropylene.

C12.9.12: a CMU, where SE1 is a BNNT, L1 and/or L2 comprises a amino acid residue such as phenylalanine, tyrosine, tryptophan, or histidine, and SE2 is a polystyrene.

C12.9.13: a CMU, where SE1 is a BNNT, L1 and/or L2 comprises a amino acid residue such as phenylalanine, tyrosine, tryptophan, or histidine, and SE2 is an epoxy-based polymer.

C12.9.14: a CMU, where SE1 is a BNNT, L1 and/or L2 comprises a amino acid residue such as phenylalanine, tyrosine, tryptophan, or histidine, and SE2 is a polyethylene terephtalate.

C12.9.15: a CMU, where SE1 is a BNNT, L1 and/or L2 comprises a amino acid residue such as phenylalanine, tyrosine, tryptophan, or histidine, and SE2 is a polyvinylchloride.

C12.9.16: a CMU, where SE1 is a BNNT, L1 and/or L2 comprises a amino acid residue such as phenylalanine, tyrosine, tryptophan, or histidine, and SE2 is a MWCNT.

C12.9.17: a CMU, where SE1 is a BNNT, L1 and/or L2 comprises a amino acid residue such as phenylalanine, tyrosine, tryptophan, or histidine, and SE2 is a SWCNT.

C12.9.18: a CMU, where SE1 is a BNNT, L1 and/or L2 comprises a amino acid residue such as phenylalanine, tyrosine, tryptophan, or histidine, and SE2 is a GS.

C12.9.19: a CMU, where SE1 is a BNNT, L1 and/or L2 comprises a amino acid residue such as phenylalanine, tyrosine, tryptophan, or histidine, and SE2 is a nanotube.

C12.9.20: a CMU, where SE1 is a BNNT, L1 and/or L2 comprises a amino acid residue such as phenylalanine, tyrosine, tryptophan, or histidine, and SE2 is a BNNT.

C12.9.21: a CMU, where SE1 is a BNNT, L1 and/or L2 comprises a amino acid residue such as phenylalanine, tyrosine, tryptophan, or histidine, and SE2 is a polyacrylate.

C12.9.22: a CMU, where SE1 is a BNNT, L1 and/or L2 comprises a amino acid residue such as phenylalanine, tyrosine, tryptophan, or histidine, and SE2 is a polyolefine.

C12.10.1: a CMU, where SE1 is a BNNT, L1 and/or L2 comprises a heteroaromatic system, including pyrole, thiophene, furane, pyrazole, imidazole, isoxazole, oxazole, isothiazole, thiazole, pyridine and perylene bisimides, and.

C12.10.2: a CMU, where SE1 is a BNNT, L1 and/or L2 comprises a heteroaromatic system, including pyrole, thiophene, furane, pyrazole, imidazole, isoxazole, oxazole, isothiazole, thiazole, pyridine and perylene bisimides, and SE2 is copolymer.

C12.10.3: a CMU, where SE1 is a BNNT, L1 and/or L2 comprises a heteroaromatic system, including pyrole, thiophene, furane, pyrazole, imidazole, isoxazole, oxazole, isothiazole, thiazole, pyridine and perylene bisimides, and SE2 is a high density polyethylene.

C12.10.4: a CMU, where SE1 is a BNNT, L1 and/or L2 comprises a heteroaromatic system, including pyrole, thiophene, furane, pyrazole, imidazole, isoxazole, oxazole, isothiazole, thiazole, pyridine and perylene bisimides, and SE2 is a linear low density polyethylene.

C12.10.5: a CMU, where SE1 is a BNNT, L1 and/or L2 comprises a heteroaromatic system, including pyrole, thiophene, furane, pyrazole, imidazole, isoxazole, oxazole, isothiazole, thiazole, pyridine and perylene bisimides, and SE2 is a low density polyethylene.

C12.10.6: a CMU, where SE1 is a BNNT, L1 and/or L2 comprises a heteroaromatic system, including pyrole, thiophene, furane, pyrazole, imidazole, isoxazole, oxazole, isothiazole, thiazole, pyridine and perylene bisimides, and SE2 is a nylon.

C12.10.7: a CMU, where SE1 is a BNNT, L1 and/or L2 comprises a heteroaromatic system, including pyrole, thiophene, furane, pyrazole, imidazole, isoxazole, oxazole, isothiazole, thiazole, pyridine and perylene bisimides, and SE2 is a polyamide.

C12.10.8: a CMU, where SE1 is a BNNT, L1 and/or L2 comprises a heteroaromatic system, including pyrole, thiophene, furane, pyrazole, imidazole, isoxazole, oxazole, isothiazole, thiazole, pyridine and perylene bisimides, and SE2 is a polycarbonate.

C12.10.9: a CMU, where SE1 is a BNNT, L1 and/or L2 comprises a heteroaromatic system, including pyrole, thiophene, furane, pyrazole, imidazole, isoxazole, oxazole, isothiazole, thiazole, pyridine and perylene bisimides, and SE2 is a polyethylene.

C12.10.10: a CMU, where SE1 is a BNNT, L1 and/or L2 comprises a heteroaromatic system, including pyrole, thiophene, furane, pyrazole, imidazole, isoxazole, oxazole, isothiazole, thiazole, pyridine and perylene bisimides, and SE2 is a polymer.

C12.10.11: a CMU, where SE1 is a BNNT, L1 and/or L2 comprises a heteroaromatic system, including pyrole, thiophene, furane, pyrazole, imidazole, isoxazole, oxazole, isothiazole, thiazole, pyridine and perylene bisimides, and SE2 is a polypropylene.

C12.10.12: a CMU, where SE1 is a BNNT, L1 and/or L2 comprises a heteroaromatic system, including pyrole, thiophene, furane, pyrazole, imidazole, isoxazole, oxazole, isothiazole, thiazole, pyridine and perylene bisimides, and SE2 is a polystyrene.

C12.10.13: a CMU, where SE1 is a BNNT, L1 and/or L2 comprises a heteroaromatic system, including pyrole, thiophene, furane, pyrazole, imidazole, isoxazole, oxazole, isothiazole, thiazole, pyridine and perylene bisimides, and SE2 is an epoxy-based polymer.

C12.10.14: a CMU, where SE1 is a BNNT, L1 and/or L2 comprises a heteroaromatic system, including pyrole, thiophene, furane, pyrazole, imidazole, isoxazole, oxazole, isothiazole, thiazole, pyridine and perylene bisimides, and SE2 is a polyethylene terephtalate.

C12.10.15: a CMU, where SE1 is a BNNT, L1 and/or L2 comprises a heteroaromatic system, including pyrole, thiophene, furane, pyrazole, imidazole, isoxazole, oxazole, isothiazole, thiazole, pyridine and perylene bisimides, and SE2 is a polyvinylchloride.

C12.10.16: a CMU, where SE1 is a BNNT, L1 and/or L2 comprises a heteroaromatic system, including pyrole, thiophene, furane, pyrazole, imidazole, isoxazole, oxazole, isothiazole, thiazole, pyridine and perylene bisimides, and SE2 is a MWCNT.

C12.10.17: a CMU, where SE1 is a BNNT, L1 and/or L2 comprises a heteroaromatic system, including pyrole, thiophene, furane, pyrazole, imidazole, isoxazole, oxazole, isothiazole, thiazole, pyridine and perylene bisimides, and SE2 is a SWCNT.

C12.10.18: a CMU, where SE1 is a BNNT, L1 and/or L2 comprises a heteroaromatic system, including pyrole, thiophene, furane, pyrazole, imidazole, isoxazole, oxazole, isothiazole, thiazole, pyridine and perylene bisimides, and SE2 is a GS.

C12.10.19: a CMU, where SE1 is a BNNT, L1 and/or L2 comprises a heteroaromatic system, including pyrole, thiophene, furane, pyrazole, imidazole, isoxazole, oxazole, isothiazole, thiazole, pyridine and perylene bisimides, and SE2 is a nanotube.

C12.10.20: a CMU, where SE1 is a BNNT, L1 and/or L2 comprises a heteroaromatic system, including pyrole, thiophene, furane, pyrazole, imidazole, isoxazole, oxazole, isothiazole, thiazole, pyridine and perylene bisimides, and SE2 is a BNNT.

C12.10.21: a CMU, where SE1 is a BNNT, L1 and/or L2 comprises a heteroaromatic system, including pyrole, thiophene, furane, pyrazole, imidazole, isoxazole, oxazole, isothiazole, thiazole, pyridine and perylene bisimides, and SE2 is a polyacrylate.

C12.10.22: a CMU, where SE1 is a BNNT, L1 and/or L2 comprises a heteroaromatic system, including pyrole, thiophene, furane, pyrazole, imidazole, isoxazole, oxazole, isothiazole, thiazole, pyridine and perylene bisimides, and SE2 is a polyolefine.

C12.11.1: a CMU, where SE1 is a BNNT, L1 and/or L2 comprises a fused ring system, composed of either aromatic, non-aromatic or anti-aromatic rings or combinations thereof, and.

C12.11.2: a CMU, where SE1 is a BNNT, L1 and/or L2 comprises a fused ring system, composed of either aromatic, non-aromatic or anti-aromatic rings or combinations thereof, and SE2 is copolymer.

C12.11.3: a CMU, where SE1 is a BNNT, L1 and/or L2 comprises a fused ring system, composed of either aromatic, non-aromatic or anti-aromatic rings or combinations thereof, and SE2 is a high density polyethylene.

C12.11.4: a CMU, where SE1 is a BNNT, L1 and/or L2 comprises a fused ring system, composed of either aromatic, non-aromatic or anti-aromatic rings or combinations thereof, and SE2 is a linear low density polyethylene.

C12.11.5: a CMU, where SE1 is a BNNT, L1 and/or L2 comprises a fused ring system, composed of either aromatic, non-aromatic or anti-aromatic rings or combinations thereof, and SE2 is a low density polyethylene.

C12.11.6: a CMU, where SE1 is a BNNT, L1 and/or L2 comprises a fused ring system, composed of either aromatic, non-aromatic or anti-aromatic rings or combinations thereof, and SE2 is a nylon.

C12.11.7: a CMU, where SE1 is a BNNT, L1 and/or L2 comprises a fused ring system, composed of either aromatic, non-aromatic or anti-aromatic rings or combinations thereof, and SE2 is a polyamide.

C12.11.8: a CMU, where SE1 is a BNNT, L1 and/or L2 comprises a fused ring system, composed of either aromatic, non-aromatic or anti-aromatic rings or combinations thereof, and SE2 is a polycarbonate.

C12.11.9: a CMU, where SE1 is a BNNT, L1 and/or L2 comprises a fused ring system, composed of either aromatic, non-aromatic or anti-aromatic rings or combinations thereof, and SE2 is a polyethylene.

C12.11.10: a CMU, where SE1 is a BNNT, L1 and/or L2 comprises a fused ring system, composed of either aromatic, non-aromatic or anti-aromatic rings or combinations thereof, and SE2 is a polymer.

C12.11.11: a CMU, where SE1 is a BNNT, L1 and/or L2 comprises a fused ring system, composed of either aromatic, non-aromatic or anti-aromatic rings or combinations thereof, and SE2 is a polypropylene.

C12.11.12: a CMU, where SE1 is a BNNT, L1 and/or L2 comprises a fused ring system, composed of either aromatic, non-aromatic or anti-aromatic rings or combinations thereof, and SE2 is a polystyrene.

C12.11.13: a CMU, where SE1 is a BNNT, L1 and/or L2 comprises a fused ring system, composed of either aromatic, non-aromatic or anti-aromatic rings or combinations thereof, and SE2 is an epoxy-based polymer.

C12.11.14: a CMU, where SE1 is a BNNT, L1 and/or L2 comprises a fused ring system, composed of either aromatic, non-aromatic or anti-aromatic rings or combinations thereof, and SE2 is a polyethylene terephtalate.

C12.11.15: a CMU, where SE1 is a BNNT, L1 and/or L2 comprises a fused ring system, composed of either aromatic, non-aromatic or anti-aromatic rings or combinations thereof, and SE2 is a polyvinylchloride.

C12.11.16: a CMU, where SE1 is a BNNT, L1 and/or L2 comprises a fused ring system, composed of either aromatic, non-aromatic or anti-aromatic rings or combinations thereof, and SE2 is a MWCNT.

C12.11.17: a CMU, where SE1 is a BNNT, L1 and/or L2 comprises a fused ring system, composed of either aromatic, non-aromatic or anti-aromatic rings or combinations thereof, and SE2 is a SWCNT.

C12.11.18: a CMU, where SE1 is a BNNT, L1 and/or L2 comprises a fused ring system, composed of either aromatic, non-aromatic or anti-aromatic rings or combinations thereof, and SE2 is a GS.

C12.11.19: a CMU, where SE1 is a BNNT, L1 and/or L2 comprises a fused ring system, composed of either aromatic, non-aromatic or anti-aromatic rings or combinations thereof, and SE2 is a nanotube.

C12.11.20: a CMU, where SE1 is a BNNT, L1 and/or L2 comprises a fused ring system, composed of either aromatic, non-aromatic or anti-aromatic rings or combinations thereof, and SE2 is a BNNT.

C12.11.21: a CMU, where SE1 is a BNNT, L1 and/or L2 comprises a fused ring system, composed of either aromatic, non-aromatic or anti-aromatic rings or combinations thereof, and SE2 is a polyacrylate.

C12.11.22: a CMU, where SE1 is a BNNT, L1 and/or L2 comprises a fused ring system, composed of either aromatic, non-aromatic or anti-aromatic rings or combinations thereof, and SE2 is a polyolefine.

Preferred embodiments are a CMU; or a composite material comprising a CMU;

or a composite material comprising a CMU and a matrix chosen from; a metal, a ceramic, organic matter, a plastic, a resin, a copolymer, a high density polyethylene (HDPE), a linear low density polyethylene (LLDPE), a low density polyethylene (LDPE), a nylon, a polyamide (PA), a polycarbonate (PC), a polyethylene (PE), a polymer, a polypropylene (PP), a polystyrene (PS), an epoxy-based polymer, a polyethylene terephtalate (PET), a polyvinylchloride (PVC); wherein the CMU is chosen from the following;

E1.1: a CMU, where SE1 is a carbon fibre and L1's affinity for SE1 is <1E-2 M.

E1.2: a CMU, where SE1 is a carbon fibre and L1's affinity for SE1 is <1E-3 M.

E1.3: a CMU, where SE1 is a carbon fibre and L1's affinity for SE1 is <1E-4 M.

E1.4: a CMU, where SE1 is a carbon fibre and L1's affinity for SE1 is <1E-5 M.

E1.5: a CMU, where SE1 is a carbon fibre and L1's affinity for SE1 is <1E-6 M.

E1.6: a CMU, where SE1 is a carbon fibre and L1's affinity for SE1 is <1E-7 M.

E1.7: a CMU, where SE1 is a carbon fibre and L1's affinity for SE1 is <1E-8 M.

E1.8: a CMU, where SE1 is a carbon fibre and L1's affinity for SE1 is <1E-9 M.

E1.9: a CMU, where SE1 is a carbon fibre and L1's affinity for SE1 is <1E-10 M.

E1.10: a CMU, where SE1 is a carbon fibre and L1's affinity for SE1 is <1E-11 M.

E2.1: a CMU, where SE1 is a carbon nanofibre and L1's affinity for SE1 is <1E-2 M.

E2.2: a CMU, where SE1 is a carbon nanofibre and L1's affinity for SE1 is <1E-3 M.

E2.3: a CMU, where SE1 is a carbon nanofibre and L1's affinity for SE1 is <1E-4 M.

E2.4: a CMU, where SE1 is a carbon nanofibre and L1's affinity for SE1 is <1E-5 M.

E2.5: a CMU, where SE1 is a carbon nanofibre and L1's affinity for SE1 is <1E-6 M.

E2.6: a CMU, where SE1 is a carbon nanofibre and L1's affinity for SE1 is <1E-7 M.

E2.7: a CMU, where SE1 is a carbon nanofibre and L1's affinity for SE1 is <1E-8 M.

E2.8: a CMU, where SE1 is a carbon nanofibre and L1's affinity for SE1 is <1E-9 M.

E2.9: a CMU, where SE1 is a carbon nanofibre and L1's affinity for SE1 is <1E-10 M.

E2.10: a CMU, where SE1 is a carbon nanofibre and L1's affinity for SE1 is <1E-11 M.

E3.1: a CMU, where SE1 is a carbon nanothread and L1's affinity for SE1 is <1E-2 M.

E3.2: a CMU, where SE1 is a carbon nanothread and L1's affinity for SE1 is <1E-3 M.

E3.3: a CMU, where SE1 is a carbon nanothread and L1's affinity for SE1 is <1E-4 M.

E3.4: a CMU, where SE1 is a carbon nanothread and L1's affinity for SE1 is <1E-5 M.

E3.5: a CMU, where SE1 is a carbon nanothread and L1's affinity for SE1 is <1E-6 M.

E3.6: a CMU, where SE1 is a carbon nanothread and L1's affinity for SE1 is <1E-7 M.

E3.7: a CMU, where SE1 is a carbon nanothread and L1's affinity for SE1 is <1E-8 M.

E3.8: a CMU, where SE1 is a carbon nanothread and L1's affinity for SE1 is <1E-9 M.

E3.9: a CMU, where SE1 is a carbon nanothread and L1's affinity for SE1 is <1E-10 M.

E3.10: a CMU, where SE1 is a carbon nanothread and L1's affinity for SE1 is <1E-11 M.

E4.1: a CMU, where SE1 is a composite material and L1's affinity for SE1 is <1E-2 M.

E4.2: a CMU, where SE1 is a composite material and L1's affinity for SE1 is <1E-3 M.

E4.3: a CMU, where SE1 is a composite material and L1's affinity for SE1 is <1E-4 M.

E4.4: a CMU, where SE1 is a composite material and L1's affinity for SE1 is <1E-5 M.

E4.5: a CMU, where SE1 is a composite material and L1's affinity for SE1 is <1E-6 M.

E4.6: a CMU, where SE1 is a composite material and L1's affinity for SE1 is <1E-7 M.

E4.7: a CMU, where SE1 is a composite material and L1's affinity for SE1 is <1E-8 M.

E4.8: a CMU, where SE1 is a composite material and L1's affinity for SE1 is <1E-9 M.

E4.9: a CMU, where SE1 is a composite material and L1's affinity for SE1 is <1E-10 M.

E4.10: a CMU, where SE1 is a composite material and L1's affinity for SE1 is <1E-11 M.

E5.1: a CMU, where SE1 is a fullerene and L1's affinity for SE1 is <1E-2 M.

E5.2: a CMU, where SE1 is a fullerene and L1's affinity for SE1 is <1E-3 M.

E5.3: a CMU, where SE1 is a fullerene and L1's affinity for SE1 is <1E-4 M.

E5.4: a CMU, where SE1 is a fullerene and L1's affinity for SE1 is <1E-5 M.

E5.5: a CMU, where SE1 is a fullerene and L1's affinity for SE1 is <1E-6 M.

E5.6: a CMU, where SE1 is a fullerene and L1's affinity for SE1 is <1E-7 M.

E5.7: a CMU, where SE1 is a fullerene and L1's affinity for SE1 is <1E-8 M.

E5.8: a CMU, where SE1 is a fullerene and L1's affinity for SE1 is <1E-9 M.

E5.9: a CMU, where SE1 is a fullerene and L1's affinity for SE1 is <1E-10 M.

E5.10: a CMU, where SE1 is a fullerene and L1's affinity for SE1 is <1E-11 M.

E6.1: a CMU, where SE1 is a MWCNT and L1's affinity for SE1 is <1E-2 M.

E6.2: a CMU, where SE1 is a MWCNT and L1's affinity for SE1 is <1E-3 M.

E6.3: a CMU, where SE1 is a MWCNT and L1's affinity for SE1 is <1E-4 M.

E6.4: a CMU, where SE1 is a MWCNT and L1's affinity for SE1 is <1E-5 M.

E6.5: a CMU, where SE1 is a MWCNT and L1's affinity for SE1 is <1E-6 M.

E6.6: a CMU, where SE1 is a MWCNT and L1's affinity for SE1 is <1E-7 M.

E6.7: a CMU, where SE1 is a MWCNT and L1's affinity for SE1 is <1E-8 M.

E6.8: a CMU, where SE1 is a MWCNT and L1's affinity for SE1 is <1E-9 M.

E6.9: a CMU, where SE1 is a MWCNT and L1's affinity for SE1 is <1E-10 M.

E6.10: a CMU, where SE1 is a MWCNT and L1's affinity for SE1 is <1E-11 M.

E7.1: a CMU, where SE1 is a SWCNT and L1's affinity for SE1 is <1E-2 M.

E7.2: a CMU, where SE1 is a SWCNT and L1's affinity for SE1 is <1E-3 M.

E7.3: a CMU, where SE1 is a SWCNT and L1's affinity for SE1 is <1E-4 M.

E7.4: a CMU, where SE1 is a SWCNT and L1's affinity for SE1 is <1E-5 M.

E7.5: a CMU, where SE1 is a SWCNT and L1's affinity for SE1 is <1E-6 M.

E7.6: a CMU, where SE1 is a SWCNT and L1's affinity for SE1 is <1E-7 M.

E7.7: a CMU, where SE1 is a SWCNT and L1's affinity for SE1 is <1E-8 M.

E7.8: a CMU, where SE1 is a SWCNT and L1's affinity for SE1 is <1E-9 M.

E7.9: a CMU, where SE1 is a SWCNT and L1's affinity for SE1 is <1E-10 M.

E7.10: a CMU, where SE1 is a SWCNT and L1's affinity for SE1 is <1E-11 M.

E8.1: a CMU, where SE1 is a GS and L1's affinity for SE1 is <1E-2 M.

E8.2: a CMU, where SE1 is a GS and L1's affinity for SE1 is <1E-3 M.

E8.3: a CMU, where SE1 is a GS and L1's affinity for SE1 is <1E-4 M.

E8.4: a CMU, where SE1 is a GS and L1's affinity for SE1 is <1E-5 M.

E8.5: a CMU, where SE1 is a GS and L1's affinity for SE1 is <1E-6 M.

E8.6: a CMU, where SE1 is a GS and L1's affinity for SE1 is <1E-7 M.

E8.7: a CMU, where SE1 is a GS and L1's affinity for SE1 is <1E-8 M.

E8.8: a CMU, where SE1 is a GS and L1's affinity for SE1 is <1E-9 M.

E8.9: a CMU, where SE1 is a GS and L1's affinity for SE1 is <1E-10 M.

E8.10: a CMU, where SE1 is a GS and L1's affinity for SE1 is <1E-11 M.

E9.1: a CMU, where SE1 is a nanotube and L1's affinity for SE1 is <1E-2 M.

E9.2: a CMU, where SE1 is a nanotube and L1's affinity for SE1 is <1E-3 M.

E9.3: a CMU, where SE1 is a nanotube and L1's affinity for SE1 is <1E-4 M.

E9.4: a CMU, where SE1 is a nanotube and L1's affinity for SE1 is <1E-5 M.

E9.5: a CMU, where SE1 is a nanotube and L1's affinity for SE1 is <1E-6 M.

E9.6: a CMU, where SE1 is a nanotube and L1's affinity for SE1 is <1E-7 M.

E9.7: a CMU, where SE1 is a nanotube and L1's affinity for SE1 is <1E-8 M.

E9.8: a CMU, where SE1 is a nanotube and L1's affinity for SE1 is <1E-9 M.

E9.9: a CMU, where SE1 is a nanotube and L1's affinity for SE1 is <1E-10 M.

E9.10: a CMU, where SE1 is a nanotube and L1's affinity for SE1 is <1E-11 M.

E10.1: a CMU, where SE1 is a one-layer molecule and L1's affinity for SE1 is <1E-2 M.

E10.2: a CMU, where SE1 is a one-layer molecule and L1's affinity for SE1 is <1E-3 M.

E10.3: a CMU, where SE1 is a one-layer molecule and L1's affinity for SE1 is <1E-4 M.

E10.4: a CMU, where SE1 is a one-layer molecule and L1's affinity for SE1 is <1E-5 M.

E10.5: a CMU, where SE1 is a one-layer molecule and L1's affinity for SE1 is <1E-6 M.

E10.6: a CMU, where SE1 is a one-layer molecule and L1's affinity for SE1 is <1E-7 M.

E10.7: a CMU, where SE1 is a one-layer molecule and L1's affinity for SE1 is <1E-8 M.

E10.8: a CMU, where SE1 is a one-layer molecule and L1's affinity for SE1 is <1E-9 M.

E10.9: a CMU, where SE1 is a one-layer molecule and L1's affinity for SE1 is <1E-10 M.

E10.10: a CMU, where SE1 is a one-layer molecule and L1's affinity for SE1 is <1E-11 M.

E11.1: a CMU, where SE1 is a one-atom layer molecule and L1's affinity for SE1 is <1E-2 M.

E11.2: a CMU, where SE1 is a one-atom layer molecule and L1's affinity for SE1 is <1E-3 M.

E11.3: a CMU, where SE1 is a one-atom layer molecule and L1's affinity for SE1 is <1E-4 M.

E11.4: a CMU, where SE1 is a one-atom layer molecule and L1's affinity for SE1 is <1E-5 M.

E11.5: a CMU, where SE1 is a one-atom layer molecule and L1's affinity for SE1 is <1E-6 M.

E11.6: a CMU, where SE1 is a one-atom layer molecule and L1's affinity for SE1 is <1E-7 M.

E11.7: a CMU, where SE1 is a one-atom layer molecule and L1's affinity for SE1 is <1E-8 M.

E11.8: a CMU, where SE1 is a one-atom layer molecule and L1's affinity for SE1 is <1E-9 M.

E11.9: a CMU, where SE1 is a one-atom layer molecule and L1's affinity for SE1 is <1E-10 M.

E11.10: a CMU, where SE1 is a one-atom layer molecule and L1's affinity for SE1 is <1E-11 M.

E12.1: a CMU, where SE1 is a functionalized CNT and L1's affinity for SE1 is <1E-2 M.

E12.2: a CMU, where SE1 is a functionalized CNT and L1's affinity for SE1 is <1E-3 M.

E12.3: a CMU, where SE1 is a functionalized CNT and L1's affinity for SE1 is <1E-4 M.

E12.4: a CMU, where SE1 is a functionalized CNT and L1's affinity for SE1 is <1E-5 M.

E12.5: a CMU, where SE1 is a functionalized CNT and L1's affinity for SE1 is <1E-6 M.

E12.6: a CMU, where SE1 is a functionalized CNT and L1's affinity for SE1 is <1E-7 M.

E12.7: a CMU, where SE1 is a functionalized CNT and L1's affinity for SE1 is <1E-8 M.

E12.8: a CMU, where SE1 is a functionalized CNT and L1's affinity for SE1 is <1E-9 M.

E12.9: a CMU, where SE1 is a functionalized CNT and L1's affinity for SE1 is <1E-10 M.

E12.10: a CMU, where SE1 is a functionalized CNT and L1's affinity for SE1 is <1E-11 M.

E13.1: a CMU, where SE1 is a functionalized graphene and L1's affinity for SE1 is <1E-2 M.

E13.2: a CMU, where SE1 is a functionalized graphene and L1's affinity for SE1 is <1E-3 M.

E13.3: a CMU, where SE1 is a functionalized graphene and L1's affinity for SE1 is <1E-4 M.

E13.4: a CMU, where SE1 is a functionalized graphene and L1's affinity for SE1 is <1E-5 M.

E13.5: a CMU, where SE1 is a functionalized graphene and L1's affinity for SE1 is <1E-6 M.

E13.6: a CMU, where SE1 is a functionalized graphene and L1's affinity for SE1 is <1E-7 M.

E13.7: a CMU, where SE1 is a functionalized graphene and L1's affinity for SE1 is <1E-8 M.

E13.8: a CMU, where SE1 is a functionalized graphene and L1's affinity for SE1 is <1E-9 M.

E13.9: a CMU, where SE1 is a functionalized graphene and L1's affinity for SE1 is <1E-10 M.

E13.10: a CMU, where SE1 is a functionalized graphene and L1's affinity for SE1 is <1E-11 M.

E14.1: a CMU, where SE1 is a functionalized BNNT or BNS and L1's affinity for SE1 is <1E-2 M.

E14.2: a CMU, where SE1 is a functionalized BNNT or BNS and L1's affinity for SE1 is <1E-3 M.

E14.3: a CMU, where SE1 is a functionalized BNNT or BNS and L1's affinity for SE1 is <1E-4 M.

E14.4: a CMU, where SE1 is a functionalized BNNT or BNS and L1's affinity for SE1 is <1E-5 M.

E14.5: a CMU, where SE1 is a functionalized BNNT or BNS and L1's affinity for SE1 is <1E-6 M.

E14.6: a CMU, where SE1 is a functionalized BNNT or BNS and L1's affinity for SE1 is <1E-7 M.

E14.7: a CMU, where SE1 is a functionalized BNNT or BNS and L1's affinity for SE1 is <1E-8 M.

E14.8: a CMU, where SE1 is a functionalized BNNT or BNS and L1's affinity for SE1 is <1E-9 M.

E14.9: a CMU, where SE1 is a functionalized BNNT or BNS and L1's affinity for SE1 is <1E-10 M.

E14.10: a CMU, where SE1 is a functionalized BNNT or BNS and L1's affinity for SE1 is <1E-11 M.

E15.1: a CMU, where SE1 is a multi-walled nanotube and L1's affinity for SE1 is <1E-2 M.

E15.2: a CMU, where SE1 is a multi-walled nanotube and L1's affinity for SE1 is <1E-3 M.

E15.3: a CMU, where SE1 is a multi-walled nanotube and L1's affinity for SE1 is <1E-4 M.

E15.4: a CMU, where SE1 is a multi-walled nanotube and L1's affinity for SE1 is <1E-5 M.

E15.5: a CMU, where SE1 is a multi-walled nanotube and L1's affinity for SE1 is <1E-6 M.

E15.6: a CMU, where SE1 is a multi-walled nanotube and L1's affinity for SE1 is <1E-7 M.

E15.7: a CMU, where SE1 is a multi-walled nanotube and L1's affinity for SE1 is <1E-8 M.

E15.8: a CMU, where SE1 is a multi-walled nanotube and L1's affinity for SE1 is <1E-9 M.

E15.9: a CMU, where SE1 is a multi-walled nanotube and L1's affinity for SE1 is <1E-10 M.

E15.10: a CMU, where SE1 is a multi-walled nanotube and L1's affinity for SE1 is <1E-11 M.

E16.1: a CMU, where SE1 is a single-walled nanotube and L1's affinity for SE1 is <1E-2 M.

E16.2: a CMU, where SE1 is a single-walled nanotube and L1's affinity for SE1 is <1E-3 M.

E16.3: a CMU, where SE1 is a single-walled nanotube and L1's affinity for SE1 is <1E-4 M.

E16.4: a CMU, where SE1 is a single-walled nanotube and L1's affinity for SE1 is <1E-5 M.

E16.5: a CMU, where SE1 is a single-walled nanotube and L1's affinity for SE1 is <1E-6 M.

E16.6: a CMU, where SE1 is a single-walled nanotube and L1's affinity for SE1 is <1E-7 M.

E16.7: a CMU, where SE1 is a single-walled nanotube and L1's affinity for SE1 is <1E-8 M.

E16.8: a CMU, where SE1 is a single-walled nanotube and L1's affinity for SE1 is <1E-9 M.

E16.9: a CMU, where SE1 is a single-walled nanotube and L1's affinity for SE1 is <1E-10 M.

E16.10: a CMU, where SE1 is a single-walled nanotube and L1's affinity for SE1 is <1E-11 M.

E17.1: a CMU, where SE1 is a BNS and L1's affinity for SE1 is <1E-2 M.

E17.2: a CMU, where SE1 is a BNS and L1's affinity for SE1 is <1E-3 M.

E17.3: a CMU, where SE1 is a BNS and L1's affinity for SE1 is <1E-4 M.

E17.4: a CMU, where SE1 is a BNS and L1's affinity for SE1 is <1E-5 M.

E17.5: a CMU, where SE1 is a BNS and L1's affinity for SE1 is <1E-6 M.

E17.6: a CMU, where SE1 is a BNS and L1's affinity for SE1 is <1E-7 M.

E17.7: a CMU, where SE1 is a BNS and L1's affinity for SE1 is <1E-8 M.

E17.8: a CMU, where SE1 is a BNS and L1's affinity for SE1 is <1E-9 M.

E17.9: a CMU, where SE1 is a BNS and L1's affinity for SE1 is <1E-10 M.

E17.10: a CMU, where SE1 is a BNS and L1's affinity for SE1 is <1E-11 M.

E18.1: a CMU, where SE1 is a BNNT and L1's affinity for SE1 is <1E-2 M.

E18.2: a CMU, where SE1 is a BNNT and L1's affinity for SE1 is <1E-3 M.

E18.3: a CMU, where SE1 is a BNNT and L1's affinity for SE1 is <1E-4 M.

E18.4: a CMU, where SE1 is a BNNT and L1's affinity for SE1 is <1E-5 M.

E18.5: a CMU, where SE1 is a BNNT and L1's affinity for SE1 is <1E-6 M.

E18.6: a CMU, where SE1 is a BNNT and L1's affinity for SE1 is <1E-7 M.

E18.7: a CMU, where SE1 is a BNNT and L1's affinity for SE1 is <1E-8 M.

E18.8: a CMU, where SE1 is a BNNT and L1's affinity for SE1 is <1E-9 M.

E18.9: a CMU, where SE1 is a BNNT and L1's affinity for SE1 is <1E-10 M.

E18.10: a CMU, where SE1 is a BNNT and L1's affinity for SE1 is <1E-11 M.

E19.1: a CMU, where SE1 is a graphane molecule and L1's affinity for SE1 is <1E-2 M.

E19.2: a CMU, where SE1 is a graphane molecule and L1's affinity for SE1 is <1E-3 M.

E19.3: a CMU, where SE1 is a graphane molecule and L1's affinity for SE1 is <1E-4 M.

E19.4: a CMU, where SE1 is a graphane molecule and L1's affinity for SE1 is <1E-5 M.

E19.5: a CMU, where SE1 is a graphane molecule and L1's affinity for SE1 is <1E-6 M.

E19.6: a CMU, where SE1 is a graphane molecule and L1's affinity for SE1 is <1E-7 M.

E19.7: a CMU, where SE1 is a graphane molecule and L1's affinity for SE1 is <1E-8 M.

E19.8: a CMU, where SE1 is a graphane molecule and L1's affinity for SE1 is <1E-9 M.

E19.9: a CMU, where SE1 is a graphane molecule and L1's affinity for SE1 is <1E-10 M.

E19.10: a CMU, where SE1 is a graphane molecule and L1's affinity for SE1 is <1E-11 M.

E20.1: a CMU, where SE1 is a graphene oxide molecule and L1's affinity for SE1 is <1E-2 M.

E20.2: a CMU, where SE1 is a graphene oxide molecule and L1's affinity for SE1 is <1E-3 M.

E20.3: a CMU, where SE1 is a graphene oxide molecule and L1's affinity for SE1 is <1E-4 M.

E20.4: a CMU, where SE1 is a graphene oxide molecule and L1's affinity for SE1 is <1E-5 M.

E20.5: a CMU, where SE1 is a graphene oxide molecule and L1's affinity for SE1 is <1E-6 M.

E20.6: a CMU, where SE1 is a graphene oxide molecule and L1's affinity for SE1 is <1E-7 M.

E20.7: a CMU, where SE1 is a graphene oxide molecule and L1's affinity for SE1 is <1E-8 M.

E20.8: a CMU, where SE1 is a graphene oxide molecule and L1's affinity for SE1 is <1E-9 M.

E20.9: a CMU, where SE1 is a graphene oxide molecule and L1's affinity for SE1 is <1E-10 M.

E20.10: a CMU, where SE1 is a graphene oxide molecule and L1's affinity for SE1 is <1E-11 M.

E21.1: a CMU, where SE1 is a graphyne molecule and L1's affinity for SE1 is <1E-2 M.

E21.2: a CMU, where SE1 is a graphyne molecule and L1's affinity for SE1 is <1E-3 M.

E21.3: a CMU, where SE1 is a graphyne molecule and L1's affinity for SE1 is <1E-4 M.

E21.4: a CMU, where SE1 is a graphyne molecule and L1's affinity for SE1 is <1E-5 M.

E21.5: a CMU, where SE1 is a graphyne molecule and L1's affinity for SE1 is <1E-6 M.

E21.6: a CMU, where SE1 is a graphyne molecule and L1's affinity for SE1 is <1E-7 M.

E21.7: a CMU, where SE1 is a graphyne molecule and L1's affinity for SE1 is <1E-8 M.

E21.8: a CMU, where SE1 is a graphyne molecule and L1's affinity for SE1 is <1E-9 M.

E21.9: a CMU, where SE1 is a graphyne molecule and L1's affinity for SE1 is <1E-10 M.

E21.10: a CMU, where SE1 is a graphyne molecule and L1's affinity for SE1 is <1E-11 M.

E22.1: a CMU, where SE1 is a reduced graphene oxide molecule and L1's affinity for SE1 is <1E-2 M.

E22.2: a CMU, where SE1 is a reduced graphene oxide molecule and L1's affinity for SE1 is <1E-3 M.

E22.3: a CMU, where SE1 is a reduced graphene oxide molecule and L1's affinity for SE1 is <1E-4 M.

E22.4: a CMU, where SE1 is a reduced graphene oxide molecule and L1's affinity for SE1 is <1E-5 M.

E22.5: a CMU, where SE1 is a reduced graphene oxide molecule and L1's affinity for SE1 is <1E-6 M.

E22.6: a CMU, where SE1 is a reduced graphene oxide molecule and L1's affinity for SE1 is <1E-7 M.

E22.7: a CMU, where SE1 is a reduced graphene oxide molecule and L1's affinity for SE1 is <1E-8 M.

E22.8: a CMU, where SE1 is a reduced graphene oxide molecule and L1's affinity for SE1 is <1E-9 M.

E22.9: a CMU, where SE1 is a reduced graphene oxide molecule and L1's affinity for SE1 is <1E-10 M.

E22.10: a CMU, where SE1 is a reduced graphene oxide molecule and L1's affinity for SE1 is <1E-11 M.

E23.1: a CMU, where SE1 is a metal and L1's affinity for SE1 is <1E-2 M.

E23.2: a CMU, where SE1 is a metal and L1's affinity for SE1 is <1E-3 M.

E23.3: a CMU, where SE1 is a metal and L1's affinity for SE1 is <1E-4 M.

E23.4: a CMU, where SE1 is a metal and L1's affinity for SE1 is <1E-5 M.

E23.5: a CMU, where SE1 is a metal and L1's affinity for SE1 is <1E-6 M.

E23.6: a CMU, where SE1 is a metal and L1's affinity for SE1 is <1E-7 M.

E23.7: a CMU, where SE1 is a metal and L1's affinity for SE1 is <1E-8 M.

E23.8: a CMU, where SE1 is a metal and L1's affinity for SE1 is <1E-9 M.

E23.9: a CMU, where SE1 is a metal and L1's affinity for SE1 is <1E-10 M.

E23.10: a CMU, where SE1 is a metal and L1's affinity for SE1 is <1E-11 M.

E24.1: a CMU, where SE1 is a ceramic material and L1's affinity for SE1 is <1E-2 M.

E24.2: a CMU, where SE1 is a ceramic material and L1's affinity for SE1 is <1E-3 M.

E24.3: a CMU, where SE1 is a ceramic material and L1's affinity for SE1 is <1E-4 M.

E24.4: a CMU, where SE1 is a ceramic material and L1's affinity for SE1 is <1E-5 M.

E24.5: a CMU, where SE1 is a ceramic material and L1's affinity for SE1 is <1E-6 M.

E24.6: a CMU, where SE1 is a ceramic material and L1's affinity for SE1 is <1E-7 M.

E24.7: a CMU, where SE1 is a ceramic material and L1's affinity for SE1 is <1E-8 M.

E24.8: a CMU, where SE1 is a ceramic material and L1's affinity for SE1 is <1E-9 M.

E24.9: a CMU, where SE1 is a ceramic material and L1's affinity for SE1 is <1E-10 M.

E24.10: a CMU, where SE1 is a ceramic material and L1's affinity for SE1 is <1E-11 M.

E25.1: a CMU, where SE1 is a COOH-functionalized CNT and L1's affinity for SE1 is <1E-2 M.

E25.2: a CMU, where SE1 is a COOH-functionalized CNT and L1's affinity for SE1 is <1E-3 M.

E25.3: a CMU, where SE1 is a COOH-functionalized CNT and L1's affinity for SE1 is <1E-4 M.

E25.4: a CMU, where SE1 is a COOH-functionalized CNT and L1's affinity for SE1 is <1E-5 M.

E25.5: a CMU, where SE1 is a COOH-functionalized CNT and L1's affinity for SE1 is <1E-6 M.

E25.6: a CMU, where SE1 is a COOH-functionalized CNT and L1's affinity for SE1 is <1E-7 M.

E25.7: a CMU, where SE1 is a COOH-functionalized CNT and L1's affinity for SE1 is <1E-8 M.

E25.8: a CMU, where SE1 is a COOH-functionalized CNT and L1's affinity for SE1 is <1E-9 M.

E25.9: a CMU, where SE1 is a COOH-functionalized CNT and L1's affinity for SE1 is <1E-10 M.

E25.10: a CMU, where SE1 is a COOH-functionalized CNT and L1's affinity for SE1 is <1E-11 M.

E26.1: a CMU, where SE1 is a OH-functionalized carbon nanotube and L1's affinity for SE1 is <1E-2 M.

E26.2: a CMU, where SE1 is a OH-functionalized carbon nanotube and L1's affinity for SE1 is <1E-3 M.

E26.3: a CMU, where SE1 is a OH-functionalized carbon nanotube and L1's affinity for SE1 is <1E-4 M.

E26.4: a CMU, where SE1 is a OH-functionalized carbon nanotube and L1's affinity for SE1 is <1E-5 M.

E26.5: a CMU, where SE1 is a OH-functionalized carbon nanotube and L1's affinity for SE1 is <1E-6 M.

E26.6: a CMU, where SE1 is a OH-functionalized carbon nanotube and L1's affinity for SE1 is <1E-7 M.

E26.7: a CMU, where SE1 is a OH-functionalized carbon nanotube and L1's affinity for SE1 is <1E-8 M.

E26.8: a CMU, where SE1 is a OH-functionalized carbon nanotube and L1's affinity for SE1 is <1E-9 M.

E26.9: a CMU, where SE1 is a OH-functionalized carbon nanotube and L1's affinity for SE1 is <1E-10 M.

E26.10: a CMU, where SE1 is a OH-functionalized carbon nanotube and L1's affinity for SE1 is <1E-11 M.

E27.1: a CMU, where SE1 is an NH2-functionalized carbon nanotube and L1's affinity for SE1 is <1E-2 M.

E27.2: a CMU, where SE1 is an NH2-functionalized carbon nanotube and L1's affinity for SE1 is <1E-3 M.

E27.3: a CMU, where SE1 is an NH2-functionalized carbon nanotube and L1's affinity for SE1 is <1E-4 M.

E27.4: a CMU, where SE1 is an NH2-functionalized carbon nanotube and L1's affinity for SE1 is <1E-5 M.

E27.5: a CMU, where SE1 is an NH2-functionalized carbon nanotube and L1's affinity for SE1 is <1E-6 M.

E27.6: a CMU, where SE1 is an NH2-functionalized carbon nanotube and L1's affinity for SE1 is <1E-7 M.

E27.7: a CMU, where SE1 is an NH2-functionalized carbon nanotube and L1's affinity for SE1 is <1E-8 M.

E27.8: a CMU, where SE1 is an NH2-functionalized carbon nanotube and L1's affinity for SE1 is <1E-9 M.

E27.9: a CMU, where SE1 is an NH2-functionalized carbon nanotube and L1's affinity for SE1 is <1E-10 M.

E27.10: a CMU, where SE1 is an NH2-functionalized carbon nanotube and L1's affinity for SE1 is <1E-11 M.

E28.1: a CMU, where SE1 is an SH-functionalized CNT and L1's affinity for SE1 is <1E-2 M.

E28.2: a CMU, where SE1 is an SH-functionalized CNT and L1's affinity for SE1 is <1E-3 M.

E28.3: a CMU, where SE1 is an SH-functionalized CNT and L1's affinity for SE1 is <1E-4 M.

E28.4: a CMU, where SE1 is an SH-functionalized CNT and L1's affinity for SE1 is <1E-5 M.

E28.5: a CMU, where SE1 is an SH-functionalized CNT and L1's affinity for SE1 is <1E-6 M.

E28.6: a CMU, where SE1 is an SH-functionalized CNT and L1's affinity for SE1 is <1E-7 M.

E28.7: a CMU, where SE1 is an SH-functionalized CNT and L1's affinity for SE1 is <1E-8 M.

E28.8: a CMU, where SE1 is an SH-functionalized CNT and L1's affinity for SE1 is <1E-9 M.

E28.9: a CMU, where SE1 is an SH-functionalized CNT and L1's affinity for SE1 is <1E-10 M.

E28.10: a CMU, where SE1 is an SH-functionalized CNT and L1's affinity for SE1 is <1E-11 M.

E29.1: a CMU, where SE1 is COOH-functionalized graphene and L1's affinity for SE1 is <1E-2 M.

E29.2: a CMU, where SE1 is COOH-functionalized graphene and L1's affinity for SE1 is <1E-3 M.

E29.3: a CMU, where SE1 is COOH-functionalized graphene and L1's affinity for SE1 is <1E-4 M.

E29.4: a CMU, where SE1 is COOH-functionalized graphene and L1's affinity for SE1 is <1E-5 M.

E29.5: a CMU, where SE1 is COOH-functionalized graphene and L1's affinity for SE1 is <1E-6 M.

E29.6: a CMU, where SE1 is COOH-functionalized graphene and L1's affinity for SE1 is <1E-7 M.

E29.7: a CMU, where SE1 is COOH-functionalized graphene and L1's affinity for SE1 is <1E-8 M.

E29.8: a CMU, where SE1 is COOH-functionalized graphene and L1's affinity for SE1 is <1E-9 M.

E29.9: a CMU, where SE1 is COOH-functionalized graphene and L1's affinity for SE1 is <1E-10 M.

E29.10: a CMU, where SE1 is COOH-functionalized graphene and L1's affinity for SE1 is <1E-11 M.

E30.1: a CMU, where SE1 is multi-layer graphene and L1's affinity for SE1 is <1E-2 M.

E30.2: a CMU, where SE1 is multi-layer graphene and L1's affinity for SE1 is <1E-3 M.

E30.3: a CMU, where SE1 is multi-layer graphene and L1's affinity for SE1 is <1E-4 M.

E30.4: a CMU, where SE1 is multi-layer graphene and L1's affinity for SE1 is <1E-5 M.

E30.5: a CMU, where SE1 is multi-layer graphene and L1's affinity for SE1 is <1E-6 M.

E30.6: a CMU, where SE1 is multi-layer graphene and L1's affinity for SE1 is <1E-7 M.

E30.7: a CMU, where SE1 is multi-layer graphene and L1's affinity for SE1 is <1E-8 M.

E30.8: a CMU, where SE1 is multi-layer graphene and L1's affinity for SE1 is <1E-9 M.

E30.9: a CMU, where SE1 is multi-layer graphene and L1's affinity for SE1 is <1E-10 M.

E30.10: a CMU, where SE1 is multi-layer graphene and L1's affinity for SE1 is <1E-11 M.

E31.1: a CMU, where SE1 is NH2-functionalized graphene and L1's affinity for SE1 is <1E-2 M.

E31.2: a CMU, where SE1 is NH2-functionalized graphene and L1's affinity for SE1 is <1E-3 M.

E31.3: a CMU, where SE1 is NH2-functionalized graphene and L1's affinity for SE1 is <1E-4 M.

E31.4: a CMU, where SE1 is NH2-functionalized graphene and L1's affinity for SE1 is <1E-5 M.

E31.5: a CMU, where SE1 is NH2-functionalized graphene and L1's affinity for SE1 is <1E-6 M.

E31.6: a CMU, where SE1 is NH2-functionalized graphene and L1's affinity for SE1 is <1E-7 M.

E31.7: a CMU, where SE1 is NH2-functionalized graphene and L1's affinity for SE1 is <1E-8 M.

E31.8: a CMU, where SE1 is NH2-functionalized graphene and L1's affinity for SE1 is <1E-9 M.

E31.9: a CMU, where SE1 is NH2-functionalized graphene and L1's affinity for SE1 is <1E-10 M.

E31.10: a CMU, where SE1 is NH2-functionalized graphene and L1's affinity for SE1 is <1E-11 M.

E32.1: a CMU, where SE1 is OH-functionalized graphene and L1's affinity for SE1 is <1E-2 M.

E32.2: a CMU, where SE1 is OH-functionalized graphene and L1's affinity for SE1 is <1E-3 M.

E32.3: a CMU, where SE1 is OH-functionalized graphene and L1's affinity for SE1 is <1E-4 M.

E32.4: a CMU, where SE1 is OH-functionalized graphene and L1's affinity for SE1 is <1E-5 M.

E32.5: a CMU, where SE1 is OH-functionalized graphene and L1's affinity for SE1 is <1E-6 M.

E32.6: a CMU, where SE1 is OH-functionalized graphene and L1's affinity for SE1 is <1E-7 M.

E32.7: a CMU, where SE1 is OH-functionalized graphene and L1's affinity for SE1 is <1E-8 M.

E32.8: a CMU, where SE1 is OH-functionalized graphene and L1's affinity for SE1 is <1E-9 M.

E32.9: a CMU, where SE1 is OH-functionalized graphene and L1's affinity for SE1 is <1E-10 M.

E32.10: a CMU, where SE1 is OH-functionalized graphene and L1's affinity for SE1 is <1E-11 M.

E33.1: a CMU, where SE1 is a glass fibre and L1's affinity for SE1 is <1E-2 M.

E33.2: a CMU, where SE1 is a glass fibre and L1's affinity for SE1 is <1E-3 M.

E33.3: a CMU, where SE1 is a glass fibre and L1's affinity for SE1 is <1E-4 M.

E33.4: a CMU, where SE1 is a glass fibre and L1's affinity for SE1 is <1E-5 M.

E33.5: a CMU, where SE1 is a glass fibre and L1's affinity for SE1 is <1E-6 M.

E33.6: a CMU, where SE1 is a glass fibre and L1's affinity for SE1 is <1E-7 M.

E33.7: a CMU, where SE1 is a glass fibre and L1's affinity for SE1 is <1E-8 M.

E33.8: a CMU, where SE1 is a glass fibre and L1's affinity for SE1 is <1E-9 M.

E33.9: a CMU, where SE1 is a glass fibre and L1's affinity for SE1 is <1E-10 M.

E33.10: a CMU, where SE1 is a glass fibre and L1's affinity for SE1 is <1E-11 M.

E34.1: a CMU, where SE1 is aramid and L1's affinity for SE1 is <1E-2 M.

E34.2: a CMU, where SE1 is aramid and L1's affinity for SE1 is <1E-3 M.

E34.3: a CMU, where SE1 is aramid and L1's affinity for SE1 is <1E-4 M.

E34.4: a CMU, where SE1 is aramid and L1's affinity for SE1 is <1E-5 M.

E34.5: a CMU, where SE1 is aramid and L1's affinity for SE1 is <1E-6 M.

E34.6: a CMU, where SE1 is aramid and L1's affinity for SE1 is <1E-7 M.

E34.7: a CMU, where SE1 is aramid and L1's affinity for SE1 is <1E-8 M.

E34.8: a CMU, where SE1 is aramid and L1's affinity for SE1 is <1E-9 M.

E34.9: a CMU, where SE1 is aramid and L1's affinity for SE1 is <1E-10 M.

E34.10: a CMU, where SE1 is aramid and L1's affinity for SE1 is <1E-11 M.

E35.1: a CMU, where SE1 is E-glass and L1's affinity for SE1 is <1E-2 M.

E35.2: a CMU, where SE1 is E-glass and L1's affinity for SE1 is <1E-3 M.

E35.3: a CMU, where SE1 is E-glass and L1's affinity for SE1 is <1E-4 M.

E35.4: a CMU, where SE1 is E-glass and L1's affinity for SE1 is <1E-5 M.

E35.5: a CMU, where SE1 is E-glass and L1's affinity for SE1 is <1E-6 M.

E35.6: a CMU, where SE1 is E-glass and L1's affinity for SE1 is <1E-7 M.

E35.7: a CMU, where SE1 is E-glass and L1's affinity for SE1 is <1E-8 M.

E35.8: a CMU, where SE1 is E-glass and L1's affinity for SE1 is <1E-9 M.

E35.9: a CMU, where SE1 is E-glass and L1's affinity for SE1 is <1E-10 M.

E35.10: a CMU, where SE1 is E-glass and L1's affinity for SE1 is <1E-11 M.

E36.1: a CMU, where SE1 is iron and L1's affinity for SE1 is <1E-2 M.

E36.2: a CMU, where SE1 is iron and L1's affinity for SE1 is <1E-3 M.

E36.3: a CMU, where SE1 is iron and L1's affinity for SE1 is <1E-4 M.

E36.4: a CMU, where SE1 is iron and L1's affinity for SE1 is <1E-5 M.

E36.5: a CMU, where SE1 is iron and L1's affinity for SE1 is <1E-6 M.

E36.6: a CMU, where SE1 is iron and L1's affinity for SE1 is <1E-7 M.

E36.7: a CMU, where SE1 is iron and L1's affinity for SE1 is <1E-8 M.

E36.8: a CMU, where SE1 is iron and L1's affinity for SE1 is <1E-9 M.

E36.9: a CMU, where SE1 is iron and L1's affinity for SE1 is <1E-10 M.

E36.10: a CMU, where SE1 is iron and L1's affinity for SE1 is <1E-11 M.

E37.1: a CMU, where SE1 is polyester and L1's affinity for SE1 is <1E-2 M.

E37.2: a CMU, where SE1 is polyester and L1's affinity for SE1 is <1E-3 M.

E37.3: a CMU, where SE1 is polyester and L1's affinity for SE1 is <1E-4 M.

E37.4: a CMU, where SE1 is polyester and L1's affinity for SE1 is <1E-5 M.

E37.5: a CMU, where SE1 is polyester and L1's affinity for SE1 is <1E-6 M.

E37.6: a CMU, where SE1 is polyester and L1's affinity for SE1 is <1E-7 M.

E37.7: a CMU, where SE1 is polyester and L1's affinity for SE1 is <1E-8 M.

E37.8: a CMU, where SE1 is polyester and L1's affinity for SE1 is <1E-9 M.

E37.9: a CMU, where SE1 is polyester and L1's affinity for SE1 is <1E-10 M.

E37.10: a CMU, where SE1 is polyester and L1's affinity for SE1 is <1E-11 M.

E38.1: a CMU, where SE1 is polyethylene and L1's affinity for SE1 is <1E-2 M.

E38.2: a CMU, where SE1 is polyethylene and L1's affinity for SE1 is <1E-3 M.

E38.3: a CMU, where SE1 is polyethylene and L1's affinity for SE1 is <1E-4 M.

E38.4: a CMU, where SE1 is polyethylene and L1's affinity for SE1 is <1E-5 M.

E38.5: a CMU, where SE1 is polyethylene and L1's affinity for SE1 is <1E-6 M.

E38.6: a CMU, where SE1 is polyethylene and L1's affinity for SE1 is <1E-7 M.

E38.7: a CMU, where SE1 is polyethylene and L1's affinity for SE1 is <1E-8 M.

E38.8: a CMU, where SE1 is polyethylene and L1's affinity for SE1 is <1E-9 M.

E38.9: a CMU, where SE1 is polyethylene and L1's affinity for SE1 is <1E-10 M.

E38.10: a CMU, where SE1 is polyethylene and L1's affinity for SE1 is <1E-11 M.

E39.1: a CMU, where SE1 is S-glass and L1's affinity for SE1 is <1E-2 M.

E39.2: a CMU, where SE1 is S-glass and L1's affinity for SE1 is <1E-3 M.

E39.3: a CMU, where SE1 is S-glass and L1's affinity for SE1 is <1E-4 M.

E39.4: a CMU, where SE1 is S-glass and L1's affinity for SE1 is <1E-5 M.

E39.5: a CMU, where SE1 is S-glass and L1's affinity for SE1 is <1E-6 M.

E39.6: a CMU, where SE1 is S-glass and L1's affinity for SE1 is <1E-7 M.

E39.7: a CMU, where SE1 is S-glass and L1's affinity for SE1 is <1E-8 M.

E39.8: a CMU, where SE1 is S-glass and L1's affinity for SE1 is <1E-9 M.

E39.9: a CMU, where SE1 is S-glass and L1's affinity for SE1 is <1E-10 M.

E39.10: a CMU, where SE1 is S-glass and L1's affinity for SE1 is <1E-11 M.

E40.1: a CMU, where SE1 is steel and L1's affinity for SE1 is <1E-2 M.

E40.2: a CMU, where SE1 is steel and L1's affinity for SE1 is <1E-3 M.

E40.3: a CMU, where SE1 is steel and L1's affinity for SE1 is <1E-4 M.

E40.4: a CMU, where SE1 is steel and L1's affinity for SE1 is <1E-5 M.

E40.5: a CMU, where SE1 is steel and L1's affinity for SE1 is <1E-6 M.

E40.6: a CMU, where SE1 is steel and L1's affinity for SE1 is <1E-7 M.

E40.7: a CMU, where SE1 is steel and L1's affinity for SE1 is <1E-8 M.

E40.8: a CMU, where SE1 is steel and L1's affinity for SE1 is <1E-9 M.

E40.9: a CMU, where SE1 is steel and L1's affinity for SE1 is <1E-10 M.

E40.10: a CMU, where SE1 is steel and L1's affinity for SE1 is <1E-11 M.

E41.1: a CMU, where SE1 is a battery and L1's affinity for SE1 is <1E-2 M.

E41.2: a CMU, where SE1 is a battery and L1's affinity for SE1 is <1E-3 M.

E41.3: a CMU, where SE1 is a battery and L1's affinity for SE1 is <1E-4 M.

E41.4: a CMU, where SE1 is a battery and L1's affinity for SE1 is <1E-5 M.

E41.5: a CMU, where SE1 is a battery and L1's affinity for SE1 is <1E-6 M.

E41.6: a CMU, where SE1 is a battery and L1's affinity for SE1 is <1E-7 M.

E41.7: a CMU, where SE1 is a battery and L1's affinity for SE1 is <1E-8 M.

E41.8: a CMU, where SE1 is a battery and L1's affinity for SE1 is <1E-9 M.

E41.9: a CMU, where SE1 is a battery and L1's affinity for SE1 is <1E-10 M.

E41.10: a CMU, where SE1 is a battery and L1's affinity for SE1 is <1E-11 M.

E42.1: a CMU, where SE1 is a borosilicate and L1's affinity for SE1 is <1E-2 M.

E42.2: a CMU, where SE1 is a borosilicate and L1's affinity for SE1 is <1E-3 M.

E42.3: a CMU, where SE1 is a borosilicate and L1's affinity for SE1 is <1E-4 M.

E42.4: a CMU, where SE1 is a borosilicate and L1's affinity for SE1 is <1E-5 M.

E42.5: a CMU, where SE1 is a borosilicate and L1's affinity for SE1 is <1E-6 M.

E42.6: a CMU, where SE1 is a borosilicate and L1's affinity for SE1 is <1E-7 M.

E42.7: a CMU, where SE1 is a borosilicate and L1's affinity for SE1 is <1E-8 M.

E42.8: a CMU, where SE1 is a borosilicate and L1's affinity for SE1 is <1E-9 M.

E42.9: a CMU, where SE1 is a borosilicate and L1's affinity for SE1 is <1E-10 M.

E42.10: a CMU, where SE1 is a borosilicate and L1's affinity for SE1 is <1E-11 M.

E43.1: a CMU, where SE1 is a buckyball and L1's affinity for SE1 is <1E-2 M.

E43.2: a CMU, where SE1 is a buckyball and L1's affinity for SE1 is <1E-3 M.

E43.3: a CMU, where SE1 is a buckyball and L1's affinity for SE1 is <1E-4 M.

E43.4: a CMU, where SE1 is a buckyball and L1's affinity for SE1 is <1E-5 M.

E43.5: a CMU, where SE1 is a buckyball and L1's affinity for SE1 is <1E-6 M.

E43.6: a CMU, where SE1 is a buckyball and L1's affinity for SE1 is <1E-7 M.

E43.7: a CMU, where SE1 is a buckyball and L1's affinity for SE1 is <1E-8 M.

E43.8: a CMU, where SE1 is a buckyball and L1's affinity for SE1 is <1E-9 M.

E43.9: a CMU, where SE1 is a buckyball and L1's affinity for SE1 is <1E-10 M.

E43.10: a CMU, where SE1 is a buckyball and L1's affinity for SE1 is <1E-11 M.

E44.1: a CMU, where SE1 is a buckytube and L1's affinity for SE1 is <1E-2 M.

E44.2: a CMU, where SE1 is a buckytube and L1's affinity for SE1 is <1E-3 M.

E44.3: a CMU, where SE1 is a buckytube and L1's affinity for SE1 is <1E-4 M.

E44.4: a CMU, where SE1 is a buckytube and L1's affinity for SE1 is <1E-5 M.

E44.5: a CMU, where SE1 is a buckytube and L1's affinity for SE1 is <1E-6 M.

E44.6: a CMU, where SE1 is a buckytube and L1's affinity for SE1 is <1E-7 M.

E44.7: a CMU, where SE1 is a buckytube and L1's affinity for SE1 is <1E-8 M.

E44.8: a CMU, where SE1 is a buckytube and L1's affinity for SE1 is <1E-9 M.

E44.9: a CMU, where SE1 is a buckytube and L1's affinity for SE1 is <1E-10 M.

E44.10: a CMU, where SE1 is a buckytube and L1's affinity for SE1 is <1E-11 M.

E45.1: a CMU, where SE1 is a capacitator and L1's affinity for SE1 is <1E-2 M.

E45.2: a CMU, where SE1 is a capacitator and L1's affinity for SE1 is <1E-3 M.

E45.3: a CMU, where SE1 is a capacitator and L1's affinity for SE1 is <1E-4 M.

E45.4: a CMU, where SE1 is a capacitator and L1's affinity for SE1 is <1E-5 M.

E45.5: a CMU, where SE1 is a capacitator and L1's affinity for SE1 is <1E-6 M.

E45.6: a CMU, where SE1 is a capacitator and L1's affinity for SE1 is <1E-7 M.

E45.7: a CMU, where SE1 is a capacitator and L1's affinity for SE1 is <1E-8 M.

E45.8: a CMU, where SE1 is a capacitator and L1's affinity for SE1 is <1E-9 M.

E45.9: a CMU, where SE1 is a capacitator and L1's affinity for SE1 is <1E-10 M.

E45.10: a CMU, where SE1 is a capacitator and L1's affinity for SE1 is <1E-11 M.

E46.1: a CMU, where SE1 is a carbon dome and L1's affinity for SE1 is <1E-2 M.

E46.2: a CMU, where SE1 is a carbon dome and L1's affinity for SE1 is <1E-3 M.

E46.3: a CMU, where SE1 is a carbon dome and L1's affinity for SE1 is <1E-4 M.

E46.4: a CMU, where SE1 is a carbon dome and L1's affinity for SE1 is <1E-5 M.

E46.5: a CMU, where SE1 is a carbon dome and L1's affinity for SE1 is <1E-6 M.

E46.6: a CMU, where SE1 is a carbon dome and L1's affinity for SE1 is <1E-7 M.

E46.7: a CMU, where SE1 is a carbon dome and L1's affinity for SE1 is <1E-8 M.

E46.8: a CMU, where SE1 is a carbon dome and L1's affinity for SE1 is <1E-9 M.

E46.9: a CMU, where SE1 is a carbon dome and L1's affinity for SE1 is <1E-10 M.

E46.10: a CMU, where SE1 is a carbon dome and L1's affinity for SE1 is <1E-11 M.

E47.1: a CMU, where SE1 is a carbon material and L1's affinity for SE1 is <1E-2 M.

E47.2: a CMU, where SE1 is a carbon material and L1's affinity for SE1 is <1E-3 M.

E47.3: a CMU, where SE1 is a carbon material and L1's affinity for SE1 is <1E-4 M.

E47.4: a CMU, where SE1 is a carbon material and L1's affinity for SE1 is <1E-5 M.

E47.5: a CMU, where SE1 is a carbon material and L1's affinity for SE1 is <1E-6 M.

E47.6: a CMU, where SE1 is a carbon material and L1's affinity for SE1 is <1E-7 M.

E47.7: a CMU, where SE1 is a carbon material and L1's affinity for SE1 is <1E-8 M.

E47.8: a CMU, where SE1 is a carbon material and L1's affinity for SE1 is <1E-9 M.

E47.9: a CMU, where SE1 is a carbon material and L1's affinity for SE1 is <1E-10 M.

E47.10: a CMU, where SE1 is a carbon material and L1's affinity for SE1 is <1E-11 M.

E48.1: a CMU, where SE1 is a carbon megatube and L1's affinity for SE1 is <1E-2 M.

E48.2: a CMU, where SE1 is a carbon megatube and L1's affinity for SE1 is <1E-3 M.

E48.3: a CMU, where SE1 is a carbon megatube and L1's affinity for SE1 is <1E-4 M.

E48.4: a CMU, where SE1 is a carbon megatube and L1's affinity for SE1 is <1E-5 M.

E48.5: a CMU, where SE1 is a carbon megatube and L1's affinity for SE1 is <1E-6 M.

E48.6: a CMU, where SE1 is a carbon megatube and L1's affinity for SE1 is <1E-7 M.

E48.7: a CMU, where SE1 is a carbon megatube and L1's affinity for SE1 is <1E-8 M.

E48.8: a CMU, where SE1 is a carbon megatube and L1's affinity for SE1 is <1E-9 M.

E48.9: a CMU, where SE1 is a carbon megatube and L1's affinity for SE1 is <1E-10 M.

E48.10: a CMU, where SE1 is a carbon megatube and L1's affinity for SE1 is <1E-11 M.

E49.1: a CMU, where SE1 is a carbon nanofoam and L1's affinity for SE1 is <1E-2 M.

E49.2: a CMU, where SE1 is a carbon nanofoam and L1's affinity for SE1 is <1E-3 M.

E49.3: a CMU, where SE1 is a carbon nanofoam and L1's affinity for SE1 is <1E-4 M.

E49.4: a CMU, where SE1 is a carbon nanofoam and L1's affinity for SE1 is <1E-5 M.

E49.5: a CMU, where SE1 is a carbon nanofoam and L1's affinity for SE1 is <1E-6 M.

E49.6: a CMU, where SE1 is a carbon nanofoam and L1's affinity for SE1 is <1E-7 M.

E49.7: a CMU, where SE1 is a carbon nanofoam and L1's affinity for SE1 is <1E-8 M.

E49.8: a CMU, where SE1 is a carbon nanofoam and L1's affinity for SE1 is <1E-9 M.

E49.9: a CMU, where SE1 is a carbon nanofoam and L1's affinity for SE1 is <1E-10 M.

E49.10: a CMU, where SE1 is a carbon nanofoam and L1's affinity for SE1 is <1E-11 M.

E50.1: a CMU, where SE1 is a carbon polymer and L1's affinity for SE1 is <1E-2 M.

E50.2: a CMU, where SE1 is a carbon polymer and L1's affinity for SE1 is <1E-3 M.

E50.3: a CMU, where SE1 is a carbon polymer and L1's affinity for SE1 is <1E-4 M.

E50.4: a CMU, where SE1 is a carbon polymer and L1's affinity for SE1 is <1E-5 M.

E50.5: a CMU, where SE1 is a carbon polymer and L1's affinity for SE1 is <1E-6 M.

E50.6: a CMU, where SE1 is a carbon polymer and L1's affinity for SE1 is <1E-7 M.

E50.7: a CMU, where SE1 is a carbon polymer and L1's affinity for SE1 is <1E-8 M.

E50.8: a CMU, where SE1 is a carbon polymer and L1's affinity for SE1 is <1E-9 M.

E50.9: a CMU, where SE1 is a carbon polymer and L1's affinity for SE1 is <1E-10 M.

E50.10: a CMU, where SE1 is a carbon polymer and L1's affinity for SE1 is <1E-11 M.

E51.1: a CMU, where SE1 is a catalyst and L1's affinity for SE1 is <1E-2 M.

E51.2: a CMU, where SE1 is a catalyst and L1's affinity for SE1 is <1E-3 M.

E51.3: a CMU, where SE1 is a catalyst and L1's affinity for SE1 is <1E-4 M.

E51.4: a CMU, where SE1 is a catalyst and L1's affinity for SE1 is <1E-5 M.

E51.5: a CMU, where SE1 is a catalyst and L1's affinity for SE1 is <1E-6 M.

E51.6: a CMU, where SE1 is a catalyst and L1's affinity for SE1 is <1E-7 M.

E51.7: a CMU, where SE1 is a catalyst and L1's affinity for SE1 is <1E-8 M.

E51.8: a CMU, where SE1 is a catalyst and L1's affinity for SE1 is <1E-9 M.

E51.9: a CMU, where SE1 is a catalyst and L1's affinity for SE1 is <1E-10 M.

E51.10: a CMU, where SE1 is a catalyst and L1's affinity for SE1 is <1E-11 M.

E52.1: a CMU, where SE1 is a cathode and L1's affinity for SE1 is <1E-2 M.

E52.2: a CMU, where SE1 is a cathode and L1's affinity for SE1 is <1E-3 M.

E52.3: a CMU, where SE1 is a cathode and L1's affinity for SE1 is <1E-4 M.

E52.4: a CMU, where SE1 is a cathode and L1's affinity for SE1 is <1E-5 M.

E52.5: a CMU, where SE1 is a cathode and L1's affinity for SE1 is <1E-6 M.

E52.6: a CMU, where SE1 is a cathode and L1's affinity for SE1 is <1E-7 M.

E52.7: a CMU, where SE1 is a cathode and L1's affinity for SE1 is <1E-8 M.

E52.8: a CMU, where SE1 is a cathode and L1's affinity for SE1 is <1E-9 M.

E52.9: a CMU, where SE1 is a cathode and L1's affinity for SE1 is <1E-10 M.

E52.10: a CMU, where SE1 is a cathode and L1's affinity for SE1 is <1E-11 M.

E53.1: a CMU, where SE1 is a coated carbon nanotube and L1's affinity for SE1 is <1E-2 M.

E53.2: a CMU, where SE1 is a coated carbon nanotube and L1's affinity for SE1 is <1E-3 M.

E53.3: a CMU, where SE1 is a coated carbon nanotube and L1's affinity for SE1 is <1E-4 M.

E53.4: a CMU, where SE1 is a coated carbon nanotube and L1's affinity for SE1 is <1E-5 M.

E53.5: a CMU, where SE1 is a coated carbon nanotube and L1's affinity for SE1 is <1E-6 M.

E53.6: a CMU, where SE1 is a coated carbon nanotube and L1's affinity for SE1 is <1E-7 M.

E53.7: a CMU, where SE1 is a coated carbon nanotube and L1's affinity for SE1 is <1E-8 M.

E53.8: a CMU, where SE1 is a coated carbon nanotube and L1's affinity for SE1 is <1E-9 M.

E53.9: a CMU, where SE1 is a coated carbon nanotube and L1's affinity for SE1 is <1E-10 M.

E53.10: a CMU, where SE1 is a coated carbon nanotube and L1's affinity for SE1 is <1E-11 M.

E54.1: a CMU, where SE1 is a conductor and L1's affinity for SE1 is <1E-2 M.

E54.2: a CMU, where SE1 is a conductor and L1's affinity for SE1 is <1E-3 M.

E54.3: a CMU, where SE1 is a conductor and L1's affinity for SE1 is <1E-4 M.

E54.4: a CMU, where SE1 is a conductor and L1's affinity for SE1 is <1E-5 M.

E54.5: a CMU, where SE1 is a conductor and L1's affinity for SE1 is <1E-6 M.

E54.6: a CMU, where SE1 is a conductor and L1's affinity for SE1 is <1E-7 M.

E54.7: a CMU, where SE1 is a conductor and L1's affinity for SE1 is <1E-8 M.

E54.8: a CMU, where SE1 is a conductor and L1's affinity for SE1 is <1E-9 M.

E54.9: a CMU, where SE1 is a conductor and L1's affinity for SE1 is <1E-10 M.

E54.10: a CMU, where SE1 is a conductor and L1's affinity for SE1 is <1E-11 M.

E55.1: a CMU, where SE1 is a covalent crystal and L1's affinity for SE1 is <1E-2 M.

E55.2: a CMU, where SE1 is a covalent crystal and L1's affinity for SE1 is <1E-3 M.

E55.3: a CMU, where SE1 is a covalent crystal and L1's affinity for SE1 is <1E-4 M.

E55.4: a CMU, where SE1 is a covalent crystal and L1's affinity for SE1 is <1E-5 M.

E55.5: a CMU, where SE1 is a covalent crystal and L1's affinity for SE1 is <1E-6 M.

E55.6: a CMU, where SE1 is a covalent crystal and L1's affinity for SE1 is <1E-7 M.

E55.7: a CMU, where SE1 is a covalent crystal and L1's affinity for SE1 is <1E-8 M.

E55.8: a CMU, where SE1 is a covalent crystal and L1's affinity for SE1 is <1E-9 M.

E55.9: a CMU, where SE1 is a covalent crystal and L1's affinity for SE1 is <1E-10 M.

E55.10: a CMU, where SE1 is a covalent crystal and L1's affinity for SE1 is <1E-11 M.

E56.1: a CMU, where SE1 is a crystal and L1's affinity for SE1 is <1E-2 M.

E56.2: a CMU, where SE1 is a crystal and L1's affinity for SE1 is <1E-3 M.

E56.3: a CMU, where SE1 is a crystal and L1's affinity for SE1 is <1E-4 M.

E56.4: a CMU, where SE1 is a crystal and L1's affinity for SE1 is <1E-5 M.

E56.5: a CMU, where SE1 is a crystal and L1's affinity for SE1 is <1E-6 M.

E56.6: a CMU, where SE1 is a crystal and L1's affinity for SE1 is <1E-7 M.

E56.7: a CMU, where SE1 is a crystal and L1's affinity for SE1 is <1E-8 M.

E56.8: a CMU, where SE1 is a crystal and L1's affinity for SE1 is <1E-9 M.

E56.9: a CMU, where SE1 is a crystal and L1's affinity for SE1 is <1E-10 M.

E56.10: a CMU, where SE1 is a crystal and L1's affinity for SE1 is <1E-11 M.

E57.1: a CMU, where SE1 is a crystalline material and L1's affinity for SE1 is <1E-2 M.

E57.2: a CMU, where SE1 is a crystalline material and L1's affinity for SE1 is <1E-3 M.

E57.3: a CMU, where SE1 is a crystalline material and L1's affinity for SE1 is <1E-4 M.

E57.4: a CMU, where SE1 is a crystalline material and L1's affinity for SE1 is <1E-5 M.

E57.5: a CMU, where SE1 is a crystalline material and L1's affinity for SE1 is <1E-6 M.

E57.6: a CMU, where SE1 is a crystalline material and L1's affinity for SE1 is <1E-7 M.

E57.7: a CMU, where SE1 is a crystalline material and L1's affinity for SE1 is <1E-8 M.

E57.8: a CMU, where SE1 is a crystalline material and L1's affinity for SE1 is <1E-9 M.

E57.9: a CMU, where SE1 is a crystalline material and L1's affinity for SE1 is <1E-10 M.

E57.10: a CMU, where SE1 is a crystalline material and L1's affinity for SE1 is <1E-11 M.

E58.1: a CMU, where SE1 is a defect-free graphene sheet and L1's affinity for SE1 is <1E-2 M.

E58.2: a CMU, where SE1 is a defect-free graphene sheet and L1's affinity for SE1 is <1E-3 M.

E58.3: a CMU, where SE1 is a defect-free graphene sheet and L1's affinity for SE1 is <1E-4 M.

E58.4: a CMU, where SE1 is a defect-free graphene sheet and L1's affinity for SE1 is <1E-5 M.

E58.5: a CMU, where SE1 is a defect-free graphene sheet and L1's affinity for SE1 is <1E-6 M.

E58.6: a CMU, where SE1 is a defect-free graphene sheet and L1's affinity for SE1 is <1E-7 M.

E58.7: a CMU, where SE1 is a defect-free graphene sheet and L1's affinity for SE1 is <1E-8 M.

E58.8: a CMU, where SE1 is a defect-free graphene sheet and L1's affinity for SE1 is <1E-9 M.

E58.9: a CMU, where SE1 is a defect-free graphene sheet and L1's affinity for SE1 is <1E-10 M.

E58.10: a CMU, where SE1 is a defect-free graphene sheet and L1's affinity for SE1 is <1E-11 M.

E59.1: a CMU, where SE1 is a defect-free MWCNT and L1's affinity for SE1 is <1E-2 M.

E59.2: a CMU, where SE1 is a defect-free MWCNT and L1's affinity for SE1 is <1E-3 M.

E59.3: a CMU, where SE1 is a defect-free MWCNT and L1's affinity for SE1 is <1E-4 M.

E59.4: a CMU, where SE1 is a defect-free MWCNT and L1's affinity for SE1 is <1E-5 M.

E59.5: a CMU, where SE1 is a defect-free MWCNT and L1's affinity for SE1 is <1E-6 M.

E59.6: a CMU, where SE1 is a defect-free MWCNT and L1's affinity for SE1 is <1E-7 M.

E59.7: a CMU, where SE1 is a defect-free MWCNT and L1's affinity for SE1 is <1E-8 M.

E59.8: a CMU, where SE1 is a defect-free MWCNT and L1's affinity for SE1 is <1E-9 M.

E59.9: a CMU, where SE1 is a defect-free MWCNT and L1's affinity for SE1 is <1E-10 M.

E59.10: a CMU, where SE1 is a defect-free MWCNT and L1's affinity for SE1 is <1E-11 M.

E60.1: a CMU, where SE1 is a defect-free SWCNT and L1's affinity for SE1 is <1E-2 M.

E60.2: a CMU, where SE1 is a defect-free SWCNT and L1's affinity for SE1 is <1E-3 M.

E60.3: a CMU, where SE1 is a defect-free SWCNT and L1's affinity for SE1 is <1E-4 M.

E60.4: a CMU, where SE1 is a defect-free SWCNT and L1's affinity for SE1 is <1E-5 M.

E60.5: a CMU, where SE1 is a defect-free SWCNT and L1's affinity for SE1 is <1E-6 M.

E60.6: a CMU, where SE1 is a defect-free SWCNT and L1's affinity for SE1 is <1E-7 M.

E60.7: a CMU, where SE1 is a defect-free SWCNT and L1's affinity for SE1 is <1E-8 M.

E60.8: a CMU, where SE1 is a defect-free SWCNT and L1's affinity for SE1 is <1E-9 M.

E60.9: a CMU, where SE1 is a defect-free SWCNT and L1's affinity for SE1 is <1E-10 M.

E60.10: a CMU, where SE1 is a defect-free SWCNT and L1's affinity for SE1 is <1E-11 M.

E61.1: a CMU, where SE1 is a dielectric material and L1's affinity for SE1 is <1E-2 M.

E61.2: a CMU, where SE1 is a dielectric material and L1's affinity for SE1 is <1E-3 M.

E61.3: a CMU, where SE1 is a dielectric material and L1's affinity for SE1 is <1E-4 M.

E61.4: a CMU, where SE1 is a dielectric material and L1's affinity for SE1 is <1E-5 M.

E61.5: a CMU, where SE1 is a dielectric material and L1's affinity for SE1 is <1E-6 M.

E61.6: a CMU, where SE1 is a dielectric material and L1's affinity for SE1 is <1E-7 M.

E61.7: a CMU, where SE1 is a dielectric material and L1's affinity for SE1 is <1E-8 M.

E61.8: a CMU, where SE1 is a dielectric material and L1's affinity for SE1 is <1E-9 M.

E61.9: a CMU, where SE1 is a dielectric material and L1's affinity for SE1 is <1E-10 M.

E61.10: a CMU, where SE1 is a dielectric material and L1's affinity for SE1 is <1E-11 M.

E62.1: a CMU, where SE1 is a diode and L1's affinity for SE1 is <1E-2 M.

E62.2: a CMU, where SE1 is a diode and L1's affinity for SE1 is <1E-3 M.

E62.3: a CMU, where SE1 is a diode and L1's affinity for SE1 is <1E-4 M.

E62.4: a CMU, where SE1 is a diode and L1's affinity for SE1 is <1E-5 M.

E62.5: a CMU, where SE1 is a diode and L1's affinity for SE1 is <1E-6 M.

E62.6: a CMU, where SE1 is a diode and L1's affinity for SE1 is <1E-7 M.

E62.7: a CMU, where SE1 is a diode and L1's affinity for SE1 is <1E-8 M.

E62.8: a CMU, where SE1 is a diode and L1's affinity for SE1 is <1E-9 M.

E62.9: a CMU, where SE1 is a diode and L1's affinity for SE1 is <1E-10 M.

E62.10: a CMU, where SE1 is a diode and L1's affinity for SE1 is <1E-11 M.

E63.1: a CMU, where SE1 is a dodecahedrane and L1's affinity for SE1 is <1E-2 M.

E63.2: a CMU, where SE1 is a dodecahedrane and L1's affinity for SE1 is <1E-3 M.

E63.3: a CMU, where SE1 is a dodecahedrane and L1's affinity for SE1 is <1E-4 M.

E63.4: a CMU, where SE1 is a dodecahedrane and L1's affinity for SE1 is <1E-5 M.

E63.5: a CMU, where SE1 is a dodecahedrane and L1's affinity for SE1 is <1E-6 M.

E63.6: a CMU, where SE1 is a dodecahedrane and L1's affinity for SE1 is <1E-7 M.

E63.7: a CMU, where SE1 is a dodecahedrane and L1's affinity for SE1 is <1E-8 M.

E63.8: a CMU, where SE1 is a dodecahedrane and L1's affinity for SE1 is <1E-9 M.

E63.9: a CMU, where SE1 is a dodecahedrane and L1's affinity for SE1 is <1E-10 M.

E63.10: a CMU, where SE1 is a dodecahedrane and L1's affinity for SE1 is <1E-11 M.

E64.1: a CMU, where SE1 is a doped glass and L1's affinity for SE1 is <1E-2 M.

E64.2: a CMU, where SE1 is a doped glass and L1's affinity for SE1 is <1E-3 M.

E64.3: a CMU, where SE1 is a doped glass and L1's affinity for SE1 is <1E-4 M.

E64.4: a CMU, where SE1 is a doped glass and L1's affinity for SE1 is <1E-5 M.

E64.5: a CMU, where SE1 is a doped glass and L1's affinity for SE1 is <1E-6 M.

E64.6: a CMU, where SE1 is a doped glass and L1's affinity for SE1 is <1E-7 M.

E64.7: a CMU, where SE1 is a doped glass and L1's affinity for SE1 is <1E-8 M.

E64.8: a CMU, where SE1 is a doped glass and L1's affinity for SE1 is <1E-9 M.

E64.9: a CMU, where SE1 is a doped glass and L1's affinity for SE1 is <1E-10 M.

E64.10: a CMU, where SE1 is a doped glass and L1's affinity for SE1 is <1E-11 M.

E65.1: a CMU, where SE1 is a fibre and L1's affinity for SE1 is <1E-2 M.

E65.2: a CMU, where SE1 is a fibre and L1's affinity for SE1 is <1E-3 M.

E65.3: a CMU, where SE1 is a fibre and L1's affinity for SE1 is <1E-4 M.

E65.4: a CMU, where SE1 is a fibre and L1's affinity for SE1 is <1E-5 M.

E65.5: a CMU, where SE1 is a fibre and L1's affinity for SE1 is <1E-6 M.

E65.6: a CMU, where SE1 is a fibre and L1's affinity for SE1 is <1E-7 M.

E65.7: a CMU, where SE1 is a fibre and L1's affinity for SE1 is <1E-8 M.

E65.8: a CMU, where SE1 is a fibre and L1's affinity for SE1 is <1E-9 M.

E65.9: a CMU, where SE1 is a fibre and L1's affinity for SE1 is <1E-10 M.

E65.10: a CMU, where SE1 is a fibre and L1's affinity for SE1 is <1E-11 M.

E66.1: a CMU, where SE1 is a fullerite and L1's affinity for SE1 is <1E-2 M.

E66.2: a CMU, where SE1 is a fullerite and L1's affinity for SE1 is <1E-3 M.

E66.3: a CMU, where SE1 is a fullerite and L1's affinity for SE1 is <1E-4 M.

E66.4: a CMU, where SE1 is a fullerite and L1's affinity for SE1 is <1E-5 M.

E66.5: a CMU, where SE1 is a fullerite and L1's affinity for SE1 is <1E-6 M.

E66.6: a CMU, where SE1 is a fullerite and L1's affinity for SE1 is <1E-7 M.

E66.7: a CMU, where SE1 is a fullerite and L1's affinity for SE1 is <1E-8 M.

E66.8: a CMU, where SE1 is a fullerite and L1's affinity for SE1 is <1E-9 M.

E66.9: a CMU, where SE1 is a fullerite and L1's affinity for SE1 is <1E-10 M.

E66.10: a CMU, where SE1 is a fullerite and L1's affinity for SE1 is <1E-11 M.

E67.1: a CMU, where SE1 is a fused silica and L1's affinity for SE1 is <1E-2 M.

E67.2: a CMU, where SE1 is a fused silica and L1's affinity for SE1 is <1E-3 M.

E67.3: a CMU, where SE1 is a fused silica and L1's affinity for SE1 is <1E-4 M.

E67.4: a CMU, where SE1 is a fused silica and L1's affinity for SE1 is <1E-5 M.

E67.5: a CMU, where SE1 is a fused silica and L1's affinity for SE1 is <1E-6 M.

E67.6: a CMU, where SE1 is a fused silica and L1's affinity for SE1 is <1E-7 M.

E67.7: a CMU, where SE1 is a fused silica and L1's affinity for SE1 is <1E-8 M.

E67.8: a CMU, where SE1 is a fused silica and L1's affinity for SE1 is <1E-9 M.

E67.9: a CMU, where SE1 is a fused silica and L1's affinity for SE1 is <1E-10 M.

E67.10: a CMU, where SE1 is a fused silica and L1's affinity for SE1 is <1E-11 M.

E68.1: a CMU, where SE1 is a glue and L1's affinity for SE1 is <1E-2 M.

E68.2: a CMU, where SE1 is a glue and L1's affinity for SE1 is <1E-3 M.

E68.3: a CMU, where SE1 is a glue and L1's affinity for SE1 is <1E-4 M.

E68.4: a CMU, where SE1 is a glue and L1's affinity for SE1 is <1E-5 M.

E68.5: a CMU, where SE1 is a glue and L1's affinity for SE1 is <1E-6 M.

E68.6: a CMU, where SE1 is a glue and L1's affinity for SE1 is <1E-7 M.

E68.7: a CMU, where SE1 is a glue and L1's affinity for SE1 is <1E-8 M.

E68.8: a CMU, where SE1 is a glue and L1's affinity for SE1 is <1E-9 M.

E68.9: a CMU, where SE1 is a glue and L1's affinity for SE1 is <1E-10 M.

E68.10: a CMU, where SE1 is a glue and L1's affinity for SE1 is <1E-11 M.

E69.1: a CMU, where SE1 is a green ceramic and L1's affinity for SE1 is <1E-2 M.

E69.2: a CMU, where SE1 is a green ceramic and L1's affinity for SE1 is <1E-3 M.

E69.3: a CMU, where SE1 is a green ceramic and L1's affinity for SE1 is <1E-4 M.

E69.4: a CMU, where SE1 is a green ceramic and L1's affinity for SE1 is <1E-5 M.

E69.5: a CMU, where SE1 is a green ceramic and L1's affinity for SE1 is <1E-6 M.

E69.6: a CMU, where SE1 is a green ceramic and L1's affinity for SE1 is <1E-7 M.

E69.7: a CMU, where SE1 is a green ceramic and L1's affinity for SE1 is <1E-8 M.

E69.8: a CMU, where SE1 is a green ceramic and L1's affinity for SE1 is <1E-9 M.

E69.9: a CMU, where SE1 is a green ceramic and L1's affinity for SE1 is <1E-10 M.

E69.10: a CMU, where SE1 is a green ceramic and L1's affinity for SE1 is <1E-11 M.

E70.1: a CMU, where SE1 is a lanthanides and L1's affinity for SE1 is <1E-2 M.

E70.2: a CMU, where SE1 is a lanthanides and L1's affinity for SE1 is <1E-3 M.

E70.3: a CMU, where SE1 is a lanthanides and L1's affinity for SE1 is <1E-4 M.

E70.4: a CMU, where SE1 is a lanthanides and L1's affinity for SE1 is <1E-5 M.

E70.5: a CMU, where SE1 is a lanthanides and L1's affinity for SE1 is <1E-6 M.

E70.6: a CMU, where SE1 is a lanthanides and L1's affinity for SE1 is <1E-7 M.

E70.7: a CMU, where SE1 is a lanthanides and L1's affinity for SE1 is <1E-8 M.

E70.8: a CMU, where SE1 is a lanthanides and L1's affinity for SE1 is <1E-9 M.

E70.9: a CMU, where SE1 is a lanthanides and L1's affinity for SE1 is <1E-10 M.

E70.10: a CMU, where SE1 is a lanthanides and L1's affinity for SE1 is <1E-11 M.

E71.1: a CMU, where SE1 is a machinable ceramic and L1's affinity for SE1 is <1E-2 M.

E71.2: a CMU, where SE1 is a machinable ceramic and L1's affinity for SE1 is <1E-3 M.

E71.3: a CMU, where SE1 is a machinable ceramic and L1's affinity for SE1 is <1E-4 M.

E71.4: a CMU, where SE1 is a machinable ceramic and L1's affinity for SE1 is <1E-5 M.

E71.5: a CMU, where SE1 is a machinable ceramic and L1's affinity for SE1 is <1E-6 M.

E71.6: a CMU, where SE1 is a machinable ceramic and L1's affinity for SE1 is <1E-7 M.

E71.7: a CMU, where SE1 is a machinable ceramic and L1's affinity for SE1 is <1E-8 M.

E71.8: a CMU, where SE1 is a machinable ceramic and L1's affinity for SE1 is <1E-9 M.

E71.9: a CMU, where SE1 is a machinable ceramic and L1's affinity for SE1 is <1E-10 M.

E71.10: a CMU, where SE1 is a machinable ceramic and L1's affinity for SE1 is <1E-11 M.

E72.1: a CMU, where SE1 is a metal alloy and L1's affinity for SE1 is <1E-2 M.

E72.2: a CMU, where SE1 is a metal alloy and L1's affinity for SE1 is <1E-3 M.

E72.3: a CMU, where SE1 is a metal alloy and L1's affinity for SE1 is <1E-4 M.

E72.4: a CMU, where SE1 is a metal alloy and L1's affinity for SE1 is <1E-5 M.

E72.5: a CMU, where SE1 is a metal alloy and L1's affinity for SE1 is <1E-6 M.

E72.6: a CMU, where SE1 is a metal alloy and L1's affinity for SE1 is <1E-7 M.

E72.7: a CMU, where SE1 is a metal alloy and L1's affinity for SE1 is <1E-8 M.

E72.8: a CMU, where SE1 is a metal alloy and L1's affinity for SE1 is <1E-9 M.

E72.9: a CMU, where SE1 is a metal alloy and L1's affinity for SE1 is <1E-10 M.

E72.10: a CMU, where SE1 is a metal alloy and L1's affinity for SE1 is <1E-11 M.

E73.1: a CMU, where SE1 is a metal-functionalized carbon nanotube and L1's affinity for SE1 is <1E-2 M.

E73.2: a CMU, where SE1 is a metal-functionalized carbon nanotube and L1's affinity for SE1 is <1E-3 M.

E73.3: a CMU, where SE1 is a metal-functionalized carbon nanotube and L1's affinity for SE1 is <1E-4 M.

E73.4: a CMU, where SE1 is a metal-functionalized carbon nanotube and L1's affinity for SE1 is <1E-5 M.

E73.5: a CMU, where SE1 is a metal-functionalized carbon nanotube and L1's affinity for SE1 is <1E-6 M.

E73.6: a CMU, where SE1 is a metal-functionalized carbon nanotube and L1's affinity for SE1 is <1E-7 M.

E73.7: a CMU, where SE1 is a metal-functionalized carbon nanotube and L1's affinity for SE1 is <1E-8 M.

E73.8: a CMU, where SE1 is a metal-functionalized carbon nanotube and L1's affinity for SE1 is <1E-9 M.

E73.9: a CMU, where SE1 is a metal-functionalized carbon nanotube and L1's affinity for SE1 is <1E-10 M.

E73.10: a CMU, where SE1 is a metal-functionalized carbon nanotube and L1's affinity for SE1 is <1E-11 M.

E74.1: a CMU, where SE1 is a metalised dielectric and L1's affinity for SE1 is <1E-2 M.

E74.2: a CMU, where SE1 is a metalised dielectric and L1's affinity for SE1 is <1E-3 M.

E74.3: a CMU, where SE1 is a metalised dielectric and L1's affinity for SE1 is <1E-4 M.

E74.4: a CMU, where SE1 is a metalised dielectric and L1's affinity for SE1 is <1E-5 M.

E74.5: a CMU, where SE1 is a metalised dielectric and L1's affinity for SE1 is <1E-6 M.

E74.6: a CMU, where SE1 is a metalised dielectric and L1's affinity for SE1 is <1E-7 M.

E74.7: a CMU, where SE1 is a metalised dielectric and L1's affinity for SE1 is <1E-8 M.

E74.8: a CMU, where SE1 is a metalised dielectric and L1's affinity for SE1 is <1E-9 M.

E74.9: a CMU, where SE1 is a metalised dielectric and L1's affinity for SE1 is <1E-10 M.

E74.10: a CMU, where SE1 is a metalised dielectric and L1's affinity for SE1 is <1E-11 M.

E75.1: a CMU, where SE1 is a metallised ceramic and L1's affinity for SE1 is <1E-2 M.

E75.2: a CMU, where SE1 is a metallised ceramic and L1's affinity for SE1 is <1E-3 M.

E75.3: a CMU, where SE1 is a metallised ceramic and L1's affinity for SE1 is <1E-4 M.

E75.4: a CMU, where SE1 is a metallised ceramic and L1's affinity for SE1 is <1E-5 M.

E75.5: a CMU, where SE1 is a metallised ceramic and L1's affinity for SE1 is <1E-6 M.

E75.6: a CMU, where SE1 is a metallised ceramic and L1's affinity for SE1 is <1E-7 M.

E75.7: a CMU, where SE1 is a metallised ceramic and L1's affinity for SE1 is <1E-8 M.

E75.8: a CMU, where SE1 is a metallised ceramic and L1's affinity for SE1 is <1E-9 M.

E75.9: a CMU, where SE1 is a metallised ceramic and L1's affinity for SE1 is <1E-10 M.

E75.10: a CMU, where SE1 is a metallised ceramic and L1's affinity for SE1 is <1E-11 M.

E76.1: a CMU, where SE1 is a metalloid and L1's affinity for SE1 is <1E-2 M.

E76.2: a CMU, where SE1 is a metalloid and L1's affinity for SE1 is <1E-3 M.

E76.3: a CMU, where SE1 is a metalloid and L1's affinity for SE1 is <1E-4 M.

E76.4: a CMU, where SE1 is a metalloid and L1's affinity for SE1 is <1E-5 M.

E76.5: a CMU, where SE1 is a metalloid and L1's affinity for SE1 is <1E-6 M.

E76.6: a CMU, where SE1 is a metalloid and L1's affinity for SE1 is <1E-7 M.

E76.7: a CMU, where SE1 is a metalloid and L1's affinity for SE1 is <1E-8 M.

E76.8: a CMU, where SE1 is a metalloid and L1's affinity for SE1 is <1E-9 M.

E76.9: a CMU, where SE1 is a metalloid and L1's affinity for SE1 is <1E-10 M.

E76.10: a CMU, where SE1 is a metalloid and L1's affinity for SE1 is <1E-11 M.

E77.1: a CMU, where SE1 is a mineral and L1's affinity for SE1 is <1E-2 M.

E77.2: a CMU, where SE1 is a mineral and L1's affinity for SE1 is <1E-3 M.

E77.3: a CMU, where SE1 is a mineral and L1's affinity for SE1 is <1E-4 M.

E77.4: a CMU, where SE1 is a mineral and L1's affinity for SE1 is <1E-5 M.

E77.5: a CMU, where SE1 is a mineral and L1's affinity for SE1 is <1E-6 M.

E77.6: a CMU, where SE1 is a mineral and L1's affinity for SE1 is <1E-7 M.

E77.7: a CMU, where SE1 is a mineral and L1's affinity for SE1 is <1E-8 M.

E77.8: a CMU, where SE1 is a mineral and L1's affinity for SE1 is <1E-9 M.

E77.9: a CMU, where SE1 is a mineral and L1's affinity for SE1 is <1E-10 M.

E77.10: a CMU, where SE1 is a mineral and L1's affinity for SE1 is <1E-11 M.

E78.1: a CMU, where SE1 is a non-covalent crystal and L1's affinity for SE1 is <1E-2 M.

E78.2: a CMU, where SE1 is a non-covalent crystal and L1's affinity for SE1 is <1E-3 M.

E78.3: a CMU, where SE1 is a non-covalent crystal and L1's affinity for SE1 is <1E-4 M.

E78.4: a CMU, where SE1 is a non-covalent crystal and L1's affinity for SE1 is <1E-5 M.

E78.5: a CMU, where SE1 is a non-covalent crystal and L1's affinity for SE1 is <1E-6 M.

E78.6: a CMU, where SE1 is a non-covalent crystal and L1's affinity for SE1 is <1E-7 M.

E78.7: a CMU, where SE1 is a non-covalent crystal and L1's affinity for SE1 is <1E-8 M.

E78.8: a CMU, where SE1 is a non-covalent crystal and L1's affinity for SE1 is <1E-9 M.

E78.9: a CMU, where SE1 is a non-covalent crystal and L1's affinity for SE1 is <1E-10 M.

E78.10: a CMU, where SE1 is a non-covalent crystal and L1's affinity for SE1 is <1E-11 M.

E79.1: a CMU, where SE1 is a piezoelectric material and L1's affinity for SE1 is <1E-2 M.

E79.2: a CMU, where SE1 is a piezoelectric material and L1's affinity for SE1 is <1E-3 M.

E79.3: a CMU, where SE1 is a piezoelectric material and L1's affinity for SE1 is <1E-4 M.

E79.4: a CMU, where SE1 is a piezoelectric material and L1's affinity for SE1 is <1E-5 M.

E79.5: a CMU, where SE1 is a piezoelectric material and L1's affinity for SE1 is <1E-6 M.

E79.6: a CMU, where SE1 is a piezoelectric material and L1's affinity for SE1 is <1E-7 M.

E79.7: a CMU, where SE1 is a piezoelectric material and L1's affinity for SE1 is <1E-8 M.

E79.8: a CMU, where SE1 is a piezoelectric material and L1's affinity for SE1 is <1E-9 M.

E79.9: a CMU, where SE1 is a piezoelectric material and L1's affinity for SE1 is <1E-10 M.

E79.10: a CMU, where SE1 is a piezoelectric material and L1's affinity for SE1 is <1E-11 M.

E80.1: a CMU, where SE1 is a platinum group metal and L1's affinity for SE1 is <1E-2 M.

E80.2: a CMU, where SE1 is a platinum group metal and L1's affinity for SE1 is <1E-3 M.

E80.3: a CMU, where SE1 is a platinum group metal and L1's affinity for SE1 is <1E-4 M.

E80.4: a CMU, where SE1 is a platinum group metal and L1's affinity for SE1 is <1E-5 M.

E80.5: a CMU, where SE1 is a platinum group metal and L1's affinity for SE1 is <1E-6 M.

E80.6: a CMU, where SE1 is a platinum group metal and L1's affinity for SE1 is <1E-7 M.

E80.7: a CMU, where SE1 is a platinum group metal and L1's affinity for SE1 is <1E-8 M.

E80.8: a CMU, where SE1 is a platinum group metal and L1's affinity for SE1 is <1E-9 M.

E80.9: a CMU, where SE1 is a platinum group metal and L1's affinity for SE1 is <1E-10 M.

E80.10: a CMU, where SE1 is a platinum group metal and L1's affinity for SE1 is <1E-11 M.

E81.1: a CMU, where SE1 is a post-transition metal and L1's affinity for SE1 is <1E-2 M.

E81.2: a CMU, where SE1 is a post-transition metal and L1's affinity for SE1 is <1E-3 M.

E81.3: a CMU, where SE1 is a post-transition metal and L1's affinity for SE1 is <1E-4 M.

E81.4: a CMU, where SE1 is a post-transition metal and L1's affinity for SE1 is <1E-5 M.

E81.5: a CMU, where SE1 is a post-transition metal and L1's affinity for SE1 is <1E-6 M.

E81.6: a CMU, where SE1 is a post-transition metal and L1's affinity for SE1 is <1E-7 M.

E81.7: a CMU, where SE1 is a post-transition metal and L1's affinity for SE1 is <1E-8 M.

E81.8: a CMU, where SE1 is a post-transition metal and L1's affinity for SE1 is <1E-9 M.

E81.9: a CMU, where SE1 is a post-transition metal and L1's affinity for SE1 is <1E-10 M.

E81.10: a CMU, where SE1 is a post-transition metal and L1's affinity for SE1 is <1E-11 M.

E82.1: a CMU, where SE1 is a rare earth element, and L1's affinity for SE1 is <1E-2 M.

E82.2: a CMU, where SE1 is a rare earth element, and L1's affinity for SE1 is <1E-3 M.

E82.3: a CMU, where SE1 is a rare earth element, and L1's affinity for SE1 is <1E-4 M.

E82.4: a CMU, where SE1 is a rare earth element, and L1's affinity for SE1 is <1E-5 M.

E82.5: a CMU, where SE1 is a rare earth element, and L1's affinity for SE1 is <1E-6 M.

E82.6: a CMU, where SE1 is a rare earth element, and L1's affinity for SE1 is <1E-7 M.

E82.7: a CMU, where SE1 is a rare earth element, and L1's affinity for SE1 is <1E-8 M.

E82.8: a CMU, where SE1 is a rare earth element, and L1's affinity for SE1 is <1E-9 M.

E82.9: a CMU, where SE1 is a rare earth element, and L1's affinity for SE1 is <1E-10 M.

E82.10: a CMU, where SE1 is a rare earth element, and L1's affinity for SE1 is <1E-11 M.

E83.1: a CMU, where SE1 is a sapphire and L1's affinity for SE1 is <1E-2 M.

E83.2: a CMU, where SE1 is a sapphire and L1's affinity for SE1 is <1E-3 M.

E83.3: a CMU, where SE1 is a sapphire and L1's affinity for SE1 is <1E-4 M.

E83.4: a CMU, where SE1 is a sapphire and L1's affinity for SE1 is <1E-5 M.

E83.5: a CMU, where SE1 is a sapphire and L1's affinity for SE1 is <1E-6 M.

E83.6: a CMU, where SE1 is a sapphire and L1's affinity for SE1 is <1E-7 M.

E83.7: a CMU, where SE1 is a sapphire and L1's affinity for SE1 is <1E-8 M.

E83.8: a CMU, where SE1 is a sapphire and L1's affinity for SE1 is <1E-9 M.

E83.9: a CMU, where SE1 is a sapphire and L1's affinity for SE1 is <1E-10 M.

E83.10: a CMU, where SE1 is a sapphire and L1's affinity for SE1 is <1E-11 M.

E84.1: a CMU, where SE1 is a semiconductor and L1's affinity for SE1 is <1E-2 M.

E84.2: a CMU, where SE1 is a semiconductor and L1's affinity for SE1 is <1E-3 M.

E84.3: a CMU, where SE1 is a semiconductor and L1's affinity for SE1 is <1E-4 M.

E84.4: a CMU, where SE1 is a semiconductor and L1's affinity for SE1 is <1E-5 M.

E84.5: a CMU, where SE1 is a semiconductor and L1's affinity for SE1 is <1E-6 M.

E84.6: a CMU, where SE1 is a semiconductor and L1's affinity for SE1 is <1E-7 M.

E84.7: a CMU, where SE1 is a semiconductor and L1's affinity for SE1 is <1E-8 M.

E84.8: a CMU, where SE1 is a semiconductor and L1's affinity for SE1 is <1E-9 M.

E84.9: a CMU, where SE1 is a semiconductor and L1's affinity for SE1 is <1E-10 M.

E84.10: a CMU, where SE1 is a semiconductor and L1's affinity for SE1 is <1E-11 M.

E85.1: a CMU, where SE1 is a sensor and L1's affinity for SE1 is <1E-2 M.

E85.2: a CMU, where SE1 is a sensor and L1's affinity for SE1 is <1E-3 M.

E85.3: a CMU, where SE1 is a sensor and L1's affinity for SE1 is <1E-4 M.

E85.4: a CMU, where SE1 is a sensor and L1's affinity for SE1 is <1E-5 M.

E85.5: a CMU, where SE1 is a sensor and L1's affinity for SE1 is <1E-6 M.

E85.6: a CMU, where SE1 is a sensor and L1's affinity for SE1 is <1E-7 M.

E85.7: a CMU, where SE1 is a sensor and L1's affinity for SE1 is <1E-8 M.

E85.8: a CMU, where SE1 is a sensor and L1's affinity for SE1 is <1E-9 M.

E85.9: a CMU, where SE1 is a sensor and L1's affinity for SE1 is <1E-10 M.

E85.10: a CMU, where SE1 is a sensor and L1's affinity for SE1 is <1E-11 M.

E86.1: a CMU, where SE1 is a silicon nitride and L1's affinity for SE1 is <1E-2 M.

E86.2: a CMU, where SE1 is a silicon nitride and L1's affinity for SE1 is <1E-3 M.

E86.3: a CMU, where SE1 is a silicon nitride and L1's affinity for SE1 is <1E-4 M.

E86.4: a CMU, where SE1 is a silicon nitride and L1's affinity for SE1 is <1E-5 M.

E86.5: a CMU, where SE1 is a silicon nitride and L1's affinity for SE1 is <1E-6 M.

E86.6: a CMU, where SE1 is a silicon nitride and L1's affinity for SE1 is <1E-7 M.

E86.7: a CMU, where SE1 is a silicon nitride and L1's affinity for SE1 is <1E-8 M.

E86.8: a CMU, where SE1 is a silicon nitride and L1's affinity for SE1 is <1E-9 M.

E86.9: a CMU, where SE1 is a silicon nitride and L1's affinity for SE1 is <1E-10 M.

E86.10: a CMU, where SE1 is a silicon nitride and L1's affinity for SE1 is <1E-11 M.

E87.1: a CMU, where SE1 is a single crystal fiber and L1's affinity for SE1 is <1E-2 M.

E87.2: a CMU, where SE1 is a single crystal fiber and L1's affinity for SE1 is <1E-3 M.

E87.3: a CMU, where SE1 is a single crystal fiber and L1's affinity for SE1 is <1E-4 M.

E87.4: a CMU, where SE1 is a single crystal fiber and L1's affinity for SE1 is <1E-5 M.

E87.5: a CMU, where SE1 is a single crystal fiber and L1's affinity for SE1 is <1E-6 M.

E87.6: a CMU, where SE1 is a single crystal fiber and L1's affinity for SE1 is <1E-7 M.

E87.7: a CMU, where SE1 is a single crystal fiber and L1's affinity for SE1 is <1E-8 M.

E87.8: a CMU, where SE1 is a single crystal fiber and L1's affinity for SE1 is <1E-9 M.

E87.9: a CMU, where SE1 is a single crystal fiber and L1's affinity for SE1 is <1E-10 M.

E87.10: a CMU, where SE1 is a single crystal fiber and L1's affinity for SE1 is <1E-11 M.

E88.1: a CMU, where SE1 is a sol-gel and L1's affinity for SE1 is <1E-2 M.

E88.2: a CMU, where SE1 is a sol-gel and L1's affinity for SE1 is <1E-3 M.

E88.3: a CMU, where SE1 is a sol-gel and L1's affinity for SE1 is <1E-4 M.

E88.4: a CMU, where SE1 is a sol-gel and L1's affinity for SE1 is <1E-5 M.

E88.5: a CMU, where SE1 is a sol-gel and L1's affinity for SE1 is <1E-6 M.

E88.6: a CMU, where SE1 is a sol-gel and L1's affinity for SE1 is <1E-7 M.

E88.7: a CMU, where SE1 is a sol-gel and L1's affinity for SE1 is <1E-8 M.

E88.8: a CMU, where SE1 is a sol-gel and L1's affinity for SE1 is <1E-9 M.

E88.9: a CMU, where SE1 is a sol-gel and L1's affinity for SE1 is <1E-10 M.

E88.10: a CMU, where SE1 is a sol-gel and L1's affinity for SE1 is <1E-11 M.

E89.1: a CMU, where SE1 is a synthetic diamond and L1's affinity for SE1 is <1E-2 M.

E89.2: a CMU, where SE1 is a synthetic diamond and L1's affinity for SE1 is <1E-3 M.

E89.3: a CMU, where SE1 is a synthetic diamond and L1's affinity for SE1 is <1E-4 M.

E89.4: a CMU, where SE1 is a synthetic diamond and L1's affinity for SE1 is <1E-5 M.

E89.5: a CMU, where SE1 is a synthetic diamond and L1's affinity for SE1 is <1E-6 M.

E89.6: a CMU, where SE1 is a synthetic diamond and L1's affinity for SE1 is <1E-7 M.

E89.7: a CMU, where SE1 is a synthetic diamond and L1's affinity for SE1 is <1E-8 M.

E89.8: a CMU, where SE1 is a synthetic diamond and L1's affinity for SE1 is <1E-9 M.

E89.9: a CMU, where SE1 is a synthetic diamond and L1's affinity for SE1 is <1E-10 M.

E89.10: a CMU, where SE1 is a synthetic diamond and L1's affinity for SE1 is <1E-11 M.

E90.1: a CMU, where SE1 is a transition metal and L1's affinity for SE1 is <1E-2 M.

E90.2: a CMU, where SE1 is a transition metal and L1's affinity for SE1 is <1E-3 M.

E90.3: a CMU, where SE1 is a transition metal and L1's affinity for SE1 is <1E-4 M.

E90.4: a CMU, where SE1 is a transition metal and L1's affinity for SE1 is <1E-5 M.

E90.5: a CMU, where SE1 is a transition metal and L1's affinity for SE1 is <1E-6 M.

E90.6: a CMU, where SE1 is a transition metal and L1's affinity for SE1 is <1E-7 M.

E90.7: a CMU, where SE1 is a transition metal and L1's affinity for SE1 is <1E-8 M.

E90.8: a CMU, where SE1 is a transition metal and L1's affinity for SE1 is <1E-9 M.

E90.9: a CMU, where SE1 is a transition metal and L1's affinity for SE1 is <1E-10 M.

E90.10: a CMU, where SE1 is a transition metal and L1's affinity for SE1 is <1E-11 M.

E91.1: a CMU, where SE1 is a triple-wall carbon nanotube and L1's affinity for SE1 is <1E-2 M.

E91.2: a CMU, where SE1 is a triple-wall carbon nanotube and L1's affinity for SE1 is <1E-3 M.

E91.3: a CMU, where SE1 is a triple-wall carbon nanotube and L1's affinity for SE1 is <1E-4 M.

E91.4: a CMU, where SE1 is a triple-wall carbon nanotube and L1's affinity for SE1 is <1E-5 M.

E91.5: a CMU, where SE1 is a triple-wall carbon nanotube and L1's affinity for SE1 is <1E-6 M.

E91.6: a CMU, where SE1 is a triple-wall carbon nanotube and L1's affinity for SE1 is <1E-7 M.

E91.7: a CMU, where SE1 is a triple-wall carbon nanotube and L1's affinity for SE1 is <1E-8 M.

E91.8: a CMU, where SE1 is a triple-wall carbon nanotube and L1's affinity for SE1 is <1E-9 M.

E91.9: a CMU, where SE1 is a triple-wall carbon nanotube and L1's affinity for SE1 is <1E-10 M.

E91.10: a CMU, where SE1 is a triple-wall carbon nanotube and L1's affinity for SE1 is <1E-11 M.

E92.1: a CMU, where SE1 is a tungsten carbide and L1's affinity for SE1 is <1E-2 M.

E92.2: a CMU, where SE1 is a tungsten carbide and L1's affinity for SE1 is <1E-3 M.

E92.3: a CMU, where SE1 is a tungsten carbide and L1's affinity for SE1 is <1E-4 M.

E92.4: a CMU, where SE1 is a tungsten carbide and L1's affinity for SE1 is <1E-5 M.

E92.5: a CMU, where SE1 is a tungsten carbide and L1's affinity for SE1 is <1E-6 M.

E92.6: a CMU, where SE1 is a tungsten carbide and L1's affinity for SE1 is <1E-7 M.

E92.7: a CMU, where SE1 is a tungsten carbide and L1's affinity for SE1 is <1E-8 M.

E92.8: a CMU, where SE1 is a tungsten carbide and L1's affinity for SE1 is <1E-9 M.

E92.9: a CMU, where SE1 is a tungsten carbide and L1's affinity for SE1 is <1E-10 M.

E92.10: a CMU, where SE1 is a tungsten carbide and L1's affinity for SE1 is <1E-11 M.

E93.1: a CMU, where SE1 is alumina and L1's affinity for SE1 is <1E-2 M.

E93.2: a CMU, where SE1 is alumina and L1's affinity for SE1 is <1E-3 M.

E93.3: a CMU, where SE1 is alumina and L1's affinity for SE1 is <1E-4 M.

E93.4: a CMU, where SE1 is alumina and L1's affinity for SE1 is <1E-5 M.

E93.5: a CMU, where SE1 is alumina and L1's affinity for SE1 is <1E-6 M.

E93.6: a CMU, where SE1 is alumina and L1's affinity for SE1 is <1E-7 M.

E93.7: a CMU, where SE1 is alumina and L1's affinity for SE1 is <1E-8 M.

E93.8: a CMU, where SE1 is alumina and L1's affinity for SE1 is <1E-9 M.

E93.9: a CMU, where SE1 is alumina and L1's affinity for SE1 is <1E-10 M.

E93.10: a CMU, where SE1 is alumina and L1's affinity for SE1 is <1E-11 M.

E94.1: a CMU, where SE1 is alumina trihydrate and L1's affinity for SE1 is <1E-2 M.

E94.2: a CMU, where SE1 is alumina trihydrate and L1's affinity for SE1 is <1E-3 M.

E94.3: a CMU, where SE1 is alumina trihydrate and L1's affinity for SE1 is <1E-4 M.

E94.4: a CMU, where SE1 is alumina trihydrate and L1's affinity for SE1 is <1E-5 M.

E94.5: a CMU, where SE1 is alumina trihydrate and L1's affinity for SE1 is <1E-6 M.

E94.6: a CMU, where SE1 is alumina trihydrate and L1's affinity for SE1 is <1E-7 M.

E94.7: a CMU, where SE1 is alumina trihydrate and L1's affinity for SE1 is <1E-8 M.

E94.8: a CMU, where SE1 is alumina trihydrate and L1's affinity for SE1 is <1E-9 M.

E94.9: a CMU, where SE1 is alumina trihydrate and L1's affinity for SE1 is <1E-10 M.

E94.10: a CMU, where SE1 is alumina trihydrate and L1's affinity for SE1 is <1E-11 M.

E95.1: a CMU, where SE1 is aluminium and L1's affinity for SE1 is <1E-2 M.

E95.2: a CMU, where SE1 is aluminium and L1's affinity for SE1 is <1E-3 M.

E95.3: a CMU, where SE1 is aluminium and L1's affinity for SE1 is <1E-4 M.

E95.4: a CMU, where SE1 is aluminium and L1's affinity for SE1 is <1E-5 M.

E95.5: a CMU, where SE1 is aluminium and L1's affinity for SE1 is <1E-6 M.

E95.6: a CMU, where SE1 is aluminium and L1's affinity for SE1 is <1E-7 M.

E95.7: a CMU, where SE1 is aluminium and L1's affinity for SE1 is <1E-8 M.

E95.8: a CMU, where SE1 is aluminium and L1's affinity for SE1 is <1E-9 M.

E95.9: a CMU, where SE1 is aluminium and L1's affinity for SE1 is <1E-10 M.

E95.10: a CMU, where SE1 is aluminium and L1's affinity for SE1 is <1E-11 M.

E96.1: a CMU, where SE1 is aluminum boride and L1's affinity for SE1 is <1E-2 M.

E96.2: a CMU, where SE1 is aluminum boride and L1's affinity for SE1 is <1E-3 M.

E96.3: a CMU, where SE1 is aluminum boride and L1's affinity for SE1 is <1E-4 M.

E96.4: a CMU, where SE1 is aluminum boride and L1's affinity for SE1 is <1E-5 M.

E96.5: a CMU, where SE1 is aluminum boride and L1's affinity for SE1 is <1E-6 M.

E96.6: a CMU, where SE1 is aluminum boride and L1's affinity for SE1 is <1E-7 M.

E96.7: a CMU, where SE1 is aluminum boride and L1's affinity for SE1 is <1E-8 M.

E96.8: a CMU, where SE1 is aluminum boride and L1's affinity for SE1 is <1E-9 M.

E96.9: a CMU, where SE1 is aluminum boride and L1's affinity for SE1 is <1E-10 M.

E96.10: a CMU, where SE1 is aluminum boride and L1's affinity for SE1 is <1E-11 M.

E97.1: a CMU, where SE1 is aluminum oxide and L1's affinity for SE1 is <1E-2 M.

E97.2: a CMU, where SE1 is aluminum oxide and L1's affinity for SE1 is <1E-3 M.

E97.3: a CMU, where SE1 is aluminum oxide and L1's affinity for SE1 is <1E-4 M.

E97.4: a CMU, where SE1 is aluminum oxide and L1's affinity for SE1 is <1E-5 M.

E97.5: a CMU, where SE1 is aluminum oxide and L1's affinity for SE1 is <1E-6 M.

E97.6: a CMU, where SE1 is aluminum oxide and L1's affinity for SE1 is <1E-7 M.

E97.7: a CMU, where SE1 is aluminum oxide and L1's affinity for SE1 is <1E-8 M.

E97.8: a CMU, where SE1 is aluminum oxide and L1's affinity for SE1 is <1E-9 M.

E97.9: a CMU, where SE1 is aluminum oxide and L1's affinity for SE1 is <1E-10 M.

E97.10: a CMU, where SE1 is aluminum oxide and L1's affinity for SE1 is <1E-11 M.

E98.1: a CMU, where SE1 is aluminum trihydroxide and L1's affinity for SE1 is <1E-2 M.

E98.2: a CMU, where SE1 is aluminum trihydroxide and L1's affinity for SE1 is <1E-3 M.

E98.3: a CMU, where SE1 is aluminum trihydroxide and L1's affinity for SE1 is <1E-4 M.

E98.4: a CMU, where SE1 is aluminum trihydroxide and L1's affinity for SE1 is <1E-5 M.

E98.5: a CMU, where SE1 is aluminum trihydroxide and L1's affinity for SE1 is <1E-6 M.

E98.6: a CMU, where SE1 is aluminum trihydroxide and L1's affinity for SE1 is <1E-7 M.

E98.7: a CMU, where SE1 is aluminum trihydroxide and L1's affinity for SE1 is <1E-8 M.

E98.8: a CMU, where SE1 is aluminum trihydroxide and L1's affinity for SE1 is <1E-9 M.

E98.9: a CMU, where SE1 is aluminum trihydroxide and L1's affinity for SE1 is <1E-10 M.

E98.10: a CMU, where SE1 is aluminum trihydroxide and L1's affinity for SE1 is <1E-11 M.

E99.1: a CMU, where SE1 is amorphous carbon and L1's affinity for SE1 is <1E-2 M.

E99.2: a CMU, where SE1 is amorphous carbon and L1's affinity for SE1 is <1E-3 M.

E99.3: a CMU, where SE1 is amorphous carbon and L1's affinity for SE1 is <1E-4 M.

E99.4: a CMU, where SE1 is amorphous carbon and L1's affinity for SE1 is <1E-5 M.

E99.5: a CMU, where SE1 is amorphous carbon and L1's affinity for SE1 is <1E-6 M.

E99.6: a CMU, where SE1 is amorphous carbon and L1's affinity for SE1 is <1E-7 M.

E99.7: a CMU, where SE1 is amorphous carbon and L1's affinity for SE1 is <1E-8 M.

E99.8: a CMU, where SE1 is amorphous carbon and L1's affinity for SE1 is <1E-9 M.

E99.9: a CMU, where SE1 is amorphous carbon and L1's affinity for SE1 is <1E-10 M.

E99.10: a CMU, where SE1 is amorphous carbon and L1's affinity for SE1 is <1E-11 M.

E100.1: a CMU, where SE1 is an actinides and L1's affinity for SE1 is <1E-2 M.

E100.2: a CMU, where SE1 is an actinides and L1's affinity for SE1 is <1E-3 M.

E100.3: a CMU, where SE1 is an actinides and L1's affinity for SE1 is <1E-4 M.

E100.4: a CMU, where SE1 is an actinides and L1's affinity for SE1 is <1E-5 M.

E100.5: a CMU, where SE1 is an actinides and L1's affinity for SE1 is <1E-6 M.

E100.6: a CMU, where SE1 is an actinides and L1's affinity for SE1 is <1E-7 M.

E100.7: a CMU, where SE1 is an actinides and L1's affinity for SE1 is <1E-8 M.

E100.8: a CMU, where SE1 is an actinides and L1's affinity for SE1 is <1E-9 M.

E100.9: a CMU, where SE1 is an actinides and L1's affinity for SE1 is <1E-10 M.

E100.10: a CMU, where SE1 is an actinides and L1's affinity for SE1 is <1E-11 M.

E101.1: a CMU, where SE1 is an amalgam and L1's affinity for SE1 is <1E-2 M.

E101.2: a CMU, where SE1 is an amalgam and L1's affinity for SE1 is <1E-3 M.

E101.3: a CMU, where SE1 is an amalgam and L1's affinity for SE1 is <1E-4 M.

E101.4: a CMU, where SE1 is an amalgam and L1's affinity for SE1 is <1E-5 M.

E101.5: a CMU, where SE1 is an amalgam and L1's affinity for SE1 is <1E-6 M.

E101.6: a CMU, where SE1 is an amalgam and L1's affinity for SE1 is <1E-7 M.

E101.7: a CMU, where SE1 is an amalgam and L1's affinity for SE1 is <1E-8 M.

E101.8: a CMU, where SE1 is an amalgam and L1's affinity for SE1 is <1E-9 M.

E101.9: a CMU, where SE1 is an amalgam and L1's affinity for SE1 is <1E-10 M.

E101.10: a CMU, where SE1 is an amalgam and L1's affinity for SE1 is <1E-11 M.

E102.1: a CMU, where SE1 is an anode and L1's affinity for SE1 is <1E-2 M.

E102.2: a CMU, where SE1 is an anode and L1's affinity for SE1 is <1E-3 M.

E102.3: a CMU, where SE1 is an anode and L1's affinity for SE1 is <1E-4 M.

E102.4: a CMU, where SE1 is an anode and L1's affinity for SE1 is <1E-5 M.

E102.5: a CMU, where SE1 is an anode and L1's affinity for SE1 is <1E-6 M.

E102.6: a CMU, where SE1 is an anode and L1's affinity for SE1 is <1E-7 M.

E102.7: a CMU, where SE1 is an anode and L1's affinity for SE1 is <1E-8 M.

E102.8: a CMU, where SE1 is an anode and L1's affinity for SE1 is <1E-9 M.

E102.9: a CMU, where SE1 is an anode and L1's affinity for SE1 is <1E-10 M.

E102.10: a CMU, where SE1 is an anode and L1's affinity for SE1 is <1E-11 M.

E103.1: a CMU, where SE1 is an elastomers and L1's affinity for SE1 is <1E-2 M.

E103.2: a CMU, where SE1 is an elastomers and L1's affinity for SE1 is <1E-3 M.

E103.3: a CMU, where SE1 is an elastomers and L1's affinity for SE1 is <1E-4 M.

E103.4: a CMU, where SE1 is an elastomers and L1's affinity for SE1 is <1E-5 M.

E103.5: a CMU, where SE1 is an elastomers and L1's affinity for SE1 is <1E-6 M.

E103.6: a CMU, where SE1 is an elastomers and L1's affinity for SE1 is <1E-7 M.

E103.7: a CMU, where SE1 is an elastomers and L1's affinity for SE1 is <1E-8 M.

E103.8: a CMU, where SE1 is an elastomers and L1's affinity for SE1 is <1E-9 M.

E103.9: a CMU, where SE1 is an elastomers and L1's affinity for SE1 is <1E-10 M.

E103.10: a CMU, where SE1 is an elastomers and L1's affinity for SE1 is <1E-11 M.

E104.1: a CMU, where SE1 is an electrode and L1's affinity for SE1 is <1E-2 M.

E104.2: a CMU, where SE1 is an electrode and L1's affinity for SE1 is <1E-3 M.

E104.3: a CMU, where SE1 is an electrode and L1's affinity for SE1 is <1E-4 M.

E104.4: a CMU, where SE1 is an electrode and L1's affinity for SE1 is <1E-5 M.

E104.5: a CMU, where SE1 is an electrode and L1's affinity for SE1 is <1E-6 M.

E104.6: a CMU, where SE1 is an electrode and L1's affinity for SE1 is <1E-7 M.

E104.7: a CMU, where SE1 is an electrode and L1's affinity for SE1 is <1E-8 M.
E104.8: a CMU, where SE1 is an electrode and L1's affinity for SE1 is <1E-9 M.
E104.9: a CMU, where SE1 is an electrode and L1's affinity for SE1 is <1E-10 M.
E104.10: a CMU, where SE1 is an electrode and L1's affinity for SE1 is <1E-11 M.
E105.1: a CMU, where SE1 is an endohedral fullerene and L1's affinity for SE1 is <1E-2 M.
E105.2: a CMU, where SE1 is an endohedral fullerene and L1's affinity for SE1 is <1E-3 M.
E105.3: a CMU, where SE1 is an endohedral fullerene and L1's affinity for SE1 is <1E-4 M.
E105.4: a CMU, where SE1 is an endohedral fullerene and L1's affinity for SE1 is <1E-5 M.
E105.5: a CMU, where SE1 is an endohedral fullerene and L1's affinity for SE1 is <1E-6 M.
E105.6: a CMU, where SE1 is an endohedral fullerene and L1's affinity for SE1 is <1E-7 M.
E105.7: a CMU, where SE1 is an endohedral fullerene and L1's affinity for SE1 is <1E-8 M.
E105.8: a CMU, where SE1 is an endohedral fullerene and L1's affinity for SE1 is <1E-9 M.
E105.9: a CMU, where SE1 is an endohedral fullerene and L1's affinity for SE1 is <1E-10 M.
E105.10: a CMU, where SE1 is an endohedral fullerene and L1's affinity for SE1 is <1E-11 M.
E106.1: a CMU, where SE1 is an insulator and L1's affinity for SE1 is <1E-2 M.
E106.2: a CMU, where SE1 is an insulator and L1's affinity for SE1 is <1E-3 M.
E106.3: a CMU, where SE1 is an insulator and L1's affinity for SE1 is <1E-4 M.
E106.4: a CMU, where SE1 is an insulator and L1's affinity for SE1 is <1E-5 M.
E106.5: a CMU, where SE1 is an insulator and L1's affinity for SE1 is <1E-6 M.
E106.6: a CMU, where SE1 is an insulator and L1's affinity for SE1 is <1E-7 M.
E106.7: a CMU, where SE1 is an insulator and L1's affinity for SE1 is <1E-8 M.
E106.8: a CMU, where SE1 is an insulator and L1's affinity for SE1 is <1E-9 M.
E106.9: a CMU, where SE1 is an insulator and L1's affinity for SE1 is <1E-10 M.
E106.10: a CMU, where SE1 is an insulator and L1's affinity for SE1 is <1E-11 M.
E107.1: a CMU, where SE1 is an intermetallic and L1's affinity for SE1 is <1E-2 M.
E107.2: a CMU, where SE1 is an intermetallic and L1's affinity for SE1 is <1E-3 M.
E107.3: a CMU, where SE1 is an intermetallic and L1's affinity for SE1 is <1E-4 M.
E107.4: a CMU, where SE1 is an intermetallic and L1's affinity for SE1 is <1E-5 M.
E107.5: a CMU, where SE1 is an intermetallic and L1's affinity for SE1 is <1E-6 M.
E107.6: a CMU, where SE1 is an intermetallic and L1's affinity for SE1 is <1E-7 M.
E107.7: a CMU, where SE1 is an intermetallic and L1's affinity for SE1 is <1E-8 M.
E107.8: a CMU, where SE1 is an intermetallic and L1's affinity for SE1 is <1E-9 M.
E107.9: a CMU, where SE1 is an intermetallic and L1's affinity for SE1 is <1E-10 M.
E107.10: a CMU, where SE1 is an intermetallic and L1's affinity for SE1 is <1E-11 M.
E108.1: a CMU, where SE1 is an ionic crystal and L1's affinity for SE1 is <1E-2 M.
E108.2: a CMU, where SE1 is an ionic crystal and L1's affinity for SE1 is <1E-3 M.
E108.3: a CMU, where SE1 is an ionic crystal and L1's affinity for SE1 is <1E-4 M.
E108.4: a CMU, where SE1 is an ionic crystal and L1's affinity for SE1 is <1E-5 M.
E108.5: a CMU, where SE1 is an ionic crystal and L1's affinity for SE1 is <1E-6 M.
E108.6: a CMU, where SE1 is an ionic crystal and L1's affinity for SE1 is <1E-7 M.
E108.7: a CMU, where SE1 is an ionic crystal and L1's affinity for SE1 is <1E-8 M.
E108.8: a CMU, where SE1 is an ionic crystal and L1's affinity for SE1 is <1E-9 M.
E108.9: a CMU, where SE1 is an ionic crystal and L1's affinity for SE1 is <1E-10 M.
E108.10: a CMU, where SE1 is an ionic crystal and L1's affinity for SE1 is <1E-11 M.
E109.1: a CMU, where SE1 is an organic material and L1's affinity for SE1 is <1E-2 M.
E109.2: a CMU, where SE1 is an organic material and L1's affinity for SE1 is <1E-3 M.
E109.3: a CMU, where SE1 is an organic material and L1's affinity for SE1 is <1E-4 M.
E109.4: a CMU, where SE1 is an organic material and L1's affinity for SE1 is <1E-5 M.
E109.5: a CMU, where SE1 is an organic material and L1's affinity for SE1 is <1E-6 M.
E109.6: a CMU, where SE1 is an organic material and L1's affinity for SE1 is <1E-7 M.
E109.7: a CMU, where SE1 is an organic material and L1's affinity for SE1 is <1E-8 M.
E109.8: a CMU, where SE1 is an organic material and L1's affinity for SE1 is <1E-9 M.
E109.9: a CMU, where SE1 is an organic material and L1's affinity for SE1 is <1E-10 M.
E109.10: a CMU, where SE1 is an organic material and L1's affinity for SE1 is <1E-11 M.
E110.1: a CMU, where SE1 is anode and L1's affinity for SE1 is <1E-2 M.
E110.2: a CMU, where SE1 is anode and L1's affinity for SE1 is <1E-3 M.
E110.3: a CMU, where SE1 is anode and L1's affinity for SE1 is <1E-4 M.
E110.4: a CMU, where SE1 is anode and L1's affinity for SE1 is <1E-5 M.
E110.5: a CMU, where SE1 is anode and L1's affinity for SE1 is <1E-6 M.
E110.6: a CMU, where SE1 is anode and L1's affinity for SE1 is <1E-7 M.
E110.7: a CMU, where SE1 is anode and L1's affinity for SE1 is <1E-8 M.
E110.8: a CMU, where SE1 is anode and L1's affinity for SE1 is <1E-9 M.
E110.9: a CMU, where SE1 is anode and L1's affinity for SE1 is <1E-10 M.
E110.10: a CMU, where SE1 is anode and L1's affinity for SE1 is <1E-11 M.
E111.1: a CMU, where SE1 is anthracite and L1's affinity for SE1 is <1E-2 M.
E111.2: a CMU, where SE1 is anthracite and L1's affinity for SE1 is <1E-3 M.

E111.3: a CMU, where SE1 is anthracite and L1's affinity for SE1 is <1E-4 M.

E111.4: a CMU, where SE1 is anthracite and L1's affinity for SE1 is <1E-5 M.

E111.5: a CMU, where SE1 is anthracite and L1's affinity for SE1 is <1E-6 M.

E111.6: a CMU, where SE1 is anthracite and L1's affinity for SE1 is <1E-7 M.

E111.7: a CMU, where SE1 is anthracite and L1's affinity for SE1 is <1E-8 M.

E111.8: a CMU, where SE1 is anthracite and L1's affinity for SE1 is <1E-9 M.

E111.9: a CMU, where SE1 is anthracite and L1's affinity for SE1 is <1E-10 M.

E111.10: a CMU, where SE1 is anthracite and L1's affinity for SE1 is <1E-11 M.

E112.1: a CMU, where SE1 is asbestos and L1's affinity for SE1 is <1E-2 M.

E112.2: a CMU, where SE1 is asbestos and L1's affinity for SE1 is <1E-3 M.

E112.3: a CMU, where SE1 is asbestos and L1's affinity for SE1 is <1E-4 M.

E112.4: a CMU, where SE1 is asbestos and L1's affinity for SE1 is <1E-5 M.

E112.5: a CMU, where SE1 is asbestos and L1's affinity for SE1 is <1E-6 M.

E112.6: a CMU, where SE1 is asbestos and L1's affinity for SE1 is <1E-7 M.

E112.7: a CMU, where SE1 is asbestos and L1's affinity for SE1 is <1E-8 M.

E112.8: a CMU, where SE1 is asbestos and L1's affinity for SE1 is <1E-9 M.

E112.9: a CMU, where SE1 is asbestos and L1's affinity for SE1 is <1E-10 M.

E112.10: a CMU, where SE1 is asbestos and L1's affinity for SE1 is <1E-11 M.

E113.1: a CMU, where SE1 is barium and L1's affinity for SE1 is <1E-2 M.

E113.2: a CMU, where SE1 is barium and L1's affinity for SE1 is <1E-3 M.

E113.3: a CMU, where SE1 is barium and L1's affinity for SE1 is <1E-4 M.

E113.4: a CMU, where SE1 is barium and L1's affinity for SE1 is <1E-5 M.

E113.5: a CMU, where SE1 is barium and L1's affinity for SE1 is <1E-6 M.

E113.6: a CMU, where SE1 is barium and L1's affinity for SE1 is <1E-7 M.

E113.7: a CMU, where SE1 is barium and L1's affinity for SE1 is <1E-8 M.

E113.8: a CMU, where SE1 is barium and L1's affinity for SE1 is <1E-9 M.

E113.9: a CMU, where SE1 is barium and L1's affinity for SE1 is <1E-10 M.

E113.10: a CMU, where SE1 is barium and L1's affinity for SE1 is <1E-11 M.

E114.1: a CMU, where SE1 is bone and L1's affinity for SE1 is <1E-2 M.

E114.2: a CMU, where SE1 is bone and L1's affinity for SE1 is <1E-3 M.

E114.3: a CMU, where SE1 is bone and L1's affinity for SE1 is <1E-4 M.

E114.4: a CMU, where SE1 is bone and L1's affinity for SE1 is <1E-5 M.

E114.5: a CMU, where SE1 is bone and L1's affinity for SE1 is <1E-6 M.

E114.6: a CMU, where SE1 is bone and L1's affinity for SE1 is <1E-7 M.

E114.7: a CMU, where SE1 is bone and L1's affinity for SE1 is <1E-8 M.

E114.8: a CMU, where SE1 is bone and L1's affinity for SE1 is <1E-9 M.

E114.9: a CMU, where SE1 is bone and L1's affinity for SE1 is <1E-10 M.

E114.10: a CMU, where SE1 is bone and L1's affinity for SE1 is <1E-11 M.

E115.1: a CMU, where SE1 is boron and L1's affinity for SE1 is <1E-2 M.

E115.2: a CMU, where SE1 is boron and L1's affinity for SE1 is <1E-3 M.

E115.3: a CMU, where SE1 is boron and L1's affinity for SE1 is <1E-4 M.

E115.4: a CMU, where SE1 is boron and L1's affinity for SE1 is <1E-5 M.

E115.5: a CMU, where SE1 is boron and L1's affinity for SE1 is <1E-6 M.

E115.6: a CMU, where SE1 is boron and L1's affinity for SE1 is <1E-7 M.

E115.7: a CMU, where SE1 is boron and L1's affinity for SE1 is <1E-8 M.

E115.8: a CMU, where SE1 is boron and L1's affinity for SE1 is <1E-9 M.

E115.9: a CMU, where SE1 is boron and L1's affinity for SE1 is <1E-10 M.

E115.10: a CMU, where SE1 is boron and L1's affinity for SE1 is <1E-11 M.

E116.1: a CMU, where SE1 is brass and L1's affinity for SE1 is <1E-2 M.

E116.2: a CMU, where SE1 is brass and L1's affinity for SE1 is <1E-3 M.

E116.3: a CMU, where SE1 is brass and L1's affinity for SE1 is <1E-4 M.

E116.4: a CMU, where SE1 is brass and L1's affinity for SE1 is <1E-5 M.

E116.5: a CMU, where SE1 is brass and L1's affinity for SE1 is <1E-6 M.

E116.6: a CMU, where SE1 is brass and L1's affinity for SE1 is <1E-7 M.

E116.7: a CMU, where SE1 is brass and L1's affinity for SE1 is <1E-8 M.

E116.8: a CMU, where SE1 is brass and L1's affinity for SE1 is <1E-9 M.

E116.9: a CMU, where SE1 is brass and L1's affinity for SE1 is <1E-10 M.

E116.10: a CMU, where SE1 is brass and L1's affinity for SE1 is <1E-11 M.

E117.1: a CMU, where SE1 is buckypaper and L1's affinity for SE1 is <1E-2 M.

E117.2: a CMU, where SE1 is buckypaper and L1's affinity for SE1 is <1E-3 M.

E117.3: a CMU, where SE1 is buckypaper and L1's affinity for SE1 is <1E-4 M.

E117.4: a CMU, where SE1 is buckypaper and L1's affinity for SE1 is <1E-5 M.

E117.5: a CMU, where SE1 is buckypaper and L1's affinity for SE1 is <1E-6 M.

E117.6: a CMU, where SE1 is buckypaper and L1's affinity for SE1 is <1E-7 M.

E117.7: a CMU, where SE1 is buckypaper and L1's affinity for SE1 is <1E-8 M.

E117.8: a CMU, where SE1 is buckypaper and L1's affinity for SE1 is <1E-9 M.

E117.9: a CMU, where SE1 is buckypaper and L1's affinity for SE1 is <1E-10 M.

E117.10: a CMU, where SE1 is buckypaper and L1's affinity for SE1 is <1E-11 M.

E118.1: a CMU, where SE1 is calcium carbonite and L1's affinity for SE1 is <1E-2 M.

E118.2: a CMU, where SE1 is calcium carbonite and L1's affinity for SE1 is <1E-3 M.

E118.3: a CMU, where SE1 is calcium carbonite and L1's affinity for SE1 is <1E-4 M.

E118.4: a CMU, where SE1 is calcium carbonite and L1's affinity for SE1 is <1E-5 M.

E118.5: a CMU, where SE1 is calcium carbonite and L1's affinity for SE1 is <1E-6 M.

E118.6: a CMU, where SE1 is calcium carbonite and L1's affinity for SE1 is <1E-7 M.

E118.7: a CMU, where SE1 is calcium carbonite and L1's affinity for SE1 is <1E-8 M.

E118.8: a CMU, where SE1 is calcium carbonite and L1's affinity for SE1 is <1E-9 M.

E118.9: a CMU, where SE1 is calcium carbonite and L1's affinity for SE1 is <1E-10 M.

E118.10: a CMU, where SE1 is calcium carbonite and L1's affinity for SE1 is <1E-11 M.

E119.1: a CMU, where SE1 is calcium metasilicate and L1's affinity for SE1 is <1E-2 M.

E119.2: a CMU, where SE1 is calcium metasilicate and L1's affinity for SE1 is <1E-3 M.

E119.3: a CMU, where SE1 is calcium metasilicate and L1's affinity for SE1 is <1E-4 M.

E119.4: a CMU, where SE1 is calcium metasilicate and L1's affinity for SE1 is <1E-5 M.

E119.5: a CMU, where SE1 is calcium metasilicate and L1's affinity for SE1 is <1E-6 M.

E119.6: a CMU, where SE1 is calcium metasilicate and L1's affinity for SE1 is <1E-7 M.

E119.7: a CMU, where SE1 is calcium metasilicate and L1's affinity for SE1 is <1E-8 M.

E119.8: a CMU, where SE1 is calcium metasilicate and L1's affinity for SE1 is <1E-9 M.

E119.9: a CMU, where SE1 is calcium metasilicate and L1's affinity for SE1 is <1E-10 M.

E119.10: a CMU, where SE1 is calcium metasilicate and L1's affinity for SE1 is <1E-11 M.

E120.1: a CMU, where SE1 is calcium sulfate and L1's affinity for SE1 is <1E-2 M.

E120.2: a CMU, where SE1 is calcium sulfate and L1's affinity for SE1 is <1E-3 M.

E120.3: a CMU, where SE1 is calcium sulfate and L1's affinity for SE1 is <1E-4 M.

E120.4: a CMU, where SE1 is calcium sulfate and L1's affinity for SE1 is <1E-5 M.

E120.5: a CMU, where SE1 is calcium sulfate and L1's affinity for SE1 is <1E-6 M.

E120.6: a CMU, where SE1 is calcium sulfate and L1's affinity for SE1 is <1E-7 M.

E120.7: a CMU, where SE1 is calcium sulfate and L1's affinity for SE1 is <1E-8 M.

E120.8: a CMU, where SE1 is calcium sulfate and L1's affinity for SE1 is <1E-9 M.

E120.9: a CMU, where SE1 is calcium sulfate and L1's affinity for SE1 is <1E-10 M.

E120.10: a CMU, where SE1 is calcium sulfate and L1's affinity for SE1 is <1E-11 M.

E121.1: a CMU, where SE1 is calcium sulphate and L1's affinity for SE1 is <1E-2 M.

E121.2: a CMU, where SE1 is calcium sulphate and L1's affinity for SE1 is <1E-3 M.

E121.3: a CMU, where SE1 is calcium sulphate and L1's affinity for SE1 is <1E-4 M.

E121.4: a CMU, where SE1 is calcium sulphate and L1's affinity for SE1 is <1E-5 M.

E121.5: a CMU, where SE1 is calcium sulphate and L1's affinity for SE1 is <1E-6 M.

E121.6: a CMU, where SE1 is calcium sulphate and L1's affinity for SE1 is <1E-7 M.

E121.7: a CMU, where SE1 is calcium sulphate and L1's affinity for SE1 is <1E-8 M.

E121.8: a CMU, where SE1 is calcium sulphate and L1's affinity for SE1 is <1E-9 M.

E121.9: a CMU, where SE1 is calcium sulphate and L1's affinity for SE1 is <1E-10 M.

E121.10: a CMU, where SE1 is calcium sulphate and L1's affinity for SE1 is <1E-11 M.

E122.1: a CMU, where SE1 is carbon black and L1's affinity for SE1 is <1E-2 M.

E122.2: a CMU, where SE1 is carbon black and L1's affinity for SE1 is <1E-3 M.

E122.3: a CMU, where SE1 is carbon black and L1's affinity for SE1 is <1E-4 M.

E122.4: a CMU, where SE1 is carbon black and L1's affinity for SE1 is <1E-5 M.

E122.5: a CMU, where SE1 is carbon black and L1's affinity for SE1 is <1E-6 M.

E122.6: a CMU, where SE1 is carbon black and L1's affinity for SE1 is <1E-7 M.

E122.7: a CMU, where SE1 is carbon black and L1's affinity for SE1 is <1E-8 M.

E122.8: a CMU, where SE1 is carbon black and L1's affinity for SE1 is <1E-9 M.

E122.9: a CMU, where SE1 is carbon black and L1's affinity for SE1 is <1E-10 M.

E122.10: a CMU, where SE1 is carbon black and L1's affinity for SE1 is <1E-11 M.

E123.1: a CMU, where SE1 is carbon nanofoam and L1's affinity for SE1 is <1E-2 M.

E123.2: a CMU, where SE1 is carbon nanofoam and L1's affinity for SE1 is <1E-3 M.

E123.3: a CMU, where SE1 is carbon nanofoam and L1's affinity for SE1 is <1E-4 M.

E123.4: a CMU, where SE1 is carbon nanofoam and L1's affinity for SE1 is <1E-5 M.

E123.5: a CMU, where SE1 is carbon nanofoam and L1's affinity for SE1 is <1E-6 M.

E123.6: a CMU, where SE1 is carbon nanofoam and L1's affinity for SE1 is <1E-7 M.

E123.7: a CMU, where SE1 is carbon nanofoam and L1's affinity for SE1 is <1E-8 M.

E123.8: a CMU, where SE1 is carbon nanofoam and L1's affinity for SE1 is <1E-9 M.

E123.9: a CMU, where SE1 is carbon nanofoam and L1's affinity for SE1 is <1E-10 M.

E123.10: a CMU, where SE1 is carbon nanofoam and L1's affinity for SE1 is <1E-11 M.

E124.1: a CMU, where SE1 is cathode and L1's affinity for SE1 is <1E-2 M.

E124.2: a CMU, where SE1 is cathode and L1's affinity for SE1 is <1E-3 M.

E124.3: a CMU, where SE1 is cathode and L1's affinity for SE1 is <1E-4 M.

E124.4: a CMU, where SE1 is cathode and L1's affinity for SE1 is <1E-5 M.

E124.5: a CMU, where SE1 is cathode and L1's affinity for SE1 is <1E-6 M.

E124.6: a CMU, where SE1 is cathode and L1's affinity for SE1 is <1E-7 M.

E124.7: a CMU, where SE1 is cathode and L1's affinity for SE1 is <1E-8 M.

E124.8: a CMU, where SE1 is cathode and L1's affinity for SE1 is <1E-9 M.

E124.9: a CMU, where SE1 is cathode and L1's affinity for SE1 is <1E-10 M.

E124.10: a CMU, where SE1 is cathode and L1's affinity for SE1 is <1E-11 M.

E125.1: a CMU, where SE1 is chromium and L1's affinity for SE1 is <1E-2 M.

E125.2: a CMU, where SE1 is chromium and L1's affinity for SE1 is <1E-3 M.

E125.3: a CMU, where SE1 is chromium and L1's affinity for SE1 is <1E-4 M.

E125.4: a CMU, where SE1 is chromium and L1's affinity for SE1 is <1E-5 M.

E125.5: a CMU, where SE1 is chromium and L1's affinity for SE1 is <1E-6 M.

E125.6: a CMU, where SE1 is chromium and L1's affinity for SE1 is <1E-7 M.

E125.7: a CMU, where SE1 is chromium and L1's affinity for SE1 is <1E-8 M.

E125.8: a CMU, where SE1 is chromium and L1's affinity for SE1 is <1E-9 M.

E125.9: a CMU, where SE1 is chromium and L1's affinity for SE1 is <1E-10 M.

E125.10: a CMU, where SE1 is chromium and L1's affinity for SE1 is <1E-11 M.

E126.1: a CMU, where SE1 is clay and L1's affinity for SE1 is <1E-2 M.

E126.2: a CMU, where SE1 is clay and L1's affinity for SE1 is <1E-3 M.

E126.3: a CMU, where SE1 is clay and L1's affinity for SE1 is <1E-4 M.

E126.4: a CMU, where SE1 is clay and L1's affinity for SE1 is <1E-5 M.

E126.5: a CMU, where SE1 is clay and L1's affinity for SE1 is <1E-6 M.

E126.6: a CMU, where SE1 is clay and L1's affinity for SE1 is <1E-7 M.

E126.7: a CMU, where SE1 is clay and L1's affinity for SE1 is <1E-8 M.

E126.8: a CMU, where SE1 is clay and L1's affinity for SE1 is <1E-9 M.

E126.9: a CMU, where SE1 is clay and L1's affinity for SE1 is <1E-10 M.

E126.10: a CMU, where SE1 is clay and L1's affinity for SE1 is <1E-11 M.

E127.1: a CMU, where SE1 is coal and L1's affinity for SE1 is <1E-2 M.

E127.2: a CMU, where SE1 is coal and L1's affinity for SE1 is <1E-3 M.

E127.3: a CMU, where SE1 is coal and L1's affinity for SE1 is <1E-4 M.

E127.4: a CMU, where SE1 is coal and L1's affinity for SE1 is <1E-5 M.

E127.5: a CMU, where SE1 is coal and L1's affinity for SE1 is <1E-6 M.

E127.6: a CMU, where SE1 is coal and L1's affinity for SE1 is <1E-7 M.

E127.7: a CMU, where SE1 is coal and L1's affinity for SE1 is <1E-8 M.

E127.8: a CMU, where SE1 is coal and L1's affinity for SE1 is <1E-9 M.

E127.9: a CMU, where SE1 is coal and L1's affinity for SE1 is <1E-10 M.

E127.10: a CMU, where SE1 is coal and L1's affinity for SE1 is <1E-11 M.

E128.1: a CMU, where SE1 is copper and L1's affinity for SE1 is <1E-2 M.

E128.2: a CMU, where SE1 is copper and L1's affinity for SE1 is <1E-3 M.

E128.3: a CMU, where SE1 is copper and L1's affinity for SE1 is <1E-4 M.

E128.4: a CMU, where SE1 is copper and L1's affinity for SE1 is <1E-5 M.

E128.5: a CMU, where SE1 is copper and L1's affinity for SE1 is <1E-6 M.

E128.6: a CMU, where SE1 is copper and L1's affinity for SE1 is <1E-7 M.

E128.7: a CMU, where SE1 is copper and L1's affinity for SE1 is <1E-8 M.

E128.8: a CMU, where SE1 is copper and L1's affinity for SE1 is <1E-9 M.

E128.9: a CMU, where SE1 is copper and L1's affinity for SE1 is <1E-10 M.

E128.10: a CMU, where SE1 is copper and L1's affinity for SE1 is <1E-11 M.

E129.1: a CMU, where SE1 is diamond and L1's affinity for SE1 is <1E-2 M.

E129.2: a CMU, where SE1 is diamond and L1's affinity for SE1 is <1E-3 M.

E129.3: a CMU, where SE1 is diamond and L1's affinity for SE1 is <1E-4 M.

E129.4: a CMU, where SE1 is diamond and L1's affinity for SE1 is <1E-5 M.

E129.5: a CMU, where SE1 is diamond and L1's affinity for SE1 is <1E-6 M.

E129.6: a CMU, where SE1 is diamond and L1's affinity for SE1 is <1E-7 M.

E129.7: a CMU, where SE1 is diamond and L1's affinity for SE1 is <1E-8 M.

E129.8: a CMU, where SE1 is diamond and L1's affinity for SE1 is <1E-9 M.

E129.9: a CMU, where SE1 is diamond and L1's affinity for SE1 is <1E-10 M.

E129.10: a CMU, where SE1 is diamond and L1's affinity for SE1 is <1E-11 M.

E130.1: a CMU, where SE1 is diamond-like carbon and L1's affinity for SE1 is <1E-2 M.

E130.2: a CMU, where SE1 is diamond-like carbon and L1's affinity for SE1 is <1E-3 M.

E130.3: a CMU, where SE1 is diamond-like carbon and L1's affinity for SE1 is <1E-4 M.

E130.4: a CMU, where SE1 is diamond-like carbon and L1's affinity for SE1 is <1E-5 M.

E130.5: a CMU, where SE1 is diamond-like carbon and L1's affinity for SE1 is <1E-6 M.

E130.6: a CMU, where SE1 is diamond-like carbon and L1's affinity for SE1 is <1E-7 M.

E130.7: a CMU, where SE1 is diamond-like carbon and L1's affinity for SE1 is <1E-8 M.

E130.8: a CMU, where SE1 is diamond-like carbon and L1's affinity for SE1 is <1E-9 M.

E130.9: a CMU, where SE1 is diamond-like carbon and L1's affinity for SE1 is <1E-10 M.

E130.10: a CMU, where SE1 is diamond-like carbon and L1's affinity for SE1 is <1E-11 M.

E131.1: a CMU, where SE1 is double-layer graphene and L1's affinity for SE1 is <1E-2 M.

E131.2: a CMU, where SE1 is double-layer graphene and L1's affinity for SE1 is <1E-3 M.

E131.3: a CMU, where SE1 is double-layer graphene and L1's affinity for SE1 is <1E-4 M.

E131.4: a CMU, where SE1 is double-layer graphene and L1's affinity for SE1 is <1E-5 M.

E131.5: a CMU, where SE1 is double-layer graphene and L1's affinity for SE1 is <1E-6 M.

E131.6: a CMU, where SE1 is double-layer graphene and L1's affinity for SE1 is <1E-7 M.

E131.7: a CMU, where SE1 is double-layer graphene and L1's affinity for SE1 is <1E-8 M.

E131.8: a CMU, where SE1 is double-layer graphene and L1's affinity for SE1 is <1E-9 M.

E131.9: a CMU, where SE1 is double-layer graphene and L1's affinity for SE1 is <1E-10 M.

E131.10: a CMU, where SE1 is double-layer graphene and L1's affinity for SE1 is <1E-11 M.

E132.1: a CMU, where SE1 is exfoliated graphite and L1's affinity for SE1 is <1E-2 M.

E132.2: a CMU, where SE1 is exfoliated graphite and L1's affinity for SE1 is <1E-3 M.

E132.3: a CMU, where SE1 is exfoliated graphite and L1's affinity for SE1 is <1E-4 M.

E132.4: a CMU, where SE1 is exfoliated graphite and L1's affinity for SE1 is <1E-5 M.

E132.5: a CMU, where SE1 is exfoliated graphite and L1's affinity for SE1 is <1E-6 M.

E132.6: a CMU, where SE1 is exfoliated graphite and L1's affinity for SE1 is <1E-7 M.

E132.7: a CMU, where SE1 is exfoliated graphite and L1's affinity for SE1 is <1E-8 M.

E132.8: a CMU, where SE1 is exfoliated graphite and L1's affinity for SE1 is <1E-9 M.

E132.9: a CMU, where SE1 is exfoliated graphite and L1's affinity for SE1 is <1E-10 M.

E132.10: a CMU, where SE1 is exfoliated graphite and L1's affinity for SE1 is <1E-11 M.

E133.1: a CMU, where SE1 is exfoliated silicate and L1's affinity for SE1 is <1E-2 M.

E133.2: a CMU, where SE1 is exfoliated silicate and L1's affinity for SE1 is <1E-3 M.

E133.3: a CMU, where SE1 is exfoliated silicate and L1's affinity for SE1 is <1E-4 M.

E133.4: a CMU, where SE1 is exfoliated silicate and L1's affinity for SE1 is <1E-5 M.

E133.5: a CMU, where SE1 is exfoliated silicate and L1's affinity for SE1 is <1E-6 M.

E133.6: a CMU, where SE1 is exfoliated silicate and L1's affinity for SE1 is <1E-7 M.

E133.7: a CMU, where SE1 is exfoliated silicate and L1's affinity for SE1 is <1E-8 M.

E133.8: a CMU, where SE1 is exfoliated silicate and L1's affinity for SE1 is <1E-9 M.

E133.9: a CMU, where SE1 is exfoliated silicate and L1's affinity for SE1 is <1E-10 M.

E133.10: a CMU, where SE1 is exfoliated silicate and L1's affinity for SE1 is <1E-11 M.

E134.1: a CMU, where SE1 is flourinated graphene and L1's affinity for SE1 is <1E-2 M.

E134.2: a CMU, where SE1 is flourinated graphene and L1's affinity for SE1 is <1E-3 M.

E134.3: a CMU, where SE1 is flourinated graphene and L1's affinity for SE1 is <1E-4 M.

E134.4: a CMU, where SE1 is flourinated graphene and L1's affinity for SE1 is <1E-5 M.

E134.5: a CMU, where SE1 is flourinated graphene and L1's affinity for SE1 is <1E-6 M.

E134.6: a CMU, where SE1 is flourinated graphene and L1's affinity for SE1 is <1E-7 M.

E134.7: a CMU, where SE1 is flourinated graphene and L1's affinity for SE1 is <1E-8 M.

E134.8: a CMU, where SE1 is flourinated graphene and L1's affinity for SE1 is <1E-9 M.

E134.9: a CMU, where SE1 is flourinated graphene and L1's affinity for SE1 is <1E-10 M.

E134.10: a CMU, where SE1 is flourinated graphene and L1's affinity for SE1 is <1E-11 M.

E135.1: a CMU, where SE1 is fused silica and L1's affinity for SE1 is <1E-2 M.

E135.2: a CMU, where SE1 is fused silica and L1's affinity for SE1 is <1E-3 M.

E135.3: a CMU, where SE1 is fused silica and L1's affinity for SE1 is <1E-4 M.

E135.4: a CMU, where SE1 is fused silica and L1's affinity for SE1 is <1E-5 M.

E135.5: a CMU, where SE1 is fused silica and L1's affinity for SE1 is <1E-6 M.

E135.6: a CMU, where SE1 is fused silica and L1's affinity for SE1 is <1E-7 M.

E135.7: a CMU, where SE1 is fused silica and L1's affinity for SE1 is <1E-8 M.

E135.8: a CMU, where SE1 is fused silica and L1's affinity for SE1 is <1E-9 M.

E135.9: a CMU, where SE1 is fused silica and L1's affinity for SE1 is <1E-10 M.

E135.10: a CMU, where SE1 is fused silica and L1's affinity for SE1 is <1E-11 M.

E136.1: a CMU, where SE1 is gallium arsenide and L1's affinity for SE1 is <1E-2 M.

E136.2: a CMU, where SE1 is gallium arsenide and L1's affinity for SE1 is <1E-3 M.

E136.3: a CMU, where SE1 is gallium arsenide and L1's affinity for SE1 is <1E-4 M.

E136.4: a CMU, where SE1 is gallium arsenide and L1's affinity for SE1 is <1E-5 M.

E136.5: a CMU, where SE1 is gallium arsenide and L1's affinity for SE1 is <1E-6 M.

E136.6: a CMU, where SE1 is gallium arsenide and L1's affinity for SE1 is <1E-7 M.

E136.7: a CMU, where SE1 is gallium arsenide and L1's affinity for SE1 is <1E-8 M.

E136.8: a CMU, where SE1 is gallium arsenide and L1's affinity for SE1 is <1E-9 M.

E136.9: a CMU, where SE1 is gallium arsenide and L1's affinity for SE1 is <1E-10 M.

E136.10: a CMU, where SE1 is gallium arsenide and L1's affinity for SE1 is <1E-11 M.

E137.1: a CMU, where SE1 is gallium nitride and L1's affinity for SE1 is <1E-2 M.

E137.2: a CMU, where SE1 is gallium nitride and L1's affinity for SE1 is <1E-3 M.

E137.3: a CMU, where SE1 is gallium nitride and L1's affinity for SE1 is <1E-4 M.

E137.4: a CMU, where SE1 is gallium nitride and L1's affinity for SE1 is <1E-5 M.

E137.5: a CMU, where SE1 is gallium nitride and L1's affinity for SE1 is <1E-6 M.

E137.6: a CMU, where SE1 is gallium nitride and L1's affinity for SE1 is <1E-7 M.

E137.7: a CMU, where SE1 is gallium nitride and L1's affinity for SE1 is <1E-8 M.
E137.8: a CMU, where SE1 is gallium nitride and L1's affinity for SE1 is <1E-9 M.
E137.9: a CMU, where SE1 is gallium nitride and L1's affinity for SE1 is <1E-10 M.
E137.10: a CMU, where SE1 is gallium nitride and L1's affinity for SE1 is <1E-11 M.
E138.1: a CMU, where SE1 is germanium and L1's affinity for SE1 is <1E-2 M.
E138.2: a CMU, where SE1 is germanium and L1's affinity for SE1 is <1E-3 M.
E138.3: a CMU, where SE1 is germanium and L1's affinity for SE1 is <1E-4 M.
E138.4: a CMU, where SE1 is germanium and L1's affinity for SE1 is <1E-5 M.
E138.5: a CMU, where SE1 is germanium and L1's affinity for SE1 is <1E-6 M.
E138.6: a CMU, where SE1 is germanium and L1's affinity for SE1 is <1E-7 M.
E138.7: a CMU, where SE1 is germanium and L1's affinity for SE1 is <1E-8 M.
E138.8: a CMU, where SE1 is germanium and L1's affinity for SE1 is <1E-9 M.
E138.9: a CMU, where SE1 is germanium and L1's affinity for SE1 is <1E-10 M.
E138.10: a CMU, where SE1 is germanium and L1's affinity for SE1 is <1E-11 M.
E139.1: a CMU, where SE1 is glass and L1's affinity for SE1 is <1E-2 M.
E139.2: a CMU, where SE1 is glass and L1's affinity for SE1 is <1E-3 M.
E139.3: a CMU, where SE1 is glass and L1's affinity for SE1 is <1E-4 M.
E139.4: a CMU, where SE1 is glass and L1's affinity for SE1 is <1E-5 M.
E139.5: a CMU, where SE1 is glass and L1's affinity for SE1 is <1E-6 M.
E139.6: a CMU, where SE1 is glass and L1's affinity for SE1 is <1E-7 M.
E139.7: a CMU, where SE1 is glass and L1's affinity for SE1 is <1E-8 M.
E139.8: a CMU, where SE1 is glass and L1's affinity for SE1 is <1E-9 M.
E139.9: a CMU, where SE1 is glass and L1's affinity for SE1 is <1E-10 M.
E139.10: a CMU, where SE1 is glass and L1's affinity for SE1 is <1E-11 M.
E140.1: a CMU, where SE1 is glass microsphere and L1's affinity for SE1 is <1E-2 M.
E140.2: a CMU, where SE1 is glass microsphere and L1's affinity for SE1 is <1E-3 M.
E140.3: a CMU, where SE1 is glass microsphere and L1's affinity for SE1 is <1E-4 M.
E140.4: a CMU, where SE1 is glass microsphere and L1's affinity for SE1 is <1E-5 M.
E140.5: a CMU, where SE1 is glass microsphere and L1's affinity for SE1 is <1E-6 M.
E140.6: a CMU, where SE1 is glass microsphere and L1's affinity for SE1 is <1E-7 M.
E140.7: a CMU, where SE1 is glass microsphere and L1's affinity for SE1 is <1E-8 M.
E140.8: a CMU, where SE1 is glass microsphere and L1's affinity for SE1 is <1E-9 M.
E140.9: a CMU, where SE1 is glass microsphere and L1's affinity for SE1 is <1E-10 M.
E140.10: a CMU, where SE1 is glass microsphere and L1's affinity for SE1 is <1E-11 M.
E141.1: a CMU, where SE1 is glass ribbons and L1's affinity for SE1 is <1E-2 M.
E141.2: a CMU, where SE1 is glass ribbons and L1's affinity for SE1 is <1E-3 M.
E141.3: a CMU, where SE1 is glass ribbons and L1's affinity for SE1 is <1E-4 M.
E141.4: a CMU, where SE1 is glass ribbons and L1's affinity for SE1 is <1E-5 M.
E141.5: a CMU, where SE1 is glass ribbons and L1's affinity for SE1 is <1E-6 M.
E141.6: a CMU, where SE1 is glass ribbons and L1's affinity for SE1 is <1E-7 M.
E141.7: a CMU, where SE1 is glass ribbons and L1's affinity for SE1 is <1E-8 M.
E141.8: a CMU, where SE1 is glass ribbons and L1's affinity for SE1 is <1E-9 M.
E141.9: a CMU, where SE1 is glass ribbons and L1's affinity for SE1 is <1E-10 M.
E141.10: a CMU, where SE1 is glass ribbons and L1's affinity for SE1 is <1E-11 M.
E142.1: a CMU, where SE1 is glassy carbon and L1's affinity for SE1 is <1E-2 M.
E142.2: a CMU, where SE1 is glassy carbon and L1's affinity for SE1 is <1E-3 M.
E142.3: a CMU, where SE1 is glassy carbon and L1's affinity for SE1 is <1E-4 M.
E142.4: a CMU, where SE1 is glassy carbon and L1's affinity for SE1 is <1E-5 M.
E142.5: a CMU, where SE1 is glassy carbon and L1's affinity for SE1 is <1E-6 M.
E142.6: a CMU, where SE1 is glassy carbon and L1's affinity for SE1 is <1E-7 M.
E142.7: a CMU, where SE1 is glassy carbon and L1's affinity for SE1 is <1E-8 M.
E142.8: a CMU, where SE1 is glassy carbon and L1's affinity for SE1 is <1E-9 M.
E142.9: a CMU, where SE1 is glassy carbon and L1's affinity for SE1 is <1E-10 M.
E142.10: a CMU, where SE1 is glassy carbon and L1's affinity for SE1 is <1E-11 M.
E143.1: a CMU, where SE1 is gold and L1's affinity for SE1 is <1E-2 M.
E143.2: a CMU, where SE1 is gold and L1's affinity for SE1 is <1E-3 M.
E143.3: a CMU, where SE1 is gold and L1's affinity for SE1 is <1E-4 M.
E143.4: a CMU, where SE1 is gold and L1's affinity for SE1 is <1E-5 M.
E143.5: a CMU, where SE1 is gold and L1's affinity for SE1 is <1E-6 M.
E143.6: a CMU, where SE1 is gold and L1's affinity for SE1 is <1E-7 M.
E143.7: a CMU, where SE1 is gold and L1's affinity for SE1 is <1E-8 M.
E143.8: a CMU, where SE1 is gold and L1's affinity for SE1 is <1E-9 M.
E143.9: a CMU, where SE1 is gold and L1's affinity for SE1 is <1E-10 M.
E143.10: a CMU, where SE1 is gold and L1's affinity for SE1 is <1E-11 M.
E144.1: a CMU, where SE1 is hardened steel and L1's affinity for SE1 is <1E-2 M.
E144.2: a CMU, where SE1 is hardened steel and L1's affinity for SE1 is <1E-3 M.

E144.3: a CMU, where SE1 is hardened steel and L1's affinity for SE1 is <1E-4 M.

E144.4: a CMU, where SE1 is hardened steel and L1's affinity for SE1 is <1E-5 M.

E144.5: a CMU, where SE1 is hardened steel and L1's affinity for SE1 is <1E-6 M.

E144.6: a CMU, where SE1 is hardened steel and L1's affinity for SE1 is <1E-7 M.

E144.7: a CMU, where SE1 is hardened steel and L1's affinity for SE1 is <1E-8 M.

E144.8: a CMU, where SE1 is hardened steel and L1's affinity for SE1 is <1E-9 M.

E144.9: a CMU, where SE1 is hardened steel and L1's affinity for SE1 is <1E-10 M.

E144.10: a CMU, where SE1 is hardened steel and L1's affinity for SE1 is <1E-11 M.

E145.1: a CMU, where SE1 is hydrous magnesium silicate and L1's affinity for SE1 is <1E-2 M.

E145.2: a CMU, where SE1 is hydrous magnesium silicate and L1's affinity for SE1 is <1E-3 M.

E145.3: a CMU, where SE1 is hydrous magnesium silicate and L1's affinity for SE1 is <1E-4 M.

E145.4: a CMU, where SE1 is hydrous magnesium silicate and L1's affinity for SE1 is <1E-5 M.

E145.5: a CMU, where SE1 is hydrous magnesium silicate and L1's affinity for SE1 is <1E-6 M.

E145.6: a CMU, where SE1 is hydrous magnesium silicate and L1's affinity for SE1 is <1E-7 M.

E145.7: a CMU, where SE1 is hydrous magnesium silicate and L1's affinity for SE1 is <1E-8 M.

E145.8: a CMU, where SE1 is hydrous magnesium silicate and L1's affinity for SE1 is <1E-9 M.

E145.9: a CMU, where SE1 is hydrous magnesium silicate and L1's affinity for SE1 is <1E-10 M.

E145.10: a CMU, where SE1 is hydrous magnesium silicate and L1's affinity for SE1 is <1E-11 M.

E146.1: a CMU, where SE1 is hyperdiamond and L1's affinity for SE1 is <1E-2 M.

E146.2: a CMU, where SE1 is hyperdiamond and L1's affinity for SE1 is <1E-3 M.

E146.3: a CMU, where SE1 is hyperdiamond and L1's affinity for SE1 is <1E-4 M.

E146.4: a CMU, where SE1 is hyperdiamond and L1's affinity for SE1 is <1E-5 M.

E146.5: a CMU, where SE1 is hyperdiamond and L1's affinity for SE1 is <1E-6 M.

E146.6: a CMU, where SE1 is hyperdiamond and L1's affinity for SE1 is <1E-7 M.

E146.7: a CMU, where SE1 is hyperdiamond and L1's affinity for SE1 is <1E-8 M.

E146.8: a CMU, where SE1 is hyperdiamond and L1's affinity for SE1 is <1E-9 M.

E146.9: a CMU, where SE1 is hyperdiamond and L1's affinity for SE1 is <1E-10 M.

E146.10: a CMU, where SE1 is hyperdiamond and L1's affinity for SE1 is <1E-11 M.

E147.1: a CMU, where SE1 is iron oxides and L1's affinity for SE1 is <1E-2 M.

E147.2: a CMU, where SE1 is iron oxides and L1's affinity for SE1 is <1E-3 M.

E147.3: a CMU, where SE1 is iron oxides and L1's affinity for SE1 is <1E-4 M.

E147.4: a CMU, where SE1 is iron oxides and L1's affinity for SE1 is <1E-5 M.

E147.5: a CMU, where SE1 is iron oxides and L1's affinity for SE1 is <1E-6 M.

E147.6: a CMU, where SE1 is iron oxides and L1's affinity for SE1 is <1E-7 M.

E147.7: a CMU, where SE1 is iron oxides and L1's affinity for SE1 is <1E-8 M.

E147.8: a CMU, where SE1 is iron oxides and L1's affinity for SE1 is <1E-9 M.

E147.9: a CMU, where SE1 is iron oxides and L1's affinity for SE1 is <1E-10 M.

E147.10: a CMU, where SE1 is iron oxides and L1's affinity for SE1 is <1E-11 M.

E148.1: a CMU, where SE1 is lead zirconium titanate and L1's affinity for SE1 is <1E-2 M.

E148.2: a CMU, where SE1 is lead zirconium titanate and L1's affinity for SE1 is <1E-3 M.

E148.3: a CMU, where SE1 is lead zirconium titanate and L1's affinity for SE1 is <1E-4 M.

E148.4: a CMU, where SE1 is lead zirconium titanate and L1's affinity for SE1 is <1E-5 M.

E148.5: a CMU, where SE1 is lead zirconium titanate and L1's affinity for SE1 is <1E-6 M.

E148.6: a CMU, where SE1 is lead zirconium titanate and L1's affinity for SE1 is <1E-7 M.

E148.7: a CMU, where SE1 is lead zirconium titanate and L1's affinity for SE1 is <1E-8 M.

E148.8: a CMU, where SE1 is lead zirconium titanate and L1's affinity for SE1 is <1E-9 M.

E148.9: a CMU, where SE1 is lead zirconium titanate and L1's affinity for SE1 is <1E-10 M.

E148.10: a CMU, where SE1 is lead zirconium titanate and L1's affinity for SE1 is <1E-11 M.

E149.1: a CMU, where SE1 is lignite and L1's affinity for SE1 is <1E-2 M.

E149.2: a CMU, where SE1 is lignite and L1's affinity for SE1 is <1E-3 M.

E149.3: a CMU, where SE1 is lignite and L1's affinity for SE1 is <1E-4 M.

E149.4: a CMU, where SE1 is lignite and L1's affinity for SE1 is <1E-5 M.

E149.5: a CMU, where SE1 is lignite and L1's affinity for SE1 is <1E-6 M.

E149.6: a CMU, where SE1 is lignite and L1's affinity for SE1 is <1E-7 M.

E149.7: a CMU, where SE1 is lignite and L1's affinity for SE1 is <1E-8 M.

E149.8: a CMU, where SE1 is lignite and L1's affinity for SE1 is <1E-9 M.

E149.9: a CMU, where SE1 is lignite and L1's affinity for SE1 is <1E-10 M.

E149.10: a CMU, where SE1 is lignite and L1's affinity for SE1 is <1E-11 M.

E150.1: a CMU, where SE1 is lithium niobate and L1's affinity for SE1 is <1E-2 M.

E150.2: a CMU, where SE1 is lithium niobate and L1's affinity for SE1 is <1E-3 M.

E150.3: a CMU, where SE1 is lithium niobate and L1's affinity for SE1 is <1E-4 M.

E150.4: a CMU, where SE1 is lithium niobate and L1's affinity for SE1 is <1E-5 M.

E150.5: a CMU, where SE1 is lithium niobate and L1's affinity for SE1 is <1E-6 M.

E150.6: a CMU, where SE1 is lithium niobate and L1's affinity for SE1 is <1E-7 M.

E150.7: a CMU, where SE1 is lithium niobate and L1's affinity for SE1 is <1E-8 M.

E150.8: a CMU, where SE1 is lithium niobate and L1's affinity for SE1 is <1E-9 M.

E150.9: a CMU, where SE1 is lithium niobate and L1's affinity for SE1 is <1E-10 M.

E150.10: a CMU, where SE1 is lithium niobate and L1's affinity for SE1 is <1E-11 M.

E151.1: a CMU, where SE1 is lonsdaleite and L1's affinity for SE1 is <1E-2 M.

E151.2: a CMU, where SE1 is lonsdaleite and L1's affinity for SE1 is <1E-3 M.

E151.3: a CMU, where SE1 is lonsdaleite and L1's affinity for SE1 is <1E-4 M.

E151.4: a CMU, where SE1 is lonsdaleite and L1's affinity for SE1 is <1E-5 M.

E151.5: a CMU, where SE1 is lonsdaleite and L1's affinity for SE1 is <1E-6 M.

E151.6: a CMU, where SE1 is lonsdaleite and L1's affinity for SE1 is <1E-7 M.

E151.7: a CMU, where SE1 is lonsdaleite and L1's affinity for SE1 is <1E-8 M.

E151.8: a CMU, where SE1 is lonsdaleite and L1's affinity for SE1 is <1E-9 M.

E151.9: a CMU, where SE1 is lonsdaleite and L1's affinity for SE1 is <1E-10 M.

E151.10: a CMU, where SE1 is lonsdaleite and L1's affinity for SE1 is <1E-11 M.

E152.1: a CMU, where SE1 is magnesium dihydroxide and L1's affinity for SE1 is <1E-2 M.

E152.2: a CMU, where SE1 is magnesium dihydroxide and L1's affinity for SE1 is <1E-3 M.

E152.3: a CMU, where SE1 is magnesium dihydroxide and L1's affinity for SE1 is <1E-4 M.

E152.4: a CMU, where SE1 is magnesium dihydroxide and L1's affinity for SE1 is <1E-5 M.

E152.5: a CMU, where SE1 is magnesium dihydroxide and L1's affinity for SE1 is <1E-6 M.

E152.6: a CMU, where SE1 is magnesium dihydroxide and L1's affinity for SE1 is <1E-7 M.

E152.7: a CMU, where SE1 is magnesium dihydroxide and L1's affinity for SE1 is <1E-8 M.

E152.8: a CMU, where SE1 is magnesium dihydroxide and L1's affinity for SE1 is <1E-9 M.

E152.9: a CMU, where SE1 is magnesium dihydroxide and L1's affinity for SE1 is <1E-10 M.

E152.10: a CMU, where SE1 is magnesium dihydroxide and L1's affinity for SE1 is <1E-11 M.

E153.1: a CMU, where SE1 is magnesium oxide and L1's affinity for SE1 is <1E-2 M.

E153.2: a CMU, where SE1 is magnesium oxide and L1's affinity for SE1 is <1E-3 M.

E153.3: a CMU, where SE1 is magnesium oxide and L1's affinity for SE1 is <1E-4 M.

E153.4: a CMU, where SE1 is magnesium oxide and L1's affinity for SE1 is <1E-5 M.

E153.5: a CMU, where SE1 is magnesium oxide and L1's affinity for SE1 is <1E-6 M.

E153.6: a CMU, where SE1 is magnesium oxide and L1's affinity for SE1 is <1E-7 M.

E153.7: a CMU, where SE1 is magnesium oxide and L1's affinity for SE1 is <1E-8 M.

E153.8: a CMU, where SE1 is magnesium oxide and L1's affinity for SE1 is <1E-9 M.

E153.9: a CMU, where SE1 is magnesium oxide and L1's affinity for SE1 is <1E-10 M.

E153.10: a CMU, where SE1 is magnesium oxide and L1's affinity for SE1 is <1E-11 M.

E154.1: a CMU, where SE1 is manganese and L1's affinity for SE1 is <1E-2 M.

E154.2: a CMU, where SE1 is manganese and L1's affinity for SE1 is <1E-3 M.

E154.3: a CMU, where SE1 is manganese and L1's affinity for SE1 is <1E-4 M.

E154.4: a CMU, where SE1 is manganese and L1's affinity for SE1 is <1E-5 M.

E154.5: a CMU, where SE1 is manganese and L1's affinity for SE1 is <1E-6 M.

E154.6: a CMU, where SE1 is manganese and L1's affinity for SE1 is <1E-7 M.

E154.7: a CMU, where SE1 is manganese and L1's affinity for SE1 is <1E-8 M.

E154.8: a CMU, where SE1 is manganese and L1's affinity for SE1 is <1E-9 M.

E154.9: a CMU, where SE1 is manganese and L1's affinity for SE1 is <1E-10 M.

E154.10: a CMU, where SE1 is manganese and L1's affinity for SE1 is <1E-11 M.

E155.1: a CMU, where SE1 is metal oxide and L1's affinity for SE1 is <1E-2 M.

E155.2: a CMU, where SE1 is metal oxide and L1's affinity for SE1 is <1E-3 M.

E155.3: a CMU, where SE1 is metal oxide and L1's affinity for SE1 is <1E-4 M.

E155.4: a CMU, where SE1 is metal oxide and L1's affinity for SE1 is <1E-5 M.

E155.5: a CMU, where SE1 is metal oxide and L1's affinity for SE1 is <1E-6 M.

E155.6: a CMU, where SE1 is metal oxide and L1's affinity for SE1 is <1E-7 M.

E155.7: a CMU, where SE1 is metal oxide and L1's affinity for SE1 is <1E-8 M.

E155.8: a CMU, where SE1 is metal oxide and L1's affinity for SE1 is <1E-9 M.

E155.9: a CMU, where SE1 is metal oxide and L1's affinity for SE1 is <1E-10 M.

E155.10: a CMU, where SE1 is metal oxide and L1's affinity for SE1 is <1E-11 M.

E156.1: a CMU, where SE1 is mica and L1's affinity for SE1 is <1E-2 M.

E156.2: a CMU, where SE1 is mica and L1's affinity for SE1 is <1E-3 M.

E156.3: a CMU, where SE1 is mica and L1's affinity for SE1 is <1E-4 M.

E156.4: a CMU, where SE1 is mica and L1's affinity for SE1 is <1E-5 M.

E156.5: a CMU, where SE1 is mica and L1's affinity for SE1 is <1E-6 M.

E156.6: a CMU, where SE1 is mica and L1's affinity for SE1 is <1E-7 M.

E156.7: a CMU, where SE1 is mica and L1's affinity for SE1 is <1E-8 M.

E156.8: a CMU, where SE1 is mica and L1's affinity for SE1 is <1E-9 M.

E156.9: a CMU, where SE1 is mica and L1's affinity for SE1 is <1E-10 M.

E156.10: a CMU, where SE1 is mica and L1's affinity for SE1 is <1E-11 M.

E157.1: a CMU, where SE1 is molybdenum and L1's affinity for SE1 is <1E-2 M.

E157.2: a CMU, where SE1 is molybdenum and L1's affinity for SE1 is <1E-3 M.

E157.3: a CMU, where SE1 is molybdenum and L1's affinity for SE1 is <1E-4 M.

E157.4: a CMU, where SE1 is molybdenum and L1's affinity for SE1 is <1E-5 M.

E157.5: a CMU, where SE1 is molybdenum and L1's affinity for SE1 is <1E-6 M.

E157.6: a CMU, where SE1 is molybdenum and L1's affinity for SE1 is <1E-7 M.

E157.7: a CMU, where SE1 is molybdenum and L1's affinity for SE1 is <1E-8 M.

E157.8: a CMU, where SE1 is molybdenum and L1's affinity for SE1 is <1E-9 M.

E157.9: a CMU, where SE1 is molybdenum and L1's affinity for SE1 is <1E-10 M.

E157.10: a CMU, where SE1 is molybdenum and L1's affinity for SE1 is <1E-11 M.

E158.1: a CMU, where SE1 is nickel and L1's affinity for SE1 is <1E-2 M.

E158.2: a CMU, where SE1 is nickel and L1's affinity for SE1 is <1E-3 M.

E158.3: a CMU, where SE1 is nickel and L1's affinity for SE1 is <1E-4 M.

E158.4: a CMU, where SE1 is nickel and L1's affinity for SE1 is <1E-5 M.

E158.5: a CMU, where SE1 is nickel and L1's affinity for SE1 is <1E-6 M.

E158.6: a CMU, where SE1 is nickel and L1's affinity for SE1 is <1E-7 M.

E158.7: a CMU, where SE1 is nickel and L1's affinity for SE1 is <1E-8 M.

E158.8: a CMU, where SE1 is nickel and L1's affinity for SE1 is <1E-9 M.

E158.9: a CMU, where SE1 is nickel and L1's affinity for SE1 is <1E-10 M.

E158.10: a CMU, where SE1 is nickel and L1's affinity for SE1 is <1E-11 M.

E159.1: a CMU, where SE1 is nylon and L1's affinity for SE1 is <1E-2 M.

E159.2: a CMU, where SE1 is nylon and L1's affinity for SE1 is <1E-3 M.

E159.3: a CMU, where SE1 is nylon and L1's affinity for SE1 is <1E-4 M.

E159.4: a CMU, where SE1 is nylon and L1's affinity for SE1 is <1E-5 M.

E159.5: a CMU, where SE1 is nylon and L1's affinity for SE1 is <1E-6 M.

E159.6: a CMU, where SE1 is nylon and L1's affinity for SE1 is <1E-7 M.

E159.7: a CMU, where SE1 is nylon and L1's affinity for SE1 is <1E-8 M.

E159.8: a CMU, where SE1 is nylon and L1's affinity for SE1 is <1E-9 M.

E159.9: a CMU, where SE1 is nylon and L1's affinity for SE1 is <1E-10 M.

E159.10: a CMU, where SE1 is nylon and L1's affinity for SE1 is <1E-11 M.

E160.1: a CMU, where SE1 is palladium and L1's affinity for SE1 is <1E-2 M.

E160.2: a CMU, where SE1 is palladium and L1's affinity for SE1 is <1E-3 M.

E160.3: a CMU, where SE1 is palladium and L1's affinity for SE1 is <1E-4 M.

E160.4: a CMU, where SE1 is palladium and L1's affinity for SE1 is <1E-5 M.

E160.5: a CMU, where SE1 is palladium and L1's affinity for SE1 is <1E-6 M.

E160.6: a CMU, where SE1 is palladium and L1's affinity for SE1 is <1E-7 M.

E160.7: a CMU, where SE1 is palladium and L1's affinity for SE1 is <1E-8 M.

E160.8: a CMU, where SE1 is palladium and L1's affinity for SE1 is <1E-9 M.

E160.9: a CMU, where SE1 is palladium and L1's affinity for SE1 is <1E-10 M.

E160.10: a CMU, where SE1 is palladium and L1's affinity for SE1 is <1E-11 M.

E161.1: a CMU, where SE1 is pencil lead and L1's affinity for SE1 is <1E-2 M.

E161.2: a CMU, where SE1 is pencil lead and L1's affinity for SE1 is <1E-3 M.

E161.3: a CMU, where SE1 is pencil lead and L1's affinity for SE1 is <1E-4 M.

E161.4: a CMU, where SE1 is pencil lead and L1's affinity for SE1 is <1E-5 M.

E161.5: a CMU, where SE1 is pencil lead and L1's affinity for SE1 is <1E-6 M.

E161.6: a CMU, where SE1 is pencil lead and L1's affinity for SE1 is <1E-7 M.

E161.7: a CMU, where SE1 is pencil lead and L1's affinity for SE1 is <1E-8 M.

E161.8: a CMU, where SE1 is pencil lead and L1's affinity for SE1 is <1E-9 M.

E161.9: a CMU, where SE1 is pencil lead and L1's affinity for SE1 is <1E-10 M.

E161.10: a CMU, where SE1 is pencil lead and L1's affinity for SE1 is <1E-11 M.

E162.1: a CMU, where SE1 is platinum and L1's affinity for SE1 is <1E-2 M.

E162.2: a CMU, where SE1 is platinum and L1's affinity for SE1 is <1E-3 M.

E162.3: a CMU, where SE1 is platinum and L1's affinity for SE1 is <1E-4 M.

E162.4: a CMU, where SE1 is platinum and L1's affinity for SE1 is <1E-5 M.

E162.5: a CMU, where SE1 is platinum and L1's affinity for SE1 is <1E-6 M.

E162.6: a CMU, where SE1 is platinum and L1's affinity for SE1 is <1E-7 M.

E162.7: a CMU, where SE1 is platinum and L1's affinity for SE1 is <1E-8 M.

E162.8: a CMU, where SE1 is platinum and L1's affinity for SE1 is <1E-9 M.

E162.9: a CMU, where SE1 is platinum and L1's affinity for SE1 is <1E-10 M.

E162.10: a CMU, where SE1 is platinum and L1's affinity for SE1 is <1E-11 M.

E163.1: a CMU, where SE1 is prismane and L1's affinity for SE1 is <1E-2 M.

E163.2: a CMU, where SE1 is prismane and L1's affinity for SE1 is <1E-3 M.

E163.3: a CMU, where SE1 is prismane and L1's affinity for SE1 is <1E-4 M.

E163.4: a CMU, where SE1 is prismane and L1's affinity for SE1 is <1E-5 M.

E163.5: a CMU, where SE1 is prismane and L1's affinity for SE1 is <1E-6 M.

E163.6: a CMU, where SE1 is prismane and L1's affinity for SE1 is <1E-7 M.

E163.7: a CMU, where SE1 is prismane and L1's affinity for SE1 is <1E-8 M.

E163.8: a CMU, where SE1 is prismane and L1's affinity for SE1 is <1E-9 M.

E163.9: a CMU, where SE1 is prismane and L1's affinity for SE1 is <1E-10 M.

E163.10: a CMU, where SE1 is prismane and L1's affinity for SE1 is <1E-11 M.

E164.1: a CMU, where SE1 is pyrolytic graphite and L1's affinity for SE1 is <1E-2 M.

E164.2: a CMU, where SE1 is pyrolytic graphite and L1's affinity for SE1 is <1E-3 M.

E164.3: a CMU, where SE1 is pyrolytic graphite and L1's affinity for SE1 is <1E-4 M.

E164.4: a CMU, where SE1 is pyrolytic graphite and L1's affinity for SE1 is <1E-5 M.

E164.5: a CMU, where SE1 is pyrolytic graphite and L1's affinity for SE1 is <1E-6 M.

E164.6: a CMU, where SE1 is pyrolytic graphite and L1's affinity for SE1 is <1E-7 M.

E164.7: a CMU, where SE1 is pyrolytic graphite and L1's affinity for SE1 is <1E-8 M.

E164.8: a CMU, where SE1 is pyrolytic graphite and L1's affinity for SE1 is <1E-9 M.

E164.9: a CMU, where SE1 is pyrolytic graphite and L1's affinity for SE1 is <1E-10 M.

E164.10: a CMU, where SE1 is pyrolytic graphite and L1's affinity for SE1 is <1E-11 M.

E165.1: a CMU, where SE1 is rubber and L1's affinity for SE1 is <1E-2 M.

E165.2: a CMU, where SE1 is rubber and L1's affinity for SE1 is <1E-3 M.

E165.3: a CMU, where SE1 is rubber and L1's affinity for SE1 is <1E-4 M.

E165.4: a CMU, where SE1 is rubber and L1's affinity for SE1 is <1E-5 M.

E165.5: a CMU, where SE1 is rubber and L1's affinity for SE1 is <1E-6 M.

E165.6: a CMU, where SE1 is rubber and L1's affinity for SE1 is <1E-7 M.

E165.7: a CMU, where SE1 is rubber and L1's affinity for SE1 is <1E-8 M.

E165.8: a CMU, where SE1 is rubber and L1's affinity for SE1 is <1E-9 M.

E165.9: a CMU, where SE1 is rubber and L1's affinity for SE1 is <1E-10 M.

E165.10: a CMU, where SE1 is rubber and L1's affinity for SE1 is <1E-11 M.

E166.1: a CMU, where SE1 is silica and L1's affinity for SE1 is <1E-2 M.

E166.2: a CMU, where SE1 is silica and L1's affinity for SE1 is <1E-3 M.

E166.3: a CMU, where SE1 is silica and L1's affinity for SE1 is <1E-4 M.

E166.4: a CMU, where SE1 is silica and L1's affinity for SE1 is <1E-5 M.

E166.5: a CMU, where SE1 is silica and L1's affinity for SE1 is <1E-6 M.

E166.6: a CMU, where SE1 is silica and L1's affinity for SE1 is <1E-7 M.

E166.7: a CMU, where SE1 is silica and L1's affinity for SE1 is <1E-8 M.

E166.8: a CMU, where SE1 is silica and L1's affinity for SE1 is <1E-9 M.

E166.9: a CMU, where SE1 is silica and L1's affinity for SE1 is <1E-10 M.

E166.10: a CMU, where SE1 is silica and L1's affinity for SE1 is <1E-11 M.

E167.1: a CMU, where SE1 is silica gel and L1's affinity for SE1 is <1E-2 M.

E167.2: a CMU, where SE1 is silica gel and L1's affinity for SE1 is <1E-3 M.

E167.3: a CMU, where SE1 is silica gel and L1's affinity for SE1 is <1E-4 M.

E167.4: a CMU, where SE1 is silica gel and L1's affinity for SE1 is <1E-5 M.

E167.5: a CMU, where SE1 is silica gel and L1's affinity for SE1 is <1E-6 M.

E167.6: a CMU, where SE1 is silica gel and L1's affinity for SE1 is <1E-7 M.

E167.7: a CMU, where SE1 is silica gel and L1's affinity for SE1 is <1E-8 M.

E167.8: a CMU, where SE1 is silica gel and L1's affinity for SE1 is <1E-9 M.

E167.9: a CMU, where SE1 is silica gel and L1's affinity for SE1 is <1E-10 M.

E167.10: a CMU, where SE1 is silica gel and L1's affinity for SE1 is <1E-11 M.

E168.1: a CMU, where SE1 is silicon and L1's affinity for SE1 is <1E-2 M.

E168.2: a CMU, where SE1 is silicon and L1's affinity for SE1 is <1E-3 M.

E168.3: a CMU, where SE1 is silicon and L1's affinity for SE1 is <1E-4 M.

E168.4: a CMU, where SE1 is silicon and L1's affinity for SE1 is <1E-5 M.

E168.5: a CMU, where SE1 is silicon and L1's affinity for SE1 is <1E-6 M.

E168.6: a CMU, where SE1 is silicon and L1's affinity for SE1 is <1E-7 M.

E168.7: a CMU, where SE1 is silicon and L1's affinity for SE1 is <1E-8 M.

E168.8: a CMU, where SE1 is silicon and L1's affinity for SE1 is <1E-9 M.

E168.9: a CMU, where SE1 is silicon and L1's affinity for SE1 is <1E-10 M.

E168.10: a CMU, where SE1 is silicon and L1's affinity for SE1 is <1E-11 M.

E169.1: a CMU, where SE1 is silicon carbide and L1's affinity for SE1 is <1E-2 M.

E169.2: a CMU, where SE1 is silicon carbide and L1's affinity for SE1 is <1E-3 M.

E169.3: a CMU, where SE1 is silicon carbide and L1's affinity for SE1 is <1E-4 M.

E169.4: a CMU, where SE1 is silicon carbide and L1's affinity for SE1 is <1E-5 M.

E169.5: a CMU, where SE1 is silicon carbide and L1's affinity for SE1 is <1E-6 M.

E169.6: a CMU, where SE1 is silicon carbide and L1's affinity for SE1 is <1E-7 M.

E169.7: a CMU, where SE1 is silicon carbide and L1's affinity for SE1 is <1E-8 M.

E169.8: a CMU, where SE1 is silicon carbide and L1's affinity for SE1 is <1E-9 M.

E169.9: a CMU, where SE1 is silicon carbide and L1's affinity for SE1 is <1E-10 M.

E169.10: a CMU, where SE1 is silicon carbide and L1's affinity for SE1 is <1E-11 M.

E170.1: a CMU, where SE1 is silicon dioxide and L1's affinity for SE1 is <1E-2 M.

E170.2: a CMU, where SE1 is silicon dioxide and L1's affinity for SE1 is <1E-3 M.

E170.3: a CMU, where SE1 is silicon dioxide and L1's affinity for SE1 is <1E-4 M.

E170.4: a CMU, where SE1 is silicon dioxide and L1's affinity for SE1 is <1E-5 M.

E170.5: a CMU, where SE1 is silicon dioxide and L1's affinity for SE1 is <1E-6 M.

E170.6: a CMU, where SE1 is silicon dioxide and L1's affinity for SE1 is <1E-7 M.

E170.7: a CMU, where SE1 is silicon dioxide and L1's affinity for SE1 is <1E-8 M.

E170.8: a CMU, where SE1 is silicon dioxide and L1's affinity for SE1 is <1E-9 M.

E170.9: a CMU, where SE1 is silicon dioxide and L1's affinity for SE1 is <1E-10 M.

E170.10: a CMU, where SE1 is silicon dioxide and L1's affinity for SE1 is <1E-11 M.

E171.1: a CMU, where SE1 is silicon nitride and L1's affinity for SE1 is <1E-2 M.

E171.2: a CMU, where SE1 is silicon nitride and L1's affinity for SE1 is <1E-3 M.

E171.3: a CMU, where SE1 is silicon nitride and L1's affinity for SE1 is <1E-4 M.

E171.4: a CMU, where SE1 is silicon nitride and L1's affinity for SE1 is <1E-5 M.

E171.5: a CMU, where SE1 is silicon nitride and L1's affinity for SE1 is <1E-6 M.

E171.6: a CMU, where SE1 is silicon nitride and L1's affinity for SE1 is <1E-7 M.

E171.7: a CMU, where SE1 is silicon nitride and L1's affinity for SE1 is <1E-8 M.

E171.8: a CMU, where SE1 is silicon nitride and L1's affinity for SE1 is <1E-9 M.

E171.9: a CMU, where SE1 is silicon nitride and L1's affinity for SE1 is <1E-10 M.

E171.10: a CMU, where SE1 is silicon nitride and L1's affinity for SE1 is <1E-11 M.

E172.1: a CMU, where SE1 is silver and L1's affinity for SE1 is <1E-2 M.

E172.2: a CMU, where SE1 is silver and L1's affinity for SE1 is <1E-3 M.

E172.3: a CMU, where SE1 is silver and L1's affinity for SE1 is <1E-4 M.

E172.4: a CMU, where SE1 is silver and L1's affinity for SE1 is <1E-5 M.

E172.5: a CMU, where SE1 is silver and L1's affinity for SE1 is <1E-6 M.

E172.6: a CMU, where SE1 is silver and L1's affinity for SE1 is <1E-7 M.

E172.7: a CMU, where SE1 is silver and L1's affinity for SE1 is <1E-8 M.

E172.8: a CMU, where SE1 is silver and L1's affinity for SE1 is <1E-9 M.

E172.9: a CMU, where SE1 is silver and L1's affinity for SE1 is <1E-10 M.

E172.10: a CMU, where SE1 is silver and L1's affinity for SE1 is <1E-11 M.

E173.1: a CMU, where SE1 is soot and L1's affinity for SE1 is <1E-2 M.

E173.2: a CMU, where SE1 is soot and L1's affinity for SE1 is <1E-3 M.

E173.3: a CMU, where SE1 is soot and L1's affinity for SE1 is <1E-4 M.

E173.4: a CMU, where SE1 is soot and L1's affinity for SE1 is <1E-5 M.

E173.5: a CMU, where SE1 is soot and L1's affinity for SE1 is <1E-6 M.

E173.6: a CMU, where SE1 is soot and L1's affinity for SE1 is <1E-7 M.

E173.7: a CMU, where SE1 is soot and L1's affinity for SE1 is <1E-8 M.

E173.8: a CMU, where SE1 is soot and L1's affinity for SE1 is <1E-9 M.

E173.9: a CMU, where SE1 is soot and L1's affinity for SE1 is <1E-10 M.

E173.10: a CMU, where SE1 is soot and L1's affinity for SE1 is <1E-11 M.

E174.1: a CMU, where SE1 is stainless steel and L1's affinity for SE1 is <1E-2 M.

E174.2: a CMU, where SE1 is stainless steel and L1's affinity for SE1 is <1E-3 M.

E174.3: a CMU, where SE1 is stainless steel and L1's affinity for SE1 is <1E-4 M.

E174.4: a CMU, where SE1 is stainless steel and L1's affinity for SE1 is <1E-5 M.

E174.5: a CMU, where SE1 is stainless steel and L1's affinity for SE1 is <1E-6 M.

E174.6: a CMU, where SE1 is stainless steel and L1's affinity for SE1 is <1E-7 M.

E174.7: a CMU, where SE1 is stainless steel and L1's affinity for SE1 is <1E-8 M.

E174.8: a CMU, where SE1 is stainless steel and L1's affinity for SE1 is <1E-9 M.

E174.9: a CMU, where SE1 is stainless steel and L1's affinity for SE1 is <1E-10 M.

E174.10: a CMU, where SE1 is stainless steel and L1's affinity for SE1 is <1E-11 M.

E175.1: a CMU, where SE1 is tantalum and L1's affinity for SE1 is <1E-2 M.

E175.2: a CMU, where SE1 is tantalum and L1's affinity for SE1 is <1E-3 M.

E175.3: a CMU, where SE1 is tantalum and L1's affinity for SE1 is <1E-4 M.

E175.4: a CMU, where SE1 is tantalum and L1's affinity for SE1 is <1E-5 M.

E175.5: a CMU, where SE1 is tantalum and L1's affinity for SE1 is <1E-6 M.

E175.6: a CMU, where SE1 is tantalum and L1's affinity for SE1 is <1E-7 M.

E175.7: a CMU, where SE1 is tantalum and L1's affinity for SE1 is <1E-8 M.

E175.8: a CMU, where SE1 is tantalum and L1's affinity for SE1 is <1E-9 M.

E175.9: a CMU, where SE1 is tantalum and L1's affinity for SE1 is <1E-10 M.

E175.10: a CMU, where SE1 is tantalum and L1's affinity for SE1 is <1E-11 M.

E176.1: a CMU, where SE1 is titanium and L1's affinity for SE1 is <1E-2 M.

E176.2: a CMU, where SE1 is titanium and L1's affinity for SE1 is <1E-3 M.

E176.3: a CMU, where SE1 is titanium and L1's affinity for SE1 is <1E-4 M.

E176.4: a CMU, where SE1 is titanium and L1's affinity for SE1 is <1E-5 M.

E176.5: a CMU, where SE1 is titanium and L1's affinity for SE1 is <1E-6 M.

E176.6: a CMU, where SE1 is titanium and L1's affinity for SE1 is <1E-7 M.

E176.7: a CMU, where SE1 is titanium and L1's affinity for SE1 is <1E-8 M.

E176.8: a CMU, where SE1 is titanium and L1's affinity for SE1 is <1E-9 M.

E176.9: a CMU, where SE1 is titanium and L1's affinity for SE1 is <1E-10 M.

E176.10: a CMU, where SE1 is titanium and L1's affinity for SE1 is <1E-11 M.

E177.1: a CMU, where SE1 is titanium oxide and L1's affinity for SE1 is <1E-2 M.

E177.2: a CMU, where SE1 is titanium oxide and L1's affinity for SE1 is <1E-3 M.

E177.3: a CMU, where SE1 is titanium oxide and L1's affinity for SE1 is <1E-4 M.

E177.4: a CMU, where SE1 is titanium oxide and L1's affinity for SE1 is <1E-5 M.

E177.5: a CMU, where SE1 is titanium oxide and L1's affinity for SE1 is <1E-6 M.

E177.6: a CMU, where SE1 is titanium oxide and L1's affinity for SE1 is <1E-7 M.

E177.7: a CMU, where SE1 is titanium oxide and L1's affinity for SE1 is <1E-8 M.

E177.8: a CMU, where SE1 is titanium oxide and L1's affinity for SE1 is <1E-9 M.

E177.9: a CMU, where SE1 is titanium oxide and L1's affinity for SE1 is <1E-10 M.

E177.10: a CMU, where SE1 is titanium oxide and L1's affinity for SE1 is <1E-11 M.

E178.1: a CMU, where SE1 is tooth cementum and L1's affinity for SE1 is <1E-2 M.

E178.2: a CMU, where SE1 is tooth cementum and L1's affinity for SE1 is <1E-3 M.

E178.3: a CMU, where SE1 is tooth cementum and L1's affinity for SE1 is <1E-4 M.

E178.4: a CMU, where SE1 is tooth cementum and L1's affinity for SE1 is <1E-5 M.

E178.5: a CMU, where SE1 is tooth cementum and L1's affinity for SE1 is <1E-6 M.

E178.6: a CMU, where SE1 is tooth cementum and L1's affinity for SE1 is <1E-7 M.

E178.7: a CMU, where SE1 is tooth cementum and L1's affinity for SE1 is <1E-8 M.

E178.8: a CMU, where SE1 is tooth cementum and L1's affinity for SE1 is <1E-9 M.

E178.9: a CMU, where SE1 is tooth cementum and L1's affinity for SE1 is <1E-10 M.

E178.10: a CMU, where SE1 is tooth cementum and L1's affinity for SE1 is <1E-11 M.

E179.1: a CMU, where SE1 is tooth dentine and L1's affinity for SE1 is <1E-2 M.

E179.2: a CMU, where SE1 is tooth dentine and L1's affinity for SE1 is <1E-3 M.

E179.3: a CMU, where SE1 is tooth dentine and L1's affinity for SE1 is <1E-4 M.

E179.4: a CMU, where SE1 is tooth dentine and L1's affinity for SE1 is <1E-5 M.

E179.5: a CMU, where SE1 is tooth dentine and L1's affinity for SE1 is <1E-6 M.

E179.6: a CMU, where SE1 is tooth dentine and L1's affinity for SE1 is <1E-7 M.

E179.7: a CMU, where SE1 is tooth dentine and L1's affinity for SE1 is <1E-8 M.

E179.8: a CMU, where SE1 is tooth dentine and L1's affinity for SE1 is <1E-9 M.

E179.9: a CMU, where SE1 is tooth dentine and L1's affinity for SE1 is <1E-10 M.

E179.10: a CMU, where SE1 is tooth dentine and L1's affinity for SE1 is <1E-11 M.

E180.1: a CMU, where SE1 is tooth enamel and L1's affinity for SE1 is <1E-2 M.

E180.2: a CMU, where SE1 is tooth enamel and L1's affinity for SE1 is <1E-3 M.

E180.3: a CMU, where SE1 is tooth enamel and L1's affinity for SE1 is <1E-4 M.

E180.4: a CMU, where SE1 is tooth enamel and L1's affinity for SE1 is <1E-5 M.

E180.5: a CMU, where SE1 is tooth enamel and L1's affinity for SE1 is <1E-6 M.

E180.6: a CMU, where SE1 is tooth enamel and L1's affinity for SE1 is <1E-7 M.

E180.7: a CMU, where SE1 is tooth enamel and L1's affinity for SE1 is <1E-8 M.

E180.8: a CMU, where SE1 is tooth enamel and L1's affinity for SE1 is <1E-9 M.

E180.9: a CMU, where SE1 is tooth enamel and L1's affinity for SE1 is <1E-10 M.

E180.10: a CMU, where SE1 is tooth enamel and L1's affinity for SE1 is <1E-11 M.

E181.1: a CMU, where SE1 is tungsten and L1's affinity for SE1 is <1E-2 M.

E181.2: a CMU, where SE1 is tungsten and L1's affinity for SE1 is <1E-3 M.

E181.3: a CMU, where SE1 is tungsten and L1's affinity for SE1 is <1E-4 M.

E181.4: a CMU, where SE1 is tungsten and L1's affinity for SE1 is <1E-5 M.

E181.5: a CMU, where SE1 is tungsten and L1's affinity for SE1 is <1E-6 M.

E181.6: a CMU, where SE1 is tungsten and L1's affinity for SE1 is <1E-7 M.

E181.7: a CMU, where SE1 is tungsten and L1's affinity for SE1 is <1E-8 M.

E181.8: a CMU, where SE1 is tungsten and L1's affinity for SE1 is <1E-9 M.

E181.9: a CMU, where SE1 is tungsten and L1's affinity for SE1 is <1E-10 M.

E181.10: a CMU, where SE1 is tungsten and L1's affinity for SE1 is <1E-11 M.

E182.1: a CMU, where SE1 is tungsten carbide and L1's affinity for SE1 is <1E-2 M.

E182.2: a CMU, where SE1 is tungsten carbide and L1's affinity for SE1 is <1E-3 M.

E182.3: a CMU, where SE1 is tungsten carbide and L1's affinity for SE1 is <1E-4 M.

E182.4: a CMU, where SE1 is tungsten carbide and L1's affinity for SE1 is <1E-5 M.

E182.5: a CMU, where SE1 is tungsten carbide and L1's affinity for SE1 is <1E-6 M.

E182.6: a CMU, where SE1 is tungsten carbide and L1's affinity for SE1 is <1E-7 M.

E182.7: a CMU, where SE1 is tungsten carbide and L1's affinity for SE1 is <1E-8 M.

E182.8: a CMU, where SE1 is tungsten carbide and L1's affinity for SE1 is <1E-9 M.

E182.9: a CMU, where SE1 is tungsten carbide and L1's affinity for SE1 is <1E-10 M.

E182.10: a CMU, where SE1 is tungsten carbide and L1's affinity for SE1 is <1E-11 M.

E183.1: a CMU, where SE1 is wood and L1's affinity for SE1 is <1E-2 M.

E183.2: a CMU, where SE1 is wood and L1's affinity for SE1 is <1E-3 M.

E183.3: a CMU, where SE1 is wood and L1's affinity for SE1 is <1E-4 M.

E183.4: a CMU, where SE1 is wood and L1's affinity for SE1 is <1E-5 M.

E183.5: a CMU, where SE1 is wood and L1's affinity for SE1 is <1E-6 M.

E183.6: a CMU, where SE1 is wood and L1's affinity for SE1 is <1E-7 M.

E183.7: a CMU, where SE1 is wood and L1's affinity for SE1 is <1E-8 M.

E183.8: a CMU, where SE1 is wood and L1's affinity for SE1 is <1E-9 M.

E183.9: a CMU, where SE1 is wood and L1's affinity for SE1 is <1E-10 M.

E183.10: a CMU, where SE1 is wood and L1's affinity for SE1 is <1E-11 M.

E184.1: a CMU, where SE1 is zinc oxide and L1's affinity for SE1 is <1E-2 M.

E184.2: a CMU, where SE1 is zinc oxide and L1's affinity for SE1 is <1E-3 M.

E184.3: a CMU, where SE1 is zinc oxide and L1's affinity for SE1 is <1E-4 M.

E184.4: a CMU, where SE1 is zinc oxide and L1's affinity for SE1 is <1E-5 M.

E184.5: a CMU, where SE1 is zinc oxide and L1's affinity for SE1 is <1E-6 M.

E184.6: a CMU, where SE1 is zinc oxide and L1's affinity for SE1 is <1E-7 M.

E184.7: a CMU, where SE1 is zinc oxide and L1's affinity for SE1 is <1E-8 M.

E184.8: a CMU, where SE1 is zinc oxide and L1's affinity for SE1 is <1E-9 M.

E184.9: a CMU, where SE1 is zinc oxide and L1's affinity for SE1 is <1E-10 M.

E184.10: a CMU, where SE1 is zinc oxide and L1's affinity for SE1 is <1E-11 M.

E185.1: a CMU, where SE1 is zirconia and L1's affinity for SE1 is <1E-2 M.

E185.2: a CMU, where SE1 is zirconia and L1's affinity for SE1 is <1E-3 M.

E185.3: a CMU, where SE1 is zirconia and L1's affinity for SE1 is <1E-4 M.

E185.4: a CMU, where SE1 is zirconia and L1's affinity for SE1 is <1E-5 M.

E185.5: a CMU, where SE1 is zirconia and L1's affinity for SE1 is <1E-6 M.

E185.6: a CMU, where SE1 is zirconia and L1's affinity for SE1 is <1E-7 M.

E185.7: a CMU, where SE1 is zirconia and L1's affinity for SE1 is <1E-8 M.

E185.8: a CMU, where SE1 is zirconia and L1's affinity for SE1 is <1E-9 M.

E185.9: a CMU, where SE1 is zirconia and L1's affinity for SE1 is <1E-10 M.

E185.10: a CMU, where SE1 is zirconia and L1's affinity for SE1 is <1E-11 M.

E186.1: a CMU, where SE1 is a nanofibre and L1's affinity for SE1 is <1E-2 M.

E186.2: a CMU, where SE1 is a nanofibre and L1's affinity for SE1 is <1E-3 M.

E186.3: a CMU, where SE1 is a nanofibre and L1's affinity for SE1 is <1E-4 M.

E186.4: a CMU, where SE1 is a nanofibre and L1's affinity for SE1 is <1E-5 M.

E186.5: a CMU, where SE1 is a nanofibre and L1's affinity for SE1 is <1E-6 M.

E186.6: a CMU, where SE1 is a nanofibre and L1's affinity for SE1 is <1E-7 M.

E186.7: a CMU, where SE1 is a nanofibre and L1's affinity for SE1 is <1E-8 M.

E186.8: a CMU, where SE1 is a nanofibre and L1's affinity for SE1 is <1E-9 M.

E186.9: a CMU, where SE1 is a nanofibre and L1's affinity for SE1 is <1E-10 M.

E186.10: a CMU, where SE1 is a nanofibre and L1's affinity for SE1 is <1E-11 M.

E187.1: a CMU, where SE1 is a plastic and L1's affinity for SE1 is <1E-2 M.

E187.2: a CMU, where SE1 is a plastic and L1's affinity for SE1 is <1E-3 M.

E187.3: a CMU, where SE1 is a plastic and L1's affinity for SE1 is <1E-4 M.

E187.4: a CMU, where SE1 is a plastic and L1's affinity for SE1 is <1E-5 M.

E187.5: a CMU, where SE1 is a plastic and L1's affinity for SE1 is <1E-6 M.

E187.6: a CMU, where SE1 is a plastic and L1's affinity for SE1 is <1E-7 M.

E187.7: a CMU, where SE1 is a plastic and L1's affinity for SE1 is <1E-8 M.

E187.8: a CMU, where SE1 is a plastic and L1's affinity for SE1 is <1E-9 M.

E187.9: a CMU, where SE1 is a plastic and L1's affinity for SE1 is <1E-10 M.

E187.10: a CMU, where SE1 is a plastic and L1's affinity for SE1 is <1E-11 M.

E188.1: a CMU, where SE1 is a fibre and L1's affinity for SE1 is <1E-2 M.

E188.2: a CMU, where SE1 is a fibre and L1's affinity for SE1 is <1E-3 M.

E188.3: a CMU, where SE1 is a fibre and L1's affinity for SE1 is <1E-4 M.

E188.4: a CMU, where SE1 is a fibre and L1's affinity for SE1 is <1E-5 M.

E188.5: a CMU, where SE1 is a fibre and L1's affinity for SE1 is <1E-6 M.

E188.6: a CMU, where SE1 is a fibre and L1's affinity for SE1 is <1E-7 M.

E188.7: a CMU, where SE1 is a fibre and L1's affinity for SE1 is <1E-8 M.

E188.8: a CMU, where SE1 is a fibre and L1's affinity for SE1 is <1E-9 M.

E188.9: a CMU, where SE1 is a fibre and L1's affinity for SE1 is <1E-10 M.

E188.10: a CMU, where SE1 is a fibre and L1's affinity for SE1 is <1E-11 M.

E189.1: a CMU, where SE1 is a nanomaterial and L1's affinity for SE1 is <1E-2 M.

E189.2: a CMU, where SE1 is a nanomaterial and L1's affinity for SE1 is <1E-3 M.

E189.3: a CMU, where SE1 is a nanomaterial and L1's affinity for SE1 is <1E-4 M.

E189.4: a CMU, where SE1 is a nanomaterial and L1's affinity for SE1 is <1E-5 M.

E189.5: a CMU, where SE1 is a nanomaterial and L1's affinity for SE1 is <1E-6 M.

E189.6: a CMU, where SE1 is a nanomaterial and L1's affinity for SE1 is <1E-7 M.

E189.7: a CMU, where SE1 is a nanomaterial and L1's affinity for SE1 is <1E-8 M.

E189.8: a CMU, where SE1 is a nanomaterial and L1's affinity for SE1 is <1E-9 M.

E189.9: a CMU, where SE1 is a nanomaterial and L1's affinity for SE1 is <1E-10 M.

E189.10: a CMU, where SE1 is a nanomaterial and L1's affinity for SE1 is <1E-11 M.

E190.1: a CMU, where SE1 is graphite and L1's affinity for SE1 is <1E-2 M.

E190.2: a CMU, where SE1 is graphite and L1's affinity for SE1 is <1E-3 M.

E190.3: a CMU, where SE1 is graphite and L1's affinity for SE1 is <1E-4 M.

E190.4: a CMU, where SE1 is graphite and L1's affinity for SE1 is <1E-5 M.

E190.5: a CMU, where SE1 is graphite and L1's affinity for SE1 is <1E-6 M.

E190.6: a CMU, where SE1 is graphite and L1's affinity for SE1 is <1E-7 M.

E190.7: a CMU, where SE1 is graphite and L1's affinity for SE1 is <1E-8 M.

E190.8: a CMU, where SE1 is graphite and L1's affinity for SE1 is <1E-9 M.

E190.9: a CMU, where SE1 is graphite and L1's affinity for SE1 is <1E-10 M.

E190.10: a CMU, where SE1 is graphite and L1's affinity for SE1 is <1E-11 M.

E191.1: a CMU, where SE1 is a cellulose nanofibre and L1's affinity for SE1 is <1E-2 M.

E191.2: a CMU, where SE1 is a cellulose nanofibre and L1's affinity for SE1 is <1E-3 M.

E191.3: a CMU, where SE1 is a cellulose nanofibre and L1's affinity for SE1 is <1E-4 M.

E191.4: a CMU, where SE1 is a cellulose nanofibre and L1's affinity for SE1 is <1E-5 M.

E191.5: a CMU, where SE1 is a cellulose nanofibre and L1's affinity for SE1 is <1E-6 M.

E191.6: a CMU, where SE1 is a cellulose nanofibre and L1's affinity for SE1 is <1E-7 M.

E191.7: a CMU, where SE1 is a cellulose nanofibre and L1's affinity for SE1 is <1E-8 M.

E191.8: a CMU, where SE1 is a cellulose nanofibre and L1's affinity for SE1 is <1E-9 M.

E191.9: a CMU, where SE1 is a cellulose nanofibre and L1's affinity for SE1 is <1E-10 M.

E191.10: a CMU, where SE1 is a cellulose nanofibre and L1's affinity for SE1 is <1E-11 M.

E192.1: a CMU, where SE1 is a ceramic and L1's affinity for SE1 is <1E-2 M.

E192.2: a CMU, where SE1 is a ceramic and L1's affinity for SE1 is <1E-3 M.

E192.3: a CMU, where SE1 is a ceramic and L1's affinity for SE1 is <1E-4 M.

E192.4: a CMU, where SE1 is a ceramic and L1's affinity for SE1 is <1E-5 M.

E192.5: a CMU, where SE1 is a ceramic and L1's affinity for SE1 is <1E-6 M.

E192.6: a CMU, where SE1 is a ceramic and L1's affinity for SE1 is <1E-7 M.

E192.7: a CMU, where SE1 is a ceramic and L1's affinity for SE1 is <1E-8 M.

E192.8: a CMU, where SE1 is a ceramic and L1's affinity for SE1 is <1E-9 M.

E192.9: a CMU, where SE1 is a ceramic and L1's affinity for SE1 is <1E-10 M.

E192.10: a CMU, where SE1 is a ceramic and L1's affinity for SE1 is <1E-11 M.

E193.1: a CMU, where SE1 is curran and L1's affinity for SE1 is <1E-2 M.

E193.2: a CMU, where SE1 is curran and L1's affinity for SE1 is <1E-3 M.

E193.3: a CMU, where SE1 is curran and L1's affinity for SE1 is <1E-4 M.

E193.4: a CMU, where SE1 is curran and L1's affinity for SE1 is <1E-5 M.

E193.5: a CMU, where SE1 is curran and L1's affinity for SE1 is <1E-6 M.

E193.6: a CMU, where SE1 is curran and L1's affinity for SE1 is <1E-7 M.

E193.7: a CMU, where SE1 is curran and L1's affinity for SE1 is <1E-8 M.

E193.8: a CMU, where SE1 is curran and L1's affinity for SE1 is <1E-9 M.

E193.9: a CMU, where SE1 is curran and L1's affinity for SE1 is <1E-10 M.

E193.10: a CMU, where SE1 is curran and L1's affinity for SE1 is <1E-11 M.

E194.1: a CMU, where SE1 is a nanothread and L1's affinity for SE1 is <1E-2 M.

E194.2: a CMU, where SE1 is a nanothread and L1's affinity for SE1 is <1E-3 M.

E194.3: a CMU, where SE1 is a nanothread and L1's affinity for SE1 is <1E-4 M.

E194.4: a CMU, where SE1 is a nanothread and L1's affinity for SE1 is <1E-5 M.

E194.5: a CMU, where SE1 is a nanothread and L1's affinity for SE1 is <1E-6 M.

E194.6: a CMU, where SE1 is a nanothread and L1's affinity for SE1 is <1E-7 M.

E194.7: a CMU, where SE1 is a nanothread and L1's affinity for SE1 is <1E-8 M.

E194.8: a CMU, where SE1 is a nanothread and L1's affinity for SE1 is <1E-9 M.

E194.9: a CMU, where SE1 is a nanothread and L1's affinity for SE1 is <1E-10 M.

E194.10: a CMU, where SE1 is a nanothread and L1's affinity for SE1 is <1E-11 M.

E195.1: a CMU, where SE1 is a functionalized nanotube and L1's affinity for SE1 is <1E-2 M.

E195.2: a CMU, where SE1 is a functionalized nanotube and L1's affinity for SE1 is <1E-3 M.

E195.3: a CMU, where SE1 is a functionalized nanotube and L1's affinity for SE1 is <1E-4 M.

E195.4: a CMU, where SE1 is a functionalized nanotube and L1's affinity for SE1 is <1E-5 M.

E195.5: a CMU, where SE1 is a functionalized nanotube and L1's affinity for SE1 is <1E-6 M.

E195.6: a CMU, where SE1 is a functionalized nanotube and L1's affinity for SE1 is <1E-7 M.

E195.7: a CMU, where SE1 is a functionalized nanotube and L1's affinity for SE1 is <1E-8 M.

E195.8: a CMU, where SE1 is a functionalized nanotube and L1's affinity for SE1 is <1E-9 M.

E195.9: a CMU, where SE1 is a functionalized nanotube and L1's affinity for SE1 is <1E-10 M.

E195.10: a CMU, where SE1 is a functionalized nanotube and L1's affinity for SE1 is <1E-11 M.

E196.1: a CMU, where SE1 is a plastic material and L1's affinity for SE1 is <1E-2 M.

E196.2: a CMU, where SE1 is a plastic material and L1's affinity for SE1 is <1E-3 M.

E196.3: a CMU, where SE1 is a plastic material and L1's affinity for SE1 is <1E-4 M.

E196.4: a CMU, where SE1 is a plastic material and L1's affinity for SE1 is <1E-5 M.

E196.5: a CMU, where SE1 is a plastic material and L1's affinity for SE1 is <1E-6 M.

E196.6: a CMU, where SE1 is a plastic material and L1's affinity for SE1 is <1E-7 M.

E196.7: a CMU, where SE1 is a plastic material and L1's affinity for SE1 is <1E-8 M.

E196.8: a CMU, where SE1 is a plastic material and L1's affinity for SE1 is <1E-9 M.

E196.9: a CMU, where SE1 is a plastic material and L1's affinity for SE1 is <1E-10 M.

E196.10: a CMU, where SE1 is a plastic material and L1's affinity for SE1 is <1E-11 M.

E197.1: a CMU, where SE1 is a metal material and L1's affinity for SE1 is <1E-2 M.

E197.2: a CMU, where SE1 is a metal material and L1's affinity for SE1 is <1E-3 M.

E197.3: a CMU, where SE1 is a metal material and L1's affinity for SE1 is <1E-4 M.

E197.4: a CMU, where SE1 is a metal material and L1's affinity for SE1 is <1E-5 M.

E197.5: a CMU, where SE1 is a metal material and L1's affinity for SE1 is <1E-6 M.

E197.6: a CMU, where SE1 is a metal material and L1's affinity for SE1 is <1E-7 M.

E197.7: a CMU, where SE1 is a metal material and L1's affinity for SE1 is <1E-8 M.

E197.8: a CMU, where SE1 is a metal material and L1's affinity for SE1 is <1E-9 M.

E197.9: a CMU, where SE1 is a metal material and L1's affinity for SE1 is <1E-10 M.

E197.10: a CMU, where SE1 is a metal material and L1's affinity for SE1 is <1E-11 M.

E198.1: a CMU, where SE1 is a polymer material and L1's affinity for SE1 is <1E-2 M.

E198.2: a CMU, where SE1 is a polymer material and L1's affinity for SE1 is <1E-3 M.

E198.3: a CMU, where SE1 is a polymer material and L1's affinity for SE1 is <1E-4 M.

E198.4: a CMU, where SE1 is a polymer material and L1's affinity for SE1 is <1E-5 M.

E198.5: a CMU, where SE1 is a polymer material and L1's affinity for SE1 is <1E-6 M.

E198.6: a CMU, where SE1 is a polymer material and L1's affinity for SE1 is <1E-7 M.

E198.7: a CMU, where SE1 is a polymer material and L1's affinity for SE1 is <1E-8 M.

E198.8: a CMU, where SE1 is a polymer material and L1's affinity for SE1 is <1E-9 M.

E198.9: a CMU, where SE1 is a polymer material and L1's affinity for SE1 is <1E-10 M.

E198.10: a CMU, where SE1 is a polymer material and L1's affinity for SE1 is <1E-11 M.

E199.1: a CMU, where SE1 is a thiol-functionalize graphene molecule and L1's affinity for SE1 is <1E-2 M.

E199.2: a CMU, where SE1 is a thiol-functionalized graphene molecule and L1's affinity for SE1 is <1E-3 M.

E199.3: a CMU, where SE1 is a thiol-functionalized graphene molecule and L1's affinity for SE1 is <1E-4 M.

E199.4: a CMU, where SE1 is a thiol-functionalized graphene molecule and L1's affinity for SE1 is <1E-5 M.

E199.5: a CMU, where SE1 is a thiol-functionalized graphene molecule and L1's affinity for SE1 is <1E-6 M.

E199.6: a CMU, where SE1 is a thiol-functionalized graphene molecule and L1's affinity for SE1 is <1E-7 M.

E199.7: a CMU, where SE1 is a thiol-functionalized graphene molecule and L1's affinity for SE1 is <1E-8 M.

E199.8: a CMU, where SE1 is a thiol-functionalized graphene molecule and L1's affinity for SE1 is <1E-9 M.

E199.9: a CMU, where SE1 is a thiol-functionalized graphene molecule and L1's affinity for SE1 is <1E-10 M.

E199.10: a CMU, where SE1 is a thiol-functionalized graphene molecule and L1's affinity for SE1 is <1E-11 M.

Preferred embodiments are the following combinations of one or more SE(s) and a matrix, wherein each SE may be bound by one or more ligands, and any two SEs may be linked by a linker;

D.0000101: a BNNT, and the matrix is a metal.

D.0000011: a CF, and the matrix is a metal.

D.0000111: a BNNT, a CF, and the matrix is a metal.

D.0010001: a GS, and the matrix is a metal.

D.0010101: a GS, a BNNT, and the matrix is a metal.

D.0010011: a GS, a CF, and the matrix is a metal.

D.0010111: a GS, a BNNT, a CF, and the matrix is a metal.

D.0001001: a BNS, and the matrix is a metal.

D.0001101: a BNS, a BNNT, and the matrix is a metal.

D.0001011: a BNS, a CF, and the matrix is a metal.

D.0001111: a BNS, a BNNT, a CF, and the matrix is a metal.

D.0011001: a GS, a BNS, and the matrix is a metal.

D.0011101: a GS, a BNS, a BNNT, and the matrix is a metal.

D.0011011: a GS, a BNS, a CF, and the matrix is a metal.

D.0011111: a GS, a BNS, a BNNT, a CF, and the matrix is a metal.

D.1000001: a MWCNT, and the matrix is a metal.

D.1000101: a MWCNT, a BNNT, and the matrix is a metal.

D.1000011: a MWCNT, a CF, and the matrix is a metal.

D.1000111: a MWCNT, a BNNT, a CF, and the matrix is a metal.

D.1010001: a MWCNT, a GS, and the matrix is a metal.

D.1010101: a MWCNT, a GS, a BNNT, and the matrix is a metal.

D.1010011: a MWCNT, a GS, a CF, and the matrix is a metal.

D.1010111: a MWCNT, a GS, a BNNT, a CF, and the matrix is a metal.

D.1001001: a MWCNT, a BNS, and the matrix is a metal.

D.1001101: a MWCNT, a BNS, a BNNT, and the matrix is a metal.

D.1001011: a MWCNT, a BNS, a CF, and the matrix is a metal.

D.1001111: a MWCNT, a BNS, a BNNT, a CF, and the matrix is a metal.

D.1011001: a MWCNT, a GS, a BNS, and the matrix is a metal.

D.1011101: a MWCNT, a GS, a BNS, a BNNT, and the matrix is a metal.

D.1011011: a MWCNT, a GS, a BNS, a CF, and the matrix is a metal.

D.1011111: a MWCNT, a GS, a BNS, a BNNT, a CF, and the matrix is a metal.

D.0100001: a SWCNT, and the matrix is a metal.

D.0100101: a SWCNT, a BNNT, and the matrix is a metal.

D.0100011: a SWCNT, a CF, and the matrix is a metal.

D.0100111: a SWCNT, a BNNT, a CF, and the matrix is a metal.

D.0110001: a SWCNT, a GS, and the matrix is a metal.

D.0110101: a SWCNT, a GS, a BNNT, and the matrix is a metal.

D.0110011: a SWCNT, a GS, a CF, and the matrix is a metal.

D.0110111: a SWCNT, a GS, a BNNT, a CF, and the matrix is a metal.

D.0101001: a SWCNT, a BNS, and the matrix is a metal.

D.0101101: a SWCNT, a BNS, a BNNT, and the matrix is a metal.

D.0101011: a SWCNT, a BNS, a CF, and the matrix is a metal.

D.0101111: a SWCNT, a BNS, a BNNT, a CF, and the matrix is a metal.

D.0111001: a SWCNT, a GS, a BNS, and the matrix is a metal.

D.0111101: a SWCNT, a GS, a BNS, a BNNT, and the matrix is a metal.

D.0111011: a SWCNT, a GS, a BNS, a CF, and the matrix is a metal.

D.0111111: a SWCNT, a GS, a BNS, a BNNT, a CF, and the matrix is a metal.

D.1100001: a MWCNT, a SWCNT, and the matrix is a metal.

D.1100101: a MWCNT, a SWCNT, a BNNT, and the matrix is a metal.

D.1100011: a MWCNT, a SWCNT, a CF, and the matrix is a metal.

D.1100111: a MWCNT, a SWCNT, a BNNT, a CF, and the matrix is a metal.

D.1110001: a MWCNT, a SWCNT, a GS, and the matrix is a metal.

D.1110101: a MWCNT, a SWCNT, a GS, a BNNT, and the matrix is a metal.

D.1110011: a MWCNT, a SWCNT, a GS, a CF, and the matrix is a metal.

D.1110111: a MWCNT, a SWCNT, a GS, a BNNT, a CF, and the matrix is a metal.

D.1101001: a MWCNT, a SWCNT, a BNS, and the matrix is a metal.

D.1101101: a MWCNT, a SWCNT, a BNS, a BNNT, and the matrix is a metal.

D.1101011: a MWCNT, a SWCNT, a BNS, a CF, and the matrix is a metal.

D.1101111: a MWCNT, a SWCNT, a BNS, a BNNT, a CF, and the matrix is a metal.

D.1111001: a MWCNT, a SWCNT, a GS, a BNS, and the matrix is a metal.

D.1111101: a MWCNT, a SWCNT, a GS, a BNS, a BNNT, and the matrix is a metal.

D.1111011: a MWCNT, a SWCNT, a GS, a BNS, a CF, and the matrix is a metal.

D.1111111: a MWCNT, a SWCNT, a GS, a BNS, a BNNT, a CF, and the matrix is a metal.

D.0000102: a BNNT, and the matrix is a ceramic.

D.0000012: a CF, and the matrix is a ceramic.

D.0000112: a BNNT, a CF, and the matrix is a ceramic.

D.0010002: a GS, and the matrix is a ceramic.

D.0010102: a GS, a BNNT, and the matrix is a ceramic.

D.0010012: a GS, a CF, and the matrix is a ceramic.

D.0010112: a GS, a BNNT, a CF, and the matrix is a ceramic.

D.0001002: a BNS, and the matrix is a ceramic.

D.0001102: a BNS, a BNNT, and the matrix is a ceramic.

D.0001012: a BNS, a CF, and the matrix is a ceramic.

D.0001112: a BNS, a BNNT, a CF, and the matrix is a ceramic.

D.0011002: a GS, a BNS, and the matrix is a ceramic.

D.0011102: a GS, a BNS, a BNNT, and the matrix is a ceramic.

D.0011012: a GS, a BNS, a CF, and the matrix is a ceramic.

D.0011112: a GS, a BNS, a BNNT, a CF, and the matrix is a ceramic.

D.1000002: a MWCNT, and the matrix is a ceramic.

D.1000102: a MWCNT, a BNNT, and the matrix is a ceramic.

D.1000012: a MWCNT, a CF, and the matrix is a ceramic.

D.1000112: a MWCNT, a BNNT, a CF, and the matrix is a ceramic.

D.1010002: a MWCNT, a GS, and the matrix is a ceramic.

D.1010102: a MWCNT, a GS, a BNNT, and the matrix is a ceramic.

D.1010012: a MWCNT, a GS, a CF, and the matrix is a ceramic.

D.1010112: a MWCNT, a GS, a BNNT, a CF, and the matrix is a ceramic.

D.1001002: a MWCNT, a BNS, and the matrix is a ceramic.

D.1001102: a MWCNT, a BNS, a BNNT, and the matrix is a ceramic.

D.1001012: a MWCNT, a BNS, a CF, and the matrix is a ceramic.

D.1001112: a MWCNT, a BNS, a BNNT, a CF, and the matrix is a ceramic.

D.1011002: a MWCNT, a GS, a BNS, and the matrix is a ceramic.

D.1011102: a MWCNT, a GS, a BNS, a BNNT, and the matrix is a ceramic.

D.1011012: a MWCNT, a GS, a BNS, a CF, and the matrix is a ceramic.

D.1011112: a MWCNT, a GS, a BNS, a BNNT, a CF, and the matrix is a ceramic.

D.0100002: a SWCNT, and the matrix is a ceramic.

D.0100102: a SWCNT, a BNNT, and the matrix is a ceramic.

D.0100012: a SWCNT, a CF, and the matrix is a ceramic.

D.0100112: a SWCNT, a BNNT, a CF, and the matrix is a ceramic.

D.0110002: a SWCNT, a GS, and the matrix is a ceramic.

D.0110102: a SWCNT, a GS, a BNNT, and the matrix is a ceramic.

D.0110012: a SWCNT, a GS, a CF, and the matrix is a ceramic.

D.0110112: a SWCNT, a GS, a BNNT, a CF, and the matrix is a ceramic.

D.0101002: a SWCNT, a BNS, and the matrix is a ceramic.

D.0101102: a SWCNT, a BNS, a BNNT, and the matrix is a ceramic.

D.0101012: a SWCNT, a BNS, a CF, and the matrix is a ceramic.

D.0101112: a SWCNT, a BNS, a BNNT, a CF, and the matrix is a ceramic.

D.0111002: a SWCNT, a GS, a BNS, and the matrix is a ceramic.

D.0111102: a SWCNT, a GS, a BNS, a BNNT, and the matrix is a ceramic.

D.0111012: a SWCNT, a GS, a BNS, a CF, and the matrix is a ceramic.

D.0111112: a SWCNT, a GS, a BNS, a BNNT, a CF, and the matrix is a ceramic.

D.1100002: a MWCNT, a SWCNT, and the matrix is a ceramic.

D.1100102: a MWCNT, a SWCNT, a BNNT, and the matrix is a ceramic.

D.1100012: a MWCNT, a SWCNT, a CF, and the matrix is a ceramic.

D.1100112: a MWCNT, a SWCNT, a BNNT, a CF, and the matrix is a ceramic.

D.1110002: a MWCNT, a SWCNT, a GS, and the matrix is a ceramic.

D.1110102: a MWCNT, a SWCNT, a GS, a BNNT, and the matrix is a ceramic.

D.1110012: a MWCNT, a SWCNT, a GS, a CF, and the matrix is a ceramic.

D.1110112: a MWCNT, a SWCNT, a GS, a BNNT, a CF, and the matrix is a ceramic.

D.1101002: a MWCNT, a SWCNT, a BNS, and the matrix is a ceramic.

D.1101102: a MWCNT, a SWCNT, a BNS, a BNNT, and the matrix is a ceramic.

D.1101012: a MWCNT, a SWCNT, a BNS, a CF, and the matrix is a ceramic.

D.1101112: a MWCNT, a SWCNT, a BNS, a BNNT, a CF, and the matrix is a ceramic.

D.1111002: a MWCNT, a SWCNT, a GS, a BNS, and the matrix is a ceramic.

D.1111102: a MWCNT, a SWCNT, a GS, a BNS, a BNNT, and the matrix is a ceramic.

D.1111012: a MWCNT, a SWCNT, a GS, a BNS, a CF, and the matrix is a ceramic.

D.1111112: a MWCNT, a SWCNT, a GS, a BNS, a BNNT, a CF, and the matrix is a ceramic.

D.0000103: a BNNT, and the matrix is organic matter.

D.0000013: a CF, and the matrix is organic matter.

D.0000113: a BNNT, a CF, and the matrix is organic matter.

D.0010003: a GS, and the matrix is organic matter.

D.0010103: a GS, a BNNT, and the matrix is organic matter.

D.0010013: a GS, a CF, and the matrix is organic matter.

D.0010113: a GS, a BNNT, a CF, and the matrix is organic matter.

D.0001003: a BNS, and the matrix is organic matter.

D.0001103: a BNS, a BNNT, and the matrix is organic matter.

D.0001013: a BNS, a CF, and the matrix is organic matter.

D.0001113: a BNS, a BNNT, a CF, and the matrix is organic matter.

D.0011003: a GS, a BNS, and the matrix is organic matter.

D.0011103: a GS, a BNS, a BNNT, and the matrix is organic matter.

D.0011013: a GS, a BNS, a CF, and the matrix is organic matter.

D.0011113: a GS, a BNS, a BNNT, a CF, and the matrix is organic matter.

D.1000003: a MWCNT, and the matrix is organic matter.

D.1000103: a MWCNT, a BNNT, and the matrix is organic matter.

D.1000013: a MWCNT, a CF, and the matrix is organic matter.

D.1000113: a MWCNT, a BNNT, a CF, and the matrix is organic matter.

D.1010003: a MWCNT, a GS, and the matrix is organic matter.

D.1010103: a MWCNT, a GS, a BNNT, and the matrix is organic matter.

D.1010013: a MWCNT, a GS, a CF, and the matrix is organic matter.

D.1010113: a MWCNT, a GS, a BNNT, a CF, and the matrix is organic matter.

D.1001003: a MWCNT, a BNS, and the matrix is organic matter.

D.1001103: a MWCNT, a BNS, a BNNT, and the matrix is organic matter.

D.1001013: a MWCNT, a BNS, a CF, and the matrix is organic matter.

D.1001113: a MWCNT, a BNS, a BNNT, a CF, and the matrix is organic matter.

D.1011003: a MWCNT, a GS, a BNS, and the matrix is organic matter.

D.1011103: a MWCNT, a GS, a BNS, a BNNT, and the matrix is organic matter.

D.1011013: a MWCNT, a GS, a BNS, a CF, and the matrix is organic matter.

D.1011113: a MWCNT, a GS, a BNS, a BNNT, a CF, and the matrix is organic matter.

D.0100003: a SWCNT, and the matrix is organic matter.

D.0100103: a SWCNT, a BNNT, and the matrix is organic matter.

D.0100013: a SWCNT, a CF, and the matrix is organic matter.

D.0100113: a SWCNT, a BNNT, a CF, and the matrix is organic matter.

D.0110003: a SWCNT, a GS, and the matrix is organic matter.

D.0110103: a SWCNT, a GS, a BNNT, and the matrix is organic matter.

D.0110013: a SWCNT, a GS, a CF, and the matrix is organic matter.

D.0110113: a SWCNT, a GS, a BNNT, a CF, and the matrix is organic matter.

D.0101003: a SWCNT, a BNS, and the matrix is organic matter.

D.0101103: a SWCNT, a BNS, a BNNT, and the matrix is organic matter.

D.0101013: a SWCNT, a BNS, a CF, and the matrix is organic matter.

D.0101113: a SWCNT, a BNS, a BNNT, a CF, and the matrix is organic matter.

D.0111003: a SWCNT, a GS, a BNS, and the matrix is organic matter.

D.0111103: a SWCNT, a GS, a BNS, a BNNT, and the matrix is organic matter.

D.0111013: a SWCNT, a GS, a BNS, a CF, and the matrix is organic matter.

D.0111113: a SWCNT, a GS, a BNS, a BNNT, a CF, and the matrix is organic matter.

D.1100003: a MWCNT, a SWCNT, and the matrix is organic matter.

D.1100103: a MWCNT, a SWCNT, a BNNT, and the matrix is organic matter.

D.1100013: a MWCNT, a SWCNT, a CF, and the matrix is organic matter.

D.1100113: a MWCNT, a SWCNT, a BNNT, a CF, and the matrix is organic matter.

D.1110003: a MWCNT, a SWCNT, a GS, and the matrix is organic matter.

D.1110103: a MWCNT, a SWCNT, a GS, a BNNT, and the matrix is organic matter.

D.1110013: a MWCNT, a SWCNT, a GS, a CF, and the matrix is organic matter.

D.1110113: a MWCNT, a SWCNT, a GS, a BNNT, a CF, and the matrix is organic matter.

D.1101003: a MWCNT, a SWCNT, a BNS, and the matrix is organic matter.

D.1101103: a MWCNT, a SWCNT, a BNS, a BNNT, and the matrix is organic matter.

D.1101013: a MWCNT, a SWCNT, a BNS, a CF, and the matrix is organic matter.

D.1101113: a MWCNT, a SWCNT, a BNS, a BNNT, a CF, and the matrix is organic matter.

D.1111003: a MWCNT, a SWCNT, a GS, a BNS, and the matrix is organic matter.

D.1111103: a MWCNT, a SWCNT, a GS, a BNS, a BNNT, and the matrix is organic matter.

D.1111013: a MWCNT, a SWCNT, a GS, a BNS, a CF, and the matrix is organic matter.

D.1111113: a MWCNT, a SWCNT, a GS, a BNS, a BNNT, a CF, and the matrix is organic matter.

D.0000104: a BNNT, and the matrix is a plastic.

D.0000014: a CF, and the matrix is a plastic.

D.0000114: a BNNT, a CF, and the matrix is a plastic.
D.0010004: a GS, and the matrix is a plastic.
D.0010104: a GS, a BNNT, and the matrix is a plastic.
D.0010014: a GS, a CF, and the matrix is a plastic.
D.0010114: a GS, a BNNT, a CF, and the matrix is a plastic.
D.0001004: a BNS, and the matrix is a plastic.
D.0001104: a BNS, a BNNT, and the matrix is a plastic.
D.0001014: a BNS, a CF, and the matrix is a plastic.
D.0001114: a BNS, a BNNT, a CF, and the matrix is a plastic.
D.0011004: a GS, a BNS, and the matrix is a plastic.
D.0011104: a GS, a BNS, a BNNT, and the matrix is a plastic.
D.0011014: a GS, a BNS, a CF, and the matrix is a plastic.
D.0011114: a GS, a BNS, a BNNT, a CF, and the matrix is a plastic.
D.1000004: a MWCNT, and the matrix is a plastic.
D.1000104: a MWCNT, a BNNT, and the matrix is a plastic.
D.1000014: a MWCNT, a CF, and the matrix is a plastic.
D.1000114: a MWCNT, a BNNT, a CF, and the matrix is a plastic.
D.1010004: a MWCNT, a GS, and the matrix is a plastic.
D.1010104: a MWCNT, a GS, a BNNT, and the matrix is a plastic.
D.1010014: a MWCNT, a GS, a CF, and the matrix is a plastic.
D.1010114: a MWCNT, a GS, a BNNT, a CF, and the matrix is a plastic.
D.1001004: a MWCNT, a BNS, and the matrix is a plastic.
D.1001104: a MWCNT, a BNS, a BNNT, and the matrix is a plastic.
D.1001014: a MWCNT, a BNS, a CF, and the matrix is a plastic.
D.1001114: a MWCNT, a BNS, a BNNT, a CF, and the matrix is a plastic.
D.1011004: a MWCNT, a GS, a BNS, and the matrix is a plastic.
D.1011104: a MWCNT, a GS, a BNS, a BNNT, and the matrix is a plastic.
D.1011014: a MWCNT, a GS, a BNS, a CF, and the matrix is a plastic.
D.1011114: a MWCNT, a GS, a BNS, a BNNT, a CF, and the matrix is a plastic.
D.0100004: a SWCNT, and the matrix is a plastic.
D.0100104: a SWCNT, a BNNT, and the matrix is a plastic.
D.0100014: a SWCNT, a CF, and the matrix is a plastic.
D.0100114: a SWCNT, a BNNT, a CF, and the matrix is a plastic.
D.0110004: a SWCNT, a GS, and the matrix is a plastic.
D.0110104: a SWCNT, a GS, a BNNT, and the matrix is a plastic.
D.0110014: a SWCNT, a GS, a CF, and the matrix is a plastic.
D.0110114: a SWCNT, a GS, a BNNT, a CF, and the matrix is a plastic.
D.0101004: a SWCNT, a BNS, and the matrix is a plastic.
D.0101104: a SWCNT, a BNS, a BNNT, and the matrix is a plastic.
D.0101014: a SWCNT, a BNS, a CF, and the matrix is a plastic.
D.0101114: a SWCNT, a BNS, a BNNT, a CF, and the matrix is a plastic.
D.0111004: a SWCNT, a GS, a BNS, and the matrix is a plastic.
D.0111104: a SWCNT, a GS, a BNS, a BNNT, and the matrix is a plastic.
D.0111014: a SWCNT, a GS, a BNS, a CF, and the matrix is a plastic.
D.0111114: a SWCNT, a GS, a BNS, a BNNT, a CF, and the matrix is a plastic.
D.1100004: a MWCNT, a SWCNT, and the matrix is a plastic.
D.1100104: a MWCNT, a SWCNT, a BNNT, and the matrix is a plastic.
D.1100014: a MWCNT, a SWCNT, a CF, and the matrix is a plastic.
D.1100114: a MWCNT, a SWCNT, a BNNT, a CF, and the matrix is a plastic.
D.1110004: a MWCNT, a SWCNT, a GS, and the matrix is a plastic.
D.1110104: a MWCNT, a SWCNT, a GS, a BNNT, and the matrix is a plastic.
D.1110014: a MWCNT, a SWCNT, a GS, a CF, and the matrix is a plastic.
D.1110114: a MWCNT, a SWCNT, a GS, a BNNT, a CF, and the matrix is a plastic.
D.1101004: a MWCNT, a SWCNT, a BNS, and the matrix is a plastic.
D.1101104: a MWCNT, a SWCNT, a BNS, a BNNT, and the matrix is a plastic.
D.1101014: a MWCNT, a SWCNT, a BNS, a CF, and the matrix is a plastic.
D.1101114: a MWCNT, a SWCNT, a BNS, a BNNT, a CF, and the matrix is a plastic.
D.1111004: a MWCNT, a SWCNT, a GS, a BNS, and the matrix is a plastic.
D.1111104: a MWCNT, a SWCNT, a GS, a BNS, a BNNT, and the matrix is a plastic.
D.1111014: a MWCNT, a SWCNT, a GS, a BNS, a CF, and the matrix is a plastic.
D.1111114: a MWCNT, a SWCNT, a GS, a BNS, a BNNT, a CF, and the matrix is a plastic.
D.0000105: a BNNT, and the matrix is a resin.
D.0000015: a CF, and the matrix is a resin.
D.0000115: a BNNT, a CF, and the matrix is a resin.
D.0010005: a GS, and the matrix is a resin.
D.0010105: a GS, a BNNT, and the matrix is a resin.
D.0010015: a GS, a CF, and the matrix is a resin.
D.0010115: a GS, a BNNT, a CF, and the matrix is a resin.
D.0001005: a BNS, and the matrix is a resin.
D.0001105: a BNS, a BNNT, and the matrix is a resin.
D.0001015: a BNS, a CF, and the matrix is a resin.
D.0001115: a BNS, a BNNT, a CF, and the matrix is a resin.
D.0011005: a GS, a BNS, and the matrix is a resin.
D.0011105: a GS, a BNS, a BNNT, and the matrix is a resin.
D.0011015: a GS, a BNS, a CF, and the matrix is a resin.
D.0011115: a GS, a BNS, a BNNT, a CF, and the matrix is a resin.
D.1000005: a MWCNT, and the matrix is a resin.
D.1000105: a MWCNT, a BNNT, and the matrix is a resin.
D.1000015: a MWCNT, a CF, and the matrix is a resin.
D.1000115: a MWCNT, a BNNT, a CF, and the matrix is a resin.
D.1010005: a MWCNT, a GS, and the matrix is a resin.
D.1010105: a MWCNT, a GS, a BNNT, and the matrix is a resin.

D.1010015: a MWCNT, a GS, a CF, and the matrix is a resin.

D.1010115: a MWCNT, a GS, a BNNT, a CF, and the matrix is a resin.

D.1001005: a MWCNT, a BNS, and the matrix is a resin.

D.1001105: a MWCNT, a BNS, a BNNT, and the matrix is a resin.

D.1001015: a MWCNT, a BNS, a CF, and the matrix is a resin.

D.1001115: a MWCNT, a BNS, a BNNT, a CF, and the matrix is a resin.

D.1011005: a MWCNT, a GS, a BNS, and the matrix is a resin.

D.1011105: a MWCNT, a GS, a BNS, a BNNT, and the matrix is a resin.

D.1011015: a MWCNT, a GS, a BNS, a CF, and the matrix is a resin.

D.1011115: a MWCNT, a GS, a BNS, a BNNT, a CF, and the matrix is a resin.

D.0100005: a SWCNT, and the matrix is a resin.

D.0100105: a SWCNT, a BNNT, and the matrix is a resin.

D.0100015: a SWCNT, a CF, and the matrix is a resin.

D.0100115: a SWCNT, a BNNT, a CF, and the matrix is a resin.

D.0110005: a SWCNT, a GS, and the matrix is a resin.

D.0110105: a SWCNT, a GS, a BNNT, and the matrix is a resin.

D.0110015: a SWCNT, a GS, a CF, and the matrix is a resin.

D.0110115: a SWCNT, a GS, a BNNT, a CF, and the matrix is a resin.

D.0101005: a SWCNT, a BNS, and the matrix is a resin.

D.0101105: a SWCNT, a BNS, a BNNT, and the matrix is a resin.

D.0101015: a SWCNT, a BNS, a CF, and the matrix is a resin.

D.0101115: a SWCNT, a BNS, a BNNT, a CF, and the matrix is a resin.

D.0111005: a SWCNT, a GS, a BNS, and the matrix is a resin.

D.0111105: a SWCNT, a GS, a BNS, a BNNT, and the matrix is a resin.

D.0111015: a SWCNT, a GS, a BNS, a CF, and the matrix is a resin.

D.0111115: a SWCNT, a GS, a BNS, a BNNT, a CF, and the matrix is a resin.

D.1100005: a MWCNT, a SWCNT, and the matrix is a resin.

D.1100105: a MWCNT, a SWCNT, a BNNT, and the matrix is a resin.

D.1100015: a MWCNT, a SWCNT, a CF, and the matrix is a resin.

D.1100115: a MWCNT, a SWCNT, a BNNT, a CF, and the matrix is a resin.

D.1110005: a MWCNT, a SWCNT, a GS, and the matrix is a resin.

D.1110105: a MWCNT, a SWCNT, a GS, a BNNT, and the matrix is a resin.

D.1110015: a MWCNT, a SWCNT, a GS, a CF, and the matrix is a resin.

D.1110115: a MWCNT, a SWCNT, a GS, a BNNT, a CF, and the matrix is a resin.

D.1101005: a MWCNT, a SWCNT, a BNS, and the matrix is a resin.

D.1101105: a MWCNT, a SWCNT, a BNS, a BNNT, and the matrix is a resin.

D.1101015: a MWCNT, a SWCNT, a BNS, a CF, and the matrix is a resin.

D.1101115: a MWCNT, a SWCNT, a BNS, a BNNT, a CF, and the matrix is a resin.

D.1111005: a MWCNT, a SWCNT, a GS, a BNS, and the matrix is a resin.

D.1111105: a MWCNT, a SWCNT, a GS, a BNS, a BNNT, and the matrix is a resin.

D.1111015: a MWCNT, a SWCNT, a GS, a BNS, a CF, and the matrix is a resin.

D.1111115: a MWCNT, a SWCNT, a GS, a BNS, a BNNT, a CF, and the matrix is a resin.

D.0000106: a BNNT, and the matrix is a copolymer.

D.0000016: a CF, and the matrix is a copolymer.

D.0000116: a BNNT, a CF, and the matrix is a copolymer.

D.0010006: a GS, and the matrix is a copolymer.

D.0010106: a GS, a BNNT, and the matrix is a copolymer.

D.0010016: a GS, a CF, and the matrix is a copolymer.

D.0010116: a GS, a BNNT, a CF, and the matrix is a copolymer.

D.0001006: a BNS, and the matrix is a copolymer.

D.0001106: a BNS, a BNNT, and the matrix is a copolymer.

D.0001016: a BNS, a CF, and the matrix is a copolymer.

D.0001116: a BNS, a BNNT, a CF, and the matrix is a copolymer.

D.0011006: a GS, a BNS, and the matrix is a copolymer.

D.0011106: a GS, a BNS, a BNNT, and the matrix is a copolymer.

D.0011016: a GS, a BNS, a CF, and the matrix is a copolymer.

D.0011116: a GS, a BNS, a BNNT, a CF, and the matrix is a copolymer.

D.1000006: a MWCNT, and the matrix is a copolymer.

D.1000106: a MWCNT, a BNNT, and the matrix is a copolymer.

D.1000016: a MWCNT, a CF, and the matrix is a copolymer.

D.1000116: a MWCNT, a BNNT, a CF, and the matrix is a copolymer.

D.1010006: a MWCNT, a GS, and the matrix is a copolymer.

D.1010106: a MWCNT, a GS, a BNNT, and the matrix is a copolymer.

D.1010016: a MWCNT, a GS, a CF, and the matrix is a copolymer.

D.1010116: a MWCNT, a GS, a BNNT, a CF, and the matrix is a copolymer.

D.1001006: a MWCNT, a BNS, and the matrix is a copolymer.

D.1001106: a MWCNT, a BNS, a BNNT, and the matrix is a copolymer.

D.1001016: a MWCNT, a BNS, a CF, and the matrix is a copolymer.

D.1001116: a MWCNT, a BNS, a BNNT, a CF, and the matrix is a copolymer.

D.1011006: a MWCNT, a GS, a BNS, and the matrix is a copolymer.

D.1011106: a MWCNT, a GS, a BNS, a BNNT, and the matrix is a copolymer.

D.1011016: a MWCNT, a GS, a BNS, a CF, and the matrix is a copolymer.

D.1011116: a MWCNT, a GS, a BNS, a BNNT, a CF, and the matrix is a copolymer.

D.0100006: a SWCNT, and the matrix is a copolymer.

D.0100106: a SWCNT, a BNNT, and the matrix is a copolymer.

D.0100016: a SWCNT, a CF, and the matrix is a copolymer.

D.0100116: a SWCNT, a BNNT, a CF, and the matrix is a copolymer.

D.0110006: a SWCNT, a GS, and the matrix is a copolymer.

D.0110106: a SWCNT, a GS, a BNNT, and the matrix is a copolymer.

D.0110016: a SWCNT, a GS, a CF, and the matrix is a copolymer.

D.0110116: a SWCNT, a GS, a BNNT, a CF, and the matrix is a copolymer.

D.0101006: a SWCNT, a BNS, and the matrix is a copolymer.

D.0101106: a SWCNT, a BNS, a BNNT, and the matrix is a copolymer.

D.0101016: a SWCNT, a BNS, a CF, and the matrix is a copolymer.

D.0101116: a SWCNT, a BNS, a BNNT, a CF, and the matrix is a copolymer.

D.0111006: a SWCNT, a GS, a BNS, and the matrix is a copolymer.

D.0111106: a SWCNT, a GS, a BNS, a BNNT, and the matrix is a copolymer.

D.0111016: a SWCNT, a GS, a BNS, a CF, and the matrix is a copolymer.

D.0111116: a SWCNT, a GS, a BNS, a BNNT, a CF, and the matrix is a copolymer.

D.1100006: a MWCNT, a SWCNT, and the matrix is a copolymer.

D.1100106: a MWCNT, a SWCNT, a BNNT, and the matrix is a copolymer.

D.1100016: a MWCNT, a SWCNT, a CF, and the matrix is a copolymer.

D.1100116: a MWCNT, a SWCNT, a BNNT, a CF, and the matrix is a copolymer.

D.1110006: a MWCNT, a SWCNT, a GS, and the matrix is a copolymer.

D.1110106: a MWCNT, a SWCNT, a GS, a BNNT, and the matrix is a copolymer.

D.1110016: a MWCNT, a SWCNT, a GS, a CF, and the matrix is a copolymer.

D.1110116: a MWCNT, a SWCNT, a GS, a BNNT, a CF, and the matrix is a copolymer.

D.1101006: a MWCNT, a SWCNT, a BNS, and the matrix is a copolymer.

D.1101106: a MWCNT, a SWCNT, a BNS, a BNNT, and the matrix is a copolymer.

D.1101016: a MWCNT, a SWCNT, a BNS, a CF, and the matrix is a copolymer.

D.1101116: a MWCNT, a SWCNT, a BNS, a BNNT, a CF, and the matrix is a copolymer.

D.1111006: a MWCNT, a SWCNT, a GS, a BNS, and the matrix is a copolymer.

D.1111106: a MWCNT, a SWCNT, a GS, a BNS, a BNNT, and the matrix is a copolymer.

D.1111016: a MWCNT, a SWCNT, a GS, a BNS, a CF, and the matrix is a copolymer.

D.1111116: a MWCNT, a SWCNT, a GS, a BNS, a BNNT, a CF, and the matrix is a copolymer.

D.0000107: a BNNT, and the matrix is a nylon.

D.0000017: a CF, and the matrix is a nylon.

D.0000117: a BNNT, a CF, and the matrix is a nylon.

D.0010007: a GS, and the matrix is a nylon.

D.0010107: a GS, a BNNT, and the matrix is a nylon.

D.0010017: a GS, a CF, and the matrix is a nylon.

D.0010117: a GS, a BNNT, a CF, and the matrix is a nylon.

D.0001007: a BNS, and the matrix is a nylon.

D.0001107: a BNS, a BNNT, and the matrix is a nylon.

D.0001017: a BNS, a CF, and the matrix is a nylon.

D.0001117: a BNS, a BNNT, a CF, and the matrix is a nylon.

D.0011007: a GS, a BNS, and the matrix is a nylon.

D.0011107: a GS, a BNS, a BNNT, and the matrix is a nylon.

D.0011017: a GS, a BNS, a CF, and the matrix is a nylon.

D.0011117: a GS, a BNS, a BNNT, a CF, and the matrix is a nylon.

D.1000007: a MWCNT, and the matrix is a nylon.

D.1000107: a MWCNT, a BNNT, and the matrix is a nylon.

D.1000017: a MWCNT, a CF, and the matrix is a nylon.

D.1000117: a MWCNT, a BNNT, a CF, and the matrix is a nylon.

D.1010007: a MWCNT, a GS, and the matrix is a nylon.

D.1010107: a MWCNT, a GS, a BNNT, and the matrix is a nylon.

D.1010017: a MWCNT, a GS, a CF, and the matrix is a nylon.

D.1010117: a MWCNT, a GS, a BNNT, a CF, and the matrix is a nylon.

D.1001007: a MWCNT, a BNS, and the matrix is a nylon.

D.1001107: a MWCNT, a BNS, a BNNT, and the matrix is a nylon.

D.1001017: a MWCNT, a BNS, a CF, and the matrix is a nylon.

D.1001117: a MWCNT, a BNS, a BNNT, a CF, and the matrix is a nylon.

D.1011007: a MWCNT, a GS, a BNS, and the matrix is a nylon.

D.1011107: a MWCNT, a GS, a BNS, a BNNT, and the matrix is a nylon.

D.1011017: a MWCNT, a GS, a BNS, a CF, and the matrix is a nylon.

D.1011117: a MWCNT, a GS, a BNS, a BNNT, a CF, and the matrix is a nylon.

D.0100007: a SWCNT, and the matrix is a nylon.

D.0100107: a SWCNT, a BNNT, and the matrix is a nylon.

D.0100017: a SWCNT, a CF, and the matrix is a nylon.

D.0100117: a SWCNT, a BNNT, a CF, and the matrix is a nylon.

D.0110007: a SWCNT, a GS, and the matrix is a nylon.

D.0110107: a SWCNT, a GS, a BNNT, and the matrix is a nylon.

D.0110017: a SWCNT, a GS, a CF, and the matrix is a nylon.

D.0110117: a SWCNT, a GS, a BNNT, a CF, and the matrix is a nylon.

D.0101007: a SWCNT, a BNS, and the matrix is a nylon.

D.0101107: a SWCNT, a BNS, a BNNT, and the matrix is a nylon.

D.0101017: a SWCNT, a BNS, a CF, and the matrix is a nylon.

D.0101117: a SWCNT, a BNS, a BNNT, a CF, and the matrix is a nylon.

D.0111007: a SWCNT, a GS, a BNS, and the matrix is a nylon.

D.0111107: a SWCNT, a GS, a BNS, a BNNT, and the matrix is a nylon.

D.0111017: a SWCNT, a GS, a BNS, a CF, and the matrix is a nylon.

D.0111117: a SWCNT, a GS, a BNS, a BNNT, a CF, and the matrix is a nylon.

D.1100007: a MWCNT, a SWCNT, and the matrix is a nylon.

D.1100107: a MWCNT, a SWCNT, a BNNT, and the matrix is a nylon.

D.1100017: a MWCNT, a SWCNT, a CF, and the matrix is a nylon.

D.1100117: a MWCNT, a SWCNT, a BNNT, a CF, and the matrix is a nylon.

D.1110007: a MWCNT, a SWCNT, a GS, and the matrix is a nylon.

D.1110107: a MWCNT, a SWCNT, a GS, a BNNT, and the matrix is a nylon.

D.1110017: a MWCNT, a SWCNT, a GS, a CF, and the matrix is a nylon.

D.1110117: a MWCNT, a SWCNT, a GS, a BNNT, a CF, and the matrix is a nylon.

D.1101007: a MWCNT, a SWCNT, a BNS, and the matrix is a nylon.

D.1101107: a MWCNT, a SWCNT, a BNS, a BNNT, and the matrix is a nylon.

D.1101017: a MWCNT, a SWCNT, a BNS, a CF, and the matrix is a nylon.

D.1101117: a MWCNT, a SWCNT, a BNS, a BNNT, a CF, and the matrix is a nylon.

D.1111007: a MWCNT, a SWCNT, a GS, a BNS, and the matrix is a nylon.

D.1111107: a MWCNT, a SWCNT, a GS, a BNS, a BNNT, and the matrix is a nylon.

D.1111017: a MWCNT, a SWCNT, a GS, a BNS, a CF, and the matrix is a nylon.

D.1111117: a MWCNT, a SWCNT, a GS, a BNS, a BNNT, a CF, and the matrix is a nylon.

D.0000108: a BNNT, and the matrix is a polyamide.

D.0000018: a CF, and the matrix is a polyamide.

D.0000118: a BNNT, a CF, and the matrix is a polyamide.

D.0010008: a GS, and the matrix is a polyamide.

D.0010108: a GS, a BNNT, and the matrix is a polyamide.

D.0010018: a GS, a CF, and the matrix is a polyamide.

D.0010118: a GS, a BNNT, a CF, and the matrix is a polyamide.

D.0001008: a BNS, and the matrix is a polyamide.

D.0001108: a BNS, a BNNT, and the matrix is a polyamide.

D.0001018: a BNS, a CF, and the matrix is a polyamide.

D.0001118: a BNS, a BNNT, a CF, and the matrix is a polyamide.

D.0011008: a GS, a BNS, and the matrix is a polyamide.

D.0011108: a GS, a BNS, a BNNT, and the matrix is a polyamide.

D.0011018: a GS, a BNS, a CF, and the matrix is a polyamide.

D.0011118: a GS, a BNS, a BNNT, a CF, and the matrix is a polyamide.

D.1000008: a MWCNT, and the matrix is a polyamide.

D.1000108: a MWCNT, a BNNT, and the matrix is a polyamide.

D.1000018: a MWCNT, a CF, and the matrix is a polyamide.

D.1000118: a MWCNT, a BNNT, a CF, and the matrix is a polyamide.

D.1010008: a MWCNT, a GS, and the matrix is a polyamide.

D.1010108: a MWCNT, a GS, a BNNT, and the matrix is a polyamide.

D.1010018: a MWCNT, a GS, a CF, and the matrix is a polyamide.

D.1010118: a MWCNT, a GS, a BNNT, a CF, and the matrix is a polyamide.

D.1001008: a MWCNT, a BNS, and the matrix is a polyamide.

D.1001108: a MWCNT, a BNS, a BNNT, and the matrix is a polyamide.

D.1001018: a MWCNT, a BNS, a CF, and the matrix is a polyamide.

D.1001118: a MWCNT, a BNS, a BNNT, a CF, and the matrix is a polyamide.

D.1011008: a MWCNT, a GS, a BNS, and the matrix is a polyamide.

D.1011108: a MWCNT, a GS, a BNS, a BNNT, and the matrix is a polyamide.

D.1011018: a MWCNT, a GS, a BNS, a CF, and the matrix is a polyamide.

D.1011118: a MWCNT, a GS, a BNS, a BNNT, a CF, and the matrix is a polyamide.

D.0100008: a SWCNT, and the matrix is a polyamide.

D.0100108: a SWCNT, a BNNT, and the matrix is a polyamide.

D.0100018: a SWCNT, a CF, and the matrix is a polyamide.

D.0100118: a SWCNT, a BNNT, a CF, and the matrix is a polyamide.

D.0110008: a SWCNT, a GS, and the matrix is a polyamide.

D.0110108: a SWCNT, a GS, a BNNT, and the matrix is a polyamide.

D.0110018: a SWCNT, a GS, a CF, and the matrix is a polyamide.

D.0110118: a SWCNT, a GS, a BNNT, a CF, and the matrix is a polyamide.

D.0101008: a SWCNT, a BNS, and the matrix is a polyamide.

D.0101108: a SWCNT, a BNS, a BNNT, and the matrix is a polyamide.

D.0101018: a SWCNT, a BNS, a CF, and the matrix is a polyamide.

D.0101118: a SWCNT, a BNS, a BNNT, a CF, and the matrix is a polyamide.

D.0111008: a SWCNT, a GS, a BNS, and the matrix is a polyamide.

D.0111108: a SWCNT, a GS, a BNS, a BNNT, and the matrix is a polyamide.

D.0111018: a SWCNT, a GS, a BNS, a CF, and the matrix is a polyamide.

D.0111118: a SWCNT, a GS, a BNS, a BNNT, a CF, and the matrix is a polyamide.

D.1100008: a MWCNT, a SWCNT, and the matrix is a polyamide.

D.1100108: a MWCNT, a SWCNT, a BNNT, and the matrix is a polyamide.

D.1100018: a MWCNT, a SWCNT, a CF, and the matrix is a polyamide.

D.1100118: a MWCNT, a SWCNT, a BNNT, a CF, and the matrix is a polyamide.

D.1110008: a MWCNT, a SWCNT, a GS, and the matrix is a polyamide.

D.1110108: a MWCNT, a SWCNT, a GS, a BNNT, and the matrix is a polyamide.

D.1110018: a MWCNT, a SWCNT, a GS, a CF, and the matrix is a polyamide.

D.1110118: a MWCNT, a SWCNT, a GS, a BNNT, a CF, and the matrix is a polyamide.

D.1101008: a MWCNT, a SWCNT, a BNS, and the matrix is a polyamide.

D.1101108: a MWCNT, a SWCNT, a BNS, a BNNT, and the matrix is a polyamide.

D.1101018: a MWCNT, a SWCNT, a BNS, a CF, and the matrix is a polyamide.

D.1101118: a MWCNT, a SWCNT, a BNS, a BNNT, a CF, and the matrix is a polyamide.

D.1111008: a MWCNT, a SWCNT, a GS, a BNS, and the matrix is a polyamide.

D.1111108: a MWCNT, a SWCNT, a GS, a BNS, a BNNT, and the matrix is a polyamide.

D.1111018: a MWCNT, a SWCNT, a GS, a BNS, a CF, and the matrix is a polyamide.

D.1111118: a MWCNT, a SWCNT, a GS, a BNS, a BNNT, a CF, and the matrix is a polyamide.

D.0000109: a BNNT, and the matrix is a polycarbonate.

D.0000019: a CF, and the matrix is a polycarbonate.

D.0000119: a BNNT, a CF, and the matrix is a polycarbonate.

D.0010009: a GS, and the matrix is a polycarbonate.

D.0010109: a GS, a BNNT, and the matrix is a polycarbonate.

D.0010019: a GS, a CF, and the matrix is a polycarbonate.

D.0010119: a GS, a BNNT, a CF, and the matrix is a polycarbonate.

D.0001009: a BNS, and the matrix is a polycarbonate.

D.0001109: a BNS, a BNNT, and the matrix is a polycarbonate.

D.0001019: a BNS, a CF, and the matrix is a polycarbonate.

D.0001119: a BNS, a BNNT, a CF, and the matrix is a polycarbonate.

D.0011009: a GS, a BNS, and the matrix is a polycarbonate.

D.0011109: a GS, a BNS, a BNNT, and the matrix is a polycarbonate.

D.0011019: a GS, a BNS, a CF, and the matrix is a polycarbonate.

D.0011119: a GS, a BNS, a BNNT, a CF, and the matrix is a polycarbonate.

D.1000009: a MWCNT, and the matrix is a polycarbonate.

D.1000109: a MWCNT, a BNNT, and the matrix is a polycarbonate.

D.1000019: a MWCNT, a CF, and the matrix is a polycarbonate.

D.1000119: a MWCNT, a BNNT, a CF, and the matrix is a polycarbonate.

D.1010009: a MWCNT, a GS, and the matrix is a polycarbonate.

D.1010109: a MWCNT, a GS, a BNNT, and the matrix is a polycarbonate.

D.1010019: a MWCNT, a GS, a CF, and the matrix is a polycarbonate.

D.1010119: a MWCNT, a GS, a BNNT, a CF, and the matrix is a polycarbonate.

D.1001009: a MWCNT, a BNS, and the matrix is a polycarbonate.

D.1001109: a MWCNT, a BNS, a BNNT, and the matrix is a polycarbonate.

D.1001019: a MWCNT, a BNS, a CF, and the matrix is a polycarbonate.

D.1001119: a MWCNT, a BNS, a BNNT, a CF, and the matrix is a polycarbonate.

D.1011009: a MWCNT, a GS, a BNS, and the matrix is a polycarbonate.

D.1011109: a MWCNT, a GS, a BNS, a BNNT, and the matrix is a polycarbonate.

D.1011019: a MWCNT, a GS, a BNS, a CF, and the matrix is a polycarbonate.

D.1011119: a MWCNT, a GS, a BNS, a BNNT, a CF, and the matrix is a polycarbonate.

D.0100009: a SWCNT, and the matrix is a polycarbonate.

D.0100109: a SWCNT, a BNNT, and the matrix is a polycarbonate.

D.0100019: a SWCNT, a CF, and the matrix is a polycarbonate.

D.0100119: a SWCNT, a BNNT, a CF, and the matrix is a polycarbonate.

D.0110009: a SWCNT, a GS, and the matrix is a polycarbonate.

D.0110109: a SWCNT, a GS, a BNNT, and the matrix is a polycarbonate.

D.0110019: a SWCNT, a GS, a CF, and the matrix is a polycarbonate.

D.0110119: a SWCNT, a GS, a BNNT, a CF, and the matrix is a polycarbonate.

D.0101009: a SWCNT, a BNS, and the matrix is a polycarbonate.

D.0101109: a SWCNT, a BNS, a BNNT, and the matrix is a polycarbonate.

D.0101019: a SWCNT, a BNS, a CF, and the matrix is a polycarbonate.

D.0101119: a SWCNT, a BNS, a BNNT, a CF, and the matrix is a polycarbonate.

D.0111009: a SWCNT, a GS, a BNS, and the matrix is a polycarbonate.

D.0111109: a SWCNT, a GS, a BNS, a BNNT, and the matrix is a polycarbonate.

D.0111019: a SWCNT, a GS, a BNS, a CF, and the matrix is a polycarbonate.

D.0111119: a SWCNT, a GS, a BNS, a BNNT, a CF, and the matrix is a polycarbonate.

D.1100009: a MWCNT, a SWCNT, and the matrix is a polycarbonate.

D.1100109: a MWCNT, a SWCNT, a BNNT, and the matrix is a polycarbonate.

D.1100019: a MWCNT, a SWCNT, a CF, and the matrix is a polycarbonate.

D.1100119: a MWCNT, a SWCNT, a BNNT, a CF, and the matrix is a polycarbonate.

D.1110009: a MWCNT, a SWCNT, a GS, and the matrix is a polycarbonate.

D.1110109: a MWCNT, a SWCNT, a GS, a BNNT, and the matrix is a polycarbonate.

D.1110019: a MWCNT, a SWCNT, a GS, a CF, and the matrix is a polycarbonate.

D.1110119: a MWCNT, a SWCNT, a GS, a BNNT, a CF, and the matrix is a polycarbonate.

D.1101009: a MWCNT, a SWCNT, a BNS, and the matrix is a polycarbonate.

D.1101109: a MWCNT, a SWCNT, a BNS, a BNNT, and the matrix is a polycarbonate.

D.1101019: a MWCNT, a SWCNT, a BNS, a CF, and the matrix is a polycarbonate.

D.1101119: a MWCNT, a SWCNT, a BNS, a BNNT, a CF, and the matrix is a polycarbonate.

D.1111009: a MWCNT, a SWCNT, a GS, a BNS, and the matrix is a polycarbonate.

D.1111109: a MWCNT, a SWCNT, a GS, a BNS, a BNNT, and the matrix is a polycarbonate.

D.1111019: a MWCNT, a SWCNT, a GS, a BNS, a CF, and the matrix is a polycarbonate.

D.1111119: a MWCNT, a SWCNT, a GS, a BNS, a BNNT, a CF, and the matrix is a polycarbonate.

D.00001010: a BNNT, and the matrix is a polyethylene.

D.00000110: a CF, and the matrix is a polyethylene.

D.00001110: a BNNT, a CF, and the matrix is a polyethylene.

D.00100010: a GS, and the matrix is a polyethylene.

D.00101010: a GS, a BNNT, and the matrix is a polyethylene.

D.00100110: a GS, a CF, and the matrix is a polyethylene.

D.00101110: a GS, a BNNT, a CF, and the matrix is a polyethylene.

D.00010010: a BNS, and the matrix is a polyethylene.

D.00011010: a BNS, a BNNT, and the matrix is a polyethylene.

D.00010110: a BNS, a CF, and the matrix is a polyethylene.

D.00011110: a BNS, a BNNT, a CF, and the matrix is a polyethylene.

D.00110010: a GS, a BNS, and the matrix is a polyethylene.

D.00111010: a GS, a BNS, a BNNT, and the matrix is a polyethylene.

D.00110110: a GS, a BNS, a CF, and the matrix is a polyethylene.

D.00111110: a GS, a BNS, a BNNT, a CF, and the matrix is a polyethylene.

D.10000010: a MWCNT, and the matrix is a polyethylene.

D.10001010: a MWCNT, a BNNT, and the matrix is a polyethylene.

D.10000110: a MWCNT, a CF, and the matrix is a polyethylene.

D.10001110: a MWCNT, a BNNT, a CF, and the matrix is a polyethylene.

D.10100010: a MWCNT, a GS, and the matrix is a polyethylene.

D.10101010: a MWCNT, a GS, a BNNT, and the matrix is a polyethylene.

D.10100110: a MWCNT, a GS, a CF, and the matrix is a polyethylene.

D.10101110: a MWCNT, a GS, a BNNT, a CF, and the matrix is a polyethylene.

D.10010010: a MWCNT, a BNS, and the matrix is a polyethylene.

D.10011010: a MWCNT, a BNS, a BNNT, and the matrix is a polyethylene.

D.10010110: a MWCNT, a BNS, a CF, and the matrix is a polyethylene.

D.10011110: a MWCNT, a BNS, a BNNT, a CF, and the matrix is a polyethylene.

D.10110010: a MWCNT, a GS, a BNS, and the matrix is a polyethylene.

D.10111010: a MWCNT, a GS, a BNS, a BNNT, and the matrix is a polyethylene.

D.10110110: a MWCNT, a GS, a BNS, a CF, and the matrix is a polyethylene.

D.10111110: a MWCNT, a GS, a BNS, a BNNT, a CF, and the matrix is a polyethylene.

D.01000010: a SWCNT, and the matrix is a polyethylene.

D.01001010: a SWCNT, a BNNT, and the matrix is a polyethylene.

D.01000110: a SWCNT, a CF, and the matrix is a polyethylene.

D.01001110: a SWCNT, a BNNT, a CF, and the matrix is a polyethylene.

D.01100010: a SWCNT, a GS, and the matrix is a polyethylene.

D.01101010: a SWCNT, a GS, a BNNT, and the matrix is a polyethylene.

D.01100110: a SWCNT, a GS, a CF, and the matrix is a polyethylene.

D.01101110: a SWCNT, a GS, a BNNT, a CF, and the matrix is a polyethylene.

D.01010010: a SWCNT, a BNS, and the matrix is a polyethylene.

D.01011010: a SWCNT, a BNS, a BNNT, and the matrix is a polyethylene.

D.01010110: a SWCNT, a BNS, a CF, and the matrix is a polyethylene.

D.01011110: a SWCNT, a BNS, a BNNT, a CF, and the matrix is a polyethylene.

D.01110010: a SWCNT, a GS, a BNS, and the matrix is a polyethylene.

D.01111010: a SWCNT, a GS, a BNS, a BNNT, and the matrix is a polyethylene.

D.01110110: a SWCNT, a GS, a BNS, a CF, and the matrix is a polyethylene.

D.01111110: a SWCNT, a GS, a BNS, a BNNT, a CF, and the matrix is a polyethylene.

D.11000010: a MWCNT, a SWCNT, and the matrix is a polyethylene.

D.11001010: a MWCNT, a SWCNT, a BNNT, and the matrix is a polyethylene.

D.11000110: a MWCNT, a SWCNT, a CF, and the matrix is a polyethylene.

D.11001110: a MWCNT, a SWCNT, a BNNT, a CF, and the matrix is a polyethylene.

D.11100010: a MWCNT, a SWCNT, a GS, and the matrix is a polyethylene.

D.11101010: a MWCNT, a SWCNT, a GS, a BNNT, and the matrix is a polyethylene.

D.11100110: a MWCNT, a SWCNT, a GS, a CF, and the matrix is a polyethylene.

D.11101110: a MWCNT, a SWCNT, a GS, a BNNT, a CF, and the matrix is a polyethylene.

D.11010010: a MWCNT, a SWCNT, a BNS, and the matrix is a polyethylene.

D.11011010: a MWCNT, a SWCNT, a BNS, a BNNT, and the matrix is a polyethylene.

D.11010110: a MWCNT, a SWCNT, a BNS, a CF, and the matrix is a polyethylene.

D.11011110: a MWCNT, a SWCNT, a BNS, a BNNT, a CF, and the matrix is a polyethylene.

D.11110010: a MWCNT, a SWCNT, a GS, a BNS, and the matrix is a polyethylene.

D.11111010: a MWCNT, a SWCNT, a GS, a BNS, a BNNT, and the matrix is a polyethylene.

D.11110110: a MWCNT, a SWCNT, a GS, a BNS, a CF, and the matrix is a polyethylene.

D.11111110: a MWCNT, a SWCNT, a GS, a BNS, a BNNT, a CF, and the matrix is a polyethylene.

D.00001011: a BNNT, and the matrix is a polymer.

D.00000111: a CF, and the matrix is a polymer.

D.00001111: a BNNT, a CF, and the matrix is a polymer.

D.00100011: a GS, and the matrix is a polymer.

D.00101011: a GS, a BNNT, and the matrix is a polymer.

D.00100111: a GS, a CF, and the matrix is a polymer.

D.00101111: a GS, a BNNT, a CF, and the matrix is a polymer.

D.00010011: a BNS, and the matrix is a polymer.

D.00011011: a BNS, a BNNT, and the matrix is a polymer.

D.00010111: a BNS, a CF, and the matrix is a polymer.

D.00011111: a BNS, a BNNT, a CF, and the matrix is a polymer.

D.00110011: a GS, a BNS, and the matrix is a polymer.

D.00111011: a GS, a BNS, a BNNT, and the matrix is a polymer.

D.00110111: a GS, a BNS, a CF, and the matrix is a polymer.

D.00111111: a GS, a BNS, a BNNT, a CF, and the matrix is a polymer.

D.10000011: a MWCNT, and the matrix is a polymer.

D.10001011: a MWCNT, a BNNT, and the matrix is a polymer.

D.10000111: a MWCNT, a CF, and the matrix is a polymer.

D.10001111: a MWCNT, a BNNT, a CF, and the matrix is a polymer.

D.10100011: a MWCNT, a GS, and the matrix is a polymer.

D.10101011: a MWCNT, a GS, a BNNT, and the matrix is a polymer.

D.10100111: a MWCNT, a GS, a CF, and the matrix is a polymer.

D.10101111: a MWCNT, a GS, a BNNT, a CF, and the matrix is a polymer.

D.10010011: a MWCNT, a BNS, and the matrix is a polymer.

D.10011011: a MWCNT, a BNS, a BNNT, and the matrix is a polymer.

D.10010111: a MWCNT, a BNS, a CF, and the matrix is a polymer.

D.10011111: a MWCNT, a BNS, a BNNT, a CF, and the matrix is a polymer.

D.10110011: a MWCNT, a GS, a BNS, and the matrix is a polymer.

D.10111011: a MWCNT, a GS, a BNS, a BNNT, and the matrix is a polymer.

D.10110111: a MWCNT, a GS, a BNS, a CF, and the matrix is a polymer.

D.10111111: a MWCNT, a GS, a BNS, a BNNT, a CF, and the matrix is a polymer.

D.01000011: a SWCNT, and the matrix is a polymer.

D.01001011: a SWCNT, a BNNT, and the matrix is a polymer.

D.01000111: a SWCNT, a CF, and the matrix is a polymer.

D.01001111: a SWCNT, a BNNT, a CF, and the matrix is a polymer.

D.01100011: a SWCNT, a GS, and the matrix is a polymer.

D.01101011: a SWCNT, a GS, a BNNT, and the matrix is a polymer.

D.01100111: a SWCNT, a GS, a CF, and the matrix is a polymer.

D.01101111: a SWCNT, a GS, a BNNT, a CF, and the matrix is a polymer.

D.01010011: a SWCNT, a BNS, and the matrix is a polymer.

D.01011011: a SWCNT, a BNS, a BNNT, and the matrix is a polymer.

D.01010111: a SWCNT, a BNS, a CF, and the matrix is a polymer.

D.01011111: a SWCNT, a BNS, a BNNT, a CF, and the matrix is a polymer.

D.01110011: a SWCNT, a GS, a BNS, and the matrix is a polymer.

D.01111011: a SWCNT, a GS, a BNS, a BNNT, and the matrix is a polymer.

D.01110111: a SWCNT, a GS, a BNS, a CF, and the matrix is a polymer.

D.01111111: a SWCNT, a GS, a BNS, a BNNT, a CF, and the matrix is a polymer.

D.11000011: a MWCNT, a SWCNT, and the matrix is a polymer.

D.11001011: a MWCNT, a SWCNT, a BNNT, and the matrix is a polymer.

D.11000111: a MWCNT, a SWCNT, a CF, and the matrix is a polymer.

D.11001111: a MWCNT, a SWCNT, a BNNT, a CF, and the matrix is a polymer.

D.11100011: a MWCNT, a SWCNT, a GS, and the matrix is a polymer.

D.11101011: a MWCNT, a SWCNT, a GS, a BNNT, and the matrix is a polymer.

D.11100111: a MWCNT, a SWCNT, a GS, a CF, and the matrix is a polymer.

D.11101111: a MWCNT, a SWCNT, a GS, a BNNT, a CF, and the matrix is a polymer.

D.11010011: a MWCNT, a SWCNT, a BNS, and the matrix is a polymer.

D.11011011: a MWCNT, a SWCNT, a BNS, a BNNT, and the matrix is a polymer.

D.11010111: a MWCNT, a SWCNT, a BNS, a CF, and the matrix is a polymer.

D.11011111: a MWCNT, a SWCNT, a BNS, a BNNT, a CF, and the matrix is a polymer.

D.11110011: a MWCNT, a SWCNT, a GS, a BNS, and the matrix is a polymer.

D.11111011: a MWCNT, a SWCNT, a GS, a BNS, a BNNT, and the matrix is a polymer.

D.11110111: a MWCNT, a SWCNT, a GS, a BNS, a CF, and the matrix is a polymer.

D.11111111: a MWCNT, a SWCNT, a GS, a BNS, a BNNT, a CF, and the matrix is a polymer.

D.00001012: a BNNT, and the matrix is a polypropylene.

D.00000112: a CF, and the matrix is a polypropylene.

D.00001112: a BNNT, a CF, and the matrix is a polypropylene.

D.00100012: a GS, and the matrix is a polypropylene.

D.00101012: a GS, a BNNT, and the matrix is a polypropylene.

D.00100112: a GS, a CF, and the matrix is a polypropylene.

D.00101112: a GS, a BNNT, a CF, and the matrix is a polypropylene.

D.00010012: a BNS, and the matrix is a polypropylene.

D.00011012: a BNS, a BNNT, and the matrix is a polypropylene.

D.00010112: a BNS, a CF, and the matrix is a polypropylene.

D.00011112: a BNS, a BNNT, a CF, and the matrix is a polypropylene.

D.00110012: a GS, a BNS, and the matrix is a polypropylene.

D.00111012: a GS, a BNS, a BNNT, and the matrix is a polypropylene.

D.00110112: a GS, a BNS, a CF, and the matrix is a polypropylene.

D.00111112: a GS, a BNS, a BNNT, a CF, and the matrix is a polypropylene.

D.10000012: a MWCNT, and the matrix is a polypropylene.

D.10001012: a MWCNT, a BNNT, and the matrix is a polypropylene.

D.10000112: a MWCNT, a CF, and the matrix is a polypropylene.

D.10001112: a MWCNT, a BNNT, a CF, and the matrix is a polypropylene.

D.10100012: a MWCNT, a GS, and the matrix is a polypropylene.

D.10101012: a MWCNT, a GS, a BNNT, and the matrix is a polypropylene.

D.10100112: a MWCNT, a GS, a CF, and the matrix is a polypropylene.

D.10101112: a MWCNT, a GS, a BNNT, a CF, and the matrix is a polypropylene.

D.10010012: a MWCNT, a BNS, and the matrix is a polypropylene.

D.10011012: a MWCNT, a BNS, a BNNT, and the matrix is a polypropylene.

D.10010112: a MWCNT, a BNS, a CF, and the matrix is a polypropylene.

D.10011112: a MWCNT, a BNS, a BNNT, a CF, and the matrix is a polypropylene.

D.10110012: a MWCNT, a GS, a BNS, and the matrix is a polypropylene.

D.10111012: a MWCNT, a GS, a BNS, a BNNT, and the matrix is a polypropylene.

D.10110112: a MWCNT, a GS, a BNS, a CF, and the matrix is a polypropylene.

D.10111112: a MWCNT, a GS, a BNS, a BNNT, a CF, and the matrix is a polypropylene.

D.01000012: a SWCNT, and the matrix is a polypropylene.

D.01001012: a SWCNT, a BNNT, and the matrix is a polypropylene.

D.01000112: a SWCNT, a CF, and the matrix is a polypropylene.

D.01001112: a SWCNT, a BNNT, a CF, and the matrix is a polypropylene.

D.01100012: a SWCNT, a GS, and the matrix is a polypropylene.

D.01101012: a SWCNT, a GS, a BNNT, and the matrix is a polypropylene.

D.01100112: a SWCNT, a GS, a CF, and the matrix is a polypropylene.

D.01101112: a SWCNT, a GS, a BNNT, a CF, and the matrix is a polypropylene.

D.01010012: a SWCNT, a BNS, and the matrix is a polypropylene.

D.01011012: a SWCNT, a BNS, a BNNT, and the matrix is a polypropylene.

D.01010112: a SWCNT, a BNS, a CF, and the matrix is a polypropylene.

D.01011112: a SWCNT, a BNS, a BNNT, a CF, and the matrix is a polypropylene.

D.01110012: a SWCNT, a GS, a BNS, and the matrix is a polypropylene.

D.01111012: a SWCNT, a GS, a BNS, a BNNT, and the matrix is a polypropylene.

D.01110112: a SWCNT, a GS, a BNS, a CF, and the matrix is a polypropylene.

D.01111112: a SWCNT, a GS, a BNS, a BNNT, a CF, and the matrix is a polypropylene.

D.11000012: a MWCNT, a SWCNT, and the matrix is a polypropylene.

D.11001012: a MWCNT, a SWCNT, a BNNT, and the matrix is a polypropylene.

D.11000112: a MWCNT, a SWCNT, a CF, and the matrix is a polypropylene.

D.11001112: a MWCNT, a SWCNT, a BNNT, a CF, and the matrix is a polypropylene.

D.11100012: a MWCNT, a SWCNT, a GS, and the matrix is a polypropylene.

D.11101012: a MWCNT, a SWCNT, a GS, a BNNT, and the matrix is a polypropylene.

D.11100112: a MWCNT, a SWCNT, a GS, a CF, and the matrix is a polypropylene.

D.11101112: a MWCNT, a SWCNT, a GS, a BNNT, a CF, and the matrix is a polypropylene.

D.11010012: a MWCNT, a SWCNT, a BNS, and the matrix is a polypropylene.

D.11011012: a MWCNT, a SWCNT, a BNS, a BNNT, and the matrix is a polypropylene.

D.11010112: a MWCNT, a SWCNT, a BNS, a CF, and the matrix is a polypropylene.

D.11011112: a MWCNT, a SWCNT, a BNS, a BNNT, a CF, and the matrix is a polypropylene.

D.11110012: a MWCNT, a SWCNT, a GS, a BNS, and the matrix is a polypropylene.

D.11111012: a MWCNT, a SWCNT, a GS, a BNS, a BNNT, and the matrix is a polypropylene.

D.11110112: a MWCNT, a SWCNT, a GS, a BNS, a CF, and the matrix is a polypropylene.

D.11111112: a MWCNT, a SWCNT, a GS, a BNS, a BNNT, a CF, and the matrix is a polypropylene.

D.00001013: a BNNT, and the matrix is a polystyrene.

D.00000113: a CF, and the matrix is a polystyrene.

D.00001113: a BNNT, a CF, and the matrix is a polystyrene.

D.00100013: a GS, and the matrix is a polystyrene.

D.00101013: a GS, a BNNT, and the matrix is a polystyrene.

D.00100113: a GS, a CF, and the matrix is a polystyrene.

D.00101113: a GS, a BNNT, a CF, and the matrix is a polystyrene.

D.00010013: a BNS, and the matrix is a polystyrene.

D.00011013: a BNS, a BNNT, and the matrix is a polystyrene.

D.00010113: a BNS, a CF, and the matrix is a polystyrene.

D.00011113: a BNS, a BNNT, a CF, and the matrix is a polystyrene.

D.00110013: a GS, a BNS, and the matrix is a polystyrene.

D.00111013: a GS, a BNS, a BNNT, and the matrix is a polystyrene.

D.00110113: a GS, a BNS, a CF, and the matrix is a polystyrene.

D.00111113: a GS, a BNS, a BNNT, a CF, and the matrix is a polystyrene.

D.10000013: a MWCNT, and the matrix is a polystyrene.

D.10001013: a MWCNT, a BNNT, and the matrix is a polystyrene.

D.10000113: a MWCNT, a CF, and the matrix is a polystyrene.

D.10001113: a MWCNT, a BNNT, a CF, and the matrix is a polystyrene.

D.10100013: a MWCNT, a GS, and the matrix is a polystyrene.

D.10101013: a MWCNT, a GS, a BNNT, and the matrix is a polystyrene.

D.10100113: a MWCNT, a GS, a CF, and the matrix is a polystyrene.

D.10101113: a MWCNT, a GS, a BNNT, a CF, and the matrix is a polystyrene.

D.10010013: a MWCNT, a BNS, and the matrix is a polystyrene.

D.10011013: a MWCNT, a BNS, a BNNT, and the matrix is a polystyrene.

D.10010113: a MWCNT, a BNS, a CF, and the matrix is a polystyrene.

D.10011113: a MWCNT, a BNS, a BNNT, a CF, and the matrix is a polystyrene.

D.10110013: a MWCNT, a GS, a BNS, and the matrix is a polystyrene.

D.10111013: a MWCNT, a GS, a BNS, a BNNT, and the matrix is a polystyrene.

D.10110113: a MWCNT, a GS, a BNS, a CF, and the matrix is a polystyrene.

D.10111113: a MWCNT, a GS, a BNS, a BNNT, a CF, and the matrix is a polystyrene.

D.01000013: a SWCNT, and the matrix is a polystyrene.

D.01001013: a SWCNT, a BNNT, and the matrix is a polystyrene.

D.01000113: a SWCNT, a CF, and the matrix is a polystyrene.

D.01001113: a SWCNT, a BNNT, a CF, and the matrix is a polystyrene.

D.01100013: a SWCNT, a GS, and the matrix is a polystyrene.

D.01101013: a SWCNT, a GS, a BNNT, and the matrix is a polystyrene.

D.01100113: a SWCNT, a GS, a CF, and the matrix is a polystyrene.

D.01101113: a SWCNT, a GS, a BNNT, a CF, and the matrix is a polystyrene.

D.01010013: a SWCNT, a BNS, and the matrix is a polystyrene.

D.01011013: a SWCNT, a BNS, a BNNT, and the matrix is a polystyrene.

D.01010113: a SWCNT, a BNS, a CF, and the matrix is a polystyrene.

D.01011113: a SWCNT, a BNS, a BNNT, a CF, and the matrix is a polystyrene.

D.01110013: a SWCNT, a GS, a BNS, and the matrix is a polystyrene.

D.01111013: a SWCNT, a GS, a BNS, a BNNT, and the matrix is a polystyrene.

D.01110113: a SWCNT, a GS, a BNS, a CF, and the matrix is a polystyrene.

D.01111113: a SWCNT, a GS, a BNS, a BNNT, a CF, and the matrix is a polystyrene.

D.11000013: a MWCNT, a SWCNT, and the matrix is a polystyrene.

D.11001013: a MWCNT, a SWCNT, a BNNT, and the matrix is a polystyrene.

D.11000113: a MWCNT, a SWCNT, a CF, and the matrix is a polystyrene.

D.11001113: a MWCNT, a SWCNT, a BNNT, a CF, and the matrix is a polystyrene.

D.11100013: a MWCNT, a SWCNT, a GS, and the matrix is a polystyrene.

D.11101013: a MWCNT, a SWCNT, a GS, a BNNT, and the matrix is a polystyrene.

D.11100113: a MWCNT, a SWCNT, a GS, a CF, and the matrix is a polystyrene.

D.11101113: a MWCNT, a SWCNT, a GS, a BNNT, a CF, and the matrix is a polystyrene.

D.11010013: a MWCNT, a SWCNT, a BNS, and the matrix is a polystyrene.

D.11011013: a MWCNT, a SWCNT, a BNS, a BNNT, and the matrix is a polystyrene.

D.11010113: a MWCNT, a SWCNT, a BNS, a CF, and the matrix is a polystyrene.

D.11011113: a MWCNT, a SWCNT, a BNS, a BNNT, a CF, and the matrix is a polystyrene.

D.11110013: a MWCNT, a SWCNT, a GS, a BNS, and the matrix is a polystyrene.

D.11111013: a MWCNT, a SWCNT, a GS, a BNS, a BNNT, and the matrix is a polystyrene.

D.11110113: a MWCNT, a SWCNT, a GS, a BNS, a CF, and the matrix is a polystyrene.

D.11111113: a MWCNT, a SWCNT, a GS, a BNS, a BNNT, a CF, and the matrix is a polystyrene.

D.00001014: a BNNT, and the matrix is an epoxy-based polymer.

D.00000114: a CF, and the matrix is an epoxy-based polymer.

D.00001114: a BNNT, a CF, and the matrix is an epoxy-based polymer.

D.00100014: a GS, and the matrix is an epoxy-based polymer.

D.00101014: a GS, a BNNT, and the matrix is an epoxy-based polymer.

D.00100114: a GS, a CF, and the matrix is an epoxy-based polymer.

D.00101114: a GS, a BNNT, a CF, and the matrix is an epoxy-based polymer.

D.00010014: a BNS, and the matrix is an epoxy-based polymer.

D.00011014: a BNS, a BNNT, and the matrix is an epoxy-based polymer.

D.00010114: a BNS, a CF, and the matrix is an epoxy-based polymer.

D.00011114: a BNS, a BNNT, a CF, and the matrix is an epoxy-based polymer.

D.00110014: a GS, a BNS, and the matrix is an epoxy-based polymer.

D.00111014: a GS, a BNS, a BNNT, and the matrix is an epoxy-based polymer.

D.00110114: a GS, a BNS, a CF, and the matrix is an epoxy-based polymer.

D.00111114: a GS, a BNS, a BNNT, a CF, and the matrix is an epoxy-based polymer.

D.10000014: a MWCNT, and the matrix is an epoxy-based polymer.

D.10001014: a MWCNT, a BNNT, and the matrix is an epoxy-based polymer.

D.10000114: a MWCNT, a CF, and the matrix is an epoxy-based polymer.

D.10001114: a MWCNT, a BNNT, a CF, and the matrix is an epoxy-based polymer.

D.10100014: a MWCNT, a GS, and the matrix is an epoxy-based polymer.

D.10101014: a MWCNT, a GS, a BNNT, and the matrix is an epoxy-based polymer.

D.10100114: a MWCNT, a GS, a CF, and the matrix is an epoxy-based polymer.

D.10101114: a MWCNT, a GS, a BNNT, a CF, and the matrix is an epoxy-based polymer.

D.10010014: a MWCNT, a BNS, and the matrix is an epoxy-based polymer.

D.10011014: a MWCNT, a BNS, a BNNT, and the matrix is an epoxy-based polymer.

D.10010114: a MWCNT, a BNS, a CF, and the matrix is an epoxy-based polymer.

D.10011114: a MWCNT, a BNS, a BNNT, a CF, and the matrix is an epoxy-based polymer.

D.10110014: a MWCNT, a GS, a BNS, and the matrix is an epoxy-based polymer.

D.10111014: a MWCNT, a GS, a BNS, a BNNT, and the matrix is an epoxy-based polymer.

D.10110114: a MWCNT, a GS, a BNS, a CF, and the matrix is an epoxy-based polymer.

D.10111114: a MWCNT, a GS, a BNS, a BNNT, a CF, and the matrix is an epoxy-based polymer.

D.01000014: a SWCNT, and the matrix is an epoxy-based polymer.

D.01001014: a SWCNT, a BNNT, and the matrix is an epoxy-based polymer.

D.01000114: a SWCNT, a CF, and the matrix is an epoxy-based polymer.

D.01001114: a SWCNT, a BNNT, a CF, and the matrix is an epoxy-based polymer.

D.01100014: a SWCNT, a GS, and the matrix is an epoxy-based polymer.

D.01101014: a SWCNT, a GS, a BNNT, and the matrix is an epoxy-based polymer.

D.01100114: a SWCNT, a GS, a CF, and the matrix is an epoxy-based polymer.

D.01101114: a SWCNT, a GS, a BNNT, a CF, and the matrix is an epoxy-based polymer.

D.01010014: a SWCNT, a BNS, and the matrix is an epoxy-based polymer.

D.01011014: a SWCNT, a BNS, a BNNT, and the matrix is an epoxy-based polymer.

D.01010114: a SWCNT, a BNS, a CF, and the matrix is an epoxy-based polymer.

D.01011114: a SWCNT, a BNS, a BNNT, a CF, and the matrix is an epoxy-based polymer.

D.01110014: a SWCNT, a GS, a BNS, and the matrix is an epoxy-based polymer.

D.01111014: a SWCNT, a GS, a BNS, a BNNT, and the matrix is an epoxy-based polymer.

D.01110114: a SWCNT, a GS, a BNS, a CF, and the matrix is an epoxy-based polymer.

D.01111114: a SWCNT, a GS, a BNS, a BNNT, a CF, and the matrix is an epoxy-based polymer.

D.11000014: a MWCNT, a SWCNT, and the matrix is an epoxy-based polymer.

D.11001014: a MWCNT, a SWCNT, a BNNT, and the matrix is an epoxy-based polymer.

D.11000114: a MWCNT, a SWCNT, a CF, and the matrix is an epoxy-based polymer.

D.11001114: a MWCNT, a SWCNT, a BNNT, a CF, and the matrix is an epoxy-based polymer.

D.11100014: a MWCNT, a SWCNT, a GS, and the matrix is an epoxy-based polymer.

D.11101014: a MWCNT, a SWCNT, a GS, a BNNT, and the matrix is an epoxy-based polymer.

D.11100114: a MWCNT, a SWCNT, a GS, a CF, and the matrix is an epoxy-based polymer.

D.11101114: a MWCNT, a SWCNT, a GS, a BNNT, a CF, and the matrix is an epoxy-based polymer.

D.11010014: a MWCNT, a SWCNT, a BNS, and the matrix is an epoxy-based polymer.

D.11011014: a MWCNT, a SWCNT, a BNS, a BNNT, and the matrix is an epoxy-based polymer.

D.11010114: a MWCNT, a SWCNT, a BNS, a CF, and the matrix is an epoxy-based polymer.

D.11011114: a MWCNT, a SWCNT, a BNS, a BNNT, a CF, and the matrix is an epoxy-based polymer.

D.11110014: a MWCNT, a SWCNT, a GS, a BNS, and the matrix is an epoxy-based polymer.

D.11111014: a MWCNT, a SWCNT, a GS, a BNS, a BNNT, and the matrix is an epoxy-based polymer.

D.11110114: a MWCNT, a SWCNT, a GS, a BNS, a CF, and the matrix is an epoxy-based polymer.

D.11111114: a MWCNT, a SWCNT, a GS, a BNS, a BNNT, a CF, and the matrix is an epoxy-based polymer.

D.00001015: a BNNT, and the matrix is a polyethylene teraphtalate.

D.00000115: a CF, and the matrix is a polyethylene terephtalate.

D.00001115: a BNNT, a CF, and the matrix is a polyethylene terephtalate.

D.00100015: a GS, and the matrix is a polyethylene terephtalate.

D.00101015: a GS, a BNNT, and the matrix is a polyethylene terephtalate.

D.00100115: a GS, a CF, and the matrix is a polyethylene terephtalate.

D.00101115: a GS, a BNNT, a CF, and the matrix is a polyethylene terephtalate.

D.00010015: a BNS, and the matrix is a polyethylene terephtalate.

D.00011015: a BNS, a BNNT, and the matrix is a polyethylene terephtalate.

D.00010115: a BNS, a CF, and the matrix is a polyethylene terephtalate.

D.00011115: a BNS, a BNNT, a CF, and the matrix is a polyethylene terephtalate.

D.00110015: a GS, a BNS, and the matrix is a polyethylene terephtalate.

D.00111015: a GS, a BNS, a BNNT, and the matrix is a polyethylene terephtalate.

D.00110115: a GS, a BNS, a CF, and the matrix is a polyethylene terephtalate.

D.00111115: a GS, a BNS, a BNNT, a CF, and the matrix is a polyethylene terephtalate.

D.10000015: a MWCNT, and the matrix is a polyethylene terephtalate.

D.10001015: a MWCNT, a BNNT, and the matrix is a polyethylene terephtalate.

D.10000115: a MWCNT, a CF, and the matrix is a polyethylene terephtalate.

D.10001115: a MWCNT, a BNNT, a CF, and the matrix is a polyethylene terephtalate.

D.10100015: a MWCNT, a GS, and the matrix is a polyethylene terephtalate.

D.10101015: a MWCNT, a GS, a BNNT, and the matrix is a polyethylene terephtalate.

D.10100115: a MWCNT, a GS, a CF, and the matrix is a polyethylene terephtalate.

D.10101115: a MWCNT, a GS, a BNNT, a CF, and the matrix is a polyethylene terephtalate.

D.10010015: a MWCNT, a BNS, and the matrix is a polyethylene terephtalate.

D.10011015: a MWCNT, a BNS, a BNNT, and the matrix is a polyethylene terephtalate.

D.10010115: a MWCNT, a BNS, a CF, and the matrix is a polyethylene terephtalate.

D.10011115: a MWCNT, a BNS, a BNNT, a CF, and the matrix is a polyethylene terephtalate.

D.10110015: a MWCNT, a GS, a BNS, and the matrix is a polyethylene terephtalate.

D.10111015: a MWCNT, a GS, a BNS, a BNNT, and the matrix is a polyethylene terephtalate.

D.10110115: a MWCNT, a GS, a BNS, a CF, and the matrix is a polyethylene terephtalate.

D.10111115: a MWCNT, a GS, a BNS, a BNNT, a CF, and the matrix is a polyethylene terephtalate.

D.01000015: a SWCNT, and the matrix is a polyethylene terephtalate.

D.01001015: a SWCNT, a BNNT, and the matrix is a polyethylene terephtalate.

D.01000115: a SWCNT, a CF, and the matrix is a polyethylene terephtalate.

D.01001115: a SWCNT, a BNNT, a CF, and the matrix is a polyethylene terephtalate.

D.01100015: a SWCNT, a GS, and the matrix is a polyethylene terephtalate.

D.01101015: a SWCNT, a GS, a BNNT, and the matrix is a polyethylene terephtalate.

D.01100115: a SWCNT, a GS, a CF, and the matrix is a polyethylene terephtalate.

D.01101115: a SWCNT, a GS, a BNNT, a CF, and the matrix is a polyethylene terephtalate.

D.01010015: a SWCNT, a BNS, and the matrix is a polyethylene terephtalate.

D.01011015: a SWCNT, a BNS, a BNNT, and the matrix is a polyethylene terephtalate.

D.01010115: a SWCNT, a BNS, a CF, and the matrix is a polyethylene terephtalate.

D.01011115: a SWCNT, a BNS, a BNNT, a CF, and the matrix is a polyethylene terephtalate.

D.01110015: a SWCNT, a GS, a BNS, and the matrix is a polyethylene terephtalate.

D.01111015: a SWCNT, a GS, a BNS, a BNNT, and the matrix is a polyethylene terephtalate.

D.01110115: a SWCNT, a GS, a BNS, a CF, and the matrix is a polyethylene terephtalate.

D.01111115: a SWCNT, a GS, a BNS, a BNNT, a CF, and the matrix is a polyethylene terephtalate.

D.11000015: a MWCNT, a SWCNT, and the matrix is a polyethylene terephtalate.

D.11001015: a MWCNT, a SWCNT, a BNNT, and the matrix is a polyethylene terephtalate.

D.11000115: a MWCNT, a SWCNT, a CF, and the matrix is a polyethylene terephtalate.

D.11001115: a MWCNT, a SWCNT, a BNNT, a CF, and the matrix is a polyethylene terephtalate.

D.11100015: a MWCNT, a SWCNT, a GS, and the matrix is a polyethylene terephtalate.

D.11101015: a MWCNT, a SWCNT, a GS, a BNNT, and the matrix is a polyethylene terephtalate.

D.11100115: a MWCNT, a SWCNT, a GS, a CF, and the matrix is a polyethylene terephtalate.

D.11101115: a MWCNT, a SWCNT, a GS, a BNNT, a CF, and the matrix is a polyethylene terephtalate.

D.11010015: a MWCNT, a SWCNT, a BNS, and the matrix is a polyethylene terephtalate.

D.11011015: a MWCNT, a SWCNT, a BNS, a BNNT, and the matrix is a polyethylene terephtalate.

D.11010115: a MWCNT, a SWCNT, a BNS, a CF, and the matrix is a polyethylene terephtalate.

D.11011115: a MWCNT, a SWCNT, a BNS, a BNNT, a CF, and the matrix is a polyethylene terephtalate.

D.11110015: a MWCNT, a SWCNT, a GS, a BNS, and the matrix is a polyethylene terephtalate.

D.11111015: a MWCNT, a SWCNT, a GS, a BNS, a BNNT, and the matrix is a polyethylene terephtalate.

D.11110115: a MWCNT, a SWCNT, a GS, a BNS, a CF, and the matrix is a polyethylene terephtalate.

D.11111115: a MWCNT, a SWCNT, a GS, a BNS, a BNNT, a CF, and the matrix is a polyethylene terephtalate.

D.00001016: a BNNT, and the matrix is a polyvinylchloride.

D.00000116: a CF, and the matrix is a polyvinylchloride.

D.00001116: a BNNT, a CF, and the matrix is a polyvinylchloride.

D.00100016: a GS, and the matrix is a polyvinylchloride.

D.00101016: a GS, a BNNT, and the matrix is a polyvinylchloride.

D.00100116: a GS, a CF, and the matrix is a polyvinylchloride.

D.00101116: a GS, a BNNT, a CF, and the matrix is a polyvinylchloride.

D.00010016: a BNS, and the matrix is a polyvinylchloride.

D.00011016: a BNS, a BNNT, and the matrix is a polyvinylchloride.

D.00010116: a BNS, a CF, and the matrix is a polyvinylchloride.

D.00011116: a BNS, a BNNT, a CF, and the matrix is a polyvinylchloride.

D.00110016: a GS, a BNS, and the matrix is a polyvinylchloride.

D.00111016: a GS, a BNS, a BNNT, and the matrix is a polyvinylchloride.

D.00110116: a GS, a BNS, a CF, and the matrix is a polyvinylchloride.

D.00111116: a GS, a BNS, a BNNT, a CF, and the matrix is a polyvinylchloride.

D.10000016: a MWCNT, and the matrix is a polyvinylchloride.

D.10001016: a MWCNT, a BNNT, and the matrix is a polyvinylchloride.

D.10000116: a MWCNT, a CF, and the matrix is a polyvinylchloride.

D.10001116: a MWCNT, a BNNT, a CF, and the matrix is a polyvinylchloride.

D.10100016: a MWCNT, a GS, and the matrix is a polyvinylchloride.

D.10101016: a MWCNT, a GS, a BNNT, and the matrix is a polyvinylchloride.

D.10100116: a MWCNT, a GS, a CF, and the matrix is a polyvinylchloride.

D.10101116: a MWCNT, a GS, a BNNT, a CF, and the matrix is a polyvinylchloride.

D.10010016: a MWCNT, a BNS, and the matrix is a polyvinylchloride.

D.10011016: a MWCNT, a BNS, a BNNT, and the matrix is a polyvinylchloride.

D.10010116: a MWCNT, a BNS, a CF, and the matrix is a polyvinylchloride.

D.10011116: a MWCNT, a BNS, a BNNT, a CF, and the matrix is a polyvinylchloride.

D.10110016: a MWCNT, a GS, a BNS, and the matrix is a polyvinylchloride.

D.10111016: a MWCNT, a GS, a BNS, a BNNT, and the matrix is a polyvinylchloride.

D.10110116: a MWCNT, a GS, a BNS, a CF, and the matrix is a polyvinylchloride.

D.10111116: a MWCNT, a GS, a BNS, a BNNT, a CF, and the matrix is a polyvinylchloride.

D.01000016: a SWCNT, and the matrix is a polyvinylchloride.

D.01001016: a SWCNT, a BNNT, and the matrix is a polyvinylchloride.

D.01000116: a SWCNT, a CF, and the matrix is a polyvinylchloride.

D.01001116: a SWCNT, a BNNT, a CF, and the matrix is a polyvinylchloride.

D.01100016: a SWCNT, a GS, and the matrix is a polyvinylchloride.

D.01101016: a SWCNT, a GS, a BNNT, and the matrix is a polyvinylchloride.

D.01100116: a SWCNT, a GS, a CF, and the matrix is a polyvinylchloride.

D.01101116: a SWCNT, a GS, a BNNT, a CF, and the matrix is a polyvinylchloride.

D.01010016: a SWCNT, a BNS, and the matrix is a polyvinylchloride.

D.01011016: a SWCNT, a BNS, a BNNT, and the matrix is a polyvinylchloride.

D.01010116: a SWCNT, a BNS, a CF, and the matrix is a polyvinylchloride.

D.01011116: a SWCNT, a BNS, a BNNT, a CF, and the matrix is a polyvinylchloride.

D.01110016: a SWCNT, a GS, a BNS, and the matrix is a polyvinylchloride.

D.01111016: a SWCNT, a GS, a BNS, a BNNT, and the matrix is a polyvinylchloride.

D.01110116: a SWCNT, a GS, a BNS, a CF, and the matrix is a polyvinylchloride.

D.01111116: a SWCNT, a GS, a BNS, a BNNT, a CF, and the matrix is a polyvinylchloride.

D.11000016: a MWCNT, a SWCNT, and the matrix is a polyvinylchloride.

D.11001016: a MWCNT, a SWCNT, a BNNT, and the matrix is a polyvinylchloride.

D.11000116: a MWCNT, a SWCNT, a CF, and the matrix is a polyvinylchloride.

D.11001116: a MWCNT, a SWCNT, a BNNT, a CF, and the matrix is a polyvinylchloride.

D.11100016: a MWCNT, a SWCNT, a GS, and the matrix is a polyvinylchloride.

D.11101016: a MWCNT, a SWCNT, a GS, a BNNT, and the matrix is a polyvinylchloride.

D.11100116: a MWCNT, a SWCNT, a GS, a CF, and the matrix is a polyvinylchloride.

D.11101116: a MWCNT, a SWCNT, a GS, a BNNT, a CF, and the matrix is a polyvinylchloride.

D.11010016: a MWCNT, a SWCNT, a BNS, and the matrix is a polyvinylchloride.

D.11011016: a MWCNT, a SWCNT, a BNS, a BNNT, and the matrix is a polyvinylchloride.

D.11010116: a MWCNT, a SWCNT, a BNS, a CF, and the matrix is a polyvinylchloride.

D.11011116: a MWCNT, a SWCNT, a BNS, a BNNT, a CF, and the matrix is a polyvinylchloride.

D.11110016: a MWCNT, a SWCNT, a GS, a BNS, and the matrix is a polyvinylchloride.

D.11111016: a MWCNT, a SWCNT, a GS, a BNS, a BNNT, and the matrix is a polyvinylchloride.

D.11110116: a MWCNT, a SWCNT, a GS, a BNS, a CF, and the matrix is a polyvinylchloride.

D.11111116: a MWCNT, a SWCNT, a GS, a BNS, a BNNT, a CF, and the matrix is a polyvinylchloride.

Desired Characteristics of Composite Materials Described Herein.

For any characteristics of composite material mentioned above and below, and in each characteristic's entire range, further characteristics of the composite material that are of importance in the present invention are the crystallinity of the matrix material, stiffness, electrical conductivity, thermal conductivity, color, fluorescence, luminescence, UV protective capability, abrasion resistance, ductility, elasticity, flexibility, energy storage capability (energy storage as heat or kinetic energy), information storage capability, hydrophilicity, hydrophobicity, polarity, aproticity, and charge, as well as the following characteristics where the unit of measure is indicated after each characteristic: Arc Resistance, sec; Impact Strength, Charpy, J/cm; Impact Strength, Izod Notched, J/cm; Impact Strength, Izod Unnotched, J/cm; Impact Strength, Charpy Notched Low Temp, J/cm; Impact Strength, Izod Notched Low Temp, J/cm; Impact Strength, Charpy Unnotched Low Temp, J/cm; Impact Strength, Charpy Unnotched, J/cm; Linear Mold Shrinkage, cm/cm; Maximum Service Temperature, Air; Melt Flow, g/10 min; Melting Point; Modulus of Elasticity, GPa; Moisture Absorption at Equilibrium, %; Oxygen Transmission, cc-mm/m; Poisson's Ratio; Processing Temperature; Surface Resistance, ohm; Tensile Strength, Ultimate, MPa; Tensile Strength, Yield, MPa; Thermal Conductivity, W/m-K; UL RTI, Electrical; UL RTI, Mechanical with Impact; UL RTI, Mechanical without Impact; Vicat Softening Point; Water Absorption, %; Coefficient of Friction; Comparative Tracking Index, V; Compressive Yield Strength, MPa; CTE, linear 20; Deflection Temperature at 0.46 MPa; Deflection Temperature at 1.8 MPa; Density, g/cc; Dielectric Constant; Dielectric Constant, Low Frequency; Dielectric Strength, kV/mm; Dissipation Factor; Dissipation Factor, Low Frequency; Electrical Resistivity, ohm-cm; Elongation @ break, %; Flammability, UL94; Flexural Modulus, GPa; Flexural Yield Strength, MPa; Glass Temperature; Hardness, Barcol; Hardness, Rockwell E; Hardness, Rockwell M; Hardness, Rockwell R; Hardness, Shore A; Hardness, Shore D; Heat Capacity, J/g.

Depending on the application, composite material with a low, medium, or high degree of each of these characteristics is preferable in the present invention.

Composite Material.

The composite materials of the present invention may have a number of characteristics. One such characteristic is the number of different CMUs in the composite.

Number of different CMUs in the composite. The composite may comprise 2 or more different CMUs, preferably 3 or more, such as 4 or more, 5 or more, 6 or more, 7 or more, 8 or more, 9 or more, 10 or more, 15 or more, 20 or more, 30 or more or 50 or more different CMUs.

For any characteristics of a composite material mentioned above, and in each characteristic's entire range, a further characteristic of importance is the number of different SEs in the composite.

Number of different SEs in the composite. The composite may comprise 2 or more different SE, preferably 3 or more, such as 4 or more, 5 or more, 6 or more, 7 or more, 8 or more, 9 or more, 10 or more, 15 or more, 20 or more, 30 or more or 50 or more different SEs.

For any characteristics of a composite material mentioned above, and in each characteristic's entire range, a further characteristic of importance is the melting point of the composite material.

Melting point of composite material. The melting point of the composite material is an important parameter and in some cases, such as ceramic brakes for automobiles, aircrafts and trains, a high melting point is desired. Thus, depending on the context, the melting point of the composite material is preferably greater than −20° C., such as greater than 0° C., such as greater than 50° C., such as greater than 100° C., such as greater than 200° C., such as greater than 400° C., such as greater than 600° C., such as greater than 800° C., such as greater than 1,000° C., such as greater than 1,500° C., such as greater than 2,000° C., such as greater than 3,000° C., such as greater than 4,000° C., such as greater than 6,000° C., such as greater than 8,000° C.

In other cases, a composite material's flexibility at low temperatures is important, wherefore a low melting point may be advantageous. Thus, depending on the context, the melting point of the composite material is preferably less than 8,000° C., such as less than 6,000° C., such as less than 4,000° C., such as less than 3,000° C., such as less than 2,000° C., such as less than 1,500° C., such as less than 1,000° C., such as less than 800° C., such as less than 600° C., such as less than 400° C., such as less than 200° C., such as less than 100° C., such as less than 50° C., such as less than 0° C., such as less than −20° C.

Composite materials may have melting points below 0° C., such as between −20° C. and 0° C.; or may be higher, such as between 0° C. and 50° C., or between 50° C. and 100° C., or between 100° C. and 200° C., or between 200° C. and 300° C., or between 300° C. and 400° C., or between 400° C. and 500° C., or between 500° C. and 600° C., or between 600° C. and 700° C., or between 700° C. and 800° C., or between 800° C. and 900° C., or between 900° C. and 1,000° C., or between 1,000° C. and 1,100° C., or between 1,000° C. and 1,200° C., or between 1,200° C. and 1,400° C., or between 1,400° C. and 1,600° C., or between 1,600° C. and 1,800° C., or between 1,800° C. and 2,000° C., or between 2,000° C. and 2,200° C., or between 2,200° C. and 2,400° C., or between 2,400° C. and 2,600° C., or between 2,600° C. and 2,800° C., or between 2,800° C. and 3,000° C., or between 3,000° C. and 3,200° C., or between 3,200° C. and 3,400° C., or between 3,400° C. and 3,600° C., or between 3,600° C. and 3,800° C., or between 3,800° C. and 4,000° C., or between 4,000° C. and 4,200° C., or between 4,200° C. and 4,400° C., or between 4,400° C. and 4,600° C., or between 4,600° C. and 4,800° C., or between 4,800° C. and 5,000° C., or between 5,000° C. and 5,200° C., or between 5,200° C. and 5,400° C., or between 5,400° C. and 5,600° C., or between 5,600° C. and 5,800° C., or between 5,800° C. and 6,000° C., or between 6,000° C. and 6,200° C., or between 6,200° C. and 6,400° C., or between 6,400° C. and 6,600° C., or between 6,600° C. and 6,800° C., or between 6,800° C. and 7,000° C., or between 7,000° C. and 7,200° C., or between 7,200° C. and 7,400° C., or between 7,400° C. and 7,600° C., or between 7,600° C. and 7,800° C., or between 7,800° C. and 8,000° C., or between 8,000° C. and 8,200° C., or between 8,400° C. and 8,600° C., or between 8,600° C. and 8,800° C., or between 8,800° C. and 9,000° C., or between 9,000° C. and 9,200° C., or between 9,200° C. and 9,400° C., or between 9,400° C. and 9,600° C., or between 9,600° C. and 9,800° C., or between 9,800° C. and 10,000° C., or between 10,000° C. and 11,000° C., or between 11,000° C. and 12,000° C., or between 12,000° C. and 13,000° C., or between 13,000° C. and 14,000° C., or between 14,000° C. and 15,000° C., or between 15,000° C. and 16,000° C., or between 16,000° C. and 17,000° C., or between 17,000° C. and 18,000° C., or between 18,000° C. and 19,000° C., or between 19,000° C. and 20,000° C., or above 20,000° C.

For any characteristics of a composite material mentioned above, and in each characteristic's entire range, a further characteristic of importance is the density and strength of the composite material.

Density and Strength of the composite material. For certain applications, for example in the airplane or automotive industry, the strength and density of the composite material is of prime importance. Often, both low density and high strength is desired. However, as these two parameters often are opposing factors, a compromise will have to be made. Therefore, sometimes a high density is acceptable to gain strength, such as high tensile strength or large Young's Modulus. In other cases, low density is necessary, even if lower strength results. Thus, in preferred embodiments the composite material may have relatively low Young's modulus or low tensile strength, and in other preferred embodiments the composite material has large Young's modulus or large tensile strength; and likewise, in preferred embodiments the density can vary from very small to very large.

The specific density of composite materials of the present invention may be lower than 0.01 kg/L, but may also include specific densities in the following ranges: 0.01-0.1 kg/L; 0.1-0.4 kg/L; 0.4-0.6 kg/L; 0.6-0.8 kg/L; 0.8-1 kg/L; 1-1.2 kg/L; 1.2-1.4 kg/L; 1.4-1.6 kg/L; 1.6-1.8 kg/L; 1.8-2 kg/L; 2-2.5 kg/L; 2.5-3 kg/L; 3-3.5 kg/L; 3.5-4 kg/L; 4-4.5 kg/L; 4.5-5 kg/L; 5-5.5 kg/L; 5.5-6 kg/L; 6-6.5 kg/L; 6.5-7 kg/L; 7-7.5 kg/L; 7.5-8 kg/L; 8-8.5 kg/L; 8.5-9 kg/L; 9-9.5 kg/L; 9.5-10 kg/L; 10-11 kg/L; 11-12 kg/L; 12-13 kg/L; 13-14 kg/L; 14-16 kg/L; 16-20 kg/L; 20-30 kg/L; or above 30 kg/L.

In some cases high specific densities are preferred. This may be the case when the composite material is e.g. an anchor, as an anchor should rest heavily on the bottom. Thus, depending on the context, the specific density is preferably greater than 0.01 kg/L, such as greater than 0.05 kg/L, such as greater than 0.2 kg/L, such as greater than 0.4 kg/L, such as greater than 0.6 kg/L, such as greater than 0.8 kg/L, such as greater than 1 kg/L, such as greater than 1.2 kg/L, such as greater than 1.5 kg/L, such as greater than 2 kg/L, such as greater than 4 kg/L, such as greater than 6 kg/L, such as greater than 8 kg/L, such as greater than 10 kg/L, such as greater than 12 kg/L, such as greater than 14 kg/L, such as greater than 16 kg/L, such as greater than 20 kg/L, such as greater than 30 kg/L.

In many cases low specific density is preferred. This is for example the case if the composite material is used to make ships that must float on the water, wherefore the weight must be minimized. Thus, depending on the context, the specific density is preferably less than 30 kg/L, such as less than 20 kg/L, such as less than 16 kg/L, such as less than 14 kg/L, such as less than 12 kg/L, such as less than 10 kg/L, such as less than 8 kg/L, such as less than 6 kg/L, such as less than 4 kg/L, such as less than 2 kg/L, such as less than 1.5 kg/L, such as less than 1.2 kg/L, such as less than 1 kg/L, such as less than 0.8 kg/L, such as less than 0.6 kg/L, such as less than 0.4 kg/L, such as less than 0.2 kg/L, such as less than 0.05 kg/L, such as less than 0.01 kg/L.

The Young's modulus of composite materials. In the majority of applications of composite materials, a high Young's modulus is preferred, as this will allow the material to recover its original shape after force has been applied to the material. Thus, depending on the context, the Young's modulus is preferably greater than 0.001 TPa, such as greater than 0.01 TPa, such as greater than 0.1 TPa, such as greater than 0.15 TPa, such as greater than 0.2 TPa, such as greater than 0.5 TPa, such as greater than 1 TPa, such as greater than 2 TPa, such as greater than 4 TPa, such as greater than 6 TPa, such as greater than 8 TPa, such as greater than 10 TPa.

However, in a few applications, a low Young's modulus is desirable. This is for example the case when the degree of deformation of a composite material is being used as a measure of how much force was applied to the material. Thus, depending on the context, the Young's modulus is preferably less than 10 TPa, such as less than 8 TPa, such as less than 6 TPa, such as less than 4 TPa, such as less than 2 TPa, such as less than 1 TPa, such as less than 0.5 TPa, such as less than 0.2 TPa, such as less than 0.15 TPa, such as less than 0.1 TPa, such as less than 0.01 TPa, such as less than 0.01 TPa.

The Young's modulus of composite materials suitable for the present invention can thus be lower than 0.001 TPa, but may also include SEs with Young's Modulus in the following ranges: 0.001-0.01 TPa; 0.01-0.03 TPa; 0.03-0.05 TPa; 0.05-0.07 TPa; 0.07-0.09 TPa; 0.09-0.1 TPa; 0.1-0.11 TPa; 0.11-0.12 TPa; 0.12-0.13 TPa; 0.13-0.14 TPa; 0.14-0.15 TPa; 0.15-0.16 TPa; 0.16-0.17 TPa; 0.17-0.18 TPa; 0.18-0.19 TPa; 0.19-0.20 TPa; 0.20-0.22 TPa (e.g. stainless steel); 0.22-0.25 TPa; 0.25-0.30 TPa; 0.30-0.35 TPa; 0.35-0.40 TPa; 0.40-0.45 TPa; 0.45-0.50 TPa; 0.50-0.60 TPa; 0.60-0.80 TPa; 0.80-1.0 TPa; 1-2 TPa (e.g. single-walled carbon nanotubes); 2-3 TPa; 3-4 TPa; 4-5 TPa; 5-7 TPa; 7-10 TPa; or above 10 TPA.

Preferred tensile strength of composite materials is in most cases high, as this is suitable for a large number of applications, e.g. stronger fishing lines and stronger cables. Thus, depending on the context, the tensile strength of the composite material is preferably greater than 0.01 GPa, such as greater than 0.05 GPa, such as greater than 0.1 GPa, such as greater than 0.5 GPa, such as greater than 1 GPa, such as greater than 2 GPa, such as greater than 3 GPa, such as greater than 5 GPa, such as greater than 10 GPa, such as greater than 20 GPa, such as greater than 30 GPa, such as greater than 40 GPa, such as greater than 60 GPa, such as greater than 80 GPa, such as greater than 100 GPa, such as greater than 200 GPa.

However, in some cases a low tensile strength is advantageous, for example in cables or lines that must break for safety reasons, in order to avoid damage to individuals. Thus, depending on the context, the tensile strength of the composite material is preferably less than 200 GPa, such as less than 100 GPa, such as less than 80 GPa, such as less than 60 GPa, such as less than 40 GPa, such as less than 30 GPa, such as less than 20 GPa, such as less than 10 GPa, such as less than 5 GPa, such as less than 3 GPa, such as less than 2 GPa, such as less than 1 GPa, such as less than 0.5 GPa, such as less than 0.1 GPa, such as less than 0.05 GPa, such as less than 0.01 GPa.

The tensile strength for composite materials suitable for the present invention can thus be lower than 0.01 GPa, but may also include composite materials with tensile strengths in the following ranges: 0.01-0.03 GPa; 0.03-0.05 GPa; 0.05-0.07 GPa; 0.07-0.09 GPa; 0.09-0.1 GPa; 0.1-0.11 GPa; 0.11-0.12 GPa; 0.12-0.13 GPa; 0.13-0.14 GPa; 0.14-0.15 GPa; 0.15-0.16 GPa; 0.16-0.17 GPa; 0.17-0.18 GPa; 0.18-0.19 GPa; 0.19-0.20 GPa; 0.20-0.22 GPa; 0.22-0.25 GPa; 0.25-0.30 GPa; 0.30-0.35 GPa; 0.35-0.40 GPa; 0.40-0.45 GPa; 0.45-0.50 GPa; 0.50-0.60 GPa; 0.60-0.80 GPa; 0.80-1.0 GPa; 1-2 GPa (e.g. stainless steel); 2-3 GPa; 3-4 GPa; 4-5 GPa; 5-7 GPa; 7-10 GPa; 10-15 GPa; 15-20 GPa; 20-25 GPa; 25-30 GPa; 30-35 GPa; 35-40 GPa; 40-45 GPa; 45-50 GPa (e.g. single-walled carbon nanotubes); 50-55 GPa; 55-60 GPa; 60-65 GPa; 65-70 GPa; 70-75 GPa; 75-80 GPa; 80-85 GPa; 85-90 GPa; 90-100 GPa; 100-200 GPa, or above 200 GPa.

Often, it is the ratio of strength to density that is most important. The strength/specific density ratio for the composite material that is preferred under the present invention is represented by all the ratios that can be obtained, by dividing the abovementioned strengths with the abovementioned specific densities. Thus, preferred embodiments have composite materials with strength/specific densities in the range 0.00003-1000 TPa L/Kg (where strength is represented by Young's modulus). More specifically, the strength/specific density (Young's Modulus) of the composite material is preferably in the range 0.00003-1000 TPa L/Kg, more preferably 0.001-1000 TPA L/Kg, more preferably 0.01-1000 TPA L/Kg, more preferably 0, 1-1000 TPA L/Kg, more preferably 1-1000 TPA L/Kg, more preferably 10-1000 TPA L/Kg, more preferably 100-1000 TPA L/Kg, and more preferably 500-1000 TPA L/Kg, or higher. Where strength is measured as Tensile strength, the preferred embodiments have composite materials with strength/specific density in the range 0.0003-20000 GPa L/Kg. More specifically, the tensile strength/specific density of the composite material is preferably in the range 0.0003-20000 TPa L/Kg, more preferably 0.01-20000 TPA L/Kg, more preferably 0, 1-20000 TPA L/Kg, more preferably 1-20000 TPA L/Kg, more preferably 10-20000 TPA L/Kg, more preferably 100-20000 TPA L/Kg, more preferably 1000-20000 TPA L/Kg, more preferably 5000-20000 TPA L/Kg, and more preferably 10000-20000 TPA L/Kg, or higher.

Ratio of strength to specific density is often important. The strength/specific density ratio for the composite material that is preferred under the present invention is represented by all the ratios that can be obtained, by dividing the abovementioned strengths with the abovementioned specific densities. Thus, preferred embodiments have composite material with strength/specific densities in the range 0.00003-1,000 TPa L/Kg (where strength is represented by Young's modulus). More specifically, the strength/specific density (Young's Modulus) of the composite material is preferably in the range 0.00003-1,000 TPa L/Kg, more preferably 0.001-1,000 TPA L/Kg, more preferably 0.01-1,000 TPA L/Kg, more preferably 0.1-1,000 TPA L/Kg, more preferably 1-1,000 TPA L/Kg, more preferably 10-1,000 TPA L/Kg, more preferably 100-1,000 TPA L/Kg, and more preferably 500-1,000 TPA L/Kg, or higher.

In cases where e.g. the Young's modulus should be low (see above), the Young's modulus/specific density ratio is preferably less than 1,000 TPA L/kg, such as less than 500 TPA L/kg, such as less than 100 TPa L/kg, such as less than 10 TPa L/kg, such as less than 1 TPa L/kg, such as less than 0.1 TPa L/kg, such as less than 0.01 TPa L/kg, such as less than 0.001 TPa L/kg, such as less than 0.00003 TPa L/kg.

In cases where e.g. Young's modulus is preferably high, the Young's modulus/specific density ratio is preferably greater than 0.00003 TPa L/kg, such as greater than 0.001 TPa L/kg, such as greater than 0.01 TPa L/kg, such as greater than 0.1 TPa L/kg, such as greater than 1 TPa L/kg, such as greater than 10 TPa L/kg, such as greater than 100 TPa L/kg, such as greater than 500 TPa L/kg, such as greater than 1,000 TPA L/kg.

Where strength is measured as tensile strength, the preferred embodiments have composite materials with strength/specific density in the range 0.0003-20,000 GPa L/Kg. More specifically, the tensile strength/specific density of the composite material is preferably in the range 0.0003-20,000 GPa L/Kg, more preferably 0.01-20,000 GPa L/Kg, more preferably 0.1-20,000 GPa L/Kg, more preferably 1-20,000 GPa L/Kg, more preferably 10-20,000 GPa L/Kg, more preferably 100-20,000 GPa L/Kg, more preferably 1,000-20,000 GPa L/Kg, more preferably 5,000-20,000 GPa L/Kg, and more preferably 10,000-20,000 GPa L/Kg, or higher.

In cases where e.g. the tensile strength is preferably low (see above), the tensile strength/specific density ratio is preferably less than 20,000 GPa L/kg, such as less than 10,000 GPa L/kg, such as less than 5,000 GPa L/kg, such as less than 1,000 GPa L/kg, such as less than 100 GPa L/kg, such as less than 10 GPa L/kg, such as less than 1 GPa L/kg, such as less than 0.1 GPa L/kg, such as less than 0.0003 GPa L/kg.

In cases where e.g. tensile strength is preferably high, the tensile strength/specific density ratio is preferably greater than 0.0003 GPa L/kg, such as greater than 0.1 GPa L/kg, such as greater than 1 GPa L/kg, such as greater than 10 GPa L/kg, such as greater than 100 GPa L/kg, such as greater than 1,000 GPa L/kg, such as greater than 5,000 GPa L/kg, such as greater than 10,000 GPa L/kg, such as greater than 20,000 GPA L/kg.

Preferred fracture toughness of composite materials is in most cases high, as this results in a low risk of cracks propagating through the composite, ultimately leading to fracture. Examples of composite materials where a high fracture toughness is desirable includes, but are not limited to, wind turbine blades and airplane wings. Thus, depending on the context, the fracture toughness is preferably greater than 0.01 MPa·$m^{1/2}$, such as greater than 0.1 MPa $m^{1/2}$, such as greater than 1 MPa·$m^{1/2}$, such as greater than 2 MPa $m^{1/2}$, such as greater than 5 MPa·$m^{1/2}$, such as greater than 10 MPa·$m^{1/2}$, such as greater than 15 MPa·$m^{1/2}$, such as greater than 20 MPa·$m^{1/2}$, such as greater than 25 MPa·$m^{1/2}$, such as greater than 30 MPa·$m^{1/2}$, such as greater than 40 MPa·$m^{1/2}$, such as greater than 50 MPa·$m^{1/2}$, such as greater than 75 MPa·$m^{1/2}$, such as greater than 100 MPa·$m^{1/2}$, However, in some applications, a low fracture toughness is desirable. As an example, the fracture toughness of the windows in a train needs to be sufficiently low that a person can break the window using an appropriate tool in an emergency situation. Thus, depending on the context, the fracture toughness is preferably less than 100 MPa·$m^{1/2}$, such as less than 75 MPa $m^{1/2}$, such as less than 50 MPa·$m^{1/2}$, such as less than 40 MPa·$m^{1/2}$, such as less than 30 MPa $m^{1/2}$, such as less than 25 MPa·$m^{1/2}$, such as less than 20 MPa·$m^{1/2}$, such as less than 15 MPa $m^{1/2}$, such as less than 10 MPa·$m^{1/2}$, such as less than 5 MPa $m^{1/2}$, such as less than 2 MPa $m^{1/2}$, such as less than 1 MPa·$m^{1/2}$, such as less than 0.1 MPa·$m^{1/2}$, such as less than 0.01 MPa·$m^{1/2}$.

The fracture toughness for composite materials suitable for the present invention can thus be lower than 0.01 MPa·$m^{1/2}$, but may also include composite materials with fracture toughness in the following ranges: 0.01-0.1 MPa·$m^{1/2}$, 0.1-1 MPa·$m^{1/2}$, 1-2 MPa·$m^{1/2}$, 2-5 MPa·$m^{1/2}$, 5-10 MPa·$m^{1/2}$, 10-15 MPa·$m^{1/2}$, 15-20 MPa·$m^{1/2}$, 20-25 MPa·$m^{1/2}$, 25-30 MPa·$m^{1/2}$, 30-40 MPa·$m^{1/2}$, 40-50 MPa·$m^{1/2}$, 50-75 MPa·$m^{1/2}$, 75-100 MPa·$m^{1/2}$, or above 100 MPa·$m^{1/2}$.

Bulk modulus of composite materials. In the majority of applications of composite materials, a high bulk modulus is preferred, as this will allow the composite material to withstand a high compression, which is important in structural elements of buildings, bridges, etc. Thus, depending on the context, the bulk modulus is preferably greater than 0.001 GPa, such as greater than 0.01 GPa, such as greater than 0.1 GPa, such as greater than 1 GPa, such as greater than 10 GPa, such as greater than 50 GPa, such as greater than 100 GPa, such as greater than 200 GPa, such as greater than 300 GPa, such as greater than 400 GPa, such as greater than 500 GPa, such as greater than 600 GPa, such as greater than 700 GPa, such as greater than 800 GPa, such as greater than 900 GPa, such as greater than 1,000 GPa. However, in a few applications, a low bulk modulus is desirable. This is for example the case in some foam products, where it should be easy to compress the foam, e.g. using a person's body weight. Thus, depending on the context, the bulk modulus is preferably less than 1,000 GPa, such as less than 900 GPa, such as less than 800 GPa, such as less than 700 GPa, such as less than 600 GPa, such as less than 500 GPa, such as less than 400 GPa, such as less than 300 GPa, such as less than 200 GPa, such as less than 100 GPa, such as less than 50 GPa, such as less than 10 GPa, such as less than 1 GPa, such as less than 0.1 GPa, such as less than 0.01 GPa, such as less than 0.001 GPa.

The bulk modulus for composite materials suitable for the present invention can thus be lower than 0.001 GPa, but may also include composite materials with bulk modules in the following ranges: 0.001-0.01 GPa, 0.01-0.1 GPa, 0.1-1 GPa, 1-10 GPa, 10-100 GPa, 100-200 GPa, 200-300 GPa, 300-400 GPa, 400-500 GPa, 500-600 GPa, 600-700 GPa, 700-800 GPa, 800-900 GPa, 900-1,000 GPa, or above 1,000 GPa.

Shear modulus of composite materials. In the majority of applications of composite materials, a high shear modulus is preferred, as this will allow the composite material to withstand large forces imposed on the composite material in parallel, but opposite directions, e.g. brakes on bicycles, cars, wind turbines, etc. Thus, depending on the context, the shear modulus is preferably greater than 0.001 GPa, such as greater than 0.01 GPa, such as greater than 0.1 GPa, such as greater than 1 GPa, such as greater than 10 GPa, such as greater than 50 GPa, such as greater than 100 GPa, such as greater than 200 GPa, such as greater than 300 GPa, such as greater than 400 GPa, such as greater than 500 GPa, such as greater than 600 GPa, such as greater than 700 GPa, such as greater than 800 GPa, such as greater than 900 GPa, such as greater than 1,000 GPa.

However, in some applications, a low shear modulus is desirable. This is for example the case in plastic composite materials used for buttons, e.g. to turn on or off electronic equipment. Such buttons must have a low shear modulus so pressing them is sufficiently easy. Thus, depending on the context, the shear modulus is preferably less than 1,000 GPa, such as less than 900 GPa, such as less than 800 GPa, such as less than 700 GPa, such as less than 600 GPa, such as less than 500 GPa, such as less than 400 GPa, such as less than 300 GPa, such as less than 200 GPa, such as less than 100 GPa, such as less than 50 GPa, such as less than 10 GPa, such as less than 1 GPa, such as less than 0.1 GPa, such as less than 0.01 GPa, such as less than 0.001 GPa.

The shear modulus for composite materials suitable for the present invention can thus be lower than 0.001 GPa, but may also include composite materials with shear modules in the following ranges: 0.001-0.01 GPa, 0.01-0.1 GPa, 0.1-1 GPa, 1-10 GPa, 10-100 GPa, 100-200 GPa, 200-300 GPa, 300-400 GPa, 400-500 GPa, 500-600 GPa, 600-700 GPa, 700-800 GPa, 800-900 GPa, 900-1,000 GPa, or above 1,000 GPa.

Other kinds of strength, such as torsional strength and impact strength, are also of importance. Thus, composite materials with low, medium or high torsional strength, and composite materials with low, medium or high impact strength are suitable for the present invention, and thus represent preferred embodiments.

For any characteristics of a composite material mentioned above, and in each characteristic's entire range, a further characteristic of importance is the conductivity of the composite material.

Conductivity of composite material. In certain applications, e.g. use of a composite material in wind turbine blades, it may be important that the propellers are non-conductive, in order to not attract lightning. In other cases, it may be desirable to prepare composite materials of modest or high conductivity, in order to be able to detect cracks in the material by analytical measurement of the conductance of the material. Likewise, for composite materials used in e.g. nanosensor technology it may be important that the composite material is conductive, in order to be able to detect changes in conductivity induced by the association of an analyte with the composite material. In some sensor applications it may be desirable to have high conductivity (if the analyte has a strong reducing effect on the conductance of the composite material), or it may be desirable to use a composite material with an intermediate conductivity in order to detect small changes in conductivity. Thus, depending on the application it may be desirable that the composite material has low, intermediate or high conductivity. Composite materials may have conductivities ranging from below $10^{-30}$ S/m to at least $10^{11}$ S/m and higher, such as from below $10^{-30}$ S/m to $10^{-25}$ S/m (e.g. Teflon), such as from $10^{-25}$ S/m to $10^{-20}$ S/m (e.g. PET), such as from $10^{-20}$ S/m to $10^{-15}$ S/m (e.g. Quarts (fused) and Paraffin), such as from $10^{-15}$ S/m to $10^{-10}$ S/m (e.g. Hard Rubber, Diamond, Glass), such as from $10^{-10}$ S/m to $10^{-5}$ S/m (e.g. GaAs, Silicon), such as from $10^{-5}$ S/m to 1 S/m, such as from 1 S/m to 10 S/m (e.g. Germanium), such as from 10 S/m to $10^{2}$ S/m, such as from $10^{2}$ S/m to $10^{4}$ S/m (e.g. graphite), such as from $10^{4}$ S/m to $10^{6}$ S/m (e.g. Nichrome, Mercury,), such as from $10^{6}$ S/m to $10^{8}$ S/m (e.g. Stainless steel, Titanium, Platinum, Iron, Lithium, Aluminum, Gold, Coper, Silver), such as from $10^{8}$ S/m to $10^{9}$ S/m, such as from $10^{9}$ S/m to $10^{10}$ S/m, such as from $10^{10}$ S/m to $10^{11}$ S/m (e.g. Carbon nanotubes), such as from $10^{11}$ S/m to $10^{12}$ S/m (e.g. Carbon nanotubes), such as from $10^{12}$ S/m to $10^{14}$ S/m, and above $10^{14}$ S/m (e.g. superconducting material).

Thus, depending on the context, the conductivity of a composite material is preferably greater than $10^{-30}$ S/m, such as greater than $10^{-25}$ S/m, such as greater than $10^{-20}$ S/m, such as greater than $10^{-15}$ S/m, such as greater than $10^{-10}$ S/m, such as greater than $10^{-5}$ S/m, such as greater than 1 S/m, such as greater than 10 S/m, such as greater than $10^{2}$ S/m, such as greater than $10^{4}$ S/m, such as greater than $10^{6}$ S/m, such as greater than $10^{8}$ S/m, such as greater than $10^{9}$ S/m, such as greater than $10^{10}$ S/m, such as greater than $10^{11}$ S/m, such as greater than $10^{12}$ S/m, such as greater than $10^{13}$ S/m, such as greater than $10^{14}$ S/m.

In other applications, and depending on the context, the conductivity is preferably less than $10^{14}$ S/m, such as less than $10^{13}$ S/m, such as less than $10^{12}$ S/m, such as less than $10^{11}$ S/m, such as less than $10^{10}$ S/m, such as less than $10^{9}$ S/m, such as less than $10^{8}$ S/m, such as less than $10^{6}$ S/m, such as less than $10^{4}$ S/m, such as less than $10^{2}$ S/m, such as less than 10 S/m, such as less than 1 S/m, such as less than $10^{-5}$ S/m, such as less than $10^{-10}$ S/m, such as less than $10^{-15}$ S/m, such as less than $10^{-20}$ S/m, such as less than $10^{-25}$ S/m, such as less than $10^{-30}$ S/m.

For any characteristics of a composite material mentioned above, and in each characteristic's entire range, a further characteristic of importance is the degree to which the composite material can be elongated (stretched) without breaking.

Elongation at break. In many applications, a high elongation at break is preferred. This is for example important in composite materials that absorb energy by deforming plastically such as crash barriers and car bumpers. Thus, depending on the context, the elongation at break is preferably greater than 0.1%, such as greater than 1%, such as greater than 5%, such as greater than 10%, such as greater than 20%, such as greater than 30%, such as greater than 40%, such as greater than 50%, such as greater than 60%, such as greater than 70%, such as greater than 80%, such as greater than 90%, such as greater than 100%, such as greater than 150%, such as greater than 200%, such as greater than 300%, such as greater than 400%, such as greater than 500%, such as greater than 800%, such as greater than 1,500%.

In other applications, a low elongation at break is preferred. This is important in composite materials that must not deform even under harsh conditions such as high pressure and elevated temperature; one such example is ceramic brakes on automobiles, aircrafts and trains. Thus, depending on the context, the elongation at break is preferably less than 1,500%, such as less than 800%, such as less than 500%, such as less than 400%, such as less than 300%, such as less than 200%, such as less than 150%, such as less than 100%, such as less than 90%, such as less than 80%, such as less than 70%, such as less than 60%, such as less than 50%, such as less than 40%, such as less than 30%, such as less than 20%, such as less than 10%, such as less than 5%, such as less than 1%, such as less than 0.1%.

Composite materials suitable for the present invention can thus have an elongation at break of less than 0.1%, or have elongation at break including the following ranges: 0.1-1%, 1-5%, 5-10%, 10-20%, 20-30%, 30-40%, 40-50%, 50-60%, 60-70%, 70-80%, 80-90%, 90-100%, 100-150%, 150-200%, 200-300%, 300-400%, 400-500%, 500-800%, 800-1,500%, or have elongation at break above 1,500%.

For any characteristics of a composite material mentioned above, and in each characteristic's entire range, a further characteristic of importance is the size of the composite material.

Size of composite material. The size and shape of the composite material are important parameters. Thus, although depending on the characteristics of the composite material, composite materials may benefit from being large in size, as measured by the total weight of a piece of the composite material, the largest single dimension of a piece of composite material, or the total volume of a piece of composite material. Thus, depending on the context, the total weight of the composite material is preferably greater than $10^{-12}$ kg, such as greater than $10^{-11}$ kg, such as greater than $10^{-10}$ kg, such as greater than $10^{-9}$ kg, such as greater than $10^{-8}$ kg, such as greater than $10^{-7}$ kg, such as greater than $10^{-6}$ kg, such as greater than $10^{-5}$ kg, such as greater than $10^{-4}$ kg, such as greater than $10^{-3}$ kg, such as greater than 0.01 kg, such as greater than 0.1 kg, such as greater than 1 kg, such as greater than 10 kg, such as greater than 100 kg, such as greater than $10^{3}$ kg, such as greater than $10^{4}$ kg, such as greater than $10^{5}$ kg, such as greater than $10^{6}$ kg, such as greater than $10^{7}$ kg, such as greater than $10^{8}$ kg, such as greater than $10^{9}$ kg.

And the largest dimension of a composite material is preferably, depending on the context, greater than 0.1 Å, such as greater than 2 Å, such as greater than 1 nm, such as greater than 10 nm, such as greater than 100 nm, such as greater than 1 μm, such as greater than 10 μm, such as greater than 100 μm, such as greater than 1 mm, such as greater than 10 mm, such as greater than 100 mm, such as greater than 1 m, such as greater than 10 m, such as greater than 100 m, such as greater than 1,000 m.

And the total volume of a composite material is preferably, depending on the context, greater than 1 $nm^3$, such as greater than 1,000 $nm^3$, such as greater than 1,000,000 $nm^3$, such as greater than 1 $\mu m^3$, such as greater than 1,000 $\mu m^3$, such as greater than 1,000,000 $\mu m^3$, such as greater than 1 $mm^3$, such as greater than 1,000 $mm^3$, such as greater than 1,000,000 $mm^3$, such as greater than 1 $m^3$, such as greater than 10 $m^3$, such as greater than 100 $m^3$, such as greater than 1,000 $m^3$.

On the other hand, a composite material, depending on the characteristics of the composite material, may benefit from being small in size, as measured by the total weight of a piece of the composite material, the largest single dimension of a piece of composite material, or the total volume of a piece of composite material. Thus, depending on the context, the total weight of the composite material is preferably less than $10^9$ kg, such as less than $10^8$ kg, such as less than $10^7$ kg, such as less than $10^6$ kg, such as less than $10^5$ kg, such as less than $10^4$ kg, such as less than $10^3$ kg, such as less than 100 kg, such as less than 10 kg, such as less than 1 kg, such as less than 0.1 kg, such as less than 0.01 kg, such as less than $10^{-3}$ kg, such as less than $10^{-4}$ kg, such as less than $10^{-5}$ kg, such as less than $10^{-6}$ kg, such as less than $10^{-7}$ kg, such as less than $10^{-8}$ kg, such as less than $10^{-9}$ kg, such as less than $10^{-10}$ kg, such as less than $10^{11}$ kg, such as less than $10^{-12}$ kg.

And the largest dimension of a composite material is preferably, depending on the context, less than 1,000 m, such as less than 100 m, such as less than 10 m, such as less than 1 m, such as less than 100 mm, such as less than 10 mm, such as less than 1 mm, such as less than 100 μm, such as less than 10 μm, such as less than 1 μm, such as less than 100 nm, such as less than 10 nm, such as less than 1 nm, such as less than 2 Å, such as less than 0.1 Å.

And the total volume of a composite material is preferably, depending on the context, less than 1,000 $m^3$, such as less than 100 $m^3$, such as less than 10 $m^3$, such as less than 1 $m^3$, such as less than 1,000,000 $mm^3$, such as less than 1,000 $mm^3$, such as less than 1 $mm^3$, such as less than 1,000,000 $\mu m^3$, such as less than 1,000 $\mu m^3$, such as less than 1 $\mu m^3$, such as less than 1,000,000 $nm^3$, such as less than 1,000 $nm^3$, such as less than 1 $nm^3$.

Often, the choice of size and shape will be a compromise between opposing interests. Thus, in preferred embodiments the composite material may be very small to very large, depending on the application.

Therefore, the preferred compromise between high and low weight of the composite material depends on the context, and may be smaller than $10^{-12}$ kg, but may also be in the range of $10^{-12}$-$10^{-11}$ kg, $10^{-11}$-$10^{-10}$ kg, $10^{-10}$-$10^{-9}$ kg, $10^{-9}$-$10^{-8}$ kg, $10^{-8}$-$10^{-7}$ kg, $10^{-7}$-$10^{-6}$ kg, $10^{-6}$-$10^{-5}$ kg, $10^{-5}$-$10^{-4}$ kg, $10^{-4}$-$10^{-3}$ kg, 0.001-0.01 kg, 0.01-0.1 kg, 0.1-1 kg, 1-10 kg, 10-100 kg, 100-1,000 kg, $10^3$-$10^4$ kg, $10^4$-$10^5$ kg, $10^5$-$10^6$ kg, $10^6$-$10^7$ kg, $10^7$-$10^8$ kg, $10^8$-$10^9$ kg, or above $10^9$ kg.

Therefore, the preferred compromise between large and small dimensions of the composite material depends on the context, and may be smaller than 0.01 Å, but may also be in the range of 0.1-2 Å, 0.2-1 nm, 1-10 nm, 10-100 nm, 0.1-1 μm, 1-10 μm, 10-100 μm, 0.1-1 mm, 1-10 mm, 10-100 mm, 0.1-1 m, 1-10 m, 10-100 m, 100-1,000 m, or above 1,000 m.

Therefore, the preferred compromise between a large and a low volume of the composite material depends on the context, and may be smaller than 1 $nm^3$, but may also be in the range of 1-1,000 $nm^3$, 1,000-1,000,000 $nm^3$, 0.001-1 $\mu m^3$, 1-1,000 $\mu m^3$, 1,000-1,000,000 $\mu m^3$, 0.001-1 $mm^3$, 1-1,000 $mm^3$, 1,000-1,000,000 $mm^3$, 0.001-1 $m^3$, 1-10 $m^3$, 10-100 $m^3$, 100-1,000 $m^3$, or above 1,000 $m^3$.

For any characteristics of a composite material mentioned above, and in each characteristic's entire range, a further characteristic of importance is the number of SEs in the composite material.

In many applications, a high number of SEs in a composite material is preferred, as the characteristics of the SE (e.g. high tensional strength) is then more easily transferred to the composite material. Thus, depending on the context, the total number of SEs in a composite material is preferably greater than 1E+00, such as greater than 1E+01, such as greater than 1E+02, such as greater than 1E+03, such as greater than 1E+04, such as greater than 1E+05, such as greater than 1E+06, such as greater than 1E+07, such as greater than 1E+08, such as greater than 1E+09, such as greater than 1E+10, such as greater than 1E+11, such as greater than 1E+12, such as greater than 1E+13, such as greater than 1E+14, such as greater than 1E+15, such as greater than 1E+16, such as greater than 1E+17, such as greater than 1E+18, such as greater than 1E+19, such as greater than 1E+20.

In other applications, a low number of SEs in a composite material is preferred, as it makes processing of the composite material easier and reduces the cost of the final composite material. Thus, depending on the context, the total number of SEs in a composite material is preferably less than 1E+20, such as less than 1E+19, such as less than 1E+18, such as less than 1E+17, such as less than 1E+16, such as less than 1E+15, such as less than 1E+14, such as less than 1E+13, such as less than 1E+12, such as less than 1E+11, such as less than 1E+10, such as less than 1E+09, such as less than 1E+08, such as less than 1E+07, such as less than 1E+06, such as less than 1E+05, such as less than 1E+04, such as less than 1E+03, such as less than 1E+02, such as less than 1E+01, such as less than 2E+00.

Thus, the preferred compromise between a high and a low number of SEs in a composite material depends on the context, and may be smaller than 2, but may also be in the range of 1E+00-1E+01, 1E+01-1E+02, 1E+02-1E+03, 1E+03-1E+04, 1E+04-1E+05, 1E+05-1E+06, 1E+06-1E+07, 1E+07-1E+08, 1E+08-1E+09, 1E+09-1E+10, 1E+10-1E+11, 1E+11-1E+12, 1E+12-1E+13, 1E+13-1E+14, 1E+14-1E+15, 1E+15-1E+16, 1E+16-1E+17, 1E+17-1E+18, 1E+18-1E+19, 1E+19-1E+20, or above 1E+20.

For any characteristics of a composite material mentioned above, and in each characteristic's entire range, a further characteristic of importance is the total weight of the SEs in the composite material.

In many applications, a high total weight of an SE in a composite material is preferred, as the preferred characteristics of the SE (e.g. a high Young's modulus) is then more easily transferred to the composite material. Thus, depending on the context, the total weight of SEs in a composite material is preferably greater than 1E-15 kg, such as greater than 1E-14 kg, such as greater than 1E-13 kg, such as greater than 1E-12 kg, such as greater than 1E-11 kg, such as greater than 1E-10 kg, such as greater than 1E-09 kg, such as greater than 1E-08 kg, such as greater than 1E-07 kg, such as greater than 1E-06 kg, such as greater than 1E-05 kg, such as greater than 1E-04 kg, such as greater than 1E-03 kg, such as greater than 1E-02 kg, such as greater than 1E-01 kg, such as greater than 1E+00 kg, such as greater than 1E+01 kg, such as greater than 1E+02 kg, such as greater than 1E+03 kg, such as greater than 1E+04 kg, such as greater than 1E+05 kg, such as greater than 1E+06 kg, such as greater than 1E+07 kg, such as greater than 1E+08 kg, such as greater than 1E+09 kg.

In other applications, a low total weight of an SE in a composite material is preferred, as it reduces the total weight of the composite material. Thus, depending on the context, the total number of SEs in a composite material is preferably less than 1E+09 kg, such as less than 1E+08 kg, such as less than 1E+07 kg, such as less than 1E+06 kg, such as less than 1E+05 kg, such as less than 1E+04 kg, such as less than 1E+03 kg, such as less than 1E+02 kg, such as less than 1E+01 kg, such as less than 1E+00 kg, such as less than 1E-01 kg, such as less than 1E-02 kg, such as less than 1E-03 kg, such as less than 1E-04 kg, such as less than 1E-05 kg, such as less than 1E-06 kg, such as less than 1E-07 kg, such as less than 1E-08 kg, such as less than 1E-09 kg, such as less than 1E-10 kg, such as less than 1E-11 kg, such as less than 1E-12 kg, such as less than 1E-13 kg, such as less than 1E-14 kg, such as less than 1E-15 kg.

Thus, the preferred compromise between a high and a low total weight of an SE in a composite material depends on the context, and may be smaller than 1E-15 kg, but may also be in the range of 1E-15-1E-14 kg, 1E-14-1E-13 kg, 1E-13-1E-12 kg, 1E-12-1E-11 kg, 1E-11-1E-10 kg, 1E-10-1E-09 kg, 1E-09-1E-08 kg, 1E-08-1E-07 kg, 1E-07-1E-06 kg, 1E-06-1E-05 kg, 1E-05-1E-04 kg, 1E-04-1E-03 kg, 1E-03-1E-02 kg, 1E-02-1E-01 kg, 1E-01-1E+00 kg, 1E+00-1E+01 kg, 1E+01-1E+02 kg, 1E+02-1E+03 kg, 1E+03-1E+04 kg, 1E+04-1E+05 kg, 1E+05-1E+06 kg, 1E+06-1E+07 kg, 1E+07-1E+08 kg, 1E+08-1E+09 kg, or above 1E+09 kg.

For any characteristics of a composite material mentioned above, and in each characteristic's entire range, a further characteristic of importance is the total number of CMUs in the composite material.

In many applications, a high number of CMUs in a composite material is preferred, as the characteristics of the CMUs (e.g. high tensional strength) is then more easily transferred to the composite material. Thus, depending on the context, the total number of CMUs in a composite material is preferably greater than 1E+00, such as greater than 1E+01, such as greater than 1E+02, such as greater than 1E+03, such as greater than 1E+04, such as greater than 1E+05, such as greater than 1E+06, such as greater than 1E+07, such as greater than 1E+08, such as greater than 1E+09, such as greater than 1E+10, such as greater than 1E+11, such as greater than 1E+12, such as greater than 1E+13, such as greater than 1E+14, such as greater than 1E+15, such as greater than 1E+16, such as greater than 1E+17, such as greater than 1E+18, such as greater than 1E+19, such as greater than 1E+20.

In other applications, a low number of CMUs in a composite material is preferred, as it makes processing of the composite material easier and reduces the cost of the final composite material. Thus, depending on the context, the total number of CMUs in a composite material is preferably less than 1E+20, such as less than 1E+19, such as less than 1E+18, such as less than 1E+17, such as less than 1E+16, such as less than 1E+15, such as less than 1E+14, such as less than 1E+13, such as less than 1E+12, such as less than 1E+11, such as less than 1E+10, such as less than 1E+09, such as less than 1E+08, such as less than 1E+07, such as less than 1E+06, such as less than 1E+05, such as less than 1E+04, such as less than 1E+03, such as less than 1E+02, such as less than 1E+01, such as less than 2E+00.

Thus, the preferred compromise between a high and a low number of CMUs in a composite material depends on the context, and may be smaller than 2, but may also be in the range of 1E+00-1E+01, 1E+01-1E+02, 1E+02-1E+03, 1E+03-1E+04, 1E+04-1E+05, 1E+05-1E+06, 1E+06-1E+07, 1E+07-1E+08, 1E+08-1E+09, 1E+09-1E+10, 1E+10-1E+11, 1E+11-1E+12, 1E+12-1E+13, 1E+13-1E+14, 1E+14-1E+15, 1E+15-1E+16, 1E+16-1E+17, 1E+17-1E+18, 1E+18-1E+19, 1E+19-1E+20, or 1E+20-1E+30.

For any characteristics of a composite material mentioned above, and in each characteristic's entire range, a further characteristic of importance is homogeneity of the composite material.

A material can be homogeneous on a number of levels. Here, homogeneity is defined at the following levels: macroscopic homogeneity (objects ≥0.01 m), milliscopic homogeneity (objects 1-10 mm), microscopic homogeneity (objects 1-1,000 μm), nanoscopic homogeneity (objects 1-1,000 nm), nanoscopic homogeneity (objects 1-1,000 nm) and picoscopic homogeneity (objects 1-1,000 pm). For composite materials, homogeneity is here defined as the additive being uniformly dispersed in the composite material as evaluated by the naked eye or microscopy. Composite materials can be homogeneous on the macroscopic, milliscopic, microscopic and nanoscopic level, but not on the picoscopic level, as individual atoms can be visualized at the picoscopic level.

In many applications, the homogeneity of the composite material is an important characteristic, as a homogeneous dispersion of SEs in the composite material results in a better transfer of the properties of the SE (e.g. tensile strength) to the composite material. Thus, depending on the context, the composite material is preferably homogenous on a level less than the macroscopic level, such as a level less than the milliscopic level, such as a level less than the microscopic level, such as a level less than the nanoscopic level.

In other applications, the homogeneity of the composite material is a less important characteristic, and processing costs can be reduced and a less expensive material produced, if the composite material is less homogeneous. Thus, depending on the context, the composite material is preferably homogenous on a level greater than the nanoscopic level, such as greater than the microscopic level, such as greater than the milliscopic level, such as greater than the macroscopic level.

Thus, the preferred compromise between a high and a low homogeneity depends on the context, and may be less than on the nanoscopic level, but may also be in the range of the nanoscopic-microscopic level, the microscopic-milliscopic level, the milliscopic-macroscopic level, or above the macroscopic level.

Further characteristics of composite material. For any characteristics of an composite material mentioned above, and in each characteristic's entire range, further characteristics of the composite material that are of importance in the present invention are the stiffness, electrical conductivity, thermal conductivity, color, fluorescence, luminescence, UV protective capability, abrasion resistance, ductility, elasticity, flexibility, energy storage capability (energy storage as heat or kinetic energy), information storage capability, hydrophilicity, hydrophobicity, polarity, aproticity, and charge, as well as the following characteristics where the unit of measure is indicated after each characteristic: Arc Resistance, sec; Impact Strength, Charpy, J/cm; Impact Strength, Izod Notched, J/cm; Impact Strength, Izod Unnotched, J/cm; Impact Strength, Charpy Notched Low Temp, J/cm; Impact Strength, Izod Notched Low Temp, J/cm; Impact Strength, Charpy Unnotched Low Temp, J/cm; Impact Strength, Charpy Unnotched, J/cm; Linear Mold Shrinkage, cm/cm; Maximum Service Temperature, Air; Melt Flow, g/10 min; Melting Point; Modulus of Elasticity, GPa; Moisture Absorption at Equilibrium, %; Oxygen Transmission, cc-mm/m; Poisson's Ratio; Processing Temperature; Surface Resistance, ohm; Tensile Strength, Ultimate, MPa; Tensile Strength, Yield, MPa; Thermal Conductivity, W/m-K; UL RTI, Electrical; UL RTI, Mechanical with Impact; UL RTI, Mechanical without Impact; Vicat Softening Point; Water Absorption, %; Coefficient of Friction; Comparative Tracking Index, V; Compressive Yield Strength, MPa; CTE, linear 20; Deflection Temperature at 0.46 MPa; Deflection Temperature at 1.8 MPa; Density, g/cc; Dielectric Constant; Dielectric Constant, Low Frequency; Dielectric Strength, kV/mm; Dissipation Factor; Dissipation Factor, Low Frequency; Electrical Resistivity, ohm-cm; Elongation @ break, %; Flammability, UL94; Flexural Modulus, GPa; Flexural Yield Strength, MPa; Glass Temperature; Hardness, Barcol; Hardness, Rockwell E; Hardness, Rockwell M; Hardness, Rockwell R; Hardness, Shore A; Hardness, Shore D; Heat Capacity, J/g. Depending on the application, an composite material with a low, medium, or high degree of each of these characteristics is preferable in the present invention.

Example Composite Materials.

The CMUs described herein may be used to form composite materials, comprising a large number of CMUs.

Structural Entities and Preferred Embodiments.

Polymer and additive. In a preferred embodiment the matrix of a composite material is non-polar. As a result, non-polar additives (e.g. CNT, graphene) will typically integrate more efficiently in the polymer. Polar additives, on the other hand, may in some cases have a strong effect on the electronic and thermal characteristics of the composite material compared to the matrix material without the additive, because of the non-polarity of the matrix and the polarity of the additive. This can be advantageous in certain cases.

Nanosensor. The remarkable sensitivity of carbon nanotube or graphene properties (e.g. carbon nanotube conductivity) to the surface adsorbates permits the use of carbon nanotubes and grapheme as highly sensitive sensors.

In a preferred embodiment, one of the structural entities comprises an entity chosen from the list of nucleic acid, single-stranded DNA, double-stranded DNA, protein, antibody, enzyme, receptor, where each entity may be covalently or non-covalently bound to another entity chosen from the list comprising carbon nanotube, single-walled carbon nanotube, multi-walled carbon nanotube, graphene, single layer graphene, multi-layer graphene, or graphene oxide. If a CMU comprises e.g. a structural entity SE1 (e.g. an antibody) that binds to a molecule X, and if the other structural entity SE2 is e.g. a conducting CNT, the CMU may be used as a nanosensor for the detection of molecule X.

CNT-reinforced polymer. In a preferred embodiment, one of the structural entities is a polymer and the other structural entity is an additive providing increased strength to the composite material made of the CMUs, compared to the material that does not contain the additive. In a preferred embodiment of said embodiment the ligand attaching the additive to the linker is a non-covalent ligand. As a result, the electronic structure of the additive is not interfered with through the binding of the ligand, which is often an advantage. In a preferred embodiment of said embodiment the additive is a carbon nanotube.

Mixed polymer composite material. In some circumstances it may be desirable to mix two or more polymers. In one preferred embodiment, SE1 represents a molecule of one kind of polymer and SE2 represents a molecule of another kind of polymer. As an example, SE1 may be PVC and SE2 may be polycarbamate. In another preferred embodiment, SE1 represents a polymer molecule and SE2 is an additive, and the composite material comprises one or more polymer types different from SE1.

In a preferred embodiment, the CMU comprises two structural entities SE1 and SE2, where SE1 is an additive of high strength, and SE2 is a polymer and part of the matrix material in a composite material. Ligand1 comprises a large number of SubLigands, where the dissociation constant of the individual SubLigands is relatively high, such as in the range between $10^{-10}$-$10^{-2}$ M. Such relatively weak interactions of the individual SubLigand with SE1, e.g. in a setting where a large number of serially connected SubLigands can interact with SE1, will provide a very high degree of flexibility and self-healing to a composite material made of such CMUs.

In another preferred embodiment, the CMU comprises two structural entities SE1 and SE2, where SE1 is an additive of high strength, and SE2 is a polymer and part of the matrix material in a composite material. The Ligand2-SE2 interaction is covalent, and the Ligand1-SE1 interaction is non-covalent but very tight and thus characterized by a relatively low dissociation constant, such as in the range of $10^{-30}$-$10^{-10}$ M. A composite material comprising CMUs with such tight interactions between SE1 and Ligand1 can be very strong but may also be of little flexibility.

In a preferred embodiment, SE1 and SE2 are both a carbon nanotube, and the linker connecting SE1 and SE2 is of a length between 0.1 nm and 10 nm. In a preferred embodiment, the composite material is a material made up of a large number of CMUs, each of which comprise two structural entities SE, both of which are carbon nanotubes, and two ligands, both of which are non-covalent and bind with high affinity to the carbon nanotube. The linker connecting the two ligands and thus the two SEs, is relatively short, such as e.g. between 1 and 10 nm. The material is essentially a tight aggregate of carbon nanotubes. As a result, the material is of high strength.

In another preferred embodiment, SE1 and SE2 are both graphene, and the linker connecting SE1 and SE2 is of a length between 0.1 nm and 10 nm. The resulting CMU will have higher strength than each of the two individual graphenes.

Figure 5:
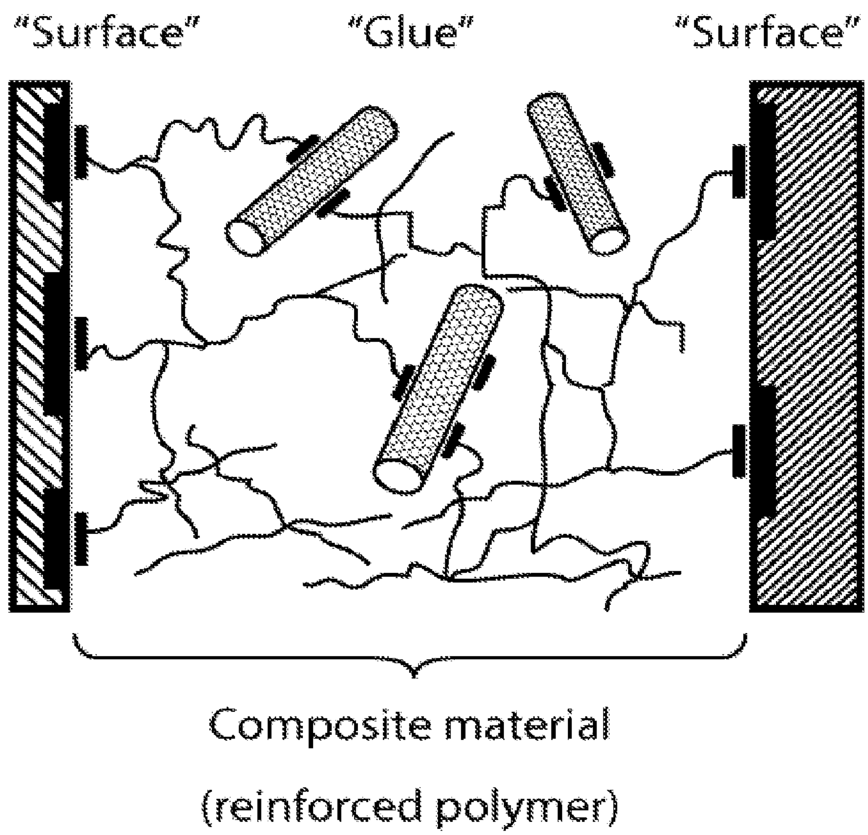
FIG. 5 shows a composite material comprising 2 kinds of CMU that serves as a glue that holds two surfaces together.

In a preferred embodiment, a composite material comprises more than one kind of CMUs. For example, if the composite material is intended to function as a glue between two surfaces, it may be desirable to have one kind of CMU (e.g. made up of a polymer (SE1) and a strengthening additive such as graphene (SE2) that is the core of a reinforced polymer that does not easily break apart, and another kind of CMU (e.g. made up of the same polymer (SE1) but a third structural entity (SE3) that is part of the two surfaces that must be glued together. See (FIG. 5).

Carbon Nanotube-Reinforced Ceramics

Ceramics cover a wide range of materials, including structural materials and technical ceramics. Concrete and piezoelectric materials are prototypical ceramics. Ceramics are usually defined as solids with a mixture of metallic or semi-metallic and non-metallic elements (often, although not always, oxygen), and they are often quite hard, non-conducting and corrosion-resistant.

Concrete is the most widely used construction material, which among other things comprises silicates. Concrete is produced by mixing cement with sand and water and adding aggregates. Other ingredients in the concrete are termed admixtures, for example air and water reducers such as superplasticizers. An example of a superplasticizer is Mapai, Dynamon SP1. Retarders and accelerators are other useful admixtures. Another ingredient in many concrete mixtures is supplementary cementitious materials also called pozzolans. These materials include fly ash, slag cement (sometimes called ground granulated blast furnace slag or slag cement), silica fume, and metakaolin. Supplementary cementitious materials are used as replacement for cement and since they have a very small particle size they reduce the permeability of concrete.

The relative amount of the water and cement is one of the key parameters that determines the strength of concrete—a lower water-to-cement ratio gives higher strength but at the expense of a higher viscosity.

Addition of filelrs such as fullerrenes, e.g. CNTs, to concrete in the form of linker units (LUs) or composite material units (CMUs) according to the present invention may help disperse the CNTs more efficiently, and increase the strength of the concrete.

Definitions

Additive shall be defined as a first substance added in small amounts to a second substance to improve, strengthen, or in other ways alter the characteristics of said second substance. Used interchangeably with filler.

Carbon nanotube is used interchangeably with CNT, and shall be defined as a fullerene having a cylindrical or toroidal configuration.

CNT is used interchangeably with Carbon Nanotube.

Composite material. A combination of two or more materials such as a polymer combined with an additive; a metal with an additive, or a ceramic with an additive. Typically, the material in excess is called the matrix, whereas the material present in small amount is called the additive or filler. Example composites are polystyrene combined with a small amount of carbon fibers, and metal combined with a small amount carbon nanotube.

Composite material unit is used interchangeably with CMU. A CMU comprises two structural entities held together by a linker and two ligands. A CMU can be a constituent of a composite material.

Element shall exclusively refer to an element of the periodic table of the elements.

Filler is used interchangeably with Additive.

Inorganic structural entities or materials shall mean any material or entity except those comprising carbon and at least one other element. Inorganic SEs thus include CNT, graphene, other fullerenes, and carbon fibers.

Ligand shall mean an entity capable of binding covalently or non-covalently to a material, where said entity is a molecule composed of atoms, which binds said material, or which connects at least two atoms of said material.

Linker Unit is used interchangeably with LU. A linker unit comprises one or more ligands, capable of binding covalently or non-covalently to a structural entity, and comprises one or more linkers that link the ligands together.

Material shall mean anything made of matter. The material may be in a solid state (such as ice) or for all practical purposes solid (e.g. such as glass).

Matrix material shall be defined as the most abundant component of a composite material.

Multi wall nanotube and MWNT are used interchangeably and shall be defined as a coaxial assembly of nanotubes similar to a coaxial cable, or as a molecular sheet, e.g. of graphene, rolled into the shape of a scroll. Examples include multi wall carbon nanotubes, which is used interchangeably with MWCNT.

Nanotube shall be defined as a hollow cylindrical or toroidal molecule, which is shorter than 1,000 nanometers in at least one dimension.

Natural as used herein, refers to entities, which are found abundantly in nature, such as in biological systems. For example, a natural peptide is composed of the twenty natural amino acids; Isoleucine, Alanine, Leucine, Asparagine, Lysine, Aspartic Acid, Methionine, Cysteine, Phenylalanine, Glutamic Acid, Threonine, Glutamine, Tryptophan, Glycine, Valine, Proline, Serine, Tyrosine, Arginine, Histidine. Similarly, a natural oligonucleotide is composed of the four natural nucleotides cytidine, adenosine, guanosine, and thymidine.

Non-natural as used herein refers to entities, which are not found abundantly in nature, such as in biological systems. For example, a non-natural peptide is a peptide, which comprises an entity not found in the list of natural amino acids. Similarly, a non-natural oligonucleotide is an oligonucleotide, which comprises an entity that is not found in the list of the four natural nucleosides.

One atom layer molecule shall be defined as a molecule, which has exactly one atom thickness in one dimension, e.g. graphene.

One layer molecule shall be defined as a molecule, which cannot be separated into two layers without breaking a chemical bond.

Organic materials or structural entities shall mean materials or entities, which contain carbon and at least one other element.

Polymer shall mean a long, repeating chain, such as a branched chain, of atoms, comprising repeated identical or similar units, formed through the linkage of many monomers. Thus, a polymer is a molecule of high relative molecular mass, the structure of which essentially comprises the multiple repetition of units derived, actually or conceptually, from molecules of low relative molecular mass. The monomers can be identical, or they can have one or more substituted chemical groups. Some polymers are made of more than one kind of monomer. Example polymers are polyvinylchloride, polystyrene, DNA, protein and polypeptide.

Single wall nanotube is used interchangeably with SWNT and shall mean a cylindrical nanostructure or a molecular tube with at least one dimension less than 1,000 nanometers. Examples include single wall carbon nanotubes, which is used interchangeable with SWNT.

Structural Entity (SE). A structural entity shall mean a chemical or physical entity. A structural entity may be an atom (e.g. an ion), a molecule (e.g. a nylon polymer or a CNT), or part of a surface/material (e.g. metal). Furthermore, a molecular SE may either be small (largest dimension less than 10 nm), or large (largest dimension more than 10 nm). The two latter categories of SEs shall be referred to as Small Molecular SEs and Large Molecular SEs. A structural entity can be part of a composite material unit (CMU), and said composite material unit may be part of a composite material. A structural entity may be used to anchor the CMU in place in the larger structure of a composite material, or alternatively, may be used to modify the characteristics of a composite material, e.g. by modifying the strength, flexibility, or appearance of the composite material.

Surface shall mean a material layer constituting a boundary, such as the one or few outermost atomic layer(s) of a material.

EXAMPLES

Example 1. Formation of Nylon

This example is from "The Nylon Rope Trick, Demonstration of condensation polymerization", by Paul W. Morgan and Stephanie L. Kwolek, Journal of Chemical Education, Volume 36, Number 4, April 1959, pp 182-184. The article describes the in situ polymerization of nylon at room temperature from simple precursor molecules. The description is merely thought as an introduction for how to prepare a polymer (in this case nylon) and is not in any way intended to enable the present invention. However, Examples 2-5 are modifications to this Example 1 that enable various aspects of the present invention.

An organic phase consisting of 2 mL (0.0093 moles) sebacoyl chloride in 100 mL carbon tetrachloride is placed in a 200 mL tall-form beaker. Over this is carefully poured a solution of 4.4 g (0.038 moles) hexamethylenediamine in 50 mL water. A polymeric film forms at once at the interface. When the film is pushed aside, new, smooth film forms at once at the fresh interface. The walls of the glass are freed of strings of polymer, the mass is grasped at the center with tweezers and raised as a rope of continuously forming polymer film. The film always forms a tent having draping and shifting folds with the apex at the air-liquid interface.

The simplest isolation method is to wash the polymer thoroughly with water and to dry it in air. The washing is greatly hastened if 50% aqueous alcohol is used for an initial wash.

If desired, fibers may be prepared from the formed material by melting it carefully in a test tube over a hot plate, and then pulling fibers from the melt by means of a glass rod brought into contact with the melt and withdrawn slowly.

If desired, films may be prepared from the formed material by preparing a 10 to 20% solution of the formed material in formic acid under stirring at room temperature. A flexible, hazy film will form when the solution is spread on a glass plate and allowed to dry overnight.

The in situ polymerization reaction to form nylons may be performed using alternative reactants. Other aliphatic diacid chlorides may be used; there is a tendency for the films to be less tough when shorter chain intermediates are used. Terephthaloyl chloride forms a tough film with piperazine and a fair film with hexamethylenediamine when chloroform is used as the solvent for the organic phase.

Other polyamides and other classes of condensation polymers can be made to form continuously as film.

Preferred solvents are those with low miscibility in water and which will not react even to a low degree with the acid halide. Alternative solvents are thus tetrachloroethylene, trichloroethylene, and 1,1,1-trichloroethane. Useful nonhalogenated solvents are benzene, toluene, xylene, hexane, and cyclohexane. The amount of reactants used must be slightly adjusted when using these alternative solvents.

Example 2. Formation of CNT-Reinforced Nylon Using a Ligand that Binds Non-Covalently to CNT This is an example of the formation of a composite material where the matrix consists of nylon and the additive is a single-walled carbon nanotube, where ligand 1 binds covalently to nylon (SE1) through an amide bond, and where ligand 2 is a peptide that binds non-covalently to the structural entity SE2 which is a carbon nanotube. This is an example of in situ polymerization.

This example is adapted from example 1.

Single-walled carbon nanotubes are obtained from e.g. NanoIntegris, Inc. Canada (purified HiPco). The carbon nanotubes (CNTs) are dispersed in dichloroethane by sonication, at a concentration of CNT of 1% weight/volume.

The six peptides SKTSGRDQSKRVPRYWNVHRDSSC, SKTSRESSAVQMGKARFLCTHSSC, KTQATSRGTRGMRTSGGFPVGSSC, KTQATSVPRKAARRWEQVDSVSSC, KTQATSESGSAGRQMFVADMGSSC, PQAQDVELPQELQDQHREVEVSSC, all of which comprise a CNT-binding motif, as described in (A Genetic Analysis of Carbon-Nanotube-Binding Proteins; Brown, S., Jespersen, T. S., Nygård, J.; Small 2008, 4, no. 4, pp. 416-420), are each separately coupled to a linker molecule comprising at one end a pyridyl-disulfide and at the other end an amino group, through a reaction between the thiol of the terminal cysteine of the peptide with the pyridyl-disulfide group of the linker molecule, to form a disulfide bond between peptide and linker molecule. The two reactive groups (disulfide and amine) of the linker molecule are separated by hexamethylene (i.e. C6), or C2, C3, C4, C5, C7, C8, C9, C10. The resulting product thus has the following structure: peptide-SS—$C_n$—$NH_2$. The peptide-SS—$C_n$—$NH_2$ molecules comprise an amine, capable of reacting with an acid chloride; the amine moiety thus enables the formation of a covalent linkage between the peptide and the polymer (see below). The resulting product is dissolved in water or aqueous buffer pH 8 at a concentration of 1 or 10 mM. Optionally, DMSO may be added at low concentration to better dissolve the peptides.

For each of the six peptide-linker constructs above, three reactions are set up:

1. An organic phase consisting of 2 mL (0.0093 moles) sebacoyl chloride in 100 mL carbon tetrachloride is placed in a 200 mL tall-form beaker. 1 mL of the 1% CNT solution from above is added under stirring.
2. An organic phase consisting of 2 mL (0.0093 moles) sebacoyl chloride in 90 mL carbon tetrachloride is placed in a 200 mL tall-form beaker. 10 mL of the 1% CNT solution from above is added under stirring.
3. An organic phase consisting of 2 mL (0.0093 moles) sebacoyl chloride in 10 mL carbon tetrachloride is placed in a 200 mL tall-form beaker. 90 mL of the 1% CNT solution from above is added under stirring.

For each of the six peptide-linker constructs above the following is done: To a solution of 4.4 g (0.038 moles) hexamethylenediamine in 50 mL water is added the peptide-linker molecule construct in 100-fold molar excess to the CNT molecules added above. This solution comprising the hexamethylenediamine and the peptide-linker construct is then carefully poured over each of the three organic phases in the three beakers. A polymeric film forms at once at the interface. When the film is pushed aside, new, smooth film forms at once at the fresh interface. The walls of the glass are freed of strings of polymer, the mass is grasped at the center with tweezers and raised as a rope of continuously forming polymer film. The film always forms a tent having draping and shifting folds with the apex at the air-liquid interface.

The simplest isolation method is to wash the polymer thoroughly with water and to dry it in air. The washing is greatly hastened if 50% aqueous alcohol is used for an initial wash.

If desired, fibers may be prepared from the formed material by melting it carefully in a test tube over a hot plate, and then pulling fibers from the melt by means of a glass rod brought into contact with the melt and withdrawn slowly. The nylon fibers comprising the CNTs, non-covalently bound to the nylon matrix, will have different features than the corresponding nylon fibers without the CNT additive, such as different strength and conductivity.

If desired, films may be prepared from the formed material by preparing a 10 to 20% solution of the formed material in formic acid under stirring at room temperature. The nylon film comprising the CNTs, non-covalently bound to the nylon matrix, will have other characteristics than the corresponding nylon film without the CNT additive, such as different impact strength or different conductivity.

The in situ polymerization reaction to form nylons may be performed using alternative reactants. Other aliphatic diacid chlorides may be used, such as the acid chlorides of adipic acid, and dodecanedioic acid. Also, aromatic diacid chlorides may be used, such as terephthalic acid or isophthalic acid.

Other reinforced polyamides e.g. the condensation product of terephthalic acid or isophthalic acid with for example bis(para-aminocyclohexyl)methane or trimethylhexamethylenediamine, and other classes of reinforced condensation polymers, e.g. polyesters including poly(ethylene terephthalate) can be made using this approach.

Preferred solvents are those with low miscibility in water and which will not react even to a low degree with the acid halide. Alternative solvents are thus tetrachloroethylene, trichloroethylene, and 1,1,1-trichloroethane. Useful nonhalogenated solvents are benzene, toluene, xylene, hexane, and cyclohexane. The amount of reactants can be adjusted when using these alternative solvents in order to improve the process.

If desired, alternative or additional additives such as fullerenes (e.g. graphene) or metals (e.g. gold) or any other additive may be added, along with appropriate ligands, e.g. graphene-, gold-, and other additive-binding ligands.

Example 3. Formation of CNT-Reinforced Nylon Using a Ligand that Binds Non-Covalently to CNT, and where the CNT-Binding Ligand is Used to Disperse the CNT More Efficiently This example is adapted from Example 2. In this example the CNT-ligand is added to the CNT suspension, rather than to the hexamethylenediamine solution (see Example 2), in order to disperse more efficiently the CNTs in first the dichloroethane (stock solution of CNT), then in the carbon tetrachloride (one of the two phases at the interface where polymerization takes place), and finally in the resulting CNT-reinforced polymer.

The six peptides of Example 2 are coupled to linkers as described in Example 2, and are each dispersed in DMSO or a similar solvent in three test tubes, at a concentration of 1, 10 or 100 mM, respectively.

Single-walled carbon nanotubes (e.g. NanoIntegris, Inc. Canada, purified HiPco) are dissolved in dichloroethane by sonication, at a concentration of CNT of 1% weight/volume, and split into 18 tubes. Then for each of the six peptides, peptide-SS-Cn-NH2 construct is added to a final molar concentration that is 10, 100 or 1,000 fold higher than the CNT concentration, respectively. The peptides will bind CNTs and help disperse these. These 18 solutions are in the following called the CNT/peptide solutions.

For each of the 18 CNT/peptide solutions above, comprising six different peptide-linker constructs, three reactions are set up:

1. An organic phase consisting of 2 mL (0.0093 moles) sebacoyl chloride in 100 mL carbon tetrachloride is placed in a 200 mL tall-form beaker. 1 mL of the CNT/peptide solution from above is added under stirring.
2. An organic phase consisting of 2 mL (0.0093 moles) sebacoyl chloride in 90 mL carbon tetrachloride is placed in a 200 mL tall-form beaker. 10 mL of the CNT/peptide solution from above is added under stirring.
3. An organic phase consisting of 2 mL (0.0093 moles) sebacoyl chloride in 10 mL carbon tetrachloride is placed in a 200 mL tall-form beaker. 90 mL of the CNT/peptide solution from above is added under stirring.

For each of the 18 reactions from above the following is done: A solution of 4.4 g (0.038 moles) hexamethylenediamine in 50 mL water is carefully poured over each of the three organic phases in the three beakers. A polymeric film forms at the interface. When the film is pushed aside, new, smooth film forms at once at the fresh interface. The walls of the glass are freed of strings of polymer, the mass is grasped at the center with tweezers and raised as a rope of continuously forming polymer film.

A simple isolation method is to wash the polymer thoroughly with water and to dry it in air. The washing is greatly hastened if 50% aqueous alcohol is used for an initial wash.

If desired, fibers may be prepared from the formed material by melting it carefully in a test tube over a hot plate, and then pulling fibers from the melt by means of a glass rod brought into contact with the melt and withdrawn slowly. The nylon fibers comprising the CNTs, non-covalently bound to the nylon matrix, will have characteristics different from the corresponding nylon fibers without the CNT additive.

If desired, films may be prepared from the formed material by preparing a 10 to 20% solution of the formed material in formic acid under stirring at a temperature between 20 and 60 degrees celcius, such as at 25 degrees celcius. A flexible, hazy film will form when the solution is spread on a glass plate and allowed to dry overnight. The nylon film comprising the CNTs, non-covalently bound to the nylon matrix, will be stronger than the corresponding nylon film without the CNT additive.

The in situ polymerization reaction to form nylons may be performed using alternative reactants. Other aliphatic diacid chlorides may be used, such as the acid chlorides of adipic acid and dodecanedioic acid. Also, aromatic diacid chlorides may be used, such as terephthalic acid or isophthalic acid.

Other reinforced polyamides e.g. the condensation product of terephthalic acid or isophthalic acid with for example bis(para-aminocyclohexyl)methane or trimethylhexamethylenediamine, and other classes of reinforced condensation polymers e.g. polyesters including poly(ethylene terephthalate) can be made using this approach.

Preferred solvents are those with low miscibility in water and which will not react even to a low degree with the acid halide. Alternative solvents are thus tetrachloroethylene, trichloroethylene, and 1,1,1-trichloroethane. Useful nonhalogenated solvents are benzene, toluene, xylene, hexane, and cyclohexane. The amount of reactants can be adjusted when using these alternative solvents in order to improve the process.

If desired, alternative or additional additives such as fullerenes (e.g. graphene) or metals (e.g. gold) or any other additive may be added, along with appropriate ligands, e.g. graphene-, gold-, and other additive-binding ligands.

Example 4. Formation of CNT-Reinforced Nylon where Ligand1 is Identical to Ligand2, and where Both Ligands Bind the CNT Non-Covalently This is an example of the formation of a composite material where the matrix consists of nylon and the additive is single-walled carbon nanotube, where ligand1 is identical to ligand2 and binds non-covalently to the carbon nanotube. This is an example of in situ polymerization.

This example is adapted from example 1.

Single-walled carbon nanotubes are obtained from e.g. NanoIntegris, Inc. Canada (purified HiPco). The carbon nanotubes (CNTs) are dispersed in 1,1,1-trichloroethane by sonication, at a concentration of CNT of 1% weight/volume.

The six peptides SKTSGRDQSKRVPRYWNVHRDSSGSSGSSGPSSG-SSGSKTSGRDQSKRVPRYWNVHRD, SKTSRESSAVQMGKARFLCTHSSGSSGSSGPSSGS-SGSKTSRESSAVQMGKARFLCTH, KTQATSRGTRGMRTSGGFPVGSSGSSGSSGPSSGS-SGKTQATSRGTRGMRTSGGFPVG, KTQATSVPRKAARRWEQVDSVSSGSSGSSGPSSG-SSGKTQATSVPRKAARRWEQVDSV, KTQATSESGSAGRQMFVADMGSSGSSGSSGPSSG-SSGKTQATSESGSAGRQMFVADMG, PQAQDVELPQELQDQHREVEVSSGSSGSSGPSSG-SSGPQAQDVELPQELQDQHREVEV, all of which comprise two CNT-binding motifs (underlined sequences) are each dissolved in water or aqueous buffer pH 8 at a concentration of 1 or 10 or 100 mM. Optionally, DMSO may be added at low concentration to better dissolve the peptides.

For each of the six peptides above, three reactions are set up:

1. An organic phase consisting of 2 mL (0.0093 moles) sebacoyl chloride in 100 mL carbon tetrachloride is placed in a 200 mL tall-form beaker. 1 mL of the 1% CNT solution from above is added under stirring.
2. An organic phase consisting of 2 mL (0.0093 moles) sebacoyl chloride in 90 mL carbon tetrachloride is placed in a 200 mL tall-form beaker. 10 mL of the 1% CNT solution from above is added under stirring.
3. An organic phase consisting of 2 mL (0.0093 moles) sebacoyl chloride in 10 mL carbon tetrachloride is placed in a 200 mL tall-form beaker. 90 mL of the 1% CNT solution from above is added under stirring.

For each of the six peptides above the following is done: To a solution of 4.4 g (0.038 moles) hexamethylenediamine in 50 mL water is added the peptide in 10x, 100x, or 1,000x molar excess to the CNT molecules added above. This solution comprising the hexamethylenediamine and the peptide is then carefully poured over each of the three organic phases in the three beakers. A polymeric film forms at once at the interface. When the film is pushed aside, new, smooth film forms at once at the fresh interface. The walls of the glass are freed of strings of polymer, the mass is grasped at the center with tweezers and raised as a rope of continuously forming polymer film.

A simple isolation method is to wash the polymer thoroughly with water and to dry it in air. The washing is greatly hastened if 50% aqueous alcohol is used for an initial wash.

If desired, fibers may be prepared from the formed material by melting it carefully in a test tube over a hot plate, and then pulling fibers from the melt by means of a glass rod brought into contact with the melt and withdrawn slowly. The nylon fibers comprising the CNTs, bound non-covalently by the peptide ligands, will have characteristics different from the corresponding nylon fibers without the CNT additive.

If desired, films may be prepared from the formed material by preparing a 10 to 20% solution of the formed material in formic acid under stirring at room temperature. The nylon film comprising the CNTs, bound non-covalently by the peptide ligands, will have characteristics different from the corresponding nylon film without the CNT additive.

The in situ polymerization reaction to form nylons may be performed using alternative reactants. Other aliphatic diacid chlorides may be used, such as the acid chlorides of adipic acid and dodecanedioic acid. Also, aromatic diacid chlorides may be used, such as terephthalic acid or isophthalic acid.

Other reinforced polyamides e.g. the condensation product of terephthalic acid or isophthalic acid with for example bis(para-aminocyclohexyl)methane or trimethylhexamethylenediamine, and other classes of reinforced condensation polymers e.g. polyesters including poly(ethylene terephthalate) can be made using this approach.

Preferred solvents are those with low miscibility in water and which will not react even to a low degree with the acid halide. Alternative solvents are thus tetrachloroethylene, trichloroethylene, and 1,1,1-trichloroethane. Useful nonhalogenated solvents are benzene, toluene, xylene, hexane, and cyclohexane. The amount of reactants can be adjusted when using these alternative solvents in order to improve the process.

If desired, alternative or additional additives such as fullerenes (e.g. graphene) or metals (e.g. gold) or any other additive may be added, along with appropriate ligands, e.g. graphene-, gold-, and other additive-binding ligands.

Example 5. Formation of CNT-Reinforced Nylon where Ligand1 is Identical to Ligand2, and where Both Ligands Bind the CNT Non-Covalently, and where the CNT-Binding Ligand is Used to Disperse the CNTs More Efficiently This is an example of the formation of a composite material where the matrix consists of nylon and the additive is single-walled carbon nanotube, where ligand 1 is identical to ligand2 and binds non-covalently to the carbon nanotube, and where the binding of ligand1 and ligand2 to the CNTs help dissolve these. This is an example of in situ polymerization.

This example is adapted from example 4.

The six peptides

SKTSGRDQSKRVPRYWNVHRDSSGSSGSSGPS-SGSSGSKTSGRDQSKRVPRYWNVH RD,

SKTSRESSAVQMGKARFLCTHSSGSSGSSGPSSG-SSGSKTSRESSAVQMGKARFLCTH,

KTQATSRGTRGMRTSGGFPVGSSGSSGSSGPSSG-SSGKTQATSRGTRGMRTSGGFPV G,

KTQATSVPRKAARRWEQVDSVSSGSSGSSGPS-SGSSGKTQATSVPRKAARRWEQVD SV,

KTQATSESGSAGRQMFVADMGSSGSSGSSGPS-SGSSGKTQATSESGSAGRQMFVAD MG,

PQAQDVELPQELQDQHREVEVSSGSSGSSGPSSG-SSGPQAQDVELPQELQDQHREVE V, all of which comprise two CNT-binding motifs, are each dissolved in water or aqueous buffer pH 8 at a concentration of 10 or 100 mM. Optionally, DMSO may be added at low concentration to better dissolve the peptides.

Single-walled carbon nanotubes are obtained from e.g. NanoIntegris, Inc. Canada (purified HiPco). The carbon nanotubes (CNTs) are dispersed in 1,1,1-trichloroethane by sonication, at a concentration of CNT of 1% weight/volume. The CNT solution is split into eighteen vials. Each of the six peptide solutions mentioned above is then added to three CNT solutions at a molar excess of the peptide over the CNT of 10x, 100x, or 1,000x, respectively. Thus, we now have eighteen CNT/peptide solutions comprising any one of six peptides, with either a peptide:CNT ratio of 10, 100 or 1,000.

For each of the 18 CNT/peptide solutions obtained above, three reactions are set up:

1. An organic phase consisting of 2 mL (0.0093 moles) sebacoyl chloride in 100 mL carbon tetrachloride is placed in a 200 mL tall-form beaker. 1 mL of the 1% CNT/peptide solution from above is added under stirring.

2. An organic phase consisting of 2 mL (0.0093 moles) sebacoyl chloride in 90 mL carbon tetrachloride is placed in a 200 mL tall-form beaker. 10 mL of the 1% CNT/peptide solution from above is added under stirring.
3. An organic phase consisting of 2 mL (0.0093 moles) sebacoyl chloride in 10 mL carbon tetrachloride is placed in a 200 mL tall-form beaker. 90 mL of the 1% CNT/peptide solution from above is added under stirring.

This gives a total of 54 organic phases.

A solution of 4.4 g (0.038 moles) hexamethylenediamine in 50 mL water is carefully poured over each of the 54 organic phases. A polymeric film forms at once at the interface. When the film is pushed aside, new, smooth film forms at once at the fresh interface. The walls of the glass are freed of strings of polymer, the mass is grasped at the center with tweezers and raised as a rope of continuously forming polymer film.

A simple isolation method is to wash the polymer thoroughly with water and to dry it in air. The washing is greatly hastened if 50% aqueous alcohol is used for an initial wash.

If desired, fibers may be prepared from the formed material by melting it carefully in a test tube over a hot plate, and then pulling fibers from the melt by means of a glass rod brought into contact with the melt and withdrawn slowly. The nylon fibers comprising the CNTs, bound non-covalently by the peptide ligands, will have characteristics different from the corresponding nylon fibers without the CNT additive, such as increased toughness or heat conductivity.

If desired, films may be prepared from the formed material by preparing a 10 to 20% solution of the formed material in formic acid under stirring at room temperature. The nylon film comprising the CNTs, bound non-covalently by the peptide ligands, will have characteristics different from the corresponding nylon film without the CNT additive.

The in situ polymerization reaction to form nylons may be performed using alternative reactants. Other aliphatic diacid chlorides may be used, such as the acid chlorides of adipic acid and dodecanedioic acid. Also, aromatic diacid chlorides may be used, such as terephthalic acid or isophthalic acid. There is a tendency for the films to be less tough when shorter chain intermediates are used. Terephthaloyl chloride forms a tough film with piperazine and a fair film with hexamethylenediamine when chloroform is used as the solvent for the organic phase.

Other reinforced polyamides e.g. the condensation product of terephthalic acid or isophthalic acid with for example bis(para-aminocyclohexyl)methane or trimethylhexamethylenediamine, and other classes of reinforced condensation polymers e.g. polyesters including poly(ethylene terephthalate) can be made using this approach.

Preferred solvents are those with low miscibility in water and which will not react even to a low degree with the acid halide. Alternative solvents are thus tetrachloroethylene, trichloroethylene, and 1,1,1-tri chloroethane. Useful nonhalogenated solvents are benzene, toluene, xylene, hexane, and cyclohexane. The amount of reactants can be adjusted when using these alternative solvents in order to improve the process.

If desired, alternative or additional additives such as fullerenes (e.g. graphene), carbon fiber or metals (e.g. gold, steel, aluminum) or any other additive may be added, along with appropriate ligands that can bind the additive added, in order to anchor the additive efficiently in the matrix.

Example 6. Formation of Carbon Nanotube Reinforced Nylon 6,10, Using Covalent Linkage of the Carbon Nanotubes to the Polymer Matrix In this example SE1 is a single-walled carbon nanotube (SWNT), SE2 is a nylon polymer molecule, Ligand2 is an amide bond, and the polymerization reaction is a polycondensation. The experiments are described in the paper "Tuning the Mechanical Properties of SWNT/Nylon 6,10 Composites with Flexible Spacers at the Interface", Moniruzzaman, M., Chattopadhyay, J., Billups, W. E., Winey, K. I., NanoLetters, 2007, 7(5), 1178-1185.

Functionalization of the SWNT sidewalls with alkyl carboxylic acid groups: The nanotubes were first functionalized with either —$(CH_2)_4$-COOH or —$(CH_2)_9$—COOH by reacting with bromo-carboxylic acid in liquid ammonia in the presence of lithium metal. The carboxylic acid groups were then converted into acid chloride groups by reacting with thionyl chloride. For convenience, the acid chloride functionalized nanotubes carrying the C4 and C9 alkyl group are called C4-SWNT and C9-SWNT, respectively, whereas the unfunctionalized nanotubes are designated SWNT.

SWNT were synthesized by the high-pressure carbon monoxide method (HiPco). In order to functionalize the sidewall of SWNT with carboxylic acid groups, 100 mg of SWNT (8.3 mmol of carbon) were taken into a dry 1,000 mL three neck round-bottom flask fitted with a dry ice condenser under an atmosphere of argon. Ammonia (600 mL) was then condensed into the flask followed by the addition of lithium metal (Aldrich, 600 mg, 8.5 mmol). The suitable bromocarboxylic acid (5-bromovaleric acid; 1.3 equiv. and 10-bromodecanoic acid; 3 equiv., Aldrich) was then added and the mixture was stirred at −33° C. for 12 hrs with slow evaporation of ammonia. The flask was then cooled in an ice bath, and the reaction mixture was quenched by the slow addition of ethanol (15 mL) followed by water (20 mL). The reaction mixture was acidified with 10% HCl, and the nanotubes were extracted into hexane and washed several times with water. The hexane layer was then filtered through a 0.2 μm PTFE membrane and washed successively with ethanol and chloroform. The functionalized SWNT were dried overnight in vacuo at 80° C. To convert the carboxylic acid groups into acid chloride groups, 200 mg of carboxylated SWNT and 30 mL freshly distilled benzene were taken into a 100 mL round-bottom flask fitted with a reflux condenser and a magnetic stir bar. To this mixture were added successively 20 mL of $SOCl_2$ (99.5%, Acros) and 2 mL of DMF. The suspension was stirred at 65° C. for 24 hrs. The solid was then separated by filtration in a 0.2 μm PTFE membrane filter paper and washed thoroughly with anhydrous tetrahydrofuran (THF). Finally, the solid was vacuum-dried at room temperature for 4 hrs. It was estimated that there is one alkyl acid chloride group for every 35 and 32 carbon atoms of the nanotube for C4-SWNT and C9-SWNT, respectively.

Synthesis of Nylon 6,10 and SWNT/Nylon 6,10 composites: The organic phase of the interfacial polycondensation reaction contained the diacid chloride (sebacoyl chloride (9.5%, Acros)) and the suspended nanotubes. The aqueous phase contained the diamine (1,6-hexamethylene diamine (Fluka)) and a base sodium hydroxide to neutralize the byproduct of this reaction, hydrochloric acid. Dichlorobenzene was used as the organic phase as it is immiscible with water and is able to disperse the SWNT.

For the polymerization of neat nylon 6,10, 1.4 g (0.011 mol) of hexamethylene diamine and 0.88 g (0.022 mol) of sodium hydroxide was dissolved in 110 mL water and was placed in a blender. A total of 2.63 g (2.36 mL, 0.011 mol) of sebacoyl chloride was dissolved in 190 mL of dichlorobenzene. The blender was turned on highest speed, and the sebacoyl chloride solution was quickly added to the diamine solution. The reaction was very fast and typically ran for just 3 min. The reaction was terminated by adding a 3% aqueous hydrochloric acid solution to the blender, and the stirring was continued for 1 min more. The polymer was filtered through a 10 μm PTFE membrane (Millipore Mitex), washed repeatedly with water and acetone, and dried at 100° C. under vaccum for 24 hrs.

For the preparation of the nanotube/nylon 6,10 composites, different wt % nanotubes were first dispersed in dichlorobenzene with the aid of bath ultrasonication for 24 hrs, and then sebacoyl chloride was added to the suspension. The reaction was then carried out using the same procedure and reagent ratios, as described for the nylon 6,10 synthesis. Composites with 0.05, 0.1, 0.5, and 1 wt % of the nanotubes were prepared. For the C4-SWNT and C9-SWNT, the loading of the nanotubes represent the wt % of the tubes with the functional groups.

Preparation of fibers: Fibers of the composites were fabricated by melt extrusion at 240° C. using a DACA SpinLine with a spinneret diameter of 500 μm.

Example 7A. Formation of Carbon Nanotube Reinforced Nylon 6,10, Using Non-Covalent Linkage of the Carbon Nanotubes to the Polymer Matrix In this example SE1 is a single-walled carbon nanotube (SWNT), SE2 is a nylon polymer molecule, Ligand1 is a non-covalent ligand, Ligand2 is an amide bond, and the polymerization reaction is a polycondensation.

This example is adapted from Example 6.

Functionalization of the SWNT sidewalls with alkyl carboxylic acid groups using a non-covalent ligand that comprises a carboxylic acid reactive group: Each of the following non-covalent carbon nanotube ligands (Riboflavin; Porphyrine; Pyrenyl; SDBS; Benzene; Naphthalene; Biphenyl; Phenanthrene; Anthracene; Pyrene; Triphenylene; P-terphenyl; Tetraphene; Pyrenecarboxylic acid; SDSA; DTAB; Tween-60; Tween-80; Monostearate; Monooleate; PSPEO; PVP; the polypeptide SKTSGRDQSKRVPRYWNVHRD, the polypeptide SKTSRESSAVQMGKARFLCTH, the polypeptide KTQATSRGTRGMRTSGGFPVG, the polypeptide KTQATSVPRKAARRWEQVDSV, the polypeptide KTQATSESGSAGRQMFVADMG, the polypeptide PQAQDVELPQELQDQHREVEV) are first modified with a carboxylic acid group using standard organic synthesis procedures. In other words, each of the ligands are reacted with a molecule that carries a reactive group X (capable of reacting with the ligand to form a covalent bond at a position of the ligand that does not eliminate the binding of the ligand to SWNT), a linker, and a carboxylic acid group. Thus, the ligands are reacted with a molecule of the structure X-linker-carboxylic acid, to form a modified ligand with the structure Ligand-X-Linker-Carboxylic Acid For the individual ligand it may be necessary to test more than one linkage point to the linker, in order to identify the position on the ligand where the chemical modification inhibits the binding of the ligand to the SWNT the least. Finally, each of the modified ligands is dissolved in an appropriate solvent, such as water, water with DMSO, or dichlorobenzene.

SWNT are synthesized by the high-pressure carbon monoxide method (HiPco). Different wt % nanotubes are then dispersed in dichlorobenzene with the aid of bath ultrasonication for 24 hrs, and each of these nanotube solutions (with different wt % of nanotube) are then distributed to a number of flasks corresponding to the number of modified ligands from above. To each flask is then added a specific modified ligand from above, in a 100-fold molar excess, 1,000-fold molar excess, 10,000-fold molar excess, or 100,000-fold molar excess to the SWNT. At this point we thus have a number of flasks containing different wt % of nanotubes and different modified ligands in different concentrations, in dichlorobenzene. The modified ligands will bind to the SWNTs, thereby functionalizing these with the carboxylic acid group, capable of reacting with the hexamethylenediamine.

Synthesis of SWNT/Nylon 6,10 composites: The organic phase of the interfacial polycondensation reaction contains the diacid chloride (sebacoyl chloride (9.5%, Acros)) and the suspended nanotubes. The aqueous phase contains the diamine (1,6-hexamethylene diamine (Fluka)) and an appropriate buffer with a pH of approximately 9-10. Dichlorobenzene is used as the organic phase as it is immiscible with water and is able to disperse the SWNTs bound by the modified ligands.

Preparation of the nanotube/nylon 6,10 composites: To each of the SWNT-modified ligand suspensions from above is now added sebacoyl chloride. The reaction is then carried out using the same procedure and reagent ratios, as described for the nylon 6,10 synthesis in Example 6, except that an appropriate buffer rather than sodium hydroxide is used.

Composites with 0.05, 0.1, 0.5, and 1 wt % of the nanotubes are prepared. The loading of the nanotubes represent the wt % of the tubes without the modified ligands.

Preparation of fibers: Fibers of the composites are fabricated by melt extrusion at 240° C. using a DACA SpinLine with a spinneret diameter of 500 μm. The fibers will have different strength and flexibility than the neat nylon fibers or SWNT-reinforced nylon fiber described in Example 6.

Example 7B. Formation of Carbon Nanotube-Reinforced Nylon 6,10, Other Types of Nylon, Other Types of Polyamides and Other Types of Polycondensation Polymers, Using Non-Covalent Linkage of the Carbon Nanotubes to the Polymer Matrix In this example SE1 is a single-walled carbon nanotube (SWNT), SE2 is a nylon polymer molecule, Ligand1 is a non-covalent ligand, Ligand2 is an amide bond, and the polymerization reaction is a polycondensation.

This example is adapted from Example 6.

Step 1. Preparation of ligands capable of binding to SWNT, and carrying an acid chloride group. The acid chloride is capable of reacting with an amine, e.g. an amino group of the growing nylon polymer.

Each of the following 29 non-covalent carbon nanotube ligands (Riboflavin; Porphyrine; Pyrenyl; SDBS; Benzene; Naphthalene; Biphenyl; Phenanthrene; Anthracene; 9,10-dihydroanthracene; Pyrene; Triphenylene; P-terphenyl; Tetraphene; Pyrenecarboxylic acid; SDSA; DTAB; Tween-60; Tween-80; Monostearate; Monooleate; PSPEO; PVP; the polypeptide SKTSGRDQSKRVPRYWNVHRD, the polypeptide SKTSRESSAVQMGKARFLCTH, the polypeptide KTQATSRGTRGMRTSGGFPVG, the polypeptide KTQATSVPRKAARRWEQVDSV, the polypeptide KTQATSESGSAGRQMFVADMG, the polypeptide PQAQDVELPQELQDQHREVEV) are prepared carrying an acid chloride, using standard organic synthesis procedures. This is either done by modification of the premade ligand, or alternatively, the acid chloride is introduced during the synthesis of the modified ligand.

Figure 7A:
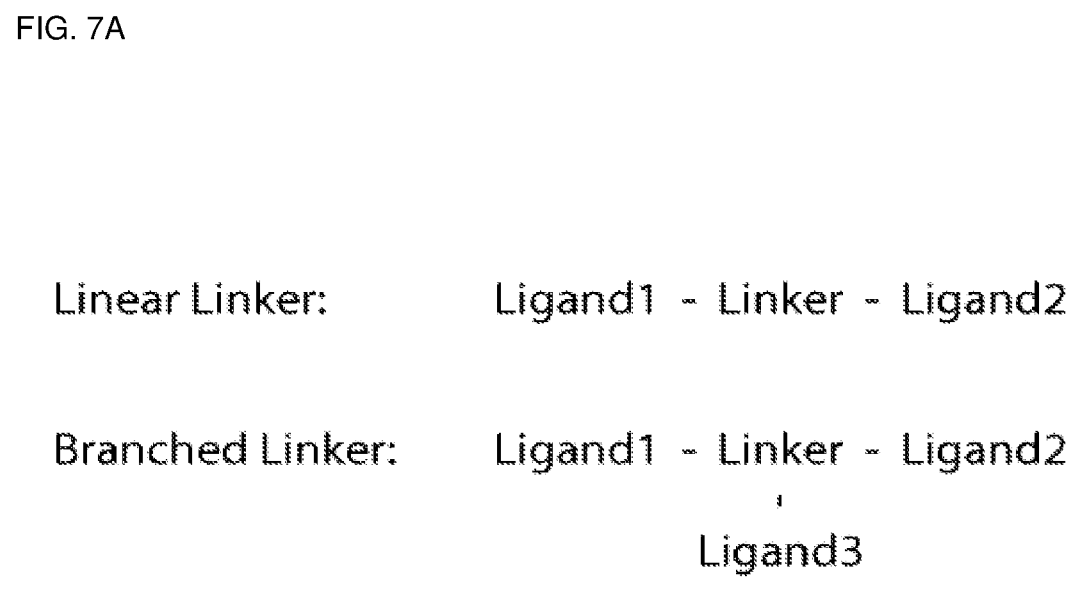

First, the site of attachment of the acid chloride group is defined. Ideally, this site is on the face of the ligand that does not interact with the SWNT, and in most cases it will be preferred that the modification of the ligand does not change its SWNT-binding properties. FIG. 7B-a depicts a possible site of attachment on a general ligand. FIG. 7B-b shows an appropriate position of modification of the 9,10-dihydroanthracene ligand. Modification at this position of the 9,10-dihydroanthracene is known to not inhibit binding of the Anthracene to carbon nanotubes.

For the individual ligand it may be necessary to test more than one linkage point to the linker, in order to identify the position on the ligand where the chemical modification inhibits the binding of the ligand to the SWNT the least.

Second, the acid chloride functionality is introduced at the desired position of the ligand. FIG. 7B-c shows how this may be done in general, e.g. by coupling the ligand to the acid chloride functionality through a linker. FIG. 7B-d shows how this may be done when the ligand is an Anthracene.

Thus, as depicted in FIG. 7B-d the 9,10-dihydroanthracene can be modified by reacting diethyl 4,7-dioxo-1,3,4,7-tetrahydro-2H-indene-2,2-dicarboxylate with anthracene in acetic acid using tetrachloro-p-benzoquinone as an oxidizing agent. The resulting benzoquinone derivative is then reduced with H2 using Pd/C as a catalyst in ethylacetate resulting in free hydroxyl groups, which are subsequently methylated with methyliodide in acetone with K2CO3 as a base to promote the reaction. Converting the ester groups in to free acids is done with lithium chloride in THF and adding hydrochloric acid afterwards. Decarboxylation removing of the acid groups can then potentially be done in the same step or in a separate step by heating the compound to a sufficient high temperature. Conversion of the remaining acid group into the acid chloride is then done by either oxalylchloride or thionylchloride in for example toluene. The acid chloride is reacted with the methyl ester of a hydroxy-carboxylic acid (for example 3-hydroxy-propionic acid, 4-hydroxy-butanoic acid, 5-hydroxy-pentanoic acid, 6-hydroxy-hexanoic acid or 11-hydroxy-undecanoic acid) in THF with pyridine. The resulting methyl-esters are finally converted to the corresponding acid chlorides by first setting free the acid and then reacting them with oxalylchloride or thionyl chloride in THF.

Finally, each of the acid chloride-modified ligands is dissolved in an appropriate solvent, such as dichlorobenzene.

then aliquoted into 28 flasks, each of which is further divided into 4 smaller flasks. To each of the 28 sets of 4 smaller flasks is now added one of the 28 acid chloride modified ligands from above, so that a set of four smaller flasks contains, respectively, a 100-fold molar excess, 1,000-fold molar excess, 10,000-fold molar excess, or 100,000-fold molar excess of a specific acid chloride-modified ligand, relative to the SWNTs.

The modified ligands will bind to the SWNTs, thereby functionalizing these with acid chloride groups.

Step 3. Synthesis of SWNT/Nylon 6,10 composites: In this synthesis, the SWNT/nylon composite is generated at the interphase between an organic phase and an aqueous phase. The organic phase is a dichlorobenzene solution containing diacid chloride (sebacoyl chloride (9.5%, Acros)) and SWNTs bound by acid chloride-modified ligands. The aqueous phase contains a diamine (1,6-hexamethylene diamine (Fluka)) and an appropriate buffer with a pH of approximately 9-10.

The reaction is then carried out similarly to the nylon 6,10 synthesis of Example 6, except that an appropriate buffer rather than sodium hydroxide is used. Thus, to each of the 28×4=112 smaller flasks from above, comprising solutions of SWNT bound by acid chloride-modified ligand, is now added sebacoyl chloride (e.g. 14 mg per mL solution in the smaller flask). 1.4 g of hexamethylene diamine is dissolved in 110 mL of an appropriate aqueous buffer (e.g. 10 mM Na-phosphate pH 10, 100 mM ammonium aetate), and is placed in a blender. The blender is turned on highest speed, and 190 mL of the solution from above, comprising SWNT, modified ligand, and sebacoyl chloride, is quickly added to the diamine solution. The reaction is allowed to proceed for 1-10 minutes, and is then terminated by adding a 3% aqueous hydrochloric acid solution to the blender, and allowing the stirring to continue for 1 min more. The polymer is filtered through a 10 µm PTFE membrane (Millipore Mitex), washed repeatedly with water and acetone, and dried at 100° C. under vacuum for 24 hrs.

FIG. 7B-e depicts the reactions leading to the SWNT/nylon composite.

The final result is thus a SWNT/nylon composite comprising 1 wt % SWNT. A total of 112 different composites are made, involving the use of 28 different SWNT-binding ligands, each of which were mixed with the SWNT at 4 different concentrations.

Where appropriate, ammonium acetate or other salts may be added to the organic phase, to improve the binding of the acid chloride-modified ligand to SWNT.

Other carbon nanotube/nylon composites may be made. Below is shown a few examples of different reactants (acid chlorides and amines) leading to different nylon polymers.

| | Putrescine | HMD | Nonadediamine | Decanediamine | Dodecanediamine |
|---|---|---|---|---|---|
| Adipic acid | Nylon 4/6 | Nylon 6/6 | Nylon 9/6 | Nylon 10/6 | Nylon 12/6 |
| Sebacic acid | Nylon 4/10 | Nylon 6/10 | Nylon 9/10 | Nylon 10/10 | Nylon 12/10 |
| Dodecanedioic acid | Nylon 4/12 | Nylon 6/12 | Nylon 9/12 | Nylon 10/12 | Nylon 12/12 |

Step 2. Functionalization of the SWNT with acid chloride groups, by binding of a non-covalent ligand that comprises an acid chloride group.

SWNTs are synthesized by the high-pressure carbon monoxide method (HiPco), and are dispersed in dichlorobenzene with the aid of bath ultrasonication for 24 hrs, at a concentration that will result in a concentration of the SWNT in the final composite of 1%. The SWNT solution is Likewise, alternative additives may be used in the preparation of nylon composites, such as multi-walled carbon nanotubes, graphene, and other fullerenes capable of binding to one of the 28 ligands mentioned above.

Other polyamides such as the condensation product of terephthalic acid or isophthalic acid with for example bis(para-aminocyclohexyl)methane or trimethylhexamethylenediamine, and other classes of condensation polymers such as polyesters including poly(ethylene terephthalate) can be made using the general approach described in this example.

Preparation of fibers: Fibers of the composites are fabricated by melt extrusion at 240° C. using a DACA SpinLine with a spinneret diameter of 500 μm. The fibers will have different strength and flexibility than the neat nylon fibers and the SWNT-reinforced nylon fiber described in Example 6. Other characteristics such as conductivity will be different as well.

Thus, by appropriate choice of additive (e.g. carbon nanotube), polymer (e.g. 6,10 nylon), ligand (e.g. anthracene), linker length (e.g. 10 atoms between ligand and acid chloride), and reaction conditions, the optimal compromise between flexibility, strength, conductivity, material processing and other important characteristics of the composite may be reached.

Example 7C. The Use of Two Non-Covalent Ligands Arranged in Series, in the Formation of Carbon Nanotube-Reinforced Nylon 6,10, Other Types of Nylon, Other Types of Polyamides and Other Types of Polycondensation Polymers In this example SE1 is a single-walled carbon nanotube (SWNT), SE2 is a nylon polymer molecule, Ligand1 is made up of two carbon nanotube-binding ligands arranged in series, Ligand2 is an amide bond, and the polymerization reaction is a polycondensation.

This example is adapted from Example 7B. All the steps, reactants used and conditions applied in Example 7B are the same for this Example 7C, except for Step 1. Step 1 is performed as follows:

Step 1. Preparation of a Ligand, comprising an acid chloride and two ligands arranged in series, where each of said ligands is capable of binding a carbon nanotube. The acid chloride is capable of reacting with an amine, e.g. an amino group of the growing nylon polymer.

Two Ligands, chosen from the following 29 non-covalent carbon nanotube ligands (Riboflavin; Porphyrine; Pyrenyl; SDBS; Benzene; Naphthalene; Biphenyl; Phenanthrene; 9,10-dihydro-Anthracene; Anthracene; Pyrene; Triphenylene; P-terphenyl; Tetraphene; Pyrenecarboxylic acid; SDSA; DTAB; Tween-60; Tween-80; Monostearate; Monooleate; PSPEO; PVP; the polypeptide SKTSGRDQSKRVPRYWNVHRD, the polypeptide SKTSRESSAVQMGKARFLCTH, the polypeptide KTQATSRGTRGMRTSGGFPVG, the polypeptide KTQATSVPRKAARRWEQVDSV, the polypeptide KTQATSESGSAGRQMFVADMG, the polypeptide PQAQDVELPQELQDQHREVEV), are mutually linked, and linked to an acid chloride, using standard organic synthesis procedures. The two ligands chosen may be identical or non-identical.

First, the sites for linking the two ligands together, as well as the site for linking to the acid chloride group, is defined. Ideally, the positions for linking are on the face of the ligands that does not interact with the SWNT. FIG. 7C-a depicts possible sites of generally linking two ligands as well as linking to the acid chloride group. FIG. 7C-b shows how the two ligands and the acid chloride group may be linked in the general sense.

FIG. 7C-c shows how two specific ligands, namely the Anthracene ligand and the peptide ligand SKTSGRDQSKRVPRYWNVHRD, may be linked in series, and linked to acid chloride.

The resulting molecule is formed by reacting 2-(2,5-dioxo-2,5-dihydro-1H-pyrrol-1-yl)ethyl 4,11-dimethoxy-2,3,5,10-tetrahydro-1H-5,10-[1,2]benzenocyclopenta[b]anthracene-2-carboxylate and methyl 5-((3-(2,5-dioxo-2,5-dihydro-1H-pyrrol-1-yl)propyl)amino)-5-oxopentanoate with the peptide in either a statistical procedure or by reacting the peptide by slowly adding one of the maleimide derivatives. Instead of having an ethylene segment between the maleimide and the anthracene derivative it is possible to have for example, but not limited to, a propyl, butyl, pentyl, hexyl or heptyl segment. Likewise for methyl 5-((3-(2,5-dioxo-2,5-dihydro-1H-pyrrol-1-yl)propyl)amino)-5-oxopentanoate it is possible to have for example butyl, pentyl, hexyl, heptyl or an octyl segment between the maleimide moiety and N on the pending amide. Yet another aspect could be to include more amino acids in the peptide sequence.

Once the final molecule (comprising two carbon nanotube-binding ligands in series, and carrying an acid chloride), has been prepared, the final molecule is dissolved in an appropriate solvent, such as dichlorobenzene. The final molecule now corresponds to the "acid chloride-modified ligand" of Example 7B, and Step 2 and the further steps and reactions of Example 7B can now be performed, to produce the desired composite.

Except for step 1, all alternative reagents, reaction conditions and comments mentioned in Example 7B apply to Example 7C as well.

Example 7D. The Use of Two Non-Covalent Ligands Arranged in Parallel, in the Formation of Carbon Nanotube-Reinforced Nylon 6,10, Other Types of Nylon, Other Types of Polyamides and Other Types of Polycondensation Polymers In this example SE1 is a single-walled carbon nanotube (SWNT), SE2 is a nylon polymer molecule, Ligand1 is made up of two carbon nanotube-binding ligands arranged in parallel, Ligand2 is an amide bond, and the polymerization reaction is a polycondensation.

This example is adapted from Example 7B. All the steps, reactants used and conditions applied in Example 7B are the same for this Example 7D, except for Step 1. Step 1 is performed as follows:

Step 1. Preparation of a Ligand, comprising an acid chloride and two ligands arranged in parallel, where each of said ligands is capable of binding a carbon nanotube. The acid chloride is capable of reacting with an amine, e.g. an amino group of the growing nylon polymer.

Two Ligands, chosen from the following 29 non-covalent carbon nanotube ligands (Riboflavin; Porphyrine; Pyrenyl; SDBS; Benzene; Naphthalene; Biphenyl; Phenanthrene; 9,10-dihydroa-anthracene; Anthracene; Pyrene; Triphenylene; P-terphenyl; Tetraphene; Pyrenecarboxylic acid; SDSA; DTAB; Tween-60; Tween-80; Monostearate; Monooleate; PSPEO; PVP; the polypeptide SKTSGRDQSKRVPRYWNVHRD, the polypeptide SKTSRESSAVQMGKARFLCTH, the polypeptide KTQATSRGTRGMRTSGGFPVG, the polypeptide KTQATSVPRKAARRWEQVDSV, the polypeptide KTQATSESGSAGRQMFVADMG, the polypeptide PQAQDVELPQELQDQHREVEV), are mutually linked, and linked to an acid chloride, using standard organic synthesis procedures. The two ligands chosen may be identical or non-identical.

First, the sites for linking the two ligands together, as well as the site for linking to the acid chloride group, is defined.

Ideally, the positions for linking are on the face of the ligands that does not interact with the SWNT. FIG. 7D-a depicts how the two ligands and the acid chloride group may be linked in the general sense.

FIG. 7D-b shows how two specific and identical ligands, namely two molecules of 9,10-dihydro-anthracene, may be linked in parallel, and linked to acid chloride. This class of molecules can be prepared starting from a ω-hydroxy-carboxylic acid, where the hydroxyl group is converted into a bromine atom and the carboxylic acid functionality converted into an ester, for example, but not limited to, a methyl ester. The bromine functionality is converted into an amine functionality by for example a Gabriel type reaction. Subsequently, the resulting amine is converted into a diol which can be reacted with the acid chloride of the 9,10-dihydroanthracene derivative. Finally, the methyl ester is converted into an acid chloride. The length of the alkyl chains are determined by r, p and q which can be a number from 0 to 100, preferably 0 to 50, more preferably 0 to 40 and even more preferably 0 to 30.

Once the final molecule (comprising two carbon nanotube-binding ligands in parallel, and carrying an acid chloride), has been prepared, the final molecule is dissolved in an appropriate solvent, such as dichlorobenzene. The final molecule now corresponds to the "acid chloride-modified ligand" of Example 7B, and Step 2 and the further steps and reactions of Example 7B can now be performed, to produce the desired composite.

Except for step 1, all alternative reagents, reaction conditions and comments mentioned in Example 7B apply to this Example 7D as well.

Example 7E. The Use of Two Covalent Ligands Arranged in Parallel, in the Formation of Carbon Nanotube-Reinforced Nylon 6,10, Other Types of Nylon, Other Types of Polyamides and Other Types of Polycondensation Polymers In this example SE1 is a multi-walled carbon nanotube (MWNT), SE2 is a nylon polymer molecule, Ligand1 is a noncovalent ligand, and Ligand2 is made up of two amide bonds arranged in parallel, and the polymerization reaction is a polycondensation.

This example is adapted from Example 7B. All the steps, reactants used and conditions applied in Example 7B are the same for this Example 7E, except that in this Example 7E, two rather than one acid chloride group are linked to the carbon nanotube-binding ligand. Thus, Step 1 of Example 7B is modified as follows:

Step 1. Preparation of ligands capable of binding to MWNT, and carrying two acid chloride groups. The acid chloride groups are capable of reacting with amines, e.g. amino groups of the growing nylon polymers.

Each of the following 29 non-covalent carbon nanotube ligands (Riboflavin; Porphyrine; Pyrenyl; SDBS; Benzene; Naphthalene; Biphenyl; Phenanthrene; Anthracene; 9,10-dihydroanthracne; Pyrene; Triphenylene; P-terphenyl; Tetraphene; Pyrenecarboxylic acid; SDSA; DTAB; Tween-60; Tween-80; Monostearate; Monooleate; PSPEO; PVP; the polypeptide SKTSGRDQSKRVPRYWNVHRD, the polypeptide SKTSRESSAVQMGKARFLCTH, the polypeptide KTQATSRGTRGMRTSGGFPVG, the polypeptide KTQATSVPRKAARRWEQVDSV, the polypeptide KTQATSESGSAGRQMFVADMG, the polypeptide PQAQDVELPQELQDQHREVEV) are prepared carrying two acid chlorides, using standard organic synthesis procedures. This is either done by modification of the premade ligand, or alternatively, the acid chlorides are introduced during the synthesis of the modified ligand.

First, the site of attachment of the two acid chloride groups is defined. Ideally, this site is on the face of the ligand that does not interact with the MWNT, and in most cases it will be preferred that the modification of the ligand does not change its MWNT-binding properties. For the individual ligand it may be necessary to test more than one linkage point to the linker, in order to identify the position on the ligand where the chemical modification inhibits the binding of the ligand to the MWNT the least.

The two acid chloride groups are introduced at the desired position of the ligand. FIG. 7E-a shows how this may be done when the ligand is 9,10-dihydro-anthracene.

Thus, as depicted in FIG. 7E-a the Anthracene can be modified very similarly to the synthesis in FIG. 7B-d, however, instead of decarboxylating to remove one of the acid groups both acid groups are retained and converted in acid chlorides. To add further alkyl spacers into the molecule this acid chloride might be reacted further as shown in FIG. 7E-a, where the length of the spacers are determined by p and q, which may be any number from 0 to 100, preferably 0 to 50, more preferably 0 to 40 and even more preferably 0 to 30. Finally, each of the acid chloride-modified ligands is dissolved in an appropriate solvent, such as dichlorobenzene.

From this point on, Step 2 and the further steps of Example 7B are followed. Except for step 1, all alternative reagents, reaction conditions and comments mentioned in Example 7B apply to this Example 7E as well.

In the final carbon nanotube/nylon composite, one carbon nanotube-binding ligand may thus be covalently linked to two nylon polymers, as depicted in FIG. 7E-b.

Example 8. Melt Processing or Solution Mixing to Form Carbon Nanotube Reinforced Polymer In this example, SE1 is a carbon nanotube, Ligand1 is a carbon nanotube binding ligand that binds carbon nanotubes non-covalently, the linker is an amide bond, Ligand2 is a carbon nanotube binding ligand, and SE2 is a carbon nanotube.

Synthesis of carbon nanotube ligands comprising either an amino group or a carboxylic acid group: Each of the following non-covalent carbon nanotube ligands (Riboflavin; Porphyrine; Pyrenyl; SDBS; Benzene; Naphthalene; Biphenyl; Phenanthrene; Anthracene; Pyrene; Triphenylene; P-terphenyl; Tetraphene; Pyrenecarboxylic acid; SDSA; DTAB; Tween-60; Tween-80; Monostearate; Monooleate; PSPEO; PVP; the polypeptide SKTSGRDQSKRVPRYWNVHRD, the polypeptide SKTSRESSAVQMGKARFLCTH, the polypeptide KTQATSRGTRGMRTSGGFPVG, the polypeptide KTQATSVPRKAARRWEQVDSV, the polypeptide KTQATSESGSAGRQMFVADMG, the polypeptide PQAQDVELPQELQDQHREVEV) are split into two, where one portion is modified with a carboxylic acid group using standard organic synthesis procedures, and the other is modified with an amino group using standard organic synthesis procedures. In other words, each of the ligands are reacted with a molecule that carries a reactive group X (capable of reacting with the ligand to form a covalent bond at a position of the ligand that does not eliminate the binding of the ligand to SWNT), a linker, and either a carboxylic acid group or amino group. Thus, the ligands are reacted with a molecule of the structure X-linker-Y (where Y is a carboxylic acid or an amino group), to form a modified ligand with the structure Ligand-X-linker-Y For the individual ligand it may be necessary to test more than one linkage point to the linker, in order to identify the position on the ligand where the chemical modification inhibits the binding of the ligand to the SWNT the least. Finally, each of the modified ligands is dissolved in an appropriate solvent, such as water, water with DMSO, or dichlorobenzene.

Functionalization of the carbon nanotubes by non-covalent binding of carbon nanotubes to the modified ligands described above, carrying either an amino group or a caraboxylic acid group: An appropriate amount of carbon nanotube is dispersed into an appropriate solvent, such as dichlorobenzene. Then the solution is split into two solutions, A and B. Each of these solutions is further split into a number of solutions corresponding to the number of different carbon nanotube ligands described above.

To each solution A is now added (to each) a specific modified ligand carrying an amino group (from above), in a 100-fold molar excess, 1,000-fold molar excess, 10,000-fold molar excess, or 100,000-fold molar excess to the SWNT. Likewise, to each solution B is now added (to each) a specific modified ligand carrying a carboxylic acid (from above), in a 100-fold molar excess, 1,000-fold molar excess, 10,000-fold molar excess, or 100,000-fold molar excess to the SWNT.

The solutions are ultrasonicated for 24 hrs. Finally, for each ligand and for each concentration of modified ligand above, the two solutions A and B are combined. We thus now have a number of solutions, each of which comprise carbon nanotubes with an excess of a given ligand modified with either amine or carboxylix acid.

Melt processing to form carbon nanotube reinforced polymers: A preformed polymer, applicable to melt processing, is now melted under appropriate conditions, split into a number of containers, and to each container is added an appropriate amount of any one of the abovementioned combined (A+B) solutions. The melted polymer is now cooled, to form the carbon nanotube reinforced polymer.

Solution mixing to form carbon nanotube reinforced polymers: A preformed polymer, applicable to solution mixing, is added appropriate solvent under appropriate conditions, split into a number of containers, and to each container is added an appropriate amount of any one of the abovementioned combined (A+B) solutions. The organic solvent is now removed, to form the carbon nanotube reinforced polymer.

9. Synthesis and Processing of Fullerene/Polyethylene (PE) Composites with Attractive Strength and/or Conductivity Characteristics.

This example involves production and processing of fullerene/PE composites, where SE1 is a fullerene, SE2 is a PE polymer or a fullerene, and where noncovalent ligands are used to anchor the fullerenes to other fullerenes or the PE directly. In situ polymerization as well as downstream processing of the composite is exemplified.

Background

Fullerenes, such as carbon nanotubes, graphene, fullerenes (such as C60, C70, C76, C78, C80, C82, C84 and C90), and polycyclic aromatic hydrocarbons have attractive features such as high strength and high heat conductivity and electrical conductivity. Covalent modifications to the fine structure of the fullerenes interfere with their attractive strength- and conductivity characteristics. Therefore, covalent anchoring of fullerenes in a composite is sometimes not advantageous; in these cases, it is preferable to anchor the fullerenes by non-covalent association with the polymer.

Preparation of Fullerene-Binding Ligand Capable of Becoming Incorporated in the PE Polymer, or Incorporated as Side Chains to the PE Polymer.

Figure 1:
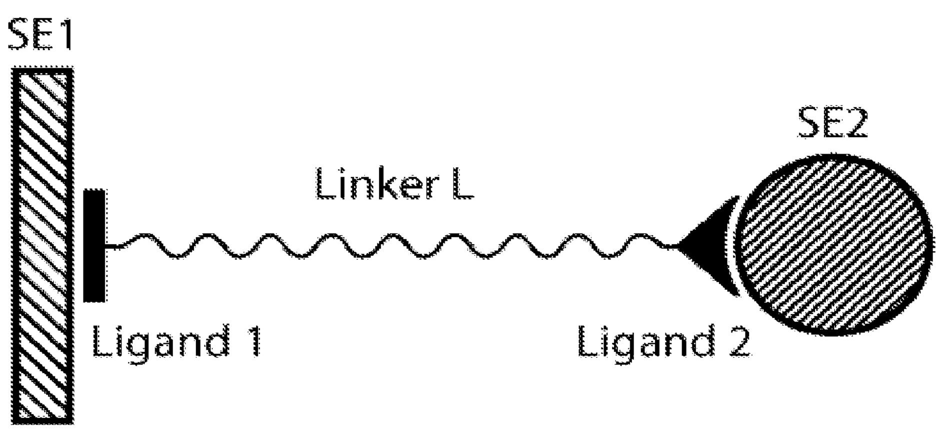
Figure 4:
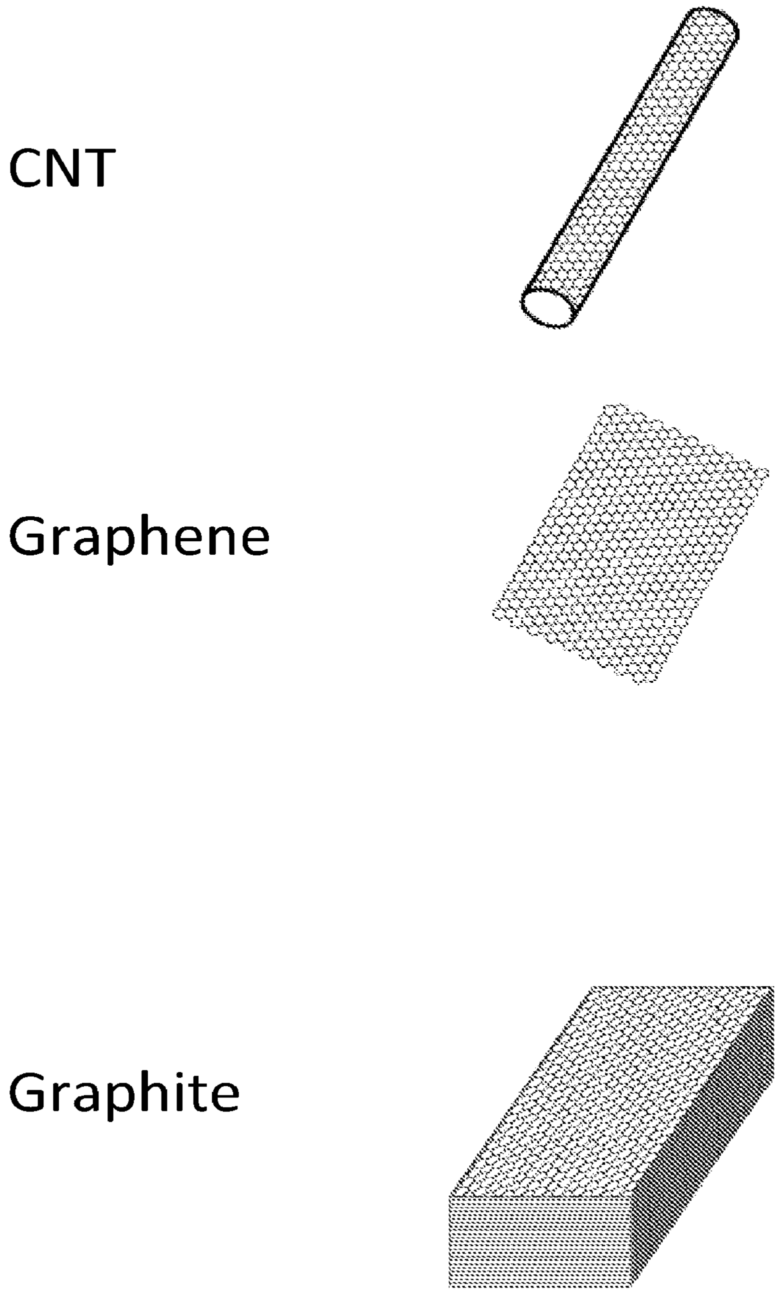
FIG. 4 illustrates examples of fullerene additives.

Compound 9A-1: Phenanthrene, a CNT-binding ligand, is here modified in order to become attached as a sidechain to the PE polymer. Compound 9A-1, a phenanthrene derivative carrying an octene ring at a position that does not interfere significantly with the binding of the Phenanthrene moiety to the CNT, is prepared by for example reacting ethyl phenanthrene-9-carboxylate with (Z)-cyclooct-4-en-1-yl-methanol in a transesterification reaction. The synthesis is shown in FIG. 9A-1.

Compound 9A-2a: Pyrene, a CNT- and graphene-binding ligand, is here modified to form a dimer of pyrene, capable of becoming attached as a sidechain to the PE polymer, thereby linking two PE polymers. The Compound 9A-2a is prepared by a route inspired by Tetrahedron Letters, 52(47), 6284-6287, where the starting material is (6-bromo-3,8-dibutylpyren-1-yl)trimethylsilane. This compound is reacted with a di-boronic acid, with an example shown in FIG. 9A-2 in a Suzuki coupling, thereby linking two pyrene units together. Subsequently, the bromine functionalities are converted into carboxylic acids by reacting with butyllithium and carbondioxide. An esterifaction with (Z)-cyclooct-4-en-1-ylmethanol results in di-pyrene moiety that can be polymerized into a polyethylene by reaction with for example Grubb's $2^{nd}$ generation catalysts followed by hydrogenation. A variety of different di-boronic acids can be used as linkers between the two pyrene moieties. Examples includes (ethyne-1,2-diylbis(4,1-phenylene))diboronic acid or other molecules with alternating triple bonds and benzene rings end-capped with benzenes functionalized with boronic acids. Some examples are shown in FIG. 9A-2.

Figures 1, 9A:
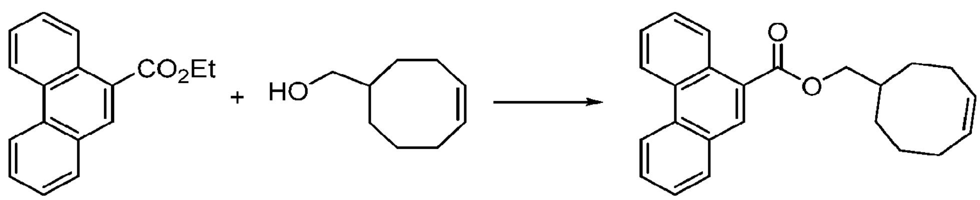
Figures 3, 9A:
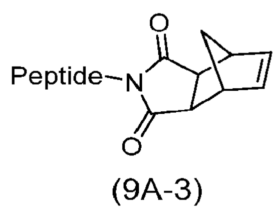
FIG. 3A shows in-situ polymerization.
FIG. 3B shows solution mixing or melt processing to make CMUs.
Figure 9A:
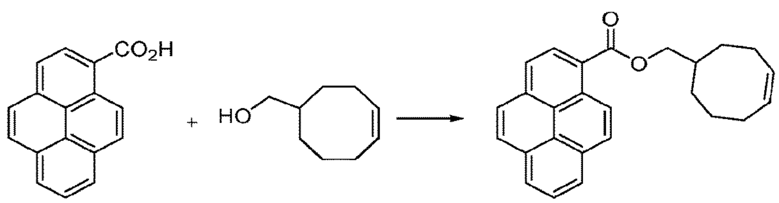
Figure 4:
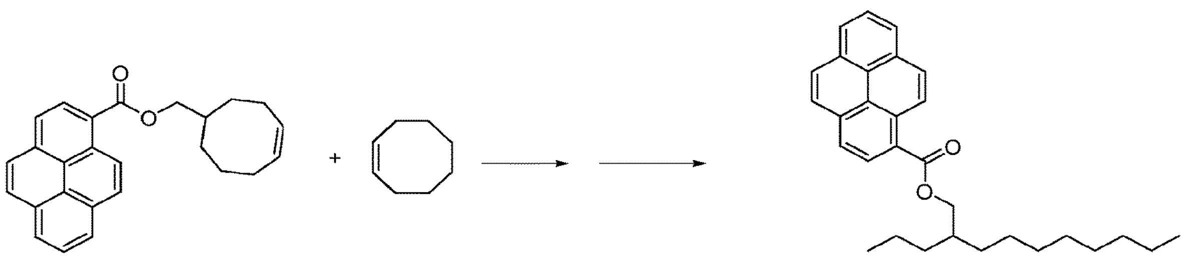
Figures 5, 9A:
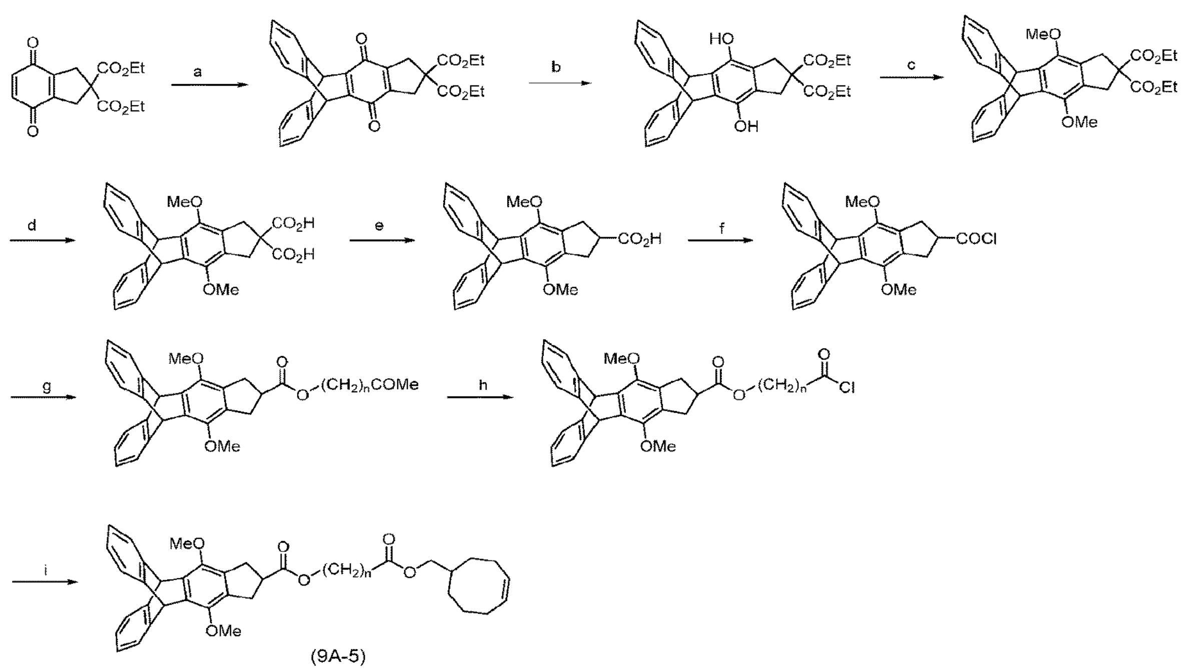
Figures 1, 9B:
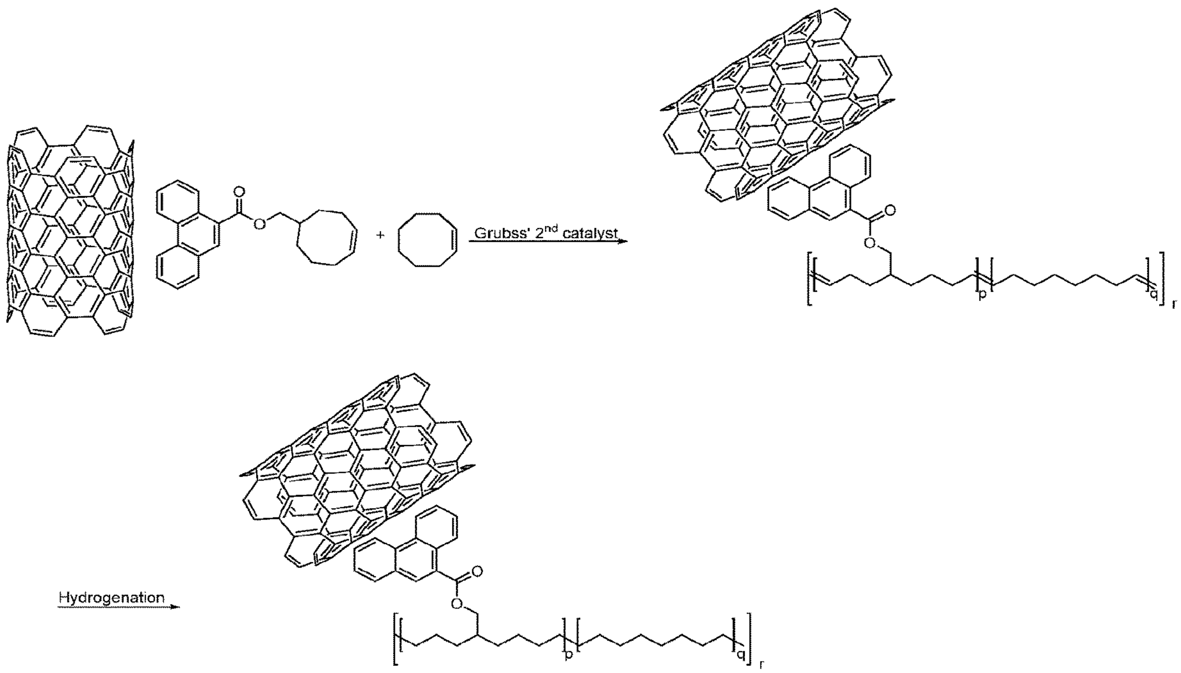
Figures 2, 9B:
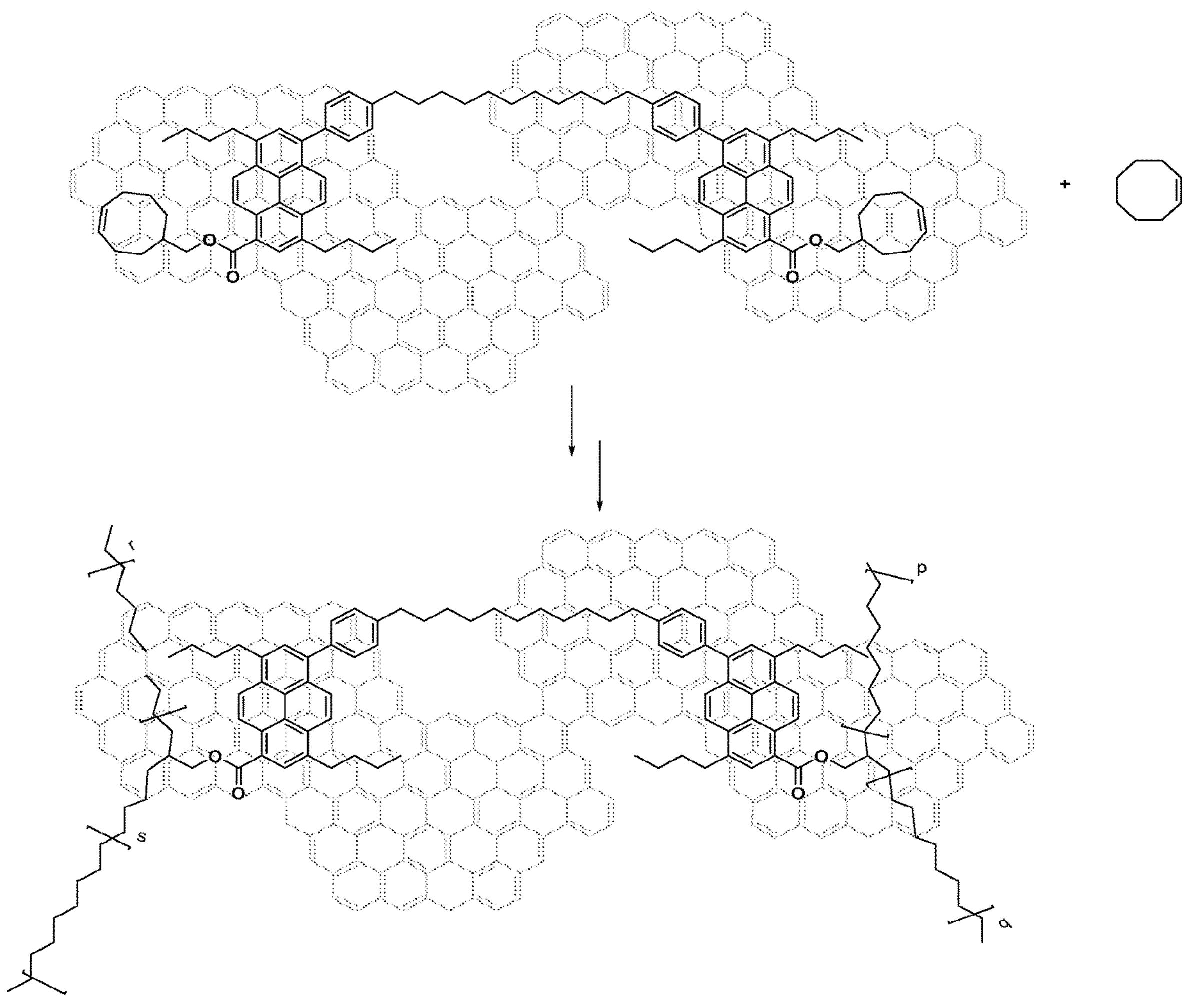
Figures 3, 9B:
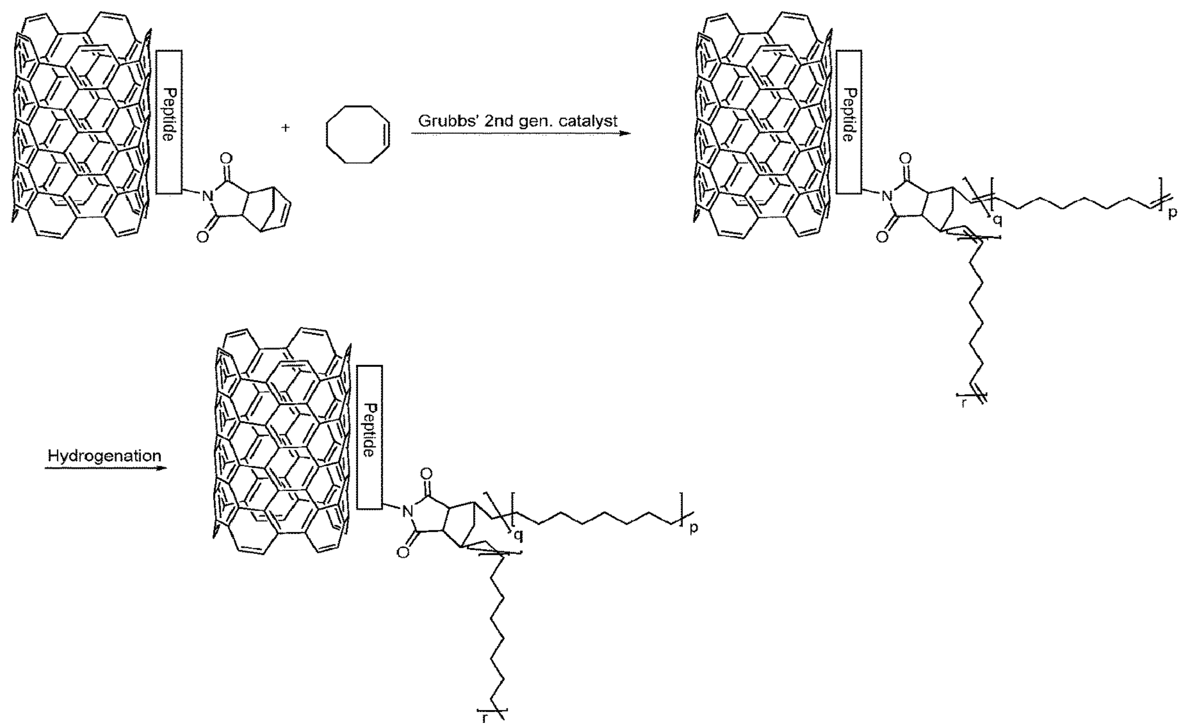
Figures 4, 9B:
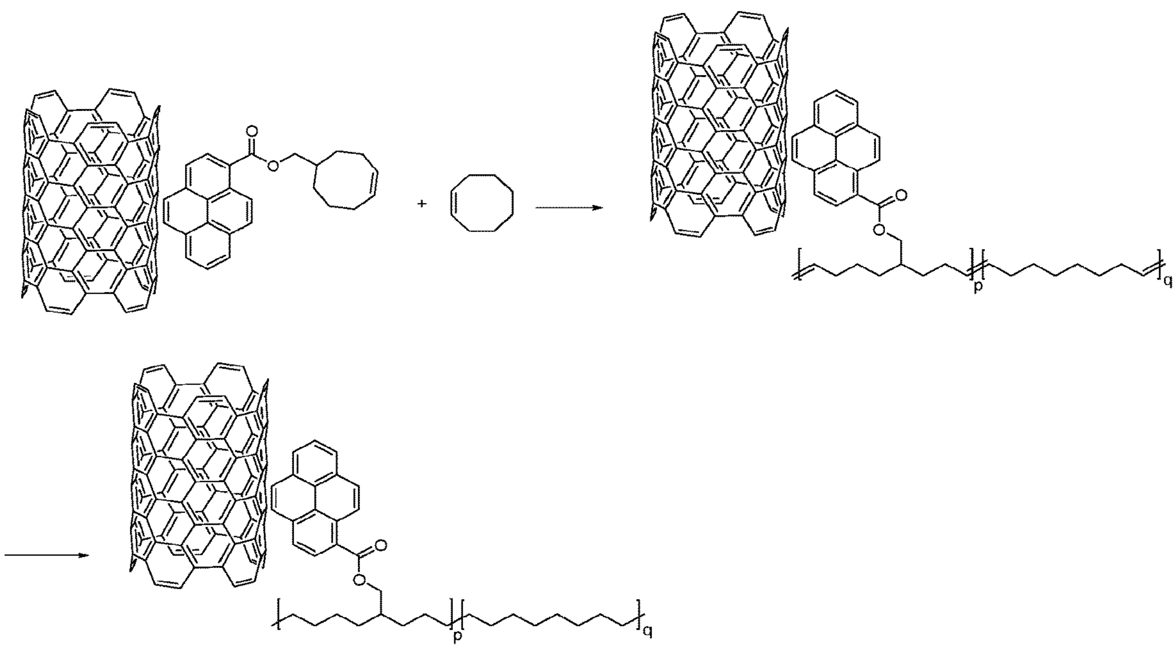
Figures 5, 9B:
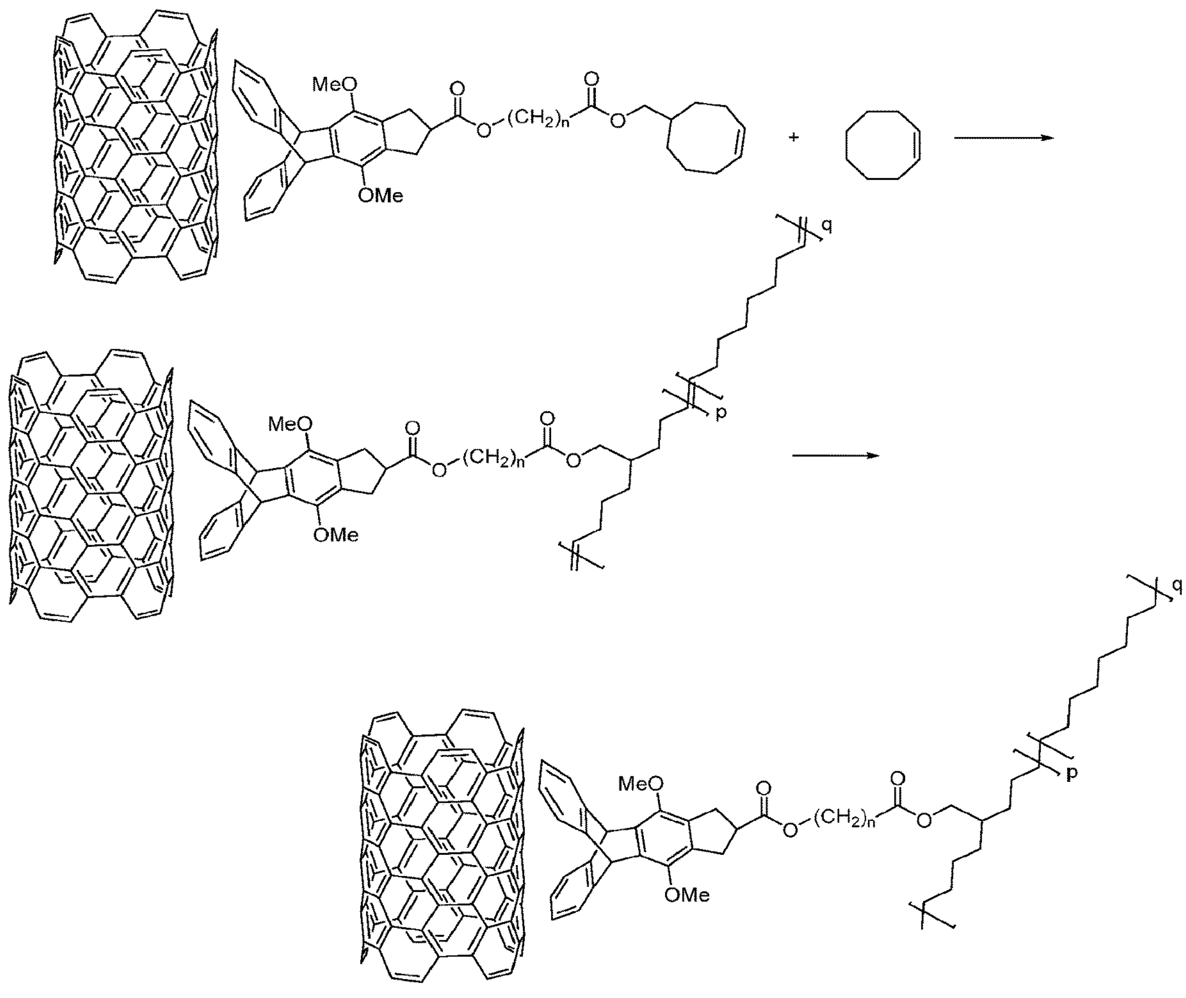

The synthesis is shown in FIG. 9A-2.

Compound 9A-3: The SWNT-binding peptide GSSGSSPQAQDVELPQELQDQHREVEV-GSSGSS, is here modified in order to become attached as a sidechain to the PE polymer. The peptide derivative is prepared by classical solid phase chemistry for preparing peptides: The synthesis can be carried out using standard FMOC-based solid phase synthesis using for example a Rink amide MBHA resin and automated synthesis. FMOC deprotection can be done using 20% 4-methylpiperidine in DMF and the amino acid couplings can be done with HBTU and DIPEA. The final peptide sequence can then be cleaved from the resin using a mixture of TFA, water and TIPS. Where needed, standard protection group chemistry was employed. The said peptide can then be polymerized with cyclooctene as the co-monomer and Grubbs' $2^{nd}$ generation catalyst as shown in FIG. 9A-3. Subsequently, the double bonds can be hydrogenated under suitable conditions such that the peptide bonds are not cleaved; the result is a polyethylene type polymer derivative with CNT binding peptide sequences.

Compound 9A-4b: The CNT-binding and graphene-binding ligand pyrene is here modified to become incorporated in the PE polymer. The pyrene derivative is prepared by reacting pyrene-1-carboxylic acid with (Z)-cyclooct-4-en-1-ylmethanol in an esterification reaction. This derivative can then be polymerized in a ring-opening methathesis polymerization reaction using for example Grubbs' $2^{nd}$ generation catalyst and cyclooctene. Subsequent hydrogenation leaves a polyethylene grafted with pyrene moieties.

Compound 9A-5: The CNT-binding ligand Anthracene is here linked, via a relatively long linker, to cyclococtene as shown in FIG. 9A-5, where n can be any number from 0 to 100. The synthesis of this compound follows the previously outlined synthesis but the acid chloride is in this case reacted with (Z)-cyclooct-4-en-1-ylmethanol. Polymerization using the ROMP methodology outlined previously with cyclooctene as the co-mononer results in an unsaturated polymer, where the spacing between the anthracene moieties in the polymer chain can vary. For example, two of the cyclooctene containing 9,10-dihydroanthracene derivatives can be reacted with each other in the ROMP reaction thus giving a comparatively short distance between two 9,10-dihydroanthracene molecules.

Preparation of Fullerene/PE Composites with Attractive Characteristics.

The PE composites are produced, by i) performing the polymerization, and then ii) reducing the double bonds of the polymer (e.g. by hydrogenation). Thereafter, as a final processing step, the solvent may be removed (e.g. by evaporation), in which case the composite may have been made in a casting mould (in situ polymerization). Alternatively, the composite material, present at this step in solvent, may be processed as described in the paragraph "Processing of fullerene/PE composites" below.

Composites Comprising Compound 9A-1.

Compound 9A-1 may be used to prepare a CNT/PE composite, in which SE1 is a CNT, Ligand1 is Phenanthrene, Ligand 2 is an ester linkage, and SE2 is a polyethylene. The synthesis is depicted in FIG. 9B-1, and involves the following synthetic steps:

i) Polymerization using Grubbs' 2$^{nd}$ Generation catalyst, at a temperature between 20 and 140° C. under oxygen-free conditions, i.e. solvents have undergone freeze-pump-thaw cycles and the reaction is run under an argon atmosphere. CNTs are dispersed in an appropriate solvent, such as toluene, xylene, tetrahydrofurane, dichloromethane or other inert halogenated solvents (optionally mediated by sonication). Compound 9A-1 (at a molar excess to CNT of e.g. 100-10,000-fold), and Octene (at a molar ratio of 0.01 to 100,000 relative to Compound 9A-1 of between 5 and 100), are added to the CNT dispersion together with Grubbs' 2$^{nd}$ Generation catalyst. Polymerization is allowed to proceed until insignificant new polymer is generated, and is then terminated by quenching the reaction mixture with methanol precipitating the polymer, which is then isolated by filtration and dried.

ii) Reduction of double bonds, e.g. by hydrogenation is done by dispersing the isolated unsaturated polymer in a suitable solvent such as xylene, tetrahydrofurane, toluene or halogenated solvents. Hydrogenation can be done with hydrogen gas in a pressurized reactor and employing a suitable catalyst such as Pd/C. Another example is to use tosyl hydrazine and trimethylamine.

Composites Comprising Compound 9A-2.

Compound 9A-2 may be used to prepare a graphene/PE composite, in which SE1 is graphene, Ligand1 is a pyrene dimer, Ligand2 is a carbon-carbon bond, and SE2 is a PE polymer. Alternatively, the CMU employed can also be considered to involve a SE1 which is a PE polymer, a Ligand1 which is a carbon-carbon bond, a linker which comprises the pyrene dimer, a Ligand2 which is a carbon-carbon bond, and a SE2 which is a PE polymer. The synthesis is depicted in FIG. 9B-2, and involves the following steps:

i) Polymerization. Compound 9A-2 and cyclooctene is mixed with graphene (5 wt % of graphene and 95 wt % of Compound 9A-2 and cyclooctene) in an appropriate solvent such as benzene, toluene, xylene, halogenated solvents such as dichloromethane, tetrachloroethane, and chlorobenzene. Optionally, sonication is employed to better disperse the graphene. After the Compound 9A-2 has been allowed to bind to the graphene the polymerization is started by adding a catalyst such as Grubbs' 2$^{nd}$ generation catalyst or other suitable Ruthenium catalysts. Polymerization is allowed to proceed until a suitable molecular weight is obtained. The reaction mixture is then quenched with methanol, which will precipitate the unsaturated polymer that has graphene bounded.

ii) Reduction of double bonds, e.g. by hydrogenation is done by dispersing the isolated unsaturated polymer in a suitable solvent such as xylene, tetrahydrofurane, toluene or halogenated solvents. Hydrogenation can be done with for example hydrogen gas in a pressurized reactor and employing a suitable catalyst such as Pd/C. Another example is to use tosyl hydrazine and trimethylamine.

Composites Comprising Compound 9A-3.

Compound 9A-3 may be used to prepare a CNT/PE composite, in which SE1 is a CNT, Ligand1 is a polypeptide, the linker is a 3a,4,7,7a-tetrahydro-1H-4,7-methanoisoindole-1,3(2H)-dione, Ligand2 is a carbon-carbon bond, and SE2 is a polyethylene polymer. The synthesis is described in FIG. 9B-3, and involves the following steps:

i) Polymerization. Compound 9A-3, at a concentration of e.g. 1-100 mM is first mixed with CNT (at a concentration resulting in a final concentration in the composite of 10 wt %), in an appropriate solvent such as benzene, toluene, xylenes, and halogenated solvents such as dichloromethane, tetrachloroethane, and chlorbenzene. Optionally, sonication is employed to better disperse the CNT. After Compound 9A-3 has been allowed to bind to the CNT, a polyethylene precursor such as cyclooctene is added at a molar ratio of 0.01 to 100.000, together with the catalyst such as Grubbs' first Ruthenium, dichloro(phenylmethylene)bis(tricyclohexylphosphine)), second Ruthenium, [1,3-bis-(2,4,6-trimethylphenyl)-2-imidazolidinylidene]dichloro (phenylmethylene)(tricyclohexylphosphine)) or third generation catalyst or the Hoveyda-Grubbs catalyst (Ruthenium, [1,3-bis(2,4,6-trimethylphenyl)-2-imidazolidinylidene]dichloro[[2-(1-methylethoxy)phenyl] methylene], [1,3-Bis(2-methylphenyl)-2-imidazolidinylidene]dichloro(2-isopropoxyphenylmethylene) ruthenium(II), 1,3-Bis(2,4,6-trimethylphenyl)-2-imidazolidinylidene]dichloro[3-(2-pyridinyl-κN) propylidene-κC]ruthenium(II), [1,3-Bis(2-methylphenyl)-2-imidazolidinylidene]dichloro (benzylidene) (tricyclohexylphosphine)ruthenium(II), Dichloro(3-methyl-2-butenylidene)bis(tricyclohexylphosphine)ruthenium(II), [1,3-Bis(2,4,6-trimethylphenyl)-2-imidazolidinylidene]dichloro(3-methyl-2-butenylidene) (tricyclohexylphosphine)ruthenium(II), [1,3-Bis(2,4,6-trimethylphenyl)-2-imidazolidinylidene]dichloro(benzylidene)bis(3-bromopyridine) ruthenium(II)). Polymerization is allowed to proceed until insignificant new polymer is generated, and is then terminated by quenching with methanol and isolating the precipitated polymer by filtration.

ii) Reduction of double bonds, e.g. by hydrogenation is done by dispersing the isolated unsaturated polymer in a suitable solvent such as xylene, tetrahydrofurane, toluene or halogenated solvents. Hydrogenation can be done with for example hydrogen gas in a pressurized reactor and employing a suitable catalyst such as Pd/C. Another example is to use tosyl hydrazine and trimethylamine.

Composites Comprising Compound 9A-4a.

Compound 9A-4a may be used to prepare a CNT/PE composite, in which SE1 is a CNT, Ligand1 is a pyrene, the linker comprises an ester bond, Ligand2 is a carbon-carbon bond, and SE2 is a polyethylene polymer. In fact, two SE2 are linked to each pyrene. The synthesis is described in FIG. 9B-4, and involves the following steps:

i) Polymerization. Compound 9A-4a, at a concentration of e.g. 1-100 mM is first mixed with CNT (at a concentration resulting in a final concentration in the composite of 0.1; 1; or 10 wt %), in an appropriate solvent such as benzene, toluene, xylene, or halogenated solvents such as dichloromethane, tetrachloroethane, and chlorobenzene. Optionally, sonication is employed to better disperse the CNTs. After Compound 9A-4a has been allowed to bind to the CNT, a polyethylene precursor such as cyclooctene is added at a concentration of 1-100 mM together with a catalyst such as Grubbs' first Ruthenium, dichloro(phenylmethylene)bis(tricyclohexylphosphine)), second (Ruthenium, [1,3-bis-(2,4,6-trimethylphenyl)-2-imidazolidinylidene]dichloro (phenylmethylene)(tricyclohexylphosphine), or third generation catalyst or the Hoveyda-Grubbs catalyst (Ruthenium, [1,3-bis(2,4,6-trimethylphenyl)-2-imidazolidinylidene]dichloro[[2-(1-methylethoxy)phenyl] methylene], [1,3-Bis(2-methylphenyl)-2-imidazolidinylidene]dichloro(2-isopropoxyphenylmethylene) ruthenium(II), 1,3-Bis(2,4,6-trimethylphenyl)-2-imidazolidinylidene]dichloro[3-(2-pyridinyl-κN) propylidene-κC]ruthenium(II), [1,3-Bis(2-methylphenyl)-2-imidazolidinylidene]dichloro (benzylidene) (tricyclohexylphosphine)ruthenium(II), Dichloro(3-methyl-2-butenylidene)bis(tricyclohexylphosphine)ruthenium(II), [1,3-Bis(2,4,6-trimethylphenyl)-2-imidazolidinylidene]dichloro(3-methyl-2-butenylidene) (tricyclohexylphosphine)ruthenium(II), [1,3-Bis(2,4,6-trimethylphenyl)-2-imidazolidinylidene]dichloro(benzylidene)bis(3-bromopyridine) ruthenium(II)). Polymerization is allowed to proceed until insignificant new polymer is generated, and is then terminated by quenching with methanol and isolating the precipitated polymer by filtration.

ii) Reduction, e.g. by hydrogenation is done by dispersing the isolated unsaturated polymer in a suitable solvent such as xylene, tetrahydrofurane, toluene or halogenated solvents. Hydrogenation can be done with for example hydrogen gas in a pressurized reactor and employing a suitable catalyst such as Pd/C. Another example is to use tosyl hydrazine and trimethylamine.

Composites Comprising Compound 9A-5.

Compound 9A-5 may be used to prepare a CNT/PE composite, in which SE1 is a CNT, Ligand1 is an anthracene, the linker is a long linker and comprises a short stretch of polyethylene, Ligand2 is an anthracene, and SE2 is a CNT. The synthesis is shown in FIG. 9B-5, and involves the following steps:

i) Linkage of two or more Compound 9A-5 molecules. Compound 9A-5, at a concentration of e.g. 1-100 mM is first mixed with CNT (at a concentration resulting in a final concentration in the composite of 0.1; 1; or 10 wt %), in an appropriate solvent such as benzene, toluene, xylene, or halogenated solvents such as dichloromethane, tetrachloroethane, and chlorobenzene. Optionally, sonication is employed to better disperse the CNTs. After Compound 9A-5 has been allowed to bind to the CNT, Grubbs' 2$^{nd}$ generation catalyst is added to promote the reaction of two octenes of two compound 9A-5 molecules. If said two Compound 9A-5 molecules were bound to two different CNTs, this effectively cross-links the two CNTs. Therefore, after an appropriate time of cross-linking, a network of cross-linked CNTs will have formed.

ii) Polymerization. A polyethylene precursor such as cyclooctene is added at a concentration of 1-100 mM, together with a catalyst such as Grubbs' first Ruthenium,dichloro(phenylmethylene)bis(tricyclohexylphosphine)), second (Ruthenium, [1,3-bis-(2,4,6-trimethylphenyl)-2-imidazolidinylidene]dichloro (phenylmethylene)(tricyclohexylphosphine), or third generation catalyst or the Hoveyda-Grubbs catalyst (Ruthenium, [1,3-bis(2,4,6-trimethylphenyl)-2-imidazolidinylidene]dichloro[[2-(1-methylethoxy)phenyl] methylene], [1,3-Bis(2-methylphenyl)-2-imidazolidinylidene]dichloro(2-isopropoxyphenylmethylene) ruthenium(II), 1,3-Bis(2,4,6-trimethylphenyl)-2-imidazolidinylidene]dichloro[3-(2-pyridinyl-κN) propylidene-κC]ruthenium(II), [1,3-Bis(2-methylphenyl)-2-imidazolidinylidene]dichloro (benzylidene) (tricyclohexylphosphine)ruthenium(II), Dichloro(3-methyl-2-butenylidene)bis(tricyclohexylphosphine)ruthenium(II), [1,3-Bis(2,4,6-trimethylphenyl)-2-imidazolidinylidene]dichloro(3-methyl-2-butenylidene) (tricyclohexylphosphine)ruthenium(II), [1,3-Bis(2,4,6-trimethylphenyl)-2-imidazolidinylidene]dichloro(benzylidene)bis(3-bromopyridine) ruthenium(II)) [**CHR]. Polymerization is allowed to proceed until insignificant new polymer is generated, and is then terminated by quenching with methanol and isolating the precipitated polymer by filtration. Some of the polymers will have formed independently of Compound 9A-5, and some of the polymers will have become attached to the linker connecting two anthracenes.

iii) Reduction, e.g. by hydrogenation is done by dispersing the isolated unsaturated polymer in a suitable solvent such as xylene, tetrahydrofurane, toluene or or halogenated solvents. Hydrogenation can be done with for example hydrogen gas in a pressurized reactor and employing a suitable catalyst such as Pd/C. Another example is to use tosyl hydrazine and trimethylamine.

General Comments to the Polymerization and Reduction Reactions Described Above, Leading to PE Composites.

Alternative PE precursors may be used in any of the polymerization reactions described in this example, e.g. cyclooctadiene, cyclooctatriene and cyclooctatetraene.

Depending on the relative amount of the fullerene-binding compound (i.e. Compound 9A-1, -2, -3, -4 or -5) and octene, the PE may be bound (through a fullerene-binding ligand) to the CNT at many or just a few positions along the CNT.

The production of polyethylene may lead to low density, medium density or high density polyethylene, depending on the polymerization conditions. Furthermore, by including additional precursors for the polymerization reaction such as octyl-cyclooctene or other alkyl substituted cyclooctenes as the precursors, branching of the PE may be obtained similar to branching in polyethylenes obtained from Ziegler-Natta type polymerizations.

Processing of the Fullerene/PE Composites Produced in this Example.

The composites produced above in this example may have been formed in a cast mould, and if desired the solvent can simply be evaporated off the composite. Alternatively, further means of processing may include any of the following:

i) Dissolve in solvent. The formed composite may be dissolved in appropriate solvent and recast in a mould. The solvent is allowed to evaporate at room temperature and under ambient pressure thus leaving the composite material having taken the desired shape in the form.
ii) Melt by heating. Melt by heating in for example an extrusion, co-extrusion, fiber-spinning, molding, ram-molding, injection molding or sintering process.
iii) Melt by heating and physical impact such as for example ram-molding.

Example 10. A Strong but Flexible Ink for Various Surfaces

In this example, a strong yet flexible epoxyacrylate-based resin material that can be used in the formulation of inks with good adhesion to plastic is prepared, by including a number of different types of CMUs. SE1 as well as SE2 can be any of CNT, graphene, epoxyacrylate polymer, or a plastic surface. The Linker Units (LUs) of this example comprise ligands of relatively high or relatively low affinities for the corresponding structural entities, as well as relatively short or relatively long linkers connecting the ligands. This is an example of an in situ polymerization, where the final processing of product involves curing by e-beam.

Preparation of Linker Units (LUs).

Compounds (10A-a) and (10A-b) both comprise the peptide HTAQSTA, a polystyrene-binding ligand. The polystyrene-binding ligand binds polystyrene with a dissociation constant of approximately 10 pM, and thus binds polystyrene with relatively high affinity. Compounds (10A-a) and (10A-b) also contains a chemical moiety capable of forming a covalent bond with an epoxyacrylate polymer. The synthesis of compounds (10A-a) and (10A-b) is shown in FIG. 10A-a and FIG. 10A-b, respectively. The synthesis involves the following steps: The peptide sequence is reacted with a suitable co-hydroxy acid ester (in FIG. 10A, 12-hydroxydodecanoic acid is used) to form the corresponding ester.

The methyl ester is reacted to form the free carboxylic acid, which is the starting material shown in FIG. 10A-a.

This compound is carefully reduced with for example diborane for form an alcohol, which can then be oxidized to the aldehyde. The aldehyde is then converted into an alkene in a Horner-Wadsworth-Emmons reaction with $Ph_3PCH_2$ and potassium tert-butoxide and finally reacted with meta-chloroperbenzoic acid to form the epoxide. The amine shown in FIG. 10B is formed by reducing the aldehyde from with $NaCNBH_3$.

Compounds (10B-a) and (10B-b) both comprise 9,10-dihydroanthracene, a CNT-binding ligand. Compounds (10B-a) and (10B-b) also contains a chemical moiety capable of forming a covalent bond with an epoxyacrylate polymer. The synthesis of compounds (10B-a) and (10B-b) is shown in FIG. 10B-a and FIG. 10B-b. The synthesis of these compounds uses the synthetic route outlined in FIG. 9A-5. For preparing the epoxide, the acid-chloride prepared in the synthetic route is converted by reacting with a suitable w-hydroxy-carboxylic acid that has been converted to an alkene (for example by first protecting the alcohol functionality of the w-hydroxy-carboxylic acid, then reducing selectively with for example diborane to form an alcohol, which can then be oxidized to the aldehyde followed by an HWE reaction to convert the aldehyde to an alkene and finally removing the alcohol protecting group), which subsequently can be converted to an epoxide with for example m-chloroperbenzoic acid. Likewise, the compound shown in FIG. 10B-b can be prepared by reacting the acid chloride shown with an ester of a suitable w-hydroxy-carboxylic acid and then setting free the acid and selectively reducing to the aldehyde (first by reducing with borane to an alcohol and then oxidizing to the aldehyde). Finally, the aldehyde can be reduced to an amine as previously described with for example $NaCNBH_3$.

Compounds (10C-a) and (10C-b) both comprise pyrene, a graphene-binding ligand. Compounds (10C-a) and (10C-b) also contains a chemical moiety capable of forming a covalent bond with an epoxyacrylate polymer. The synthesis of compounds (10C-a) and (10C-b) is shown in FIG. 10C-a and FIG. 10C-b, respectively. The synthesis involves the following steps: Pyrene-2-carboxylic acid is reacted with the ester of a suitable w-hydroxy-carboxylic acid. After reacting to the free carboxylic acid and reducing selectively the acid to an alcohol (and thereafter oxidizing selectively to the corresponding aldehyde), an HWE reaction then gives the alkene shown. Careful oxidation with m-chloro-perbenzoic acid leaves the epoxide shown. Instead of converting the aldehyde to an alkene as shown in FIG. 10C-a, a reduction with for example $NaCNBH_3$ results in the amine as shown in FIG. 10C-b.

Figure 10D:
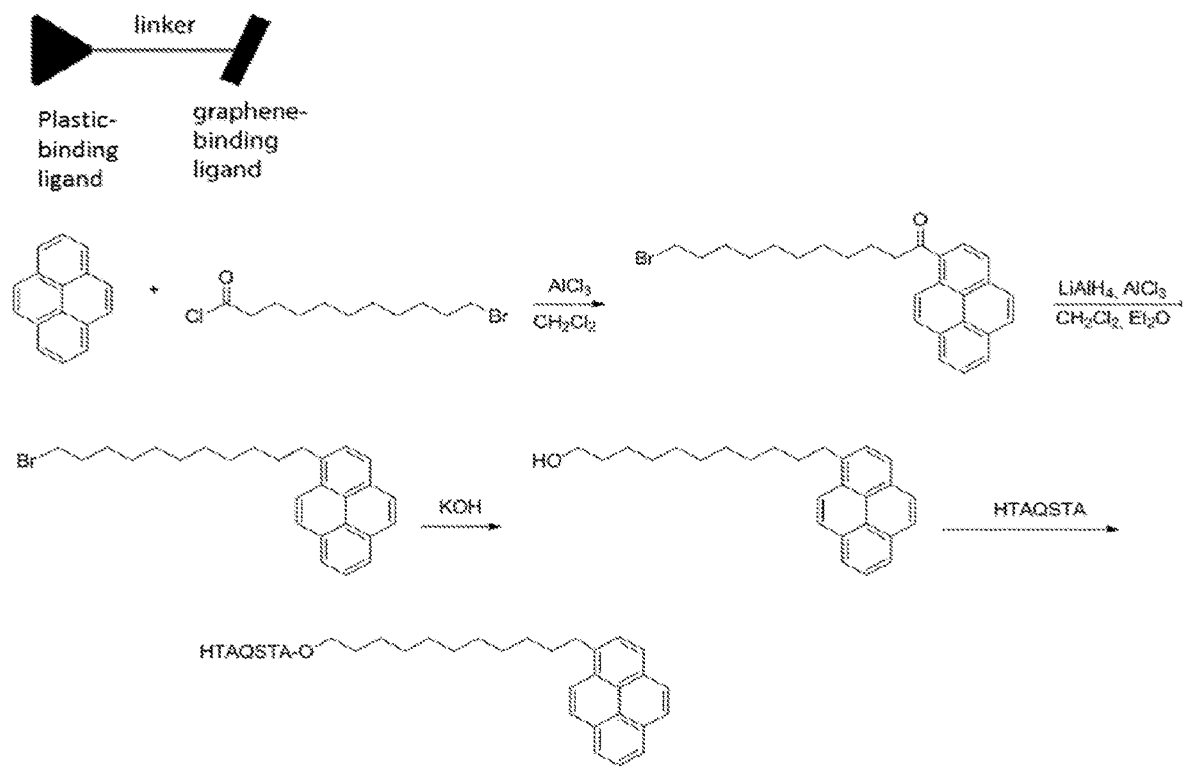

Compound (10D) comprises the peptide HTAQSTA (a polystyrene-binding ligand), and pyrene (a graphene-binding ligand), connected by a linker. The synthesis of compound (10D) is shown in FIG. 10D. The synthesis involves the following steps: Pyrene is reacted with a suitable w-bromo-acid chloride in a Friedel-Crafts reaction. The resulting ketone is then reduced with $LiAlH_4$ and $AlCl_3$ thus removing the carbonyl group. The bromide is then hydrolyzed to the alcohol which can be coupled to the peptide.

Figure 10E:
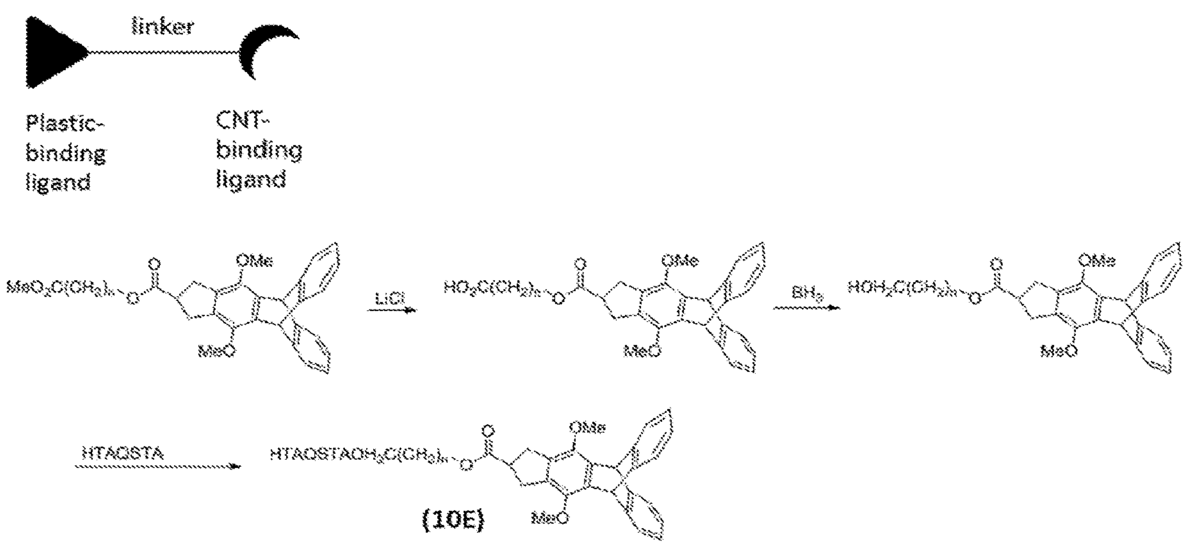
Figure 10G:
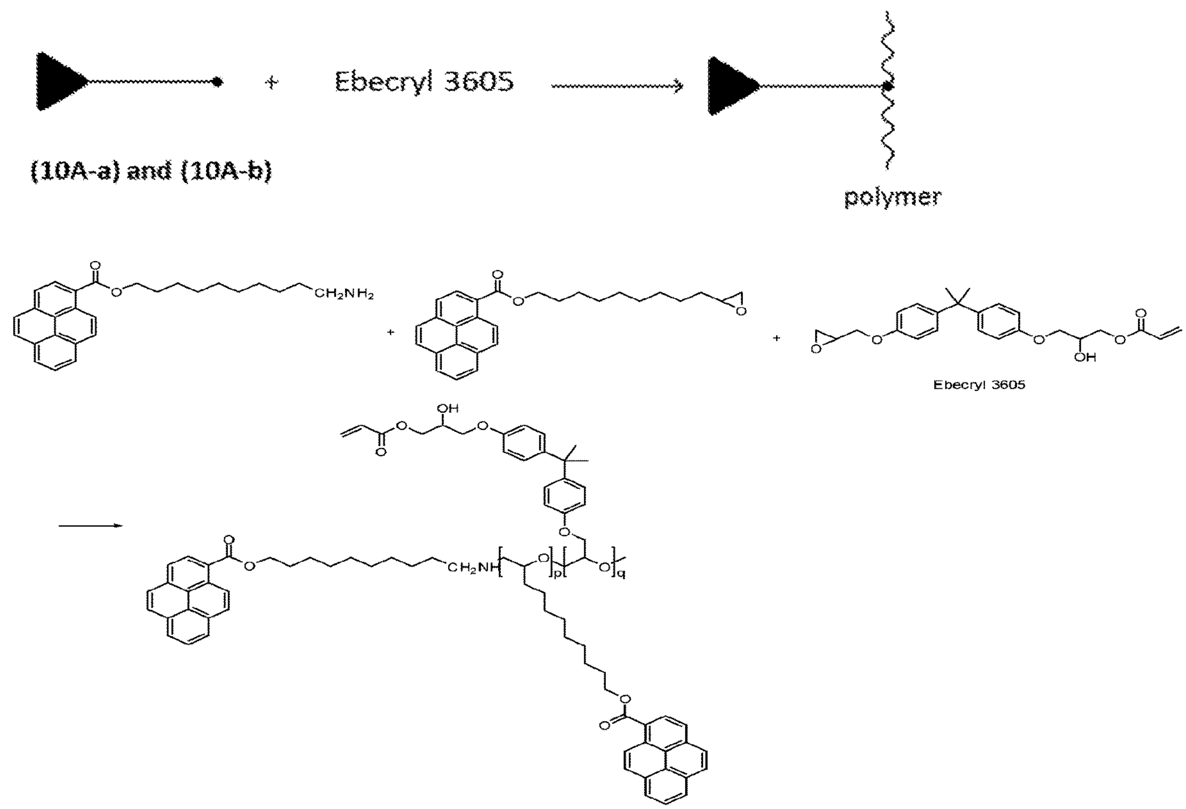

Compound (10E) comprises the peptide HTAQSTA (a polystyrene-binding ligand), and 9,10-dihydroanthracene (a CNT-binding ligand), connected by a linker. The synthesis of compound (10E) is shown in FIG. 10E. The synthesis involves the following steps: The methyl ester derivative prepared in FIG. 9A-5 is reacted with LiCl to selectively cleave the methyl ester leaving the free acid. A reduction with for example borane leaves the alcohol, which can be coupled to the peptide.

Compound (10F) comprises 9,10-dihydroanthracene (a CNT-binding ligand) and pyrene (a graphene-binding ligand), connected by a linker. The synthesis of compound (10F) is shown in FIG. 10F. The synthesis involves the following steps: The acid chloride prepared in FIG. 9A-5 is reacted with the alcohol prepared in FIG. 10D under the presence of pyridine in THF.

Polymerization Reaction to Form an Epoxy-Acrylate Based Resin.

Figure 10H:
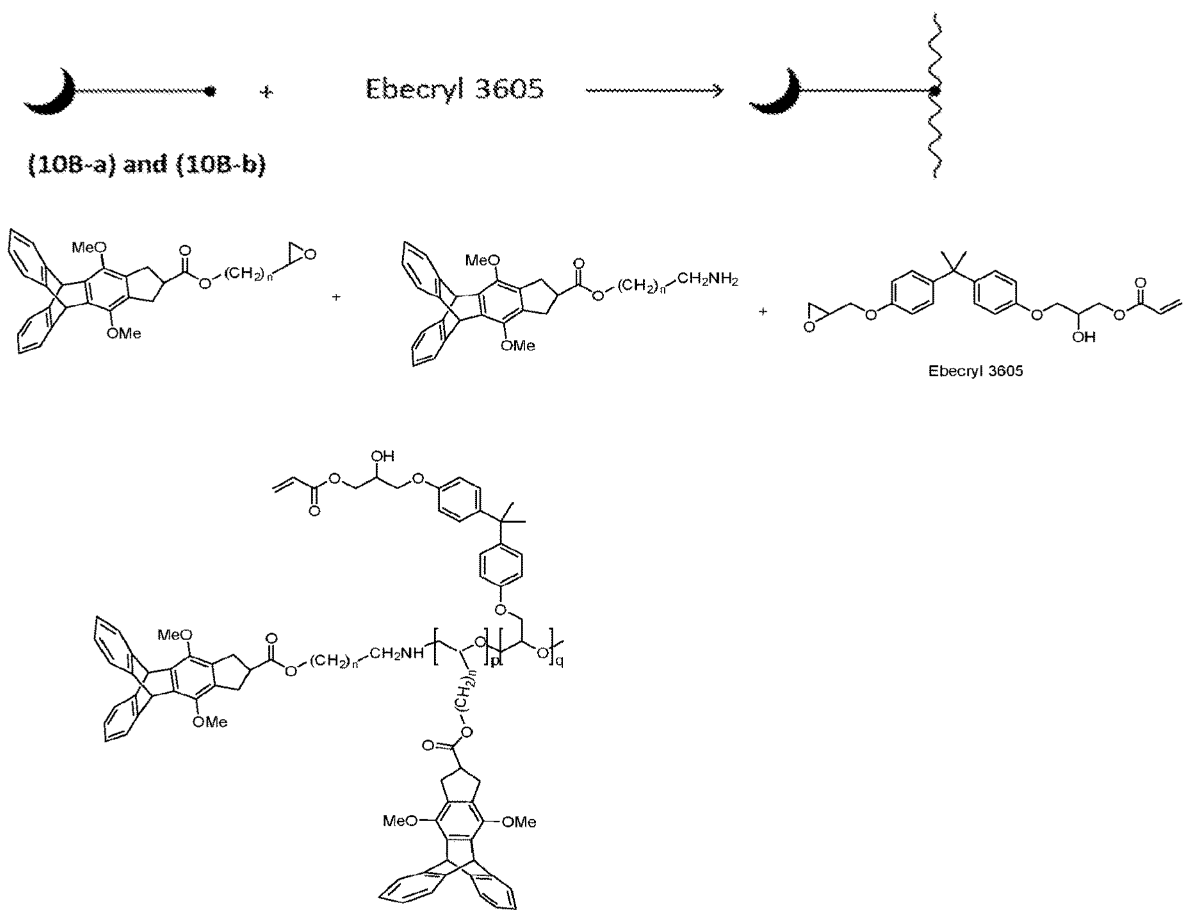
Figure 10I:
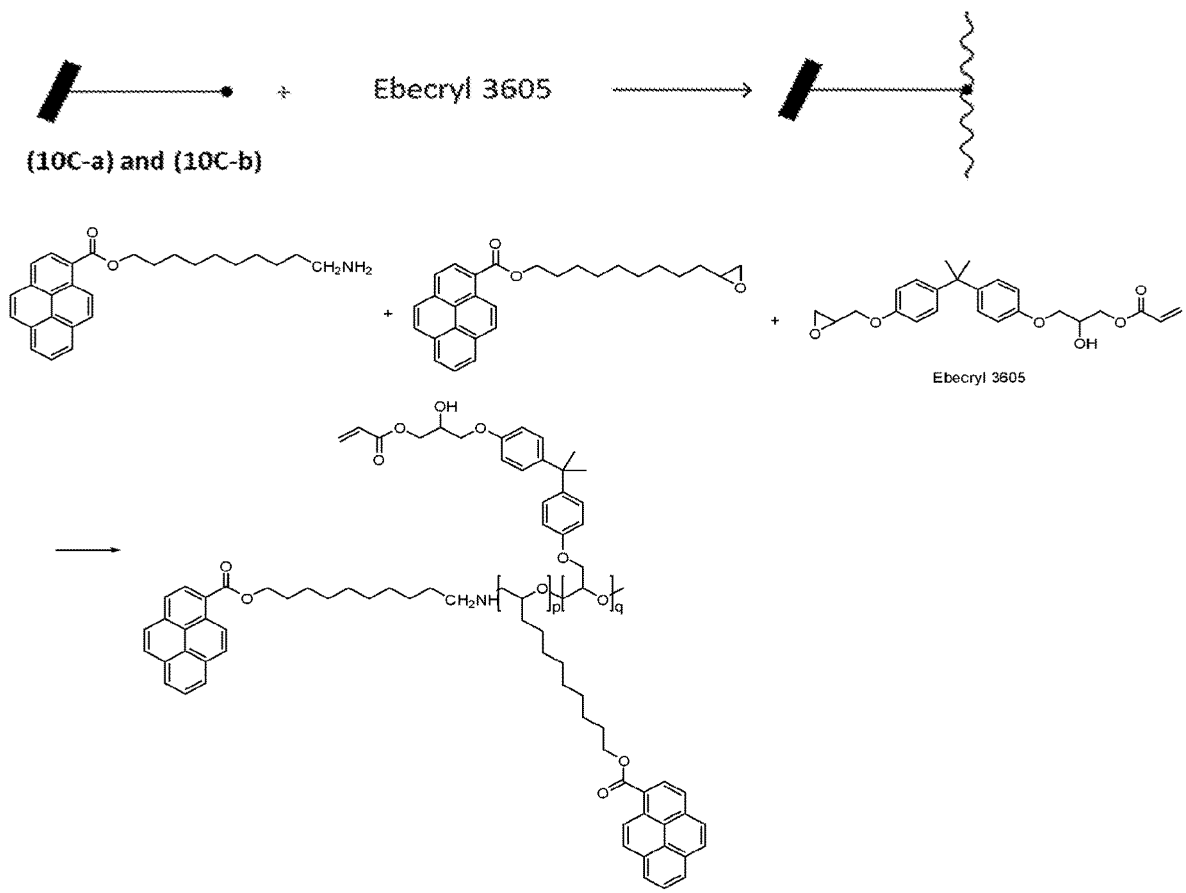
Figure 10L:
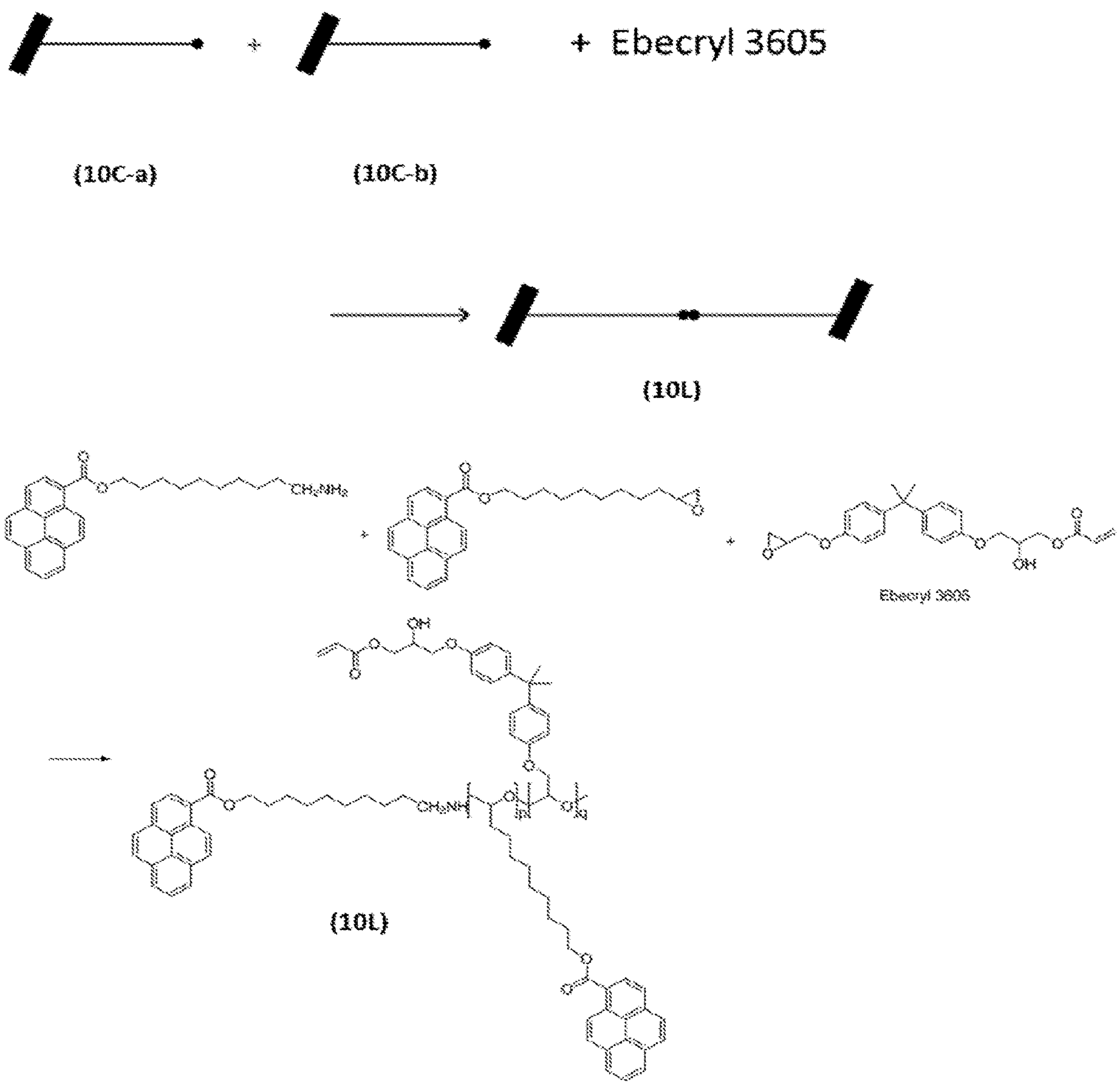

The amine prepared in FIG. 10B-b is used as an initiator for starting a polymerization reaction with the epoxide from FIG. 10B-a and the commercially available Ebecryl 3605 thus forming a copolymer as shown in FIG. 10H. This can either be done neat as Ebecryl 3605 is a high viscous liquid or in a solvent such as THF. The formed polymer can be mixed with epoxy acrylates such as hexafunctional polyester acrylates (e.g. Ebecryl LEO 10801) and other CMU entities to form a resin that can further be used in the formulation of for example electron or photoinitiator cured inks.

Formation of a Pre-Polymer Resin System as a Component in an Ink or Paint Formulation Component I comprises:

CNT, corresponding to 1 w % of final paint

Graphene, corresponding to 3 w % of final paint

Compounds (10A-a), (10B-a), and (10C-a), each at a 1,000-fold molar excess to CNT Compounds (10D), (10E), each at a 1,000-fold molar excess to CNT In addition, epoxy acrylates containing both an acrylate functionality and an un-opened epoxide, such as Ebecryl 3605, is added in a 1,000 to 100,000-fold molar excess of the CNT.

Component II Comprises:

Compound (10F), at a 100-fold molar excess to CNT in final composite

Compounds (10A-b), (10B-b), and (10C-b), each at a 1,000-fold molar excess to CNT The pre-polymer resin system will comprise many different polymeric entities as the amines will initiate the polymerization reaction by opening an epoxide. The polymerization will then propagate as the ring-opening of an epoxide results in a free alcohol functionality that can then attack another epoxide. Initiation of this reaction can be initiated by heat or by a Lewis acid.

Formulation of an ink: The final ink is formulated such that it contains the prepolymer described above in addition to various monomers, pigments, additives (flow agents, silicones) and possibly waxes. The monomers are mainly acrylates but additional resins or multifunctional oligomers are also added in order to increase the cross-linking density (for example dendritic acrylates) and adjust properties such as viscosity, adhesion and solvent resistante.

Final Processing of the Product: Curing of the Paint

The curing process is performed using an e-beam process, where a film prepared from the ink is subjected to an electron beam. The electron beam will generate a radical on the acrylate functionalities, which can attack another acrylate thus propagating the polymerization producing a cured film of the ink formulation.

CMUs Generated:

| | SE1 | Ligand1 | Linker | Ligand2 | SE2 | Compound |
|---|---|---|---|---|---|---|
| CMU1 | plastic | non-covalent | "short" | covalent | epoxyacrylate | 10G |
| CMU2 | CNT | non-covalent | "short" | covalent | epoxyacrylate | 10H |
| CMU3 | Graphene | non-covalent | "short" | covalent | epoxyacrylate | 10I |
| CMU4 | plastic | non-covalent | "short" | non-covalent | graphene | 10D |
| CMU5 | plastic | non-covalent | "short" | non-covalent | CNT | 10E |
| CMU6 | CNT | non-covalent | "short" | non-covalent | graphene | 10F |
| CMU7 | plastic | non-covalent | "short" | non-covalent | plastic | 10J |
| CMU8 | CNT | non-covalent | "short" | non-covalent | CNT | 10K |
| CMU9 | graphene | non-covalent | "short" | non-covalent | graphene | 10L |
| CMU10 | plastic | non-covalent | "long" | covalent | epoxyacrylate | |
| CMU11 | CNT | non-covalent | "long" | covalent | epoxyacrylate | |
| CMU12 | Graphene | non-covalent | "long" | covalent | epoxyacrylate | |

The linkers of CMU10, CMU11 and CMU12 comprise a stretch of epoxyacrylate polymer, formed during the polymerization process, and may thus comprise from two to several hundreds or thousands of polymer precursors, and are therefore typically longer than the linkers of the other CMUs. The average length of such linkers (consisting of a polymer) can thus be controlled by the absolute concentration of, and the ratios between, the polymer precursors.

Figure 10M:
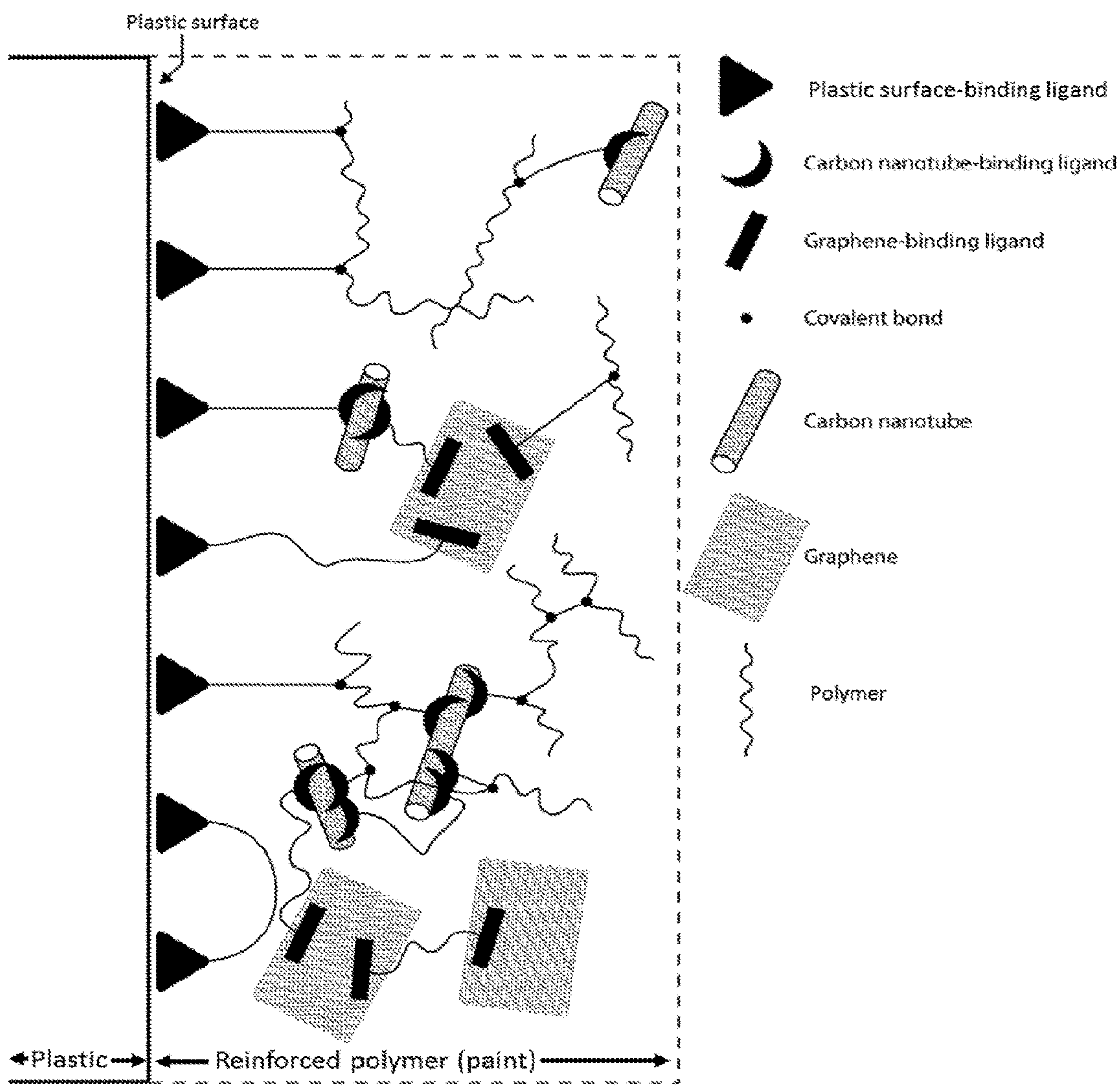

FIG. 10M shows a schematic of the final structure of the ink, including the different CMUs of the paint.

Modifications to the Procedure and to the Characteristics of the Paint Ink.

By varying the absolute amount of the components used (e.g. polymer precursors; additives; linkers), as well as the ratios between them, the characteristics may also be changed. Typically, a stronger material is obtained when a higher percentage of a high-strength additive is used (e.g. carbon fiber, CNT, graphene). Likewise, a better adherence of the paint is achieved by including a larger amount of surface-binding ligand. However, this is only true for concentrations of additive or ligand that does not negatively interfere with the integrity of the composite material.

In a preferred embodiment, the additives are conducting. As an example, some of the CNTs have a rather high conductivity. Using a paint that is conducting can be an advantage, as it may decrease corrosion.

Example 11

Polymers show varying degrees of crystallinity ranging from polymers that have no regions of crystallinity such as poly(methyl 2-methylpropenoate) to polymers that have a high degree of crystallinity such as high-density polyethylene. Examples of polymer crystallinities are given in the table below.

| Polymer | Degree of crystallinity |
|---|---|
| Nylon (PA66 and PA6) | 35-45% |
| Polyoxymethylene (POM) | 70-80% |
| Polyethylene terephthalate (PET) | 30-40% |
| Polybutylene terephthalate (PBT) | 40-50% |
| Polytetrafluoroethylene (PTFE) | 60-80% |
| isotactic polypropylene | 70-80% |
| atactic polypropylene | ~0% |
| High-density polyethylene | 70-80% |
| Low-density polyethylene | 45-55% |

When making a composite material with an enhanced characteristic, e.g. tensile strength or Young's modulus, by using fullerenes as an additive, a common problem, especially for some fullerenes, is the formation of a large non-crystalline interphase around the fullerene, which makes the composite material less strong or even weaker.

By using the present invention, a CMU comprising a nucleating agent can be generated. This nucleating agent will then induce a crystalline phase around the CNT, thus minimizing or eliminating the non-crystalline interphase wherefore the composite material becomes stronger.

The nucleating agent may be covaltently linked to a ligand, that binds to the fullerene, e.g. to CNT, thus forming a CMU with nucleating potential. See FIG. 11. FIG. 11 shows how the nucleating agent is incorporated into the CMU.

Use of a nucleating agent to minize/eliminate the non-crystalline interphase around a fullerene in a composite material. A shows a large interphase around the fullerene in the absence of a nucleating agent. B shows a small interphase around the fullerene in the presence of a nucleating agent that is brought into the proximity of the fullerene by using a ligand as described in the present invention.

Nucleating agents suitable for the present invention includes, but are not limited to: aromatic carboxylic acid salts; sodium benzoate; talc; pigment colorants; phosphate ester salts; calcium carbonate; glass; chalk; clay; kaolin; silicates; pigments; cadmium red; cobalt yellow; chromium oxide; titanium dioxide; magnesium oxide; carbonates; sulfates; carbon black; salts of carboxylic acids; benzophenone; polymers; organic liquids; polyamide-66; molybdenum disulfide; iron sulfide; titanium dioxide; sodium phenylphosphinate; potassium stearate; organic pigments; sodium benzoate; kaolin; triphenodithiazine; pimelic acid with calcium stearate; calcium stearate; pimelic acid; quinacridone permanent red dye; N,N-dicyclohexylnaphthalene-2,6-dicarboxamide; 1,2,3,4-bis-dibenzylidene sorbitol (DBS); 1,2,3,4-bis-(p-methoxybenzylidene sorbitol) (DOS); 1,2,3,4-bis-(3,4-dimethylbenzylidene sorbitol) (MBDS); 1,3:2,4-di(3,4-dimethylbenzylidene) sorbitol (DMDBS); metal salts of substituted aromatic heterocyclic phosphate; sodium 2,2'-methylene-bis-(4,6-di-t-butylphenylene)phosphate (NA-11); salts of 2,2'-methylene-bis-(4,6-di-t-butylphenylene) phosphate; lithium 2,2'-methylene-bis-(4,6-di-t-butylphenylene)phosphate; potassium 2,2'-methylene-bis-(4,6-di-t-butylphenylene)phosphate; linear trans quinacridone (LTQ); γ-modification of LTO; calcium carboxylates, calcium salts of suberic acid (Ca-sub), calcium salts of pimelic acid (Ca-pim); N,N'-dicyclohexyl-2,6-naphtalene dicarboxamide (NJS); bicyclo[2.2.1]heptane dicarboxylate salt (HPN-68); Hyperform HPN-20E; ionomers; metal oxides; metal hybrids; organic compounds; residual catalysts; polymers; fibers; hydroxyl group-containing triglyceride oils; organic acid metal salts.

Example 12. Reinforced Concrete

In this example, an alternative solution to the conventional, cumbersome treatment of CNTs prior to adding them to the concrete mixture is provided, by instead adding CNT in the form of linker units (LUs) or composite material units (CMUs).

Example 12A

Formation of a CMU consisting of a CNT, a CNT binding ligand, linked to a carboxylic acid capable of reacting with silicate to form a covalent bond.

In an appropriate solvent, such as chloroform, acetonitrile, or NMP, prepare 5 mixtures of carbon nanotubes (SWNT, MWNT, or both) and the peptide

PQAQDVELPQELQDQHREVEVPQAQDVELPQEL-QDQHREVEVGSSEEE which binds to CNT with high affinity, at a molar CNT:ligand ratio of 1:1,000, 1:10,000, 1:100,000, 1:1,000,000, and 1:10,000,000, respectively, and using a ligand concentration of between 0.01 and 10 mM.

The mixtures are sonicated at high power for an appropriate period of time, e.g. for one day at room temperature, to allow the dispersion of the CNT, mediated by the CNT-binding ligand. Then the solvent is removed by either simple evaporation, or e.g. filtration to remove unbound ligands and solvent followed by evaporation of residual solvent. The resulting powder of CNT-peptide complex) is then used in the following composite generation process.

Add the powder obtained above to a mixture of cement, sand, water and various admixtures as desired, such as superplasticizers (e.g. Mapai, Dynamon SP1), retarders and accelerators, and pozzolans such as fly ash, slag cement, silica fume, and metakaolin. The terminal carboxylic acid or one or more of the terminal three glutamic acids (abbreviated "E") will react with the silicate to form a covalent ester bond, thus forming a CMU consisting of CNT, a peptide ligand, a linker (part of the peptide), a covalent bond (the ester) and the calcium silicate hydrate. In other words, a CNT-reinforced concrete has been generated. See FIG. 12A.

Example 12B

In this example, a graphene-reinforced concrete is formed.

First, the graphene-binding ligand 10-((3,5-dinitrobenzoyl)oxy)decanoic acid, Compound (12B), which carries a carboxylic acid, is synthesized:

Commercially available 3,5-dinitro-benzoic acid can be reacted with a suitable w-hydro-carboxylic acid methyl ester, such as w-hydro-decanoic acid in the present example, by using catalytic amounts of acid such as p-toluene-sulfonic acid using a Dean-Stark setup. Removal of water pushes the equilibrium towards the ester of 3,5-dinitrobenzoic acid and the w-hydro-carboxylic acid methyl ester. By setting the methyl ester free as an acid using for example LiCl, the target molecule (12B) is generated. See FIG. 12B.

In an appropriate solvent, such as chloroform, acetonitrile, or NMP, prepare 5 mixtures of graphene and Compound (12B), at a molar graphene:(12B) ratio of 1:1,000, 1:10,000, 1:100,000, 1:1,000,000, and 1:10,000,000, respectively, and using a ligand concentration of between 0.01 and 10 mM. The mixtures are sonicated at high power for an appropriate period of time, e.g. for one day at room temperature, to allow the dispersion of the graphene, mediated by the graphene-binding ligand. Then the solvent is removed by either simple evaporation, or e.g. filtration to remove unbound ligands and solvent followed by evaporation of residual solvent. The resulting powder of graphene-peptide complex is then used in the following composite generation process.

Add the powder obtained above to a mixture of cement, sand, water and various admixtures as desired, such as superplasticizers (e.g. Mapai, Dynamon SP1), retarders and accelerators, and pozzolans such as fly ash, slag cement, silica fume, and metakaolin. The carboxylic acid of Compound (12B) will react with the silicate to form a covalent ester bond, thus forming a CMU consisting of graphene, the (12B) ligand, a linker, a covalent bond (the ester) and the calcium silicate hydrate. In other words, a graphene-reinforced concrete has been generated. See FIG. 12B.

Example 12C

To a mixture of cement, sand, water and various admixtures as desired, such as superplasticizers (e.g. Mapai, Dynamon SP1), retarders and accelerators, and pozzolans such as fly ash, slag cement, silica fume, and metakaolin, add graphene, CNT, and the Compounds (10F), (10K), and (10L), described in Example 10. This will form CMUs comprising either two CNTs, two graphenes, or one CNT and one graphene. In other words, a graphene/CNT-reinforced concrete has been generated.

Example 12D

In this example, a CNT-reinforced concrete is formed.

First, the Compound (12D), a Naphthalene polymer with pendant fluoranthene moieties, is synthesized:

2,6-dimethyl-naphthalene is used as the starting material and is reacted with a suitable w-hydromethyl-carboxylic acid chloride in a Friedel-Crafts acylation reaction. The resulting product is then reduced under for example a Clemmensen or Wolff-Kishner conditions to remove the ketone group. Hydrolysis of the ether to the alcohol followed by conversion to the bromide with for example $POBr_3$ leads to a primary bromide that can be converted to a phosphonate ester for example with the Michaelis-Arbuzov reaction using triethyl-phosphite. The resulting naphthalene molecule can be reacted with fluoranthene-3-carbaldehyde in a Horner-Wadsworth-Emmons reaction as shown. Bromination with for example N-bromo-succinimide under radical conditions followed by another Michaelis-Arbuzov reaction results in the shown di-phosphonate ester. This molecule can be polymerized with for example 2,6-dibromomethyl-naphthalene in a Horner-Wadsworth-Emmons reaction to give the desired polymer, Compound (12D). This Compound carries a fluoranthene moiety, capable of binding to CNT, and a naphthalene moiety, capable of wrapping around cement particles thereby immobilizing the compound on the cement particle.

In an appropriate solvent, such as chloroform, acetonitrile, or NMP, prepare 5 mixtures of CNT and Compound (12D), at a molar CNT:(12D) ratio of 1:1,000, 1:10,000, 1:100,000, 1:1,000,000, and 1:10,000,000, respectively, and using a ligand concentration of between 0.01 and 10 mM.

The mixtures are sonicated at high power for an appropriate period of time, e.g. for one day at room temperature, to allow the dispersion of the CNT, mediated by the graphene-binding ligand. Then the solvent is displaced by water and the suspension is then used in the following composite generation process.

The suspension obtained above is added to a mixture of cement, sand, water and various admixtures as desired, such as superplasticizers (e.g. Mapai, Dynamon SP1), retarders and accelerators, and pozzolans such as fly ash, slag cement, silica fume, and metakaolin. Thus, a CNT-reinforced concrete has been formed. See FIG. 12D.

Example 12E. Formation of Graphene- and Graphite-Reinforced Concrete

First, the Compound (12E), a Naphthalene polymer with pendant dinitrobenzoyl moieties, is synthesized:

2,6-dimethyl-naphthalene is used as the starting material and is reacted with a suitable co-hydromethyl-carboxylic acid chloride in a Friedel-Crafts acylation reaction. The resulting product is then reduced under for example a Clemmensen or Wolff-Kishner conditions to remove the ketone group. Hydrolysis of the ether to the alcohol followed by conversion to the bromide with for example $POBr_3$ leads to a primary bromide that can be converted to a phosphonate ester for example with the Michaelis-Arbuzov reaction using triethyl-phosphite. The resulting naphthalene molecule can be reacted with fluoranthene-3-carbaldehyde in a Horner-Wadsworth-Emmons reaction as shown. Bromination with for example N-bromo-succinimide under radical conditions followed by another Michaelis-Arbuzov reaction results in the shown di-phosphonate ester. This molecule can be polymerized with for example 2,6-dibromomethyl-naphthalene in a Horner-Wadsworth-Emmons reaction to give the desired polymer, Compound (12E). This Compound carries a dinitrobenzoyl moiety, capable of binding to graphene and graphite, and a naphthalene moiety, capable of wrapping around cement particles thereby immobilizing the compound on the cement particle.

In an appropriate solvent, such as chloroform, acetonitrile, or NMP, prepare 5 mixtures of graphene and graphite, at equimolar amounts of graphite and graphene, and at a molar graphene:(12E) ratio of 1:1,000, 1:10,000, 1:100,000, 1:1,000,000, and 1:10,000,000, respectively, and using a Compound (12E) concentration of between 0.01 and 10 mM. The mixtures are sonicated at high power for an appropriate period of time, e.g. for one day at room temperature, to allow the dispersion of the graphene and graphite, mediated by the graphene- and graphite-binding ligand. Then the solvent is displaced by water and the suspension is then used in the following composite generation process.

The suspension obtained above is added to a mixture of cement, sand, water and various admixtures as desired, such as superplasticizers (e.g. Mapai, Dynamon SP1), retarders and accelerators, and pozzolans such as fly ash, slag cement, silica fume, and metakaolin. Thus, a graphene/graphite-reinforced concrete has been formed. See FIG. 12E.

Example 12F

Formation of a CMU consisting of two silica particles and a peptide, in a matrix of concrete.

The peptide QTWPPPLWFSTSPGSSPGSSQTWPPPLWFSTS is added to a mixture of cement, sand, water and various admixtures as desired, such as superplasticizers (e.g. Mapai, Dynamon SP1), retarders and accelerators, and pozzolans such as fly ash, slag cement, silica fume, and metakaolin. The peptide binds with relatively high affinity to silica particles in the mixture and helps stabilize the resulting concrete.

Example 13. Reinforced Metal, Ceramics and Plastic

In this example, formation of the SE-ligand structure is used to drive efficient dispersion of the structural entity in the resulting composite. Matrices employed include metals, ceramics, plastics, and composites. The SEs examplified in this example include carbon nanotubes (single or multi-walled) and graphene, but is applicable to any fullerene or any other structural entity that is difficult to disperse and/or distribute evenly during the process of composite generation or processing.

Further, in the resulting composite, the ligands will be bound to the SE, and the surface of the SE-ligand complexes will therefore be more irregular than the corresponding SE without ligands bound. As a result, the SE will be anchored more efficiently in the matrix because of the bound ligands.

Step 1.

a. In an appropriate solvent, such as chloroform, acetonitrile, NMP, 2-propanol, acetone, tetrahydrofurane, ethyl acetate, N,N-dimethylformamide, methanol, ethanol, trimethylamine and dichloromethane, prepare 5 mixtures of graphene and one or more of the graphene-binding ligands pyrene, m-nitrobenzene, p-nitrotoluene, hexane, benzene, 1,2,3-Trichlorobenzene, at a molar graphene:ligand ratio of 1:1,000, 1:10,000, 1:100,000, 1:1,000,000, and 1:10,000,000, respectively, and using a ligand concentration of between 0.1 and 10 mM.

b. In an appropriate solvent, such as chloroform, acetonitrile, NMP, 2-propanol, acetone, tetrahydrofurane, ethyl acetate, N,N-dimethylformamide, methanol, ethanol, trimethylamine and dichloromethane, prepare 5 mixtures of carbon nanotubes (SWNT, MWNT, or both) and one or more of the CNT-binding ligands pyrene, anthracene, the peptide IFRLSWGTYFS, the peptide HWKHPWGAWDTL, p-nitrotoluene, hexane, benzene, 1,2,3-Trichlorobenzene, at a molar graphene: ligand ratio of 1:1,000, 1:10,000, 1:100,000, 1:1,000,000, and 1:10,000,000, respectively, and using a ligand concentration of between 0.01 and 10 mM.

c. Combine mixture a.) and b.) from above.

Step 2

The mixtures of a.), b.) and c.) are left for an appropriate period of time, e.g. for one day at room temperature, to allow the dispersion of graphene and CNT, respectively, mediated by the fullerene-binding ligands.

Step 3

Then the solvent is removed by either simple evaporation, or e.g. filtration to remove unbound ligands and solvent followed by evaporation of residual solvent. The resulting powder of SE-ligand complex (i.e. graphene-ligand and/or CNT-ligand complex) is then used in the following composite generation processes.

Process 1A: Preparation of metal-fullerene composite material. The desired metal (e.g. tin, or any other metal or metal alloy), is added to the SE-ligand complexes obtained in Step 3 above, under conditions that ensure efficient mixing of the metal and the SE-ligand complexes, to ensure regular distribution of the SE-ligand complexes in the metal composite. Metal can be added in many different ways, e.g. by classical approaches like thermal spraying (plasma spraying and cold spraying), mechanical alloying and hot pressing, sintering e.g. spark plasma sintering, simple melting and solidification (casting, metal infiltration, melt spinning, laser deposition), electrochemical deposition (electro deposition, electroless deposition), as well more recent techniques such as molecular level mixing, sputtering techniques, sandwich processing, torsion/friction welding, vapor deposition, mixing as paste, and nano-scale dispersion.

The final result is a metal composite, where the structural entity (here CNT and/or graphene) is bound by ligand, enabling its efficient anchoring in the composite material.

Process 1B: Alternative Route for Producing a Reinforced Metal Composite.

To the SE-ligand mixture obtained in Step 2, or to the SE-ligand powder obtained in Step 3, is added a soluble salt of the desired metal or metals. In this example, copper is used, but any other metal or metal alloy can be used. The soluble salt Cu(CH3COO)2 in water is added while stirring. Then the solvent is evaporated, and after drying and calcination (e.g. at 300° C. in air) and reduction (e.g. reduction with hydrogen at 250° C. for 3 hours under pressure), an SE-ligand-metal composite powder is obtained. This metal composite can then be further processed by standard procedures.

The final result is thus a metal composite, where the structural entity (here CNT or graphene) is bound by ligand, enabling efficient anchoring of the structural entity in the composite material.

Process 2: Preparation of Ceramics-Fullerene Composite Material.

The desired ceramics material, e.g. a technical ceramics or structural material (e.g. alumina, ceria, zirconia, carbide, boride, silicide, silicon carbide), or any ceramics material including structural materials like cement/concrete as well as technical ceramics, may be formed in situ by addition of relevant precursors such as Aluminum, Beryllium, Cerium or Zirconium, which upon oxidation gives the oxides aluminas, beryllias, cerias, zirconias, or by addition of precursors for structural materials such as oxides materials or nonoxides such as carbides, borides, nitrides and silicides, to the SE-ligand complexes obtained above. Alternatively premade ceramics is added to the SE-ligand by an appropriate process such as thermal spraying or sintering. It is important to ensure efficient mixing of SE-ligand complexes and the ceramics material under this process, to ensure regular distribution of the SE-ligand complexes in the ceramics composite.

The final result is a ceramics composite, where the structural entity (here CNT and/or graphene) is bound by ligand, enabling efficient anchoring of the structural entity in the composite material.

Process 3: Preparation of Plastic-Fullerene Composite Material.

The desired polymer, e.g. polyethylene, polyamide, polyurethane, polystyrene, polyacrylate, or any polymer, is formed in situ, by addition of relevant precursors such as (for polyacrylate) methacrylate, methyl acrylate, ethyl acrylate, 2-ethylhexyl-acrylate, hydroxyethyl methacrylate, butyl acrylate, butyl methacrylate, or 2,2-Bis[(acryloyloxy)methyl]butyl acrylate, to the SE-ligand complexes obtained above, or pre-made polymers or premade composites are added to the SE-ligand, e.g. in melted form or dissolved in an appropriate solvent (e.g. polyacrylate, polystyrene, or carbonfiber-reinforced polyethylene dissolved in 2-propanol, acetone, tetrahydrofurane, ethyl acetate, N,N-dimethylformamide, methanol, ethanol, trimethylamine and dichloromethane). It is important to ensure efficient mixing of the SE-ligand complexes and the polymer or composite material under this process, to ensure regular distribution of the SE-ligand complexes in the plastic composite.

The final result is a plastic composite, where the structural entity (here CNT or graphene) is bound by ligand, enabling its efficient anchoring in the composite material.

Example 14. A Scaffolded Network of Cross-Linked Fullerenes, in Reinforced Metal-, Ceramics-, and Polymer Composites In this example, a network structure of two different additives (CNT and graphene) is first generated, and then either not filled up with any matrix, or filled up with a matrix of polymer, polymer composite, metal or ceramics—to form a composite material consisting of cross-linked graphene and CNT, or a reinforced polymer composite, reinforced metal composite or reinforced ceramics composite, respectively.

Additives employed in this example include carbon nanotubes (single or multiwalled) and graphene, but is applicable to any fullerene or any other structural entity that may be cross-linked by linker units (LU). Also, any number of different structural entities may be used, and any number of different linker units may be used.

Step 1.

In an appropriate solvent, such as chloroform, acetonitrile, DMF, DMSO, or NMP, prepare 5 mixtures of graphene, CNT, and the compounds (10F), (10K), and (10L) described in Example 10, where (10F) is a linker unit comprising a non-covalent ligand to CNT at one end and a non-covalent graphene-binding ligand at the other end of the linker unit, (10K) is a linker unit comprising a non-covalent ligand to CNT at both ends of the linker unit, and (10L) is a linker unit comprising a non-covalent ligand to graphene at both ends of the linker unit. Use an equimolar amount of CNT and graphene, and relative molar amounts as follows:

Mixture 1: graphene:(10F):(10K):(10L)=1:100:10:10

Mixture 2: graphene:(10F):(10K):(10L)=1:1,000:100:100

Mixture 3: graphene:(10F):(10K):(10L)=1:10,000:1,000:1,000

Mixture 4: graphene:(10F):(10K):(10L)=1:100,000:10,000:10,000

Mixture 5: graphene:(10F):(10K):(10L)=1:1,000,000:100,000:100,000

Use a concentration of (10F) between 0.01 and 10 mM. Sonicate for 12 hours at high power, then incubate for 12 hours.

The linker units will now have bound to the graphene and CNT, thereby cross-linking CNT and graphene molecules, resulting in the formation of an extensive network of interlinked CNT and graphene molecules. Then the solvent is removed by either simple evaporation, or e.g. filtration to remove unbound ligands and solvent followed by evaporation of residual solvent. The dry scaffold material consisting of a network of cross-linked CNTs and graphene is depicted in FIG. 14A.

Composite materials with matrices of metal, ceramics or plastic polymers can now be generated, as described below.

Step 2.

Preparation of metal-fullerene composite material. The desired metal (e.g. tin, or any other metal or metal alloy), is added to the dry scaffold material obtained in Step 1, under conditions that ensure efficient deposition of the metal in the network structure, e.g. by classical approaches like thermal spraying (plasma spraying and cold spraying), mechanical alloying and hot pressing, sintering e.g. spark plasma sintering, simple melting and solidification (casting, metal infiltration, melt spinning, laser deposition), electrochemical deposition (electro deposition, electroless deposition), as well more recent techniques such as molecular level mixing, sputtering techniques, sandwich processing, torsion/friction welding, vapor deposition, mixing as paste, and nano-scale dispersion. The final result is a CNT/graphene/metal composite. See FIG. 14B.

Alternative route for producing a reinforced metal composite. To the dry scaffold material obtained in Step 1 is added a soluble salt of the desired metal or metals. In this example, copper is used, but any other metal or metal alloy can be used. The soluble salt $Cu(CH_3COO)_2$ in water is added while stirring. Then the solvent is evaporated, and after drying and calcination (e.g. at 300° C. in air) and reduction (e.g. reduction with hydrogen at 250° C. for 3 hours under pressure), a CNT/graphene/metal composite material is obtained. See FIG. 14B.

Preparation of ceramics-fullerene composite material. The desired ceramics material, e.g. a technical ceramics or structural material (e.g. alumina, ceria, zirconia, carbide, boride, silicide, silicon carbide, or any other ceramic material including structural materials like cement/concrete as well as technical ceramics), is formed in situ, by addition of relevant precursors to the dry scaffold material obtained in Step 1 above, such as by adding Aluminum, Beryllium, Cerium or Zirconium, which upon oxidation gives the oxides aluminas, beryllias, cerias, zirconias, or oxides materials mentioned above or nonoxides such as carbides, borides, nitrides and silicides in an appropriate solvent, and allowing the reagents to react and form the ceramics matrix. Alternatively, the ceramics matrix is deposited by an appropriate process such as thermal spraying or sintering, or by electrochemical deposition (electro deposition, electroless deposition), but the ceramics can also be deposited by more recent techniques such as molecular level mixing, sputtering techniques, sandwich processing, torsion/friction welding, vapor deposition, mixing as paste, and nano-scale dispersion.

The final result is a ceramics composite. See FIG. 14B.

Process 3: Preparation of Plastic-Fullerene Composite Material.

The desired polymer, e.g. polyethylene, polyamide, polyurethane, polystyrene, polyacrylate, or any other polymer, is formed in situ, by addition of relevant precursors, such as (for polyurethane) toluene diisocyanate and ethylene glycol, to the dry scaffold material obtained in Step 1 above. Alternatively, the matrix is added to the dry scaffold as pre-made polymers or premade composites, e.g. in melted form or dissolved in an appropriate solvent (e.g. carbonfiber-reinforced polyethylene dissolved in tetrachlorethylene or dichlorobenzene. The final result is a plastic composite comprising the structural entities graphene and CNT. See FIG. 14B.

Aspects of the Invention

The invention encompasses the following aspects:

Aspect 1.A linker unit (LU) having the structure

Ligand1-LinkerL-Ligand2 wherein

Ligand1 is a bond or chemical entity that is capable of binding covalently or non-covalently to a structural entity, LinkerL is a chemical bond or entity that links Ligand1 and Ligand2, Ligand 2 is a bond or chemical entity that is capable of binding covalently or non-covalently to a structural entity.

Aspect 2. A linker unit (LU) comprising several Ligands and Linkers, of the following compositions:

((Ligand)m)-((Linker)n)

or (Ligand-Linker)n where m and n are integers, and the Ligands and Linkers can be linked in any order and sequence, and Ligand and Linker are as defined in aspect 1.

Aspect 3. A ligand-structural entity complex comprising one or more ligands and one or more structural entities, described by the formula $SE_o$-$Ligand_p$ where SE is a structural entity, and Ligand is a chemical moiety capable of binding to the SE, and o and p are integers larger than zero.

Aspect 4. The complex according to aspect 3, wherein said ligand binds to said structural entity with a Kd less than $10^{-5}$, such as less than $10^{-6}$, less than $10^{-7}$, less than $10^{-8}$ or less than $10^{-9}$ M.

Aspect 5. The complex according to aspect 4, wherein said structural entity (SE1, SE2) is inorganic, preferably a fullerene, such as a carbon nanotube, buckyball or graphene molecule; or is a polymer such as e.g. polyimide, polyamides, polycarbonates, polyesters, polyethylenes (LDPE, HDPE), polypropylenes (PP), styrenics (polystyrenes/PS, acrylonitriles/ABS), vinyls (PVC, nylon), acrylics (PMMA/perspex,plexiglas), fluoroplastics (PTFE/teflon, FEP, PFA, PVDF), polysulphones (PES), ketones (PEEK), polyurethanes, barrier resins (PVA/polyvinyl alcohol), epoxy resins (FR4), silicone resins, elastomers (PDMS), biopolymers (wood, cellulose, starch based), conductive polymers (Pedot:PSS/baytron,orgacon, TIPS pentacene), light emitting polymers (white LEP, etc), rubber, latex, metalised polymers and copolymers and block co-polymers thereof.

Aspect 6. A structure (SE1-Ligand1-LinkerL-Ligand2), where SE1 is a first structural entity, Ligand1 is an entity as defined in aspect 1 bound to SE1, Ligand2 is an entity as defined in aspect 1 capable of binding a second structural entity SE2, and LinkerL is a chemical entity as defined in aspect 1 which links Ligand1 and Ligand2.

Aspect 7. A composite material unit (CMU) of the structure (SE1-Ligand1-LinkerL-Ligand2-SE2), where SE1 and SE2 are structural entities, Ligand1 and Ligand2 are chemical entities as defined in aspect 1 which are bound to SE1 and SE2, respectively, and LinkerL is a chemical entity as defined in aspect 1 which physically links Ligand1 and Ligand2.

Aspect 8. The composite material unit according to any one of aspects 6 or 7 where Ligand1 and Ligand2 are covalently bound to SE1 and SE2, respectively.

Aspect 9. The composite material unit of any one of aspects 6 or 7 where Ligand1 and Ligand2 are non-covalently bound to SE1 or SE2, respectively.

Aspect 10. The composite material unit of any one of aspects 6 or 7 where Ligand1 is non-covalently bound to SE1, and Ligand2 is covalently bound to SE2.

Aspect 11. The composite material unit according to any one of any one of aspects 6-7, 9-10 where Ligand1 is non-covalently bonded to SE1 and wherein Ligand1 does not contain alpha-amino acids.

Aspect 12. The composite material unit according to any one of aspects 6-11, where SE1 and/or SE2 are inorganic, preferably a fullerene, such as a carbon nanotube, buckyball or graphene molecule.

Aspect 13. The composite material unit according to any one of aspects 6-11, where SE1 and/or SE2 are polymers such as e.g. polyimide, polyamides, polycarbonates, polyesters, polyethylenes (LDPE, HDPE), polypropylenes (PP), styrenics (polystyrenes/PS, acrylonitriles/ABS), vinyls (PVC, nylon), acrylics (PMMA/perspex,plexiglas), fluoroplastics (PTFE/teflon, FEP, PFA, PVDF), polysulphones (PES), ketones (PEEK), polyurethanes, barrier resins (PVA/polyvinyl alcohol), epoxy resins (FR4), silicone resins, elastomers (PDMS), biopolymers (wood, cellulose, starch based), conductive polymers (Pedot:PSS/baytron,orgacon, TIPS pentacene), light emitting polymers (white LEP, etc), rubber, latex, metalised polymers and copolymers and block co-polymers thereof.

Aspect 14. The composite material unit according to any one of aspects 6-13, where SE2 is a polymer, preferably a polyolefin; such as polyethylene, polypropylene and polybutene, or blends or block-copolymers of polyolefins.

Aspect 15. The composite material unit according to any one of aspects 6-14, wherein SE1 and SE2 are selected as follows:

| SE1 | SE2 |
|---|---|
| Carbon nanotube | Epoxy |
| Carbon nanotube | Polyvinyl |
| Carbon nanotube | Polystyrene |
| Graphene | Epoxy |
| Kevlar | Polypropylene |
| Silk | Metal (e.g. iron, zinc, copper) |
| Metal alloy | Collagen |
| Collagen | Carbon nanotube |
| Myosin | Steel |
| Actin | Carbon nanotube |
| Cement (C—S—H) | Nanotube |
| Carbon nanotube | Carbon nanotube |
| Graphene | Graphene |
| Carbon nanotube | Carbon nanotube |
| Polyvinyl | Polyvinyl |

Aspect 16. The composite material unit according to any one of aspects 6-15, wherein Ligand1 is selected from Riboflavin, DNA, Porphyrine, Pyrenyl, SDBS, Polypeptide with sequence SVSVGMKPSPRPGGGK, Polypeptide with sequence THRTSTLDYFVI, Benzene, Naphthalene, Biphenyl, Fluorine, Phenanthrene, Anthracene, Pyrene, Triphenylene. P-terphenyl, Tetraphene, Pyrenecarboxylic acid, SDS, SDSA, DTAB, NaDDBS, Tween-60, Tween-80, Monostearate, Monooleate, PSPEO, PVP, Polystyrene and Sulfonate.

Aspect 17. The composite material unit according to any one of aspects 6-15, wherein Ligand1 is a polypeptide having 4-50 amino acids, such as 5-40 amino acids, 6-30 amino acids, 7-20 amino acids or 10-15 amino acids.

Aspect 18. The composite material unit according to any one of aspects 6-15, wherein SE1 is a fullerene and Ligand1 is selected from the group consisting of aromatic systems, including benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants; halogens; nitro group; amine; thiol; alcohol; ester; amide; carboxylic acid; phenol; indole; imidazole; sulfonate; phophate; alkanes, including hexane and heptane; zwitterionic molecules, including chemical motifs comprising an alkane (including C4, C5, C6, C7, C8, C9, C10, C11, C12, C13, C14, C15, C16, C17, C18, C19, C20, C21, C22, C23, C24, C25) and a polar end group such as sulfonate, for example SDBS, sodium dodecylbenzenesulfonate; lactames, such as N-methyl-pyrrolidone and lactones; peptides, in particular peptides with hydrophilic amino acids at the ends of the peptide and hydrophobic amino acids in the middle, and peptides such as QLMHDYR, CPTSTGQAC, CTLHVSSYC, RLNPPSQMDPPF, QTWPPPLWFSTS, HTDWRLGTWHHS, ELWSIDTSAHRK, IFRLSWGTYFS, HWKHPWGAWDTL, ELWR, ELWRPTR, KPRSVSG-dansyl, TGTG-F-GTCT, TGTG-V-GTCT, TGTG-W-GTCT, TGTG-T-GTCT, TGTG-G-GTCT, TGTG-N-GTCT, TGTG-K-GTCT, TGTG-D-GTCT, MHGKTQATSGTIQS, DAEFRHD SGYEVHHQKLVFFAEDVGSNKGAIIGLMVGGVVIA, DAEFRHDSGYEVHHQKLVFFAEDVGSNKGAIIGLMVGGVV, CHKKPSKSC, RKLPDAPGMHTW, SCSDCLKSVDFIPSSLASS, YLTMPTP, FSWEAFA, HLESTPG, GETRAPL, RHEPPLA, GETQCAA, FPGRPSP, HTAQSTA, HKPDANR, FPGHSGP, THLPWQT, GETQCAA, FPGRPSP, HTAQSTA, VKTQATSREEPPRLPSKHRPG; amino acids such as phenylalanine, tyrosine, tryptophan, histidine; heteroaromatic systems, including pyrole, thiophene, furane, pyrazole, imidazole, isoxazole, oxazole, isothiazole, thiazole, pyridine and perylene bisimides; and fused ring systems, composed of either aromatic, non-aromatic or anti-aromatic rings or combinations thereof.

Aspect 19. The composite material unit according to any one of aspects 6-18 where the dissociation constant of the interaction between Ligand1 and SE1 is less than $10^{-3}$ M, or more preferably is less than $10^{-4}$ M, or more preferably is less than $10^{-5}$ M, or more preferably is less than $10^{-6}$ M, or more preferably is less than $10^{-7}$ M, or more preferably is less than $10^{-8}$ M, or more preferably is less than $10^{-9}$ M, or more preferably is less than $10^{-10}$ M, or more preferably is less than $10^{-11}$ M, or more preferably is less than $10^{-12}$ M, or more preferably is less than $10^{-13}$ M, or more preferably is less than $10^{-14}$ M, or more preferably is less than $10^{-15}$ M, or more preferably is less than $10^{-16}$ M, or more preferably is less than $10^{-17}$ M, or more preferably is less than $10^{-18}$ M, or more preferably is less than $10^{-20}$ M, or more preferably is less than $10^{-22}$ M, or more preferably is less than $10^{-25}$ M, or more preferably is less than $10^{-30}$ M.

Aspect 20. The composite material unit according to any one of aspects 6-19, wherein the molecular weight MW of Ligand1 is less than 3000 dal, such as less than 2000 dal, or less than 1000 dal.

Aspect 21. The composite material unit according to any one of aspects 6-20, of the structure (SE1-Ligand1-LinkerL-Ligand2-SE2), wherein SE1 is a carbon nanotube, buckyball or graphene molecule;

SE2 is a polymer;

Ligand1 is a chemical entity which is non-covalently bound to SE1;

Ligand2 is a chemical entity which is covalently bound to SE2

LinkerL is a chemical entity as defined in aspect 1 which physically links Ligand1 and Ligand2, in which SE1, SE2, Ligand1, Ligand2 and LinkerL are as defined in any one of aspects 1-19

Aspect 21. The composite material unit according to any one of aspects 6-21, in which Ligand1 and/or Ligand 2 comprise one or more, such as two or more, subligands held together by one or more sub-linkers.

Aspect 22. The composite material unit according to any one of aspects 6-21, wherein the structural entity (SE1, SE2) is a small molecular structural entity (eg ion), a large molecular structural entity (eg CNT) or a particulate structural entity (eg surface).

Aspect 23. The composite material unit according to any one of aspects 6-21, wherein SE1 is a carbon nanotube, Ligand1 has a MW of less than 20000 Da and is non-covalently bound to SE1, and SE2 is a polymer, preferably a non-biological polymer.

Aspect 24. A composite material unit comprising several SEs and LUs, of the following compositions:

((SE)l)-((Ligand)m)-((Linker)n)

or (SE-Ligand-Linker)n where l, m, and n are any integers, and where the SEs, Ligands and Linkers are as defined in any of aspects 1-23, and can be linked in any order and sequence.

Aspect 25. A composition of two or more composite material units according to any one of aspects 6-24.

Aspect 26. A composition according to aspect 25, where at least one of SE1 and SE2 is linked to at least two other structural entities.

Aspect 27. A composite material comprising a composition of two or more composite material units of aspects 6-24, where at least one of SE1 and SE2 is linked to at least two other structural entities.

Aspect 28. A combination of at least one structural entity (SE1, SE2) as defined in any one of aspects 1-24 with at least one ligand (Ligand1, Ligand2) as defined in any one of aspects 1-24 which binds to said structural entity.

Aspect 29. The combination according to aspect 28, wherein said at least one ligand binds to said at least one structural entity with a dissociation constant (Kd) of less than $10^{-5}$, such as less than $10^{-6}$, less than $10^{-7}$, less than $10^{-8}$ or less than $10^{-9}$ M.

Aspect 30. A method for preparing a Composite Material Unit (CMU) according to any one of aspects 6-24, said method comprising the following steps:

a. Providing a first structural entity (SE1)

b. Providing a second structural entity (SE2)

c. Providing a linker, LinkerL d. Providing a first Ligand (Ligand1)

e. Providing a second Ligand (Ligand2)

f. Reacting, in any order, the provided structural entities, linker and ligands, to form a composite material unit (CMU) of the structure (SE1-Ligand1-LinkerL-Ligand2-SE2), wherein the first structural entity (SE1), the second structural entity (SE2), LinkerL, Ligand1 and Ligand2 are as defined in any one of aspects 1-24.

Aspect 31. The method according to aspect 30, wherein the reaction step (f) comprises a step of solution mixing, melt processing or in-situ polymerization.

Aspect 32. A carbon-nanotube (CNT) reinforced polymer comprising one or more composite material units according to any one of aspects 6-24.

Aspect 33. A nanosensor comprising one or more composite material units according to any one of aspects 6-24.

Aspect 34. Use of a composite material unit according to any one of aspects 6-24 in a paint, an adhesive, a paper, a plastic, a coating, a sealant, a concrete or a cement.

Aspect 35. Use according to aspect 34, wherein SE1 and SE2 are both carbon nanotubes.

Aspect 36 A reinforced structural entity, in which the structural entity is defined in any one of aspects 3, 5, or 12-15, and whose strength has been increased upon binding of at least one ligand, said ligand being as defined in any one of the preceding aspects.

Aspect 37. A composition of composite material units according to any one of aspects 6-24 in a matrix, wherein said matrix is selected from the group comprising a ceramic, a metal, a metal alloy, a concrete or a polymer, such as PE or epoxy.

Aspect 38. The ligand-structural entity complex according to any of aspects 3-5 in a matrix, wherein said matrix is selected from the group comprising a ceramic, a metal, a metal alloy, a concrete or a polymer, such as PE or epoxy.

Aspect 39. The use of carbon nanotube-binding ligands selected from Riboflavin, DNA, porphyrine, pyrenyl, SDBS, polypeptide with sequence SVSVGMKPSPRPGGGK, polypeptide with sequence THRTSTLDYFVI, benzene, naphthalene, biphenyl, fluorene, phenanthrene, anthracene, pyrene, triphenylene. p-terphenyl, tetraphene, pyrenecarboxylic acid, SDS, SDSA, DTAB, NaDDBS, Tween-60, Tween-80, monostearate, monooleate, PSPEO, PVP, polystyrene and sulfonate, in a composite material unit according to any one of aspects 6-24.

Aspect 40. A carbon nanotube, non-covalently bound to a ligand (Ligand1) as defined in any of aspects 1-39, with a dissociation constant Kd of less than $10^{-6}$ M, said ligand having a MW less than 20000 Da, wherein the carbon nanotube-ligand structure has an increased strength compared to a non-ligand bound carbon nanotube.

Aspect 41. A composition according to aspect 37, being homogenous, e.g. microscopically homogeneous.

Aspect 42. A composition according to any one of aspects 37 or 41 comprising composite material units (CMUs) at a concentration of at least 100 mol, e.g. at least 200 mol., at least 500 mol., at least 1000 mol.

Aspect 43. A composition according to any one of aspects 37 or 41-42 in which there are no biological molecules in the composite material.

Aspect 44. A composition according to any one of aspects 37, 41-43 having a longest dimension which is more than 1 mm, e.g. more than 1 cm or more than 10 cm.

Aspect 45. The composite material unit according to any one of aspects 6-24, wherein the molecular weight of the linker L is less than 20000 dal, e.g. less than 10000 dal, less than 5000 dal, less than 4000 dal, less than 3000 dal, less than 2000 dal, less than 1000 dal or less than 500 dal.

Aspect 46. The composite material unit according to any one of aspects 6-24 or 45, wherein the structural entity (SE1) is a non-conducting carbon nanotube.

Aspect 47. The composite material unit according to any one of aspects 6-24 or 45-46, wherein the number of different SEs in the composite material unit is more than 1, more than 2, more than 3, more than 4 or more than 5.

Aspect 48. The composite material unit according to any one of aspects 6-24 or 45-47, wherein the structural entity is bound to 2 or more different ligands.

Aspect 49. The composite material unit according to any one of aspects 6-24 or 45-48, wherein the ligands have a ratio of KA (association constant) to MW which is greater than 10000, e.g. greater than 100000, greater than 1000000, or greater than 10000000 M-1/Dal.

The invention claimed is:

1. A U-shape molecule having the structure

Subligand1-Linker-Subligand2 wherein the U-shape molecule is a Ligand molecule and each of the two Subligands is a chemical moiety; and wherein each of the two Subligands is capable of binding non-covalently to a carbon nanotube.

2. The U-shape molecule of claim 1, wherein each of the Subligands comprises a pyrene or a cyclopentadiene moiety, or wherein each of the Subligands comprises one or more chemical moieties chosen from the following list of chemical moieties: —$NH_2$, —COOH, —$CONH_2$, —SH, phenyl, benzene, and pyrene; aromatic systems; halogens, nitro group, amine, thiol, alcohol, ester, amide, carboxylic acid, phenol, indole, imidazole, sulfonate and phosphate; alkane; soap-type molecules; lactames; peptides; amino acids; heteroaromatic systems; and fused ring systems.

3. The U-shape molecule of claim 1, wherein the U-shape molecule comprises a pyrene or a cyclopentadiene moiety, or wherein the U-shape molecule comprises one or more chemical moieties chosen from the following list of chemical moieties: —$NH_2$, —COOH, —$CONH_2$, —SH, phenyl, benzene, and pyrene; aromatic systems; halogens, nitro group, amine, thiol, alcohol, ester, amide, carboxylic acid, phenol, indole, imidazole, sulfonate and phosphate; alkane; soap-type molecules; lactames; peptides; amino acids; heteroaromatic systems; and fused ring systems.

4. The U-shape molecule of claim 1, wherein either the U-shape molecule comprises 2, 3, or 4 cyclopentadiene moieties and 2, 3, or 4 anthracene moieties and two alkene moieties and two hexane or heptane moieties, or the U-shape molecule comprises two pyrene moieties and two long alkanes (C9) and two alkenes.

5. The U-shape molecule of claim 1, wherein each of the Subligands is capable of binding non-covalently to a single-wall carbon nanotube (SWNT) of (6,5) or (7,6) chirality, and wherein the U-shape molecule and/or the single-wall carbon nanotube (SWNT) is capable of binding non-covalently to a polystyrene polymer.

6. The U-shape molecule of claim 1, wherein the molecular weight of the U-shape molecule is in the range of 1-100 Dal; 100-200 Dal, 200-300 Dal, 300-400 Dal, 400-500 Dal, 500-600 Dal, 600-700 Dal, 700-800 Dal, 800-900 Dal, 900-1000 Dal, 1,000-1200 Dal, 1,200-1,400 Dal, 1,400-1,700 Dal, 1,700-2,000 Dal, 2,000-3,000 Dal, 3,000-5,000 Dal, 5,000-7,000 Dal, 7,000-10,000 Dal, 10,000-20,000 Dal, 20,000-40,000 Dal, 40,000-100,000 Dal, 100,000-200,000 Dal, 200,000-500,000 Dal, 500,000-1,000,000 Dal, 1,000,000-2,000,000 Dal, 2,000,000-5,000,000 Dal, 5,000,000-10,000,000 Dal, 10,000,000-100,000,000 Dal, or larger than 100,000,000 Dal.

7. A complex of a carbon nanotube bound non-covalently to the U-shape molecule of claim 1, said complex having the structure Carbon nanotube-U-shape molecule.

8. The complex of claim 7, wherein the U-shape molecule and/or the carbon nanotube is capable of binding non-covalently to a polystyrene polymer, and wherein the carbon nanotube is a SWNT with (6,5) or (7,6) chiral vector.

9. A complex of the U-shape molecule of claim 1 bound non-covalently to a carbon nanotube, wherein the U-shape molecule and/or the carbon nanotube are/is further bound to a polymer, and having the structure (Carbon nanotube-U-shape molecule)-polymer.

10. The complex of claim 9, wherein the U-shape molecule and/or the carbon nanotube are/is non-covalently bound to the polymer.

11. The complex of claim 9, wherein the U-shape molecule is covalently bound to the polymer.

12. The complex of claim 9, wherein the polymer is a polystyrene, and the carbon nanotube is a SWNT of (6,5) or (7,6) chirality.

13. A composition comprising the U-shape molecule of claim 1 and a carbon nanotube.

14. A composition comprising the U-shape molecule of claim 1 and a polymer.

15. A composition comprising the U-shape molecule of claim 1, a polymer, and a carbon nanotube.

16. A composite material comprising the carbon nanotube-U-shape molecule-polymer complex of claim 9.

17. The complex or composition or composite material of claim 9, wherein the polymer is chosen from the following list of polymers: polystyrene, polyurethane, polyvinylchloride, polyethylene, polypropylene, nylon, epoxy polymer, polycarbonate, polyester, polymers of monoolefins and diolefins, polymers of cycloolefins; mixtures of the polymers mentioned above and below; copolymers of monoolefins and diolefins with each other, linear low density polyethylene (LLDPE) and mixtures thereof with low density polyethylene (LDPE), propylene/but-1-ene copolymers, propylene/isobutylene copolymers, ethylene/but-1-ene copolymers, ethylene/hexene copolymers, ethylene/methylpentene copolymers, ethylene/heptene copolymers, ethylene/octene copolymers, ethylene/cycloolefin copolymers, ethylene/1-olefins copolymers, wherein the 1-olefin is generated in-situ; propylene/butadiene copolymers, isobutylene/isoprene copolymers, ethylene/vinylcyclohexene copolymers, ethylene/alkyl acrylate copolymers, ethylene/alkyl methacrylate copolymers, ethylene/vinyl acetate copolymers or ethylene/acrylic acid copolymers and their salts (ionomers) as well as terpolymers of ethylene with propylene and a diene; and mixtures of such copolymers with one another and with polymers mentioned above; hydrocarbon resins, hydrocarbon resins with hydrogenated modifications and mixtures of polyalkylenes and starch; poly(p-methylstyrene), poly($\alpha$-methylstyrene); aromatic homopolymers and copolymers derived from vinyl aromatic monomers; mixtures of high impact strength of styrene copolymers, a diene polymer or an ethylene/propylene/diene terpolymer; and block copolymers of styrene; hydrogenated aromatic polymers, polycyclohexylethylene (PCHE); graft copolymers of vinyl aromatic monomers; styrene and acrylonitrile (or methacrylonitrile) on polybutadiene; styrene, acrylonitrile and methyl methacrylate on polybutadiene; styrene and maleic anhydride on polybutadiene; styrene, acrylonitrile and maleic anhydride or maleimide on polybutadiene; styrene and maleimide on polybutadiene; styrene and alkyl acrylates or methacrylates on polybutadiene; styrene and acrylonitrile on ethylene/propylene/diene terpolymers; styrene and acrylonitrile on polyalkyl acrylates or polyalkyl methacrylates, styrene and acrylonitrile on acrylate/butadiene copolymers, as well as mixtures thereof; halogen-containing polymers, chlorinated or sulfo-chlorinated polyethylene, copolymers of ethylene and chlorinated ethylene, epichlorohydrin homo- and copolymers, polymers of halogen-containing vinyl compounds; polymers derived from $\alpha,\beta$-unsaturated acids and derivatives thereof; polymethyl methacrylates, polyacrylamides and polyacrylonitriles, impact-modified with butyl acrylate; acrylonitrile/butadiene copolymers, acrylonitrile/alkyl acrylate copolymers, acrylonitrile/alkoxyalkyl acrylate or acrylonitrile/vinyl halide copolymers or acrylonitrile/alkyl methacrylate/butadiene terpolymers; polymers derived from unsaturated alcohols and amines or the acyl derivatives or acetals thereof; as well as their copolymers with olefins; homopolymers and copolymers of cyclic ethers; polyacetals; polyacetals modified with thermoplastic polyurethanes, acrylates or MBS; polyphenylene oxides and sulfides, and mixtures of polyphenylene oxides with styrene polymers or polyamides; polybutadienes, aliphatic or aromatic polyisocyanates, as well as precursors thereof; polyamides and copolyamides derived from diamines and dicarboxylic acids and/or from aminocarboxylic acids or the corresponding lactams; polyamides prepared from hexamethylenediamine and isophthalic or/and terephthalic acid and with or without an elastomer as modifier; and also block copolymers of the aforementioned polyamides with polyolefins, olefin copolymers, ionomers or chemically bonded or grafted elastomers; or with polyethers; as well as polyamides or copolyamides modified with EPDM or ABS; and polyamides condensed during processing (RIM polyamide systems); polyureas, polyamide-imides, polyetherimides, polyesterimides, polyhydantoins and polybenzimidazoles; polyesters derived from dicarboxylic acids and diols and/or from hydroxycarboxylic acids or the corresponding lactones or lactides; polybutylenesuccinate/terephtalate, polybutyleneadipate/terephthalate, polytetramethyleneadipate/terephthalate, polybutylensuccinate/adipate, polybutylensuccinate/carbonate, poly-3-hydroxybutyrate/octanoate copolymer, poly-3-hydroxybutyrate/hexanoate/decanoate terpolymer; aliphatic polyesters; polycarbonates and polyester carbonates; polyketones; polysulfones, polyether sulfones and polyether ketones; crosslinked polymers derived from aldehydes, phenols, ureas or melamines; unsaturated polyester resins derived from copolyesters of saturated and unsaturated dicarboxylic acids with polyhydric alcohols and vinyl compounds as crosslinking agents, and also halogen-containing modifications thereof; crosslinkable acrylic resins derived from substituted acrylates; alkyd resins, polyester resins and acrylate resins crosslinked with melamine resins, urea resins, isocyanates, isocyanurates, polyisocyanates or epoxy resins; crosslinked epoxy resins derived from aliphatic, cycloaliphatic, heterocyclic or aromatic glycidyl compounds; natural polymers; as well as rosins and their derivatives; blends of polymers (polyblends); linear and branched polymers; polyimide, PTFE, PMMA, HDPE, styrenics (polystyrenes/PS, acrylonitriles/ABS), vinyls (PVC, nylon), acrylics (PMMA), fluoroplastics (PTFE, FEP, PFA, PVDF), polysulphones (PES), ketones (PEEK), polyurethanes, barrier resins (PVA/polyvinyl alcohol), FR4, silicone resins, elastomes (PDMS), biopolymers (wood, cellulose, starch based), conductive polymers (Pedot:PSS, TIPS pentacene), light emitting polymers, metalised polymers, block copolymers, rubber, Latex, Polyacetylene, Polydiacetylenes, Polyethylene—very low density (VLDPE), Polyethylene—medium density (MDPE), Polyethylene—ultrahigh molecular weight (UHMWPE), Polyisoprene, Poly-1-butene, Poly-1-hexene, Polymethylpentene, polyisobutylene, poly (ethylene propylene), Poly-1-octene, Ethylene-propylene-diene rubbers, Ethylene-propylene bases thermoplastic elastomers, Polyhexene, Polyheptene, Polyoctene, Polystyrene-butadiene, Parylene, Polymers of styrene in primary forms, Expansible polystyrene in primary forms, Expanded polystyrene (EPS), Poly(p-phenylene), High-impact polystyrene (HIPS), Polyp-phenylene-vinylene), Poly(2,5-dioctyl-1,4-phenylenevinylene), Poly(2,6-naphthalenevinylene), Polyanthracene, Poly(anthracene-vinylene), Polychloroprene, Non plasticised PVC mixed with any other substance in primary forms, Plasticised PVC mixed with any other substance in primary forms, Polyvinylidene chloride (PVDC), Polytetrafluorethylene (PTFE), Polyvinylidene fluoride (PVDF), ethylene tetrafluoro-ethylene copolymer, Polyvinylfluoride, Polyperfluoropropylene, Polyoxymethylene, Polyethyleneoxide, Polypropyleneoxide, Poly(ethylene-propylene oxide), polybutyleneoxide, Polyphenylene ether (PPE), polyacrylate, polyacrylic acid, Polymethylmethacrylate, Polymethylacrylate, Poly(ethyl acrylate), Polyhydroxyethylmethacrylate, Polybutylacrylate, Polybutylmethacrylate, Ethylene vinyl acetate (EVA) and ethylene vinyl alcohol (EVOH), Poly-vinyl acetate in primary forms, Poly-vinyl acetate in aqueous dispersion in primary forms, Polyvinylacetate, Polyvinylalcohol, Polyetherketon, polyetheretherketon, polylactic acid, Polybutylene terephtalate (PBT), Polycaprolactone (PCL), Polyglycolide (PG), Liqid crystalline polymers (aromatic) containing esters, Polyethylene adipate (PEA), Polytrimethylene terephthalate (PTT), Polyethylene naphthalate (PEN), Alkyd resins, Polymers of vinyl esters, Polyacetals in primary forms, Phenol formaldehyde resins (PF), Diglycidyl Ether of Bisphenol-A (DGEBA), Phenolic Epoxy Resins, Poly-o-vinylbenzylalcohol, Poly-p-vinylbenzylalcohol, Polyvinyl formal, Polyvinyl acetal, Polyvinyl isobutyral, Polyvinyl butyral, Polyvinyl-n-butyl ether, Polytetramethylene sebacate, Polybutylene oxide, polypropylene oxide, Polyethylene adipate, Polyacrylonitrile (PAN) and copolymers, Acrylonitrile-butadiene-styrene (ABS) terpolymer, Styrene-acrylonitrile (SAN) copolymer, Polyaniline, Polypyrrole, Polymethacrylonitrile, Polysulphones, Polysulphides, ethylene chlorotrifluoro ethylene copolymer (ECTFE), fluorinated ethylene-propylene copolymer, polychlorotrifluoro-ethylene, Nylon PA1,1, Nylon PA1,2, Nylon PA1,3, Nylon PA1,4, Nylon PA1,5, Nylon PA1,6, Nylon PA2,1, Nylon PA6,6, Nylon PA6,10, Polyurethane based on, polyimide, polycaprolactam, aramid, Polyphenylene benzobisoxazole, Poly(m-phenyleneisophtalamide) (MPD-I), Poly(p-phenyleneterephtalamide) (PPD-T), Polyisocyanurates, Bismaleimides (BMI), Polyacenaphthylene, Polyvinyl pyrrolidone, Vinyl chloride-vinyl acetate copolymers, Organomodified siloxanes (OMS), Polymethylhydrosiloxane (PMHS), Silicones in primary forms, PolyAPTAC, (poly (acrylamido-N-propyltrimethylammonium chloride)) and PolyMAPTAC (poly[3-(methacryloylamino))-propyl] trimethylammonium chloride), natural and unnatural polypeptides, lipids, polysaccharides, and wood flour.

18. The composition of claim 13 comprising two U-shape molecules bound to two different carbon nanotubes.

19. The composite material of claim 16, wherein the largest dimension of the composite material is greater than 1 μm, greater than 10 μm, greater than 100 μm, greater than 1 mm, greater than 10 mm, greater than 100 mm, greater than 1 m, greater than 10 m, greater than 100 m, or greater than 1,000 m.

20. The composition of claim 13, wherein the total number of carbon nanotubes is greater than 1E+06, greater than 1E+07, greater than 1E+08, greater than 1E+09, greater than 1E+10, greater than 1E+11, greater than 1E+12, greater than 1E+13, greater than 1E+14, greater than 1E+15, greater than 1E+16, greater than 1E+17, greater than 1E+18, greater than 1E+19, or greater than 1E+20.

21. The composite material of claim 16, wherein the total weight of the composite material is greater than $10^{-3}$ kg, greater than 0.01 kg, greater than 0.1 kg, greater than 1 kg, greater than 10 kg, greater than 100 kg, greater than $10^3$ kg, greater than $10^4$ kg, greater than $10^5$ kg, greater than $10^6$ kg, greater than $10^7$ kg, greater than $10^8$ kg, or greater than $10^9$ kg.

22. The composite material of claim 16, wherein the total number of carbon nanotube-U-shape molecule-polymer complexes of claim 4 is greater than 1E+00, greater than 1E+01, greater than 1E+02, greater than 1E+03, greater than 1E+04, greater than 1E+05, greater than 1E+06, greater than 1E+07, greater than 1E+08, greater than 1E+09, greater than 1E+10, greater than 1E+11, greater than 1E+12, greater than 1E+13, greater than 1E+14, greater than 1E+15, greater than 1E+16, greater than 1E+17, greater than 1E+18, greater than 1E+19, or greater than 1E+20.

23. The composition of claim 13, wherein the carbon nanotube content is greater than $10^{-9}$ kg, greater than $10^{-8}$ kg, greater than $10^{-7}$ kg, greater than $10^{-6}$ kg, greater than $10^{-5}$ kg, greater than $10^{-4}$ kg, greater than $10^{-3}$ kg, greater than 0.01 kg, greater than 0.1 kg, greater than 1 kg, greater than 10 kg, greater than 100 kg, greater than $10^3$ kg, greater than $10^4$ kg, greater than $10^5$ kg, greater than $10^6$ kg, greater than $10^7$ kg, greater than $10^8$ kg, or greater than $10^9$ kg.

24. The complex of claim 7, wherein the number of non-covalently bound U-shape molecules per carbon nanotube is in the range of 1 to 2, or 2 to 10, or 10 to 100, or 100 to 1000, or $10^3$ to $10^4$, or $10^4$ to $10^5$, or $10^5$ to $10^6$, or $10^6$ to $10^7$, or $10^7$ to $10^8$, or $10^8$ to $10^9$.

25. The composition of claim 13 wherein the carbon nanotube is chosen from the list of single-wall carbon nanotubes, double-wall carbon nanotubes, triple-wall carbon nanotube, multi-wall carbon nanotubes, and carbon nanotubes with the following chiral vectors (n, m); (0,0); (1,0); (2,0); (3,0); (4,0); (5,0); (6,0); (7,0); (8,0); (9,0); (10,0); (11,0); (12,0); (13,0); (14,0); (15,0); (16,0); (17,0); (18,0); (19,0); (20,0); (0,1); (1,1); (2,1); (3,1); (4,1); (5,1); (6,1); (7,1); (8,1); (9,1); (10,1); (11,1); (12,1); (13,1); (14,1); (15,1); (16,1); (17,1); (18,1); (19,1); (20,1); (0,2); (1,2); (2,2); (3,2); (4,2); (5,2); (6,2); (7,2); (8,2); (9,2); (10,2); (11,2); (12,2); (13,2); (14,2); (15,2); (16,2); (17,2); (18,2); (19,2); (20,2); (0,3); (1,3); (2,3); (3,3); (4,3); (5,3); (6,3); (7,3); (8,3); (9,3); (10,3); (11,3); (12,3); (13,3); (14,3); (15,3); (16,3); (17,3); (18,3); (19,3); (20,3); (0,4); (1,4); (2,4); (3,4); (4,4); (5,4); (6,4); (7,4); (8,4); (9,4); (10,4); (11,4); (12,4); (13,4); (14,4); (15,4); (16,4); (17,4); (18,4); (19,4); (20,4); (0,5); (1,5); (2,5); (3,5); (4,5); (5,5); (6,5); (7,5); (8,5); (9,5); (10,5); (11,5); (12,5); (13,5); (14,5); (15,5); (16,5); (17,5); (18,5); (19,5); (20,5); (0,6); (1,6); (2,6); (3,6); (4,6); (5,6); (6,6); (7,6); (8,6); (9,6); (10,6); (11,6); (12,6); (13,6); (14,6); (15,6); (16,6); (17,6); (18,6); (19,6); (20,6); (0,7); (1,7); (2,7); (3,7); (4,7); (5,7); (6,7); (7,7); (8,7); (9,7); (10,7); (11,7); (12,7); (13,7); (14,7); (15,7); (16,7); (17,7); (18,7); (19,7); (20,7); (0,8); (1,8); (2,8); (3,8); (4,8); (5,8); (6,8); (7,8); (8,8); (9,8); (10,8); (11,8); (12,8); (13,8); (14,8); (15,8); (16,8); (17,8); (18,8); (19,8); (20,8); (0,9); (1,9); (2,9); (3,9); (4,9); (5,9); (6,9); (7,9); (8,9); (9,9); (10,9); (11,9); (12,9); (13,9); (14,9); (15,9); (16,9); (17,9); (18,9); (19,9); (20,9); (0,10); (1,10); (2,10); (3,10); (4,10); (5,10); (6,10); (7,10); (8,10); (9,10); (10,10); (11,10); (12,10); (13,10); (14,10); (15,10); (16,10); (17,10); (18,10); (19,10); (20,10); (0,11); (1,11); (2,11); (3,11); (4,11); (5,11); (6,11); (7,11); (8,11); (9,11); (10,11); (11,11); (12,11); (13,11); (14,11); (15,11); (16,11); (17,11); (18,11); (19,11); (20,11); (0,12); (1,12); (2,12); (3,12); (4,12); (5,12); (6,12); (7,12); (8,12); (9,12); (10,12); (11,12); (12,12); (13,12); (14,12); (15,12); (16,12); (17,12); (18,12); (19,12); (20,12); (0,13); (1,13); (2,13); (3,13); (4,13); (5,13); (6,13); (7,13); (8,13); (9,13); (10,13); (11,13); (12,13); (13,13); (14,13); (15,13); (16,13); (17,13); (18,13); (19,13); (20,13); (0,14); (1,14); (2,14); (3,14); (4,14); (5,14); (6,14); (7,14); (8,14); (9,14); (10,14); (11,14); (12,14); (13,14); (14,14); (15,14); (16,14); (17,14); (18,14); (19,14); (20,14); (0,15); (1,15); (2,15); (3,15); (4,15); (5,15); (6,15); (7,15); (8,15); (9,15); (10,15); (11,15); (12,15); (13,15); (14,15); (15,15); (16,15); (17,15); (18,15); (19,15); (20,15); (0,16); (1,16); (2,16); (3,16); (4,16); (5,16); (6,16); (7,16); (8,16); (9,16); (10,16); (11,16); (12,16); (13,16); (14,16); (15,16); (16,16); (17,16); (18,16); (19,16); (20,16); (0,17); (1,17); (2,17); (3,17); (4,17); (5,17); (6,17); (7,17); (8,17); (9,17); (10,17); (11,17); (12,17); (13,17); (14,17); (15,17); (16,17); (17,17); (18,17); (19,17); (20,17); (0,18); (1,18); (2,18); (3,18); (4,18); (5,18); (6,18); (7,18); (8,18); (9,18); (10,18); (11,18); (12,18); (13,18); (14,18); (15,18); (16,18); (17,18); (18,18); (19,18); (20,18); (0,19); (1,19); (2,19); (3,19); (4,19); (5,19); (6,19); (7,19); (8,19); (9,19); (10,19); (11,19); (12,19); (13,19); (14,19); (15,19); (16,19); (17,19); (18,19); (19,19); (20,19); (0,20); (1,20); (2,20); (3,20); (4,20); (5,20); (6,20); (7,20); (8,20); (9,20); (10,20); (11,20); (12,20); (13,20); (14,20); (15,20); (16,20); (17,20); (18,20); (19,20); (20,20); and coated carbon nanotubes, perfect carbon nanotubes, imperfect carbon nanotubes, functionalized carbon nanotubes, thiol-functionalized, hydroxyl-functionalized, carboxylic acid-functionalized, amine-functionalized, carbon nanotubes that contain gadolinium, COOH-functionalized CNT, OH-functionalized carbon nanotube, $NH_2$-functionalized carbon nanotube, and SH-functionalized CNT.

26. The complex of claim 9, wherein the U-shape molecule is linked to the polymer through one or more covalent bonds, wherein the one or more covalent bonds are chosen from the following list: a single carbon-carbon bond, a carbon-heteroatom single bond, a heteroatom-heteroatom single bond, a double bond, a triple bond, —$CH_2$—, —C(O)—, —NH—, —O—, —S—, —$SO_2$—, —$CH_2CH_2$—, —C(O)$CH_2$—, —$CH_2$C(O)—, —NH$CH_2$—, —$CH_2$NH—, —O$CH_2$—, —$CH_2$O—, —S$CH_2$—, —$CH_2$S—, —$SO_2CH_2$—, —$CH_2SO_2$—, —NHC(O)—, —C(O)NH—, —NH$SO_2$—, —$SO_2$NH—, —$CH_2CH_2CH_2$—, —$CH_2CH_2$C(O)—, —$CH_2CH_2$NH—, —$CH_2CH_2$O—, —$CH_2CH_2$S—, —$CH_2CH_2SO_2$—, —$CH_2$C(O)$CH_2$—, —$CH_2$NH$CH_2$—, —$CH_2$O$CH_2$—, —$CH_2$S$CH_2$—, —$CH_2SO_2CH_2$—, —C(O)$CH_2CH_2$—, —NH$CH_2CH_2$—, —O$CH_2CH_2$—, —S$CH_2CH_2$—, —$SO_2CH_2CH_2$—, —$CH_2$C(O)NH—, —$CH_2SO_2$NH—, —$CH_2$NHC(O)—, —$CH_2$NH$SO_2$—, —C(O)NH$CH_2$—, —$SO_2$NH$CH_2$—, —NHC(O)$CH_2$—, —NH$SO_2CH_2$—, and —NHC(O)NH—.

27. The U-shape molecule of claim 1, wherein the Linker is a chemical bond or moiety which links Subligand1 with Subligand2 via one or more covalent bonds.

28. The U-shape molecule of claim 27, wherein the Linker is selected from the group comprising alkane, alkene, alkyne or combinations thereof comprising between 1 and 20 carbon atoms, between 20 and 30 carbon atoms, between 30 and 40 carbon atoms, between 40 and 50 carbon atoms, or more than 50 carbon atoms; or polyethylene glycol.

29. A process for making a composite material, comprising the following steps:

a. providing a solvent;
b. adding a carbon nanotube to the solvent, to form a suspension;
c. adding the U-shape molecule of claim 1;
d. sonicating the suspension comprising solvent, carbon nanotube and U-shape molecule;
e. adding a polymer; and
f. removing solvent, wherein
steps a, b, and c may be performed in any order;
steps c and d may be performed in any order;
steps d must be performed after step b;
step e may be performed at any step before step f; and
wherein optionally the U-shape molecule is covalently or non-covalently linked to the polymer, and wherein optionally the U-shape is non-covalently linked to the carbon nanotube;
to obtain a composite material.

* * * * *